United States Patent
Mikalsen et al.

(10) Patent No.: US 10,808,465 B2
(45) Date of Patent: Oct. 20, 2020

(54) SYSTEM AND METHOD FOR CONDUCTING SUBTERRANEAN OPERATIONS

(71) Applicant: Nabors LUX 2 SARL, Luxembourg (LU)

(72) Inventors: Kenneth Mikalsen, Sandnes (NO); Kjetil Naesgaard, Roeynebeg (NO)

(73) Assignee: Canrig Robotic Technologies AS, Sandnes (NO)

( * ) Notice: Subject to any disclaimer, the term of this patent is extended or adjusted under 35 U.S.C. 154(b) by 0 days.

(21) Appl. No.: 16/396,297

(22) Filed: Apr. 26, 2019

(65) Prior Publication Data
US 2019/0330935 A1 Oct. 31, 2019

Related U.S. Application Data

(60) Provisional application No. 62/663,960, filed on Apr. 27, 2018.

(51) Int. Cl.
*E21B 19/14* (2006.01)
*E21B 19/16* (2006.01)

(52) U.S. Cl.
CPC ............ *E21B 19/14* (2013.01); *E21B 19/168* (2013.01)

(58) Field of Classification Search
CPC ........ E21B 19/14; E21B 19/20; E21B 19/155; E21B 19/15
USPC ............................................ 414/22.51, 22.61
See application file for complete search history.

(56) References Cited

U.S. PATENT DOCUMENTS

| | | | |
|---|---|---|---|
| 3,501,027 A * | 3/1970 | Dea .................. | E21B 19/15 414/542 |
| 3,750,898 A | 8/1973 | Ancey et al. | |
| 3,987,910 A | 10/1976 | Brunato | |
| 4,274,778 A | 6/1981 | Putnam et al. | |
| 4,610,315 A * | 9/1986 | Koga .................. | E21B 19/20 175/85 |
| 4,621,974 A | 11/1986 | Krueger | |
| 4,715,761 A | 12/1987 | Berry et al. | |
| 4,738,321 A | 4/1988 | Oliver | |
| 4,765,401 A | 8/1988 | Boyadjieff | |

(Continued)

FOREIGN PATENT DOCUMENTS

| EP | 1953334 A2 | 8/2008 |
|---|---|---|
| EP | 2462369 B1 | 4/2013 |

(Continued)

OTHER PUBLICATIONS

International Search Report and Written Opinion for PCT/EP2019/060962, dated Jul. 23, 2019, 11 pages.

(Continued)

*Primary Examiner* — Lynn E Schwenning
(74) *Attorney, Agent, or Firm* — Abel Schillinger, LLP; Enrique Abarca

(57) ABSTRACT

A tubular handling system for conducting subterranean operations is disclosed and can include a bridge disposed within a tubular storage area and coupled to a guide rail. The bridge is configured to translate from a first bridge position to a second bridge position along the guide rail and over the tubular storage area. The tubular handling system can further include an arm coupled to the bridge and a gripper coupled to the arm. The gripper can be adapted to engage a first tubular.

20 Claims, 215 Drawing Sheets

(56) References Cited

U.S. PATENT DOCUMENTS

| | | | |
|---|---|---|---|
| 5,451,129 A * | 9/1995 | Boyadjieff | B65G 1/0442 414/22.61 |
| 6,220,807 B1 | 4/2001 | Sorokan | |
| 6,763,898 B1 | 7/2004 | Roodenburg et al. | |
| 7,404,697 B2 | 7/2008 | Thompson | |
| 7,552,775 B2 | 6/2009 | Pietras | |
| 7,603,927 B2 | 10/2009 | Markert et al. | |
| 7,699,122 B2 | 4/2010 | Eriksen | |
| 7,802,636 B2 | 9/2010 | Childers et al. | |
| 8,028,748 B2 | 10/2011 | Laitolais, Jr. et al. | |
| 8,109,338 B2 | 2/2012 | Belik | |
| 8,240,968 B2 * | 8/2012 | Hopkins | E21B 19/155 414/22.55 |
| 8,253,104 B2 | 8/2012 | Sigmar et al. | |
| 8,308,419 B2 | 11/2012 | Snihei et al. | |
| 8,397,837 B2 * | 3/2013 | Skogerbo | E21B 19/155 166/250.01 |
| 8,506,229 B2 | 8/2013 | Orgeron | |
| 8,550,761 B2 | 10/2013 | Belik et al. | |
| 8,936,424 B1 | 1/2015 | Barnes et al. | |
| 9,309,728 B2 | 4/2016 | Reddy et al. | |
| 9,500,049 B1 | 11/2016 | Orgeron et al. | |
| 2006/0010474 A1 | 5/2006 | Zahn et al. | |
| 2008/0253866 A1 * | 10/2008 | Lops | E21B 19/155 414/22.55 |
| 2010/0034620 A1 | 2/2010 | Orgeron | |
| 2012/0229291 A1 | 9/2012 | Mikalsen et al. | |
| 2014/0054089 A1 | 2/2014 | Sondervik | |
| 2014/0064883 A1 | 3/2014 | Sondervik | |
| 2014/0305265 A1 | 10/2014 | Haughorn | |
| 2014/0338174 A1 | 11/2014 | Mikalsen | |
| 2016/0060979 A1 | 3/2016 | Magnuson | |
| 2016/0090796 A1 | 3/2016 | Roodenburg et al. | |
| 2016/0153245 A1 | 6/2016 | Roodenburg et al. | |
| 2016/0160586 A1 | 6/2016 | Keogh et al. | |
| 2017/0328149 A1 | 11/2017 | Soyland et al. | |

FOREIGN PATENT DOCUMENTS

| | | | | |
|---|---|---|---|---|
| GB | 2264736 | * | 9/1993 | E21B 19/15 |
| WO | 199322535 | | 11/1993 | |
| WO | 9931346 A1 | | 6/1999 | |
| WO | 2005059299 A1 | | 6/2005 | |
| WO | 2008103156 A2 | | 8/2008 | |
| WO | 2010062610 A2 | | 6/2010 | |
| WO | 2010105159 A2 | | 9/2010 | |
| WO | 2014179727 A1 | | 11/2014 | |
| WO | 2015043740 A1 | | 4/2015 | |
| WO | 2015175093 A1 | | 11/2015 | |
| WO | 2016163890 A1 | | 10/2016 | |
| WO | 2017087349 A1 | | 5/2017 | |
| WO | 2017087595 A1 | | 5/2017 | |
| WO | 2017127924 A1 | | 8/2017 | |
| WO | 2018016964 A1 | | 1/2018 | |

OTHER PUBLICATIONS

International Search Report and Written Opinion for PCT/EP2019/060932, dated Jul. 12, 2019, 11 pages.
International Search Report and Written Opinion for PCT/EP2019/060960, dated Jul. 24, 2019, 14 pages.
International Search Report and Written Opinion for PCT/EP2019/060958, dated Jul. 24, 2019, 14 pages.

* cited by examiner

SYSTEM AND METHOD FOR CONDUCTING SUBTERRANEAN OPERATIONS

CROSS-REFERENCE TO RELATED APPLICATION(S)

This application claims priority under 35 U.S.C. § 119(e) to U.S. Patent Application No. 62/663,960, entitled "SYSTEM AND METHOD FOR CONDUCTING SUBTERRANEAN OPERATIONS," by Kenneth MIKALSEN et al., filed Apr. 27, 2018, which application is assigned to the current assignee hereof and incorporated herein by reference in its entirety.

BACKGROUND OF THE INVENTION

Field of the Disclosure

The present invention relates, in general, to drilling operations and more specifically, to pipe handling systems for drilling rigs.

Description of the Related Art

Hundreds of billions of dollars are spent worldwide for oil exploration and production. Much of this activity is conducted on drilling platforms. For example, these drilling platforms may include fixed platforms, compliant towers, semi-submersible platforms, jack-up drilling rigs, drill ships, floating productions systems, tension-leg platforms, gravity-based structures, and spar platforms. Regardless of the type of platform, these are complex operations that generally require the use of drilling rigs in order to locate and recover oil.

Accordingly, the exploration and production of natural resources continues to demand improvements.

BRIEF DESCRIPTION OF THE DRAWINGS

The present disclosure may be better understood, and its numerous features and advantages made apparent to those skilled in the art by referencing the accompanying drawings.

DETAILED DESCRIPTION

The following is generally directed to systems and methods for conducting subterranean operations.

Embodiments are directed to a system for conduction subterranean operations. The system can include a plurality of subsystems, such as a horizontal tubular handling system disposed over a tubular storage area that interacts with a vertical tubular handling system adjacent to well bore area. The system can also include a track mounted robotic arm adjacent to the well bore area and an iron roughneck adjacent to the well bore area. The system is automated and can safely pass tubulars, e.g., BHA components, drill pipes, and casings, between the horizontal tubular handling system, the vertical tubular handling system, and the robotic arm, while using the iron roughneck to automatically torque tubular together and decouple tubular members.

System for Conducting a Subterranean Operation

Figure 1:
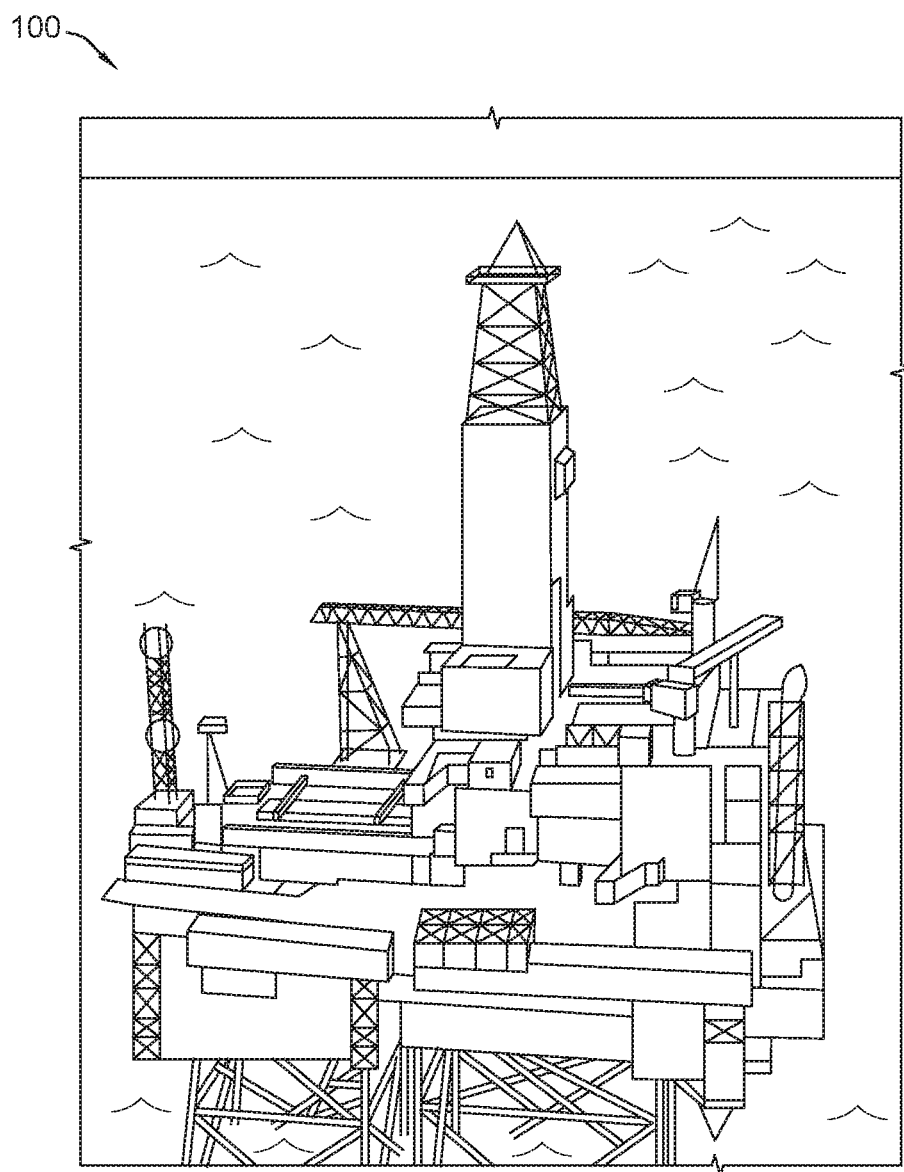
FIGS. 1-167 include illustrations of portions of a system for conducting subterranean operations in accordance with embodiments herein.
Figure 2:
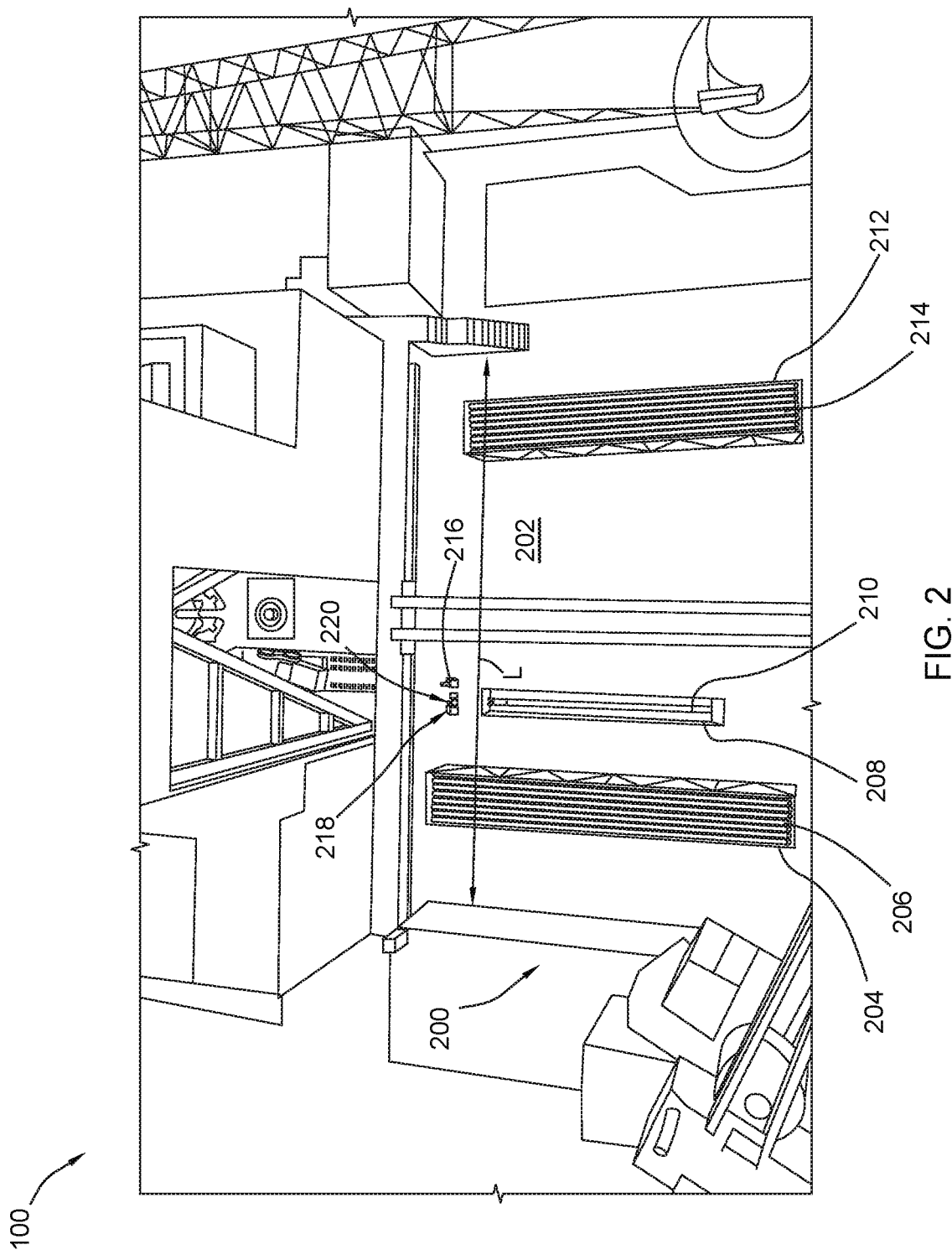
Figure 3:
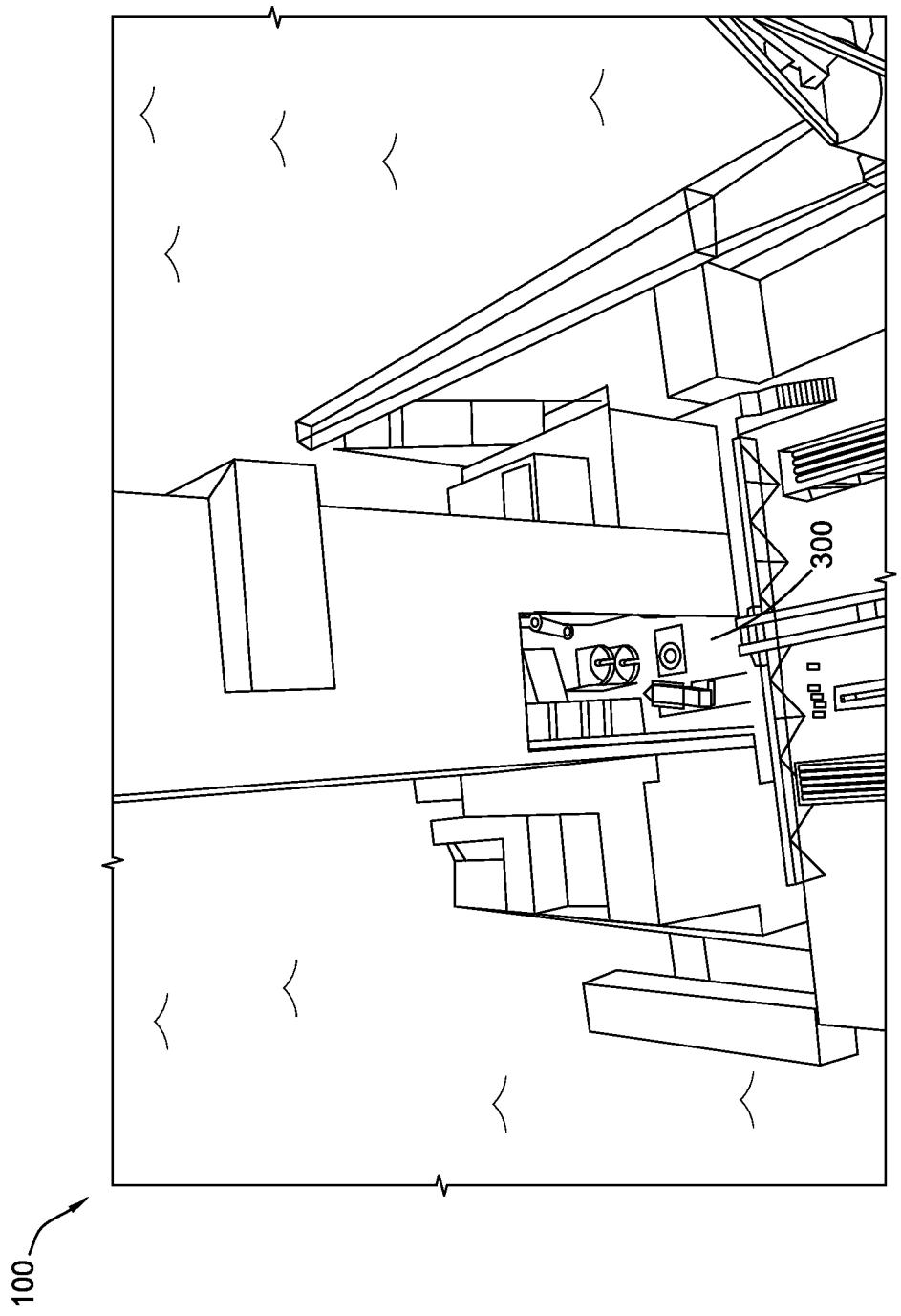
Figure 167:
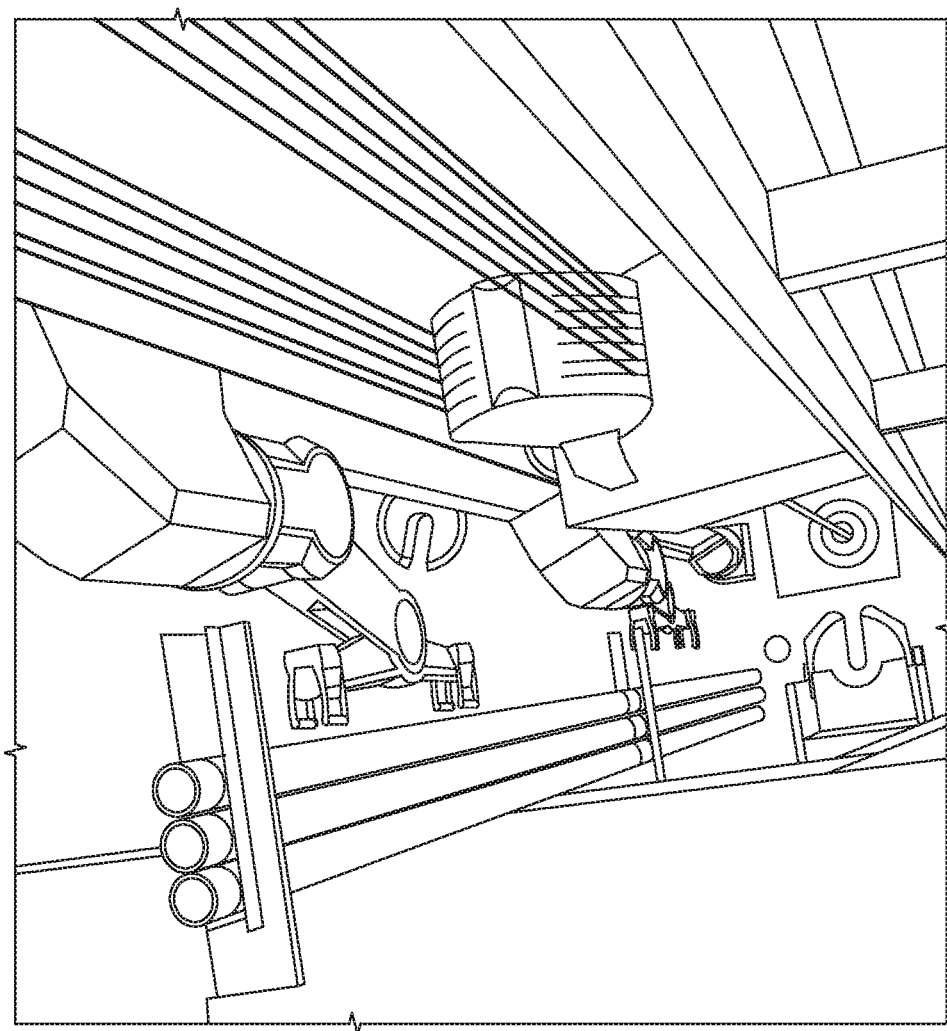
Figure 168:
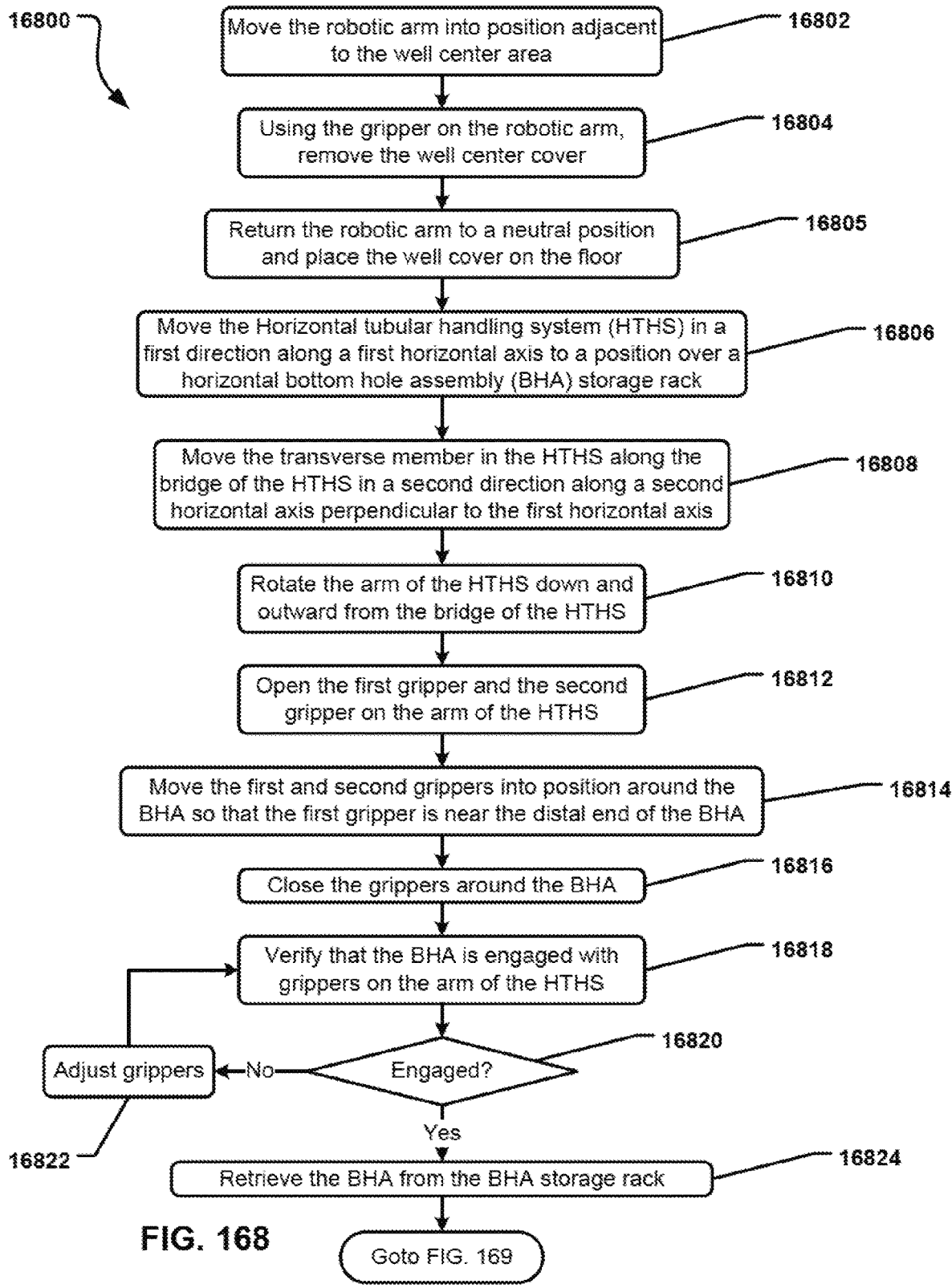
FIGS. 168-192 include illustrations of a portion of a first method for conducting subterranean operations in accordance with embodiments herein.

Referring FIG. 1 through FIG. 167 various parts of a system for conducting a subterranean operation is illustrated and is generally designated 100. As shown in FIG. 2, the system 100 can include a tubular storage area 200 that can be used to store various tubular, e.g., drill pipes and casings, horizontally and some relatively short tubulars, e.g., subs, vertically. For example, the tubular storage area 200 can include a storage floor 202 that can include a horizontal drill pipe rack 204 in which a plurality of drill pipes 206 can be stored horizontally. Further, the tubular storage area 200 can include a horizontal bottom hole assembly (BHA) storage rack 208 in which one or more BHA components, such as a BHA 210 may be stored horizontally. The tubular store area 200 can also include a horizontal storage rack 212 in which a plurality of casings 214 can be stored horizontally. It is to be understood that the horizontal drill pipe rack 204, the BHA storage rack 208, and the horizontal storage rack 212 can be considered tubular magazines in which one or more tubulars can be stored.

FIG. 2 through FIG. 4 and FIG. 10 through FIG. 12 indicate that the tubular storage area 200 can further include a vertical storage rack 216 that can include a plurality of vertical posts 218 on which a plurality of sub-type tubulars 220 (subs) can be stored. These subs 220 can include lift plugs, rotary sub, crossover subs, rotary reduced section subs, hoisting subs, lifting bails, top drive subs, inline sensors, and other types of generally cylindrical or generally tubular devices that can be engaged, threadably or non-threadably, with one or more other tubulars (e.g., drill pipes or casings). During operation, one or more subs 220 can be lifted from the vertical storage rack 216 rotated to a horizontal transfer position and transferred into a drilling area (described in detail below) for retrieval by another tubular handler.

FIG. 2 and FIG. 10 through FIG. 15 indicate that the tubular storage area 200 can further include a horizontal tubular handling system (HTHS) 230. The HTHS 230 can include a bridge 232 mounted on first guide rail 234 and a second guide rail 236. The bridge 232 is configured to translate from a first bridge position to a second bridge position along the guide rails 234, 236 and over the tubular store area 200. Further, translating the bridge 232 is performed in a direction generally transverse, or perpendicular, to a length of a first tubular that the HTHS 230 may be carrying, as described in detail below. In another aspect, operating the HTHS 230 can include translating the bridge 232 along the guide rails 234, 236 to a third bridge position spaced apart from the first bridge position and the second bridge position, wherein the third bridge position corresponds to a second pick-up position wherein the arm is adapted to engage a second tubular in a tubular magazine, e.g., to a drill pipe 206 within a horizontal drill pipe rack 204, a BHA 210 in a BHA storage rack 208, a casing 214 within a horizontal storage rack 212, or a combination thereof. Translating the bridge 232 to the first bridge position, the second bridge position, or the third bridge position can include sensing at least one characteristic of the tubular storage area 200 and the at least one characteristic can include a number of tubulars in the storage area, a position of a tubular relative to the tubular storage area, or any combination thereof.

In another aspect, the tubular storage area 200 can include a length, L, and the guide rails 234, 236 can extend along the entire length of the tubular storage area 200. This may allow the HTHS 230 to have full access to all of the tubulars stored in the tubular storage area 200 (vertically and horizontally stored). The bridge 232 can include a first portion 238 that extends from the first guide rail 234 to the second guide rail 236. Moreover, the bridge 232 can include a second portion 240 that extends from the first guide rail 234 to the second guide rail 236. In particular the first and second portions 238, 240 of the bridge can be substantially parallel to each other and substantially perpendicular to the guide rails 234, 236.

The bridge 232 of the HTHS 230 can further include a transverse member 242 that is mounted between the first and second portions 238, 240 of the bridge 232. The transverse member 242 can move linearly between the first and second portions 238, 240 of the bridge 232 along an axis 241 that is parallel to the first and second portions 238, 240 of the bridge 232. The axis 241 along which the transverse member 242 moves is substantially perpendicular to the axis 243 along which the bridge 232 moves.

As illustrated, the HTHS 230 can also include an articulating arm 244 rotatably mounted on the transverse member 242 of the bridge 232 of the HTHS 230. In a particular aspect, the articulating arm 244 can include a first portion 246 having a first end 248, a second end 250, and an elongated portion 252 extending therebetween. The first end 248 of the first portion 246 of the arm 244 can be generally cylindrical and can be rotatably mounted within a portion of the transverse member 242 of the bridge. A motor (not shown) can be disposed within the first end 248 of the first portion 246 of the arm 244. The motor can be a servomotor, a stepper motor, or the like. Further, actuating the motor may cause the arm 244 to rotate around an axis 254, passing through a center of the first end 248 of the first portion 246 of the arm 244, that may be generally perpendicular to the first and second portions 238, 240 of the bridge 232. The second end 250 of the first portion 246 of the arm 244 can be formed with a bore 256 extending substantially perpendicularly therethrough. Further, the second end 250 of the first portion 246 of the arm 244 can include a slot 258 extending therethrough at least partially along the length of the elongated portion 252 of the first portion 246 of the arm 244.

The articulating arm 244 can also include a second portion 260 having a first end 262, a second end 264, and an elongated portion 266 extending therebetween. The elongated portion 266 can include an offset disc-shaped portion 268 located centrally along the elongated portion 266 of the second portion 260 of the arm 244. The offset disc-shaped portion 268 has a center that is spaced apart a distance, D, from the longitudinal axis of the elongated portion 266 of the second portion 260 of the articulating arm 244. The offset disc-shaped portion 268 of the second portion 260 of the arm 244 is configured to fit into and rotate within the bore 254 formed in the second end 250 of the first portion 246 of the arm 244. The slot 256 formed in the second end 250 of the first portion of the arm 244 can allow the second portion 260 of the arm 244 to rotate nearly 180° with respect to the first portion 246 of the arm 244 and can allow the second portion 260 of the arm 244 to be rotated nearly parallel to the first portion 246 of the arm 244.

In a particular aspect, a motor (not shown) can be disposed within the offset disc-shaped portion 268 of the second portion 260 of the articulating arm 244. The motor can be a servomotor, a stepper motor, or the like. Further, actuating the motor can cause the second portion 260 of the articulating arm 244 to rotate with respect to the first portion 246 of the articulating arm 244 around an axis 270, passing through a center of the offset disc-shaped portion 268 of the second portion 260 of the articulating arm 244, that is generally perpendicular to the first and second portions 238, 240 of the bridge 232.

As further shown in the figures, the HTHS 230 can include a first gripper 280 attached to, or disposed on, the first end 262 of the second portion 260 of the articulating arm 244. Further, the HTHS 230 can include a second gripper 282 attached to, or disposed on, the second end 264 of the second portion of the articulating arm 244. The grippers 280, 282 are described in detail in patent application Ser. No. 15/531,644; filed on Dec. 1, 2015; and published as United States Publication number 2017/0328149. Application 2017/0328149 is hereby incorporated by reference in its entirety. As described in greater detail below, the articulating arm 244 and the grippers 280, 282 can be adapted to engage at least a first tubular and can be used to retrieve the first tubular and other tubulars from the tubular storage area 200 and pass them to the drilling area. Further, the grippers 280, 282 can be rotatably coupled to the arm 244 of the HTHS 230 and a rotational axis of each gripper 280, 282 is generally parallel with a horizontal plane or generally perpendicular to a length of the arm 244.

The arm 244 of the HTHS 230 is adapted to move a tubular between the first portion 238 and the second portion 240 of the bridge 232 upon moving the tubular from a pick-up position to a delivered position. Further, the HTHS 230 is adapted to move a first tubular from a first horizontal position associated with a pick-up position through a vertical position and to a second horizontal position associated with a delivered position. Additionally, the arm 244 of the HTHS 230 is adapted to translate along at least a portion of a length of the bridge 232 while rotating a tubular from a first horizontal position, through a vertical position, to a second horizontal position. In a particular aspect, moving the first tubular between the first and second positions includes rotating the first tubular at least 91 degrees or at least 95 degrees or at least 100 degrees or at least 120 degrees or at least 150 degrees or at least 160 degrees. Moving the arm 244 toward the first tubular is performed by pivoting the arm about a pivotal axis that oriented generally normal to a horizontal plane passing through the first portion 238 and the second portion 240 of the bridge 232.

In a particular aspect, the HTHS 230 can be used for conducting subterranean operations. Such a method can include translating a bridge 232 of a pipe deck handler to a first bridge position over a tubular storage area, moving an arm 244 coupled to the bridge 232 toward a first tubular in the tubular storage area, gripping the first tubular with a gripper 280, 282 coupled to the arm 244, and at least one of the following processes: translating the bridge 232 along a guide rail 234, 236 to a second bridge position spaced apart from the first bridge position; moving the first tubular from a first position to a second position, wherein moving includes moving at least a portion of the first tubular through the bridge 232 between a first portion 238 and a second portion 240 of the bridge 232; moving the first tubular from a first horizontal position associated with a pick-up position through a vertical position and to a second horizontal position associated with a delivered position; translating the arm 244 along at least a portion of a length of the bridge 232 while rotating the tubular from a first horizontal position, through a vertical position, to a second horizontal position; or any combination thereof.

Specifically, translating the bridge 232 can be performed in a direction generally transverse to a length of the first tubular. Moreover, the first bridge position corresponds to a pick-up position wherein the arm 244 is adapted to engage the first tubular in a tubular magazine and wherein the second bridge position corresponds to the delivered position. The method of operation can further include translating the bridge 232 along the guide rail 234, 236 to a third bridge position spaced apart from the first bridge position and second bridge position. The third bridge position corresponds to a second pick-up position wherein the arm 244 is adapted to engage a second tubular in a tubular magazine.

In a particular aspect, translating the bridge to the first bridge position further comprises sensing at least one characteristic of the tubular storage area, the at least one characteristic comprising at least one of: a number of tubulars in the tubular storage area 200; a position of the tubular relative to the tubular storage area 200; or any combination thereof. Moving the first tubular between the first and second positions comprises rotating the first tubular at least 91 degrees or at least 95 degrees or at least 100 degrees or at least 120 degrees or at least 150 degrees or at least 160 degrees. Further, moving the arm toward the first tubular is performed by pivoting the arm about a pivotal axis oriented generally normal to a horizontal plane. As previously described, the arm 244 is coupled to the bridge 232 through a transverse member 242, and translating the arm 244 along the bridge 232 is performed by moving the transverse member 242 relative to the bridge 232. Further, the transverse member 242 is coupled between the first and second portions 238, 240 of the bridge 232 and moving the transverse member 242 is performed by translating the transverse member 242 along a length of the bridge 232.

In another aspect, the gripper 280, 282 is rotatably coupled to the arm 244 about a rotational axis and the rotational axis is generally parallel with a horizontal plane or generally perpendicular to a length of the arm 244. Further, moving the first tubular from the first horizontal position to the second horizontal position comprises rotating the gripper 280, 282 around a rotational axis. The first tubular can be disposed at a first angular orientation, as measured with respect to a horizontal plane prior to engagement with the gripper 280, 282, between and including 0° and 90°.

The method of operating the HTHS 230 can further include moving the arm 244 toward a second tubular in the tubular storage area 200 and gripping the second tubular with the gripper 280, 282. In a particular aspect, the first and second tubulars can be disposed at different angular orientations, as measured prior to engagement with the gripper 280, 282. Moving the arm 244 toward the second tubular can be performed after translating the bridge 232 along the guide rail 234, 236 to a third bridge position corresponding with the second tubular. Further, moving the arm 244 toward the second tubular is performed after translating the bridge 232 along the guide rail 234, 236 to the first bridge position corresponding with the second tubular.

In another aspect, the bridge 232 is adapted to access the entire tubular storage area 200. Further, first horizontal position is disposed at a vertical elevation below the second horizontal position. Moreover, the HTHS 230 is disposed adjacent to a wellbore, and wherein the second horizontal position is closer to the wellbore than the first horizontal position. It is to be understood that the arm 244 is coupled to the bridge 232 through a transverse member 242 adapted to translate along a length of the bridge 234. At least one of the bridge 232 and transverse member 242 comprises a drive element adapted to move the transverse member along a length of the bridge. The drive element comprises an electric motor.

In another aspect, the arm 244 comprises a pivot joint adapted to pivot relative to the bridge 232 in a range between and including 1° and 270°. Additionally, the arm 244 can be adapted to pivot around the pivot joint at an angle of at least 5° or at least 10° or at least 20° or at least 30° or at least 40° or at least 50° or at least 60° or at least 70° or at least 80° or at least 90° or at least 100° or at least 110° or at least 120° or at least 130° or at least 140° or at least 150° or at least 160° or at least 170° or at least 180° or at least 190° or at least 200° or at least 210° or at least 220° or at least 230° or at least 240° or at least 250° or at least 260°. In another aspect, the arm 244 can be adapted to pivot around the pivot joint at an angle of not greater than 260° or not greater than 250° or not greater than 240° or not greater than 230° or not greater than 220° or not greater than 210° or not greater than 200° or not greater than 190° or not greater than 180° or not greater than 170° or not greater than 160° or not greater than 150° or not greater than 140° or not greater than 130° or not greater than 120° or not greater than 110° or not greater than 100° or not greater than 90°.

It is to be understood that the arm 244 is coupled directly to a transverse element 242, and the transverse element 242 is coupled directly to a first portion 238 and second portion 240 of the bridge 232. The bridge 232 is coupled to a guide rail 234, 236 and the bridge 232 is configured to translate from a first bridge position to a second bridge position along the guide rail 234, 236 and over the tubular storage area 200. The HTHS 230 can be configured to translate for a distance greater than a majority of a length of the tubular storage area. For example, the HTHS 230 is configured to translate for at least 60% of a length of the tubular storage area 200 or at least 70% or at least 80% or at least 90% or at least 95%.

In another aspect, the HTHS 230 is configured to translate for an entire length of the tubular storage area 200. It is to be understood that the guide rail includes a first guide rail 234 and a second guide rail 236, and wherein the bridge 232 comprises a first end 290 attached to the first guide rail 234 and a second end 292 attached to the second guide rail 236. The guide rail 234, 236 extends in a direction generally perpendicular to a length of the bridge 232. The HTHS 230 further includes at least one drive element between the bridge 232 and the guide rail 234, 236 configured to translate the bridge 232 along the guide rail 234, 236.

In still another aspect, the bridge 232 comprises at least one drive member between the first end 290 and the first guide rail 234 or the second end 292 and the second guide rail 236 and the at least one drive member is configured to translate the bridge 232 along the guide rail 324, 236. Further, in another aspect, the HTHS 230 can include a first drive member between the first end 290 and the first guide rail 234 and a second drive member between the second end 292 and the second guide rail 236 and the first drive member and second drive member can be controlled by at least one controller to synchronize their movements. It is to be understood that the arm 244 is coupled to a transverse member 242 and the arm 244 comprises a first pivot point with a first pivot axis extending generally parallel to a horizontal plane. The arm 244 further includes a gripper 280, 282 coupled to the arm 244 at a second pivot point and having a second pivot axis extending generally parallel to the horizontal plane.

The arm 244 and gripper 280, 282 are adapted to act in concert to move the first tubular from a first horizontal position to a second horizontal position spaced apart from the first horizontal position. During movement of the first tubular from the first horizontal position to the second horizontal positions, the gripper 280, 282 is adapted to rotate about a second pivot point a first angular displacement, $\alpha 1$, greater than an angular displacement, $\alpha 2$, of the arm about a first pivot axis. In particular, $\alpha 1$ is at least 1.01 $\alpha 2$ or at least 1.02 $\alpha 2$ or at least 1.03 $\alpha 2$ or at least 1.04 $\alpha 2$ or at least 1.05 $\alpha 2$ or at least 1.1 $\alpha 2$ or at least 1.2 $\alpha 2$ or at least 1.3 $\alpha 2$ or at least 1.4 $\alpha 2$. In another aspect, $\alpha 1$ is not greater than 10.0 $\alpha 2$ or not greater than 9.0 $\alpha 2$ or not greater than 8.0 $\alpha 2$ or not greater than 7.0 $\alpha 2$ or not greater than 6.0 $\alpha 2$ or not greater than 5.0 $\alpha 2$ or not greater than 4.0 $\alpha 2$ or not greater than 3.0 $\alpha 2$ or not greater than 2.0 $\alpha 2$ or not greater than 1.5 $\alpha 2$.

In still another aspect, the gripper 280, 282 is rotatable about a second pivot point relative to the arm 244 and the arm 244 is pivotable about a first pivot axis, and wherein the second pivot axis and first pivot axis are generally parallel with respect to one another. In another aspect, the gripper 280, 282 can include at least two gripping elements and each can be adapted to grip the first tubular. Further, at least one of the at least two gripping elements can be adapted to grip the first tubular with a first diameter and a second tubular with a second diameter different than the first diameter. In another aspect, the arm 244 comprises a recessed portion and at least a portion of the gripper 280, 282 is disposed in the recessed portion of the arm 244. The gripper 280, 282 can be rotatably coupled to the arm 244 about a rotational axis extending through the recessed portion of the arm.

In another aspect, the bridge 232 has a total length, LB, and the arm 244 is adapted to translate a distance of not greater than LB or not greater than 0.99 LB or not greater than 0.95 LB or not greater than 0.9 LB or not greater than 0.8 LB or not greater than 0.7 LB or not greater than 0.6 LB. Further, the bridge has a length, LB, and the arm is adapted to translate a distance of at least 0.05 LB or at least 0.1 LB or at least 0.2 LB or at least 0.3 LB or at least 0.4 LB or at least 0.5 LB. In another aspect, the bridge is disposed at a vertical elevation above the tubular storage area.

Figure 5:
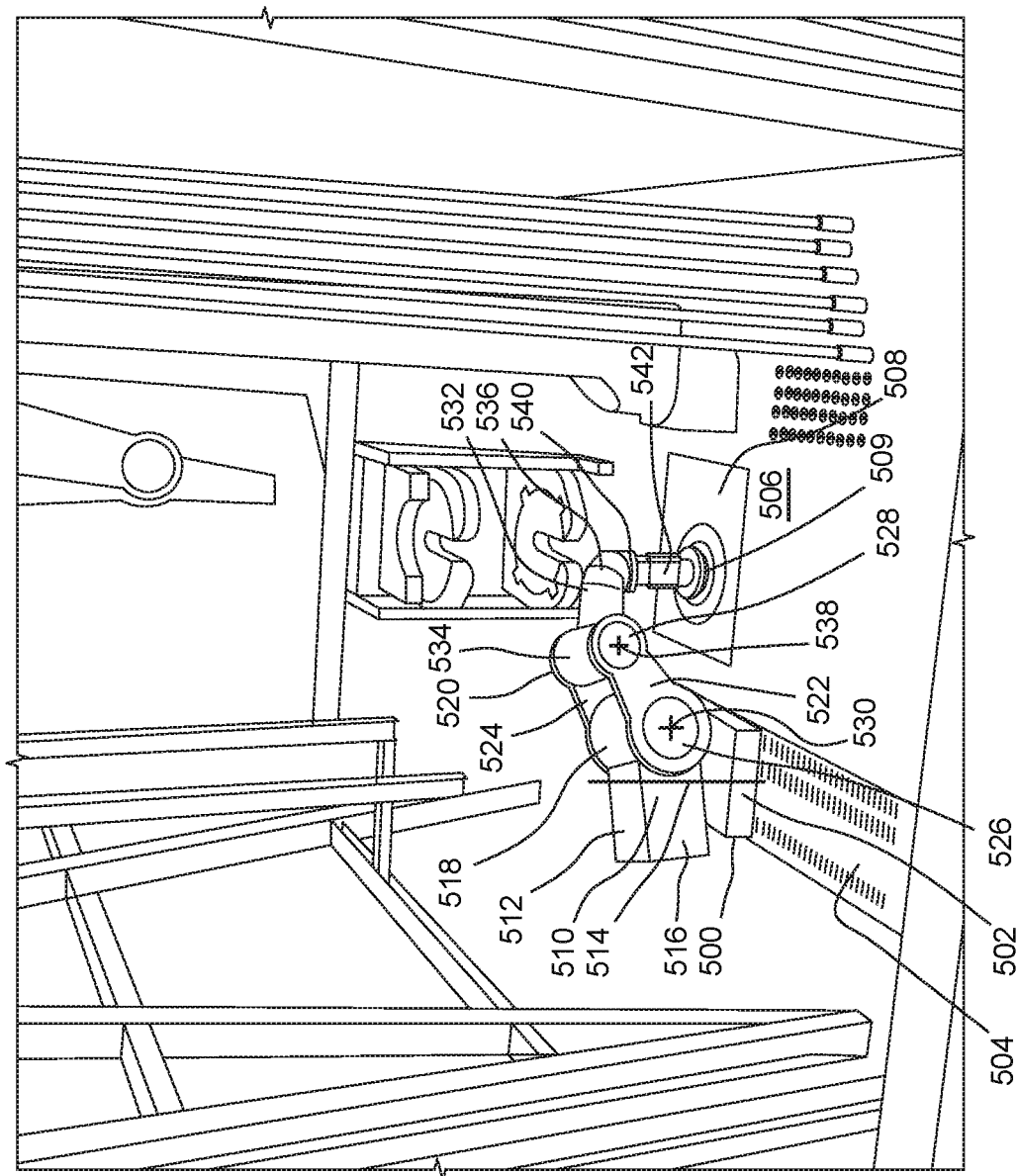
Figure 6:
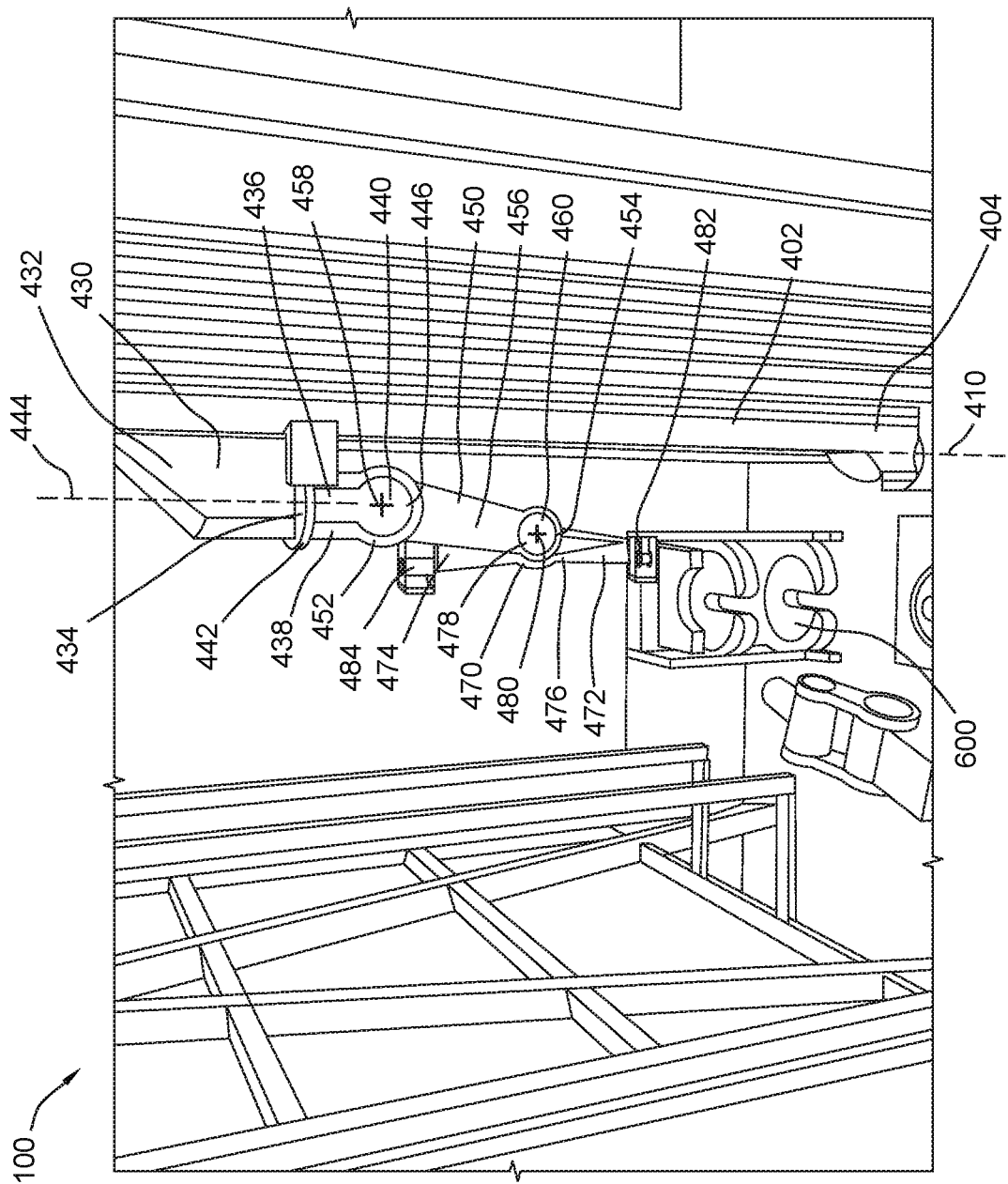
Figure 7:
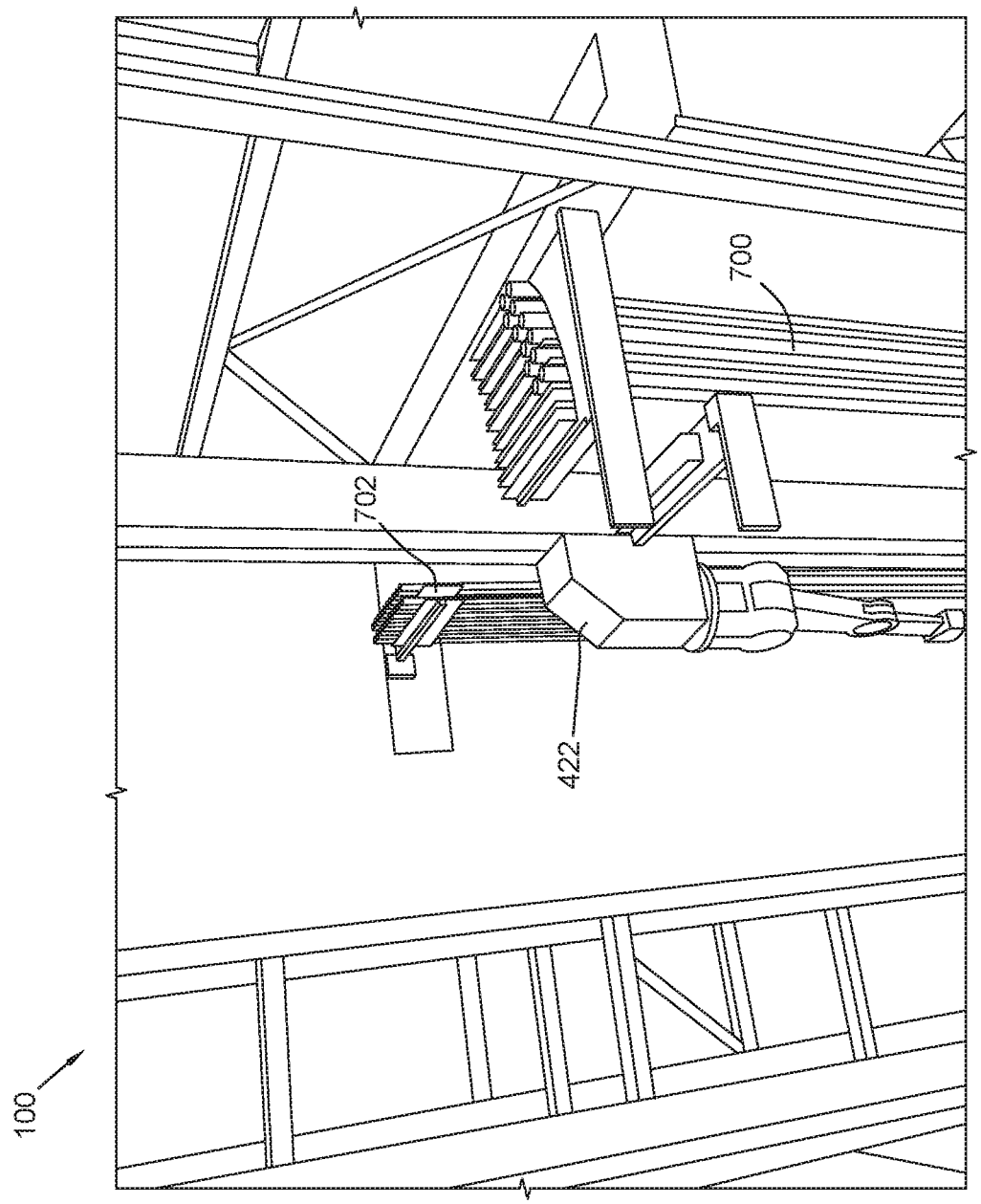

As further indicated in FIG. 3 through 7, the system 100 can include a well bore area 300 adjacent to the tubular storage area 200. The well bore area 300 can include a vertical tubular handling system (VTHS) 400, a robotic arm 500, and an iron roughneck system 600. The well bore area 300 can further include a first vertical tubular storage rack, or setback, 700 and a second vertical tubular storage rack, or setback, 702 adjacent to the VTHS 400. While the vertical storage racks 700, 702 are shown in FIG. 7 and other figures, ensuing figures have been simplified and the racks 700, 702 may be omitted for clarity.

Figure 4:
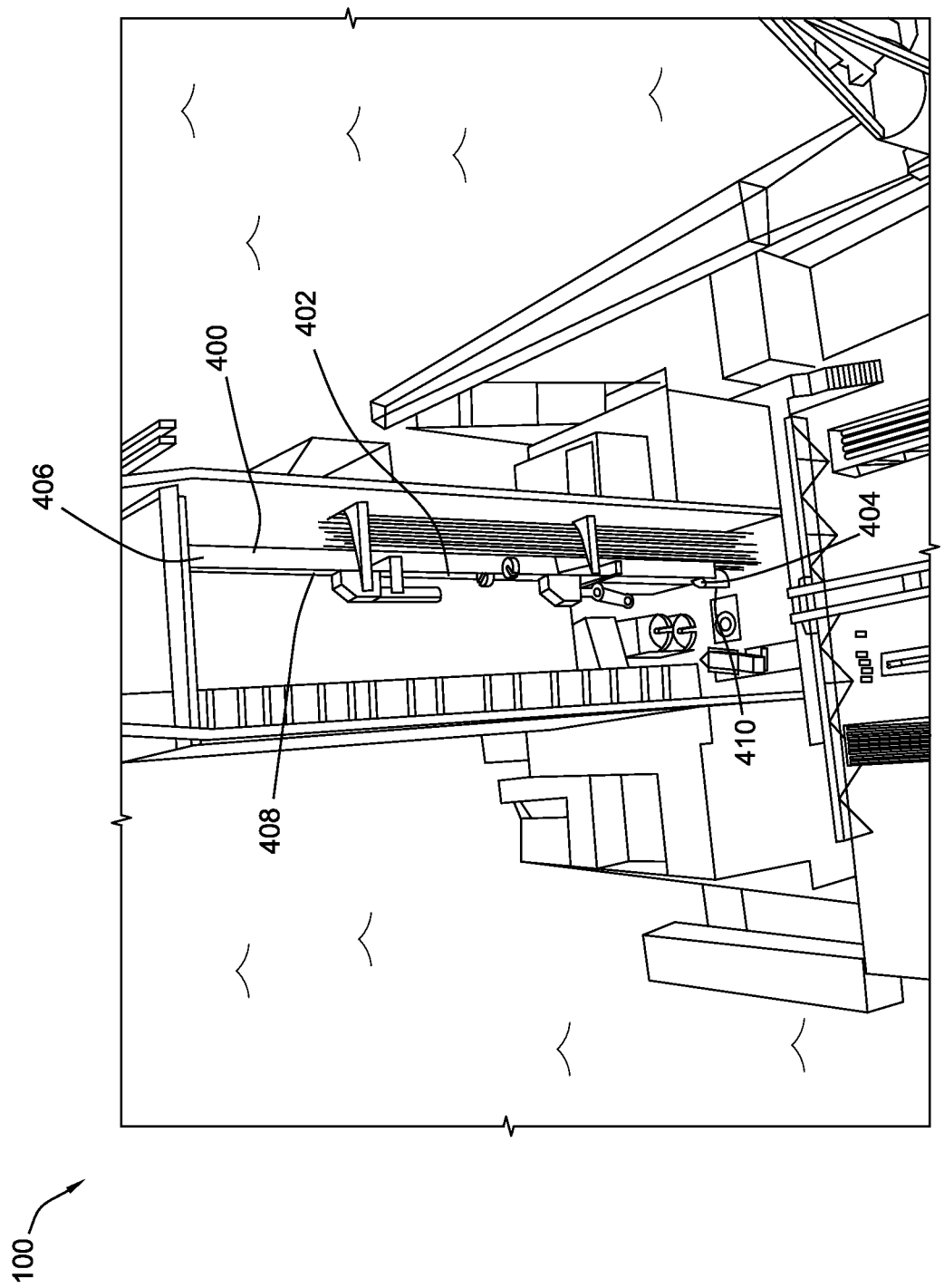

As shown in FIG. 4, the VTHS 400 can include a vertical support structure 402 having a first end 404, a second end 406, and an elongated portion 408 extending therebetween. The first end 404 of the vertical support structure 402 can be generally cylindrical and can be rotatably mounted on a base 410. In a particular aspect, the first end 404 of the vertical support structure 402 or the base 410 can include a motor (not shown) disposed therein. The motor can be a servomotor, a stepper motor, or the like. Actuating the motor can cause the vertical support structure 402 to rotate around a first vertical rotational axis 410, passing through a center of the first end 404 of the vertical support structure 402, that is generally perpendicular to the storage floor 202.

FIG. 4 further indicates that the VTHS 400 can include a lower tubular handler (LTH) 420 and an upper tubular handler (UTH) 422 coupled to the vertical support structure 402. The LTH 420 can be considered a first tubular handler and the UTH 422 can be considered a second tubular handler. In a particular aspect, the UTH 422 is disposed at a vertical elevation along the vertical support structure 402 above the LTH 420. Further, the UTH 422 is adapted to move independent of the LTH 420. More specifically, the UTH 422 and the LTH 420 are adapted to move independent of each other. Additionally, the LTH 420 and the UTH 422 are adapted to rotate with the vertical support structure 402 around the first vertical rotational axis 410. Moreover, the LTH 420 and the UTH 422 are adapted to move linearly up and down along the vertical support structure 402.

In a particular aspect, the LTH 420 and the UTH 422 may include at least three different pivot points. Further, the LTH 420 and the UTH 422 can be vertically adjustable with respect to the vertical support structure 402. The LTH 420 and/or the UTH 422 can be adapted to reorient a tubular, e.g., a first tubular, between a generally horizontal orientation and a generally vertical orientation. In a particular aspect, the LTH 420 and the UTH 422 can be adapted to move independent of each other.

As best shown in FIG. 6, the LTH 420 can include an articulating arm 430 having a first portion 432 coupled to the vertical support structure 402. A motor (not shown) can be disposed within the first portion 432 of the arm 430 and the motor can be used to raise or lower the LTH 420 along the vertical support structure 402. The motor can be a servomotor, a stepper motor, or the like.

The first portion 432 of the articulating arm 430 can include a mounting plate 434 on which a second portion 436 is mounted or otherwise coupled thereto. The second portion 436 of the arm 430 can include a first end 438 and a second end 440. The first end 438 of the second portion 436 of the arm 430 can include a mounting plate 442 that can be coupled to and abut the mounting plate 434 of the first portion 432 of the arm 430. A motor (not shown) can be disposed adjacent to the mounting plates 434, 442 within the first portion 432 of the arm 430 and the motor can be used to rotate the second portion 436 of the arm 430 around a second vertical rotational axis 444 parallel to and spaced apart from the first vertical rotational axis 410. It is to be understood that the second vertical rotational axis 444 is generally parallel with a length of the vertical support structure 402, or the second vertical rotational axis is generally vertical, or a combination thereof. The second portion 436 of the arm 430 of the LTH 420 can be rotatably by at least 10 degrees, at least 25 degrees, at least 45 degrees, at least 60 degrees, at least 90 degrees, at least 120 degrees, at least 150 degrees, or at least 180 degrees about the second vertical rotational axis 444. The motor can be a servomotor, a stepper motor, or the like.

The second end 440 of the second portion 436 of the arm 430 can include two generally disk-shaped plates 446 spaced apart from each other. In a particular aspect, the articulating arm 430 of the LTH 420 can further include a third portion 450 having a first end 452, a second end 454, and an elongated portion 456 extending therebetween. The first end 452 of the third portion 450 of the arm 430 can be generally cylindrical and can be rotatably mounted within the disk-shaped plates 446 on the second end 440 of the second portion 436 of the arm 430. A motor (not shown) can be disposed within the first end 452 of the third portion 450 of the arm 430. The motor can be a servomotor, a stepper motor, or the like. Further, actuating the motor can cause the third portion 450 of the arm 430 to rotate around a third rotational axis (into FIG. 6), passing through a center 458 of the first end 452 of the third portion 450 of the arm 430, that is generally parallel to the storage floor 202, or perpendicular to the second rotational axis, or a combination thereof. In a particular aspect, the third portion 450 of the arm 430 of the LTH 420 is rotatable by at least 10 degrees, at least 25 degrees, at least 45 degrees, at least 60 degrees, at least 90 degrees, at least 120 degrees, or at least 180 degrees about the third rotational axis.

The second end 454 of the third portion 450 of the arm 430 can be formed with a bore 460 extending substantially perpendicularly therethrough. Further, the second end 454 of the third portion 450 of the arm 430 can include a slot (not viewable in FIG. 6) extending therethrough at least partially along the length of the elongated portion 456 of the third portion 450 of the arm 430.

The articulating arm 430 can further include a fourth portion 470 having a first end 472, a second end 474, and an elongated portion 476 extending therebetween. The elongated portion 476 can include an offset disc-shaped portion 478 located centrally along the elongated portion 476 of the fourth portion 470 of the arm 430. The offset disc-shaped portion 478 has a center that is spaced apart a distance, D, from the longitudinal axis of the elongated portion 476 of the fourth portion 470 of the articulating arm 430. The offset disc-shaped portion 478 of the fourth portion 470 of the arm 430 is configured to fit into and rotate within the bore 460 formed in the fourth end 250 of the third portion 450 of the arm 430. The slot formed in the second end 454 of the third portion of the arm 430 can allow the fourth portion 470 of the arm 430 to rotate nearly 180° with respect to the third portion 450 of the arm 430 and can allow the fourth portion 470 of the arm 430 to be rotated nearly parallel to the third portion 450 of the arm 430.

In a particular aspect, a motor (not shown) can be disposed within the offset disc-shaped portion 478 of the second portion 470 of the articulating arm 430. The motor can be a servomotor, a stepper motor, or the like. Further, actuating the motor can cause the fourth portion 470 of the articulating arm 430 to rotate with respect to the third portion 450 of the articulating arm 430 around a fourth rotational axis (into FIG. 6), passing through a center 480 of the offset disc-shaped portion 478 of the second portion 470 of the articulating arm 430, that is generally parallel to the storage floor 202, or perpendicular to the second rotational axis, or a combination thereof. In a particular aspect, the fourth portion 470 of the arm 430 of the LTH 420 is rotatable by at least 10 degrees, at least 25 degrees, at least 45 degrees, at least 60 degrees, at least 90 degrees, at least 120 degrees, or at least 180 degrees about the third rotational axis.

As further shown in the figures, the articulating arm 430 of the LTH 420 can include a first gripper 482 attached to, or disposed on, the first end 472 of the fourth portion 470 of the articulating arm 430. Further, the articulating arm 430 of the LTH 420 can include a second gripper 484 attached to, or disposed on, the second end 474 of the fourth portion 470 of the articulating arm 430. The grippers 482, 484 substantially the same as the grippers 280, 282 described above. As described in greater detail below, the articulating arm 430 of the LTH 420 and the grippers 482, 484 can be used to retrieve tubulars from the HTHS 230. FIG. 7 depicts the UTH 422, which is constructed substantially identical to the LTH 420 and includes the same parts and components described above in conjunction with the LTH 420. The grippers 482, 484 can be rotatably coupled to the fourth portion 470 of the arm 430 of the LTH 420 and can rotate about a fifth rotational axis passing longitudinally through the fourth portion 470 of the arm. It is to be understood that the grippers 482, 484 are rotatable by a least 10 degrees, at least 25 degrees, at least 45 degrees, at least 60 degrees, at least 90 degrees, at least 120 degrees, at least 150 degrees, or at least 180 degrees about the fifth rotational axis.

As shown, the first portion 432 of the arm 430 is disposed at a vertical elevation above the second portion 436 of the arm 430. Further, the first portion 432 is adapted to translate along a length of the support structure 402. Moreover, the grippers 482, 484 are spaced apart from each other and at least one of the grippers 482, 484 can include powered drive element adapted to urge the first tubular in at least one of a radial direction and a longitudinal direction. The powered drive element can include powered roller.

Figure 52:
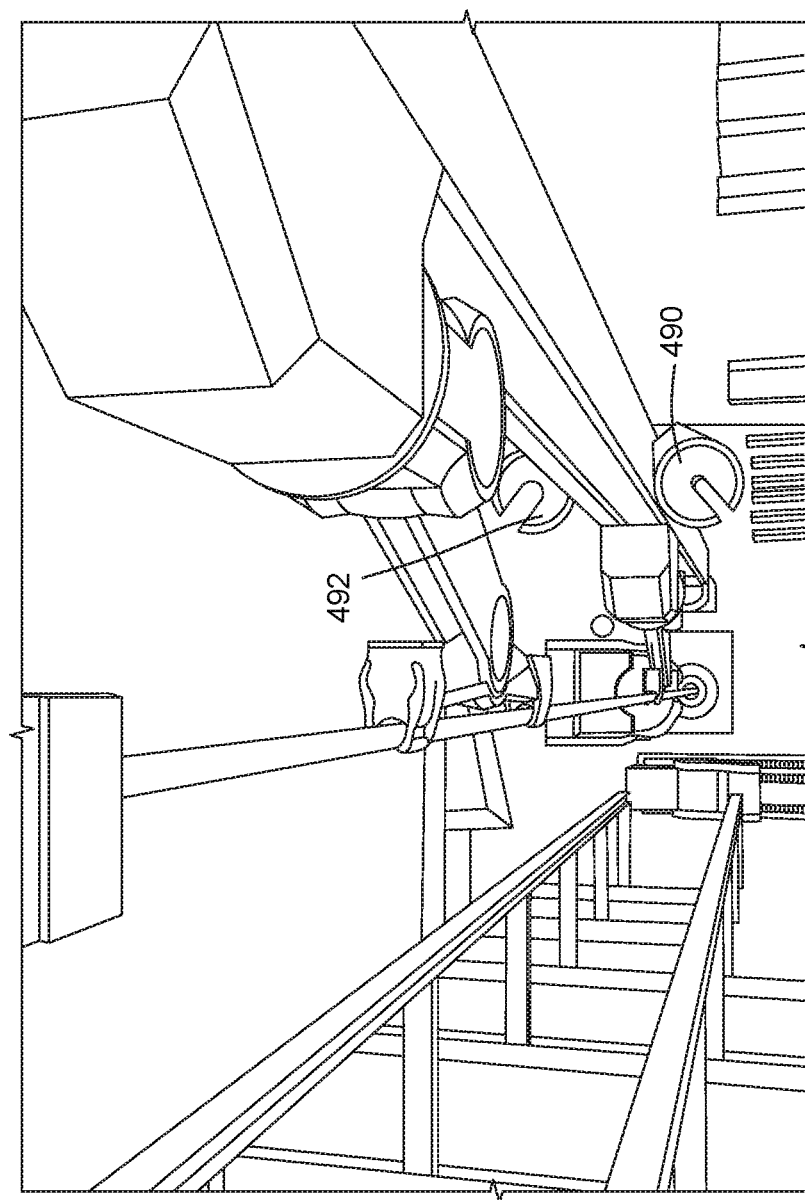

Referring now to FIG. 52, the VTHS 400 can include a first tool system 490 and a second tool system 492 statically coupled to the vertical support structure 402 of the VTHS 400. The tool systems 490, 492 are adapted to perform an operation on one or more tubulars, e.g., a drill pipe or a casing. The tool systems 490, 492 can include at least one of a torque wrench, a robotic arm, an electric motor, a pipe rack system, or any combination thereof. In particular, the first tool system 490 is a first torque wrench and the second tool system 492 is a second torque wrench. In a particular aspect, the LTH 420 and the UTH 422 are disposed circumferentially between the first and second torque wrenches 490, 492.

In another aspect, the first torque wrench 490 is disposed at a first location along the vertical support structure 402 and the second torque wrench 492 is disposed at a second location along the vertical support structure 402. In one aspect, the first and second locations are disposed at the same vertical elevation. In another aspect, the first and second locations are disposed at different vertical elevations. Further, in another aspect, the first torque wrench 490 is adapted to receive a first tubular having a first diameter and the second torque wrench is adapted to receive a second tubular having a second diameter. In one aspect, the first diameter is different from the second diameter.

In a particular aspect, the LTH 420 and the UTH 422 can be used to handle tubulars. A method of handling tubulars using the LTH 420 and the UTH 422 can include engaging a first tubular disposed in a generally horizontal orientation with a first tubular handler, the first tubular handler being vertically adjustable with respect to a support structure; reorienting the first tubular to a generally vertical orientation; and engaging the first tubular with a second tubular handler coupled to the support structure. Further, the method can include releasing the first tubular from the first tubular handler; engaging the first tubular handler with a second tubular disposed in a generally horizontal orientation; reorienting the second tubular to a generally vertical orientation; and axially aligning the first and second tubulars with respect to one another.

The method can also include threadably engaging the first and second tubulars together to form a stand of tubulars. Threadably engaging the first and second tubulars can be performed with the first tubular engaged with the second tubular handler and the second tubular engaged with the first tubular handler. At least one of the first and second tubular handlers comprises a motorized roller adapted to bias the first or second tubular in at least one of a radial direction and a longitudinal direction. The method can also include moving the stand of tubulars to a first torque wrench coupled to the support structure and engaging the first torque wrench to secure the first and second tubulars together. Moving the stand of tubulars to the first torque wrench is performed such that a threaded interface of the stand of tubulars is at a same vertical elevation as the first torque wrench. Further, reorienting the first tubular to the generally vertical orientation is performed by rotating the first tubular no greater than 120°, or no greater than 110°, or no greater than 100°, or no greater than 90°.

Engaging the first tubular with the first tubular handler can be performed when a first longitudinal half of the first tubular is closer to the support structure than a second longitudinal half of the first tubular, and wherein reorienting the first tubular is performed such that the first longitudinal half of the first tubular is disposed at a vertical elevation above the second longitudinal half of the first tubular. In a particular aspect, the first tubular handler can include a gripper having at least two spaced apart gripping elements and engaging the first tubular with the first tubular handler is performed with only one of the at least two gripping elements.

In another aspect, reorienting the first tubular to the generally vertical orientation comprises pivoting portions of the first tubular handler along three or more rotational pivot axis. Further, reorienting the first tubular to the generally vertical orientation is performed while moving the first tubular handler vertically along the support structure. In another aspect, reorienting the first tubular to the generally vertical orientation is performed while moving the first tubular handler upward along the support structure.

The method can further include repositioning the second tubular handler relative to the support structure prior to engaging the first tubular with the second tubular handler. Engaging the first tubular with the second tubular handler can be performed when the first tubular is in a generally vertical orientation.

It is to be understood that the LTH 420, the UTH 422, or a combination thereof is adapted to engage with tubulars having lengths in a range between and including 36 inches and 480 inches. Further, the LTH 420, the UTH 422, or a combination thereof is adapted to engage with tubulars having a diameter in a range between and including 5 inches and 80 inches. Moreover, the LTH 420, the UTH 422, or a combination thereof is adapted to engage with tubular segments, casing, subs, pipes, BHAs, or any combination thereof.

Referring back FIG. 5, details concerning the robotic arm 500 are illustrated. As shown, the robotic arm 500 can include a base 502 mounted on tracks 504 on the drilling rig floor 506. The tracks 504 are disposed adjacent to a well center area 508 established on the rig floor 506. The well center area 508 can include at least one well bore defined by an opening 509 in the rig floor 506.

The tracks 504 allow the robotic arm 500 to traverse the distance between well center area 508 toward the tubular storage area 200 (FIG. 2). In a particular aspect, the robotic arm 500 can include an articulating arm 510 extending from the base 502. The articulating arm 510 can include a first portion 512 that is pivotably mounted on the base 502 of the robotic arm 500. It can be appreciated that the robotic arm 500 can include a motor (not shown) that is disposed within the first portion 512 of the arm 510. The motor can be a servomotor, a stepper motor, or the like. Further, the motor can be used to rotate the first portion 512 of the arm 510 around a vertical axis 514 extending vertically through the first portion 512 of the arm 510. The vertical axis 514 can be substantially perpendicular to the rig floor 506.

In a particular aspect, the robotic arm 500 and the HTHS 230 are configured to interact and exchange objects. The robotic arm 500 can be configured to exchange a sub-type tubular with the HTHS 230 in the tubular storage area 200. The robotic arm 500 includes a gripper, described below, and is configured to hold a sub-type tubular in the gripper and pass the sub-type tubular to a gripper 280, 282 of the HTHS 230 in the tubular storage area 200.

The well center area 508 can include the VTHS 400 adjacent thereto and the at least one well bore is disposed between the robotic arm 500 and the VTHS 400 adjacent to the well center area 508. The robotic arm 500 can be configured to interact with VTHS 400 adjacent to the well center area 508 and exchange at least one object between a gripper 482, 484 of the VTHS and the gripper of the robotic arm 500. The iron roughneck 600 may also be adjacent to the well center area 508 and the robotic arm 500 can be configured to interact with and exchange objects with the iron roughneck 600.

The first portion 512 of the arm 510 can include a first end 516 and a second end 518. The second end 518 can be generally cylindrical and a second portion 520 of the arm 510 can be coupled thereto. Specifically, the second portion 520 of the arm 510 can include a first elongated plate 522 spaced apart from a second elongated plate 524. Each plate 522, 524 is substantially identical and can include a first end 526 and a second end 528. The first ends 526 of the plates 522, 524 of the second portion 520 of the arm 510 are configured to fit around the second end 518 of the first portion 512 of the arm 510. Further, a motor (not shown) can be installed within the second end 518 of the first portion 512 of the arm 510. The motor can be a servomotor, a stepper motor, or the like. Further, the motor can rotate the second portion 520 of the arm 510 around an axis that extends through a center 530 of the second end 518 of the first portion 512 of the arm 510. The axis is substantially parallel to the drilling rig floor 506.

FIG. 5 further indicates that the articulating arm 510 of the robotic arm 500 can further include a third portion 532 coupled to the second portion 520 of the arm 510. Specifically, the third portion 532 can include a first end 534 and a second end 536. The first end 534 of the third portion 532 of the arm 510 can be generally cylindrical and can fit within the second ends 528 of the plates 522, 524. Further, the first end 534 of the third portion 532 of the arm 510 can include a motor (not shown) disposed therein. The motor can be a servomotor, a stepper motor, or the like. When actuated, the motor can cause the third portion 532 of the arm 510 to rotate with respect to the second portion 520 of the arm along an axis passing through the center 538 of the first end 534 of the third portion 532 of the arm 510. The axis is substantially parallel to the drilling rig floor 506.

The arm 510 can further include a fourth portion 540 coupled to the second end 536 of the third portion 532 of the arm 510. The arm 510 can include a motor within the second end 536 of the third portion 532 of the arm 510 or within the fourth portion 540 of the arm. The motor can be a servomotor, a stepper motor, or the like and can be used to rotate the fourth portion 540 of the arm 510 with respect to the third portion 532 of the arm 510. Finally, the arm 510 can include a gripper 542 connected to the fourth portion 540 of the arm 510. The gripper 542 is substantially identical to the grippers described elsewhere herein. As described in greater detail below, the robotic arm 510 is configured to use the gripper 542 to exchange a tubular with at least one other system, e.g., an iron roughneck (described below), a tubular handler in or near the well center area (i.e., the VTHS 400), a tubular handler in the tubular storage area (i.e., the HTHS 200), or any combination thereof.

The articulating arm 510 of the robotic arm 500 can include at least one sensor that is configured to detect a characteristic of a tubular (i.e., a sub). The at least one characteristic can include a type of tubular, a size of the tubular, a length of the tubular, a diameter of the tubular, an orientation of the tubular, or any combination thereof. The system 100 can further include a at least one logic device coupled to the sensor of the articulating arm 510 of the robotic arm 500 that is configured to receive information on the characteristic of the tubular. The logic device can be configured to communicate with at least one other system during an exchange of the tubular from the articulating arm 510 of the robotic arm 500 to at least one other system. The at least one other system can include the iron roughneck (described below), a tubular handler in or near the well center area (i.e., the VTHS 400), a tubular handler in the tubular storage area (i.e., the HTHS 200), or any combination thereof. In another aspect, the robotic arm 500 is configured for automated movement without external commands.

In a particular aspect, the base 502 can include at least one pivot point configured to allow rotation of the at least one arm 510 relative to the base 502 around a vertical axis. Further, the at least one arm 510 can include a first joint overlying the base 502, the first joint including a first pivot point having a first pivot axis extending substantially horizontal and configured to allow rotation of the arm 510 relative to the base 502. In another aspect, the arm 510 can further include a second joint spaced apart from the first joint, the second joint including a second pivot point having a second pivot axis extending substantially horizontal and configured to allow rotation of a first part of the arm relative to a second part of the arm.

In another aspect, the arm 510 can further include a third joint spaced apart from the first joint and second joint, the third joint including a third pivot point having a third pivot axis extending along a portion of the at least one arm and configured to allow rotation of a third part of the arm relative to the second part of the arm 510. The arm 510 can further include a fourth joint spaced apart from the first joint, second joint and third joint, the fourth joint including a fourth pivot point having a fourth pivot axis extending along a portion of the at least one arm and configured to allow rotation of a fourth part of the arm relative to the third part of the arm.

The robotic arm 500 can be used to conduct subterranean operations. That method can include moving a tubular between a well center area and a tubular storage area by a robotic arm, wherein the robotic arm is configured to traverse at least a portion of the distance between the well center area and the tubular storage area. In one aspect, moving includes engaging a tubular in the well center area. In another aspect, moving includes engaging a tubular in the tubular storage area. In yet another aspect, moving includes engaging a tubular near the tubular storage area.

Engaging includes gripping a tubular with a gripper of the robotic arm to support the entire weight of the tubular in the gripper. Moving can also rotating the robotic arm around at least one of a first pivot point, second pivot point, third pivot point or fourth pivot point of the robotic arm to change the position of the tubular relative to the position of the tubular during engaging. Further, moving may include traversing a distance along the rig floor between a well center area and the tubular storage area and traversing includes moving the robotic arm along a portion of the rig floor on a track. In another aspect, moving can include exchanging a tubular with at least one other system selected from the group consisting of an iron roughneck, a tubular handling system in the well center area, a tubular handling system in the tubular storage area, or any combination thereof. Exchanging can include engaging the tubular in the gripper of the robotic arm; engaging the tubular within a portion of at least one other system; confirming the at least one other system has suitably engaged the tubular; and releasing the gripper of the robotic arm to transfer the entire tubular to the at least one other system. Engaging the tubular in the gripper of the robotic arm includes sensing at least one characteristic of the tubular, wherein the characteristic is selected from the group consisting of type of tubular, size of tubular, diameter of tubular, orientation of the tubular, or any combination thereof.

The method can also include placing the robotic arm in a rest position, or neutral position, when not engaging a tubular. In the rest position, the robotic arm can maintain a smaller volume space profile relative to the volume space profile when engaging a tubular. Further, in the rest position the robotic arm minimizes the volume space profile to increase the volume available for other systems to move around the robotic arm without collisions.

As shown in FIG. 6, the system 100 further includes an iron roughneck 600. As described in greater detail below, the iron roughneck 600 can be used to couple and torque two tubulars together. Alternatively, the iron roughneck 600 can be used to uncouple two tubulars from each other. An example of an iron roughneck 600 is described in detail in patent application Ser. No. 14/237,013; filed on Aug. 7, 2012; and published as United States Publication number 2014/0305265. Application 2014/0305265 is hereby incorporated by reference in its entirety.

Figure 8:
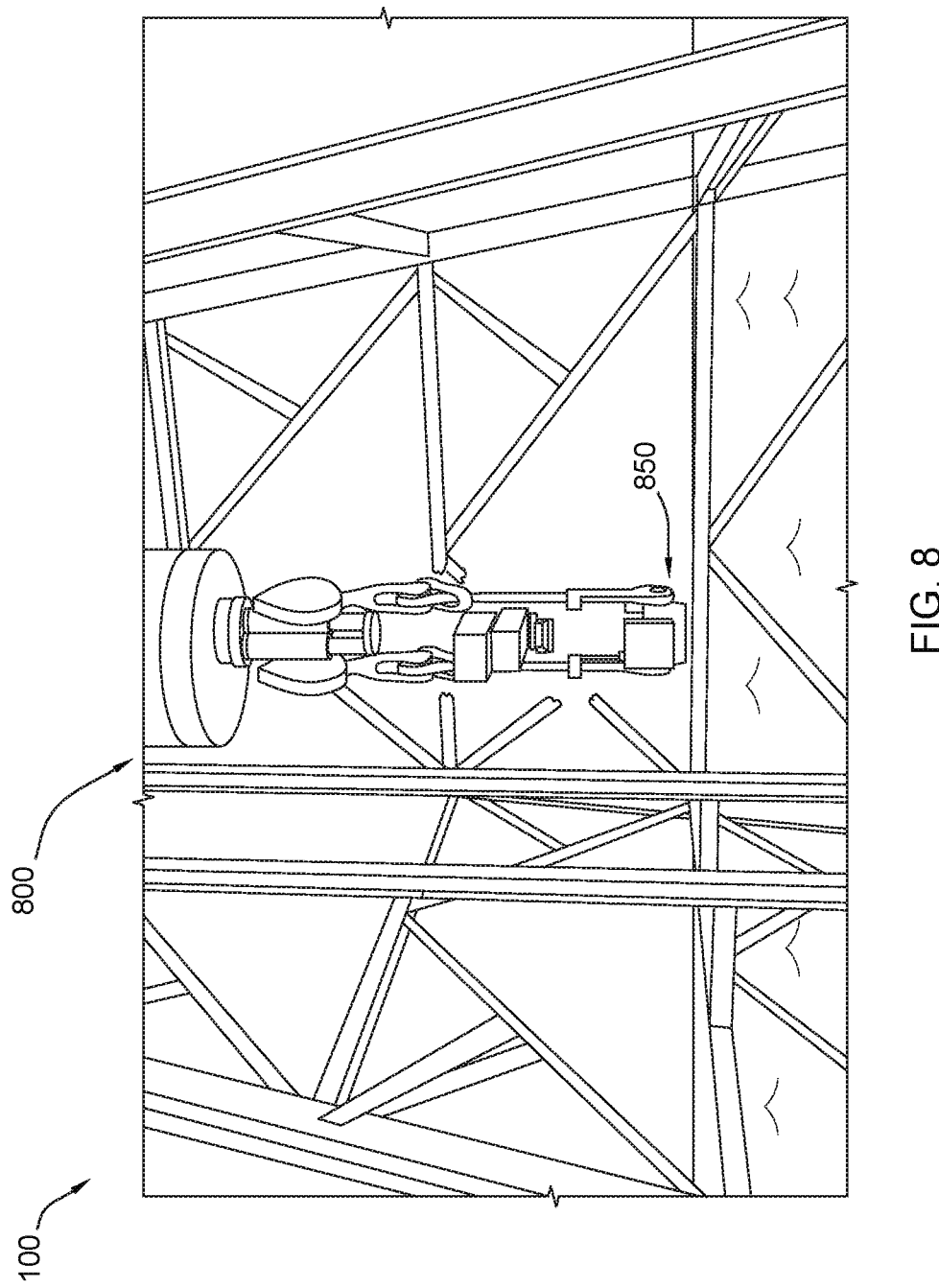

FIG. 8 indicates that the system 100 can also include a top drive system (TDS) 800 that can include an elevator 850. As described in detail below, the TDS 800 and the elevator 850 can be used to lower tubulars down into a well bore or retrieve tubulars from the well bore.

Independent and Simultaneous Operation

It is to be understood that the HTHS 230, the VTHS 400, the track mounted robotic arm 500, the iron roughneck 600, and the TDS 800 can operate independently of each other, but simultaneously with each other, and in concert with each other. The various modes operations described below list numerous steps that can be performed by the HTHS 230, the VTHS 400, the track mounted robotic arm 500, the iron roughneck 600, and the TDS 800. Many of these steps are performed at essentially the same time and save a substantial amount of time when compared to traditional drilling operations. During the descriptions below, there are indications as to which steps can be performed at the same time or at essentially the same time. In many cases, the steps overlap each other as well. In other words, during a long step, such as lowering the TDS 800, numerous other steps may be performed by the VTHS 400, the robotic arm 500, the iron roughneck 600, and the TDS 800. These other steps may not require the same amount of time to be performed as lowering the TDS 800, but they are performed while the TDS 800 is lowered in an effort to provide the most efficient use of time while operating the various components of the system 100. For example, while the TDS 800 is driving a drill pipe into a well, the HTHS 230 may be retrieving another drill pipe from the horizontal drill pipe rack 206 and the VTHS 400 may be moving into position to retrieve the drill pipe from the HTHS 230 as the drill pipe is extended from the tubular storage area into the well center area 508 by the HTHS 230. The descriptions of the various exemplary methods of operating below include as many notations as possible as to which steps can be performed at the same time. It is to be understood that this is not inclusive and is not considered to be limiting. Various other combinations of steps listed below (or not listed, but capable of being performed by the system 100) may also be performed at the same time or essentially the same time or during overlapping time periods.

Methods of Conducting Subterranean Operations

Referring now to FIG. 168 through FIG. 191, a series of flowcharts are illustrated that depict a method 16800 of conducting a subterranean operation. Throughout the description of these flowcharts, elements that appear in the FIG. 1 through FIG. 167 may be referenced. The referenced elements can perform the particular operation or function mentioned in the flowchart step. Further, there may be parenthetical notations with specific figures referenced. These parenthetical notations indicate the specific figure (in FIG. 1 through FIG. 167) in which the performance of a particular operation or function is depicted. It is to be understood that the elements and figures referenced are examples and the system 100 is not limited to only the particular element cited performing the operation or function. Moreover, any figures referenced provide examples of how the performance of a particular step may appear and are not intended to be limiting as to the only manner in which a step may be performed. Also, some steps may not appear in the figures.

Figure 9:
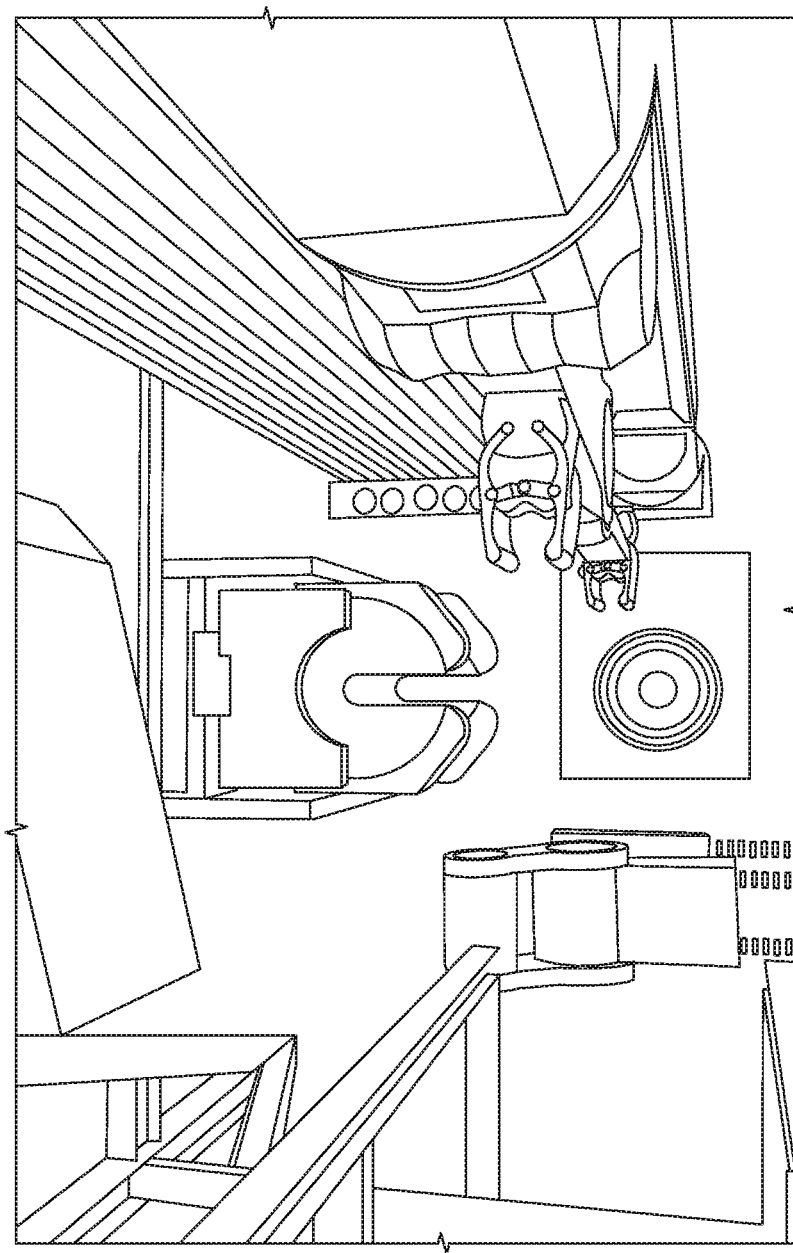

Commencing at step 16802, the system 100 can move the robotic arm 500 into position adjacent to the well center area 508 (FIG. 5). At step 16804, the system 100, using the gripper 542 on the robotic arm 500, can remove the well center cover (FIG. 9). Further, at step 16805, the system 100 can return the robotic arm 500 to a neutral position, or rest position, where the robotic arm 500 can place the well cover on the floor.

Figure 10:
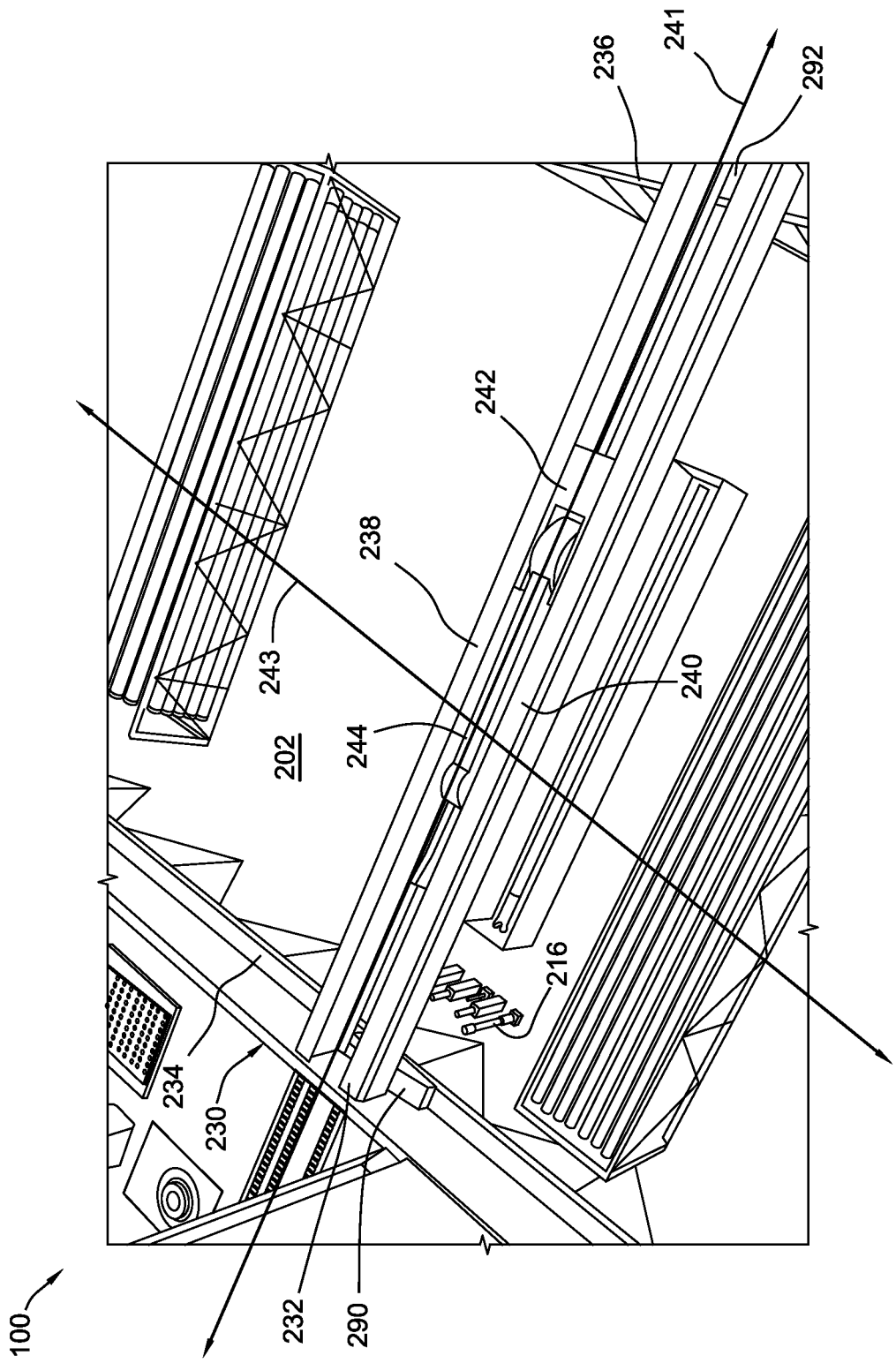
Figure 11:
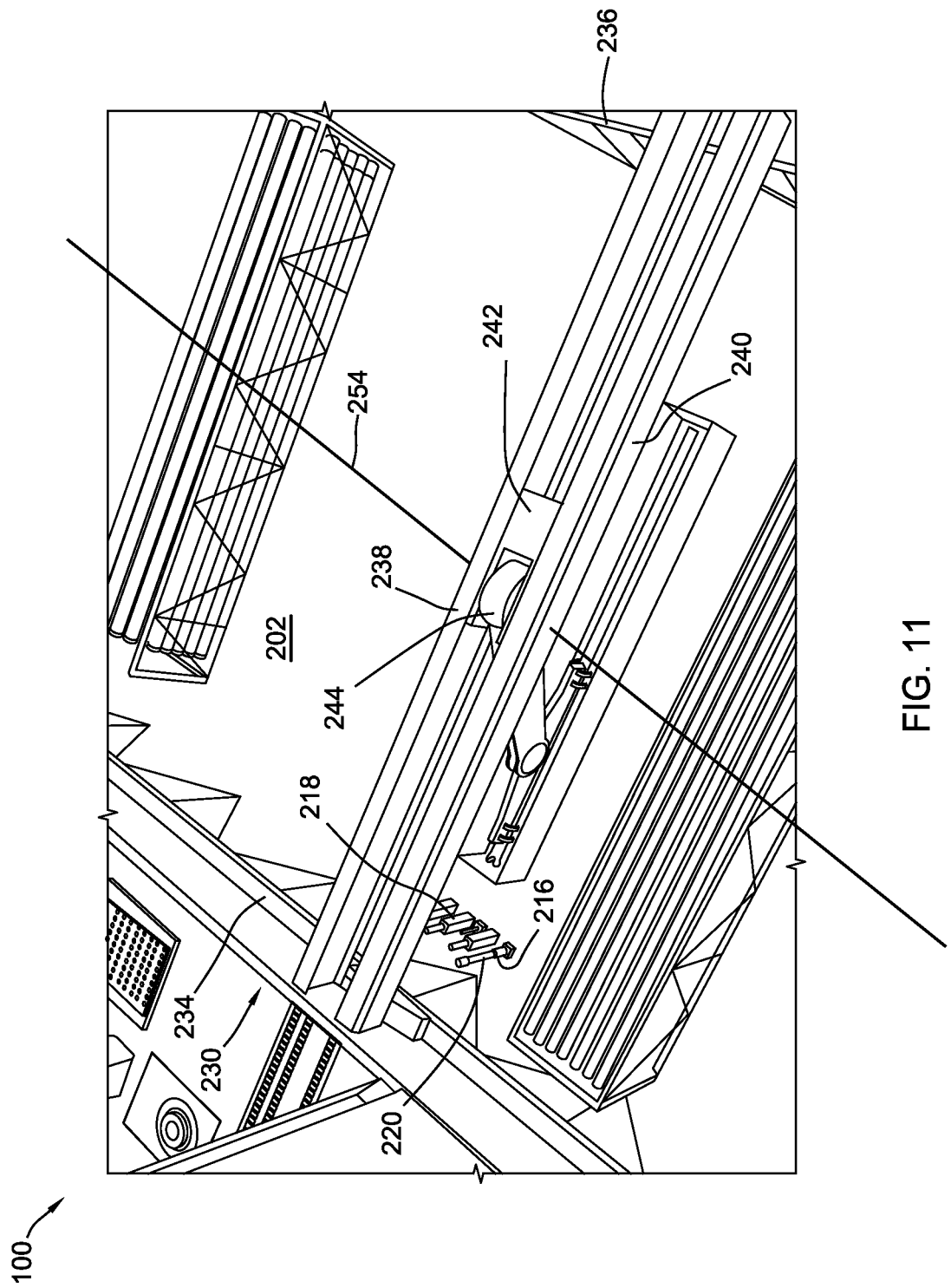

While the system 100 is performing steps 16802 through steps 16805 using the robotic arm 500, the system 100 can perform one or more of steps 16806 through 16904. Specifically, at step 16806, the system 100 can move the horizontal tubular handling system (HTHS) 230 in a first direction along a first horizontal axis to a position over a horizontal BHA storage rack 208 (FIG. 10). It is to be appreciated that the first direction is toward the horizontal BHA storage rack 208. Thereafter, the system 100 can move the transverse member 242 in the HTHS 230 along the bridge 232 of the HTHS 230 in a second direction along a second horizontal axis perpendicular to the first horizontal axis (FIG. 11). At step 16810, the system 100 can rotate the arm 244 of the HTHS 230 down and outward from the bridge of the HTHS 230 (FIG. 11). Moreover, at step 16812, the system 100 can open the first gripper 280 and the second gripper 280 on the arm 244 of the HTHS 230 (FIG. 11). Steps 16810 and 16812 can be performed at the same time.

At step 16814, the system 100 can move the first and second grippers 280, 280 into position around the BHA 210 so that the first gripper 280 is near the distal end of the BHA 210 (FIG. 11). Then, at step 16816, the system 100 can close the grippers around the BHA 210. At step 16818, the system 100 can verify that the BHA 210 is engaged with grippers 280, 282 on the arm 244 of the HTHS 230. At step 16820, if the grippers 280, 282 are not engaged, the method 16800 may proceed to step 16822 and the system 100 can adjust the grippers 280, 282. Thereafter, the method 16800 may return to step 16818 and proceed as described. At step 16820, if the grippers 280, 282 are engaged, the method 16800 may proceed to step 16824 and the system 100 can retrieve the BHA 210 from the BHA storage rack 208 (FIG. 12).

Figure 12:
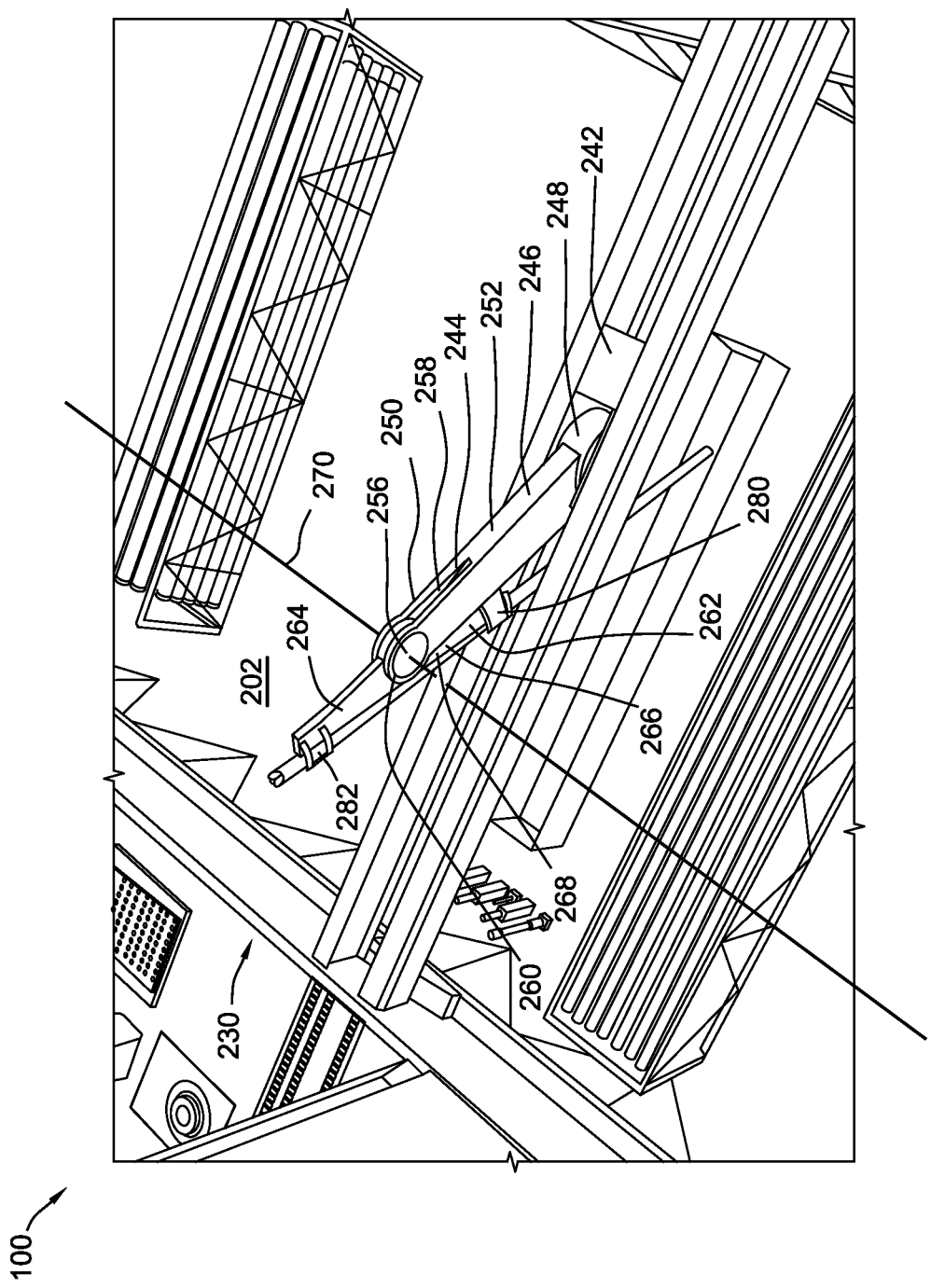
Figure 13:
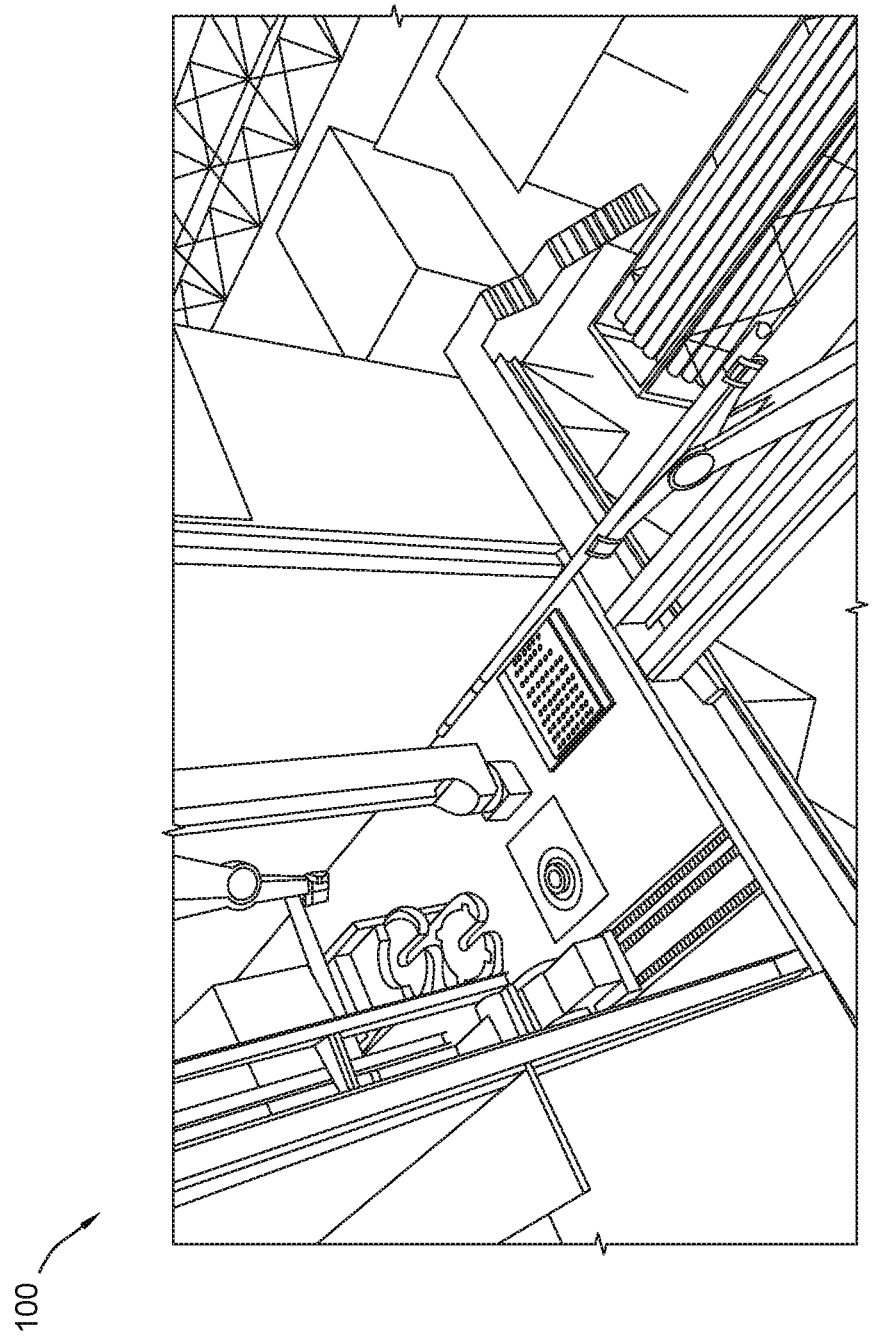
Figure 169:
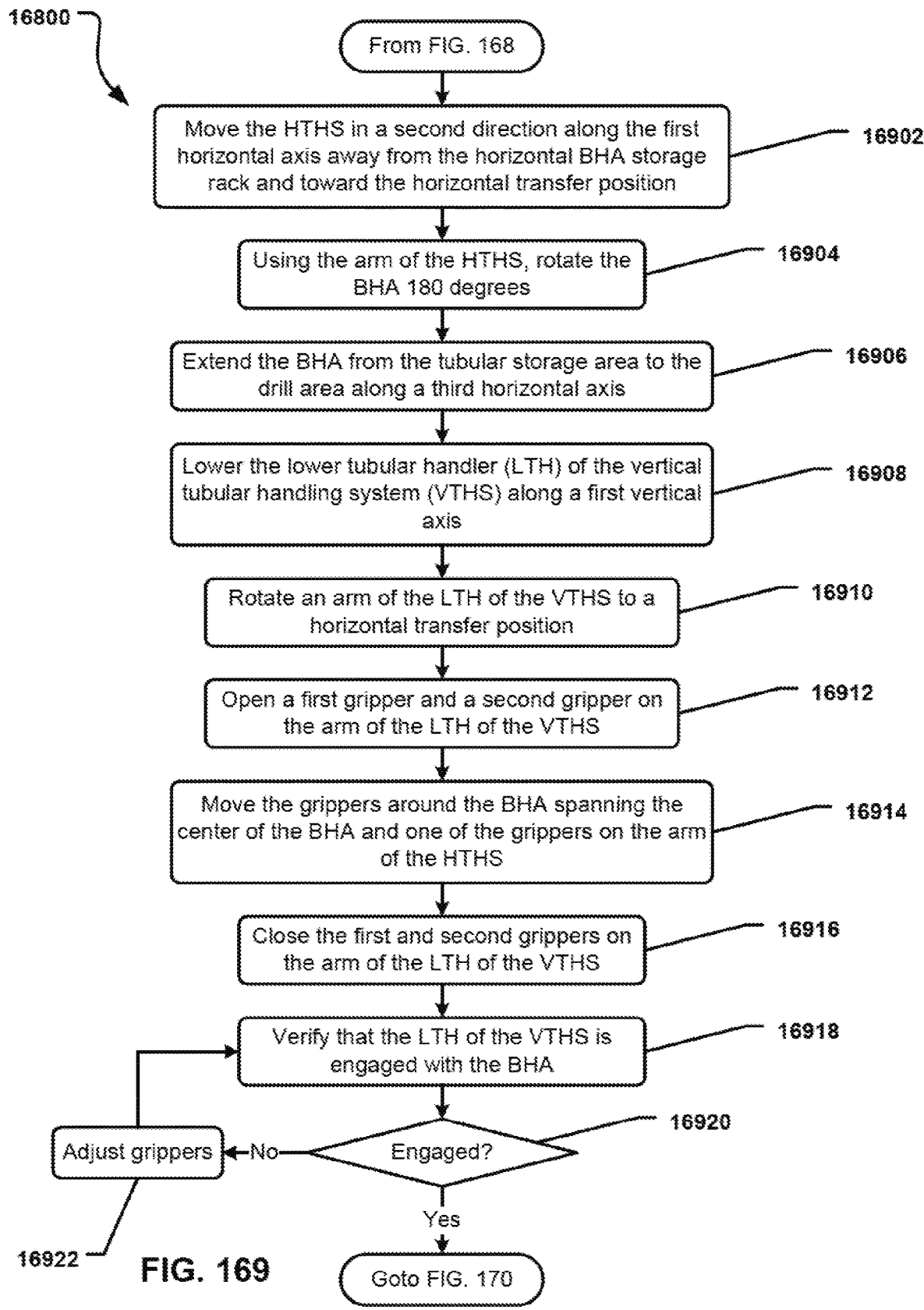
Figure 170:
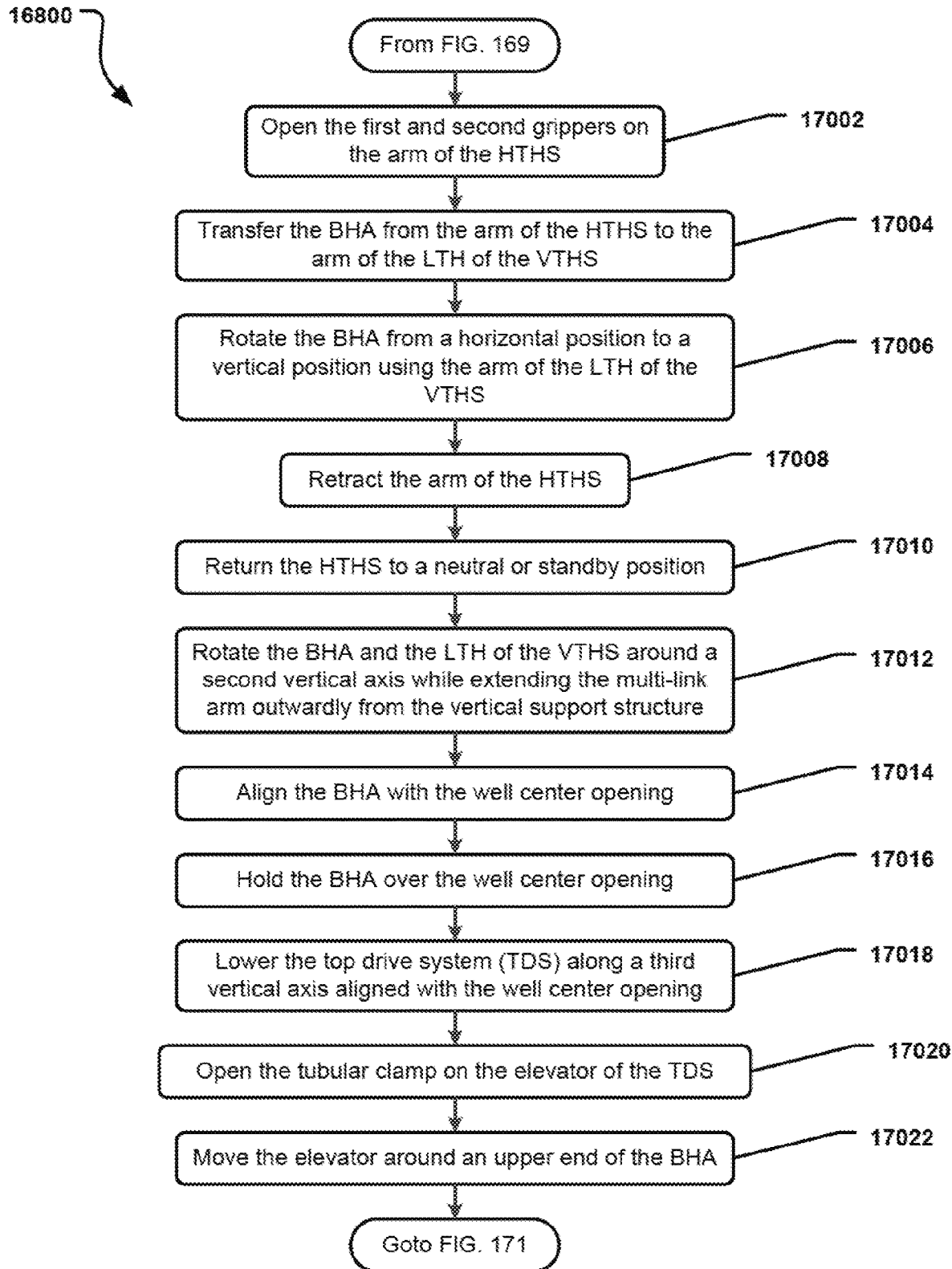
Figure 171:
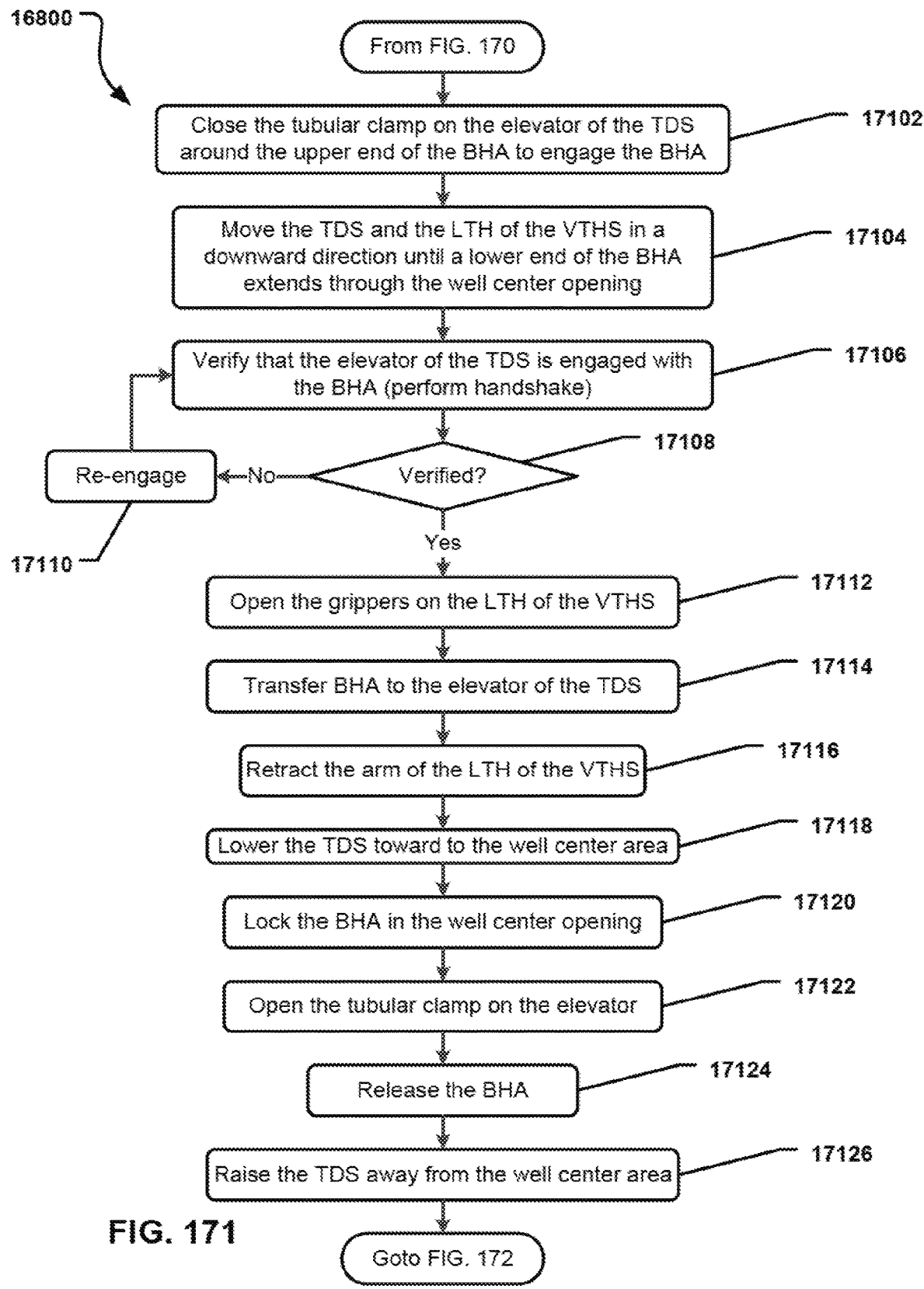
Figure 172:
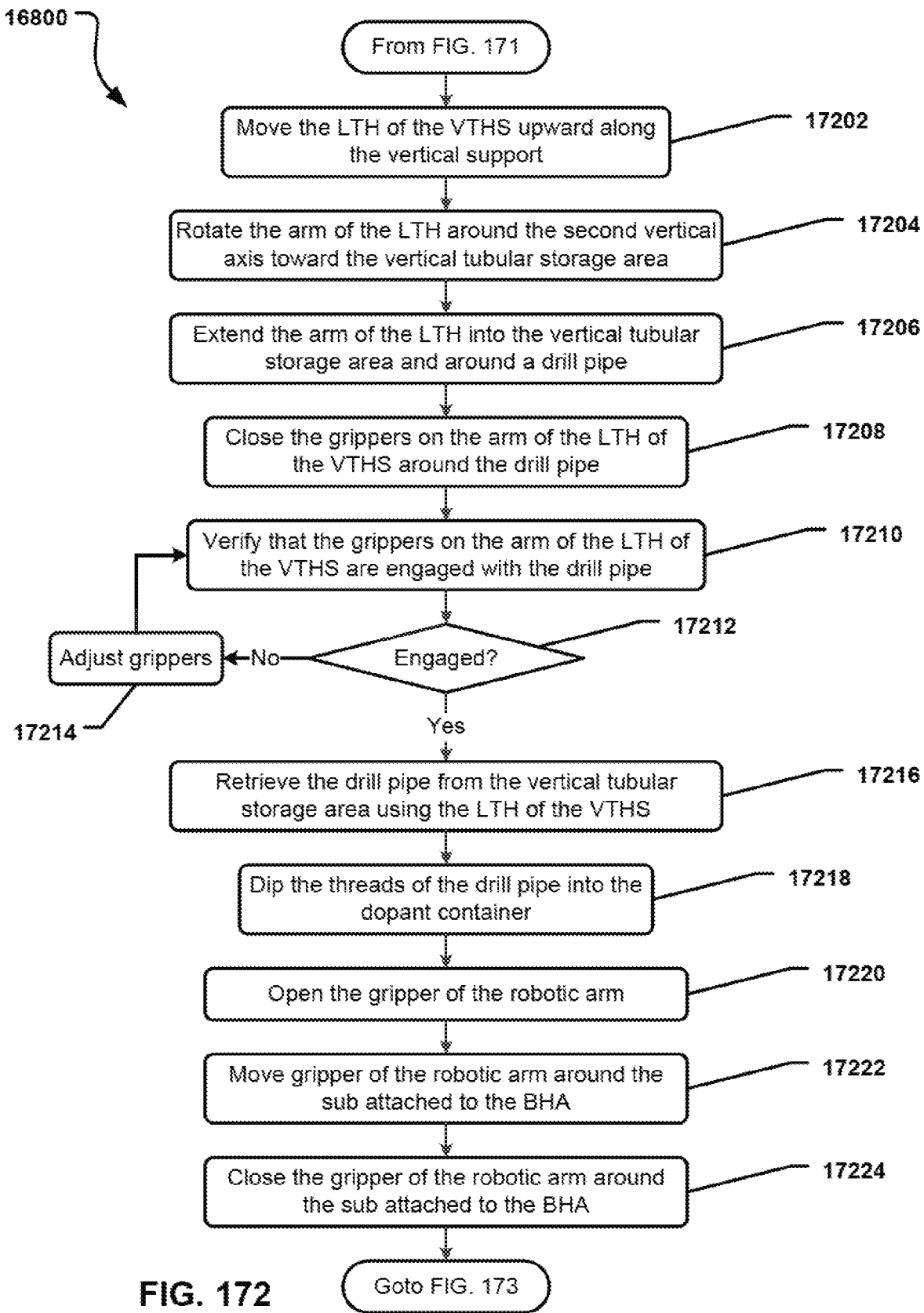

Thereafter, the method 16800 may continue to step 16902 of FIG. 169 and the system 100 may move the HTHS 230 in a second direction along the first horizontal axis away from the horizontal BHA storage rack 208 and toward the horizontal transfer position (FIG. 12). At step 16904, the system 100, using the arm 244 of the HTHS 230, can rotate the BHA 210 approximately 180 degrees (FIG. 13). Steps 16902 and 16904 can be performed at the same time. At step 16906, the system 100 can extend the BHA 210 from the tubular storage area 200 to the well bore area 300 in along a third horizontal axis (FIG. 13).

Figure 14:
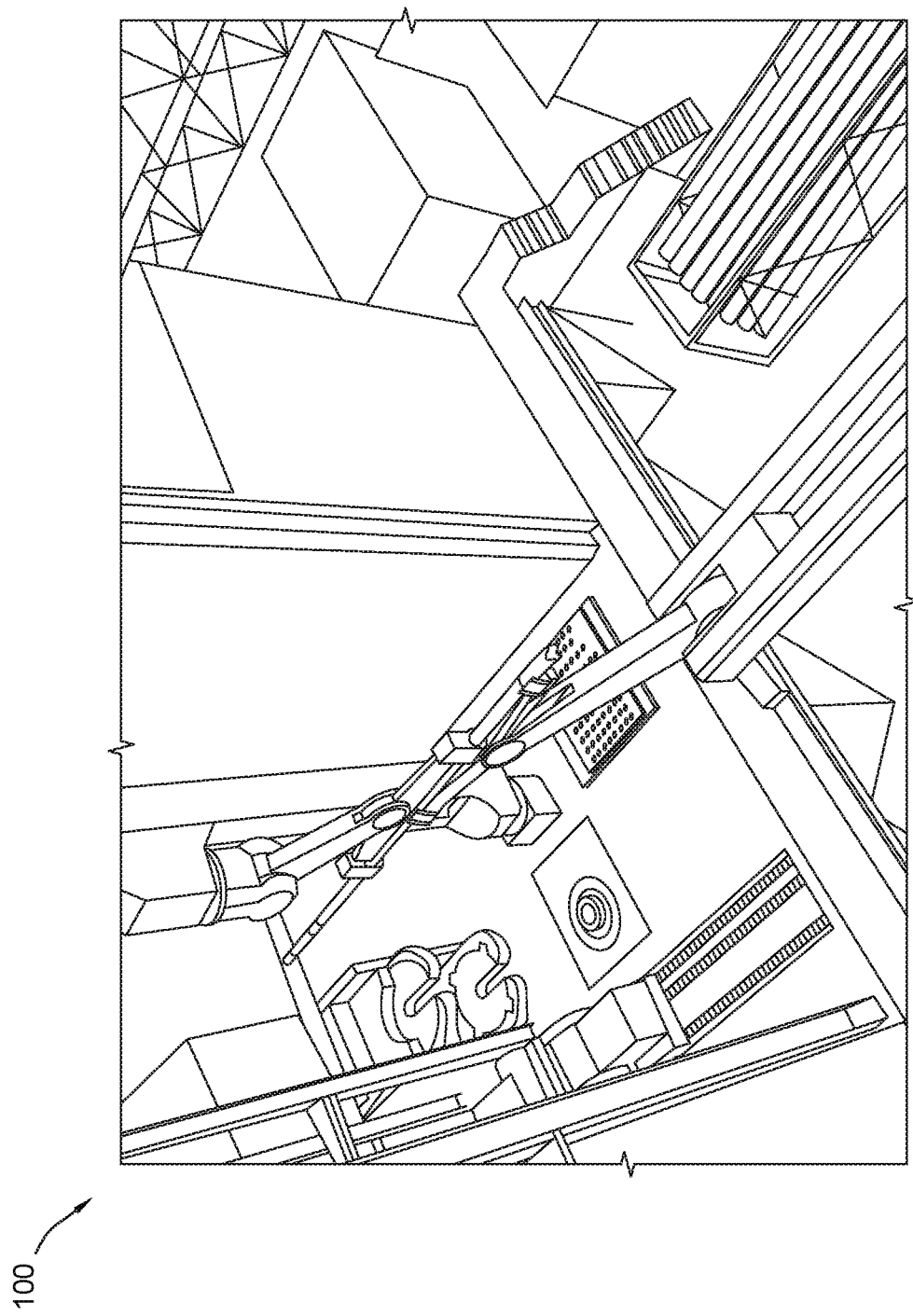

While the system 100 is performing steps 16902 through 16906 with the HTHS 230, the system 100 can use the VTHS 400 to perform steps 16908 through 16912. In particular, at step 16908, the system 100 can lower the LTH 420 of the VTHS 400 along a first vertical axis (FIG. 13). Further, at step 16910, the system 100 can rotate the arm 430 of the LTH 420 of the VTHS 400 to a horizontal transfer position (FIG. 14). At step 16912, the system 100 can open a first gripper 482 and a second gripper 484 on the arm 430 of the LTH 420 of the VTHS 400 (FIG. 14) and at step 1614, the system 100 can move the grippers 482, 484 around the BHA 210 spanning the center of the BHA 210 and one of the grippers 280, 282 on the arm 244 of the HTHS 230 (FIG. 14).

Moving to step 16916, the system 100 can close the first and second grippers on the arm 430 of the LTH 420 of the VTHS 400. At step 16918, the system 100 can verify that the LTH 420 of the VTHS 400 is engaged with the BHA 210. At step 16920, if the LTH 420 of the VTHS 400 is not engaged with the BHA 210, the method 16800 can proceed to step 16922 and the system 100 can adjust the grippers 482, 484. Then, the method 16800 can return to step 16918 and proceed as described. Otherwise, at step 16920, if the LTH 420 of the VTHS 400 is engaged with the BHA 210, the method 16800 can proceed to step 17002 of FIG. 170.

Figure 15:
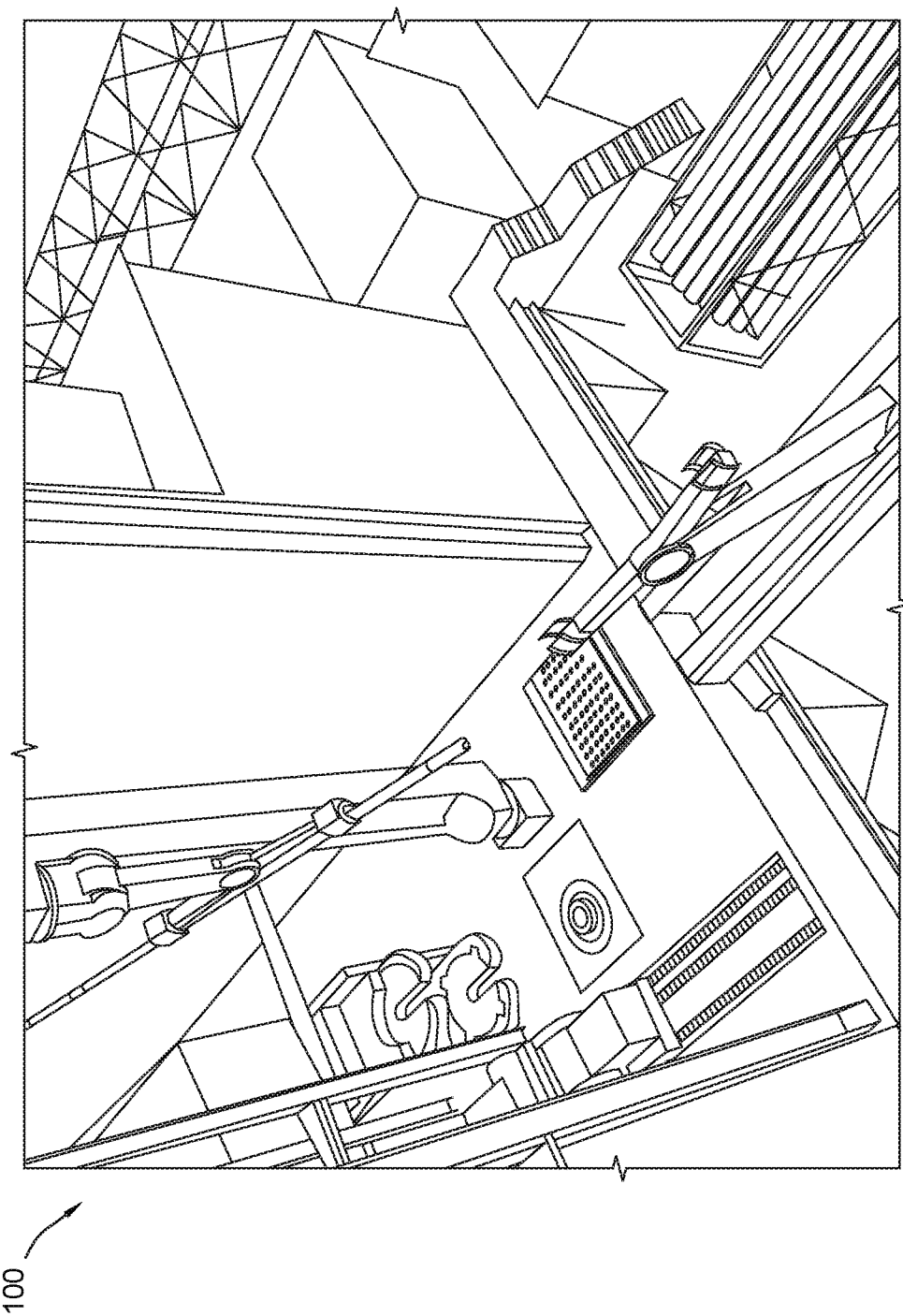

At step 17002, the system 100 can open the first and second grippers 280, 282 on the arm 244 of the HTHS 230. Next, at step 17004, the system 100 can transfer the BHA 210 from the arm 244 of the HTHS 230 to the arm 430 of the LTH 420 of the VTHS 400 (FIG. 15). At step 17006, the system 100 can rotate the BHA 210 from a horizontal position to a vertical position using the arm 430 of the LTH 420 of the VTHS 400 (FIG. 15). At step 17008, the system 100 can retract the arm 244 of the HTHS 230. Further, at step 17010, the system 100 can return the HTHS 230 to a neutral or standby position. The system 100 can perform steps 17008 and 17010 while it is performing step 17006.

Figure 16:
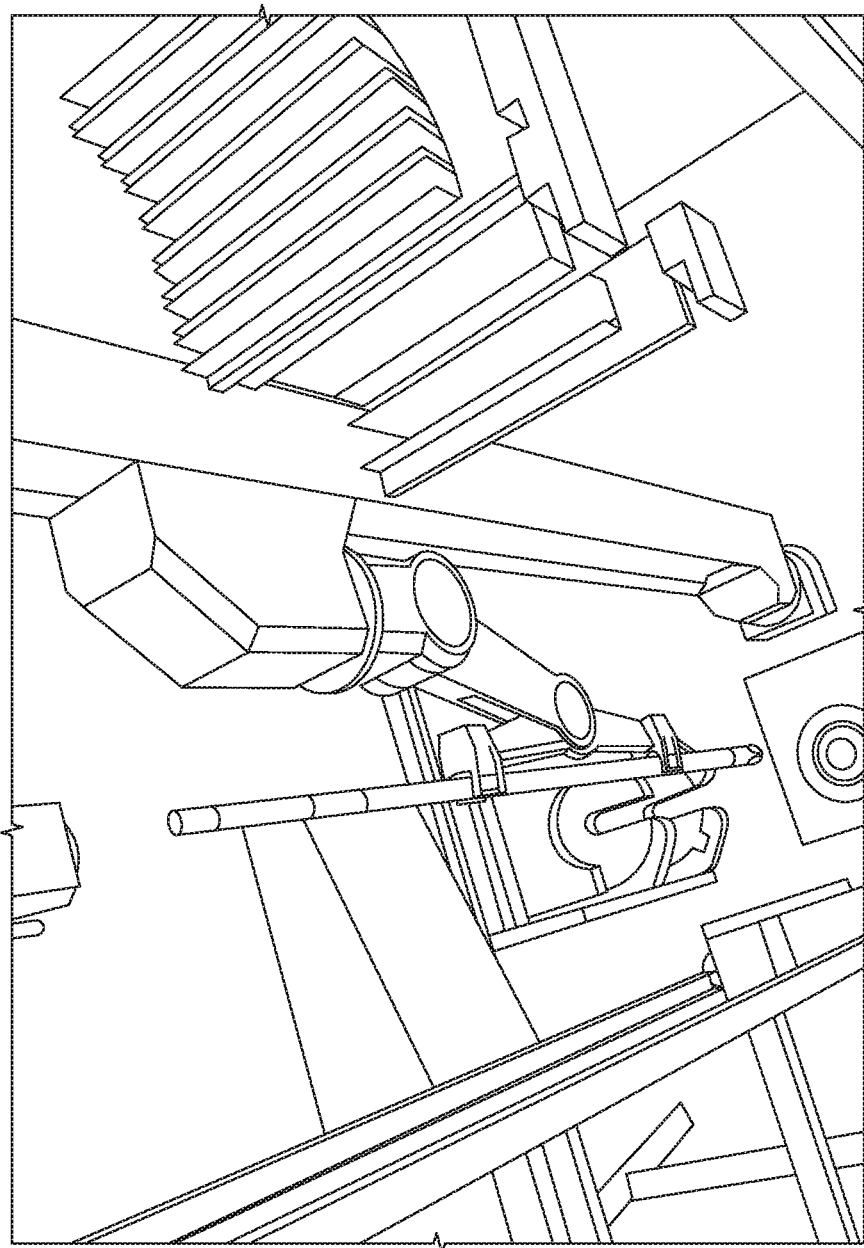
Figure 17:
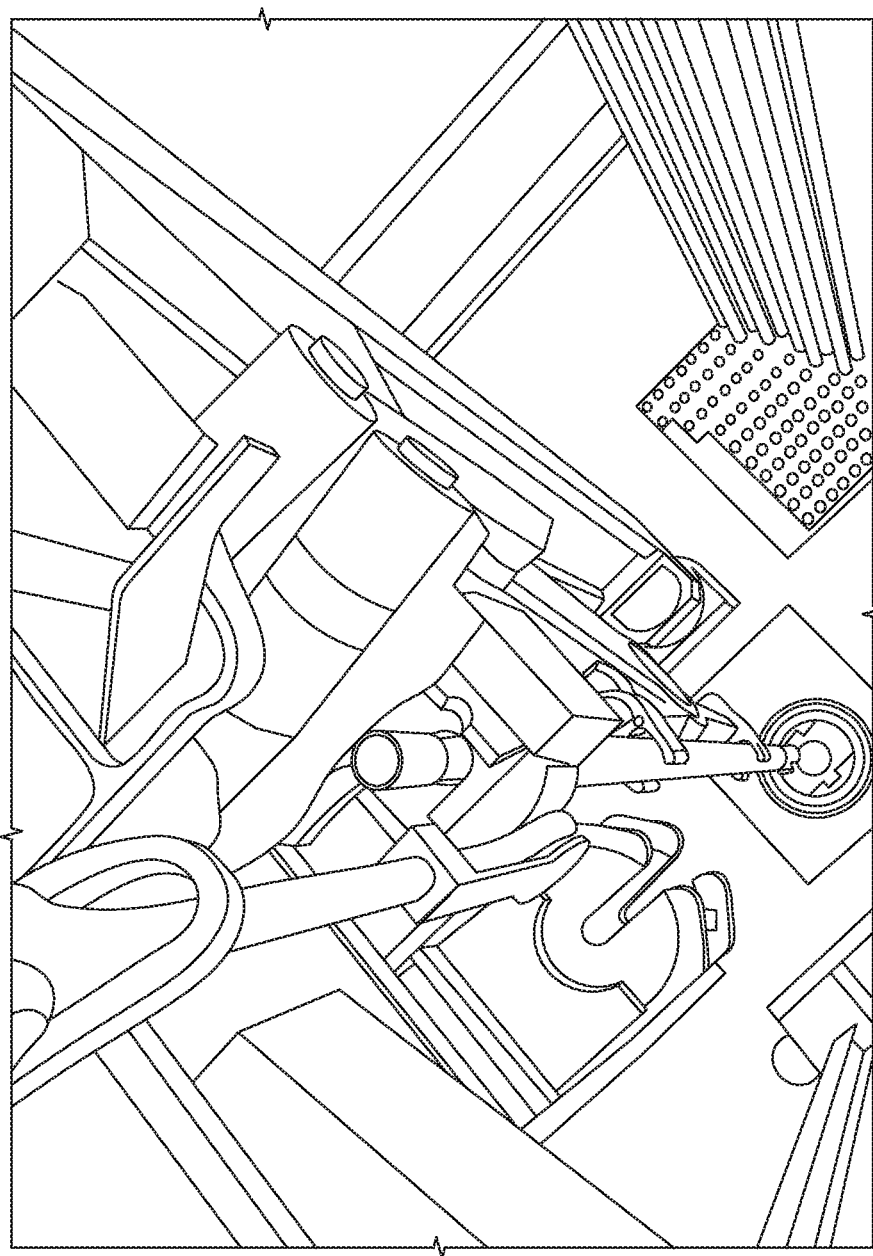

At step 17012, the system 100 can rotate the BHA 210 and the LTH 420 of the VTHS 400 around a second vertical axis while extending the multi-link arm 430 outwardly from the vertical support structure 402. At step 17014, the system 100 can align the BHA 210 with the well center opening (FIG. 16). Moving to step 17016, the system 100 hold the BHA 210 over the well center opening (FIG. 16). At step 17018, the system 100 can lower the top drive system (TDS 800) along a third vertical axis aligned with the well center opening (FIG. 17). At step 17020, the system 100 can and at step 17022, the system 100 can open the tubular clamp on the elevator 850 of the TDS 800 (FIG. 17). Further, at step 17022, the system 100 can move the elevator 850 around an upper end of the BHA 210 (FIG. 17). Thereafter, the method 16800 can move to step 17102 of FIG. 171. The system 100 can perform steps 17012 through 17016 while performing steps 17018 and 17020.

Figure 18:
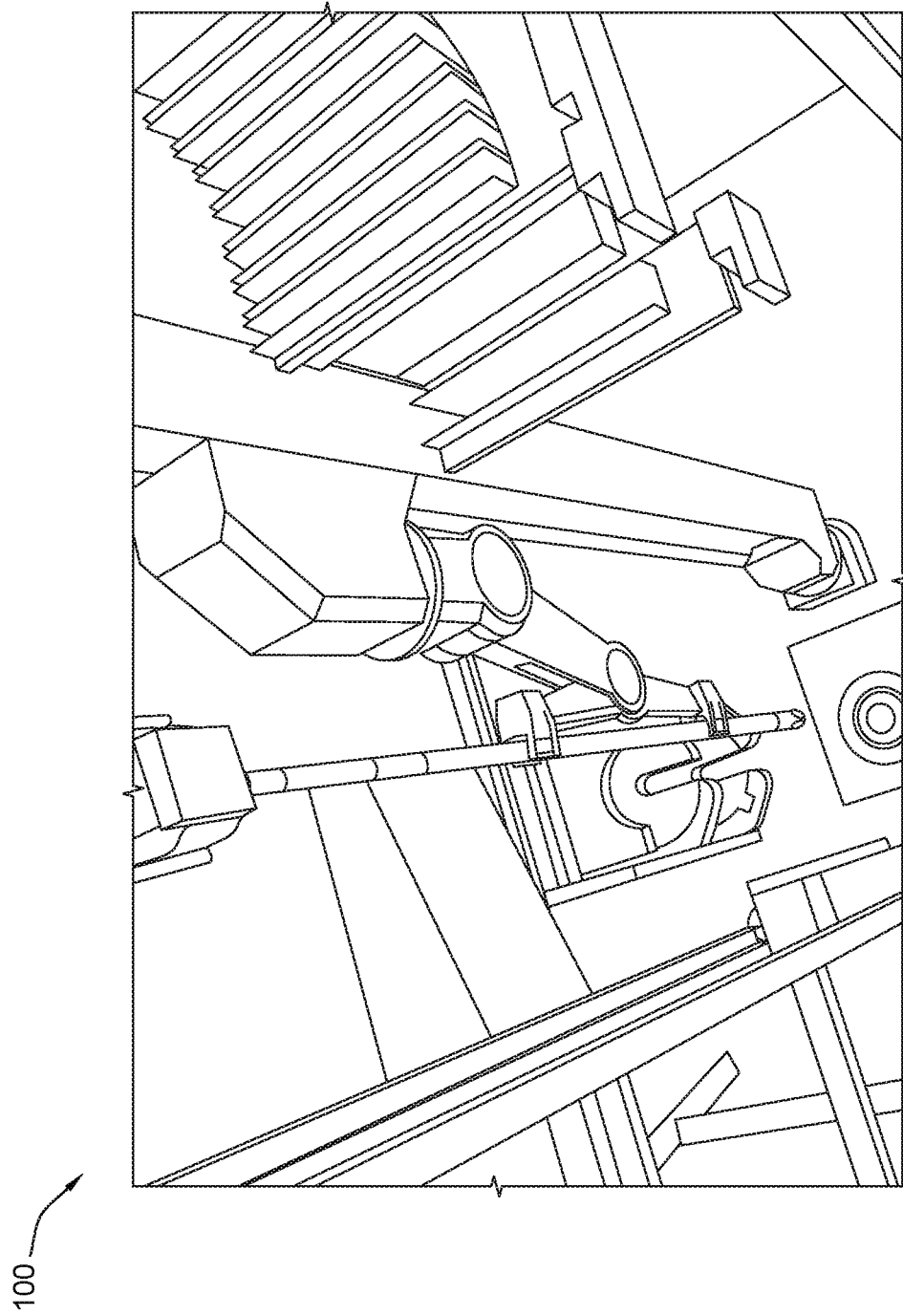
Figure 19:
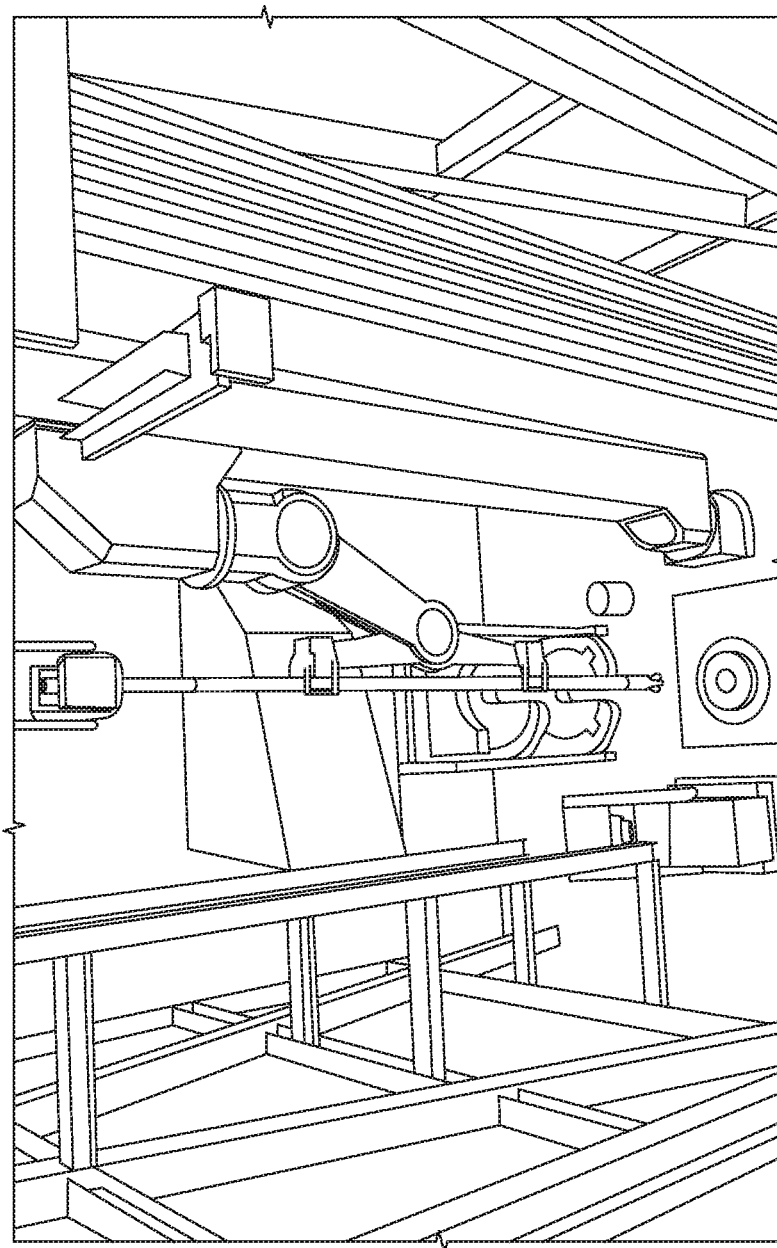
Figure 20:
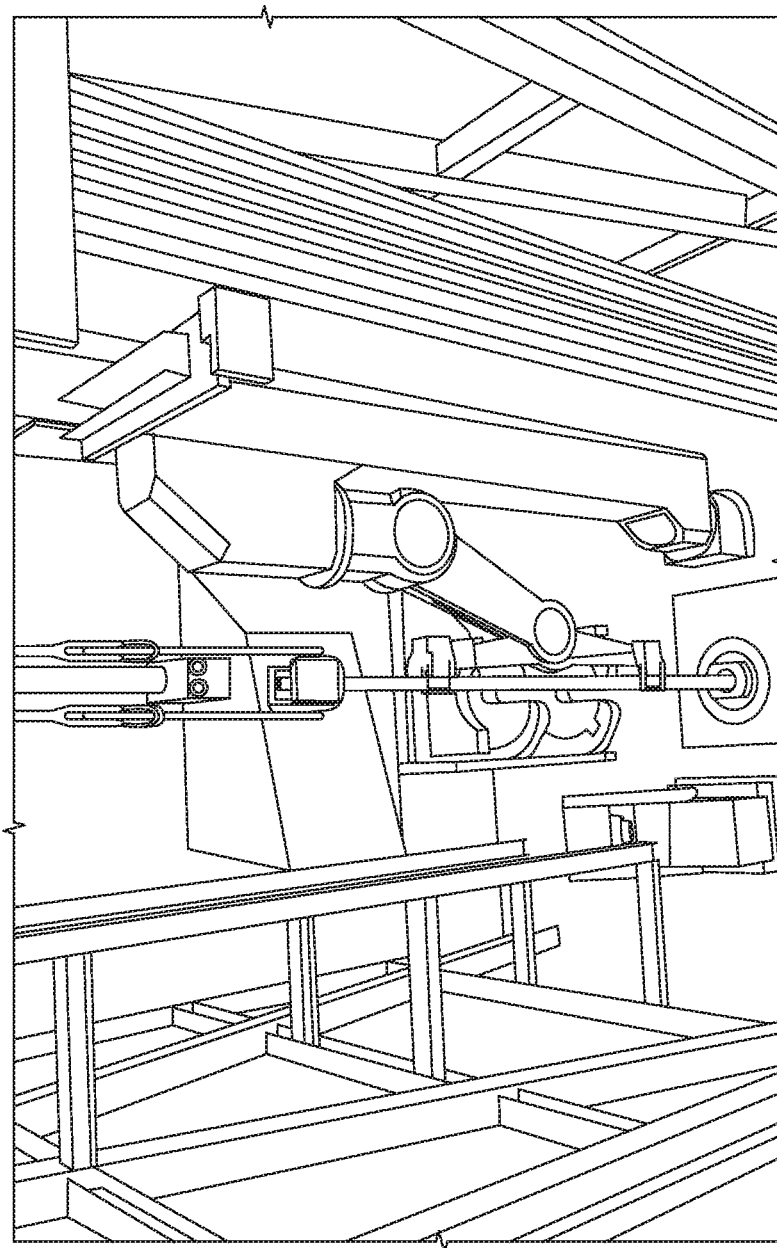
Figure 21:
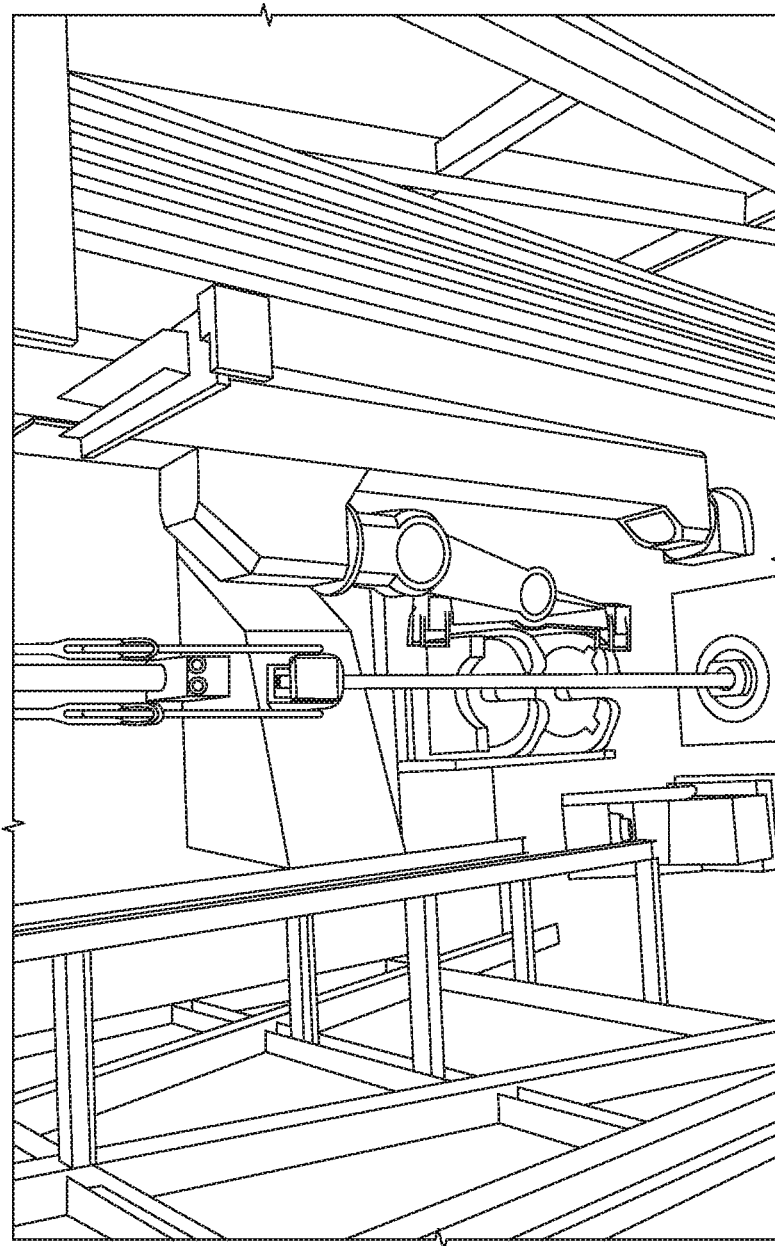
Figure 22:
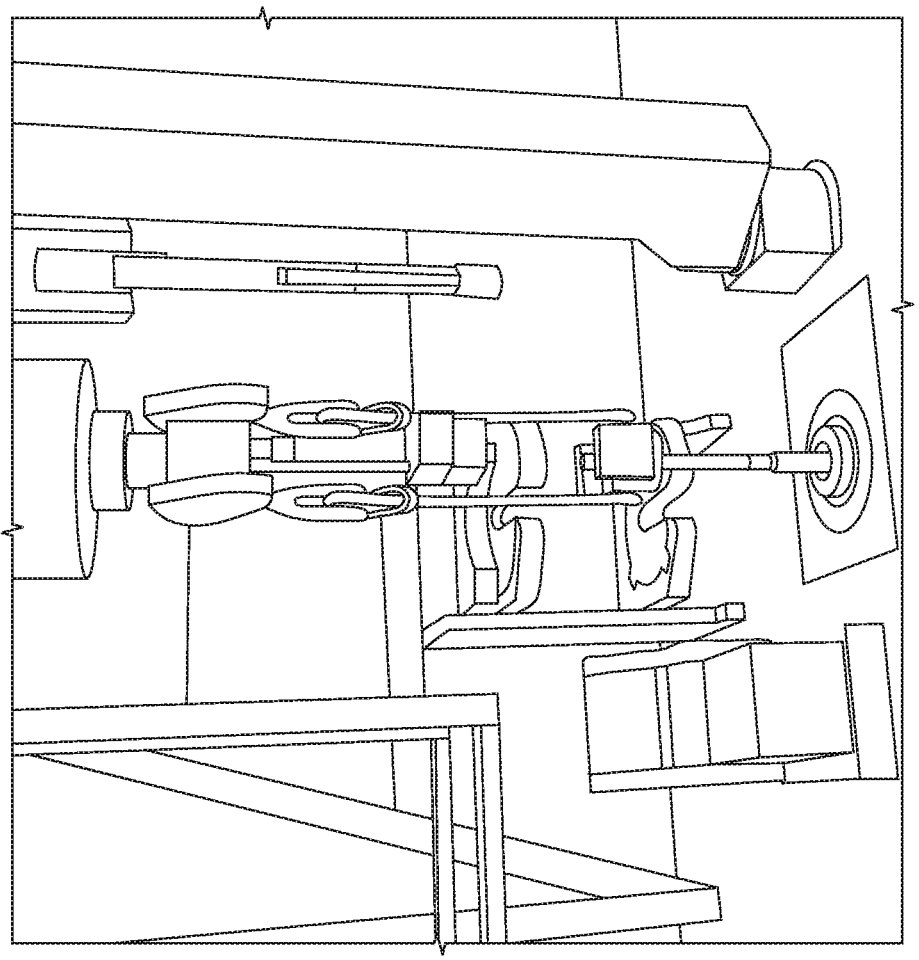
Figure 23:
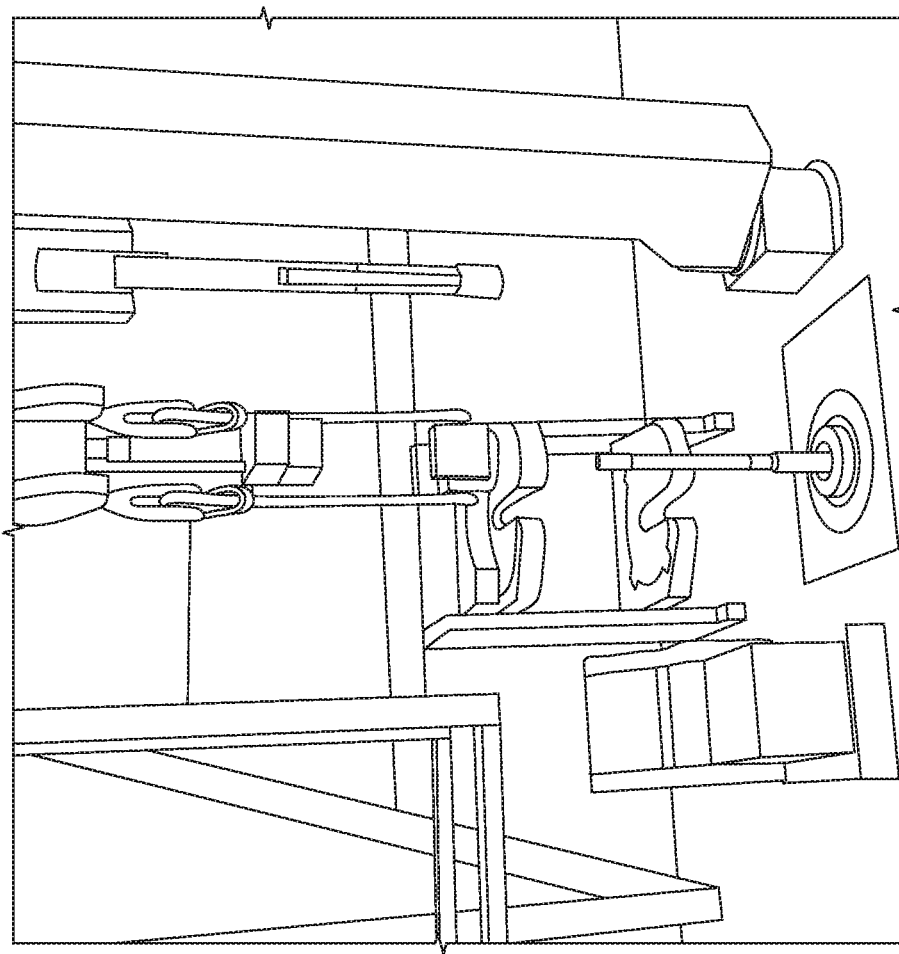

At step 17102, the system 100 can close the tubular clamp on the elevator 850 of the TDS 800 around the upper end of the BHA 210 to engage the BHA 210 (FIG. 18). At step 17104, the system 100 can move the TDS 800 and the LTH 420 of the VTHS 400 in a downward direction until a lower end of the BHA 210 extends through the well center opening (FIG. 20). At step 17106, the system 100 can verify that the elevator 850 of the TDS 800 is engaged with the BHA 210 (i.e., perform handshake). If the elevator 850 is not engaged with the BHA 210, the method 16800 can proceed to step 17110 and the system 100 can re-engage the elevator 850 with the BHA 210. Thereafter, the method 16800 may return to step 17106 and continue as described. Conversely, at step 17108, if the elevator 850 is engaged with the BHA 210, the method 16800 may proceed to step 17112 and the system 100 can open the grippers on the LTH 420 of the VTHS 400 (FIG. 21). At step 17114, the system 100 can transfer BHA 210 to the elevator 850 of the TDS 800. At step 17116, the system 100 can retract the arm 430 of the LTH 420 of the VTHS 400 (FIG. 22). Moving to step 17118, the system 100 can lower the TDS 800 toward to the well center area 508 (FIG. 22). At step 17120, the system 100 can lock the BHA 210 in the well center opening. Thereafter, at step 17122, the system 100 can open the tubular clamp on the elevator 850. At step 17124, the system 100 can release the BHA 210. Further, at step 17126, the system 100 can raise the TDS 800 away from the well center area 508 (FIG. 23). Then, the method 16800 may proceed to step 17202 of FIG. 172.

While the system 100 performs steps 17118 through 17126, the system 100 can use the VTHS 400 to perform one or more of steps 17202 through 17218. Further, at substantially the same time, the system 100 can use the robotic arm 500 to perform one or more of steps 17220 through 17306 and the system 100 can use the HTHS 230 to perform steps 17308 and 17310. Specifically, at step 17202, the system 100 can move the LTH 420 of the VTHS 400 upward along the vertical support (FIG. 22). At step 17204, the system 100 can rotate the arm 430 of the LTH 420 around the second vertical axis toward the vertical tubular storage rack 702 (FIG. 22). Moreover, at step 17206, the system 100 can extend the arm 430 of the LTH 420 into the vertical tubular storage rack 702 and around a drill pipe 206 (FIG. 22). At step 17208, the system 100 can close the grippers on the arm 430 of the LTH 420 of the VTHS 400 around the drill pipe 206 (FIG. 22). Thereafter, at step 17210, the system 100 can verify that the grippers 482, 484 on the arm 430 of the LTH 420 of the VTHS 400 are engaged with the drill pipe 206. If the grippers 482, 482 are not engaged with the drill pipe 206, the method 16800 may proceed to step 17214 and the system 100 can adjust the grippers 482, 482. Thereafter, the system 100 can proceed to step 17210 and continue as described.

On the other hand, at step 17212, if the grippers 482, 484 are engaged with the drill pipe 206, the method 16800 may continue to step 17216 and the system 100 retrieve the drill pipe 206 from the vertical tubular storage rack 702 using the LTH 420 of the VTHS 400 (FIG. 240. Then, at step 17218, the system 100 can dip the threads of the drill pipe 206 into the dopant container (FIG. 25).

Figure 24:
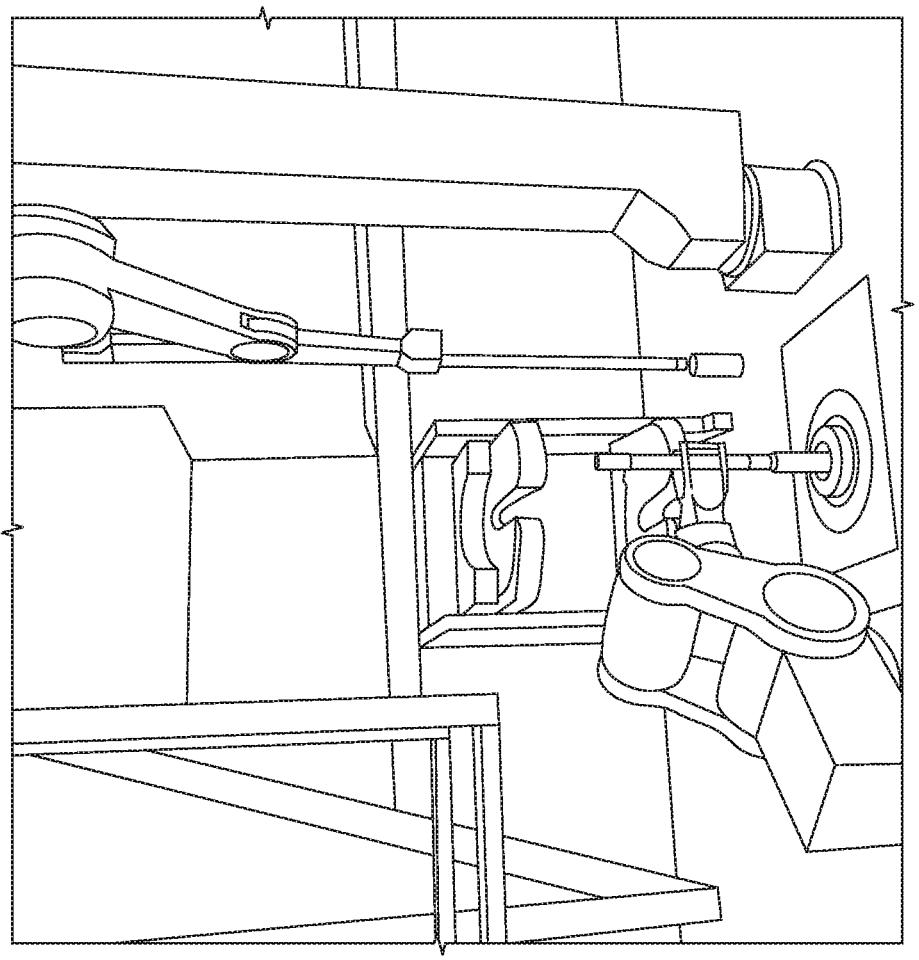

Proceeding to step 17220, the system 100 can open the gripper 542 of the robotic arm 500 (FIG. 23). Next, at step 17224, the system 100 can move gripper 542 of the robotic arm 500 around the sub attached to the BHA 210 (FIG. 24). At step 17224, the system 100 can close the gripper 542 of the robotic 500 around the sub attached to the BHA 210 (FIG. 25). Then, the method 16800 may proceed to step 17302 of FIG. 173.

Figure 25:
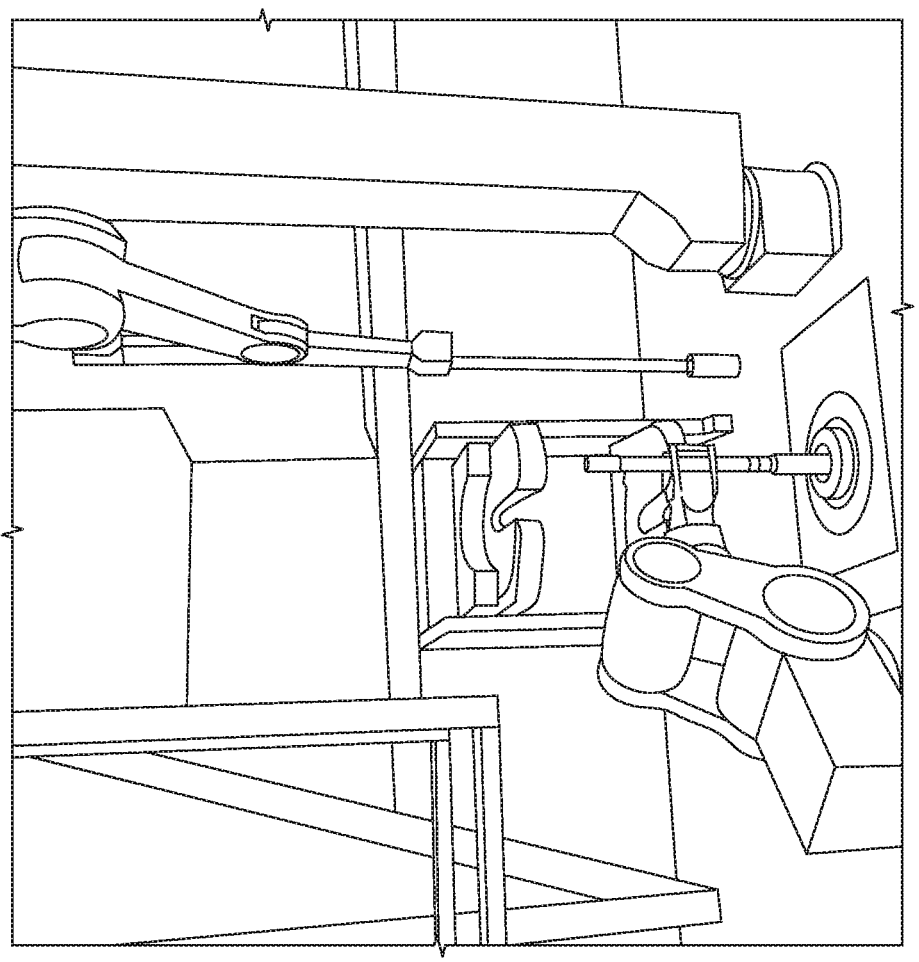
Figure 26:
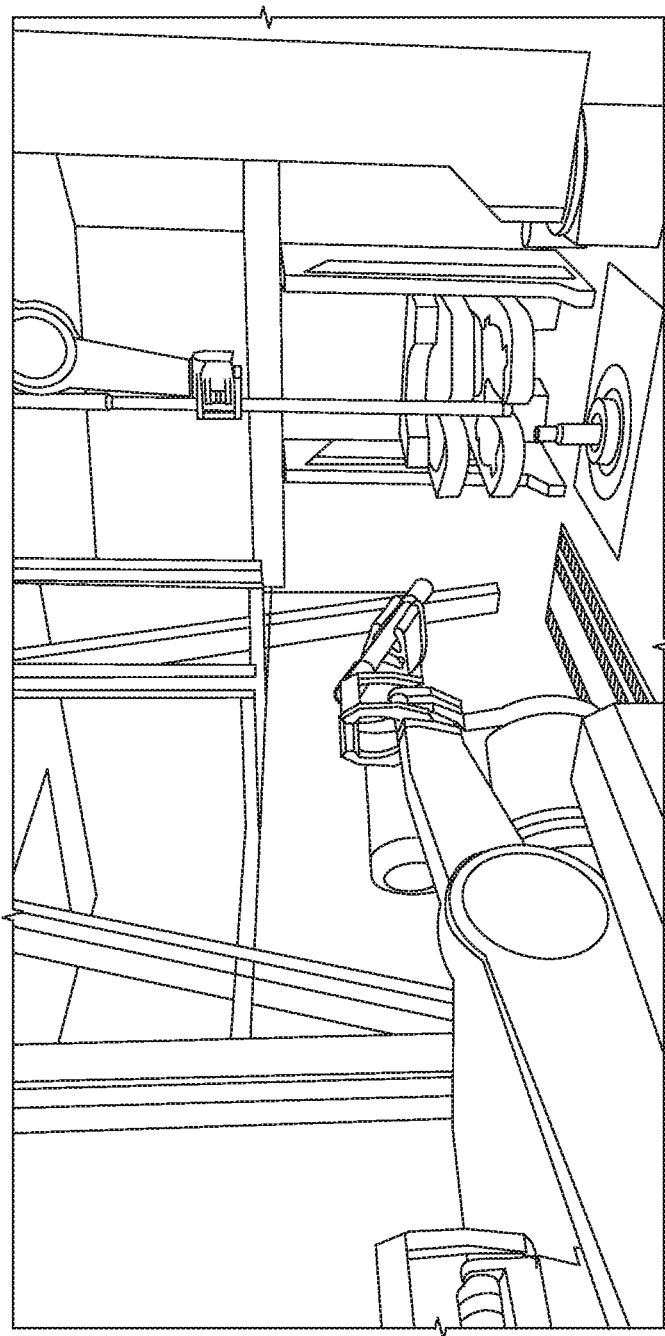
Figure 27:
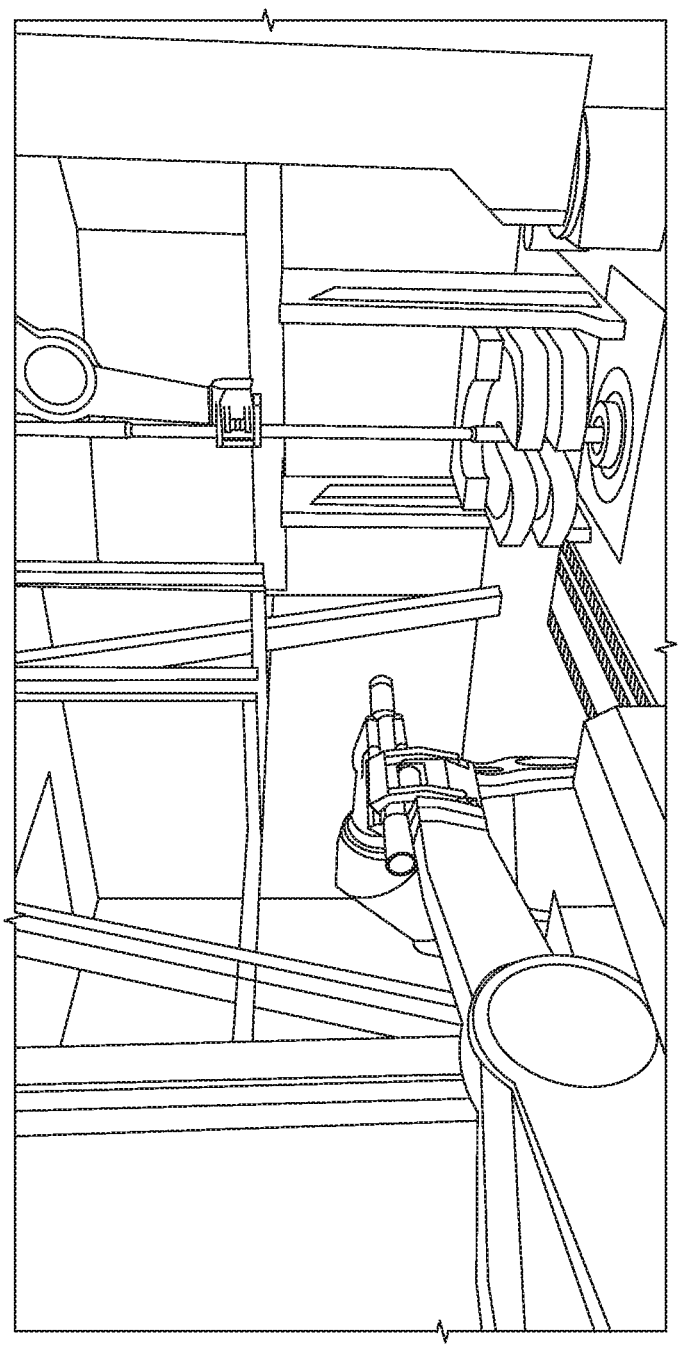
Figure 28:
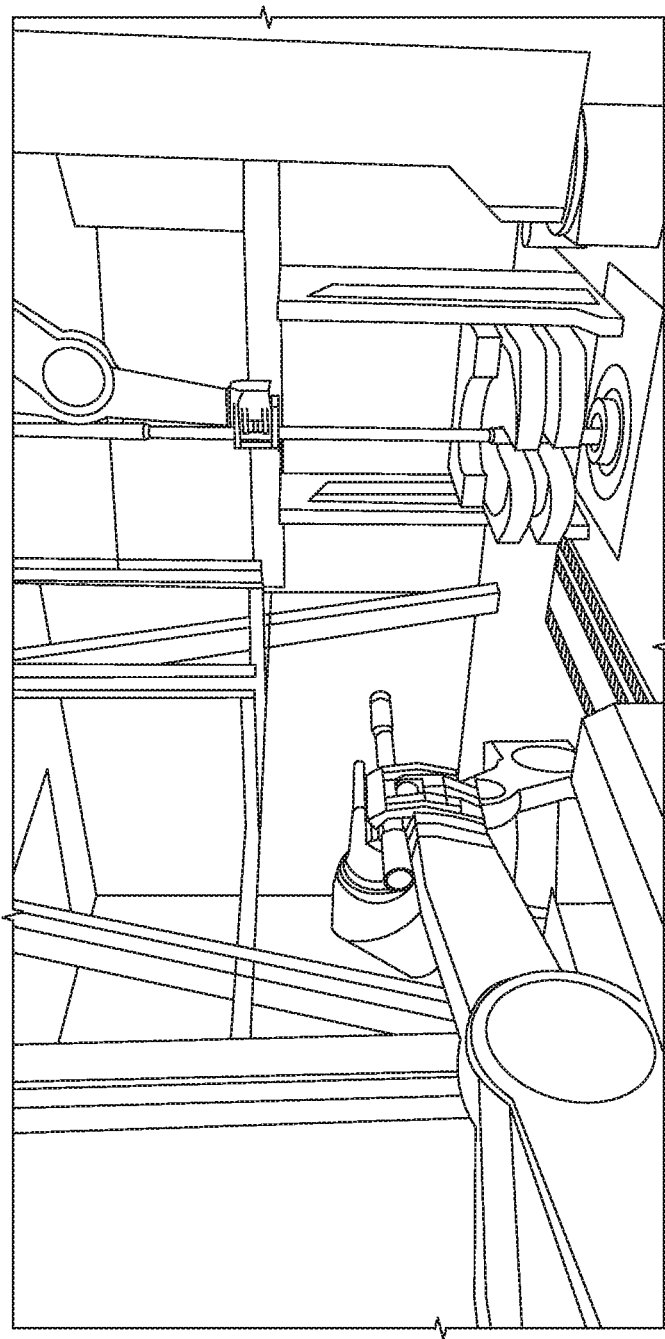
Figure 29:
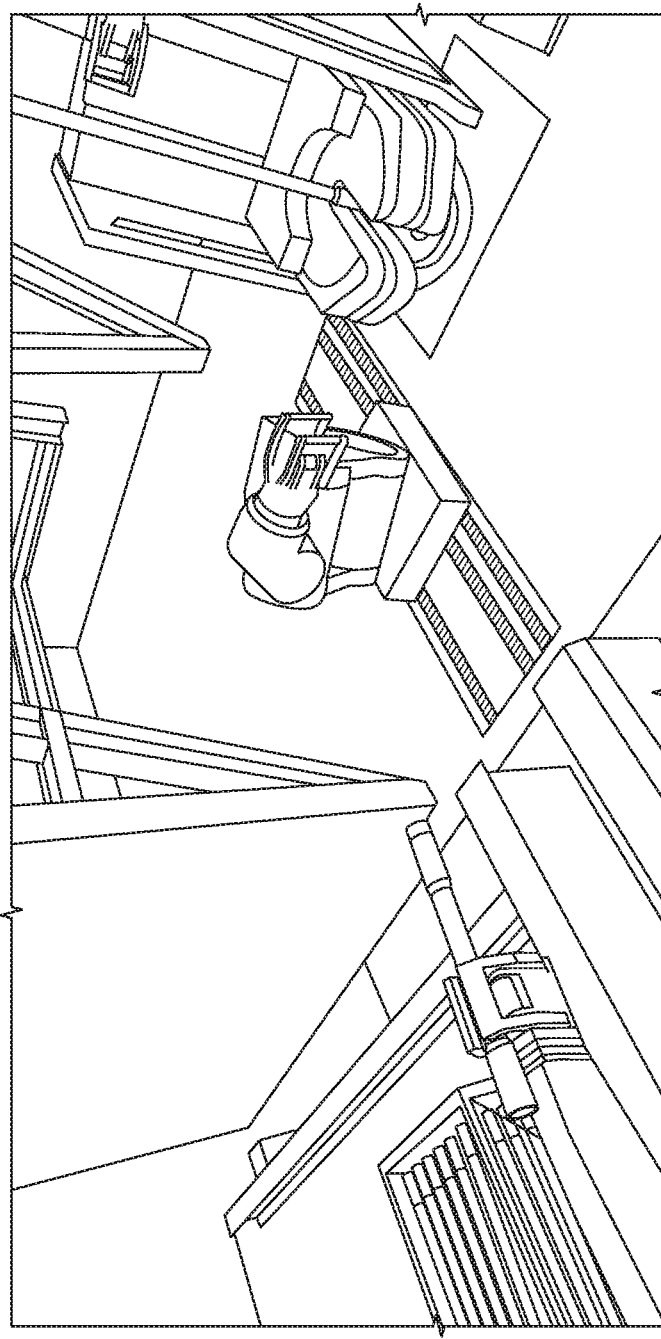
Figure 30:
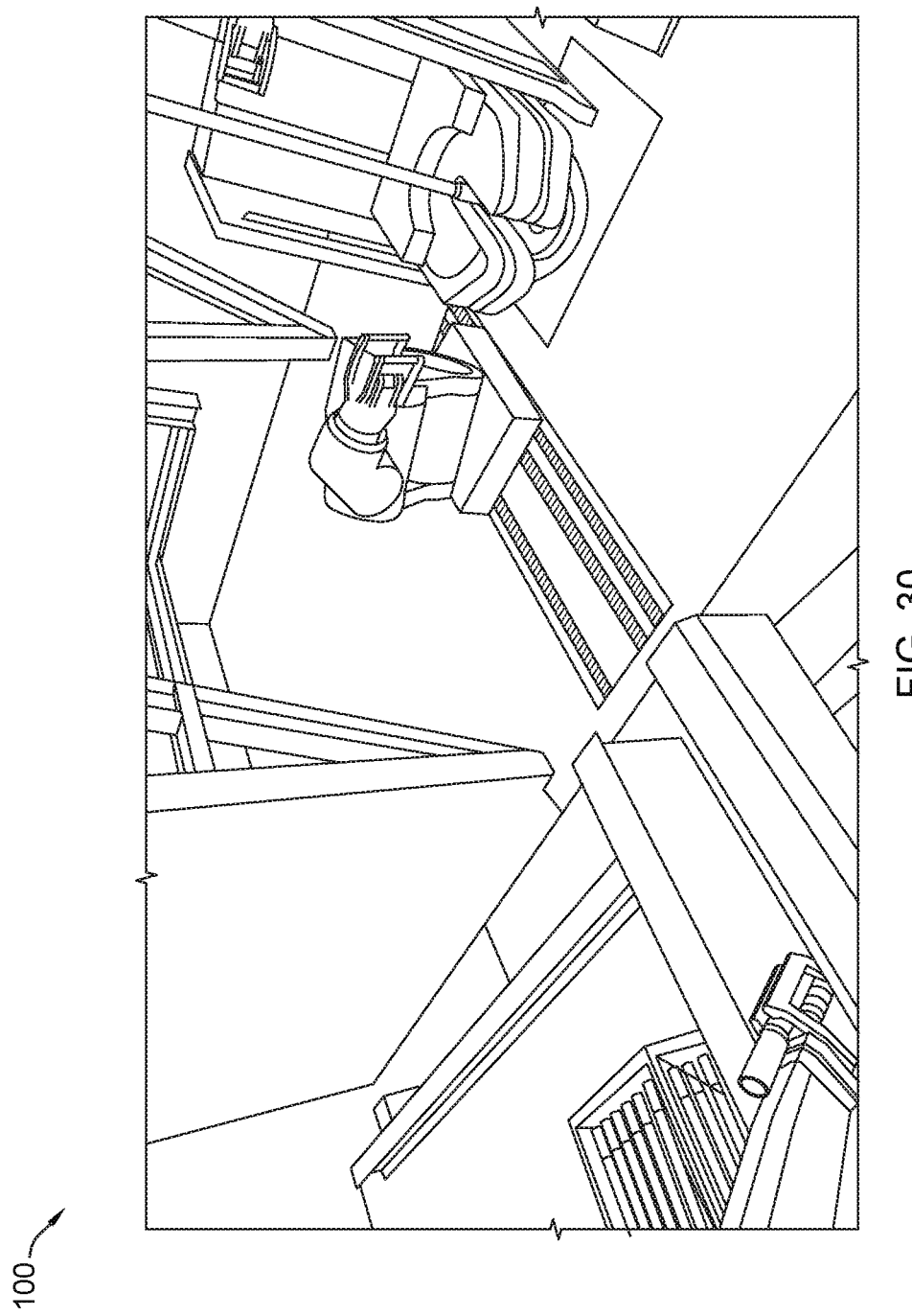
Figure 173:
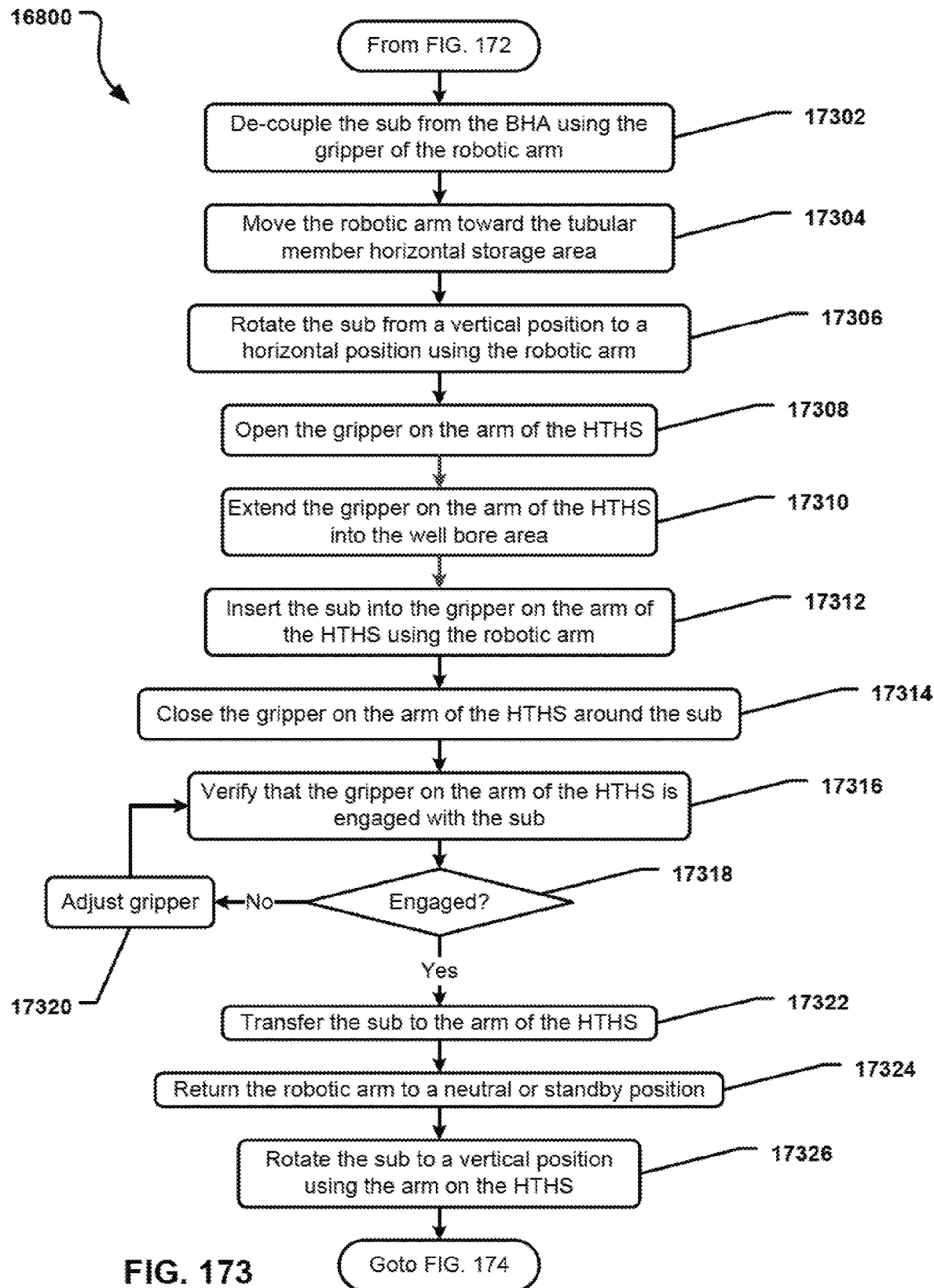

At step 17302 of FIG. 173, the system 100 can de-couple the sub from the BHA 210 using the gripper 542 of the robotic arm 500 (FIG. 25). At step 17304, the system 100 can move the robotic arm 500 toward the tubular member horizontal storage area (FIG. 26). At step 17306, the system 100 can rotate the sub from a vertical position to a horizontal position using the robotic arm 500 (FIG. 27). At step 17308, the system 100 can open the gripper 280 on the arm 244 of the HTHS 230 (FIG. 26). Further, at step 17310, the system 100 can extend the gripper 280 on the arm 244 of the HTHS 230 into the well bore area 300 (FIG. 26). At step 17312, the system 100 can insert the sub into the gripper on the arm 244 of the HTHS 230 using the robotic arm 500 (FIG. 27). At step 17314, the system 100 can close the gripper on the arm 244 of the HTHS 230 around the sub (FIG. 28). Thereafter, at step 17318, the system 100 can verify that the gripper 280 on the arm 244 of the HTHS 230 is engaged with the sub. At step 17318, if the gripper 280 is not engaged with the sub, the method 16800 can proceed to step 17320 and the system 100 can adjust the gripper 280. Thereafter, the method 16800 can return to step 17316 and continue as described. At step 17320, if the gripper 280 is engaged with the sub, the method 16800 can proceed to step 17322 and the system 100 can transfer the sub to the arm 244 of the HTHS 230 (FIG. 29). Thereafter, at step 17324, the system 100 can return robotic arm 500 to a neutral or standby position (FIG. 30). While the system 100 returns the robotic arm 500 to the neutral or standby position, they system 100 can use the HTHS 230 to perform steps 17326 through 17406. In particular, at step 17326, the system 100 can rotate the sub to a vertical position using the arm 244 on the HTHS 230 (FIG. 30).

Figure 31:
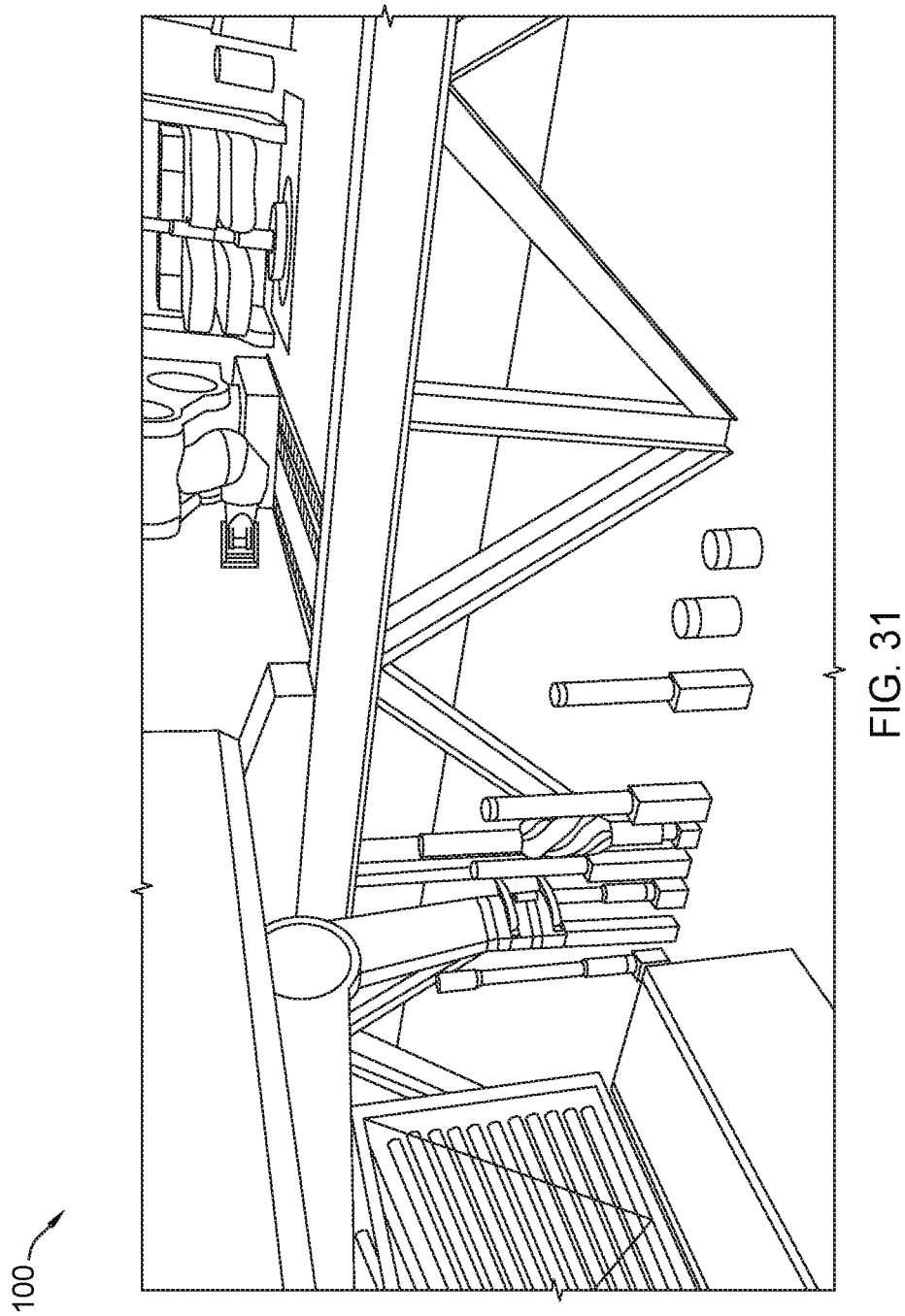
Figure 32:
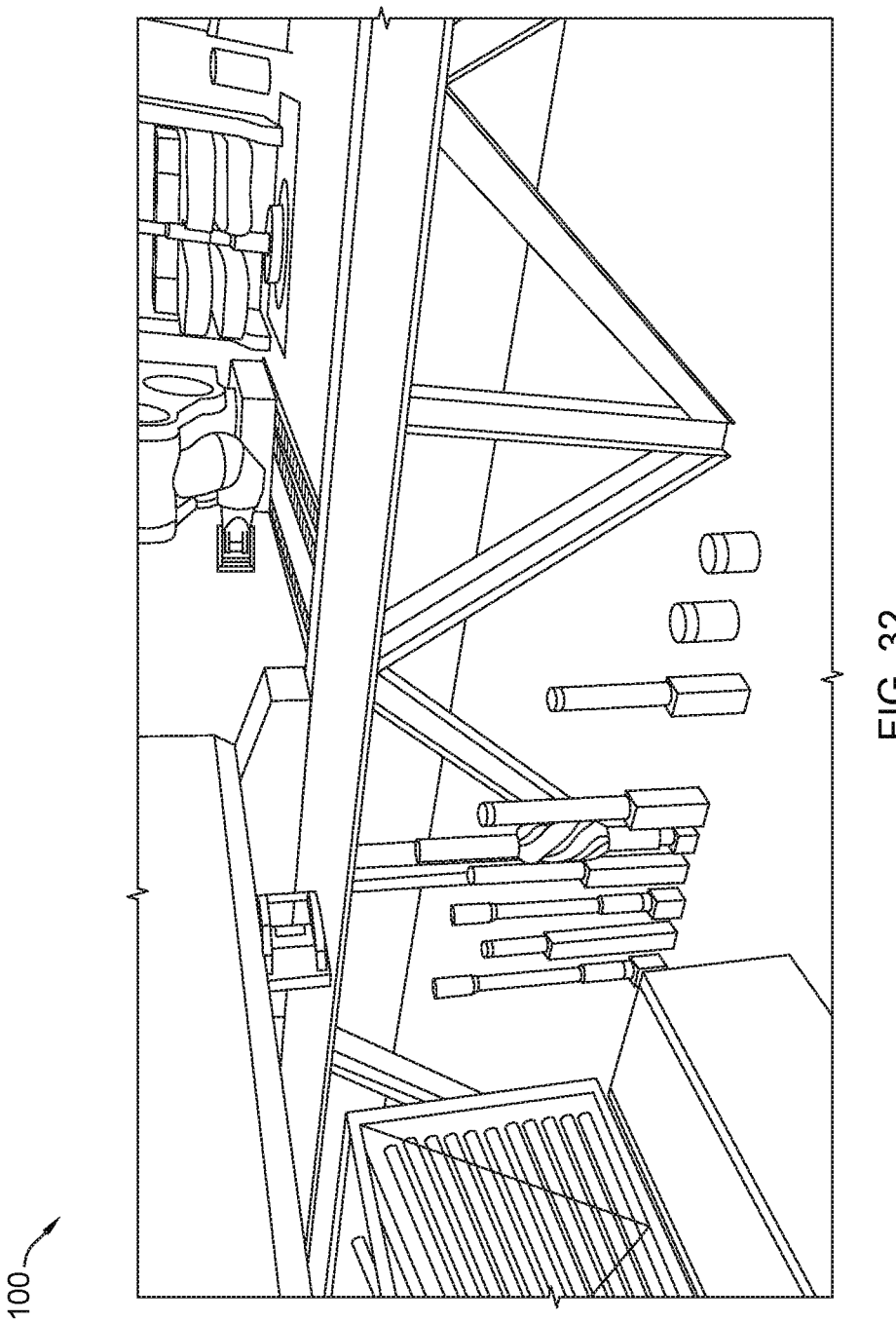
Figure 174:
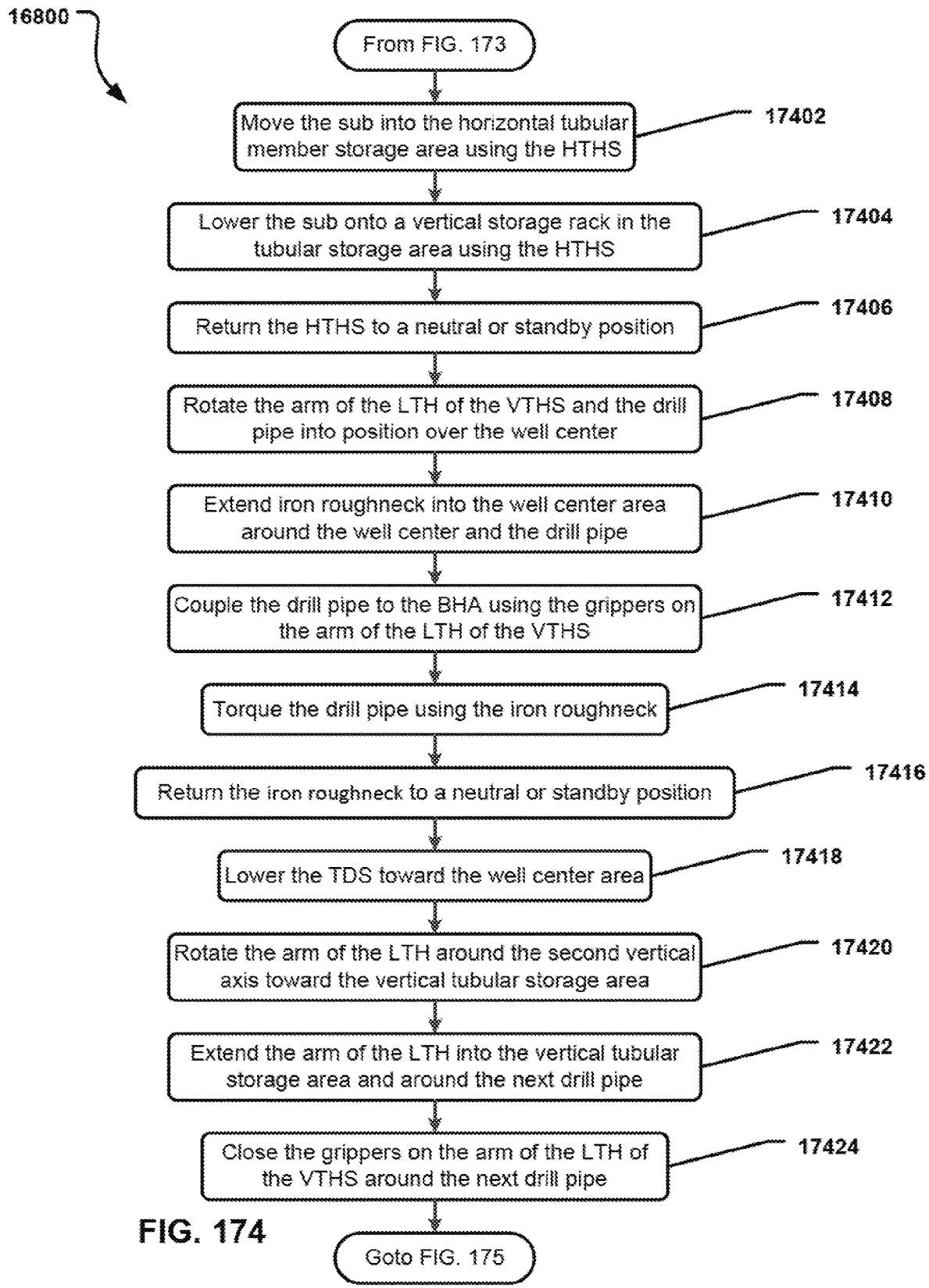

The method 16800 can then proceed to step 17402 of FIG. 174 and the system 100 can move the sub into the horizontal tubular member storage area using the HTHS 230 (FIG. 31). At step 17404, the system 100 can lower the sub onto a vertical storage rack in the tubular storage area 200 using the HTHS 230 (FIG. 32). At step 17406, the system 100 can return the HTHS 230 to a neutral or standby position. While the system 100 moves the HTHS 230 as described in steps 17326 through 17406, the system 100 can perform steps 17408 through 17414. At step 17408, the system 100 can rotate the arm 430 of the LTH 420 of the VTHS 400 and the drill pipe 206 into position over the well center (FIG. 26). At step 17410, the system 100 can extend the iron roughneck 600 into the well center area 508 around the well center and the drill pipe 206 (FIG. 27). At step 17412, the system 100 can couple the drill pipe 206 to the BHA 210 using the grippers on the arm 430 of the LTH 420 of the VTHS 400 (FIG. 28). At step 17414, the system 100 can torque the drill pipe 206 using the iron roughneck 600 (FIG. 30).

Figure 33:
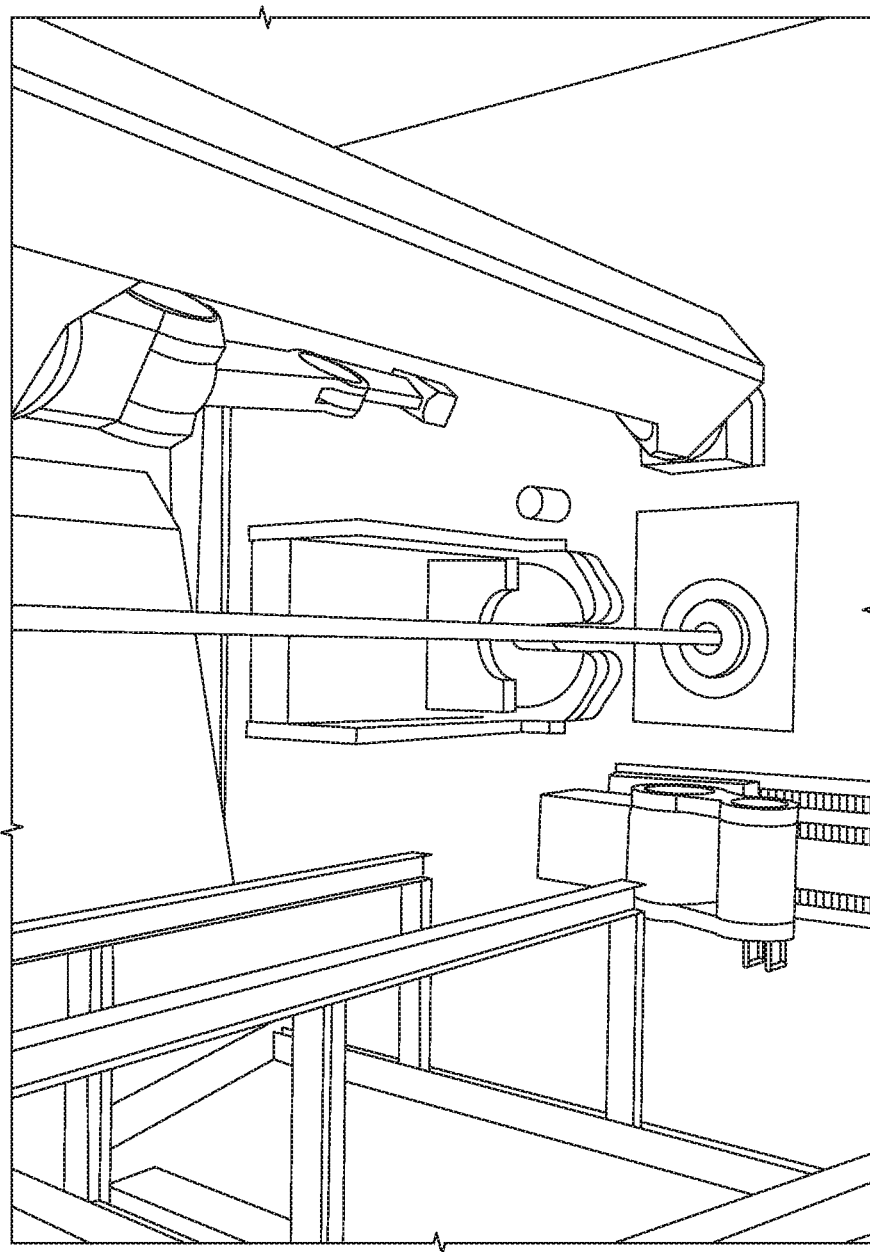

At step 17416, the system 100 can return the iron roughneck 600 to a neutral or standby position (FIG. 32). While the system 100 returns the iron roughneck 600 to the neutral position, the system 100 can lower the TDS 800 toward the well center area 508 (FIG. 33) at step 17418. Further, while the system 100 lowers the TDS 800, the system 100 can perform steps 17420 through 17510 with the VTHS 400. Specifically, at step 17420, the system 100 can rotate the arm 430 of the LTH 420 around the second vertical axis toward the vertical tubular storage area 200 (FIG. 33) and at step 17422, the system 100 can extend the arm 430 of the LTH 420 into the vertical tubular storage area 200 and around the next drill pipe 206 (FIG. 33). Then, at step 17424, the system 100 can close the grippers on the arm 430 of the LTH 420 of the VTHS 400 around the next drill pipe 206 (FIG. 33).

Figure 34:
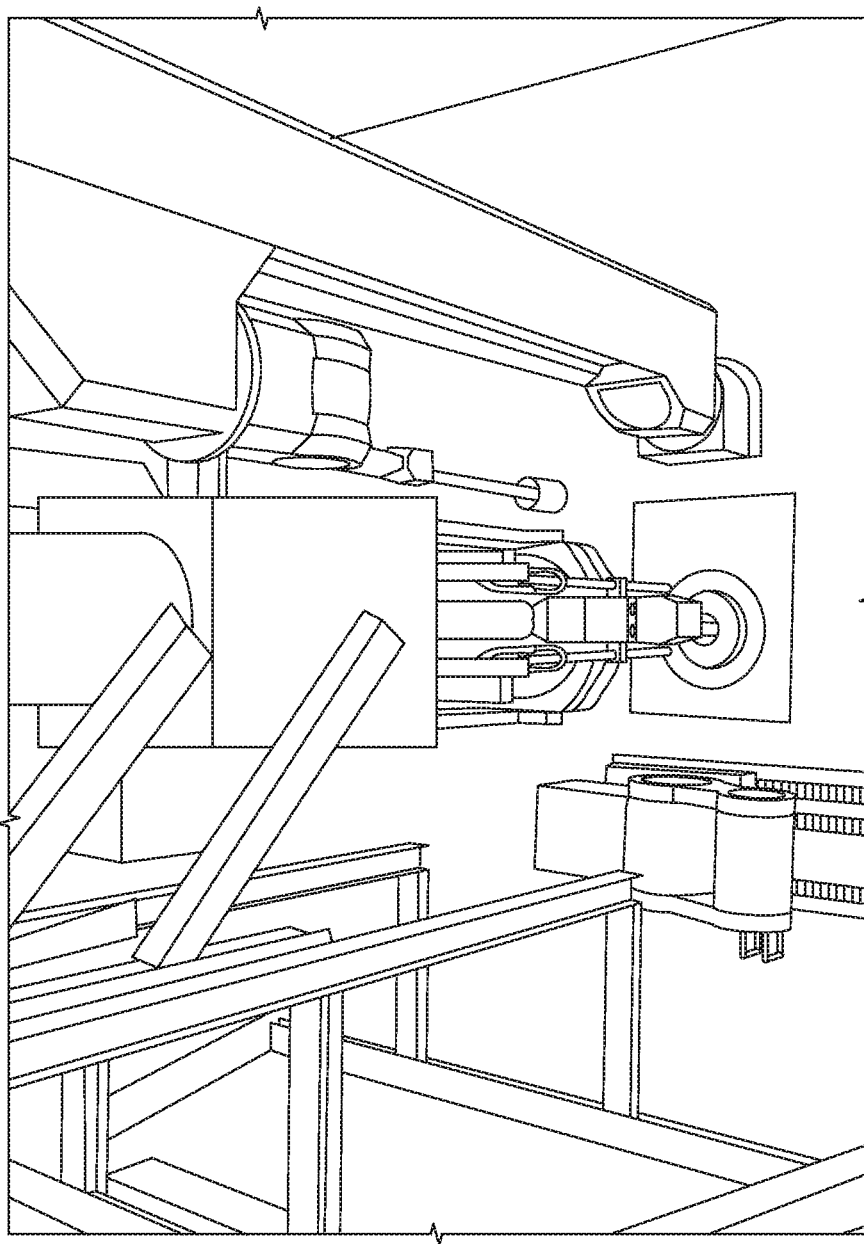
Figure 35:
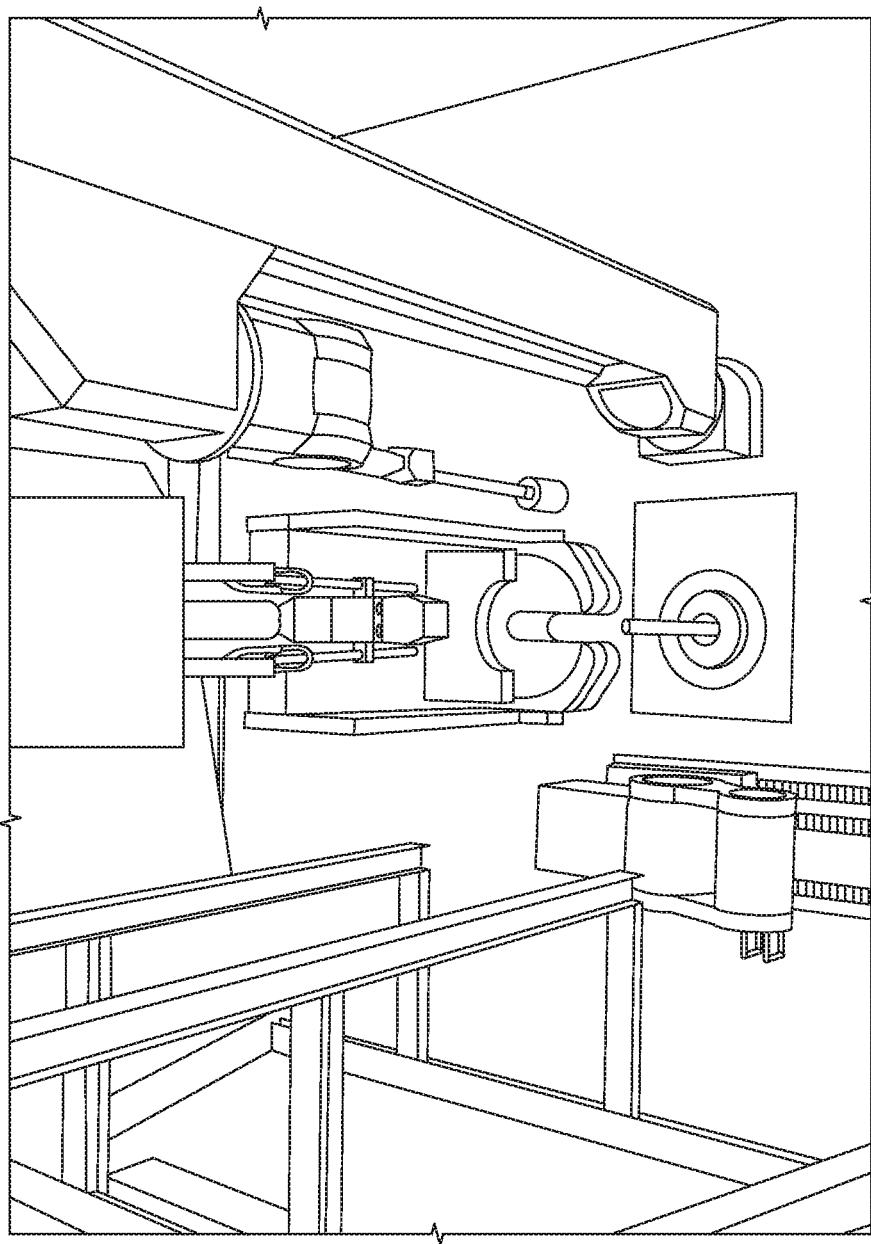
Figure 175:
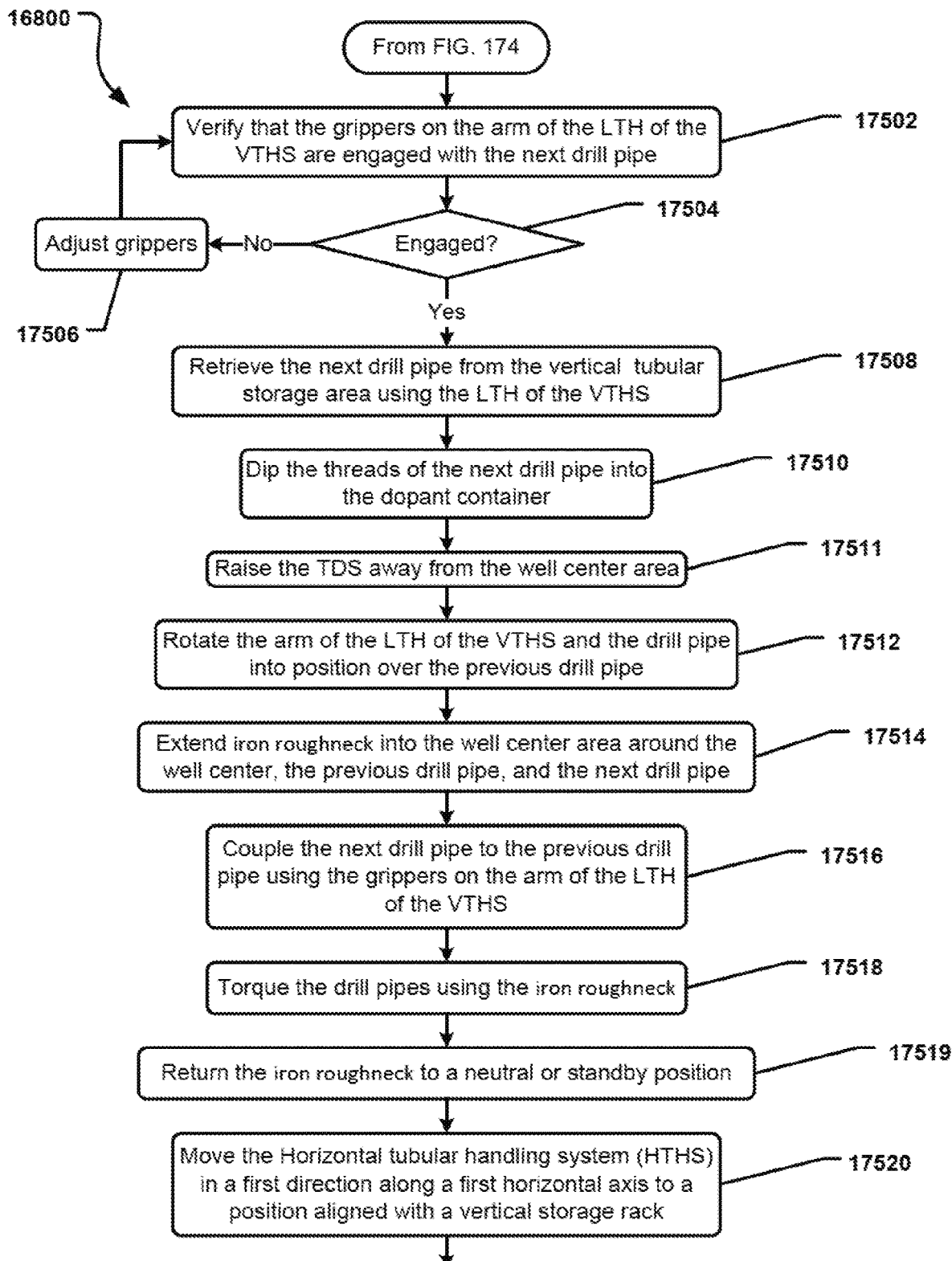

Proceeding to step 17502 of FIG. 175, the system 100 can verify that the grippers 482, 484 on the arm 430 of the LTH 420 of the VTHS 400 are engaged with the next drill pipe 206. Then, at step 17504, if the grippers 482, 484 are not engaged with the next drill pipe 206, the method 16800 may proceed to step 17506 and the system 100 may adjust the grippers 482, 484. The method 16800 can then return to step 17502 and continue as described herein. Returning to step 17504, if the grippers 482, 484 are engaged with the next drill pipe 206, the method 16800 may proceed to step 17508 and the system 100 may retrieve the next drill pipe 206 from the vertical tubular storage area 200 using the LTH 420 of the VTHS 400 (FIG. 33). Then, at step 17510, the system 100 can dip the threads of the next drill pipe 206 into the dopant container (FIG. 34). Moreover, at step 17511, the system 100 can raise the TDS 800 away from the well center area 508.

Figure 36:
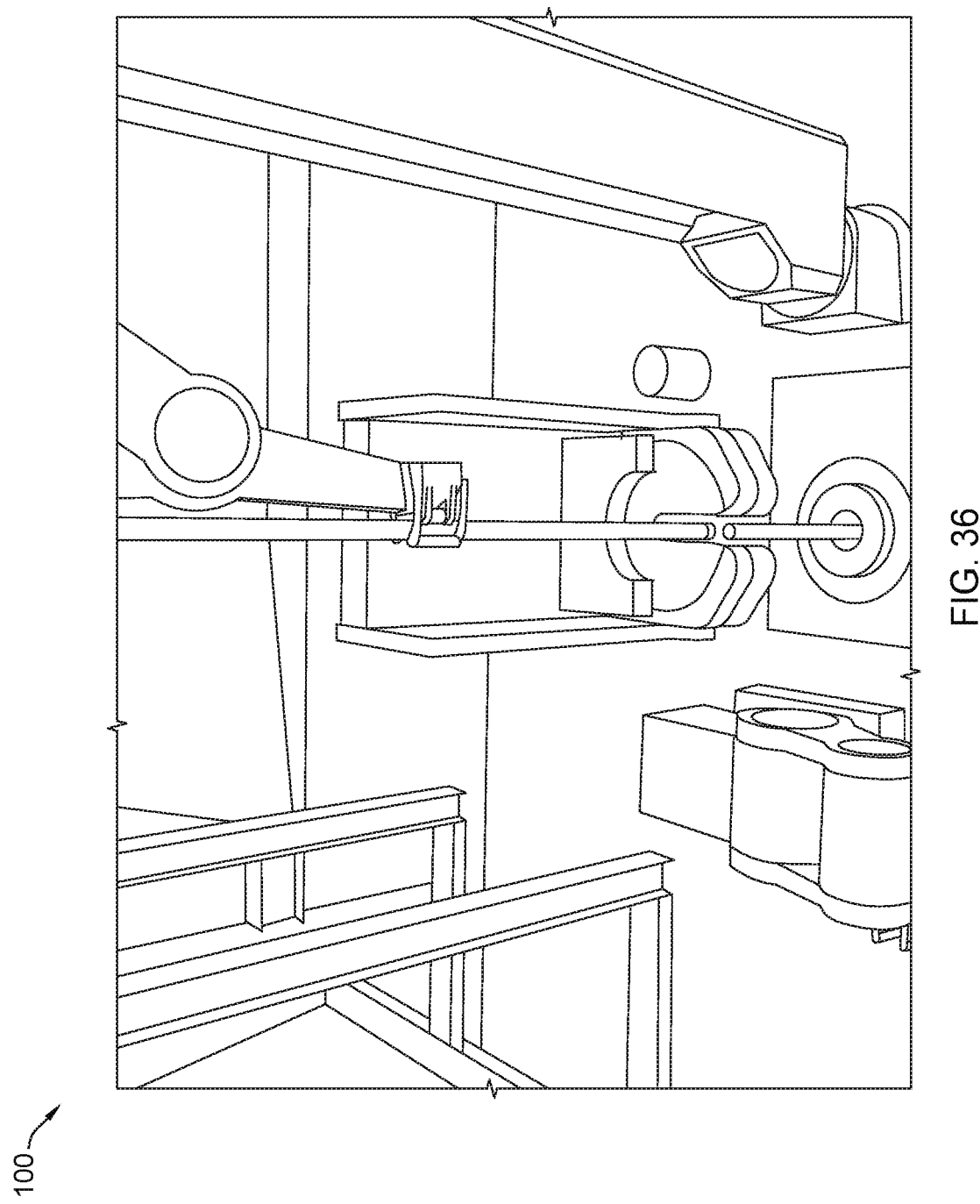
Figure 37:
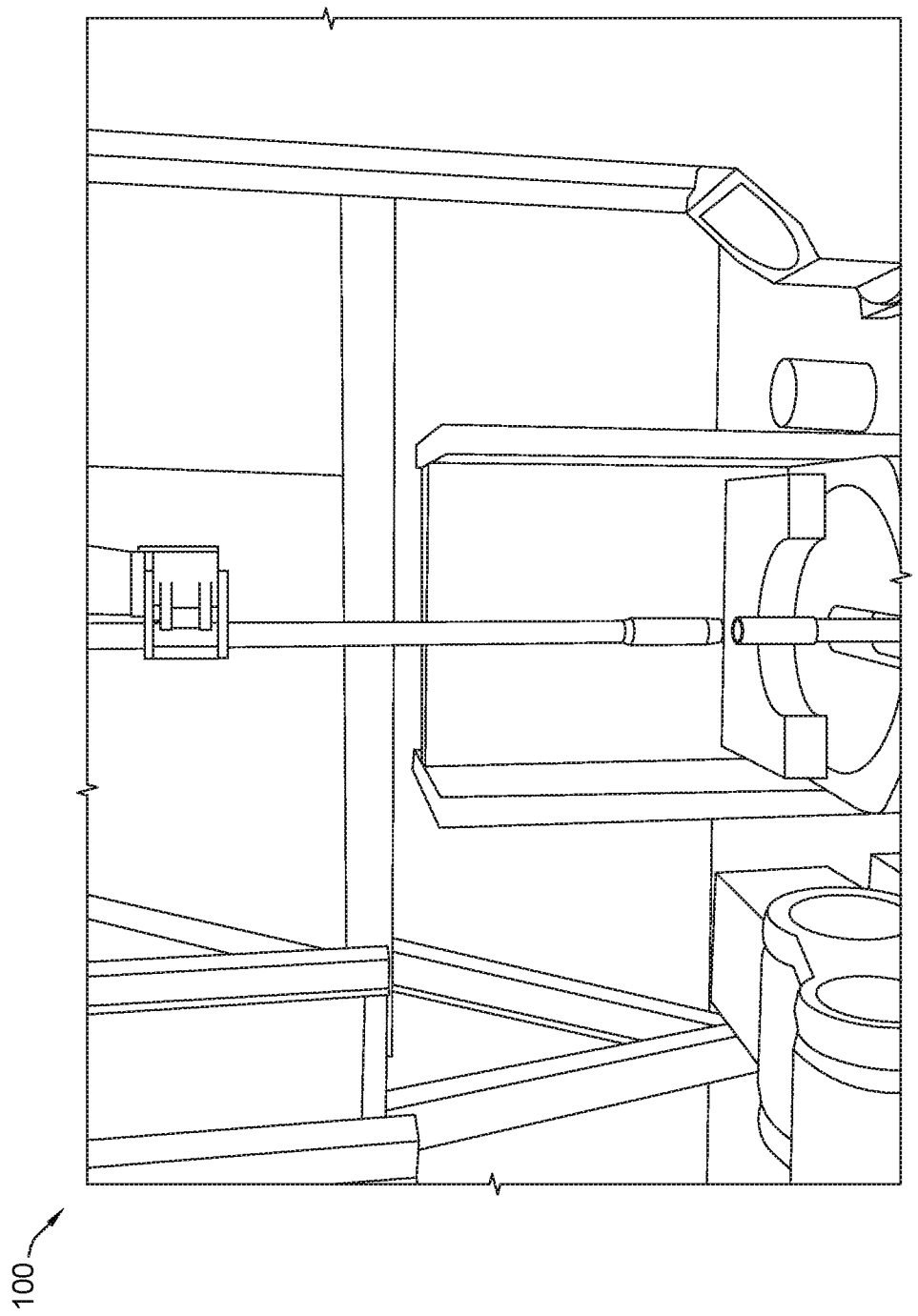
Figure 38:
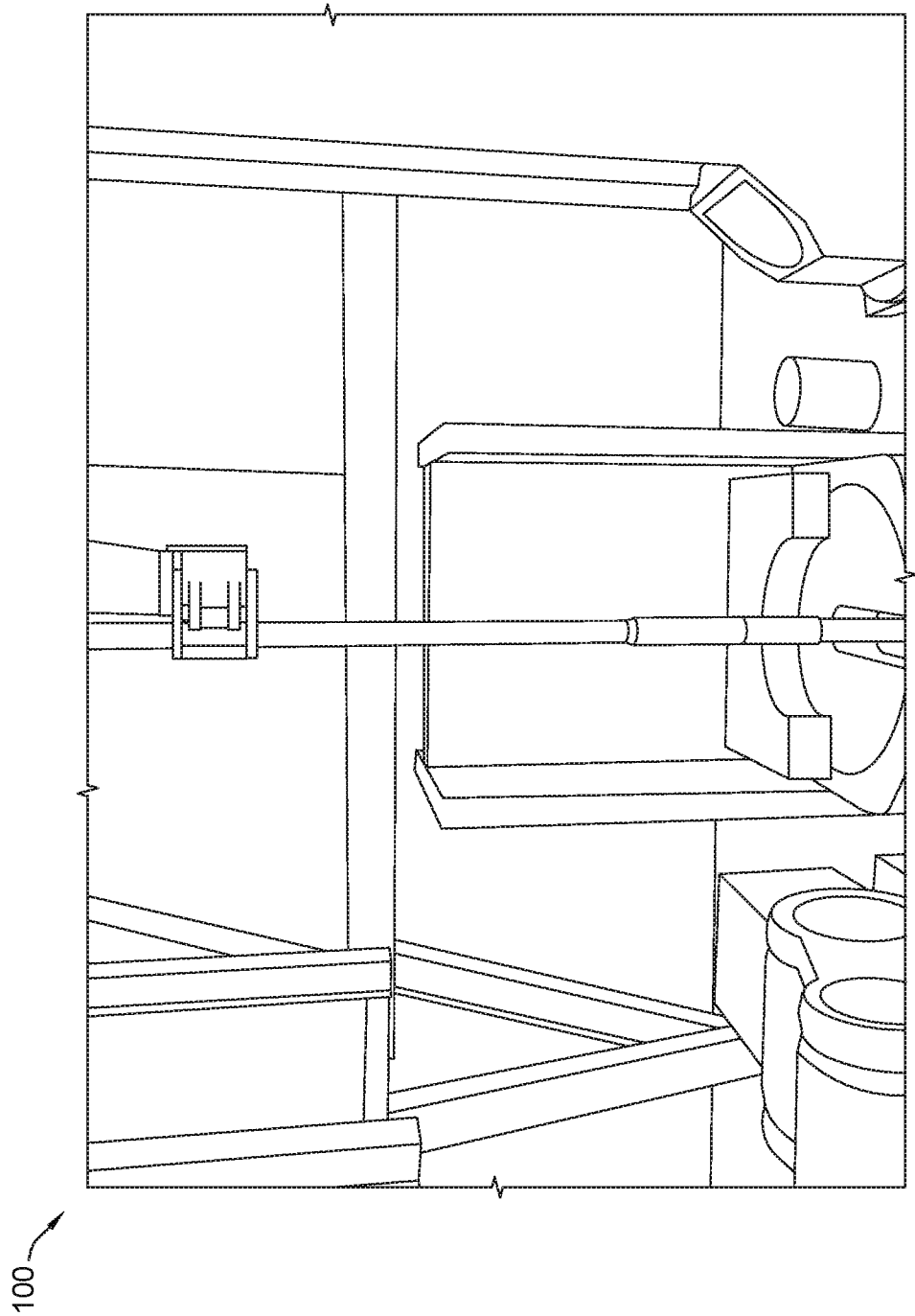
Figure 39:
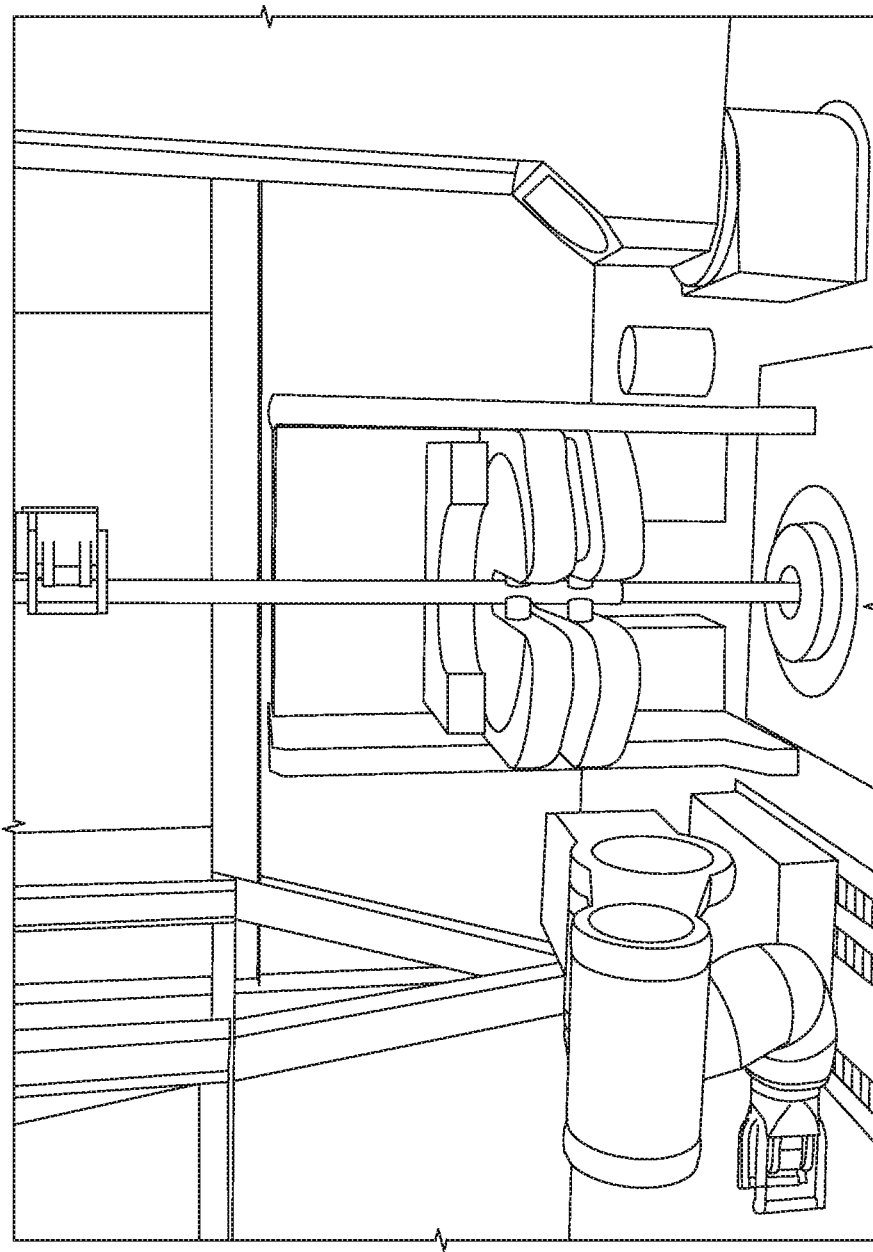
Figure 40:
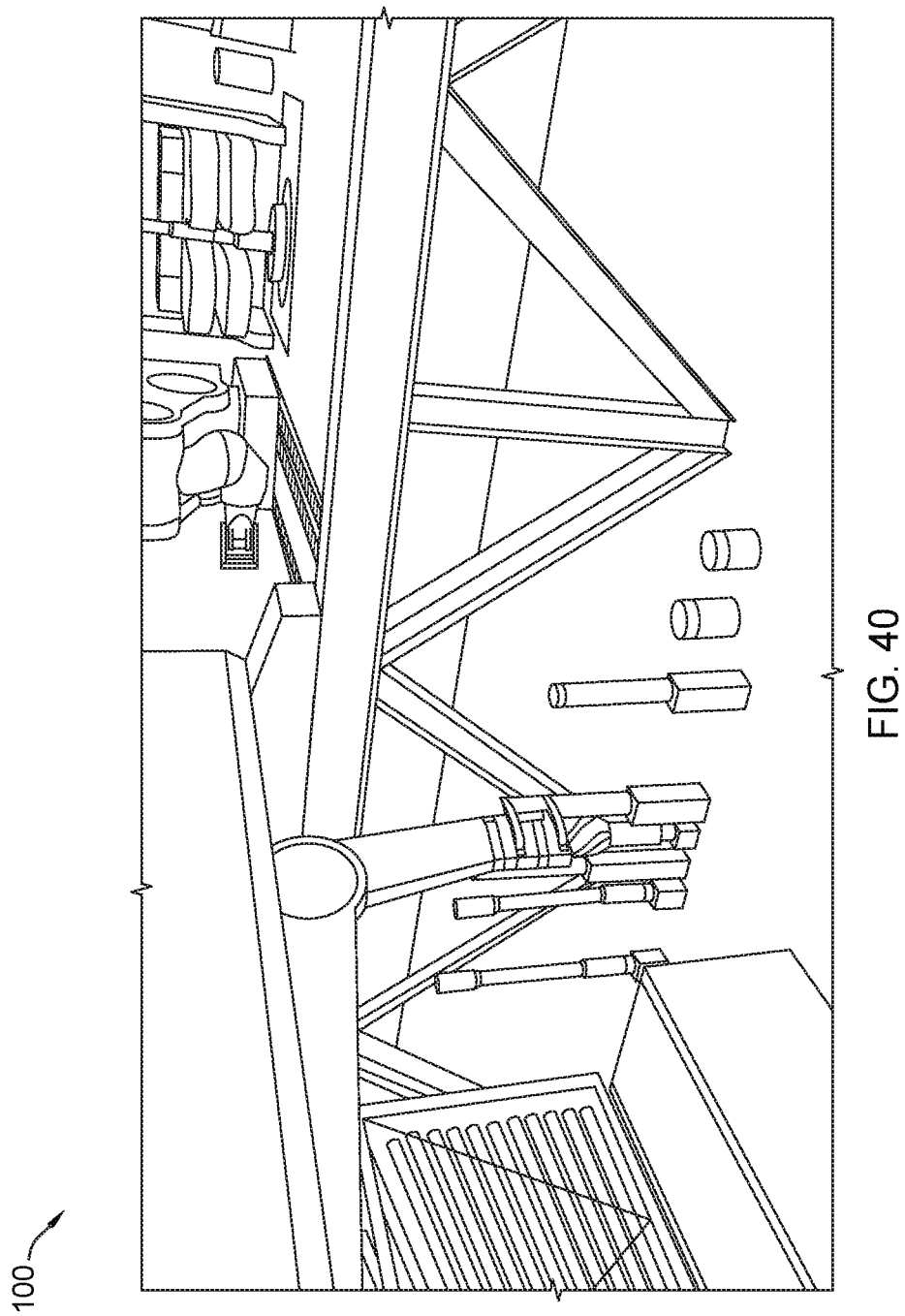

While the system 100 raises the TDS 800 at step 17511, the system 100 can rotate the arm 430 of the LTH 420 of the VTHS 400 and the drill pipe 206 into position over the previous drill pipe 206 (FIG. 36) at step 17512 and the system 100 can extend the iron roughneck 600 into the well center area 508 around the well center, the previous drill pipe 206, and the next drill pipe 206 (FIG. 37) at step 17514. Moving to step 17516, the system 100 can couple the next drill pipe 206 to the previous drill pipe 206 using the grippers 482, 484 on the arm 430 of the LTH 420 of the VTHS 400 (FIG. 38). At step 17518, the system 100 can torque the drill pipe 206s using the iron roughneck 600 (FIG. 40). At step 17519, the system 100 can return the iron roughneck to a neutral or standby position. Thereafter, at step 17520, the system 100 can move the HTHS 230 in a first direction along a first horizontal axis to a position aligned with a vertical storage rack 216 in the tubular storage area 200, while the system 100 returns the iron roughneck to the neutral position.

Figure 41:
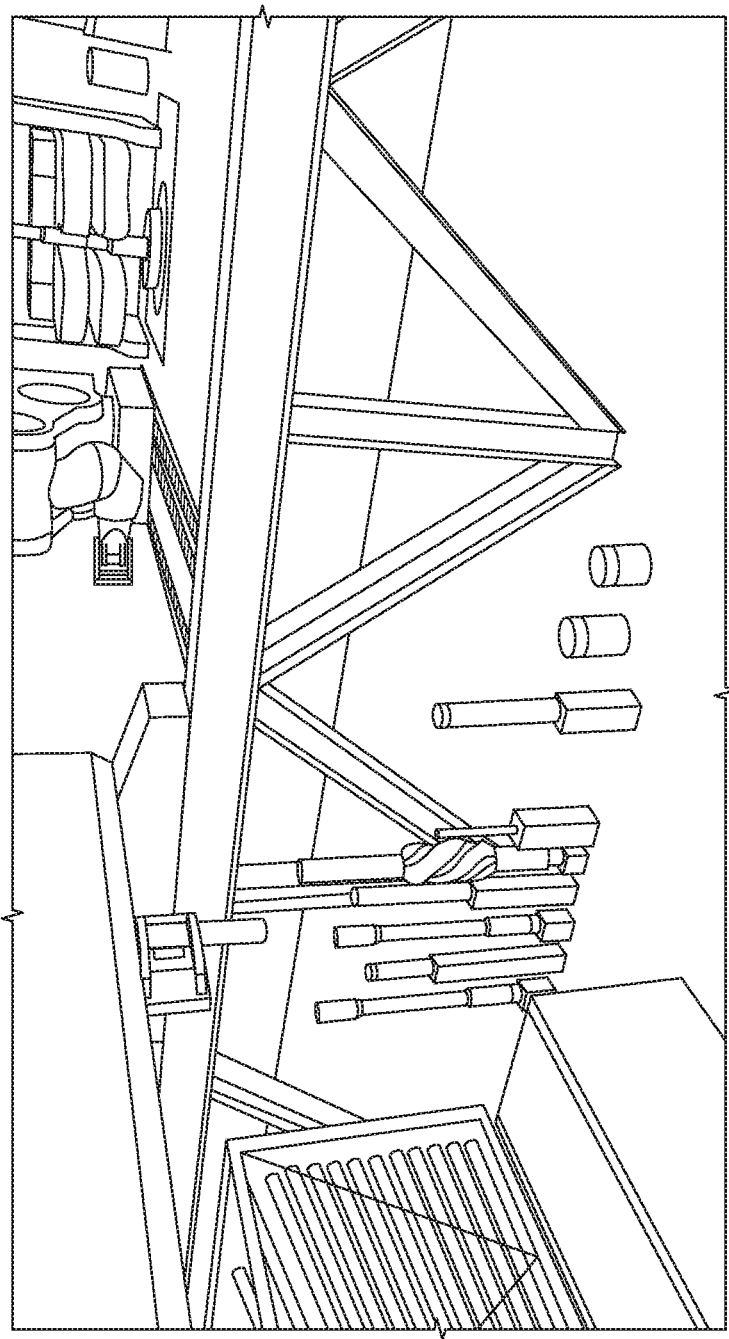
Figure 176:
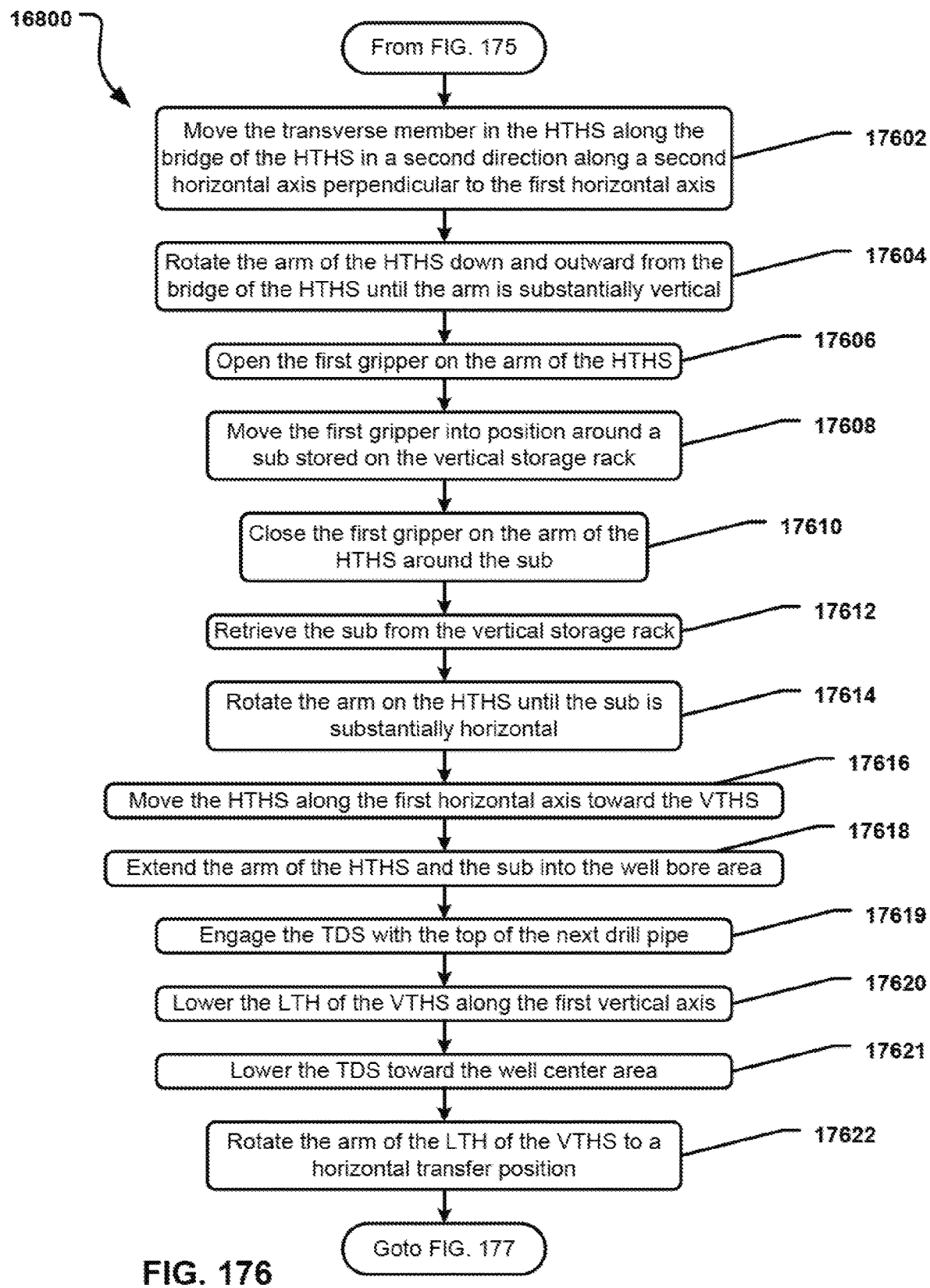
Figure 177:
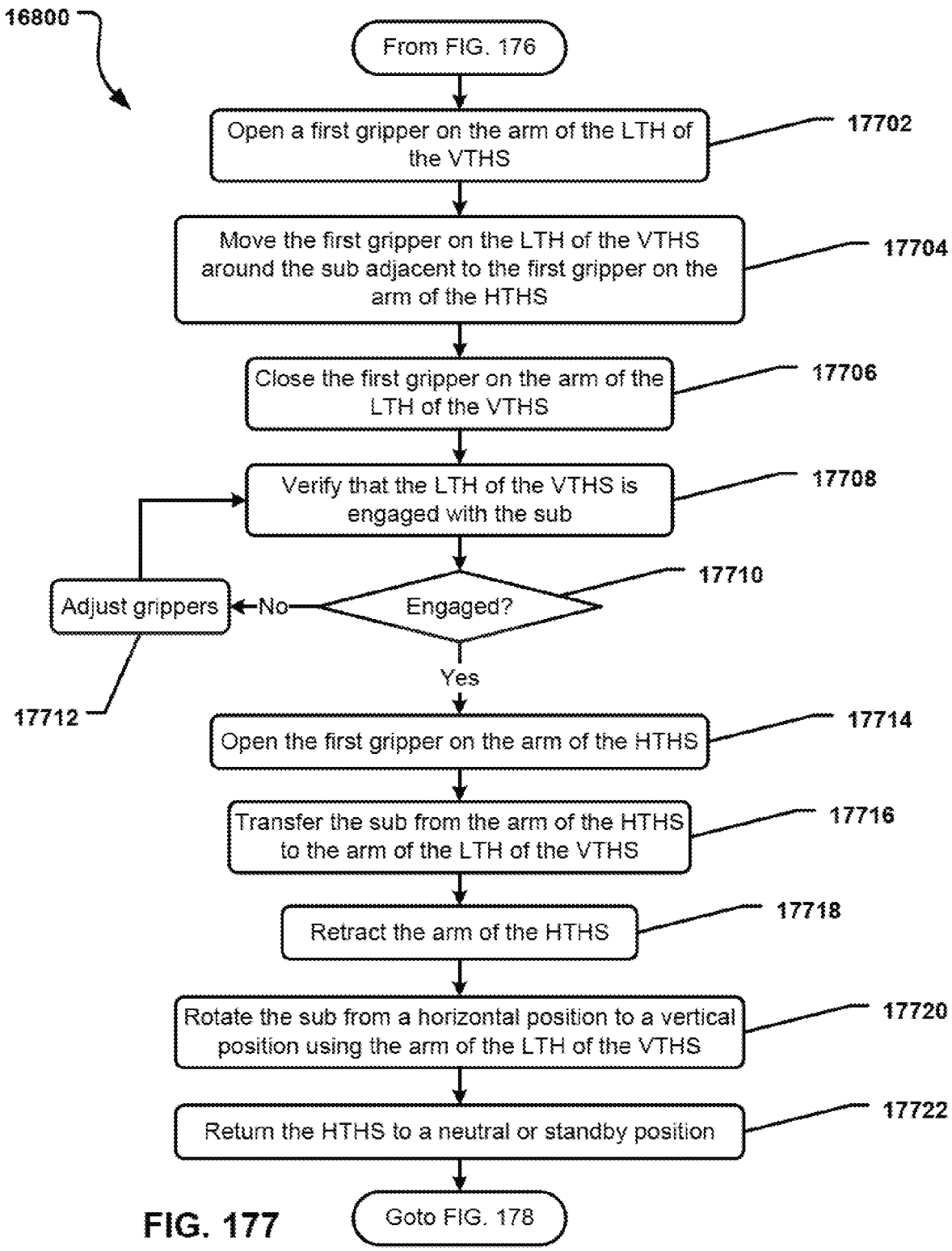
Figure 178:
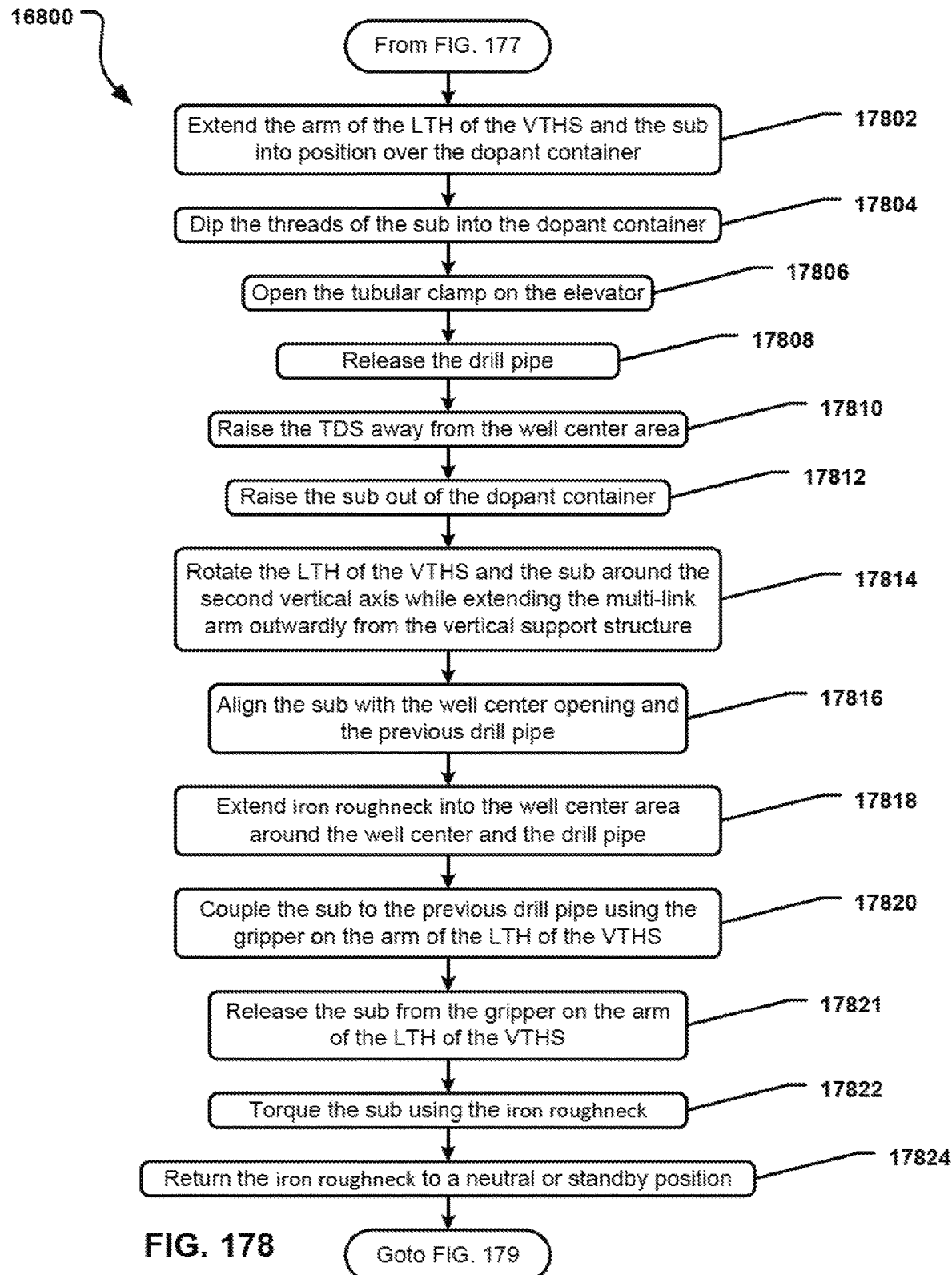

The method 16800 can then proceed to step 17602 of FIG. 176 and the system 100 move the transverse member 242 in the HTHS 230 along the bridge of the HTHS 230 in a second direction along a second horizontal axis perpendicular to the first horizontal axis (FIG. 40). At step 17604, the system 100 can rotate the arm 244 of the HTHS 230 down and outward from the bridge of the HTHS 230 until the arm 244 is substantially vertical (FIG. 40). At step 17606, the system 100 can open the first gripper 280 on the arm 244 of the HTHS 230 (FIG. 40). At step 17608, the system 100 can move the first gripper 280 into position around a sub stored on the vertical storage rack 216 (FIG. 40). Further, at step 17610, the system 100 can close the first gripper on the arm 244 of the HTHS 230 around the sub (FIG. 41). At step 17612, the system 100 can retrieve the sub from the vertical storage rack 216 (FIG. 41). At step 17614, the system 100 can rotate the arm on the HTHS 230 until the sub is substantially horizontal. At step 17616, the system 100 can move the HTHS 230 along the first horizontal axis toward the VTHS 400. Moreover, at step 17618, the system 100 can extend the arm 244 of the HTHS 230 and the sub into the well bore area 300.

Figure 42:
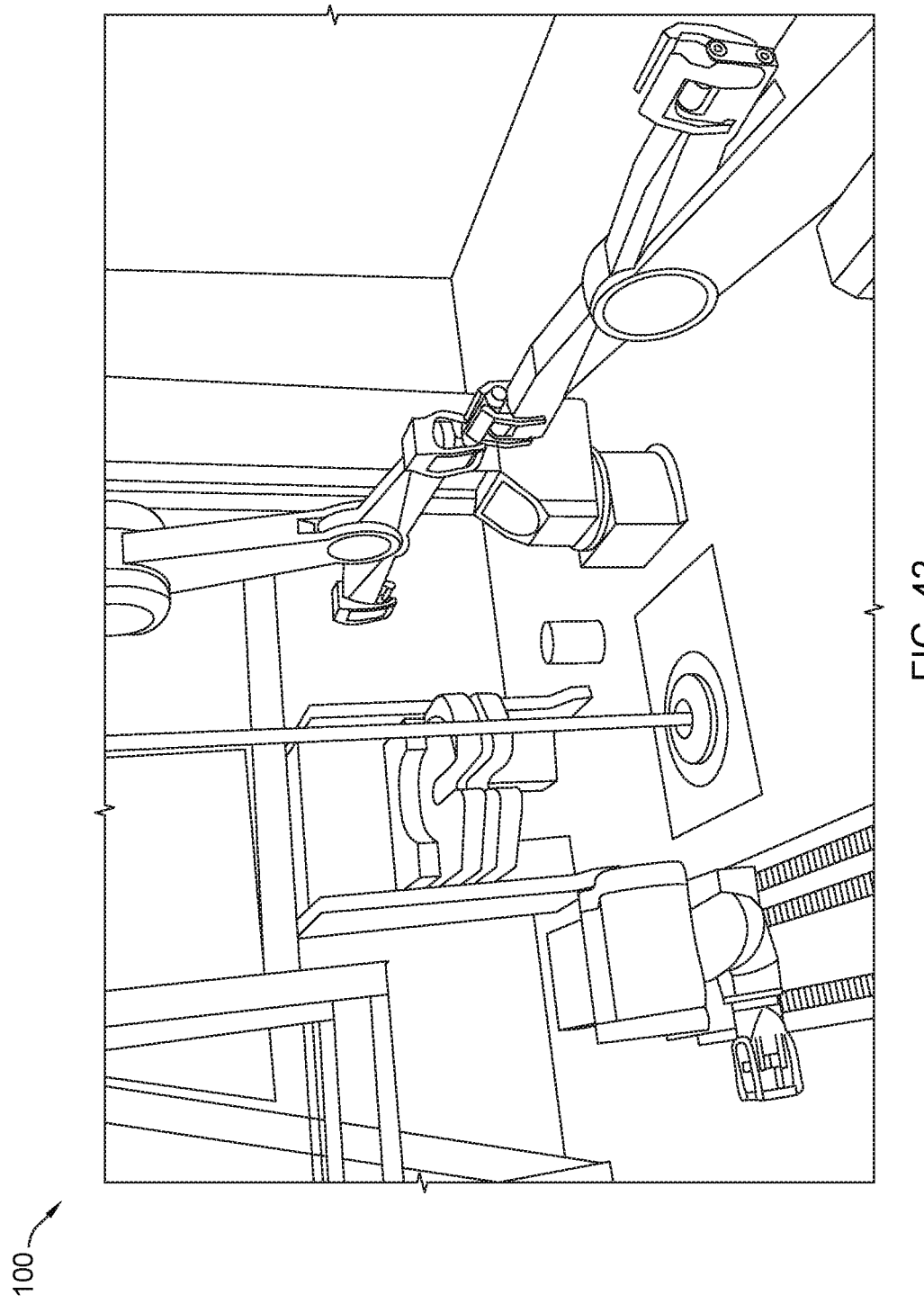

While the system 100 moves the HTHS 230 as described in steps 17520 through 17618, the system 100 can engage the TDS 800 with the next drill pipe at step 17619 and at step 17620, the system 100 can lower the LTH 420 of the VTHS 400 along the first vertical axis. At step 17621, the system 100 can lower the TDS 800 toward the well center area. While the system 100 lowers the TDS 800, the system 100 can perform one or more of steps 17622 through 17712 with the VTHS 400. In particular, at step 17622, the system 100 can rotate the arm 430 of the LTH 420 of the VTHS 400 to a horizontal transfer position (FIG. 42). Then the method 16800 can continue to step 17702 of FIG. 177.

At step 17702, the system 100 can open a first gripper 482 on the arm 430 of the LTH 420 of the VTHS 400 (FIG. 42). At step 17704, the system 100 can move the first gripper 482 on the LTH 420 of the VTHS 400 around the sub adjacent to the first gripper 280 on the arm 244 of the HTHS 230 (FIG. 42). At step 17706, the system 100 can close the first gripper 280 on the arm 430 of the LTH 420 of the VTHS 400. At step 17708, the system 100 can verify that the LTH 420 of the VTHS 400 is engaged with the BHA 210. At step 17710, if the LTH 420 of the VTHS 400 is not engaged with the BHA 210, the method 16800 can proceed to step 17712 and the system 100 can adjust the first gripper 482. The method 16800 may then return to step 17708 and continue as described. On the other hand, at step 17710, if the LTH 420 of the VTHS 400 is engaged with the BHA 210, the method 16800 can proceed to step 17714 and the system 100 can open the first gripper on the arm 244 of the HTHS 230. Further, at step 17716, the system can transfer the sub from the arm 244 of the HTHS 230 to the arm 430 of the LTH 420 of the VTHS 400. At step 17718, the system 100 can retract the arm 244 of the HTHS 230. Further, at step 17720, the system 100 can rotate the sub from a horizontal position to a vertical position using the arm 430 of the LTH 420 of the VTHS 400. At step 17722, the system 100 can return the HTHS 230 to a neutral or standby position. The system 100 can retract the arm of the HTHS, at step 17718, and return the HTHS to the neutral position, at step 17722, while performing step 17720. The method 16800 may then proceed to FIG. 178.

Figure 43:
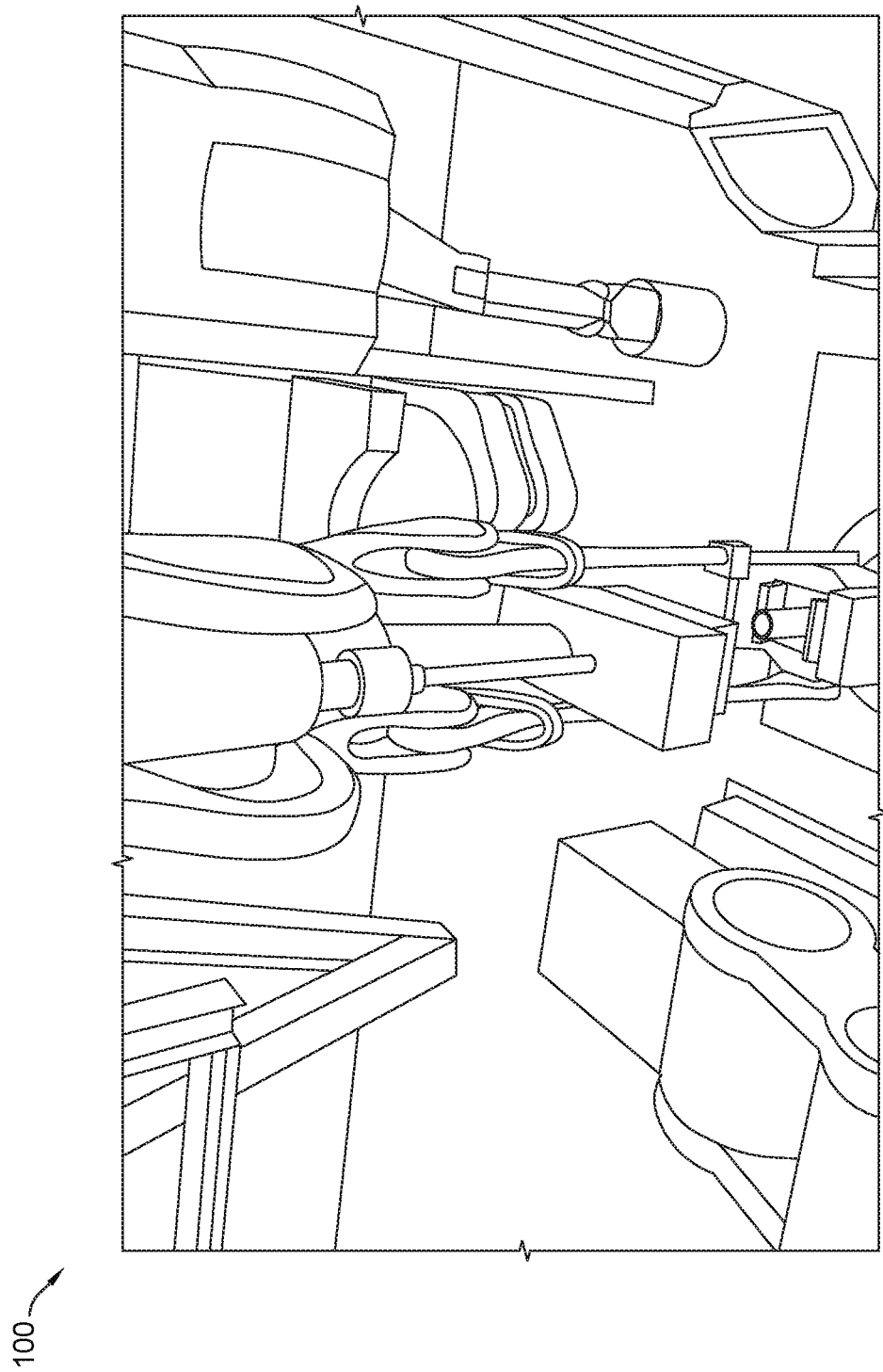

As step 17802, the system 100 can extend the arm 430 of the LTH 420 of the VTHS 400 and the sub into position over the dopant container. As step 17804, the system 100 can dip the threads of the sub into the dopant container (FIG. 43). While performing steps 17802 and 17804, the system 100, the system 100 can open the tubular clamp on the elevator 850 at step 17806 and at step 17808, the system 100 can release the drill pipe 206. Further, while performing steps 17802 and 17804, the system 100 can raise the TDS 800 away from the well center area 508 (FIG. 44) at step 17810.

Figure 44:
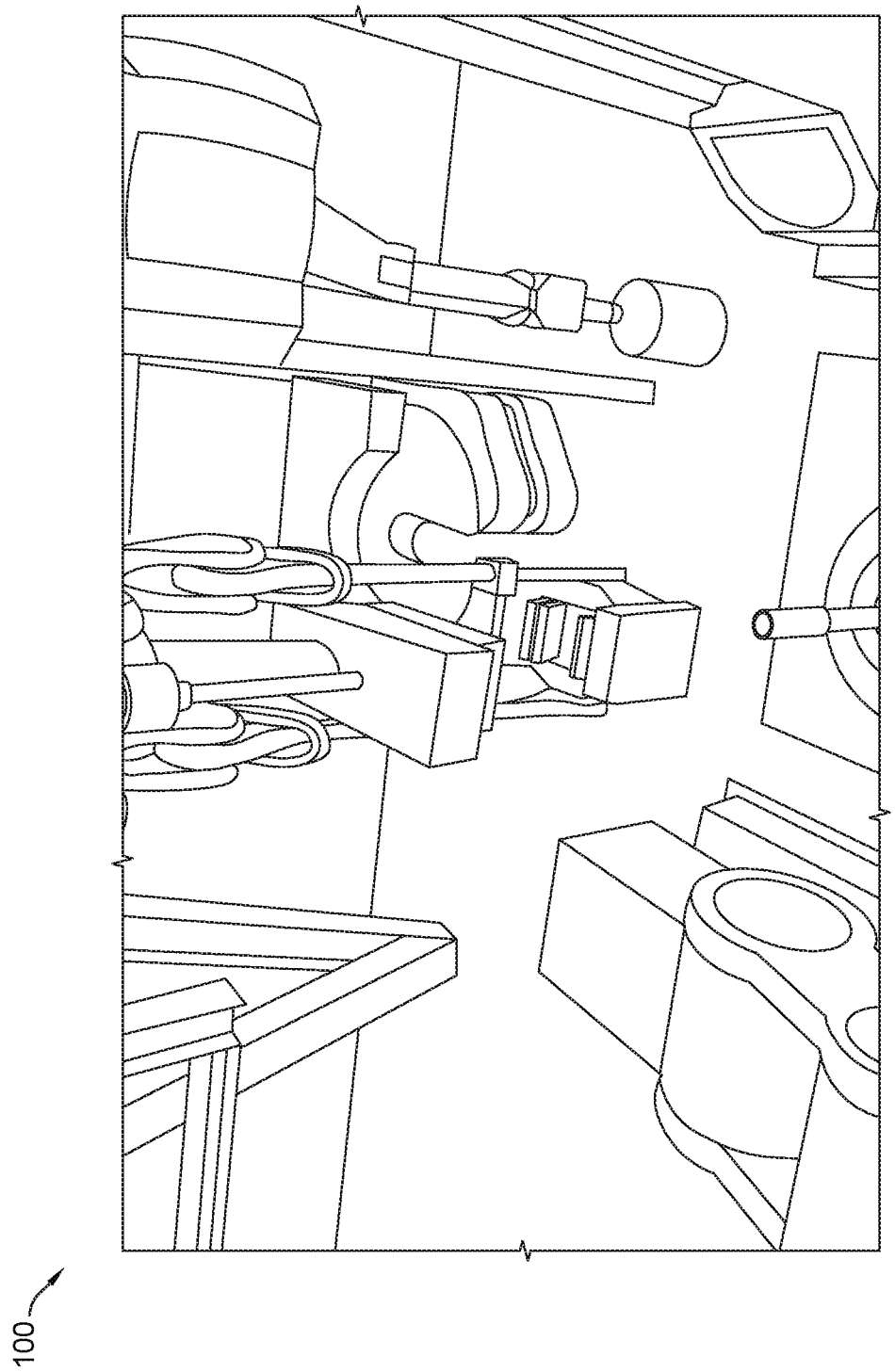
Figure 45:
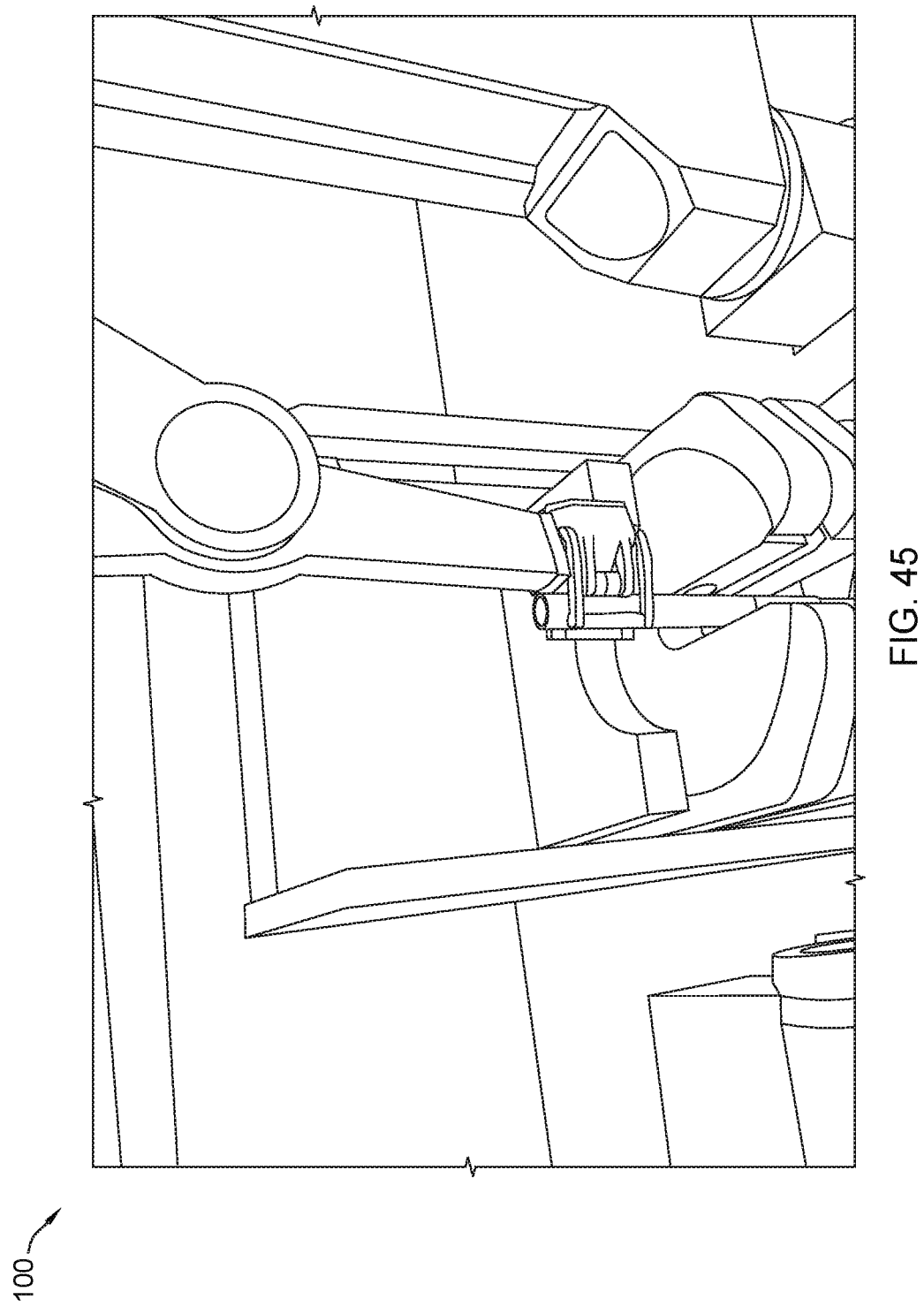
Figure 46:
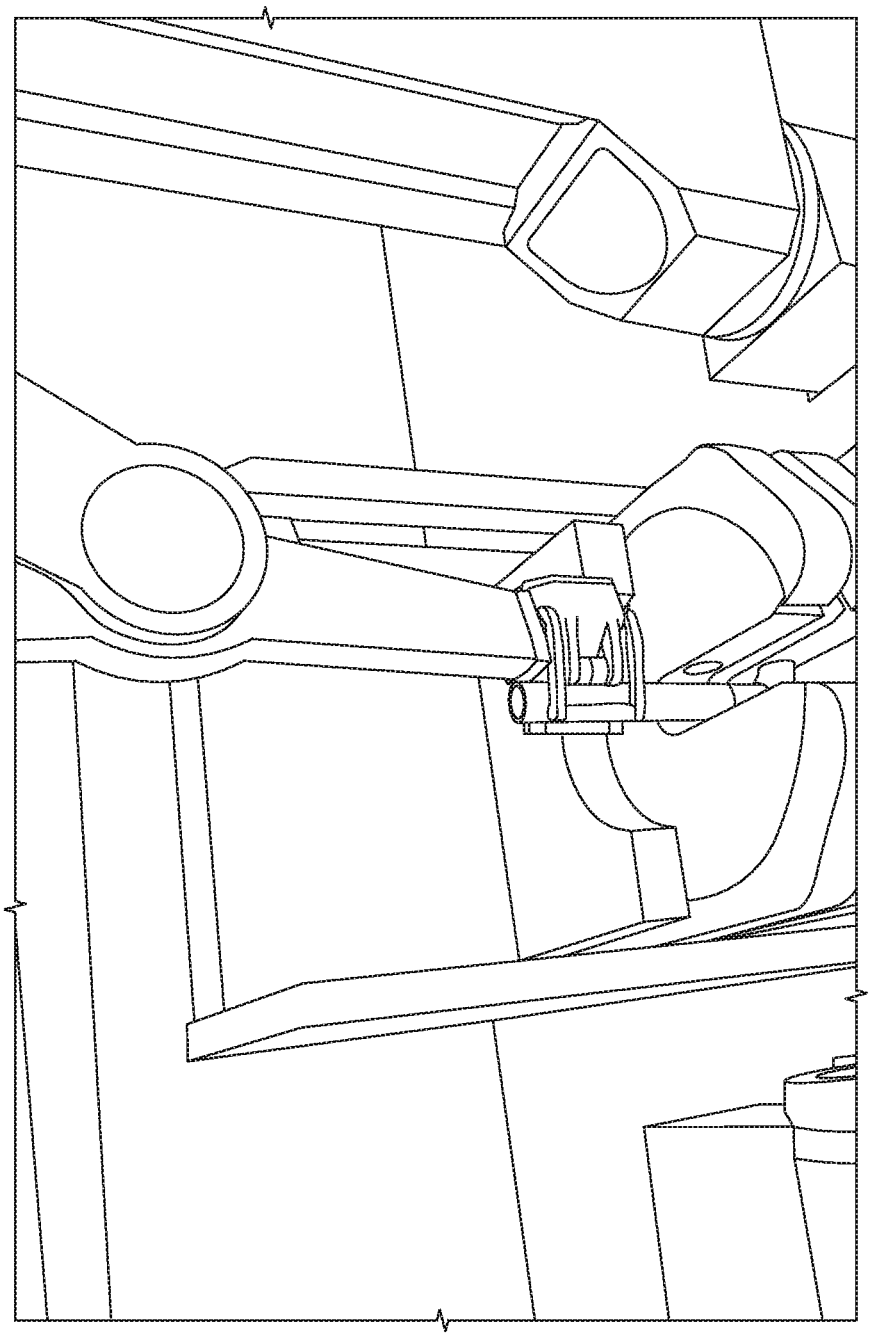
Figure 47:
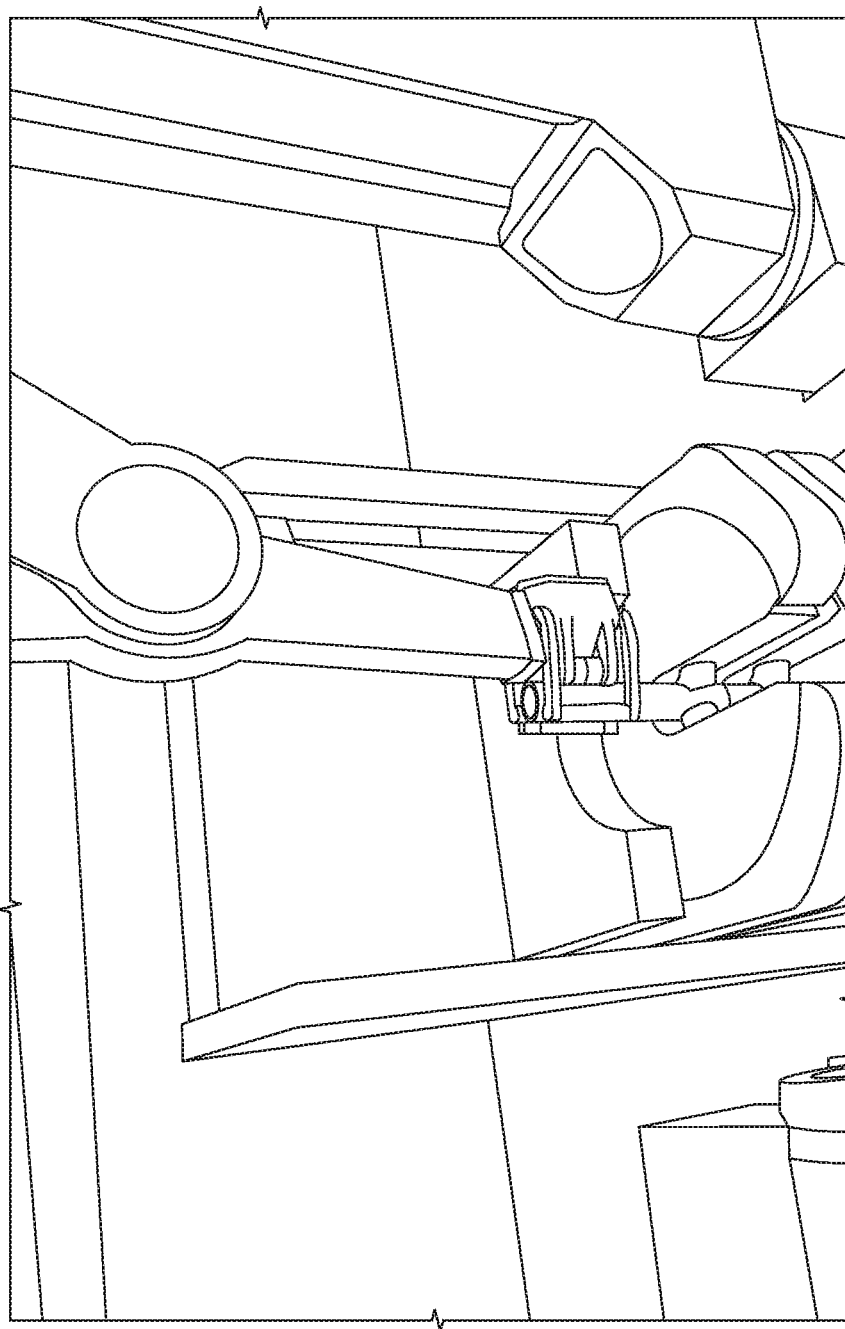

While raising the TDS 800 at step 17810, the system 100 can perform one or more of steps 17812 through 17821. Specifically, at step 17812, the system 100 can raise the sub out of the dopant container (FIG. 44). At step 17814, the system 100 can rotate the LTH 420 of the VTHS 400 and the sub around the second vertical axis while extending the multi-link arm 430 outwardly from the vertical support structure 402. Thereafter, at step 17816, the system 100 can align the sub with the well center opening and the previous drill pipe 206 (FIG. 45). At step 17818, the system 100 can extend the iron roughneck 600 into the well center area 508 around the well center and the drill pipe 206 (FIG. 45). Further, at step 17820, the system 100 can couple the sub to the previous drill pipe 206 using the gripper 482 on the arm 430 of the LTH 420 of the VTHS 400 (FIG. 46). The system 100 can extend the iron roughneck 600 in step 17818 while performing one or more of steps 17812, 17814, 17816, and 17820 with the VTHS 230.

Figure 48:
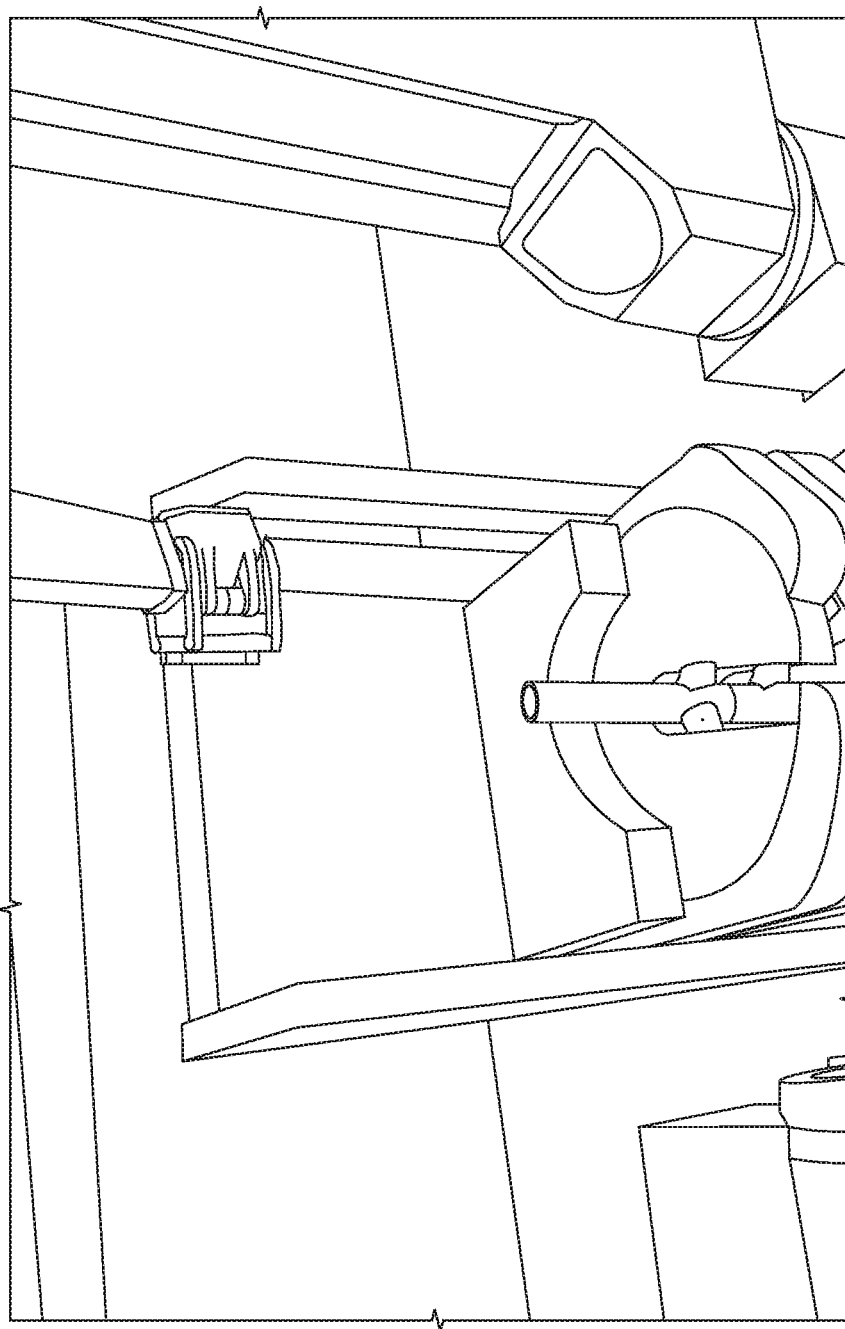
Figure 49:
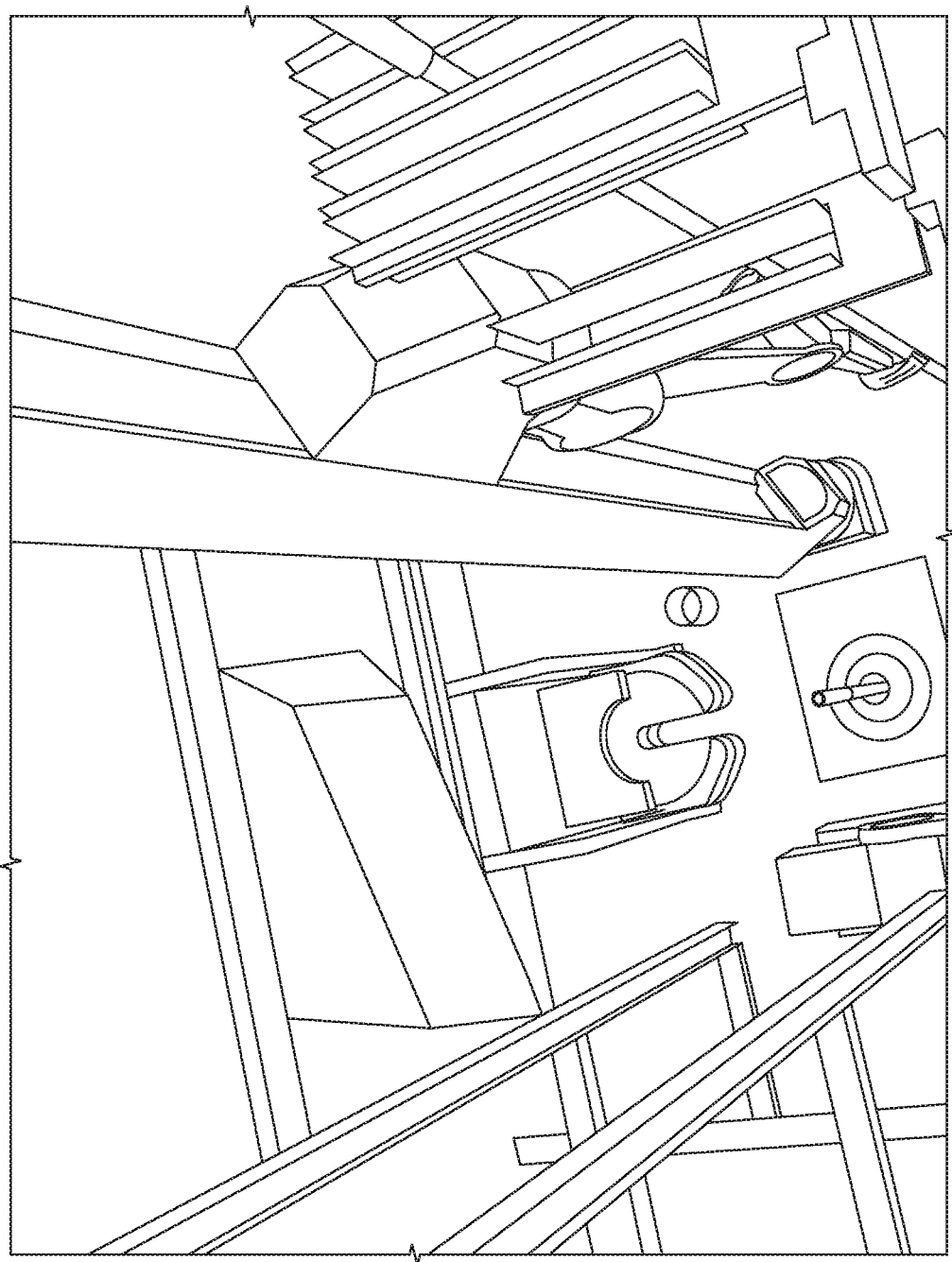

At step 17821, the system 100 can release the sub from the gripper 482 on the arm 430 of the LTH 420 of the VTHS 400. At step 17822, the system 100 can torque the drill pipe 206 using the iron roughneck 600 while releasing the gripper 482 on the arm 430 from the sub (FIG. 48). Moving to step 17824, the system 100 can return the iron roughneck 600 to a neutral or standby position (FIG. 49).

Figure 50:
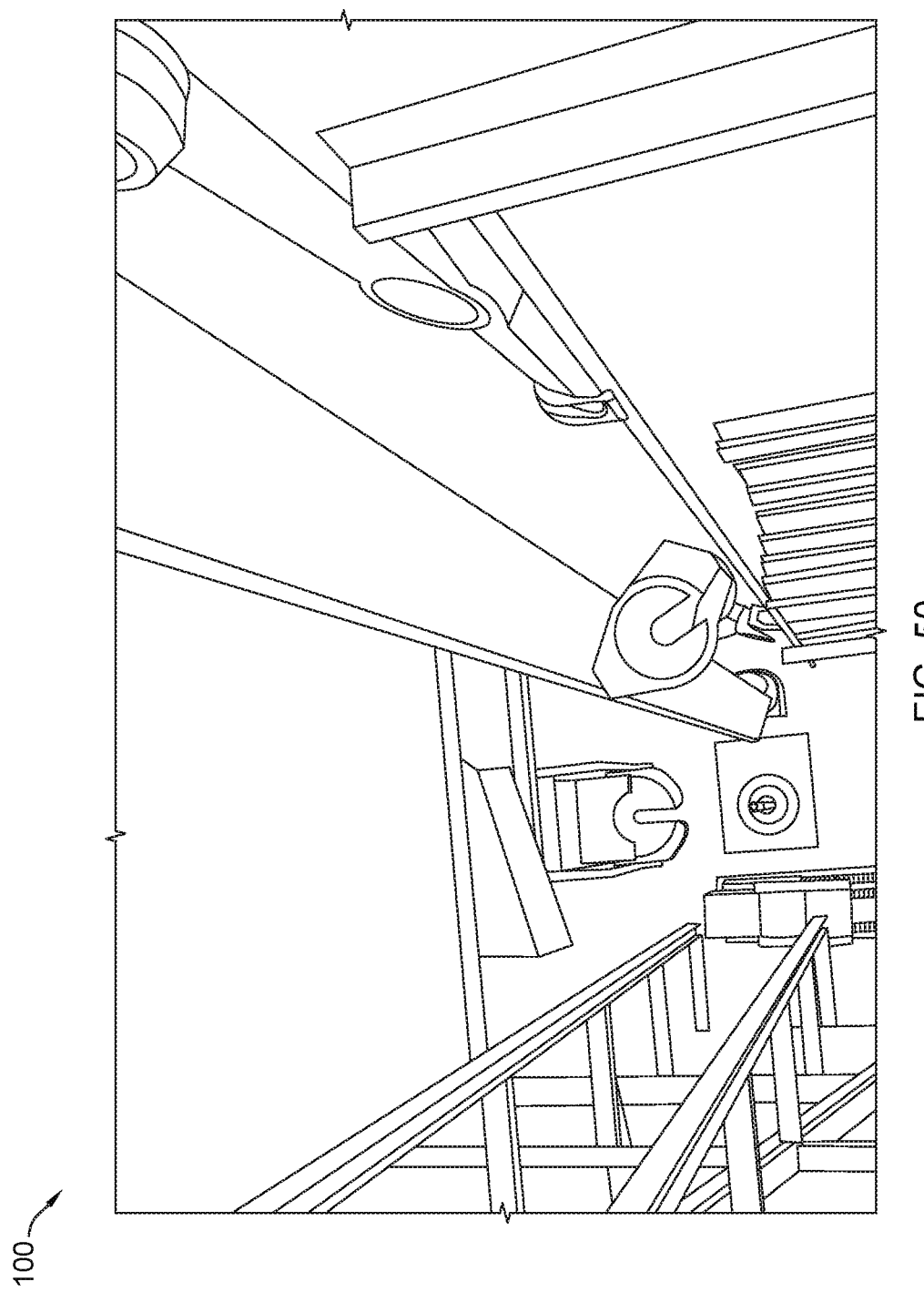
Figure 179:
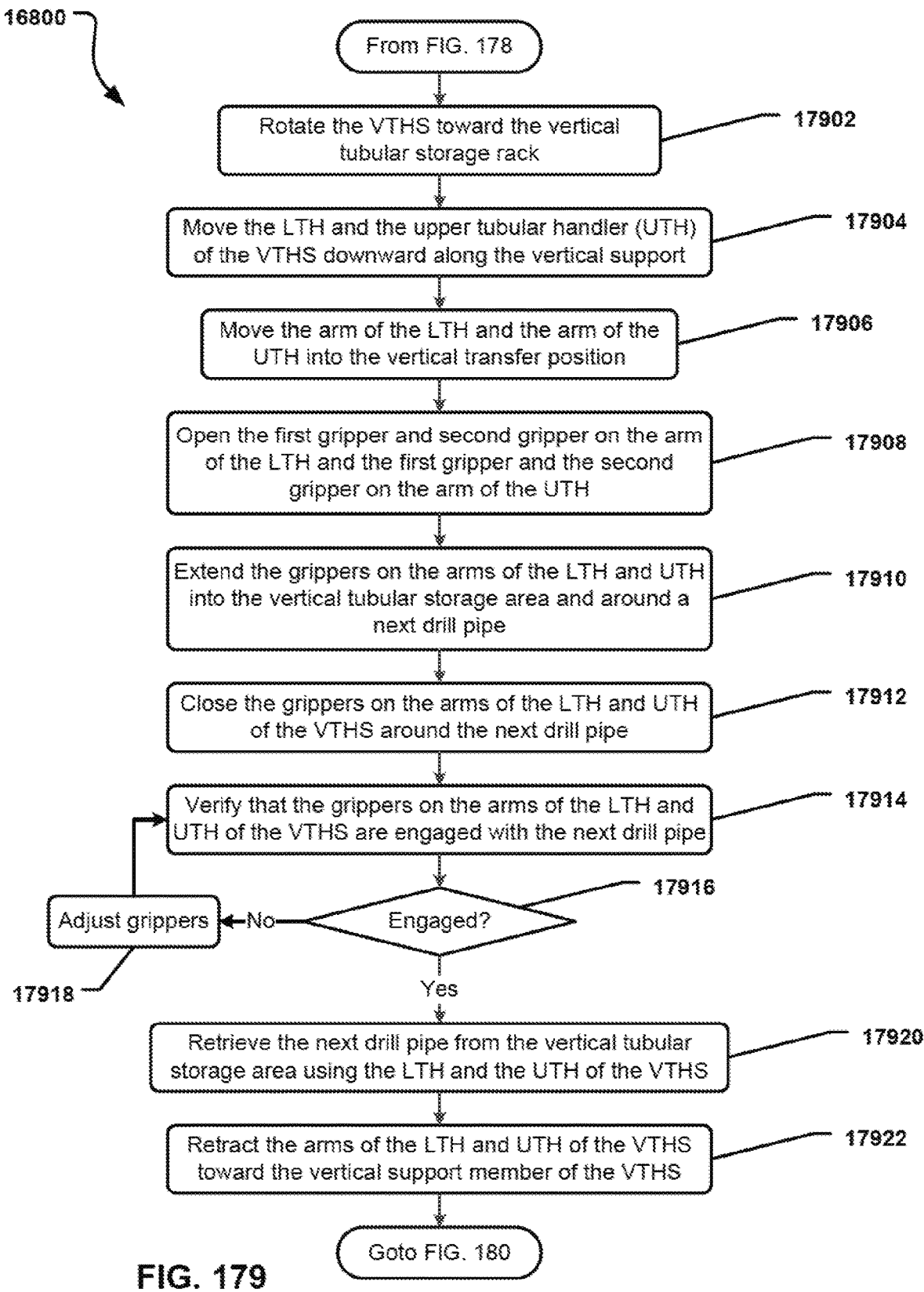

Proceeding to step 17902 of FIG. 179, while returning the iron roughneck 600 to the neutral position, in step 17824, the system 100 can rotate the VTHS 400 toward the vertical tubular storage rack 700. At step 17904, the system 100 can move the LTH 420 and the UTH 422 of the VTHS 400 upward along the vertical support. Further, at step 17906, the system 100 can move the arm 430 of the LTH 420 and the arm of the UTH 422 into the vertical transfer position. At step 17908, the system 100 can open the first gripper and second gripper on the arm 430 of the LTH 420 and the first gripper and the second gripper on the arm of the UTH 422. At step 17910, the system 100 can extend the grippers on the arms of the LTH 420 and UTH 422 into the vertical tubular storage area 200 and around a next drill pipe 206 (FIG. 49). Further, at step 17912, the system 100 can close the grippers 482, 484 on the arms 430 of the LTH 420 and UTH 422 of the VTHS 400 around the next drill pipe 206 (FIG. 49). At step 17914, the system 100 can verify that the grippers 482, 484 on the arms 430 of the LTH 420 and UTH 422 of the VTHS 400 are engaged with the next drill pipe 206. At step 17916, if the grippers 482, 484 are not engaged, the method 16800 can proceed to step 17918 and the system 100 can adjust the grippers 482, 484. Thereafter, the method 16800 can return to step 17914 and continue as described. At step 17916, if the grippers 482, 484 are engaged, the method 16800 can proceed to step 17920 and the system 100 can retrieve the next drill pipe 206 from the vertical tubular storage area 200 using the LTH 420 of the VTHS 400 (FIG. 49). Thereafter, at step 17922, the system 100 can retract the arms of the LTH 420 and UTH 422 of the VTHS 400 toward the vertical support member of the VTHS 400 (FIG. 50). Then, the method 16800 can move to FIG. 180.

Figure 51:
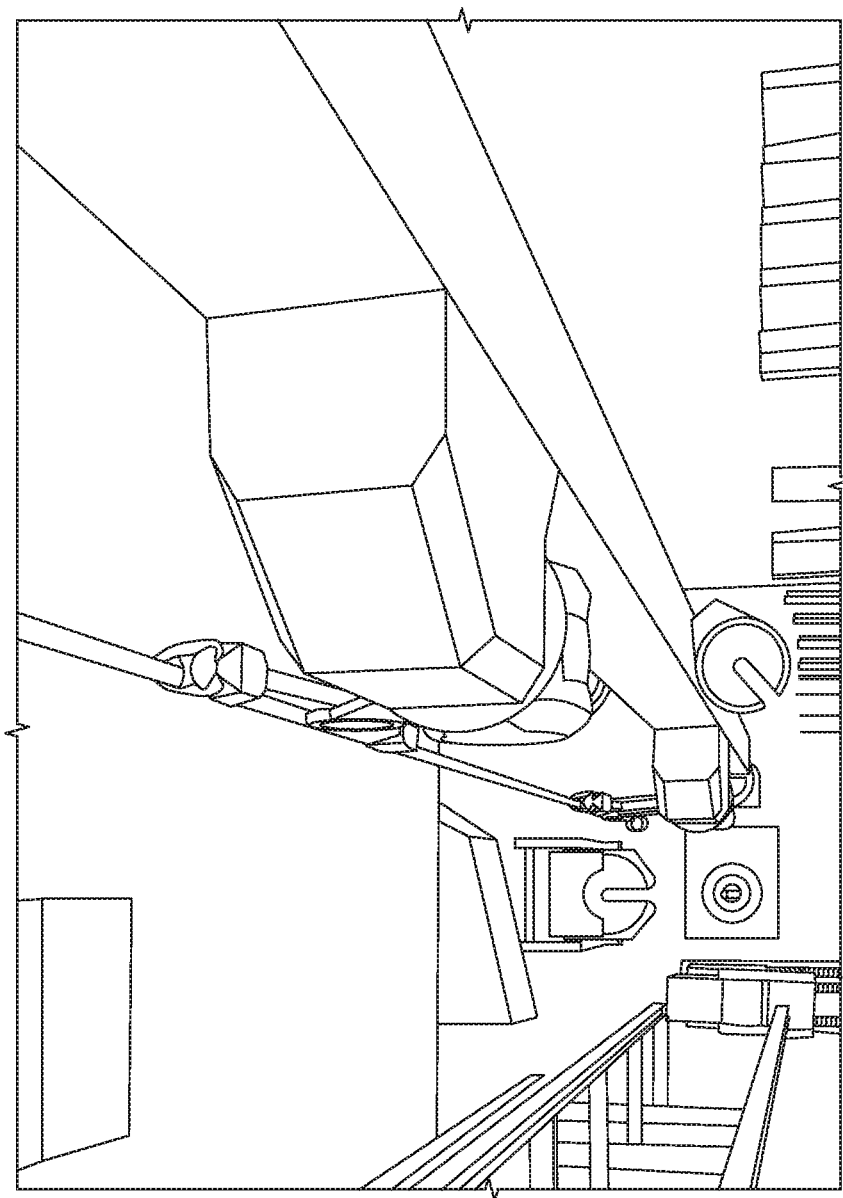
Figure 180:
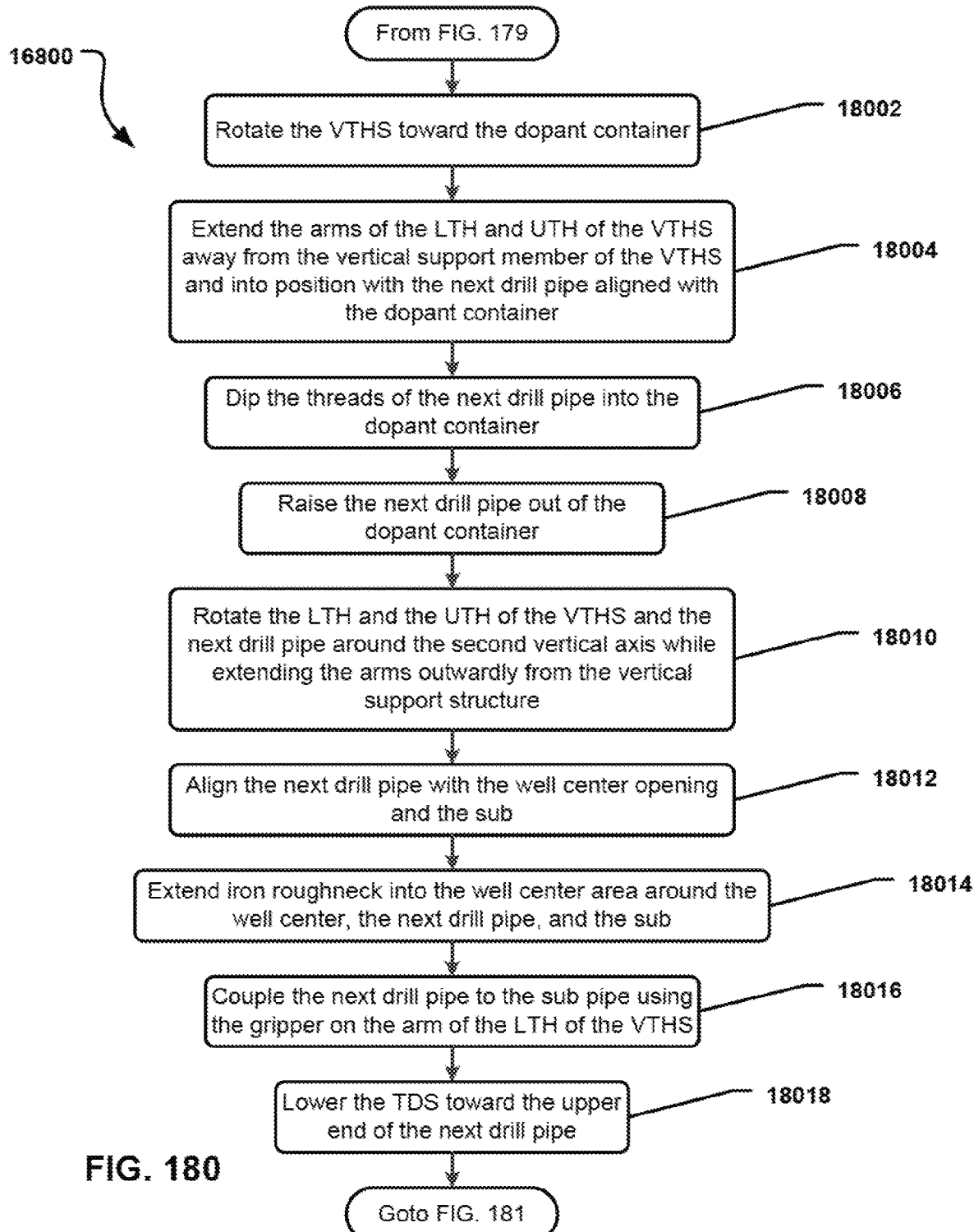
Figure 181:
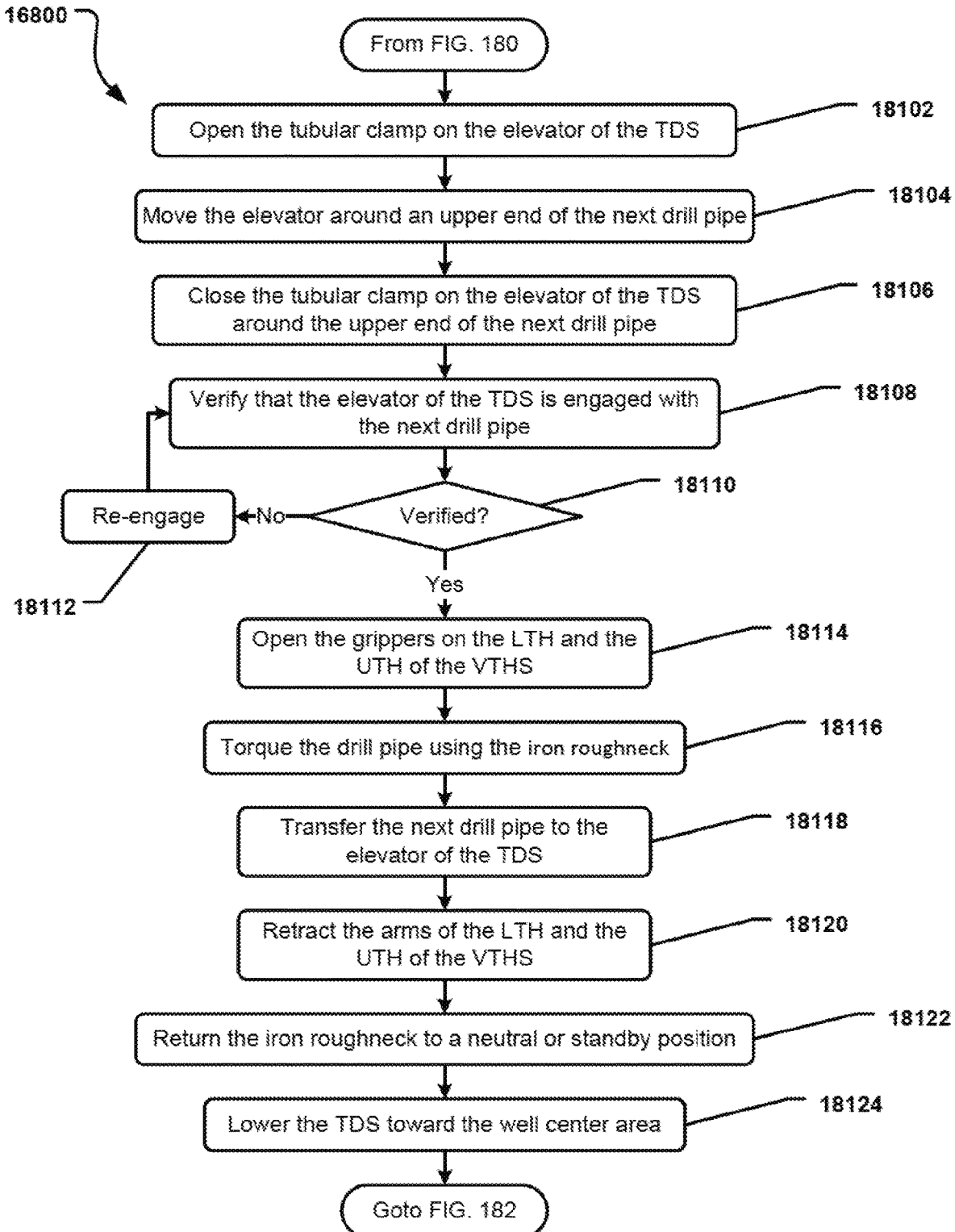
Figure 182:
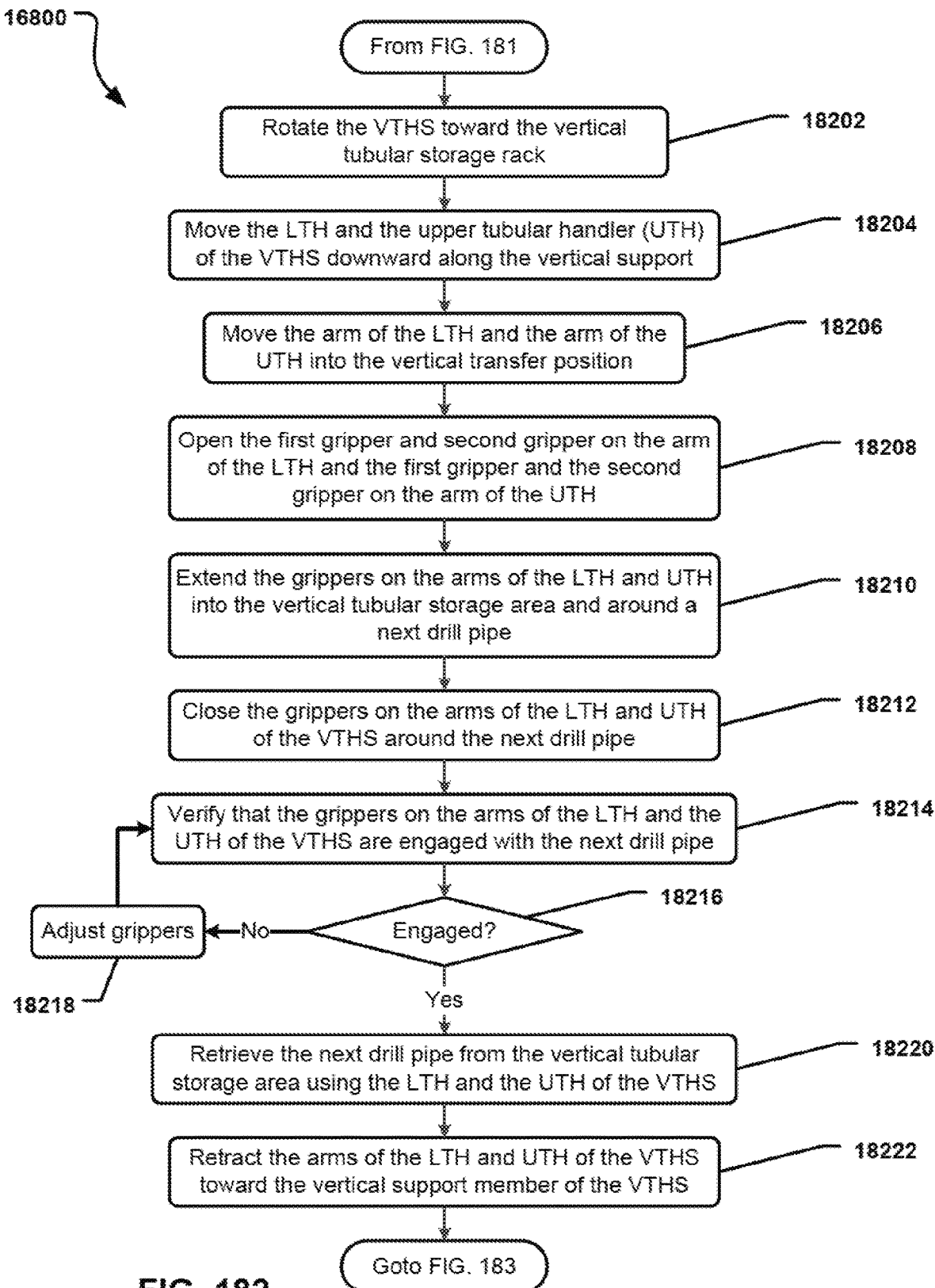
Figure 183:
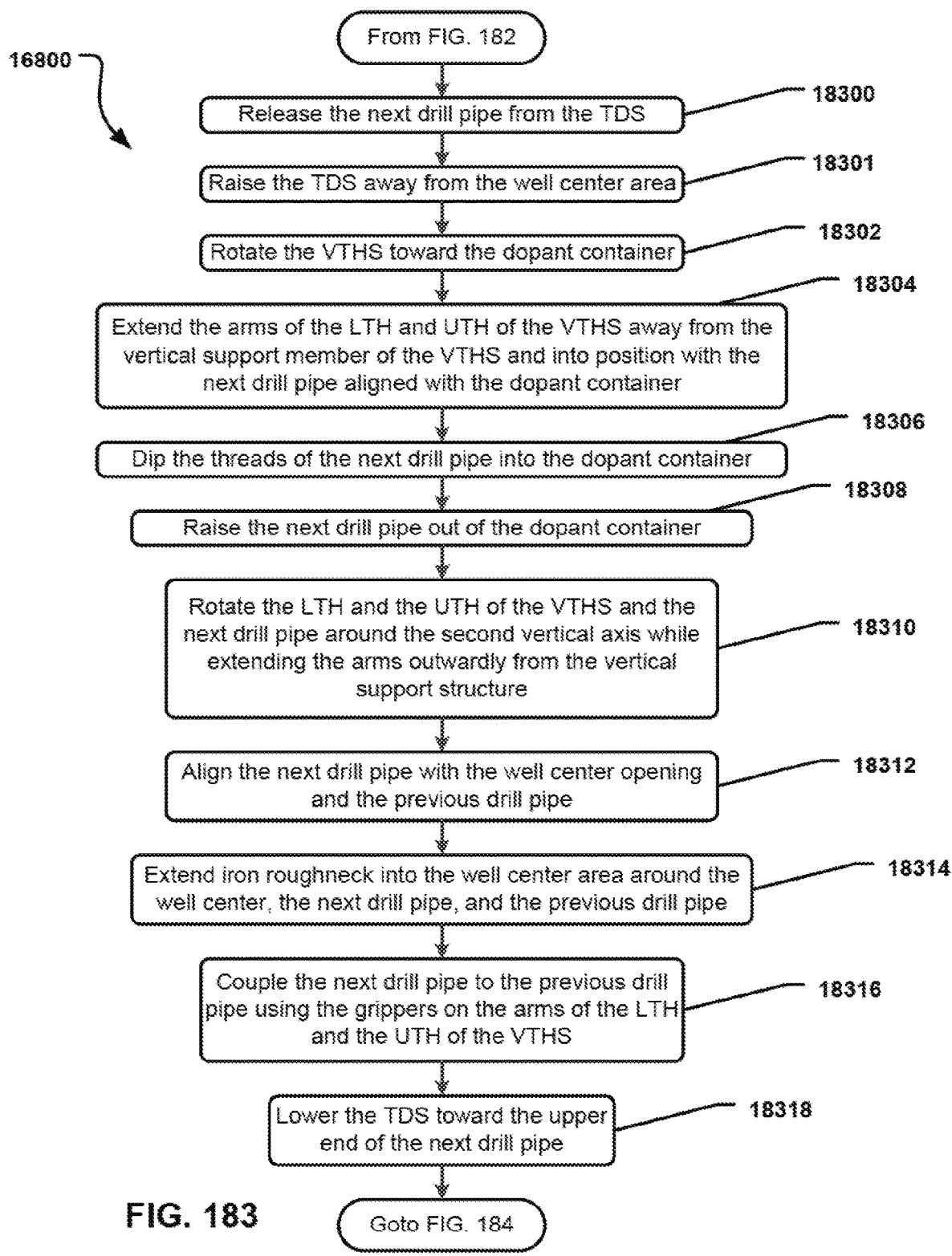

At step 18002 of FIG. 180, the system 100 can rotate the VTHS 400 toward the dopant container (FIG. 51). At step 18004, the system 100 can extend the arms of the LTH 420 and UTH 422 of the VTHS 400 away from the vertical support member of the VTHS 400 and into position with the next drill pipe 206 aligned with the dopant container (FIG. 51). Thereafter, at step 18006, the system 100 can dip the threads of the next drill pipe 206 into the dopant container. At step 18008, the system 100 can raise the next drill pipe 206 out of the dopant container. At step 18010, the system 100 can rotate the LTH 420 and the UTH 422 of the VTHS 400 and the next drill pipe 206 around the second vertical axis while extending the arms outwardly from the vertical support structure 402 (FIG. 52). Moreover, at step 18012, the system 100 can align the next drill pipe 206 with the well center opening and the previous drill pipe 206. At step 18014, the system 100 can extend the iron roughneck 600 into the well center area 508 around the well center, the next drill pipe 206, and the previous drill pipe 206 (FIG. 52). At step 18016, the system 100 can couple the next drill pipe 206 to the previous drill pipe 206 using the gripper on the arm 430 of the LTH 420 of the VTHS 400. The system 100 can extend the iron roughneck 600 in step 18014 while performing one or more of steps 18008, 18010, 18012, and 18016 with the VTHS 230. At step 18018, the system 100 can lower the TDS 800 toward the upper end of the next drill pipe 206. Then, the method 16800 can proceed to FIG. 181.

Figure 53:
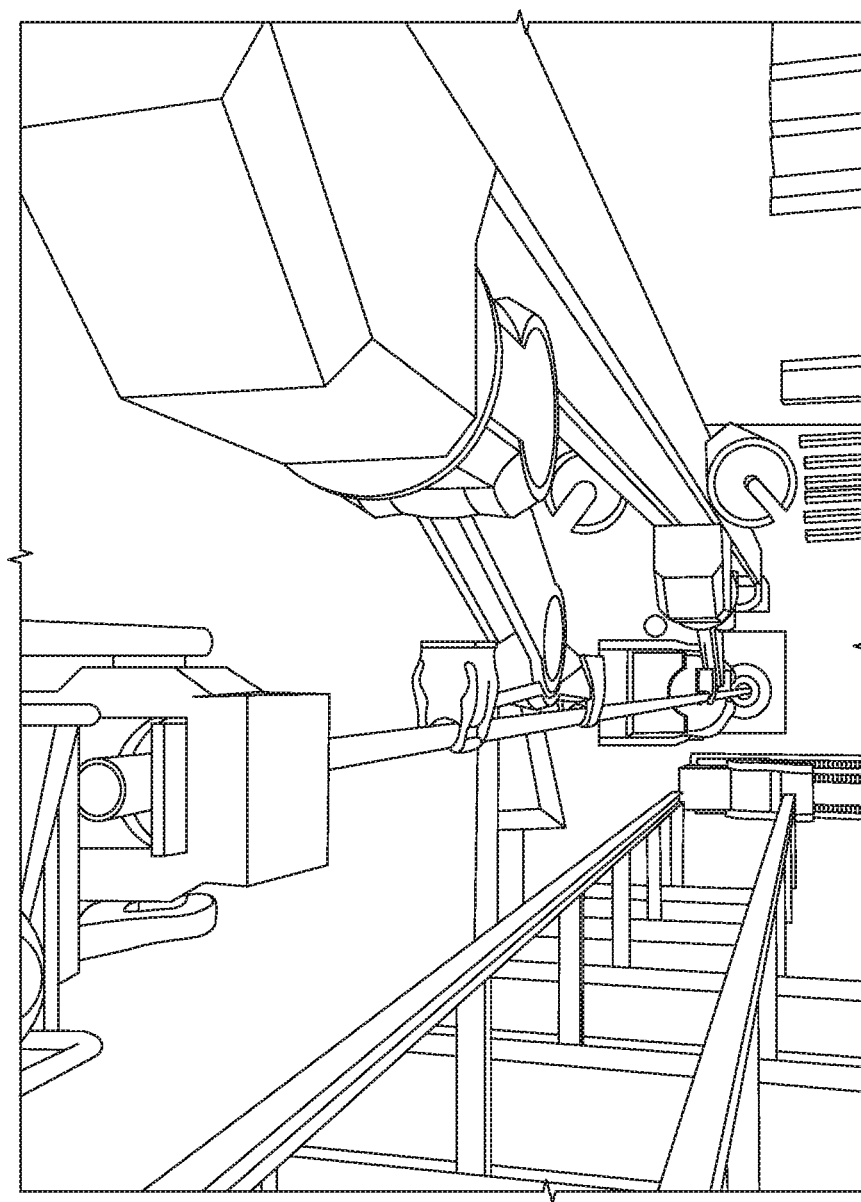
Figure 54:
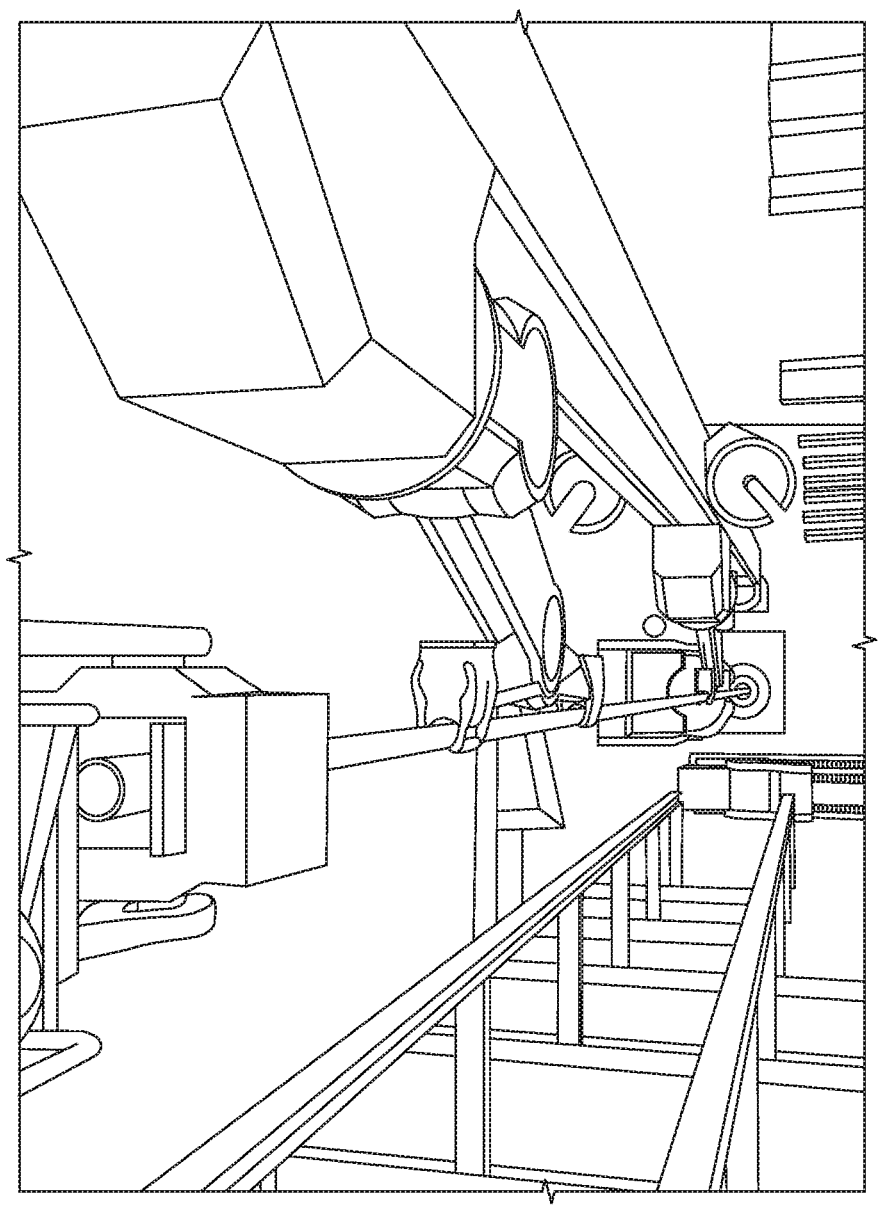

At step 18102, the system 100 can open the tubular clamp on the elevator 850 of the TDS 800 (FIG. 53). Then, at step 18104, the system 100 can move the elevator 850 around an upper end of the BHA 210 (FIG. 53). At step 18106, the system 100 can close the tubular clamp on the elevator 850 of the TDS 800 around the upper end of the next drill pipe 206 (FIG. 54). At step 18108, the system 100 can verify that the elevator 850 of the TDS 800 is engaged with the next drill pipe 206. As step 18110, if the elevator 850 is not engaged with the next drill pipe 206, the method 16800 can move to step 18112 and the system 100 can re-engaged the elevator 850 with the next drill pipe 206. The method 16800 may then return to step 18108 and continue as described herein. It is to be understood that the system 100 can perform one or more of steps 18018 through 18112 with the TDS 800 while performing one or more of steps 18008 through 18016 with the VTHS 400 and the iron roughneck 600.

Figure 55:
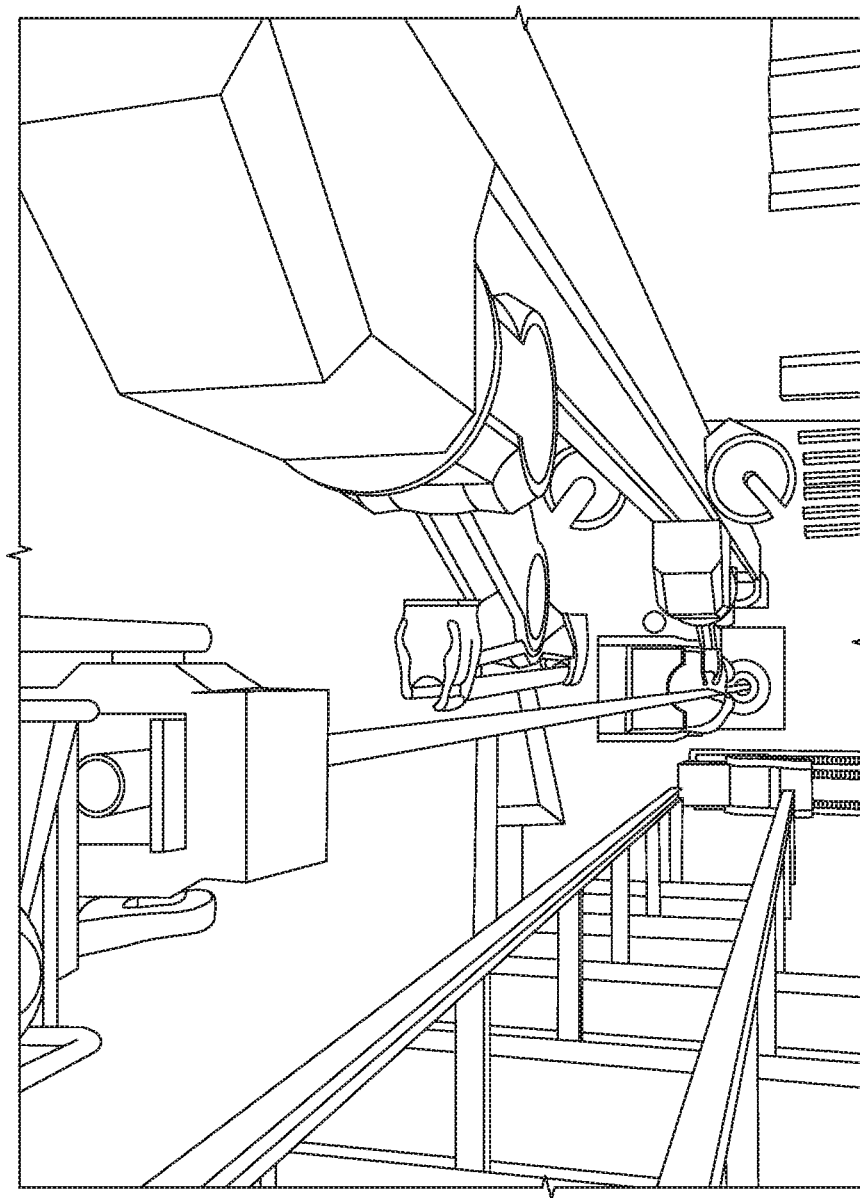
Figure 56:
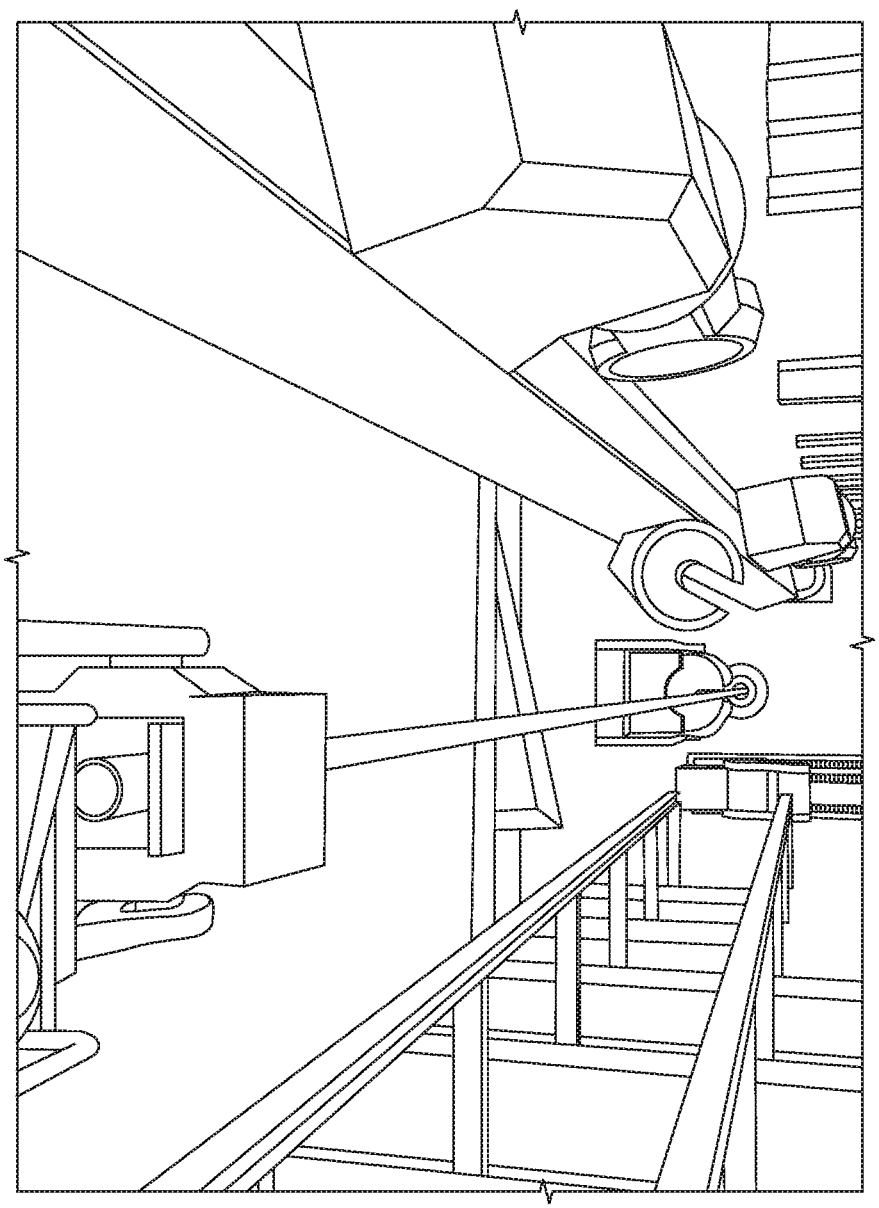
Figure 57:
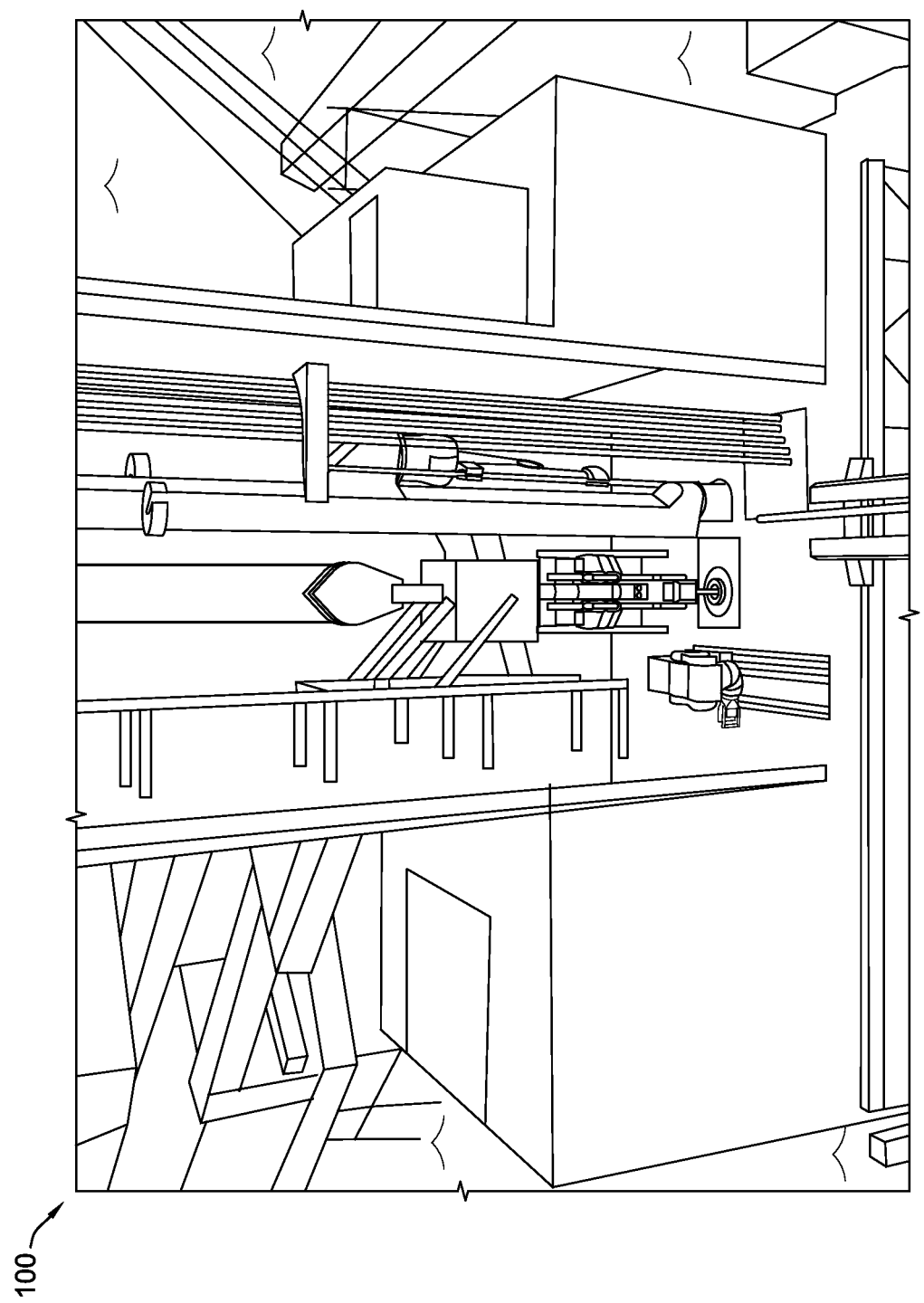

Returning to step 18110, if the elevator 850 is engaged with the next drill pipe 206, the method 16800 may continue to step 18114 and the system 100 can open the grippers 482, 484 on the LTH 420 and the UTH 422 of the VTHS 400 (FIG. 55). At step 18116, the system 100 can torque the drill pipe 206 using the iron roughneck 600 (FIG. 55) at essentially the same time as the system 100 performs step 18114. As step 18118, the system 100 can transfer the next drill pipe 206 to the elevator 850 of the TDS 800 (FIG. 55). As step 18120, the system 100 can retract the arms of the LTH 420 and the UTH 422 of the VTHS 400 (FIG. 55) and at essentially the same time, at step 18122, the system 100 can return the iron roughneck 600 to a neutral or standby position (FIG. 56). At step 18124, the system 100 can lower the TDS 800 toward the well center area 508 (FIG. 57).

Figure 58:
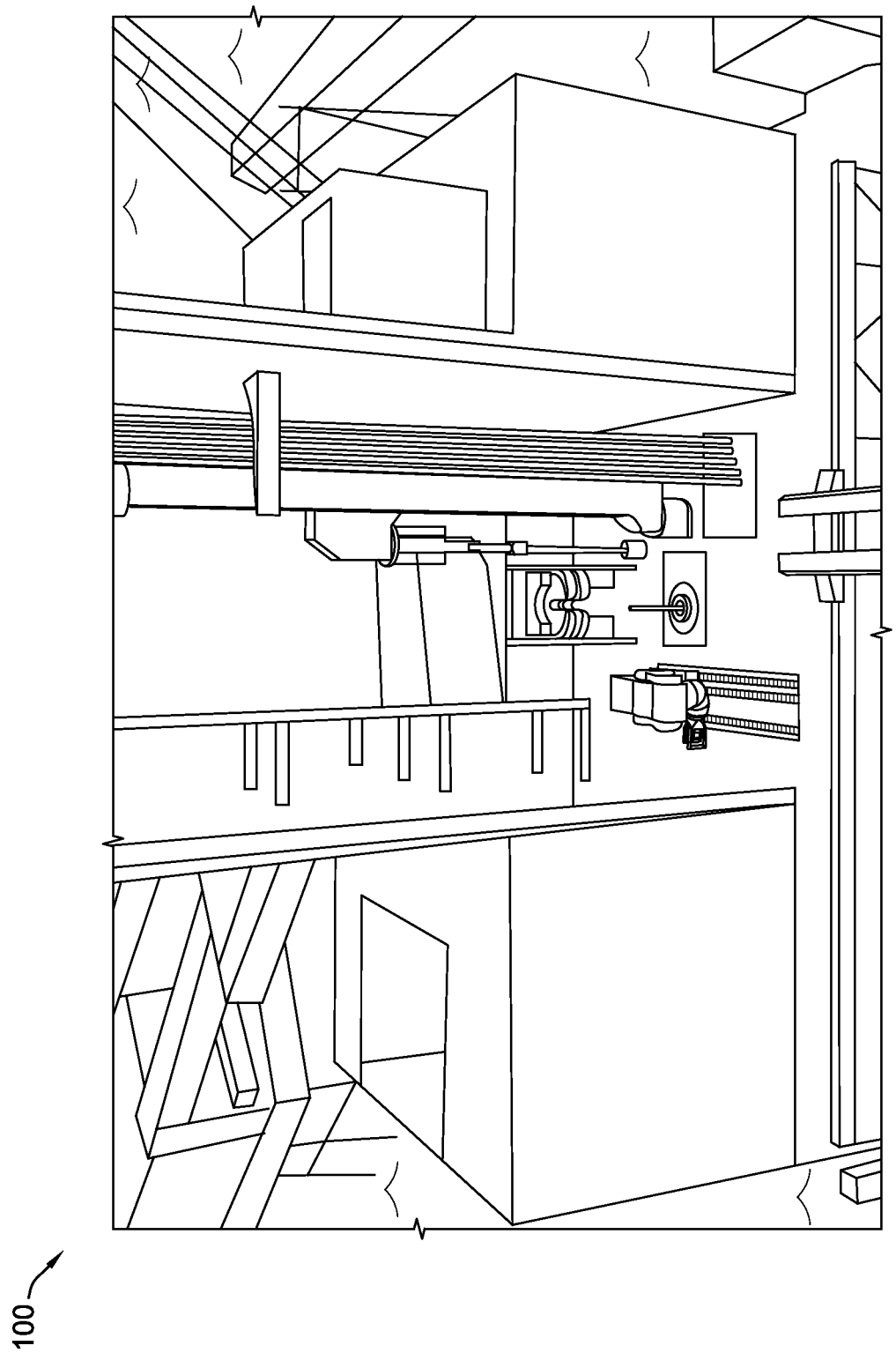

While lowering the TDS 800, at step 18124, the system 100 can perform one or more of steps 18202 through 18222. Specifically, at step 18202 of FIG. 182, the system 100 can rotate the VTHS 400 toward the vertical tubular storage rack 702 (FIG. 58). At step 18204, the system 100 can move the LTH 420 and the upper tubular handler (UTH 422) of the VTHS 400 upward along the vertical support. At step 18206, the system 100 can move the arm 430 of the LTH 420 and the arm of the UTH 422 into the vertical transfer position. At step 18208, the system 100 can open the first gripper 482 and second gripper 484 on the arm 430 of the LTH 420 and the first gripper 482 and the second gripper 484 on the arm of the UTH 422. At step 18210, the system 100 can extend the grippers on the arms of the LTH 420 and UTH 422 into the vertical tubular storage area 200 and around a next drill pipe 206. Further, at step 18212, the system 100 can close the grippers on the arms of the LTH 420 and UTH 422 of the VTHS 400 around the next drill pipe 206. At step 18214, the system 100 can verify that the grippers 482, 484 on the arms 430 of the LTH 420 and UTH 422 of the VTHS 400 are engaged with the next drill pipe 206. At step 18216, if the grippers 482, 484 are not engaged with the next drill pipe 206, the method 16800 can proceed to step 18218 and the system 100 can adjust the grippers 482, 484. The method 16800 can then return to step 18214 and continue as described herein.

Returning to step 18216, if the grippers 482, 484 are engaged with the next drill pipe 206, the method can proceed to step 18220 and the system 100 can retrieve the next drill pipe 206 from the vertical tubular storage area 200 using the LTH 420 of the VTHS 400. At step 18222, the system 100 can retract the arms of the LTH 420 and UTH 422 of the VTHS 400 toward the vertical support member of the VTHS 400. The method 16800 may then proceed to FIG. 183.

Figure 59:
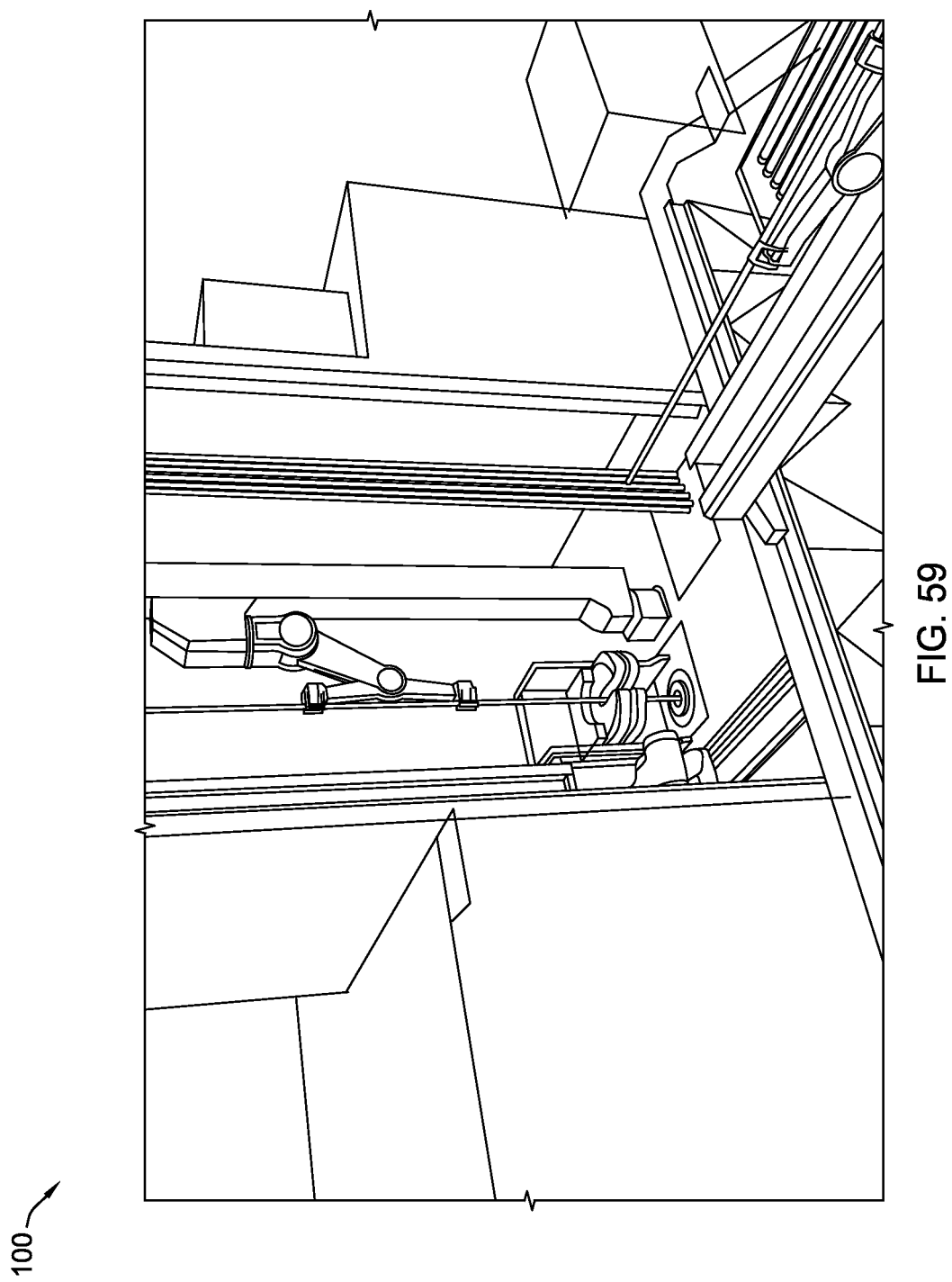

At step 18300, the system 100 can release the next drill pipe from the TDS 800. Further, at step 18301, the system 100 can raise the TDS 800 away from the well center area 508. As the system 100 raises the TDS 800, the system 100 can perform one or more of steps 18302 through 18312 with the VTHS 400. Specifically, at step 18302, the system 100 can rotate the VTHS 400 toward the dopant container (FIG. 58). At step 18304, the system 100 can extend the arms of the LTH 420 and UTH 422 of the VTHS 400 away from the vertical support member of the VTHS 400 and into position with the next drill pipe 206 aligned with the dopant container (FIG. 58). At step 18306, the system 100 can dip the threads of the next drill pipe 206 into the dopant container. At step 18308, the system 100 can raise the next drill pipe 206 out of the dopant container. At step 18310, the system 100 can rotate the LTH 420 and the UTH 422 of the VTHS 400 and the next drill pipe 206 around the second vertical axis while extending the arms outwardly from the vertical support structure 402 (FIG. 59). At step 18312, the system 100 can align the next drill pipe 206 with the well center opening and the previous drill pipe 206 (FIG. 59). At step 18314, the system 100 can extend the iron roughneck 600 into the well center area 508 around the well center, the next drill pipe 206, and the previous drill pipe 206 (FIG. 59). The system 100 can extend the iron roughneck 600, at step 18314, while performing steps 19310 and 18312 with the VTHS 400. At step 18316, the system 100 can couple the next drill pipe 206 to the previous drill pipe 206 using the grippers 482, 484 on the arms 430 of the LTH 420 and the UTH 422 of the VTHS 400 (FIG. 59). While performing step 18316 with the VTHS 400, the system 100 can also perform one or more of steps 18318 through 18412. At step 18318, the system 100 can lower the TDS 800 toward the upper end of the next drill pipe 206.

Figure 184:
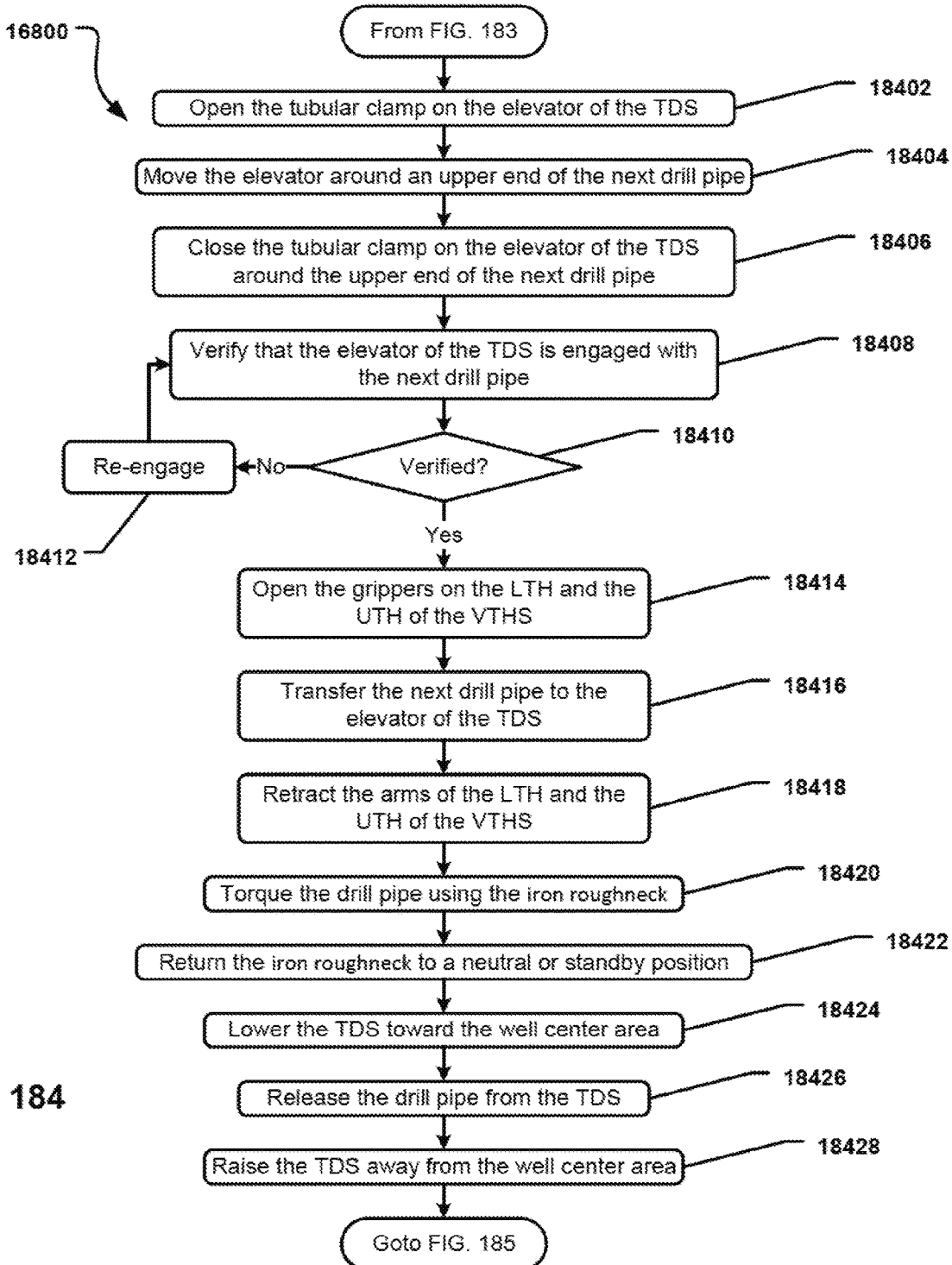
Figure 185:
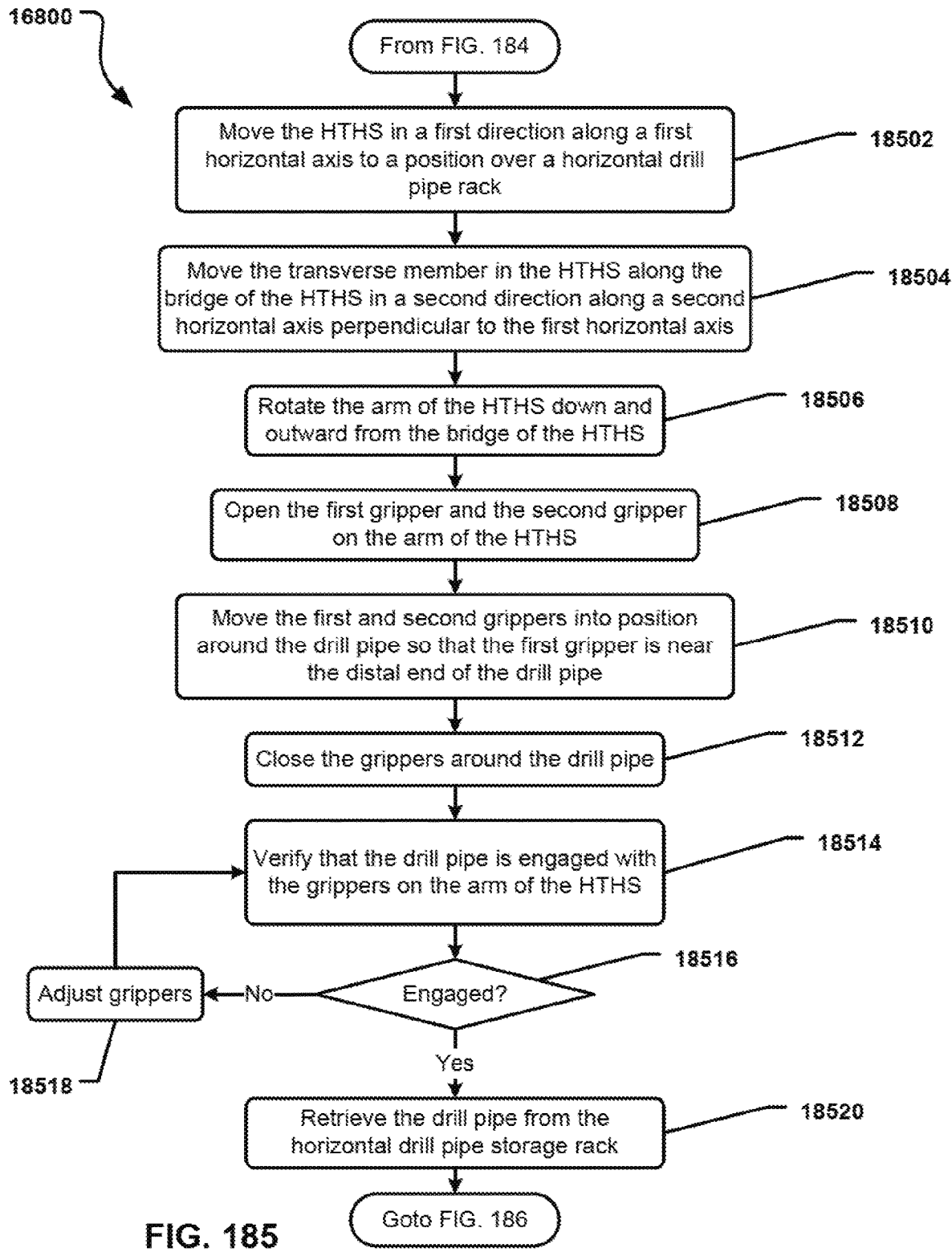
Figure 186:
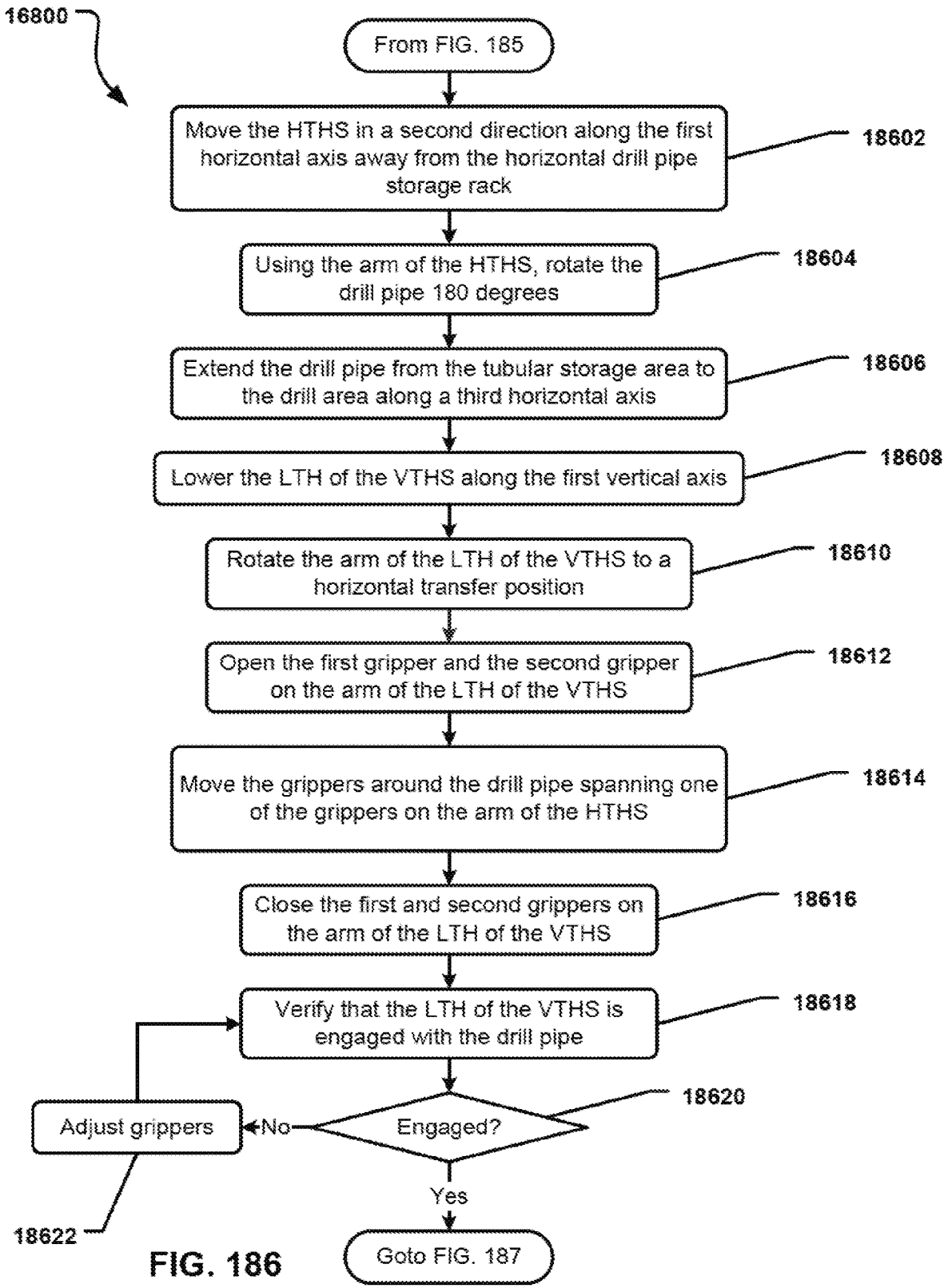
Figure 187:
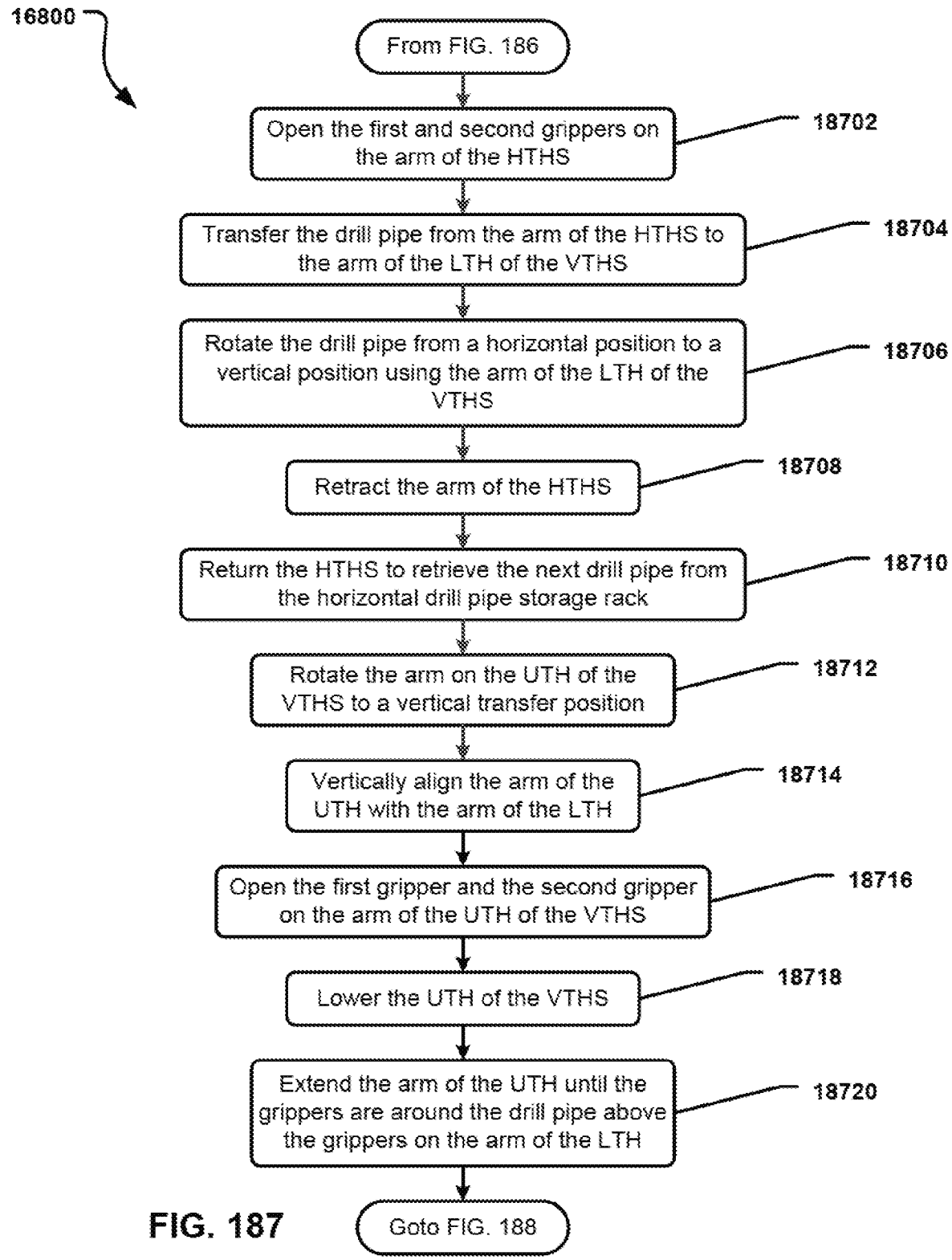

Proceeding to step 18402 of FIG. 184, the system 100 can open the tubular clamp on the elevator 850 of the TDS 800. At step 18404, the system 100 can move the elevator 850 around an upper end of the next drill pipe 210. At step 18406, the system 100 can close the tubular clamp on the elevator 850 of the TDS 800 around the upper end of the next drill pipe 206. Further, at step 18408, the system 100 can verify that the elevator 850 of the TDS 800 is engaged with the next drill pipe 206. At step 18410, if the system 100 verifies that the elevator 850 of the TDS 800 is not engaged with the next drill pipe 206, the method 16800 can proceed to step 18412 and the system 100 can re-engage the elevator 850 of the TDS 800 with the next drill pipe 206. The method 16800 may then return to step 18408 and continue as described. Returning to step 18410, if the system 100 verifies that the elevator 850 of the TDS 800 is engaged with the next drill pipe 206, the method 16800 may continue to step 18414 and the system 100 can open the grippers 482, 484 on the LTH 420 and the UTH 422 of the VTHS 400. At step 18416, the system 100 can transfer the next drill pipe 206 to the elevator 850 of the TDS 800. At step 18418, the system 100 can retract the arms of the LTH 420 and the UTH 422 of the VTHS 400. Then, at step 18420, the system 100 can torque the drill pipe 206 using the iron roughneck 600. At step 18422, the system 100 can return the iron roughneck 600 to a neutral or standby position. Moreover, at step 18424, the system 100 can lower the TDS 800 toward the well center area 508. It can be appreciated that the system 100 can begin lowering the TDS 800 while returning the iron roughneck to the neutral position. At step 18426, the system 100 can release the drill pipe from the TDS. Further, at step 18428, the system 100 can raise the TDS away from the well center area.

While the system 100 performs steps 18424 through 18428, the system 100 can also perform one or more of steps 18502 through 18604. In particular, at step 18502 of FIG. 185, the system 100 can move the HTHS 230 in a first direction along a first horizontal axis to a position over a horizontal drill pipe 206 rack. At step 18504, the system 100 can move the transverse member 242 in the HTHS 230 along the bridge of the HTHS 230 in a second direction along a second horizontal axis perpendicular to the first horizontal axis. At step 18506, the system 100 can rotate the arm 244 of the HTHS 230 down and outward from the bridge of the HTHS 230. At step 18508, the system 100 can open the first gripper 280 and the second gripper 282 on the arm 244 of the HTHS 230. Further, at step 18510, the system 100 can move the first and second grippers 280, 282 into position around the drill pipe 206 so that the first gripper 280 is near the distal end of the drill pipe 206. At step 18512, the system 100 can close the grippers 280, 282 around the drill pipe 206. At step 18514, the system 100 can verify that the drill pipe 206 is engaged with the grippers 280, 282 on the arm 244 of the HTHS 230. At step 18516, if the drill pipe 206 is not engaged with the grippers 280, 282 on the arm 244 of the HTHS 230, the method 16800 can proceed to step 18518 and the system 100 can adjust the grippers 280, 282. Thereafter, the method 16800 can return to step 18514 and continue as described. Returning to step 18516, if the drill pipe 206 is engaged with the grippers 280, 282 on the arm 244 of the HTHS 230, the method 16800 can proceed to step 18520 and the system 100 can retrieve the drill pipe 206 from the horizontal drill pipe 206 storage rack. Then, the method 16800 can continue to step 18602 of FIG. 186.

At step 18602, the system 100 can move the HTHS 230 in a second direction along the first horizontal axis away from the horizontal drill pipe 206 storage rack. At step 18604, the system 100, using the arm 244 of the HTHS 230, can rotate the drill pipe 206 180 degrees.

Figure 60:
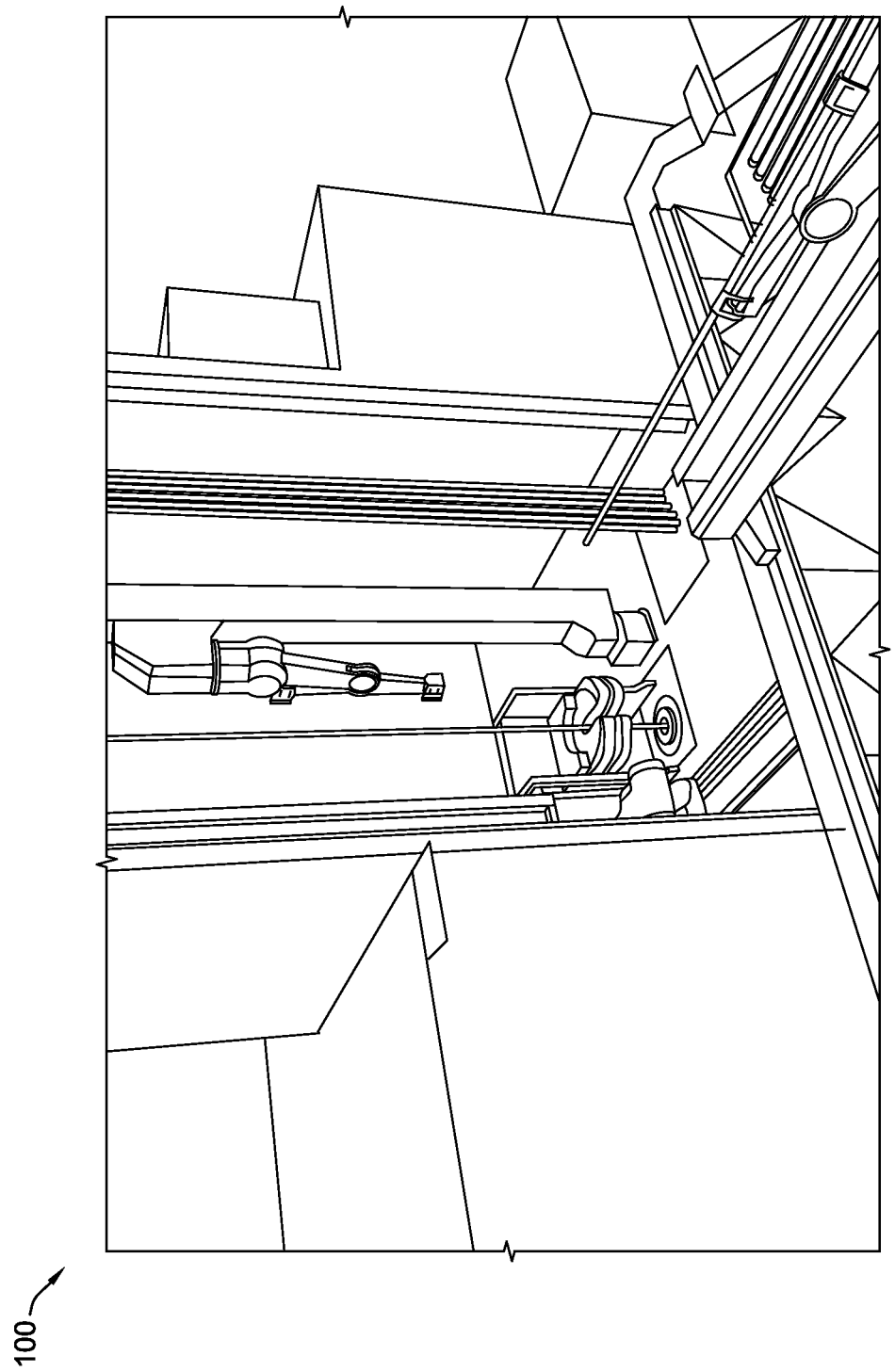
Figure 61:
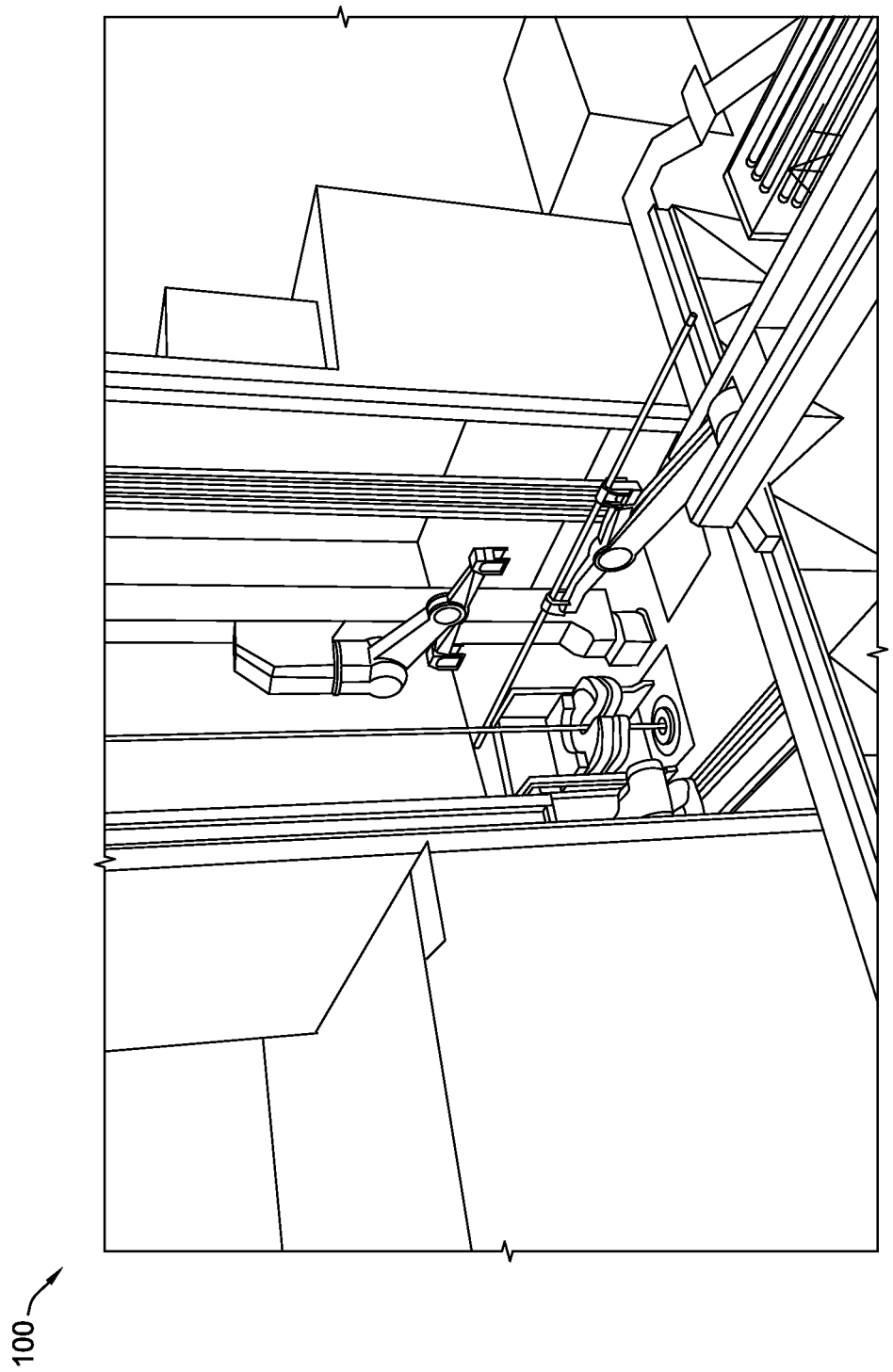
Figure 62:
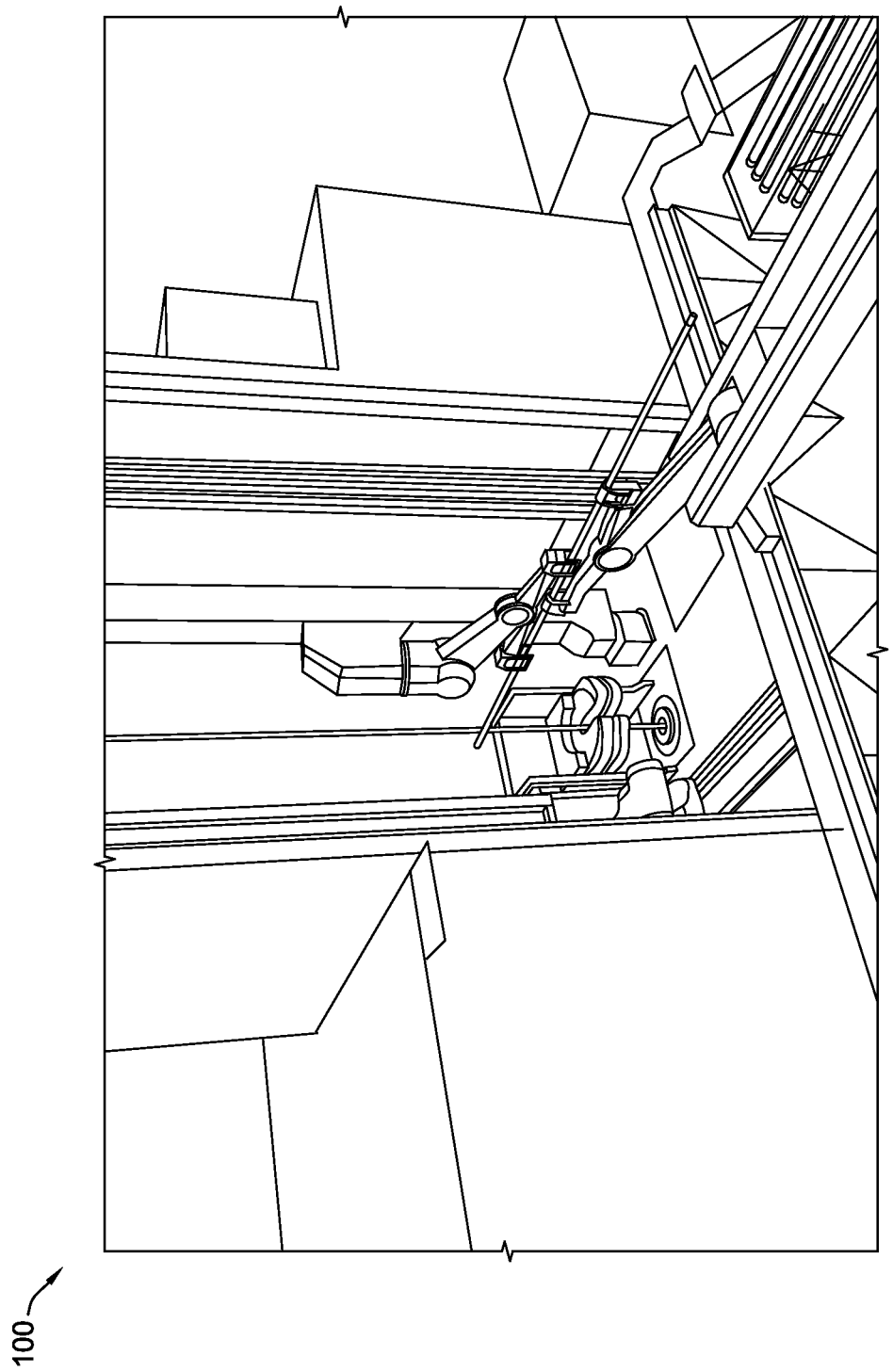

At step 18606, the system 100 can extend the drill pipe 206 from the tubular storage area 200 to the well bore area 300 along a third horizontal axis (FIG. 61). While performing step 18606 with the HTHS 230, the system 100 can perform one or more of steps 18606 through 18622. At step 18608, the system 100 can lower the LTH 420 of the VTHS 400 along the first vertical axis (FIG. 60). At step 18610, the system 100 can rotate the arm 430 of the LTH 420 of the VTHS 400 to a horizontal transfer position (FIG. 61). At step 18612, the system 100 can open the first gripper 482 and the second gripper 484 on the arm 430 of the LTH 420 of the VTHS 400 (FIG. 61). At step 18614, the system 100 can move the grippers 482, 484 around the drill pipe 206 spanning one of the grippers 280, 282 on the arm 244 of the HTHS 230 (FIG. 62). At step 18616, the system 100 can close the first and second grippers on the arm 430 of the LTH 420 of the VTHS 400. Further, at step 18618, the system 100 can verify that the LTH 420 of the VTHS 400 is engaged with the drill pipe 206. At step 18620, if the LTH 420 of the VTHS 400 is not engaged with the drill pipe 206, the method 16800 can proceed to step 18622 and the system 100 can adjust the grippers 482, 484. Then, the method 16800 can return to step 18618 and continue as described. Returning to step 18620, if the LTH 420 of the VTHS 400 is engaged with the drill pipe 206, the method 16800 can proceed to step 18702 of FIG. 187.

Figure 63:
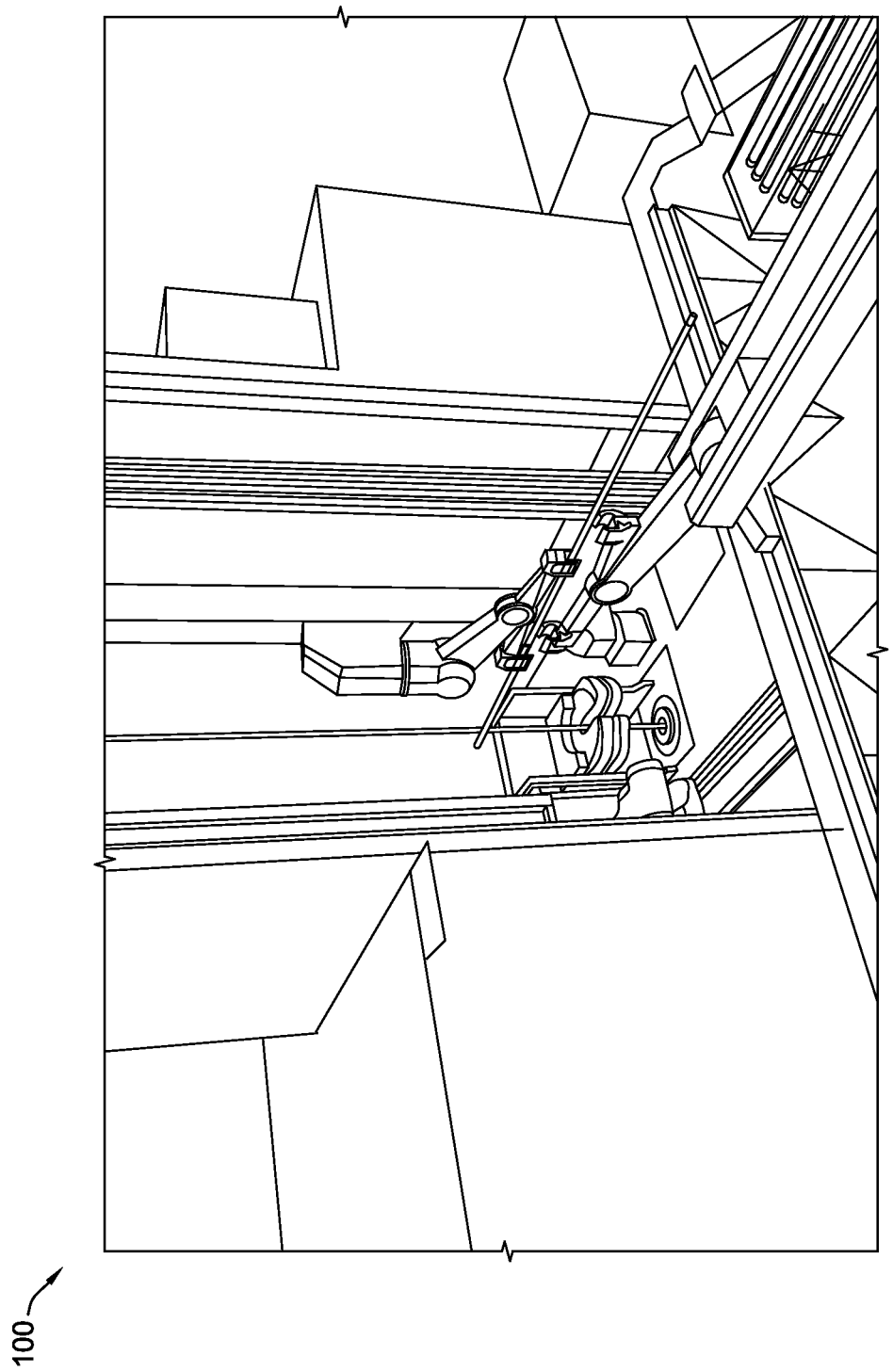
Figure 64:
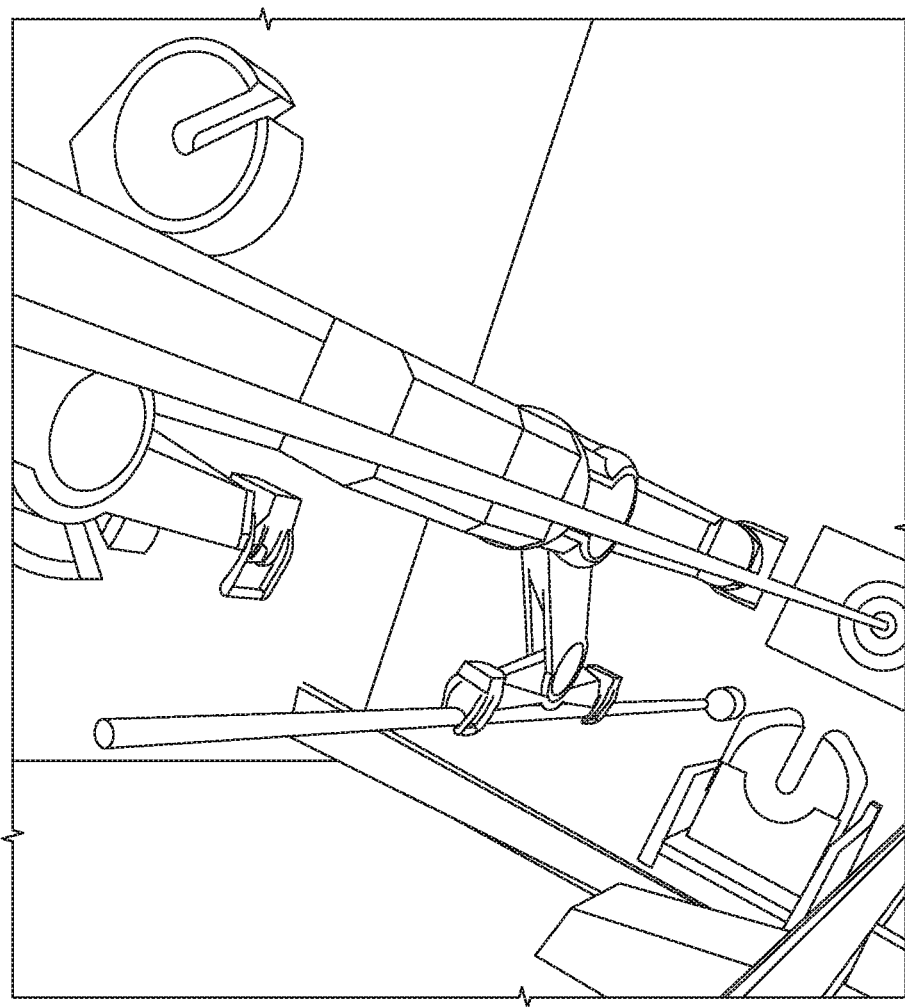
Figure 65:
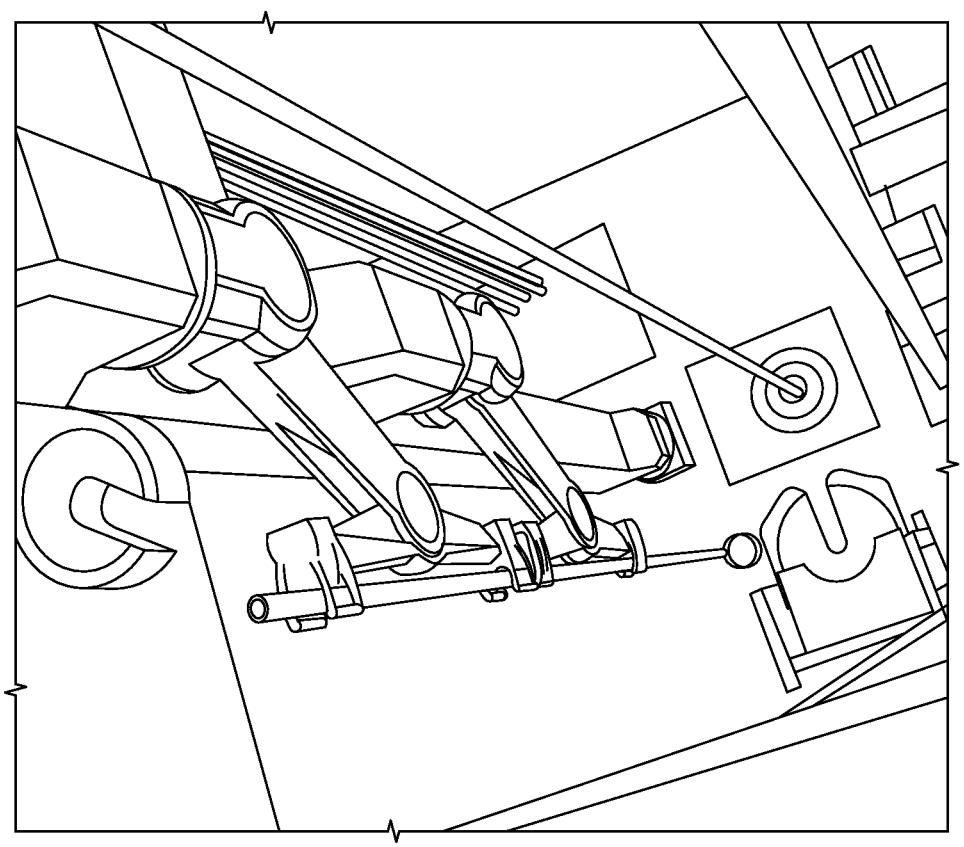

At step 18702, the system 100 can open the first and second grippers on the arm 244 of the HTHS 230 (FIG. 63). At step 18704, the system 100 can transfer the drill pipe 206 from the arm 244 of the HTHS 230 to the arm 430 of the LTH 420 of the VTHS 400. At step 18706, the system 100 can rotate the drill pipe 206 from a horizontal position to a vertical position using the arm 430 of the LTH 420 of the VTHS 400 (FIG. 64). While performing step 18706, the system 100 can also perform steps 18708 and 18710. At step 18708, the system 100 can retract the arm 244 of the HTHS 230. Further, at step 18710, the system 100 can return the HTHS 230 to retrieve the next drill pipe 206 from the horizontal drill pipe 206 storage rack. At step 18712, the system 100 can rotate the arm on the UTH 422 of the VTHS 400 to a vertical transfer position (FIG. 64). At step 18714, the system 100 can vertically align the arm of the UTH 422 with the arm 430 of the LTH 420. Moreover, at step 18716, the system 100 can open the first gripper and the second gripper on the arm of the UTH 422 of the VTHS 400. At step 18718, the system 100 can lower the UTH 422 of the VTHS 400 (FIG. 65). At step 18720, the system 100 can extend the arm of the UTH 422 until the grippers are around the drill pipe 206 above the grippers on the arm 430 of the LTH 420. The method 16800 can then proceed to FIG. 188.

Figure 66:
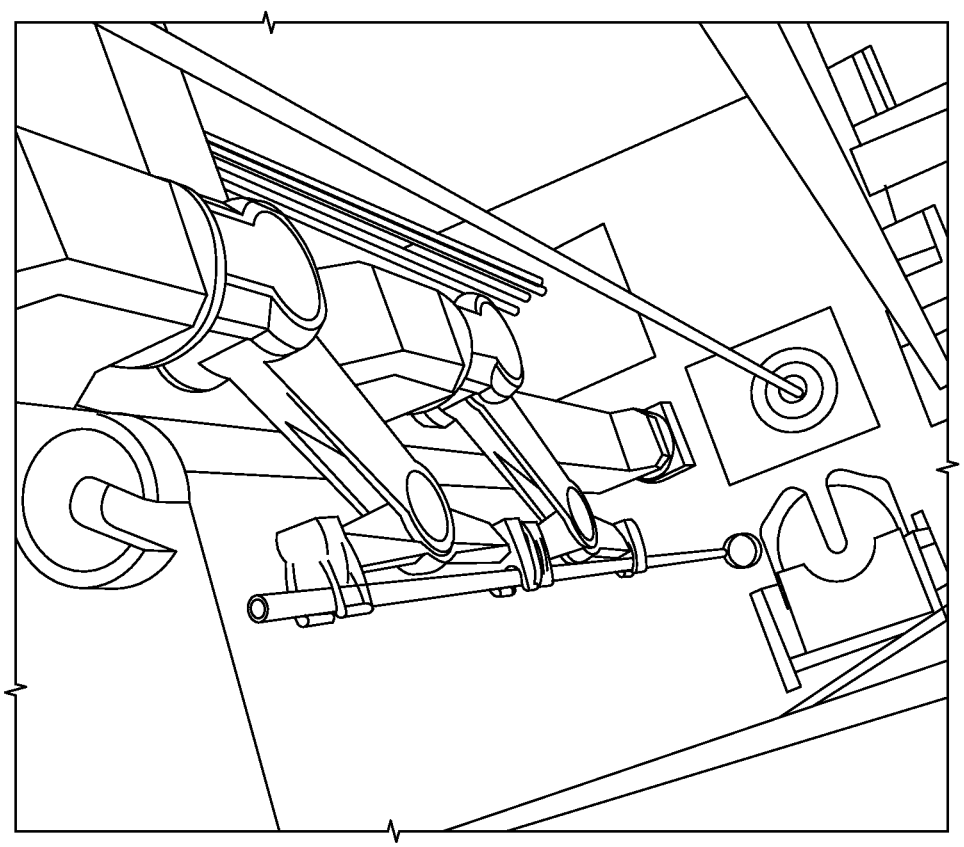
Figure 67:
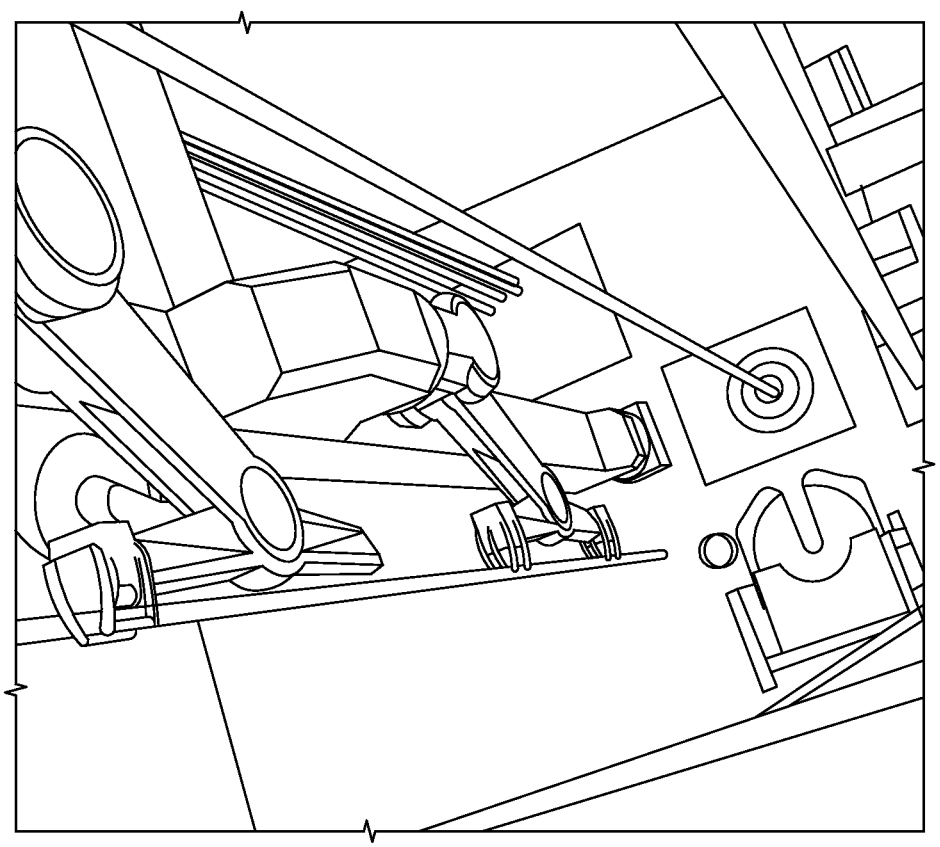
Figure 68:
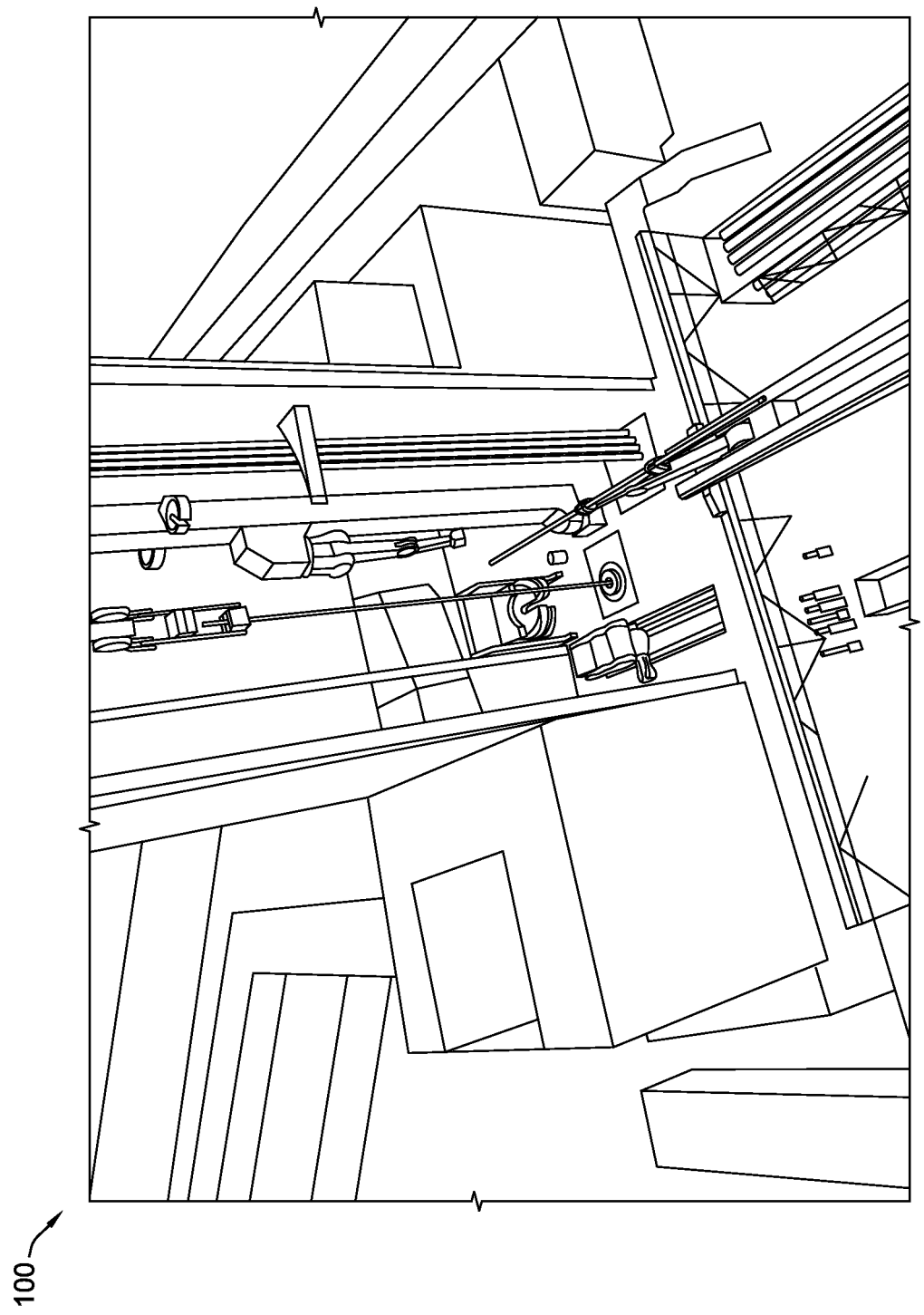
Figure 188:
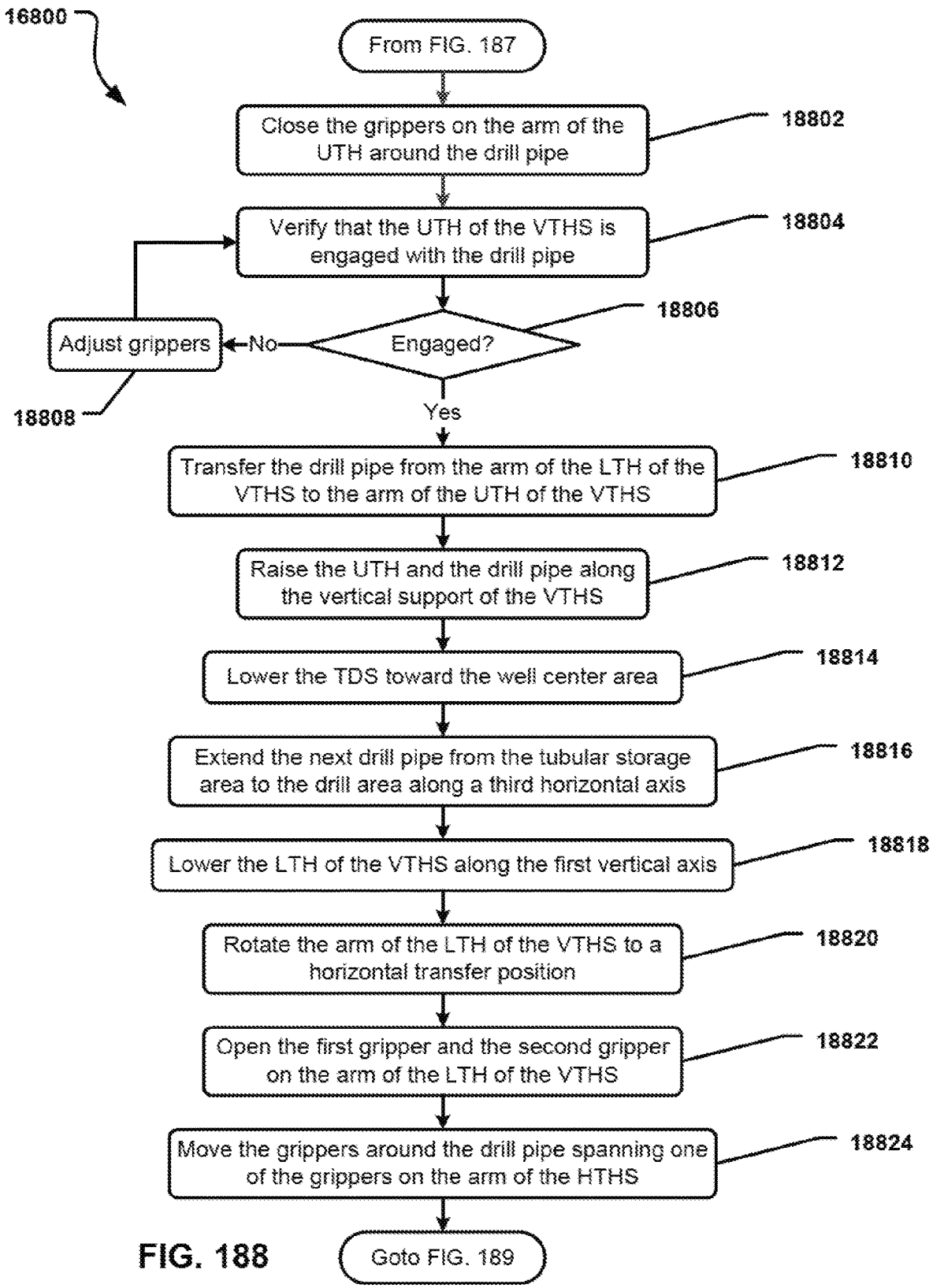

At step 18802 of FIG. 188, the system 100 can close the grippers on the arm of the UTH 422 around the drill pipe 206 (FIG. 66). At step 18804, the system 100 can verify that the UTH 422 of the VTHS 400 is engaged with the drill pipe 206. At step 18806, if the UTH 422 is not engaged with the drill pipe 206, the method 16800 can proceed to step 18808 and the system 100 can adjust the grippers 482, 484 on the UTH 422. Thereafter, the method 16800 can return to step 18804 and continue as described. On the other hand, at step 18806, if the UTH 422 is engaged with the drill pipe 206, the method 16800 can proceed to step 18810 and the system can transfer the drill pipe 206 from the arm 430 of the LTH 420 of the VTHS 400 to the arm of the UTH 422 of the VTHS 400. At step 18812, the system 100 can raise the UTH 422 and the drill pipe 206 along the vertical support of the VTHS 400 (FIG. 67). At step 18814, the system 100 can lower the TDS 800 toward the well center area 508 (FIG. 68).

Figure 69:
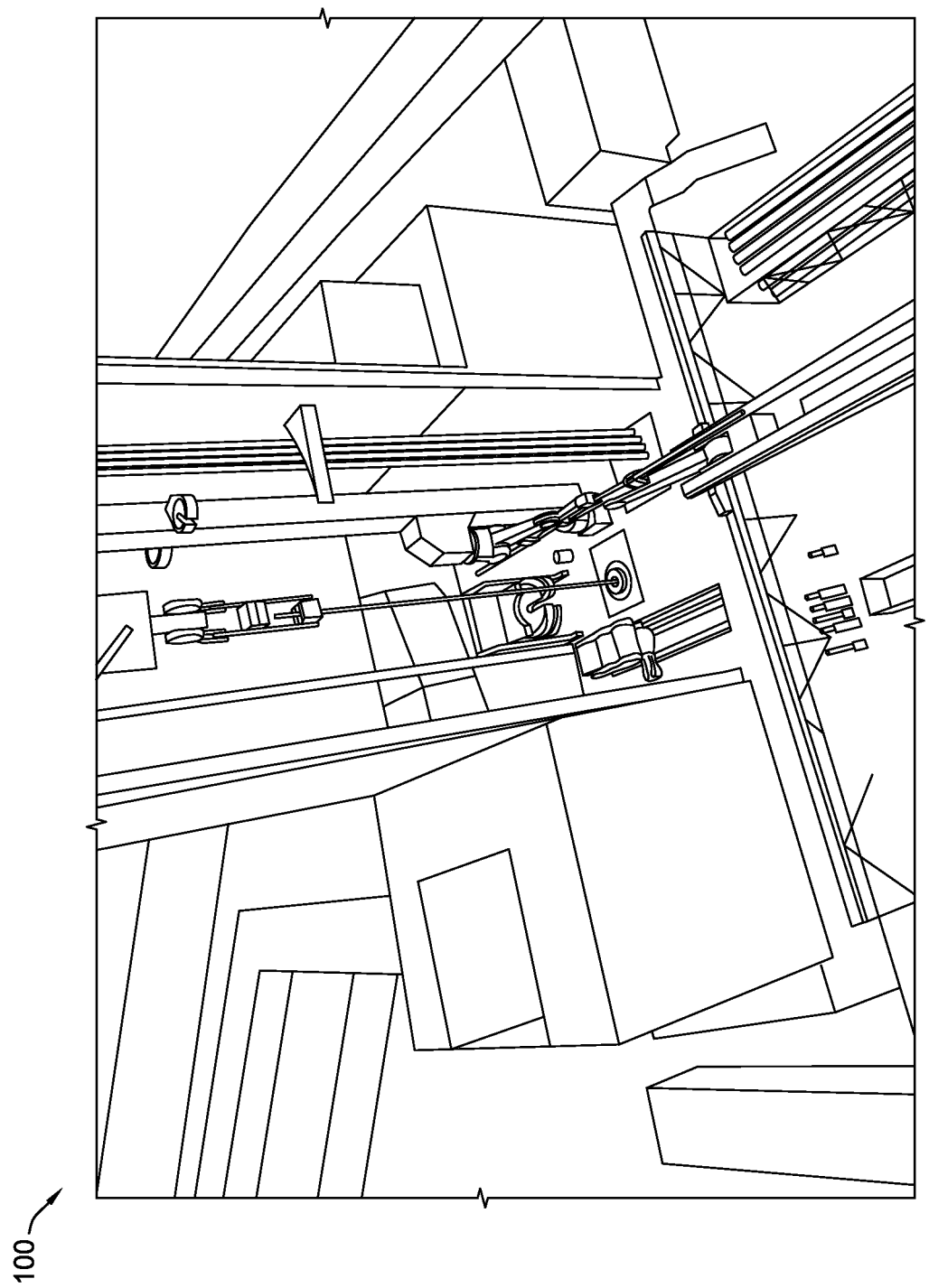

While the system 100 is lowering the TDS 800 at step 18814, the system 100 can perform one or more of steps 18816 through 18918. In particular, at step 18816, the system 100 can extend the next drill pipe 206 from the tubular storage area 200 to the well bore area 300 in along a third horizontal axis (FIG. 68). Further, at step 18818, the system 100 can lower the LTH 420 of the VTHS 400 along the first vertical axis (FIG. 68). At step 18820, the system 100 can rotate the arm 430 of the LTH 420 of the VTHS 400 to a horizontal transfer position (FIG. 69). At step 18822, the system 100 can open the first gripper and the second gripper on the arm 430 of the LTH 420 of the VTHS 400 (FIG. 69). At step 18824, the system 100 can move the grippers around the drill pipe 206 spanning one of the grippers on the arm 244 of the HTHS 230.

Figure 70:
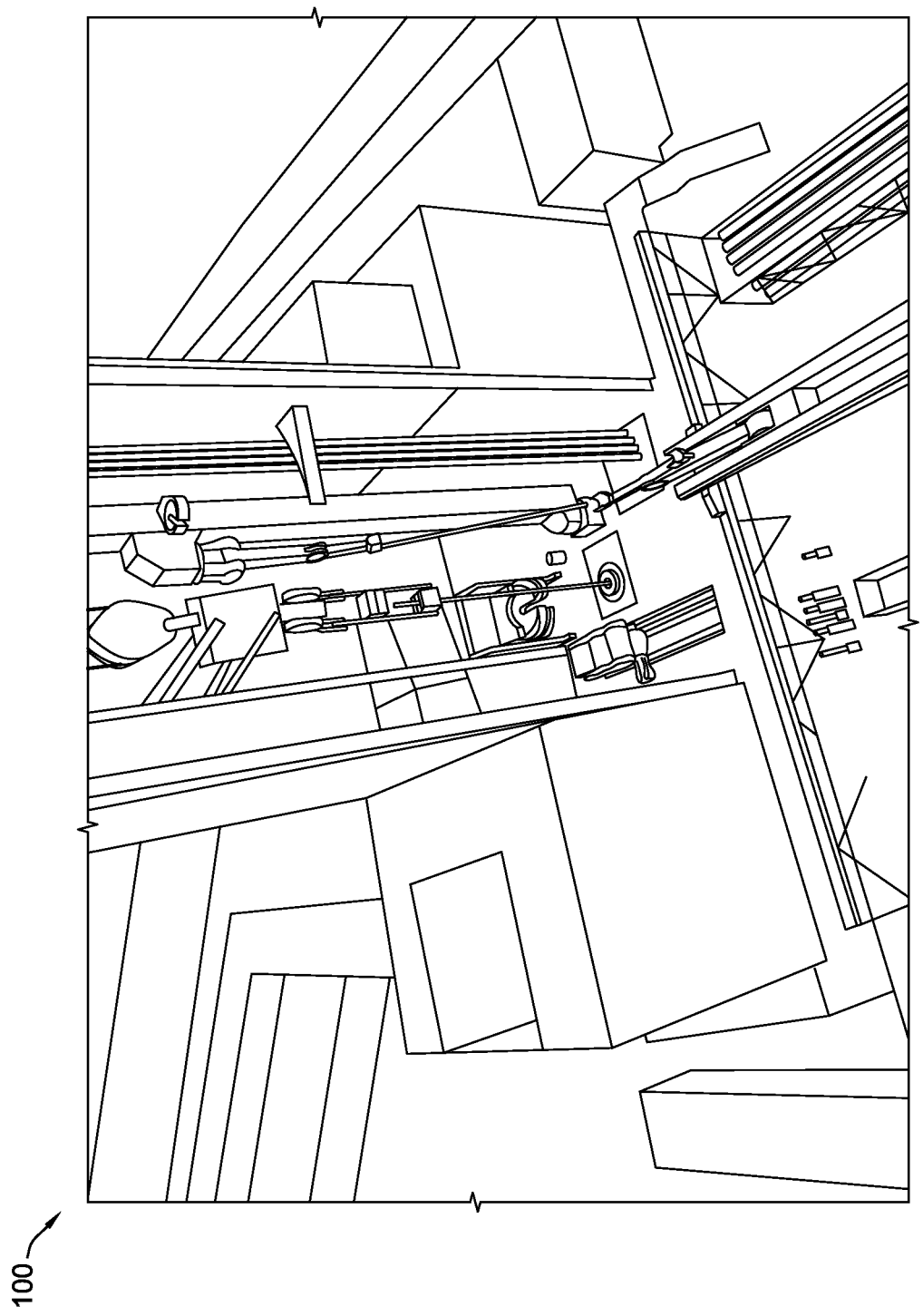
Figure 71:
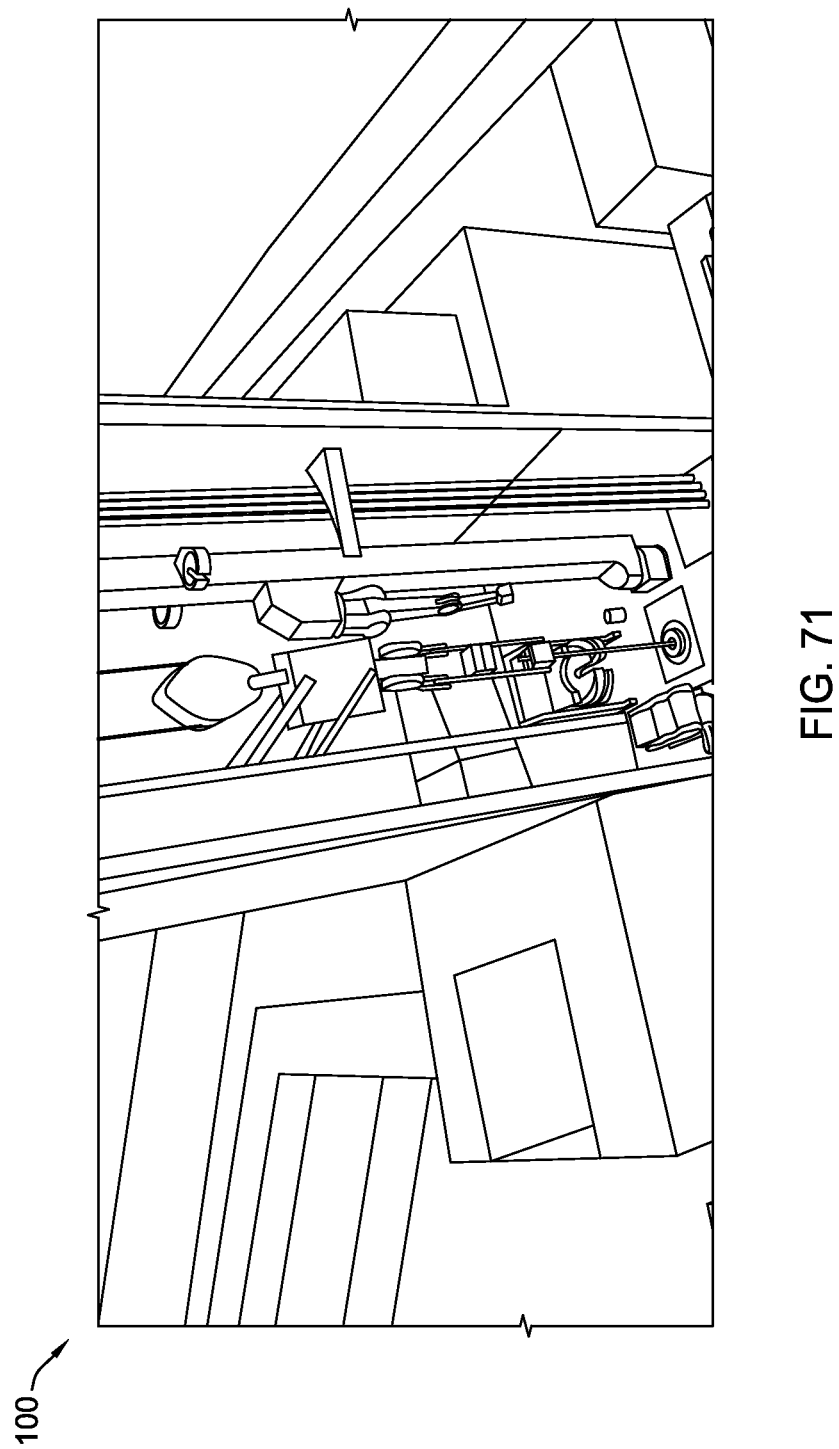
Figure 72:
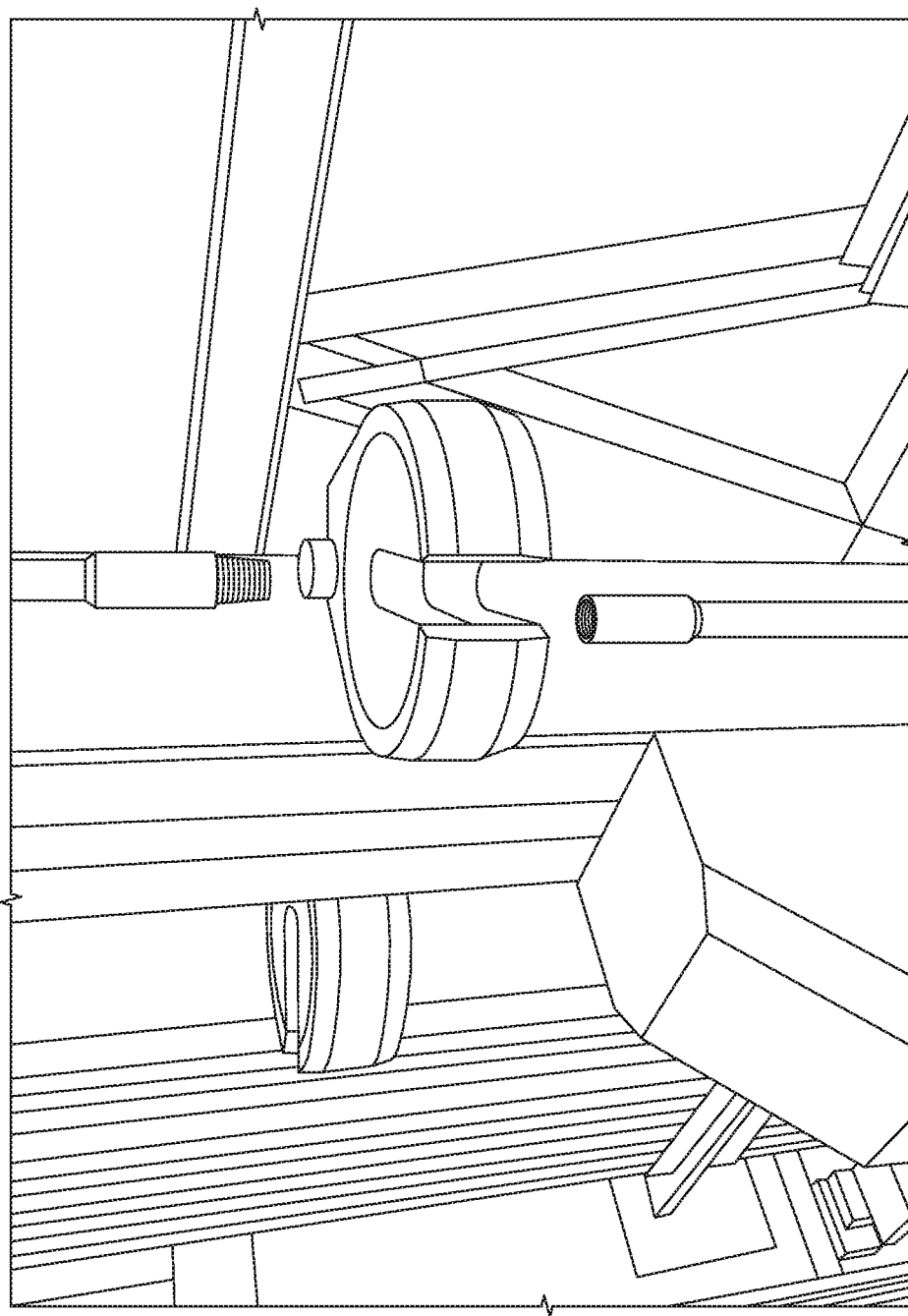
Figure 189:
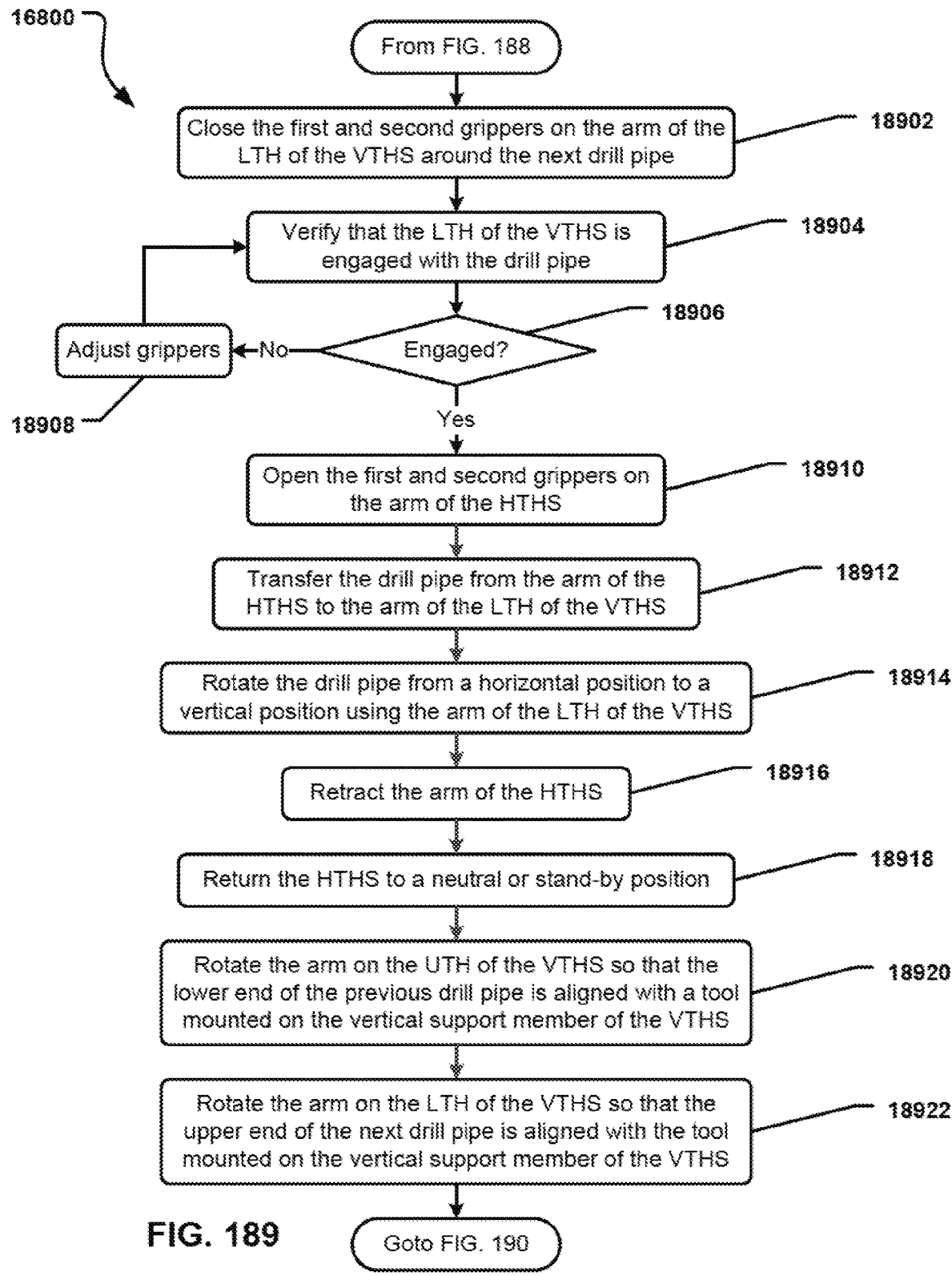

Continuing to FIG. 189, at step 18902, the system 100 can close the first and second grippers 482, 484 on the arm 430 of the LTH 420 of the VTHS 400 around the next drill pipe 206 (FIG. 69). At step 18904, the system 100 can verify that the LTH 420 of the VTHS 400 is engaged with the drill pipe 206. At step 18906, if the LTH 420 is not engaged with the drill pipe 206, the method 16800 can proceed to step 18908 and the system 100 can adjust the grippers 482, 484 on the LTH 420. Then, the method 16800 can return to step 18904 and continue as described. Returning to step 18906, if the LTH 420 is engaged with the drill pipe 206, the method 16800 can proceed to step 18910 and the system 100 can open the first and second grippers on the arm 244 of the HTHS 230 (FIG. 70). At step 18912, the system 100 can transfer the drill pipe 206 from the arm 244 of the HTHS 230 to the arm 430 of the LTH 420 of the VTHS 400. At step 18914, the system 100 can rotate the drill pipe 206 from a horizontal position to a vertical position using the arm 430 of the LTH 420 of the VTHS 400 (FIG. 71). At step 18916, the system 100 can retract the arm 244 of the HTHS 230. At step 18918, the system 100 can return the HTHS 230 to a neutral or stand-by position. At step 18920, the system 100 can rotate the arm on the UTH 422 of the VTHS 400 so that the lower end of the previous drill pipe 206 is aligned with a tool mounted on the vertical support member of the VTHS 400 (FIG. 72). At step 18904, the system 100 can rotate the arm on the LTH 420 of the VTHS 400 so that the upper end of the next drill pipe 206 is aligned with the tool mounted on the vertical support member of the VTHS 400 (FIG. 72).

Figure 73:
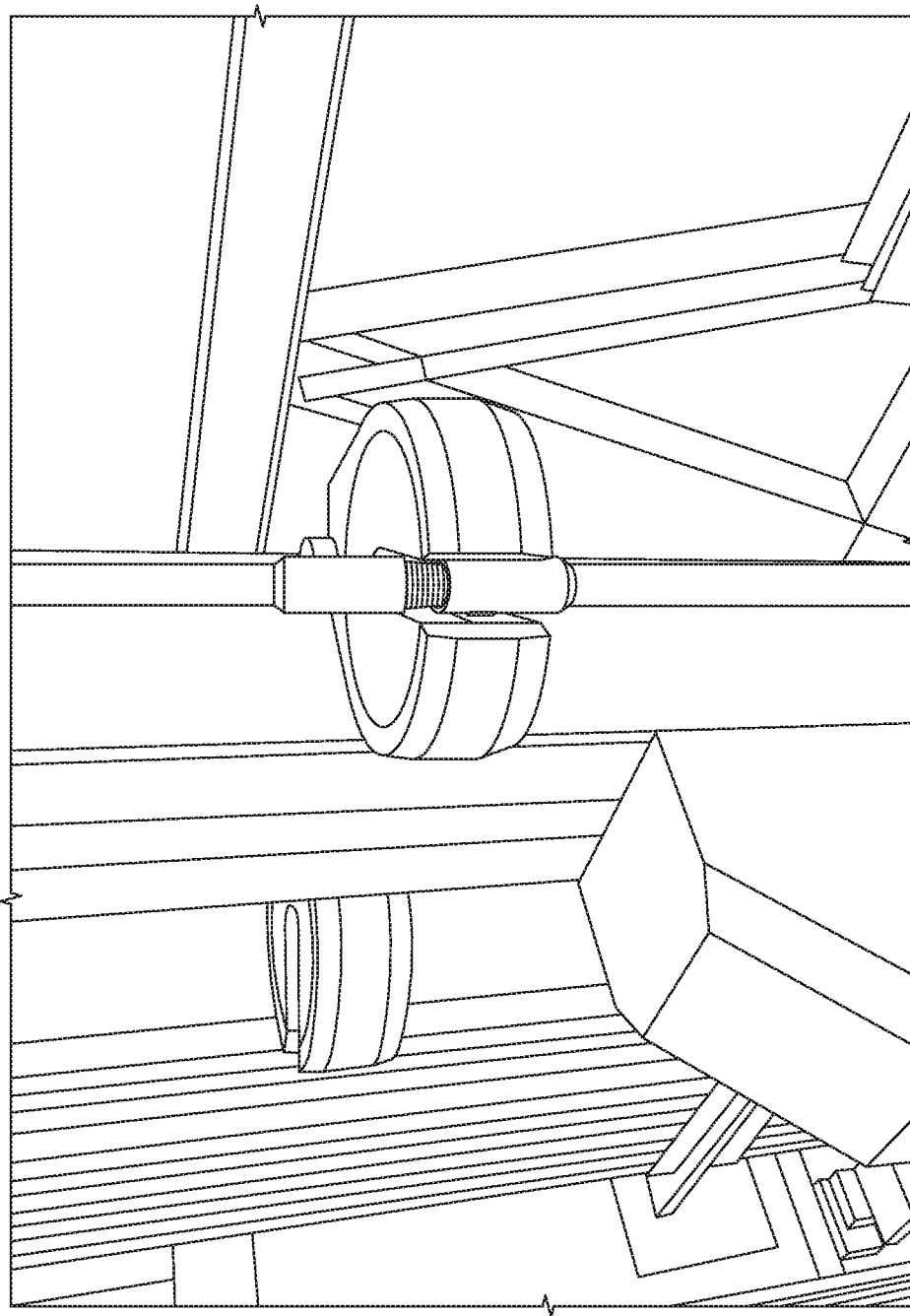
Figure 74:
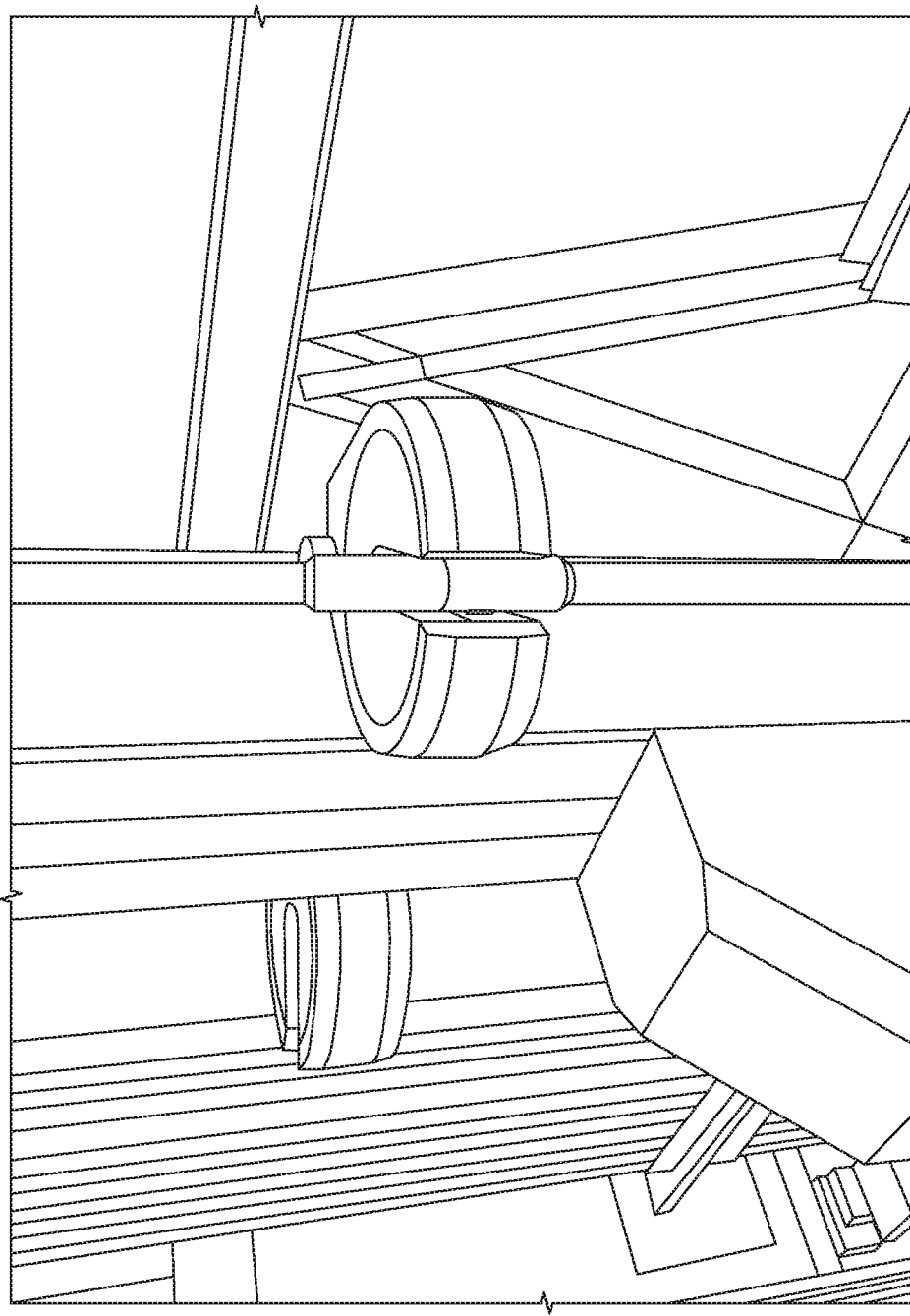
Figure 75:
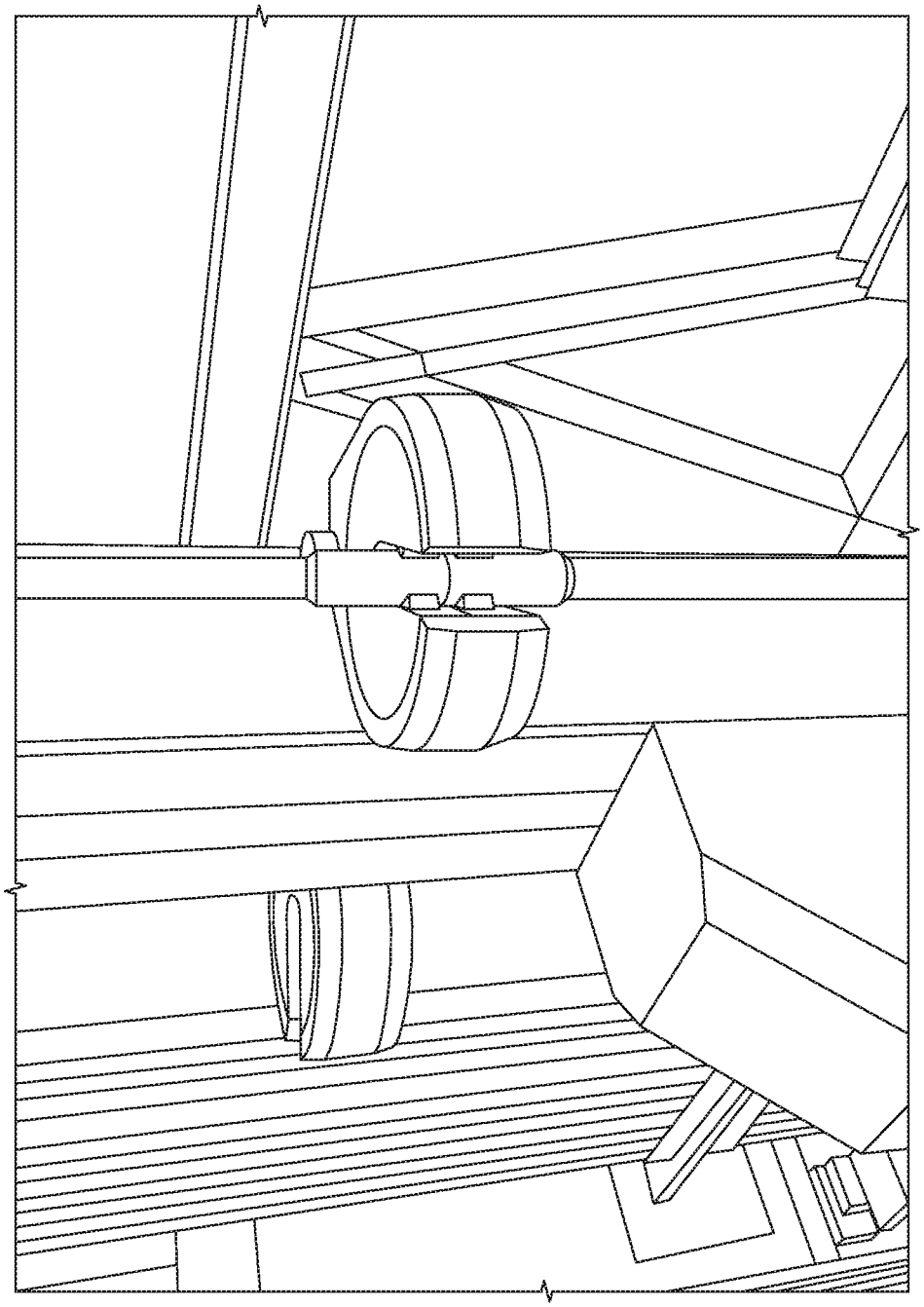
Figure 76:
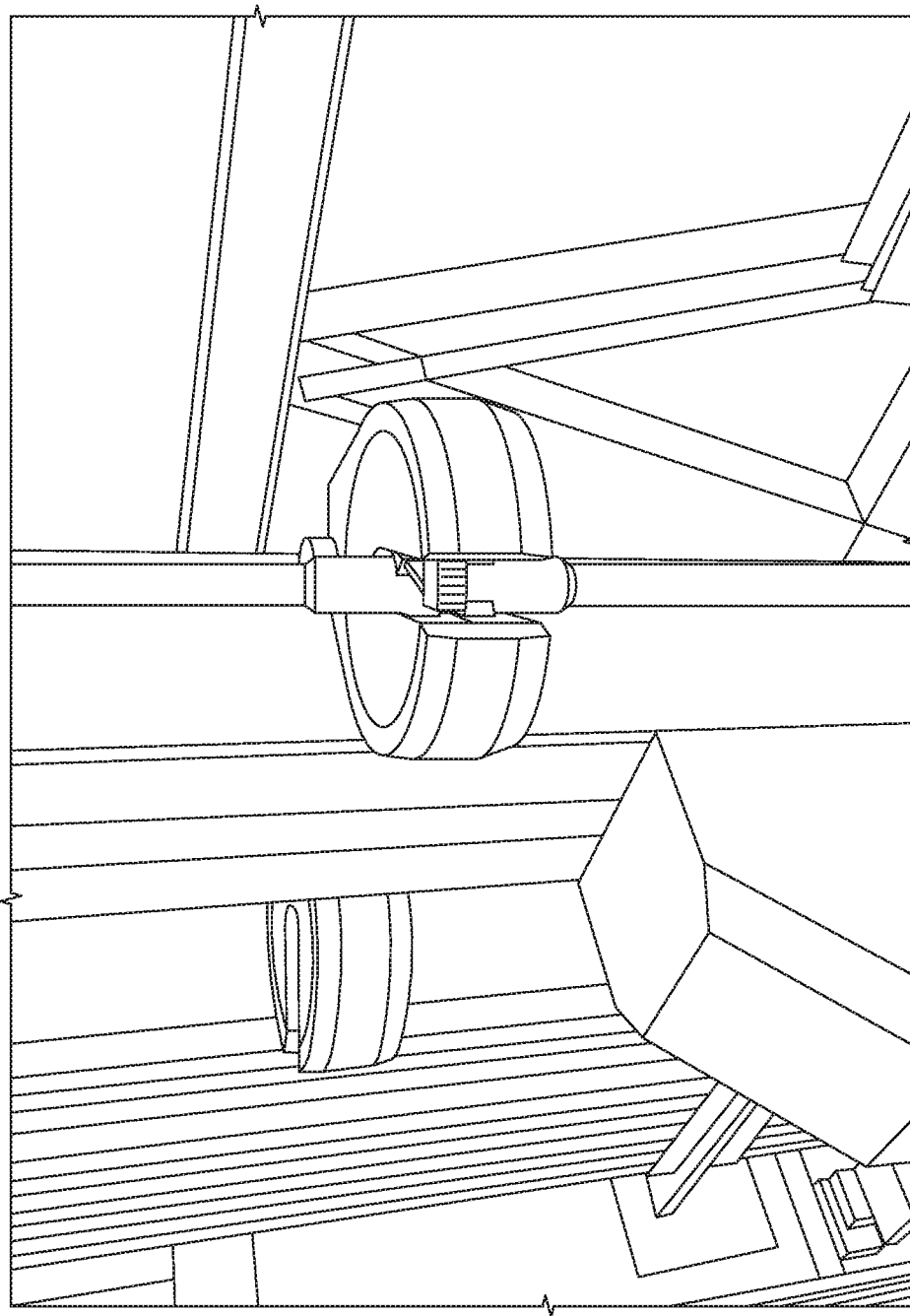
Figure 77:
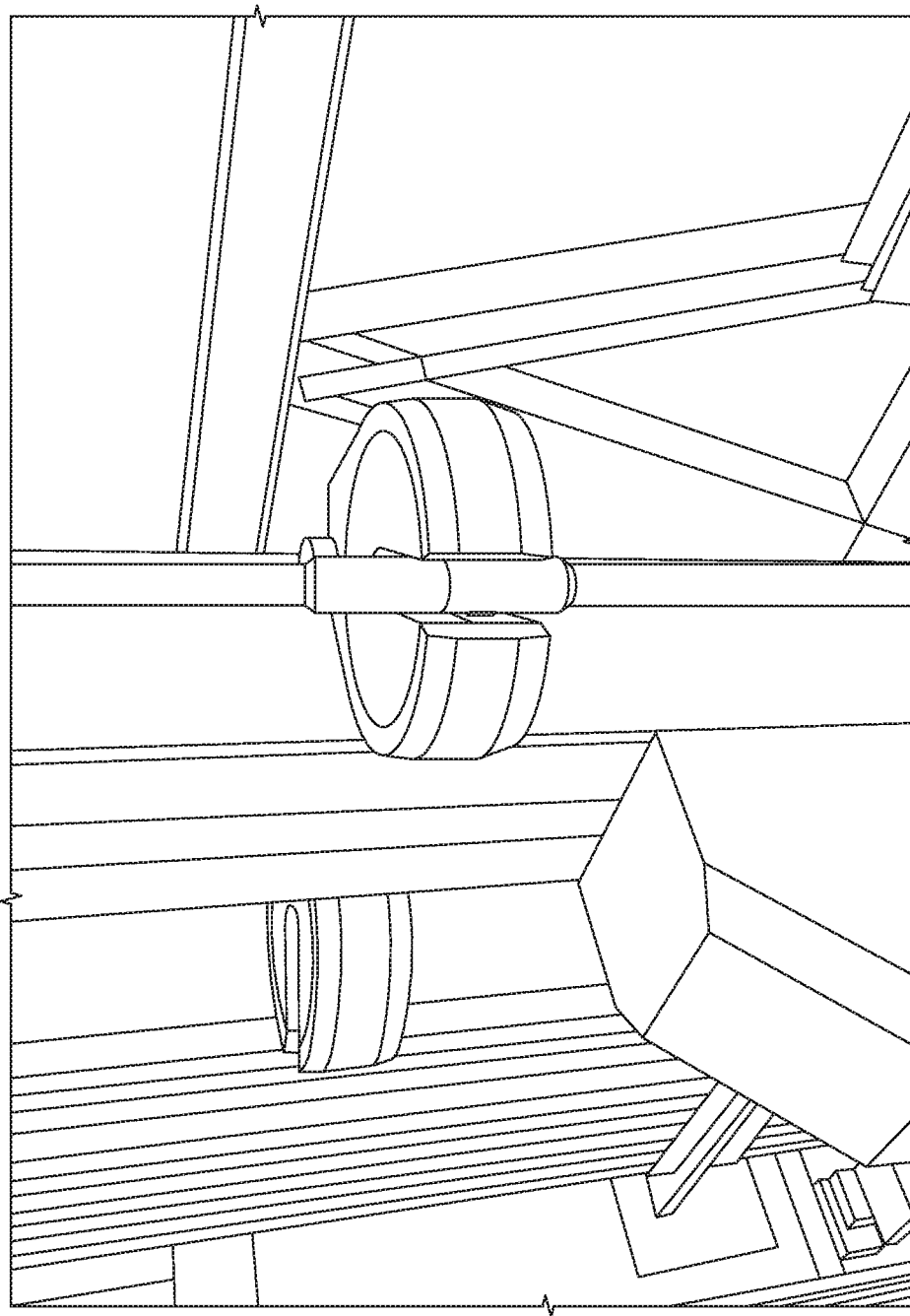
Figure 190:
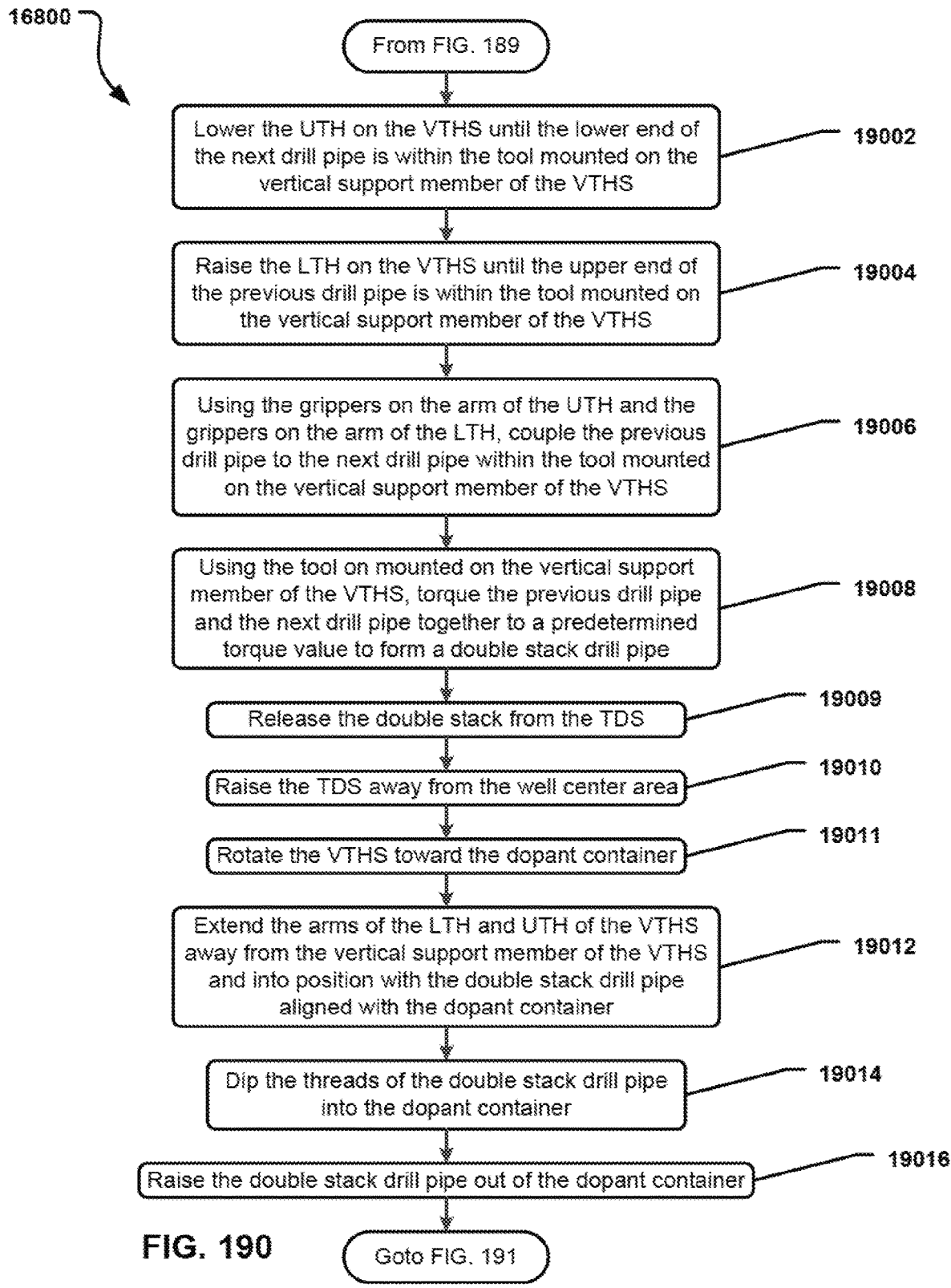
Figure 191:
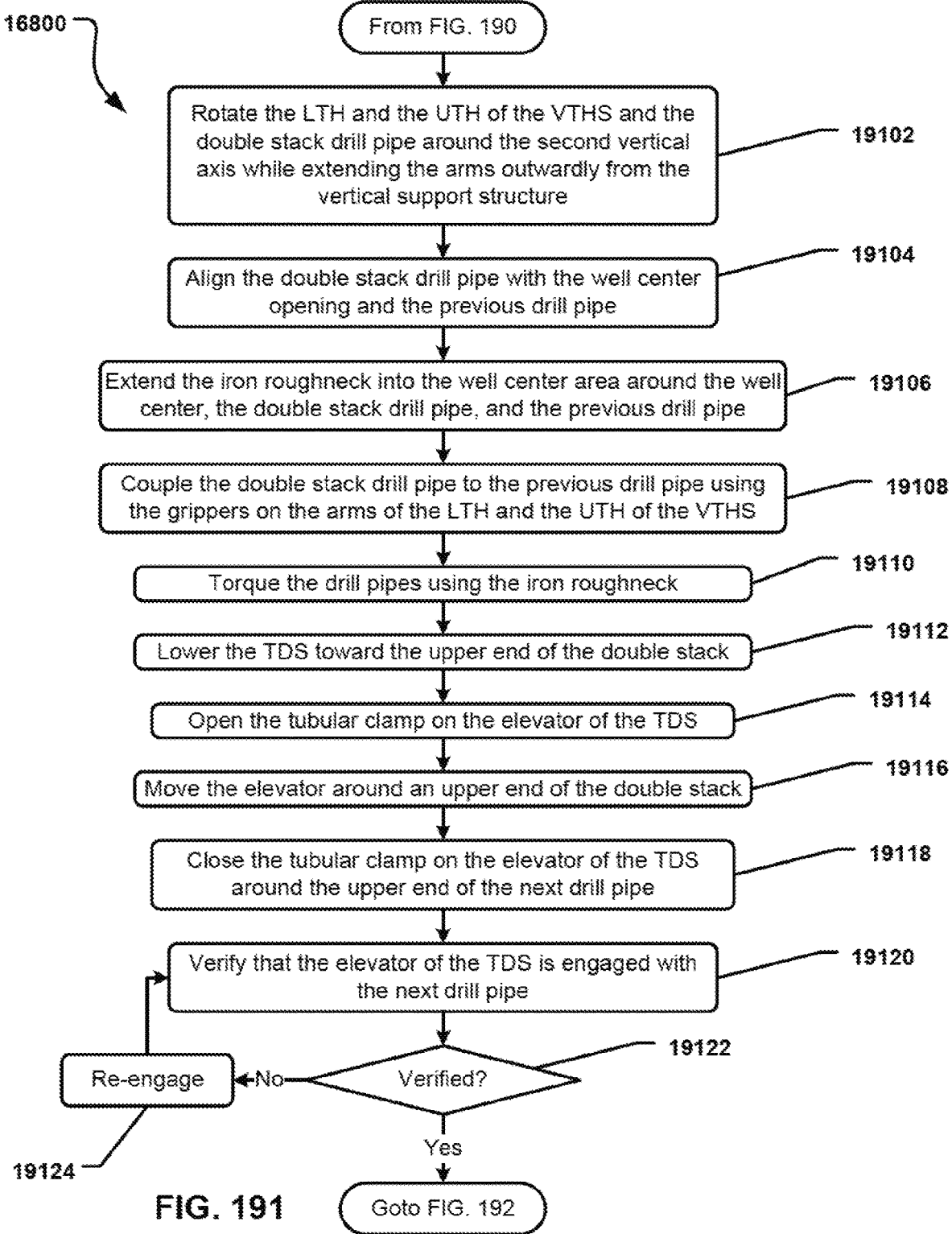

Proceeding to FIG. 190, at step 19002, the system 100 can lower the UTH 422 on the VTHS 400 until the lower end of the next drill pipe 206 is within the tool mounted on the vertical support member of the VTHS 400 (FIG. 73). At step 19004, the system 100 can raise the LTH 420 on the VTHS 400 until the upper end of the previous drill pipe 206 is within the tool mounted on the vertical support member of the VTHS 400 (FIG. 73). At step 19006, the system 100, using the grippers on the arm of the UTH 422 and the grippers on the arm 430 of the LTH 420, can couple the previous drill pipe 206 to the next drill pipe 206 within the tool mounted on the vertical support member of the VTHS 400 (FIG. 74). Further, at step 19008, the system 100, using the tool on mounted on the vertical support member of the VTHS 400, can torque the previous drill pipe 206 and the next drill pipe 206 together to a predetermined torque value to form a double stack drill pipe 206 (FIG. 76).

Figure 78:
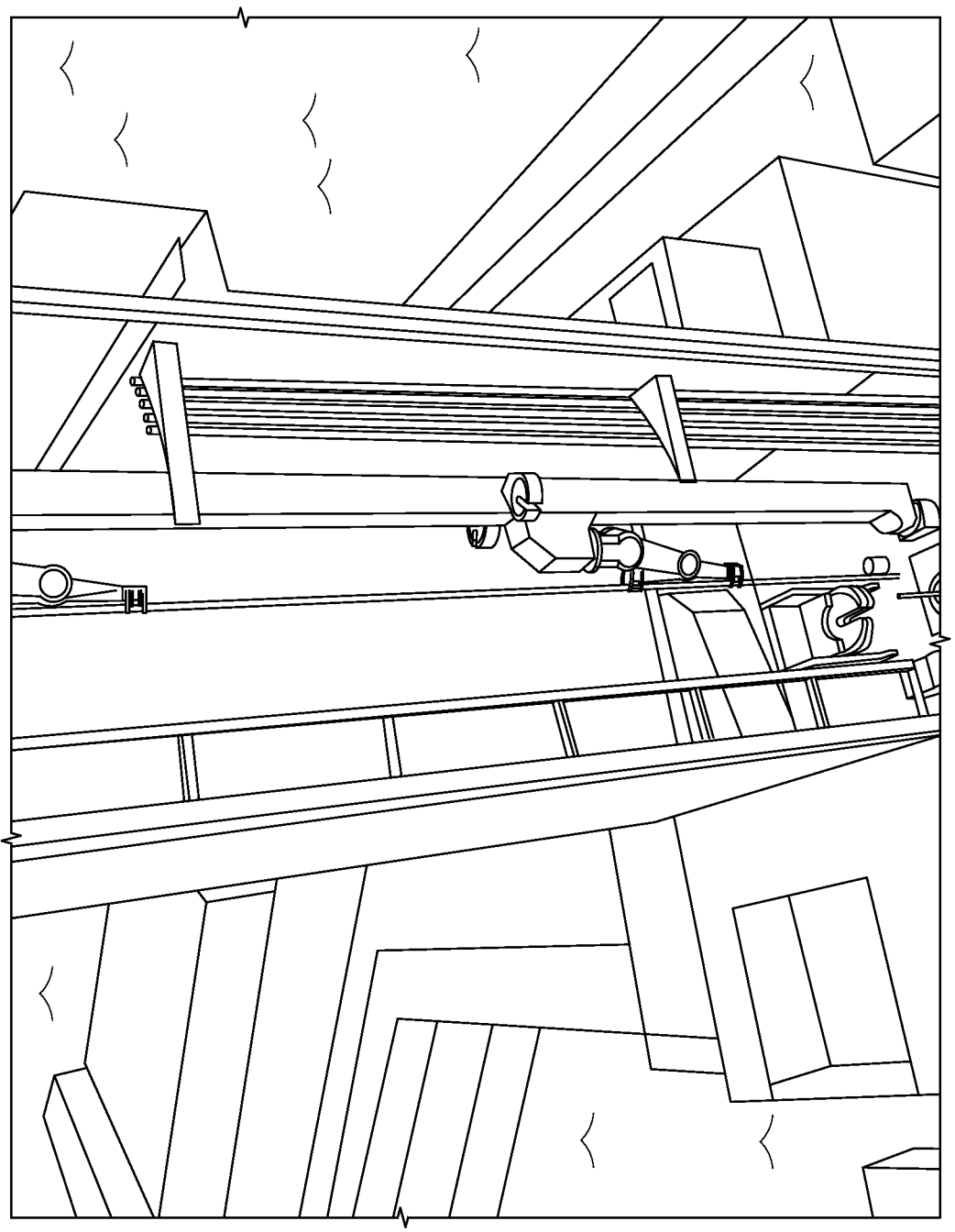
Figure 79:
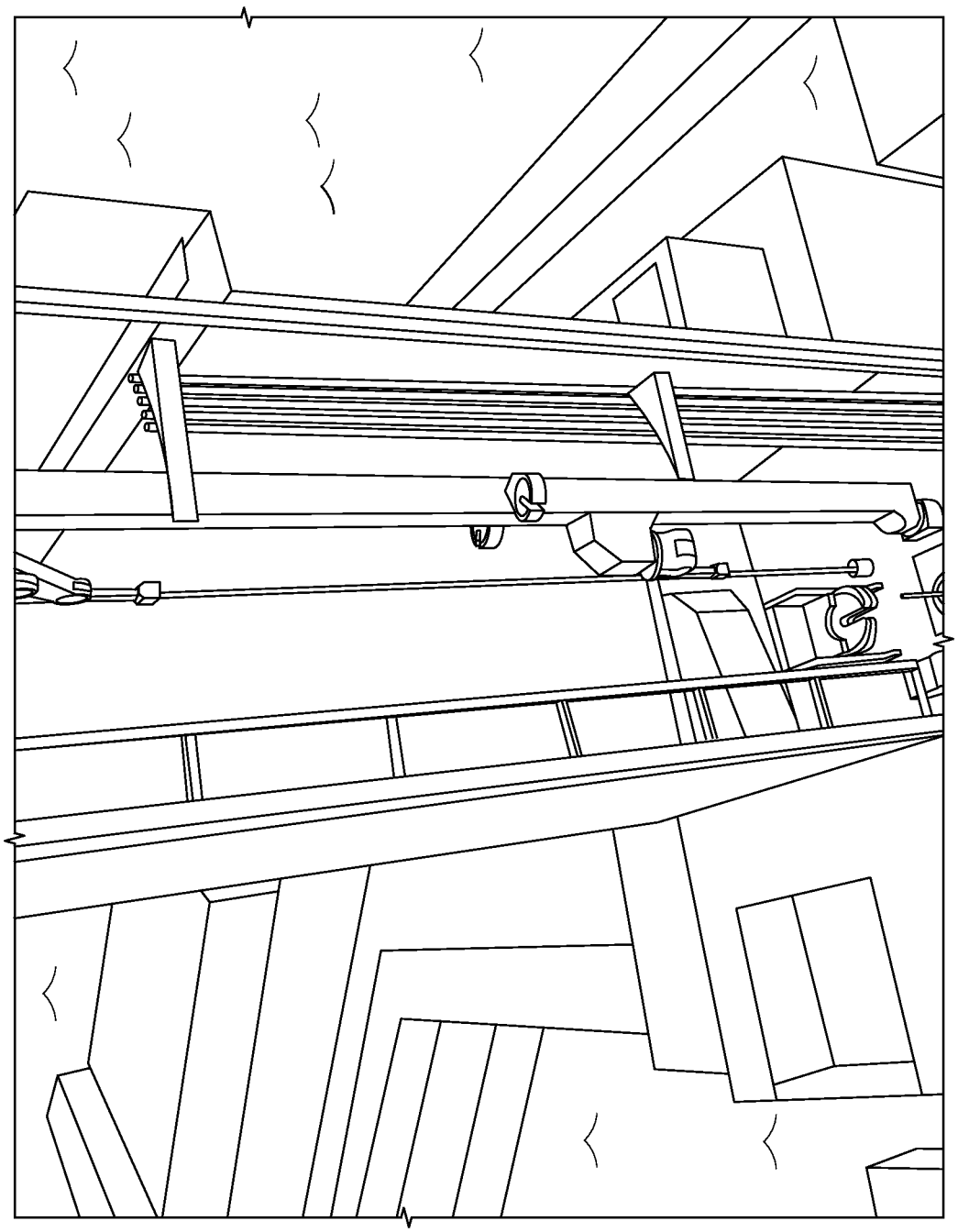

While the system 100 is performing steps 18920 through 19008 with the VTHS 400, the system 100 can perform steps 19009 through 19011. Specifically, at step 19009, the system 100 can release the previous double stack from the TDS 800. At step 19010, the system 100 can raise the TDS 800 away from the well center area 508. Further, at step 19011, the system 100 can rotate the VTHS 400 toward the dopant container (FIG. 78). At step 19012, the system 100 can extend the arms of the LTH 420 and UTH 422 of the VTHS 400 away from the vertical support member of the VTHS 400 and into position with the double stack drill pipe 206 aligned with the dopant container (FIG. 79). At step 19014, the system 100 can dip the threads of the double stack drill pipe 206 into the dopant container. At step 19016, the system 100 can raise the double stack drill pipe 206 out of the dopant container. Then, the method 16800 can move to step 19102 of FIG. 191.

Figure 80:
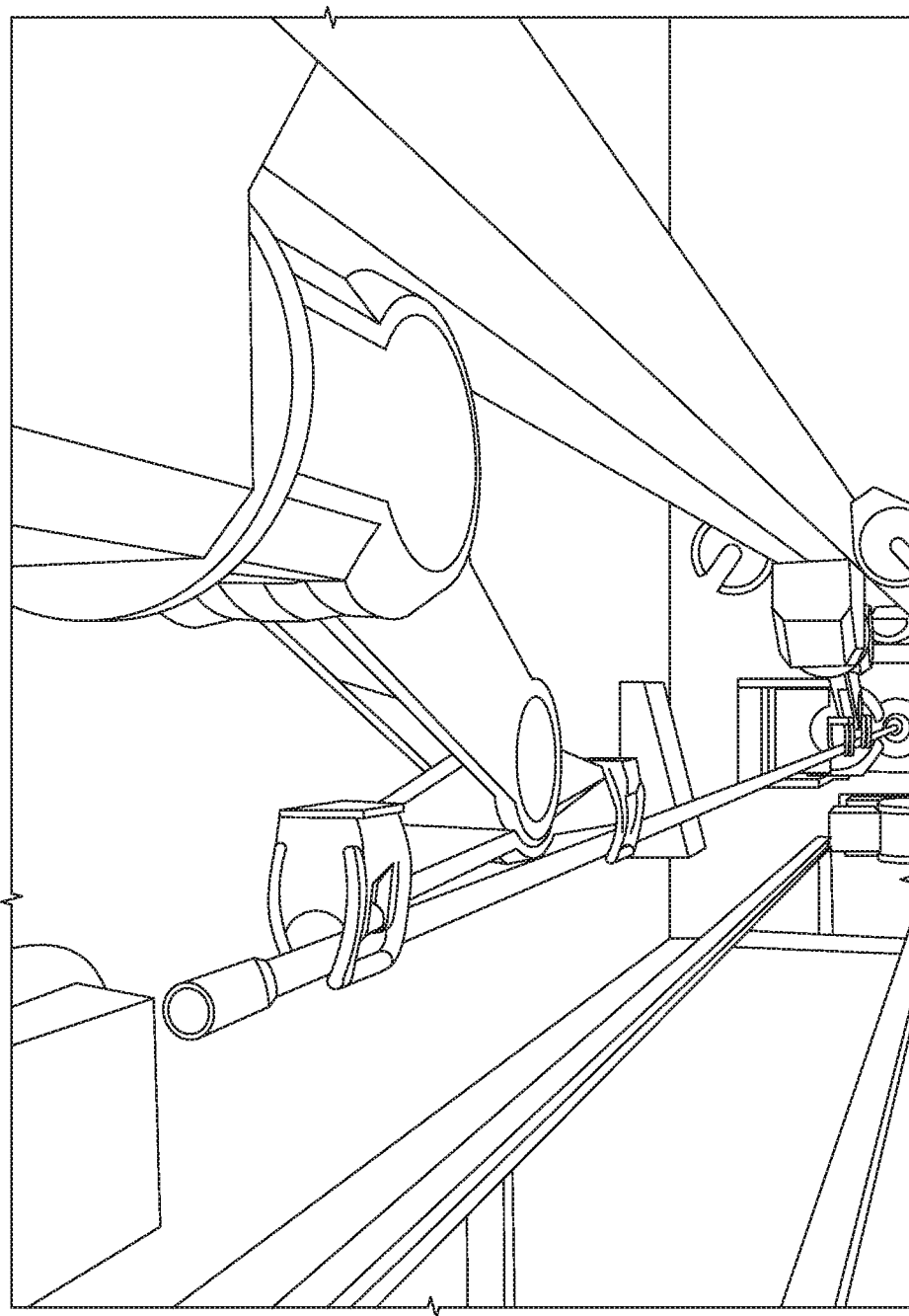
Figure 81:
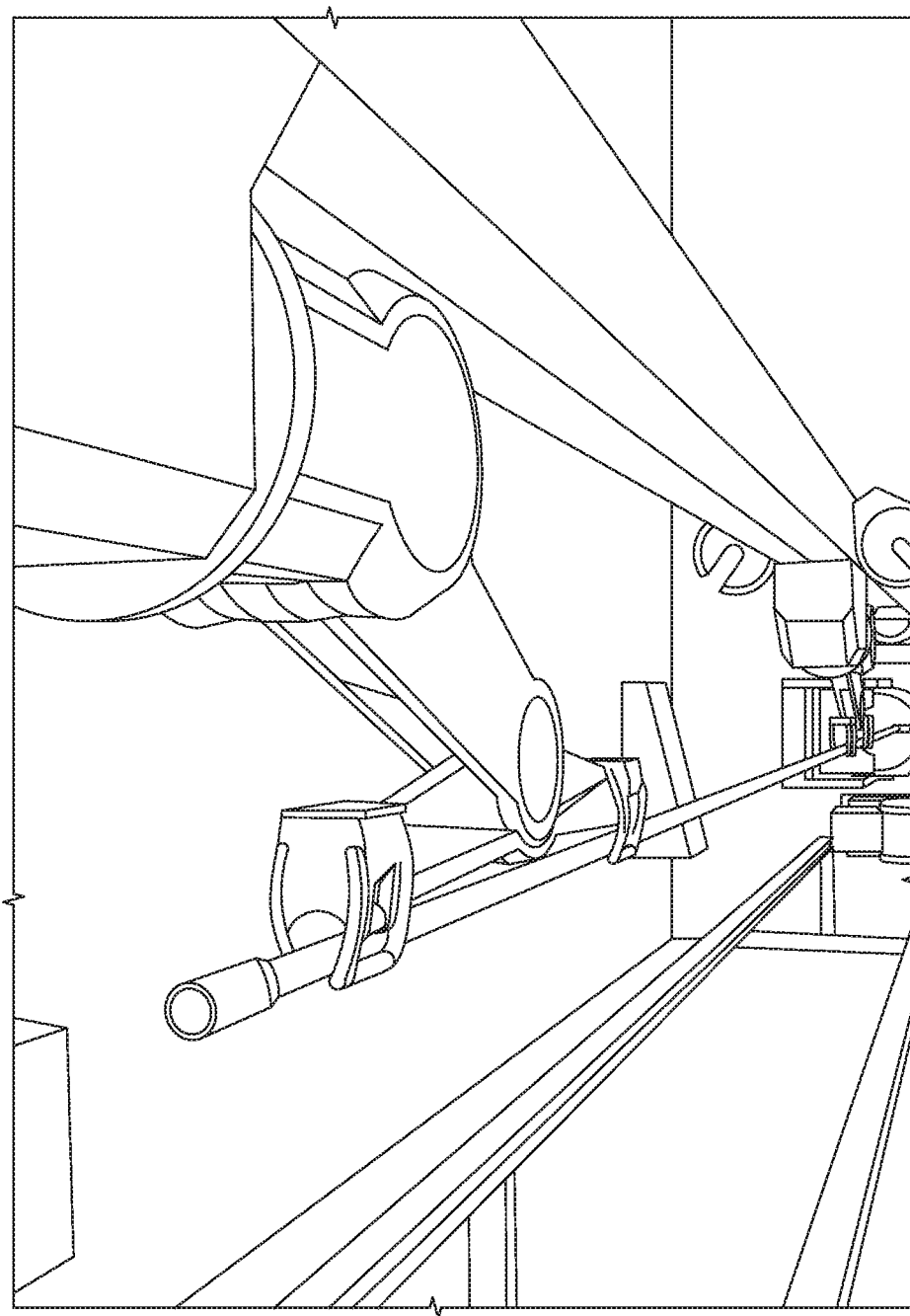
Figure 82:
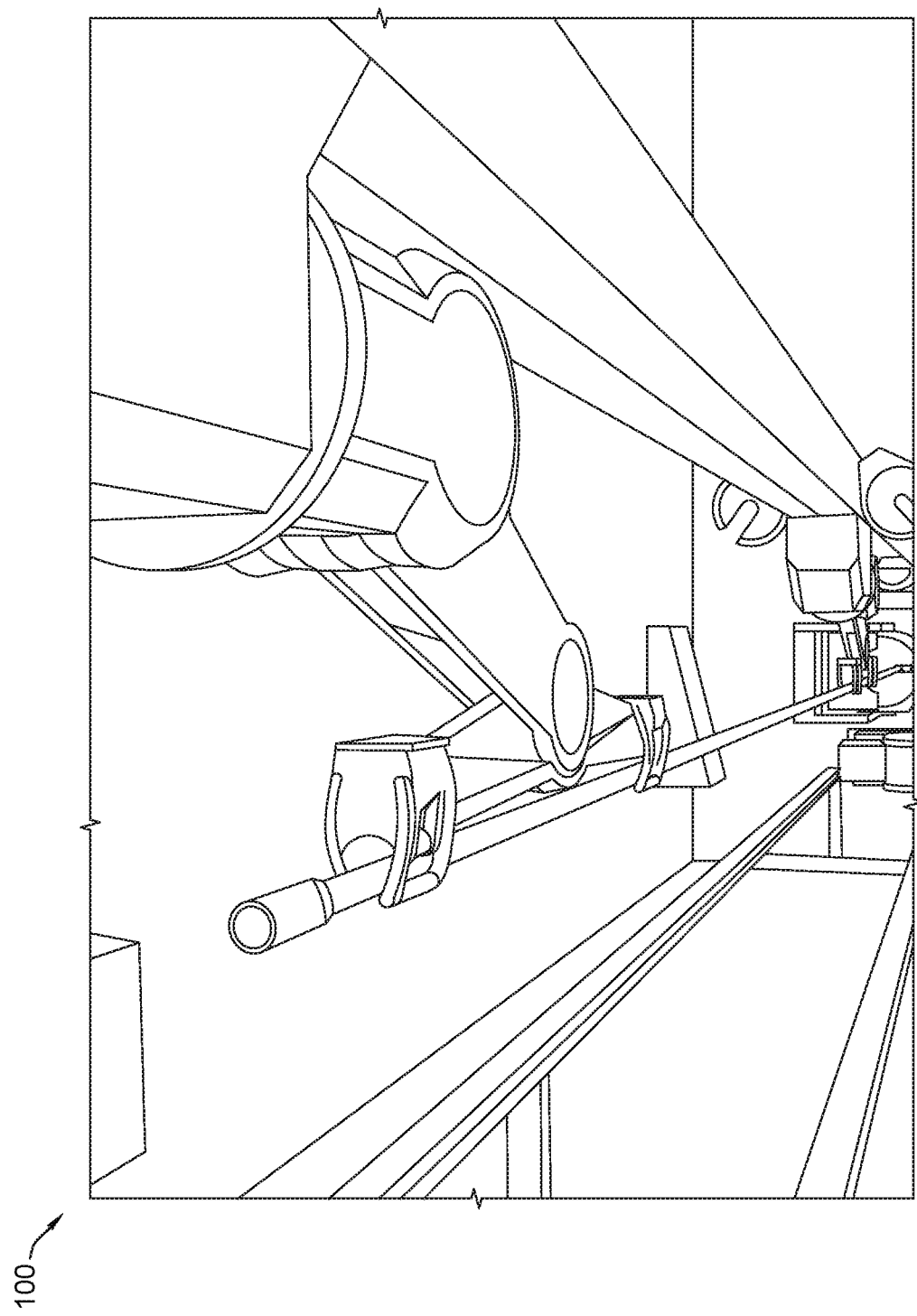

At step 19102, the system 100 can rotate the LTH 420 and the UTH 422 of the VTHS 400 and the double stack drill pipe 206 around the second vertical axis while extending the arms outwardly from the vertical support structure 402 (FIG. 80). At step 19104, the system 100 can align the double stack drill pipe 206 with the well center opening and the previous drill pipe 206 (FIG. 80). At step 19106, the system 100 can extend the iron roughneck 600 into the well center area 508 around the well center, the double stack drill pipe 206, and the previous drill pipe 206 (FIG. 81). At step 19108, the system 100 can couple the double stack drill pipe 206 to the previous drill pipe 206 using the grippers on the arms of the LTH 420 and the UTH 422 of the VTHS 400 (FIG. 82). It is to be understood that step 19106 can be performed by the system 100 with the iron roughneck 600, while one or more of steps 19102, 19104, and 19108 are being performed by the system 100 with the VTHS 400.

Figure 83:
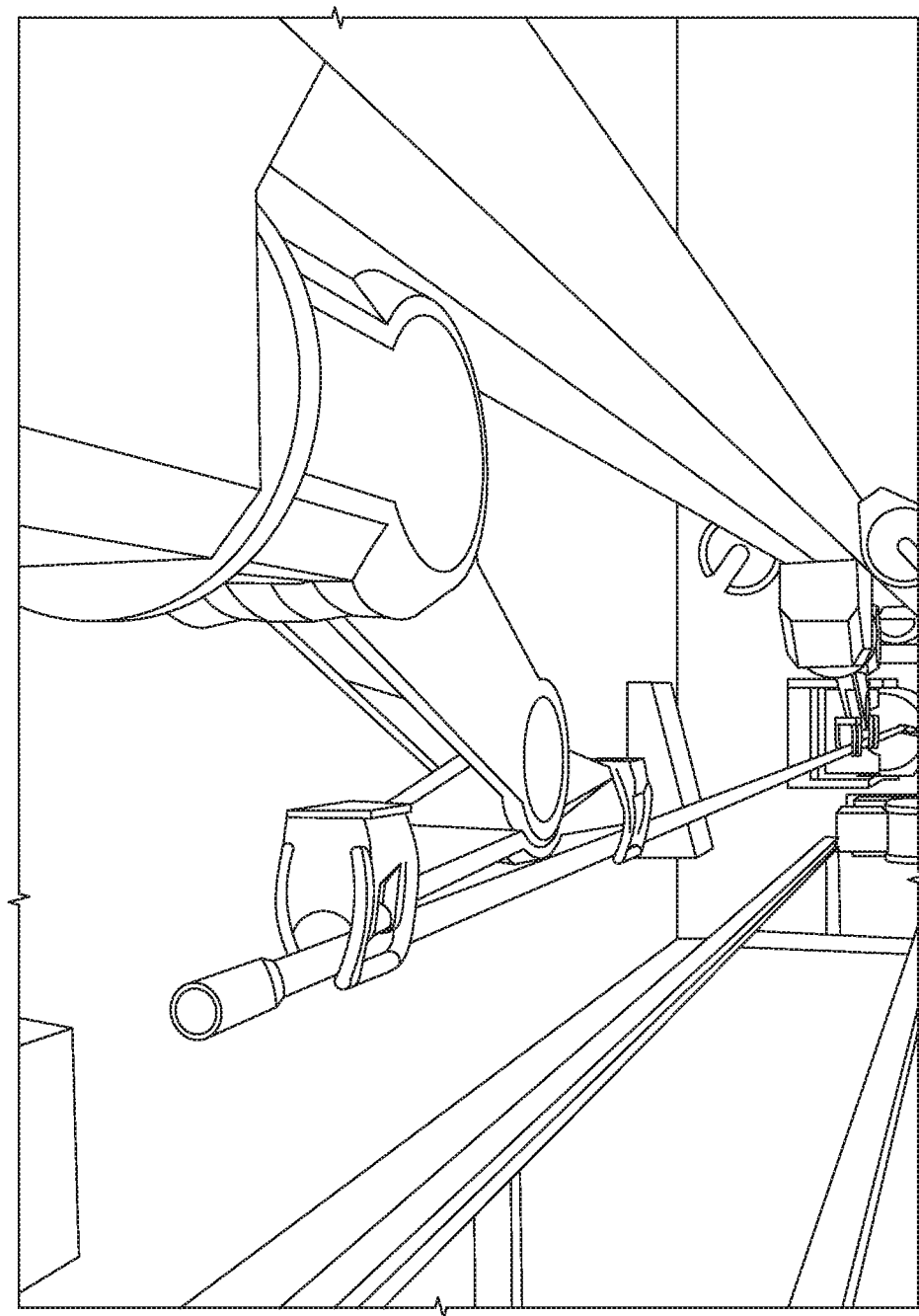
Figure 84:
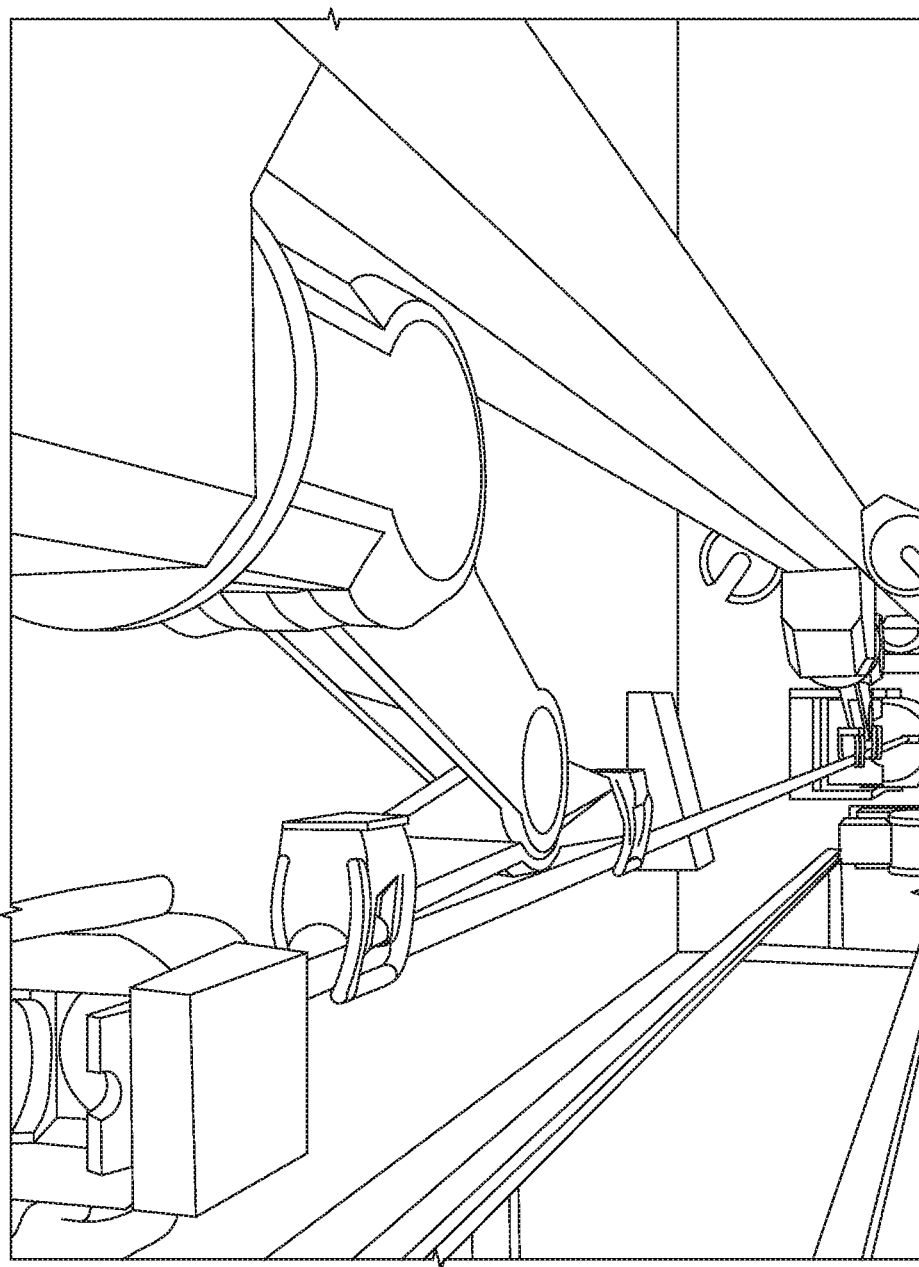
Figure 85:
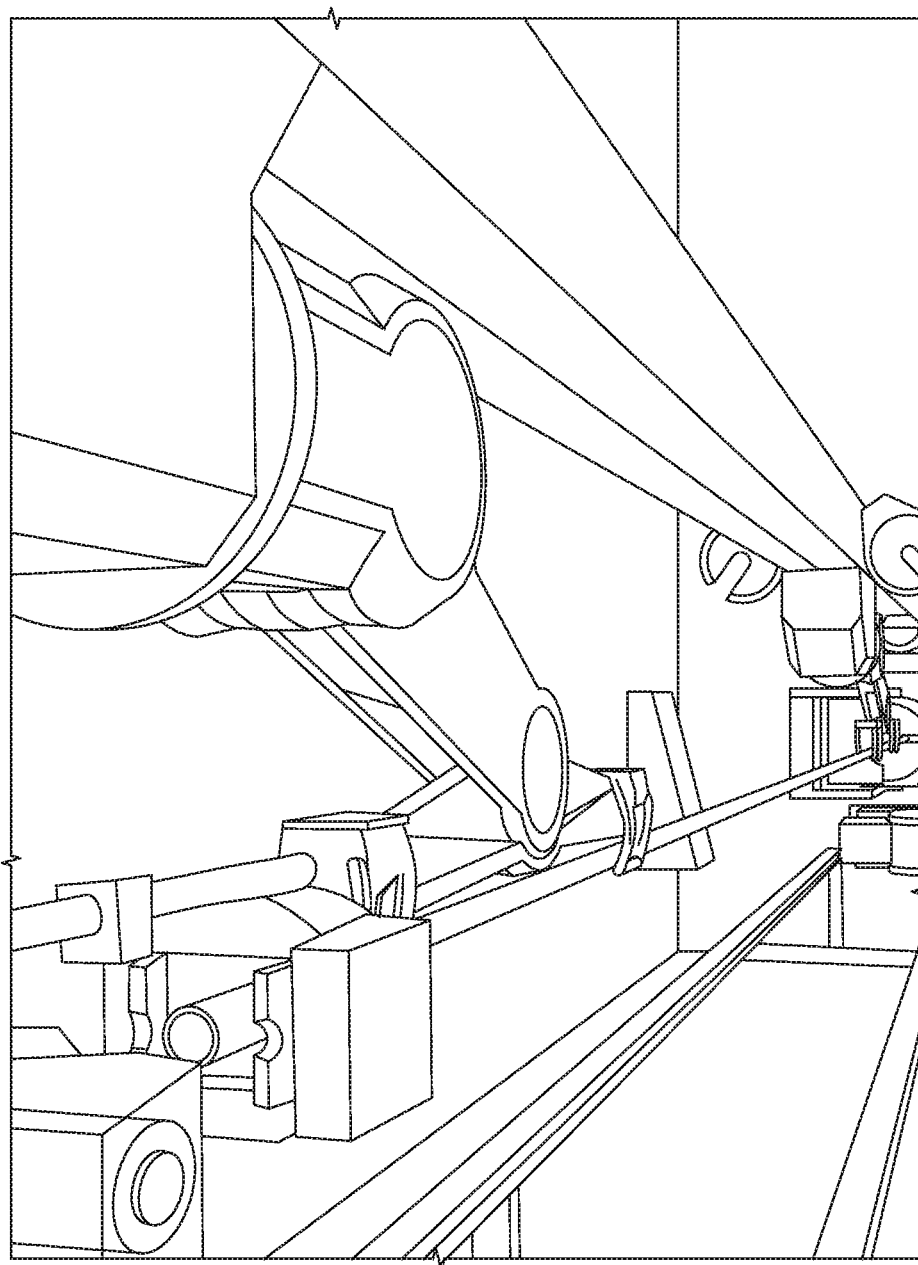
Figure 86:
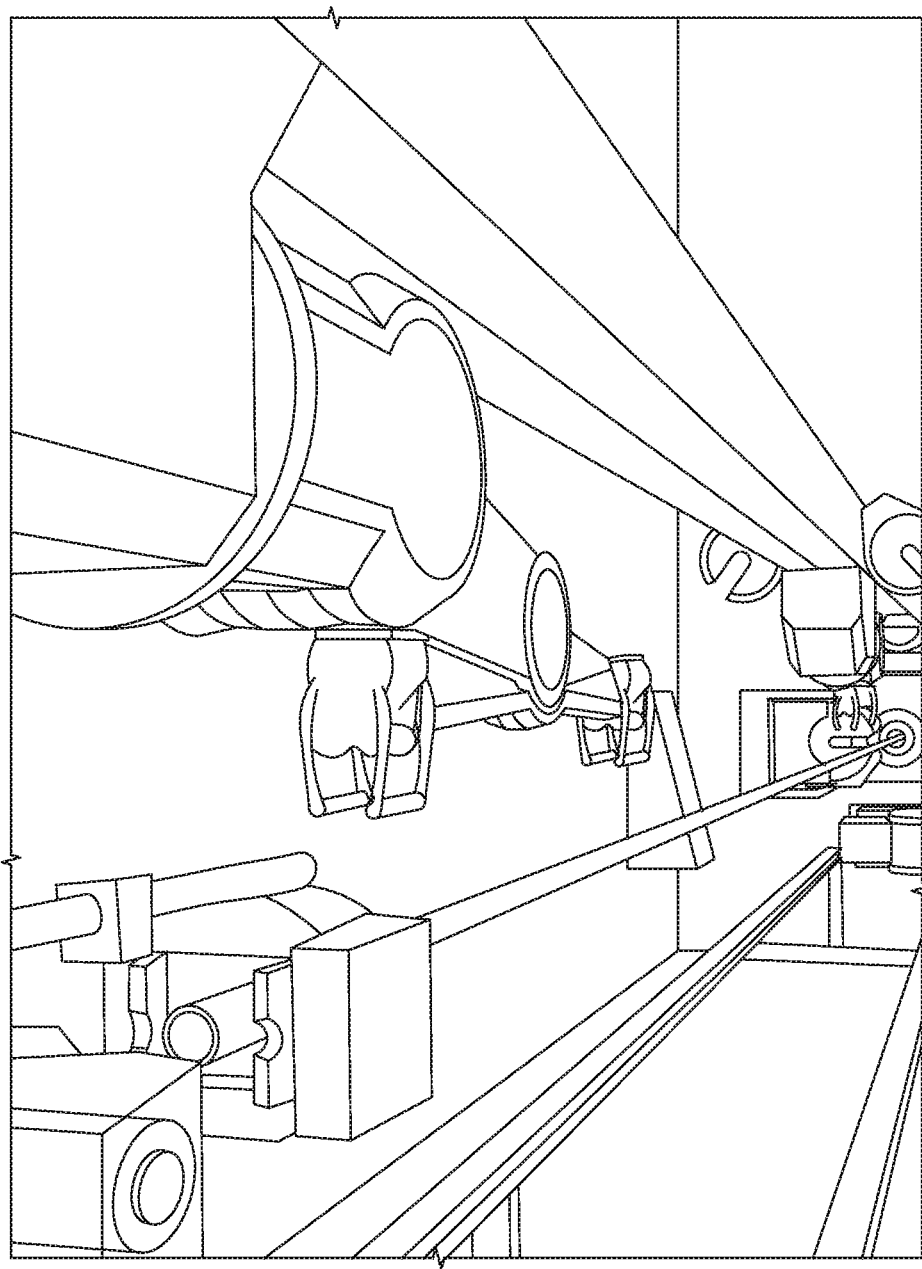

At step 19110, the system 100 can torque the drill pipes 206 together using the iron roughneck (FIG. 83). While the system 100 torques the drill pipes 206 at step 19100, the system 100 can perform one or more of steps 19112 through 19118 using the TDS 100. At step 19112, the system 100 can lower the TDS 800 toward the upper end of the next drill pipe 206 (FIG. 84). At step 19114, the system 100 can open the tubular clamp on the elevator 850 of the TDS 800 (FIG. 84). At step 19116, the system 100 can move the elevator 850 around an upper end of the BHA 210 (FIG. 85). Moreover, at step 19118, the system can close the tubular clamp on the elevator 850 of the TDS 800 around the upper end of the next drill pipe 206 (FIG. 86). At step 19120, the system 100 can verify that the elevator 850 of the TDS 800 is engaged with the next drill pipe 206. At step 19122, if the elevator 850 is not engaged with the next drill pipe 206, the method 16800 can proceed to step 19124 and the system 100 can re-engage the elevator 850 with the next drill pipe 206.

Figure 192:
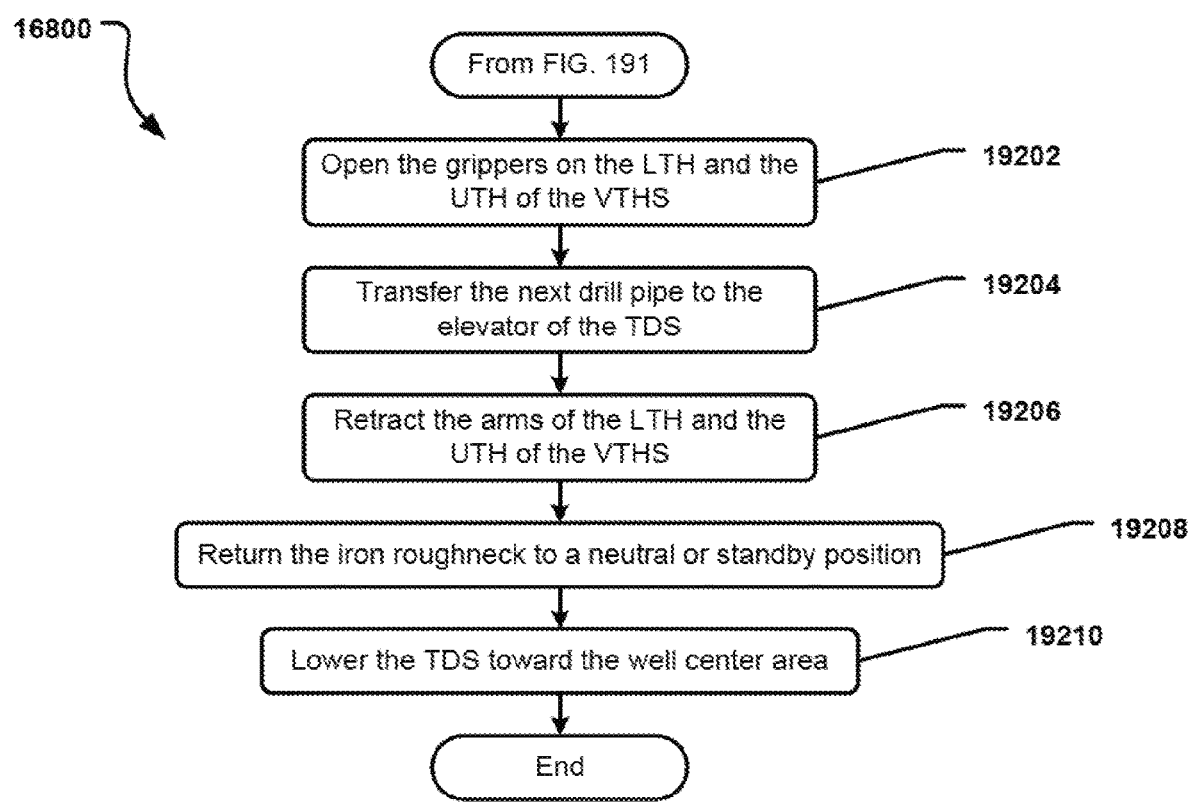
Figure 193:
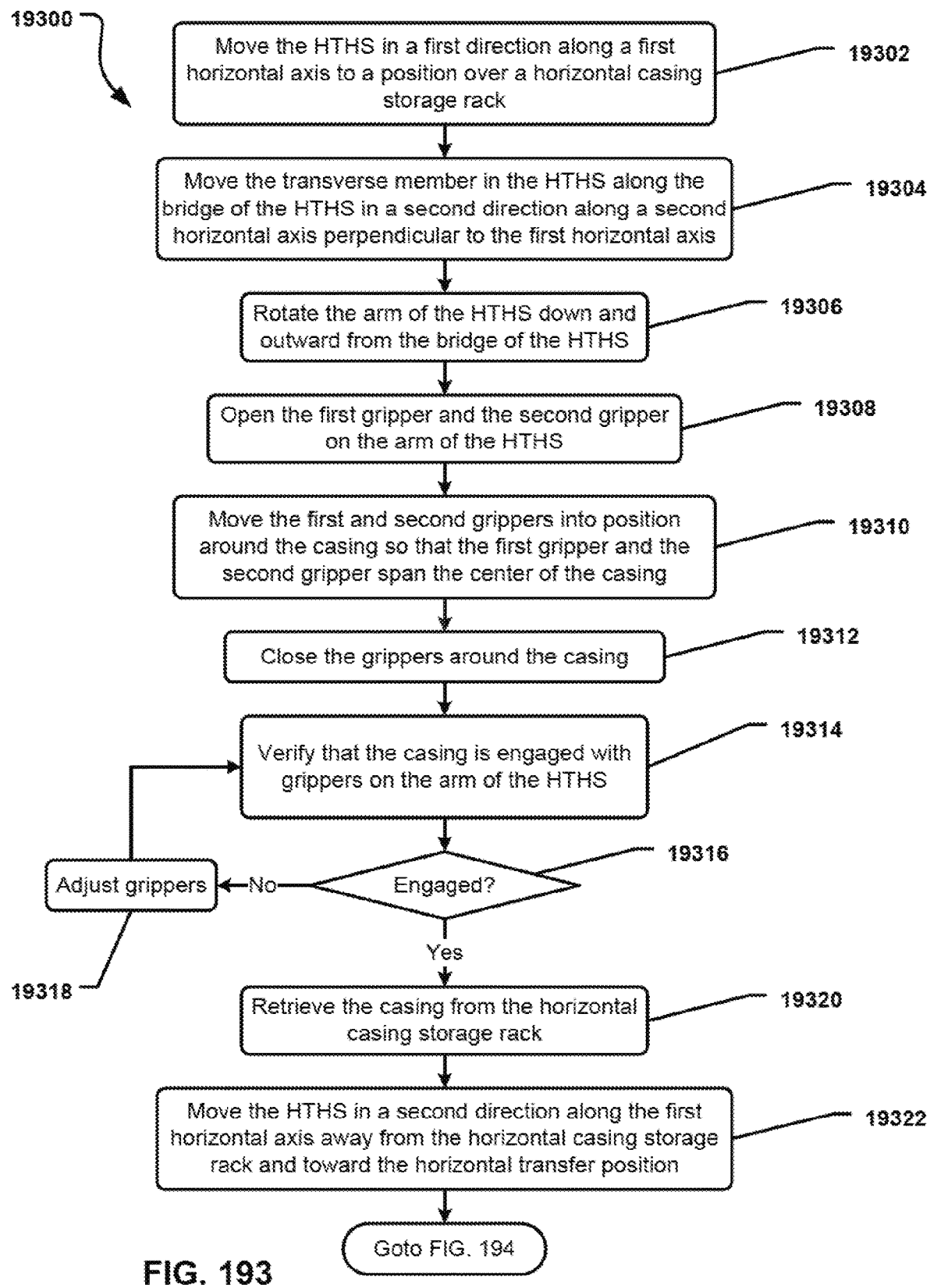
FIGS. 193-199 include illustrations of a portion of a second method for conducting subterranean operations in accordance with embodiments herein.

Then, the method 16800 may return to step 19120 and continue as described herein. Returning to step 19122, if the elevator 850 is engaged with the next drill pipe 206, the method 16800 can continue to step 19202 of FIG. 192.

Figure 87:
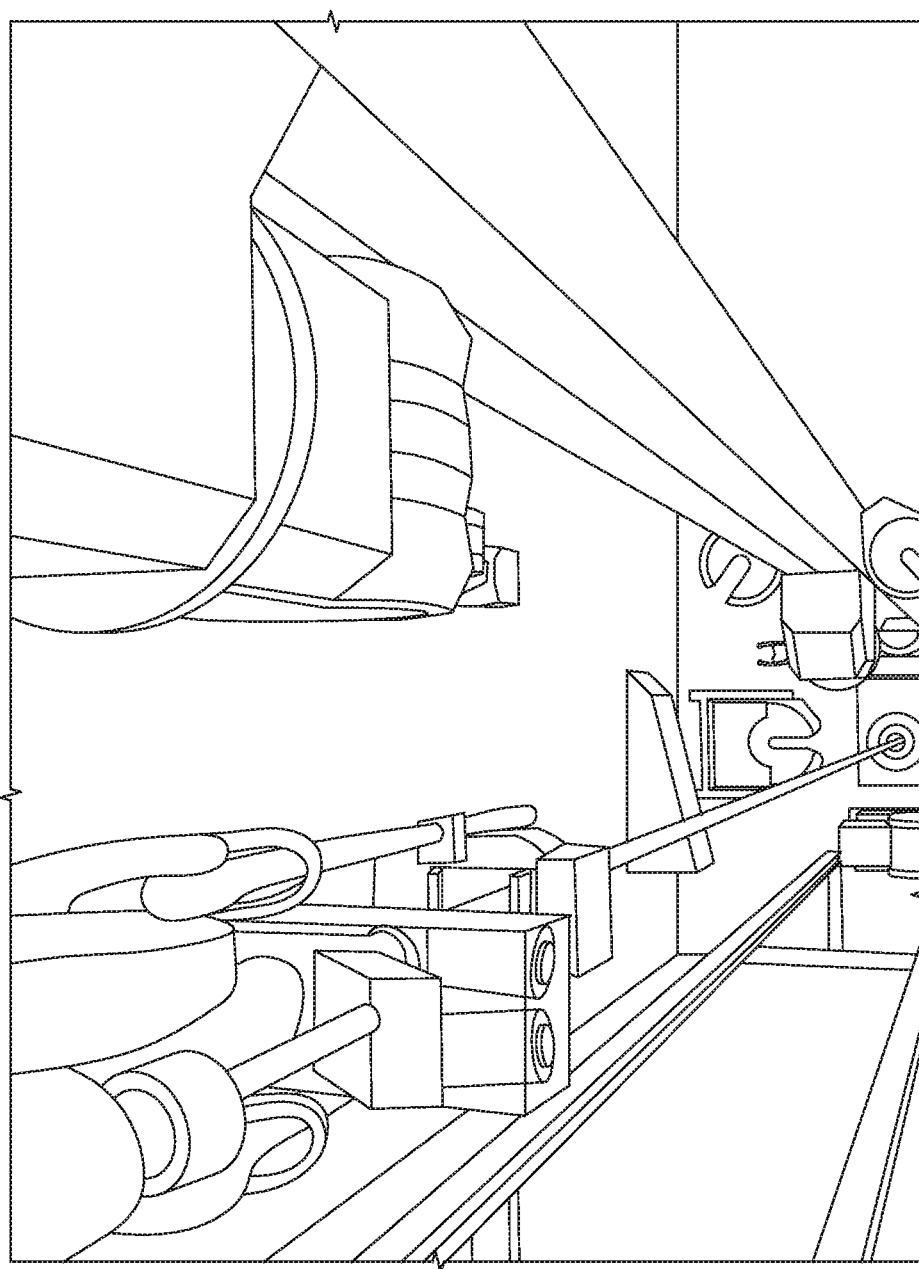
Figure 88:
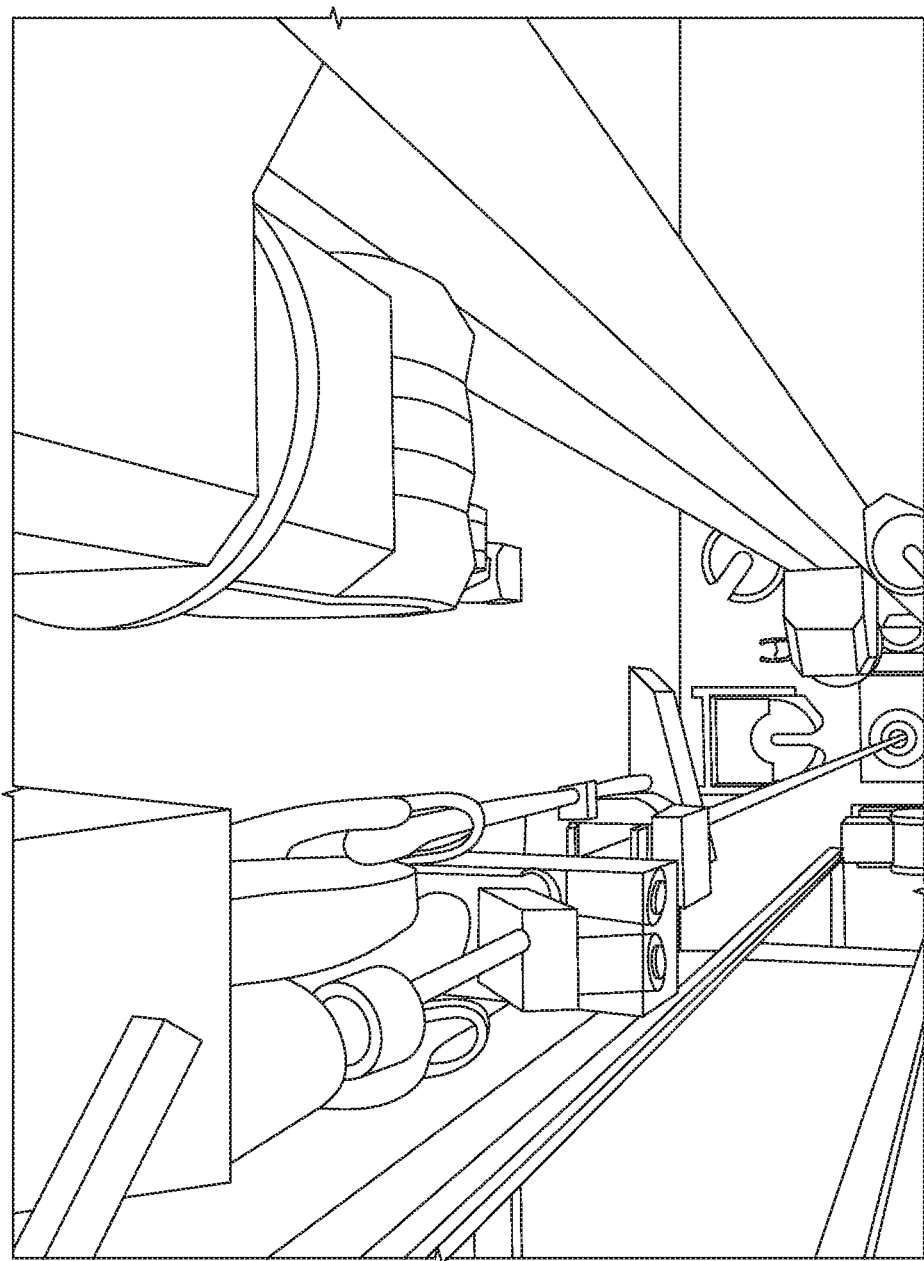
Figure 89:
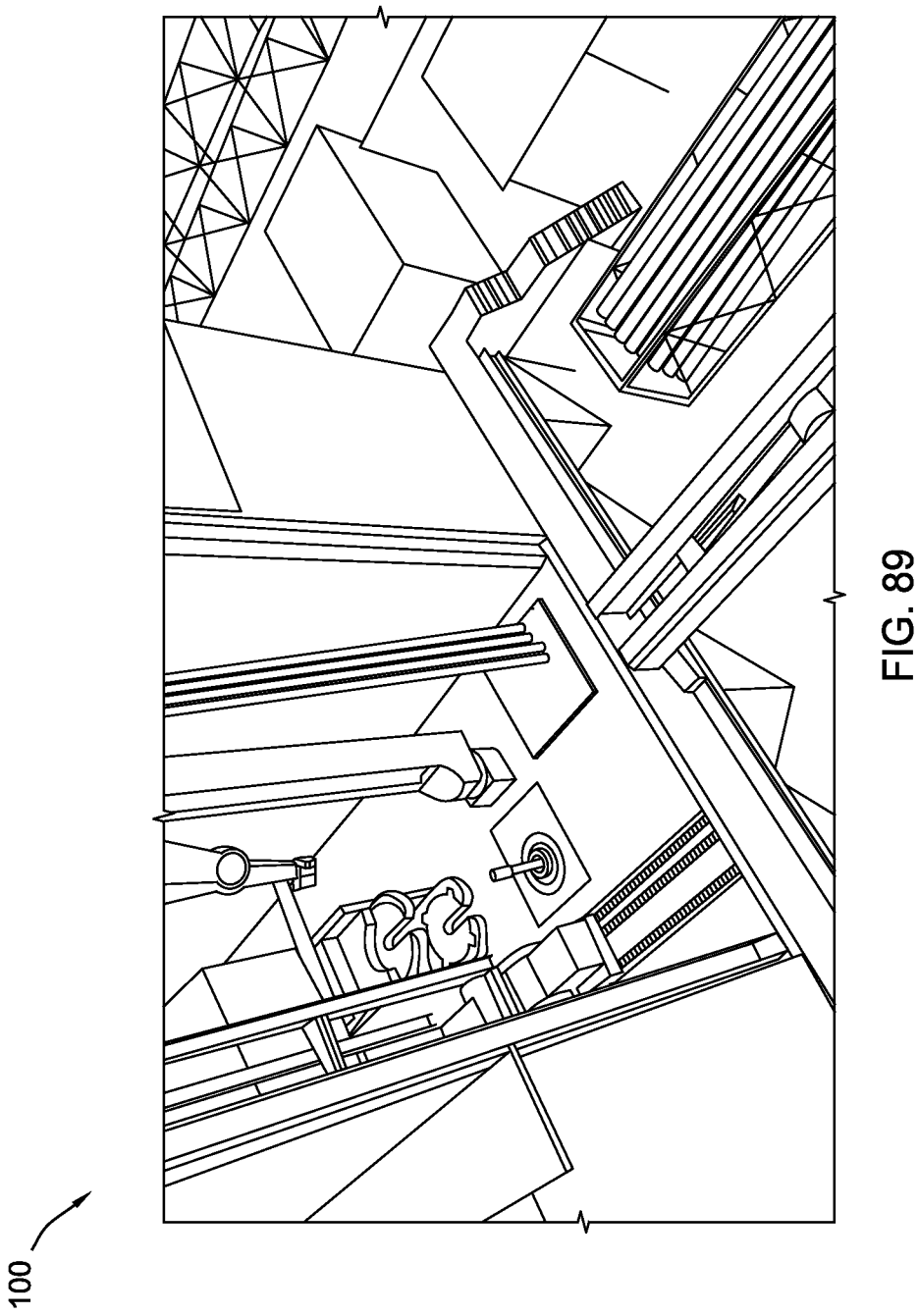

At step 19202, the system 100 can open the grippers on the LTH 420 and the UTH 422 of the VTHS 400 (FIG. 85). At step 19204, the system 100 can transfer the next drill pipe 206 to the elevator 850 of the TDS 800. At step 19206, the system 100 can retract the arms of the LTH 420 and the UTH 422 of the VTHS 400 (FIG. 86). At step 19208, the system 100 can return the iron roughneck 600 to a neutral or standby position (FIG. 87). Thereafter, at step 19210, the system 100 can lower the TDS 800 toward the well center area 508. Then, the method 16800 can end. It is to be understood that the system 100 can lower the TDS 800, at step 19210, while returning the iron roughneck 600 to the neutral position, at step 19208.

FIG. 193 through FIG. 199 include a series of flowcharts that depict another method 19300 of conducting a subterranean operation. Throughout the description of these flowcharts, elements that appear in the FIG. 1 through FIG. 167 are referenced. The elements referenced are capable of performing the particular operation or function mentioned in the flowchart step. Further, there are parenthetical notations with specific figures referenced. These parenthetical notations indicate the specific figure (in FIG. 1 through FIG. 167) in which the performance of a particular operation or function is depicted. It is to be understood that the elements and figures referenced are examples and the system 100 is not limited to only the particular element cited performing the operation or function. Moreover, any figures referenced provide examples of how the performance of a particular step may appear and are not intended to be limiting as to the only manner in which a step may be performed. Also, some steps may not appear in the figures.

Figure 90:
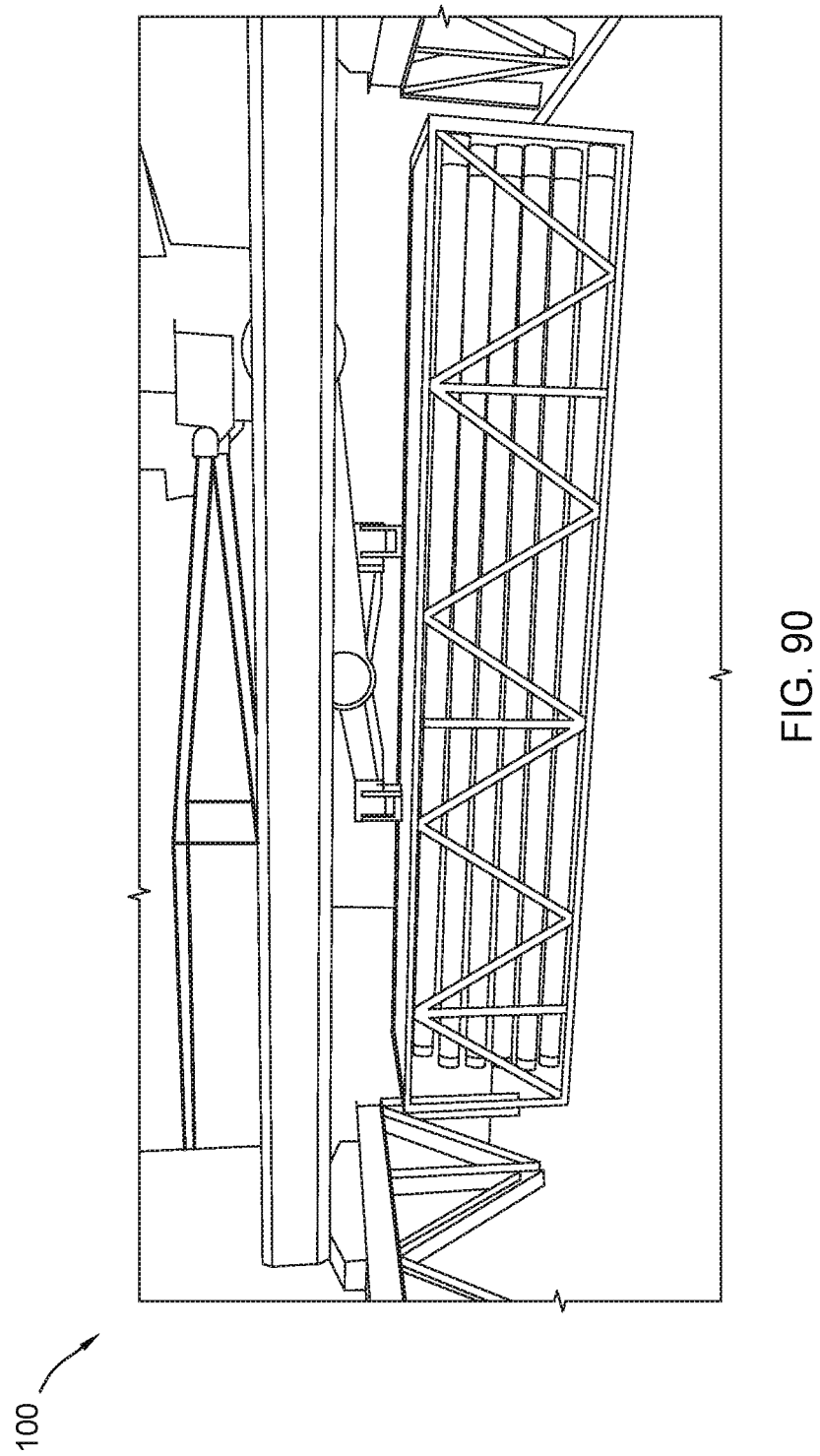
Figure 91:
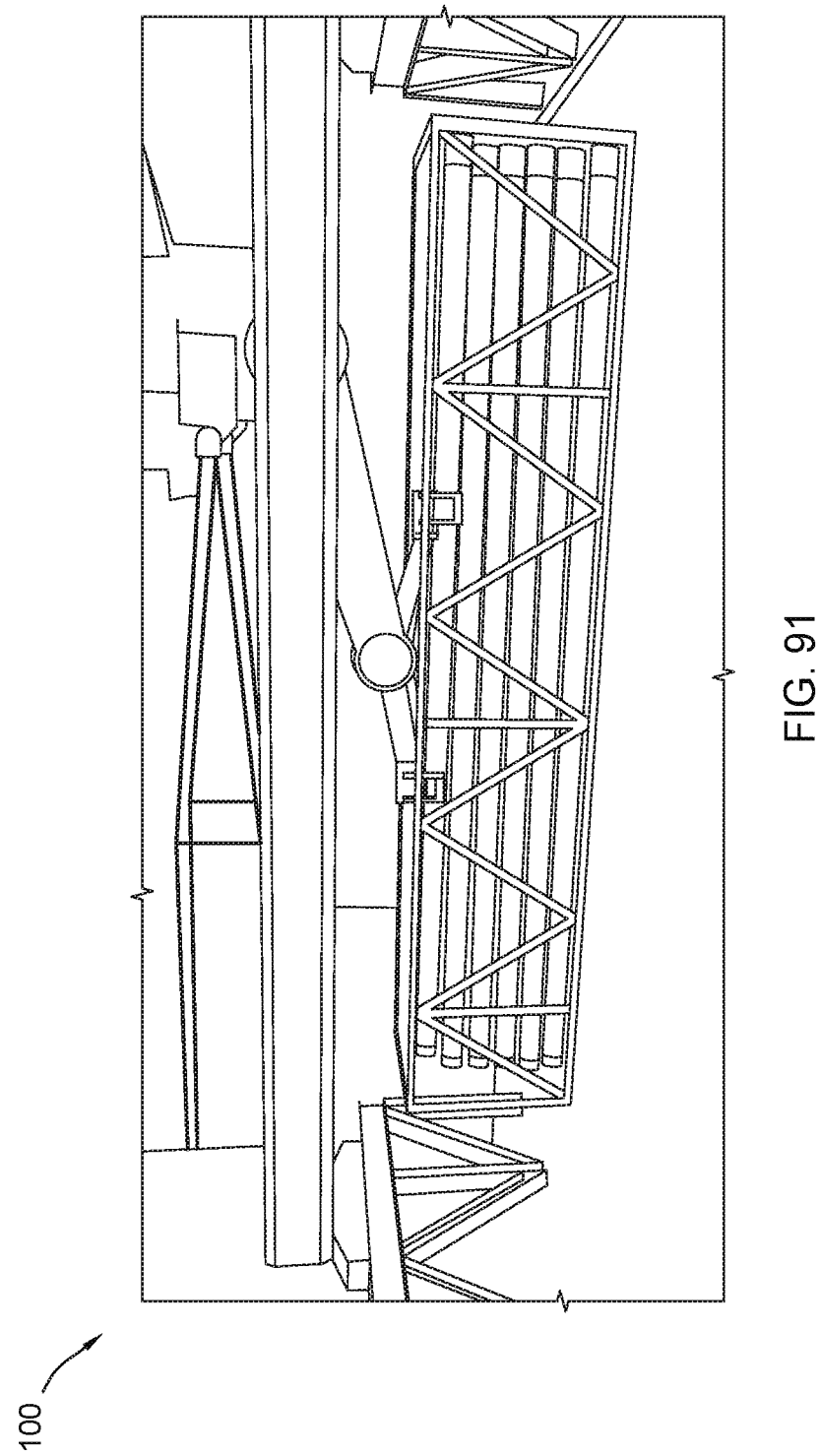
Figure 92:
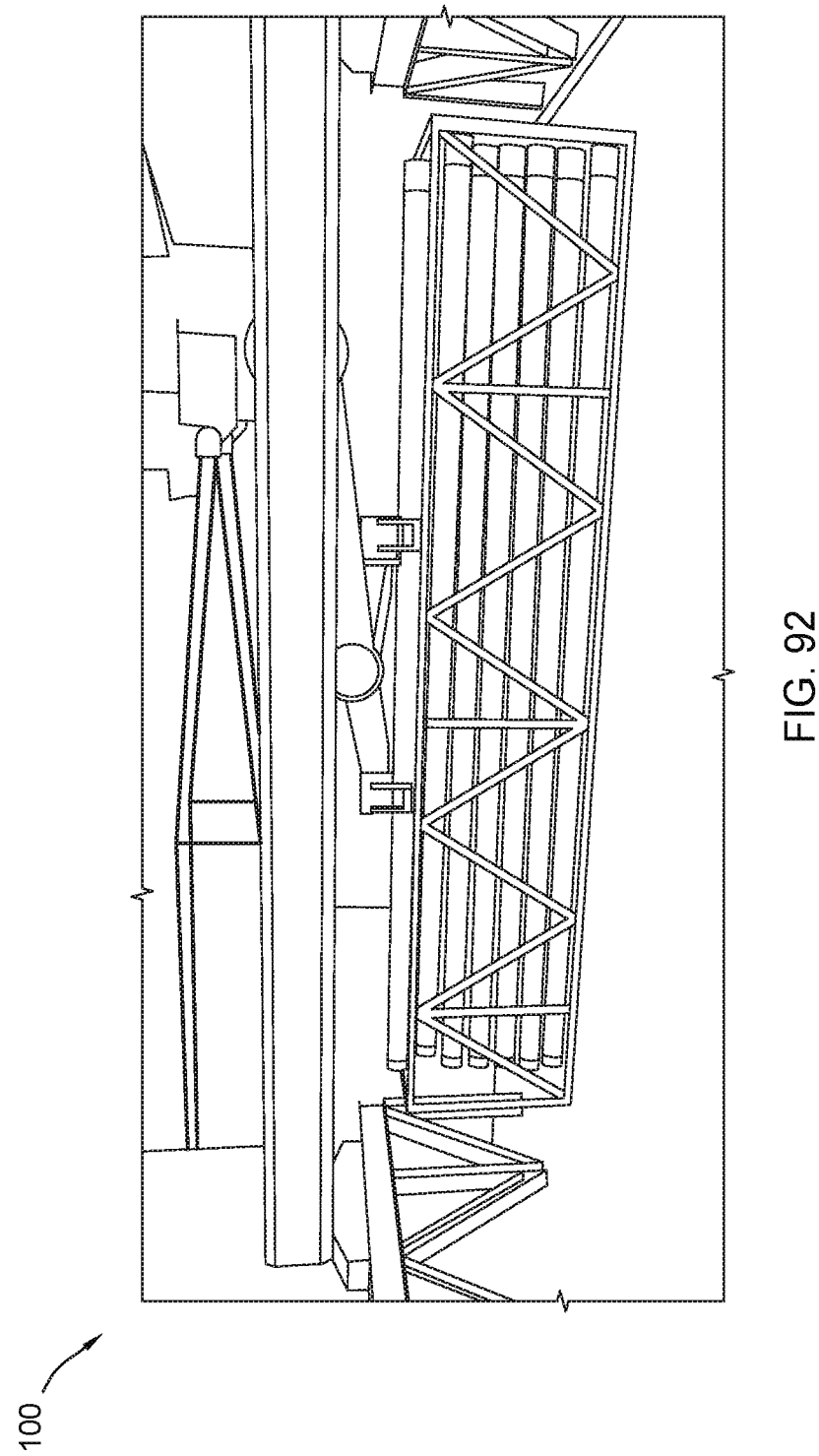
Figure 93:
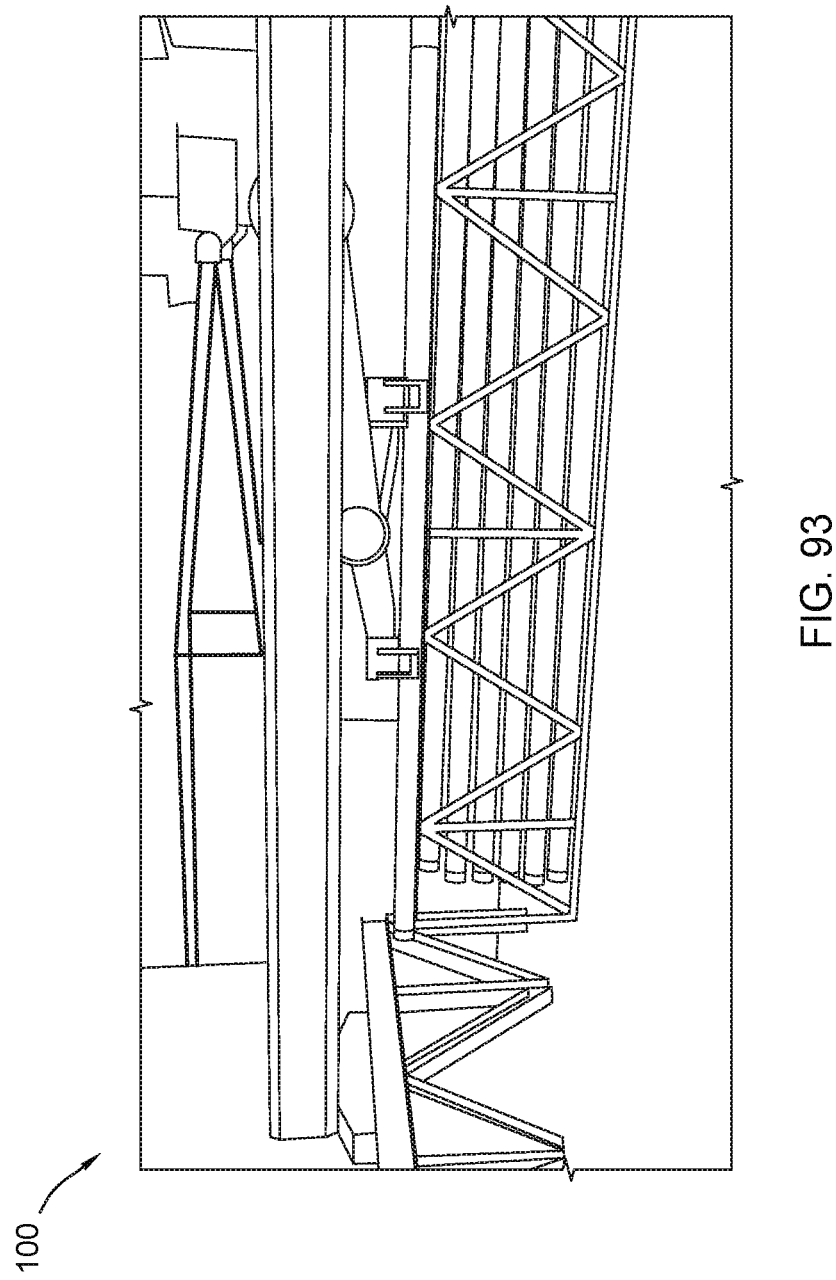
Figure 94:
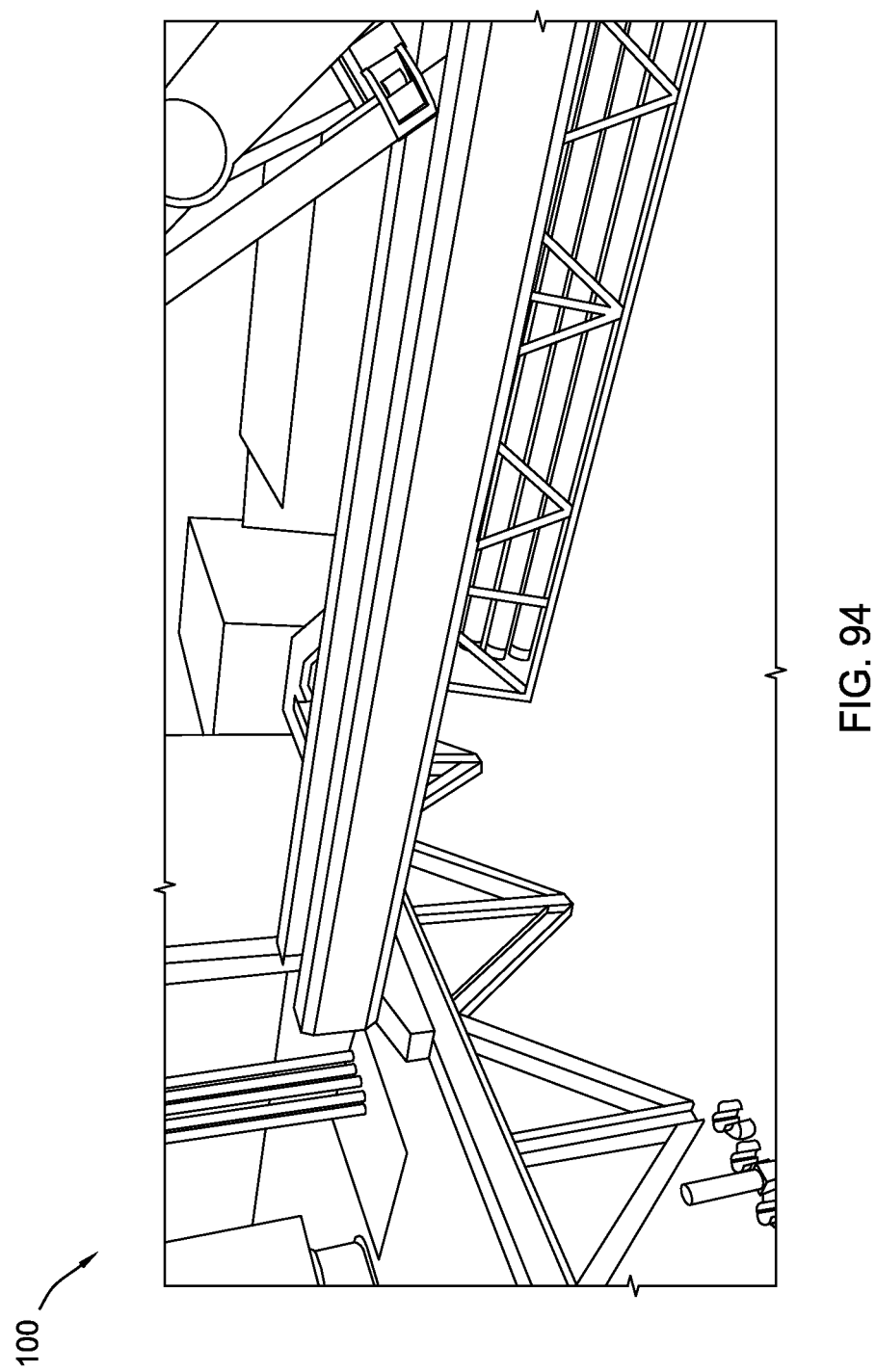

Beginning at step 19302, the system 100 can move the HTHS 230 in a first direction along a first horizontal axis to a position over a horizontal casing 214 storage rack (FIG. 90). At step 19304, the system 100 can move the transverse member 242 in the HTHS 230 along the bridge of the HTHS 230 in a second direction along a second horizontal axis perpendicular to the first horizontal axis. At step 19306, the system 100 can rotate the arm 244 of the HTHS 230 down and outward from the bridge of the HTHS 230 (FIG. 90). At step 19308, the system 100 can open the first gripper 280 and the second gripper 282 on the arm 244 of the HTHS 230 (FIG. 90). Further, at step 19310, the system 100 can move the first and second grippers 280, 282 into position around the casing 214 so that the first gripper and the second gripper span the center of the casing 214 (FIG. 91). At step 19312, the system 100 can close the grippers 280, 282 around the casing 214. Moreover, at step 19314, the system 100 can verify that the casing 214 is engaged with the grippers 280, 282 on the arm 244 of the HTHS 230. At step 19316, if the casing 214 is engaged with grippers 280, 282, the method 19300 can proceed to step 19318 and the system 100 can adjust the grippers 280, 282. Then, the method 19300 can return to step 19314 and continue as described herein. Returning to step 19316, if the casing 214 is engaged with the grippers 280, 282, the method 19300 can proceed to step 19320 and the system 100 can retrieve the casing 214 from the horizontal casing 214 storage rack 212 (FIG. 92). At step 19322, the system 100 can move the HTHS 230 in a second direction along the first horizontal axis away from the horizontal BHA storage rack 208 and toward the horizontal transfer position.

Figure 95:
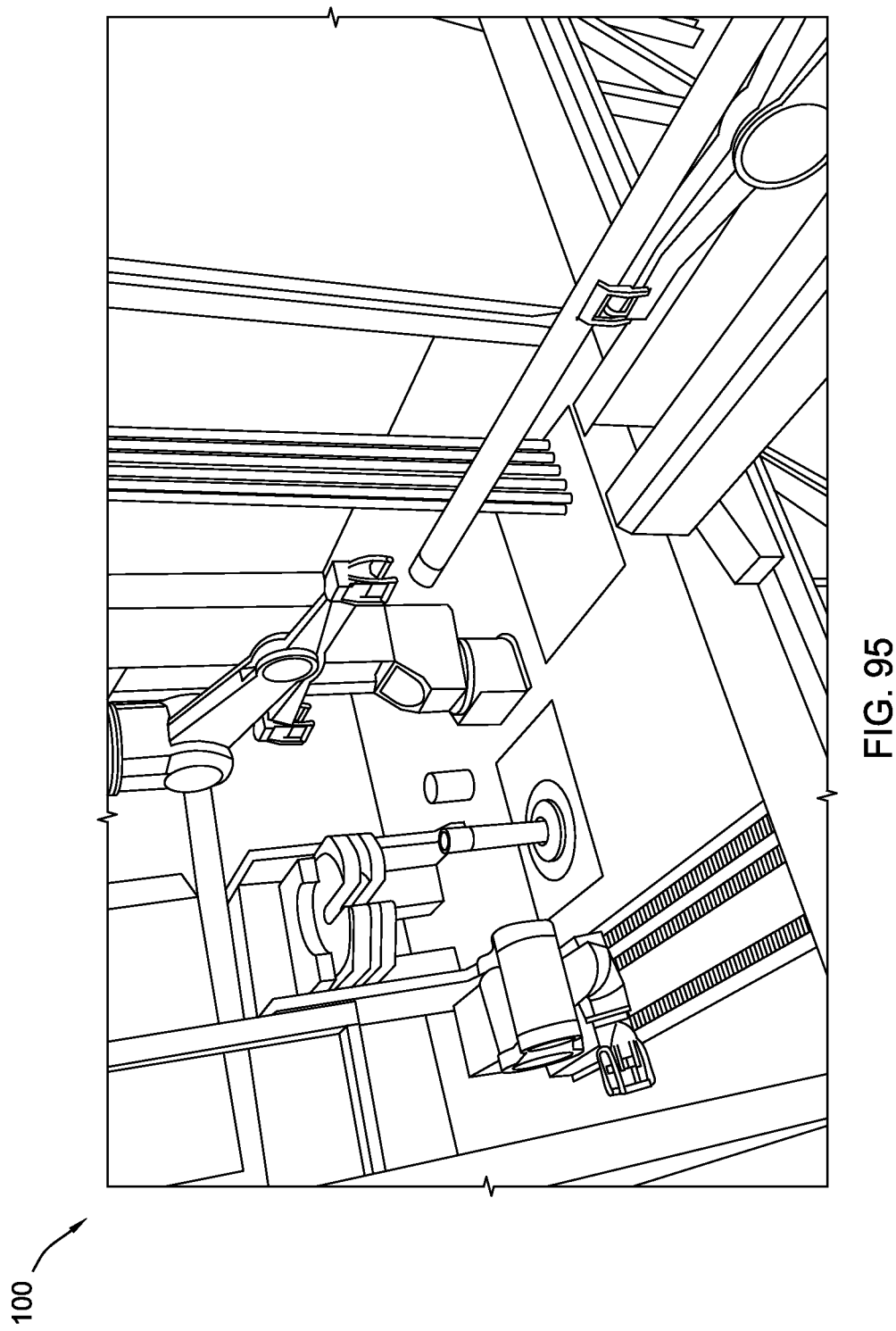
Figure 96:
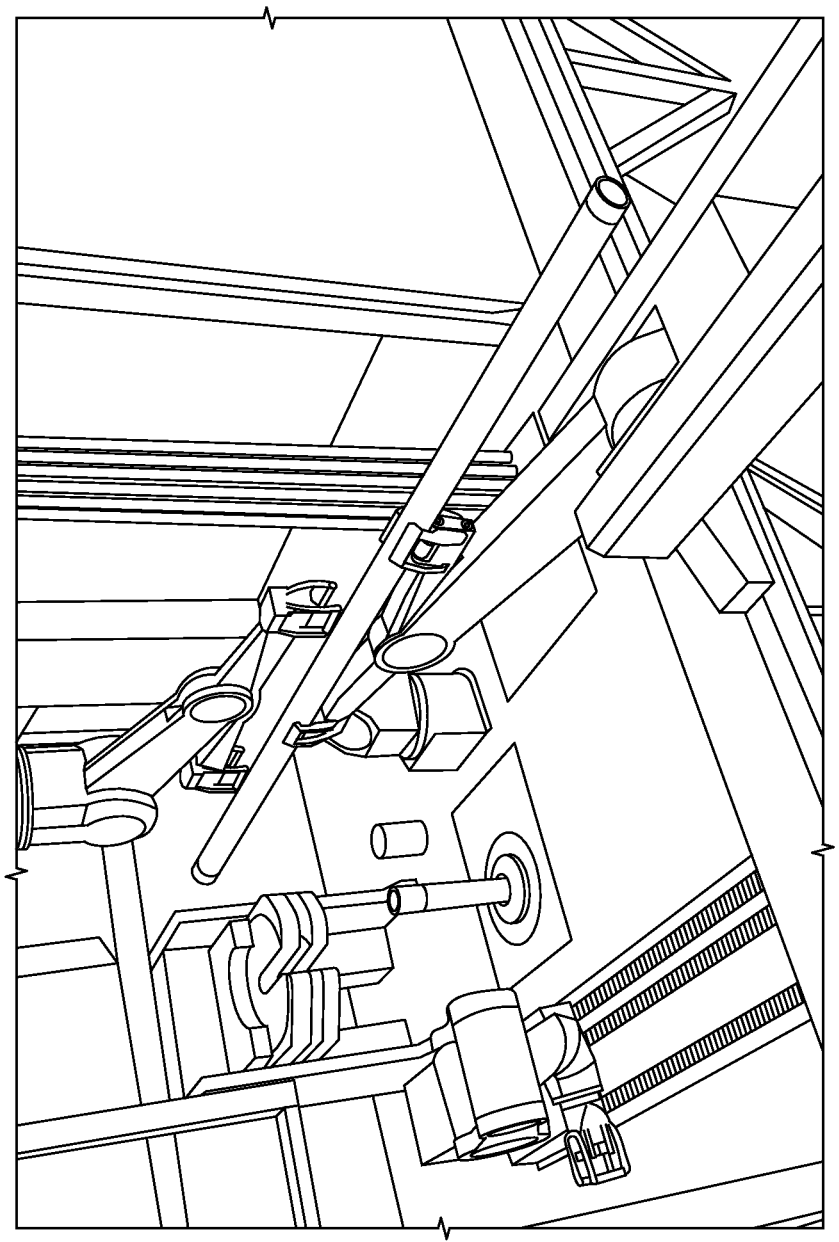
Figure 194:
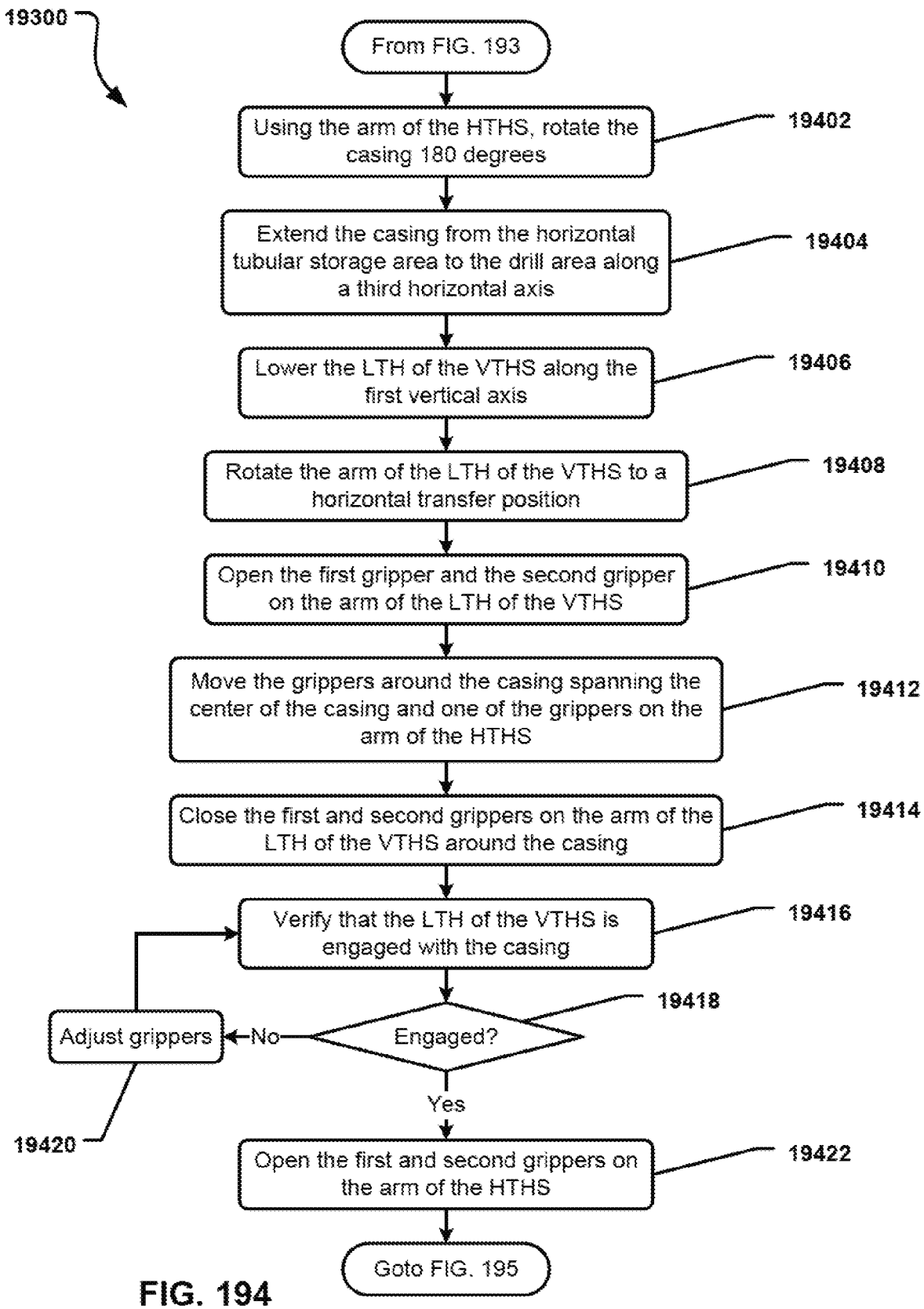

Proceeding to step 19402, depicted in FIG. 194, the system 100, using the arm 244 of the HTHS 230, can rotate the casing 214 approximately 180 degrees (FIG. 95). At step 19404, the system 100 can extend the casing 214 from the horizontal tubular storage area 200 to the well bore area 300 in along a third horizontal axis (FIG. 96).

Figure 97:
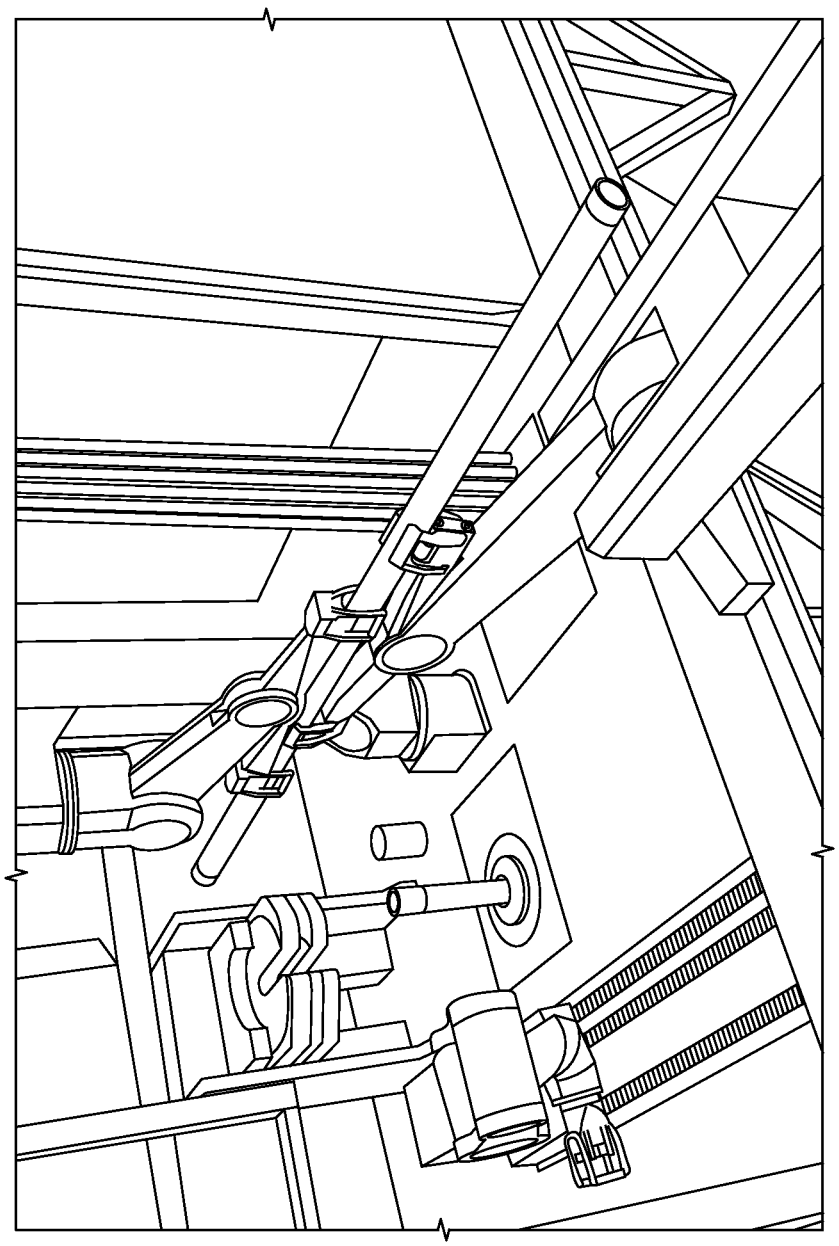
Figure 98:
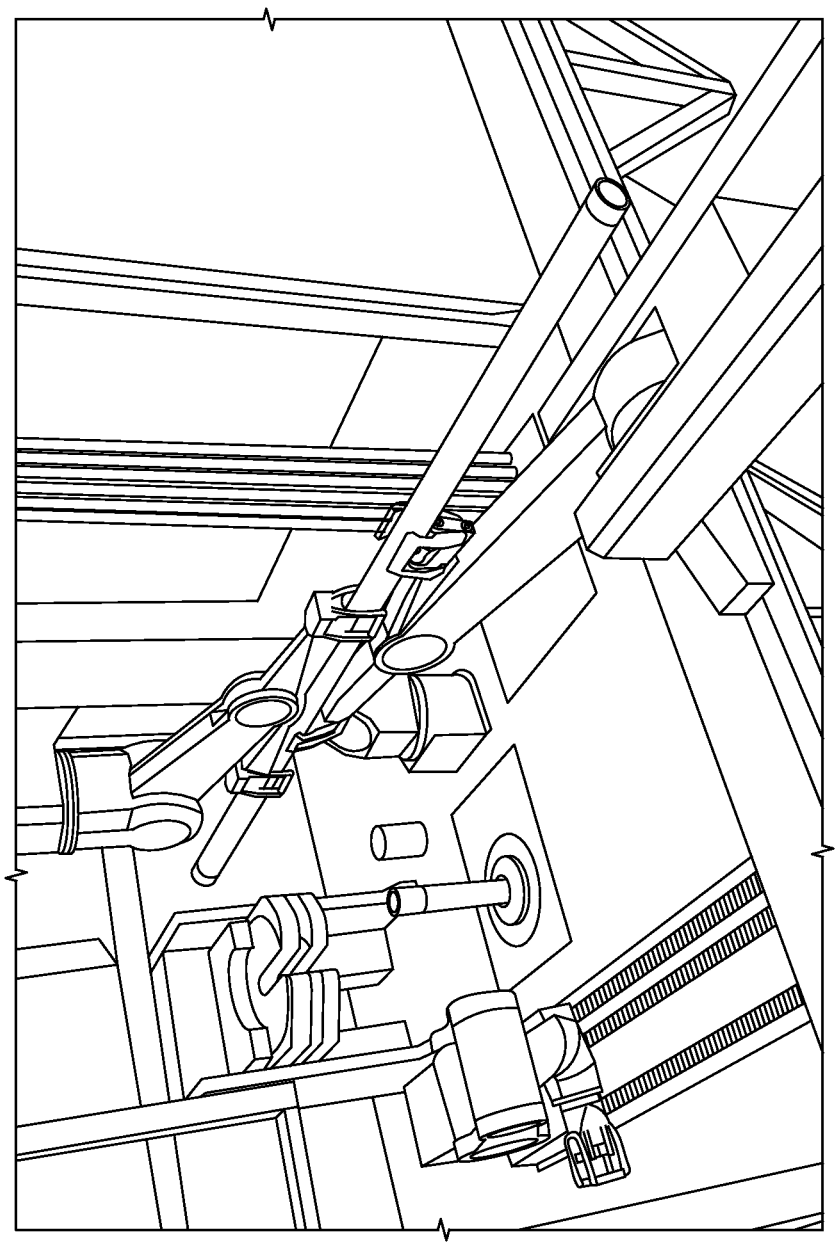

While performing one or more of steps 19302 through 19404 with the HTHS 230, the system 100 can perform one or more of steps 19406 through 19420 with the VTHS 400. Specifically, at step 19406, the system 100 can lower the LTH 420 of the VTHS 400 along the first vertical axis (FIG. 95). At step 19408, the system 100 can rotate an arm 430 of the LTH 420 of the VTHS 400 to a horizontal transfer position (FIG. 96). Further, at step 19410, the system 100 can open a first gripper 482 and a second gripper 484 on the arm 430 of the LTH 420 of the VTHS 400. At step 19412, the system 100 can move the grippers 482, 484 around the casing 214 spanning the center of the casing 214 and one of the grippers 280, 282 on the arm 244 of the HTHS 230 (FIG. 97). At step 19414, the system 100 can close the first and second grippers 482, 484 on the arm 430 of the LTH 420 of the VTHS 400 around the casing 214. At step 19416, the system 100 can verify that the LTH 420 of the VTHS 400 is engaged with the casing 214. At step 19418, if the LTH 420 is not engaged with the casing 214, the method 19300 can move to step 19420 and the system 100 can adjust the grippers 482, 284. Thereafter, the method 19300 can return to step 19416 and continue as described. On the other hand, at step 19418, if the LTH 420 is engaged with the casing 214, the method 19300 can proceed to step 19422 and the system 100 can open the first 280 and second grippers 282 on the arm 244 of the HTHS 230 (FIG. 98).

Figure 99:
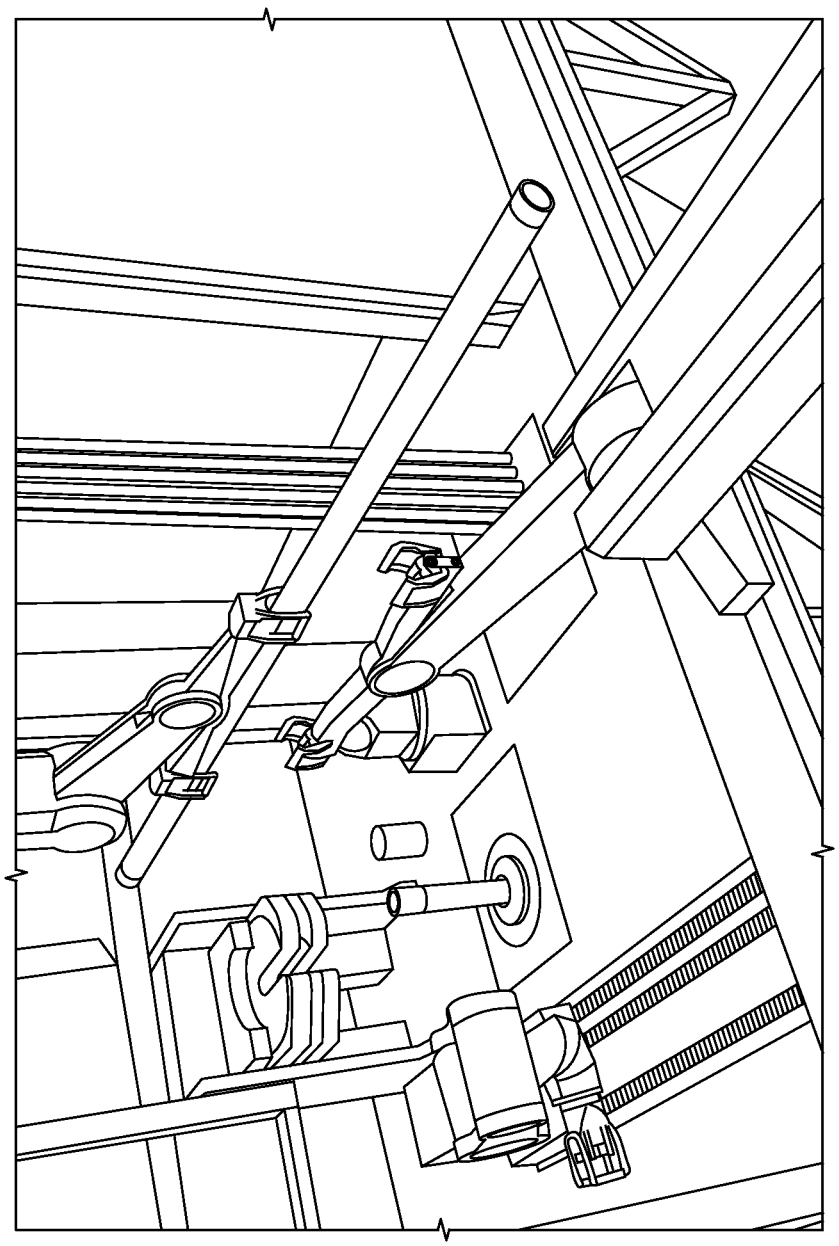
Figure 100:
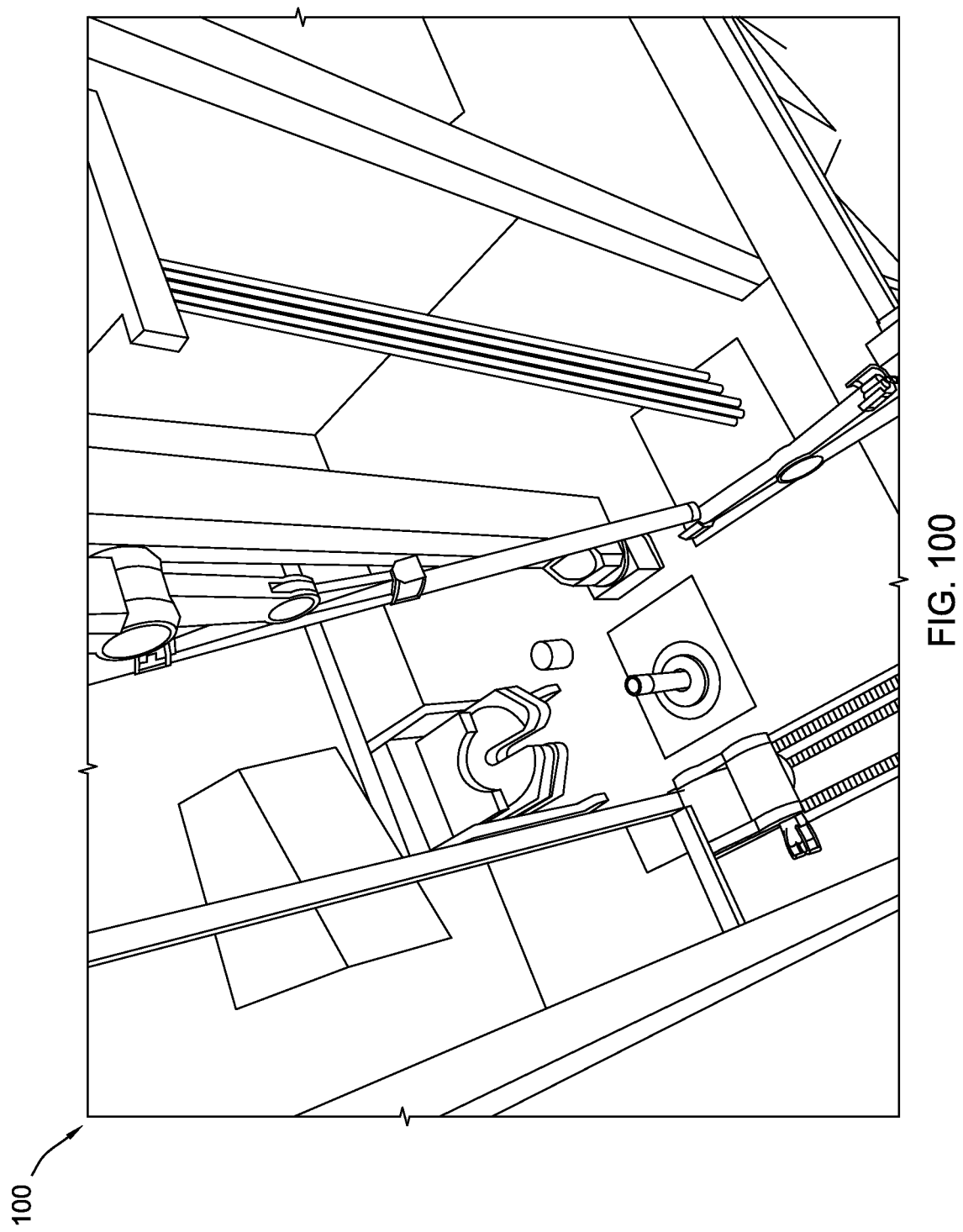
Figure 101:
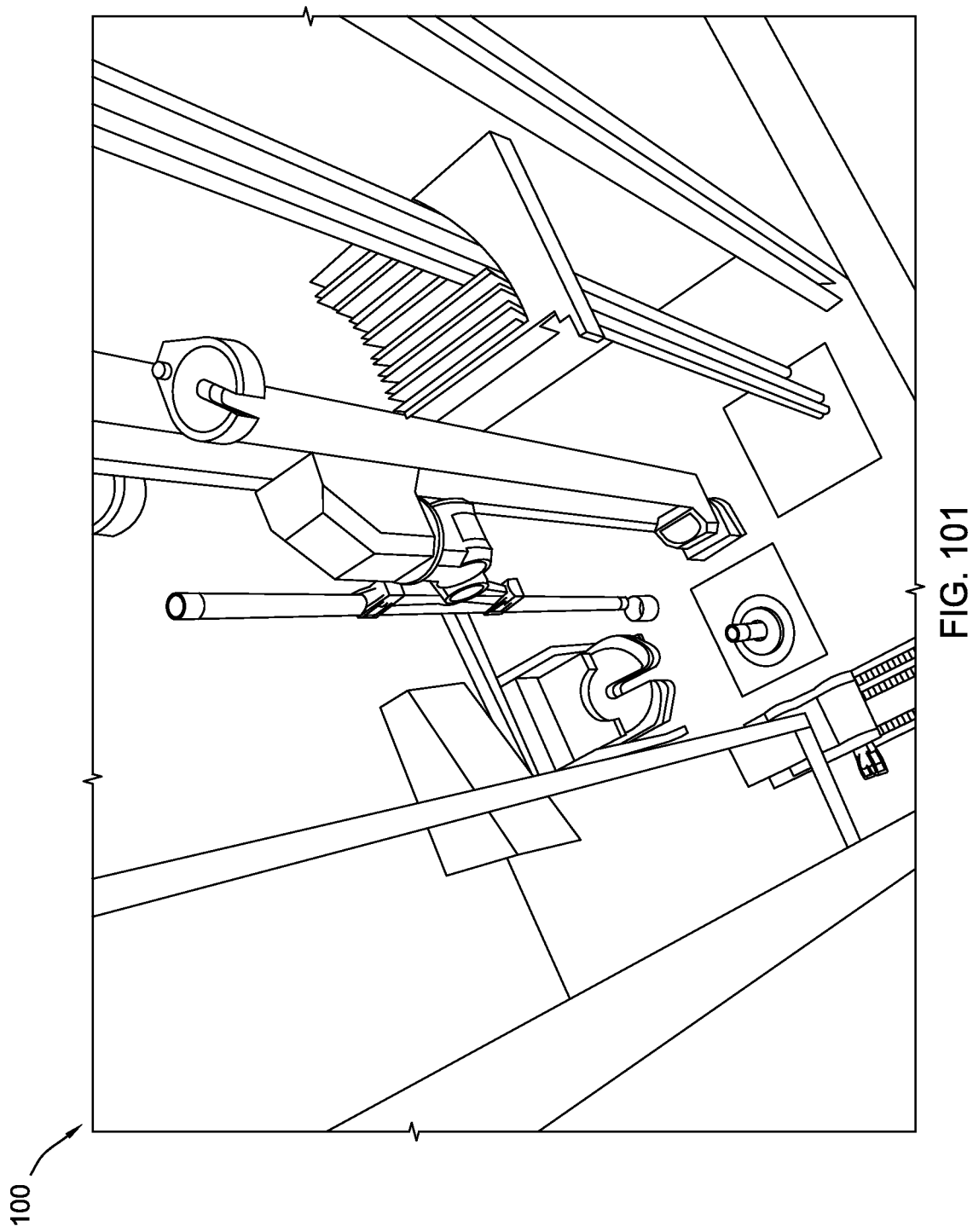
Figure 102:
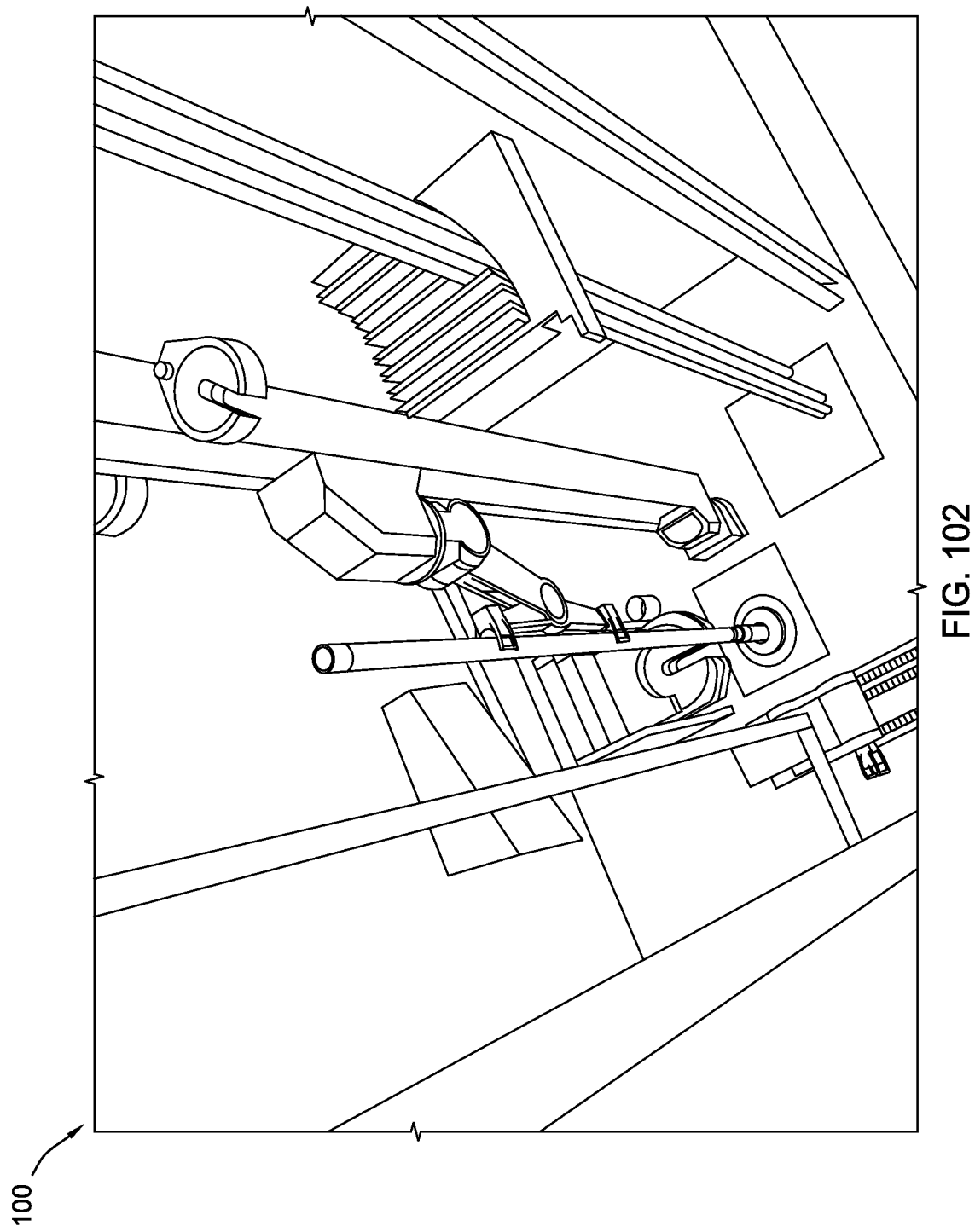
Figure 103:
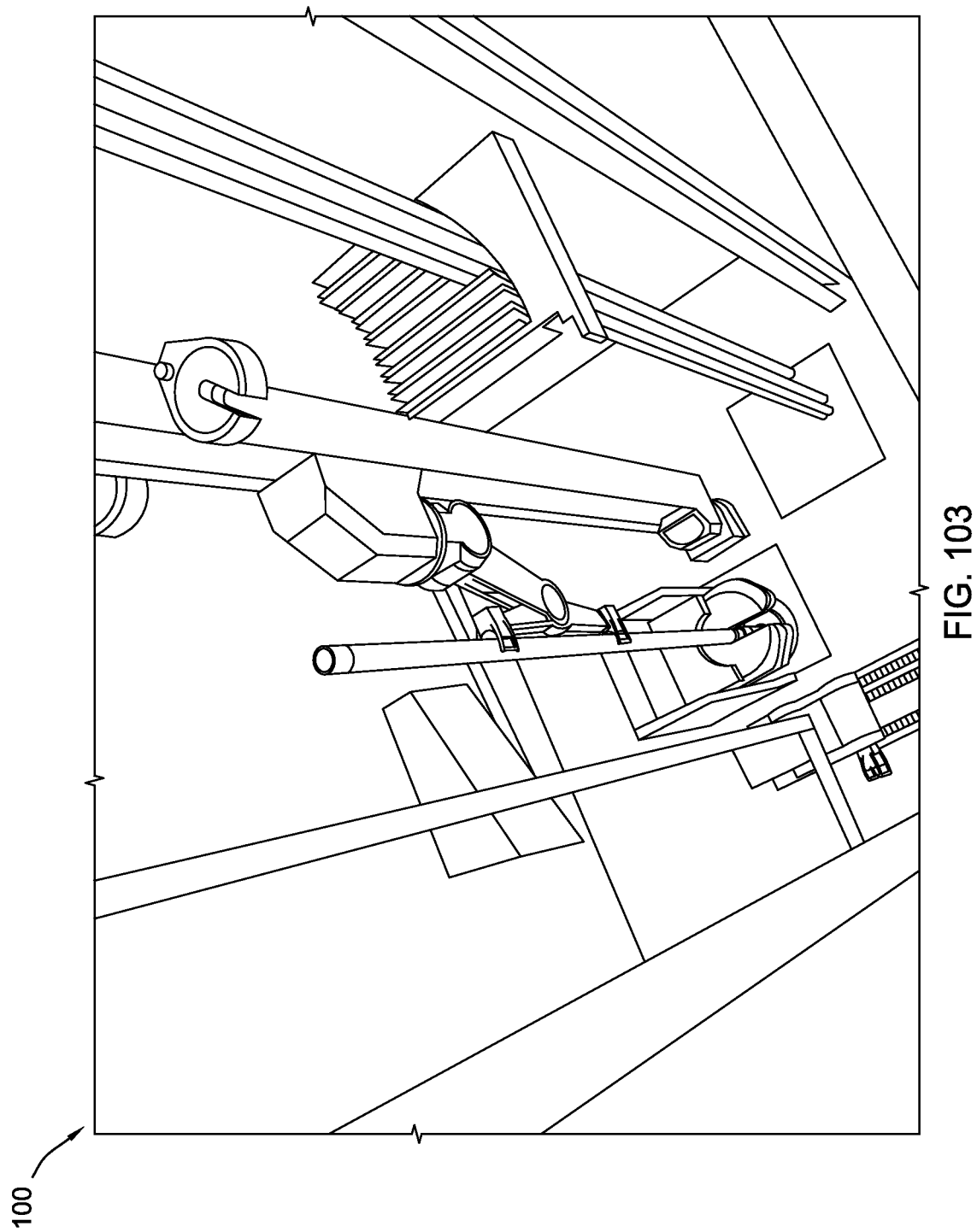
Figure 104:
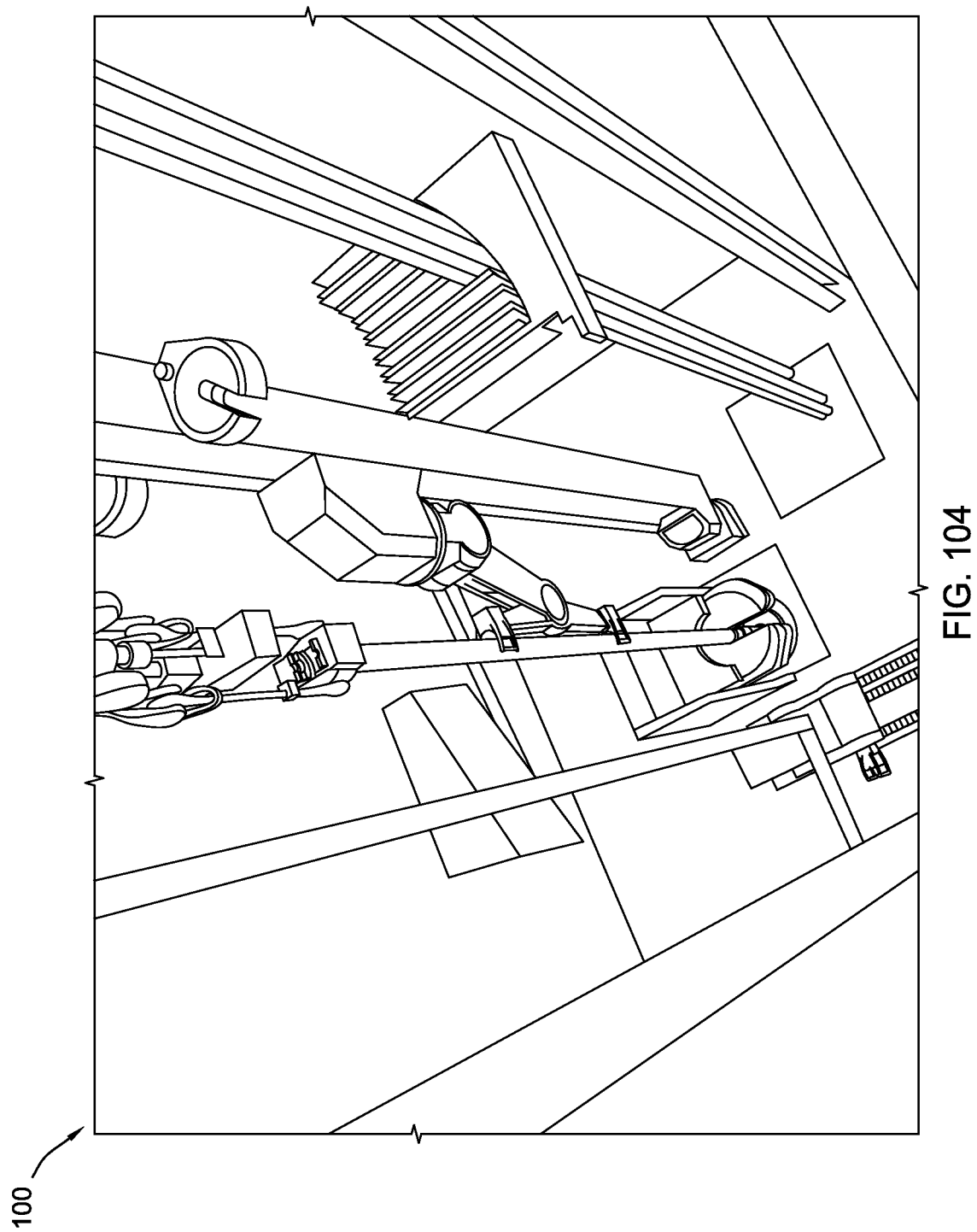
Figure 105:
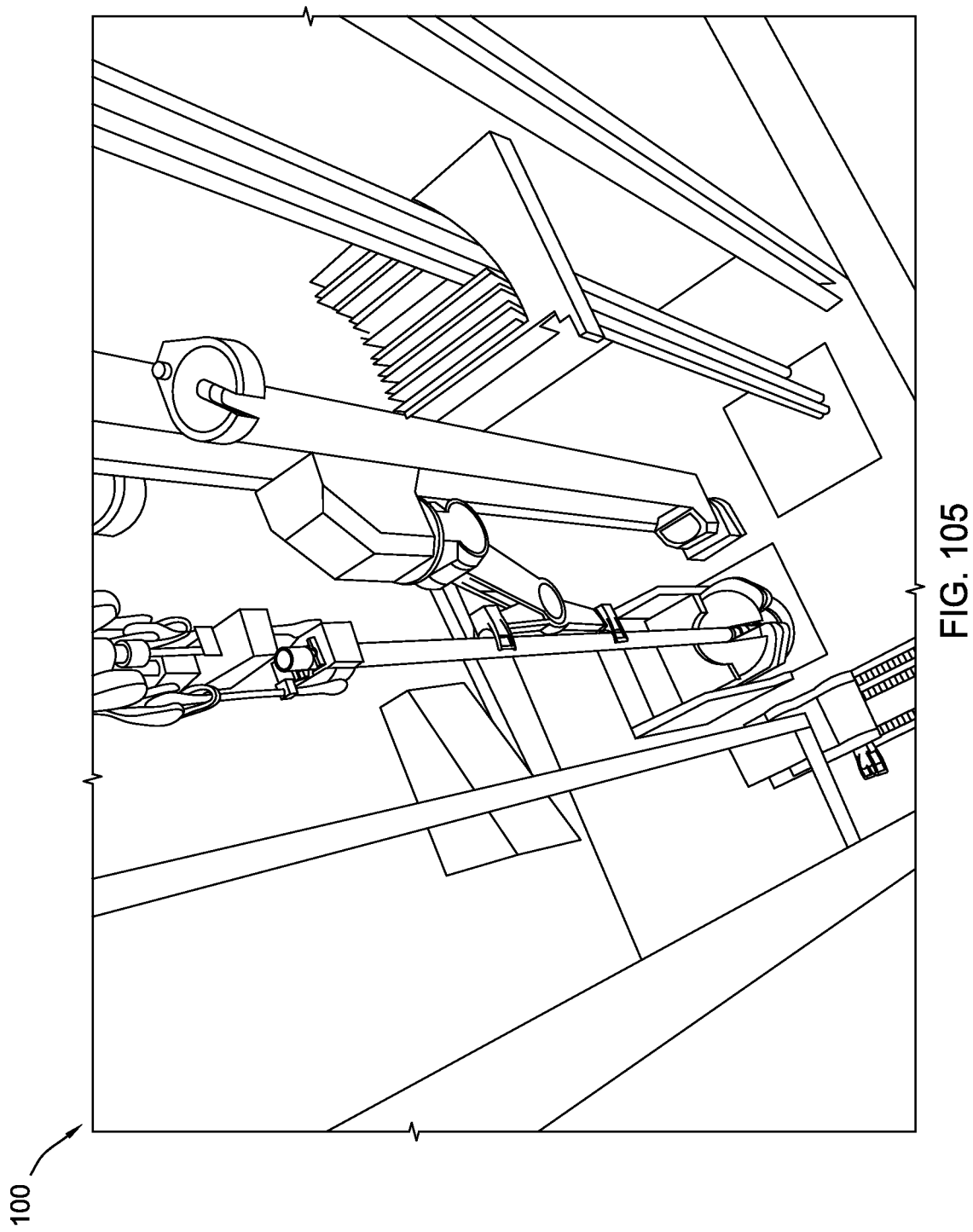
Figure 195:
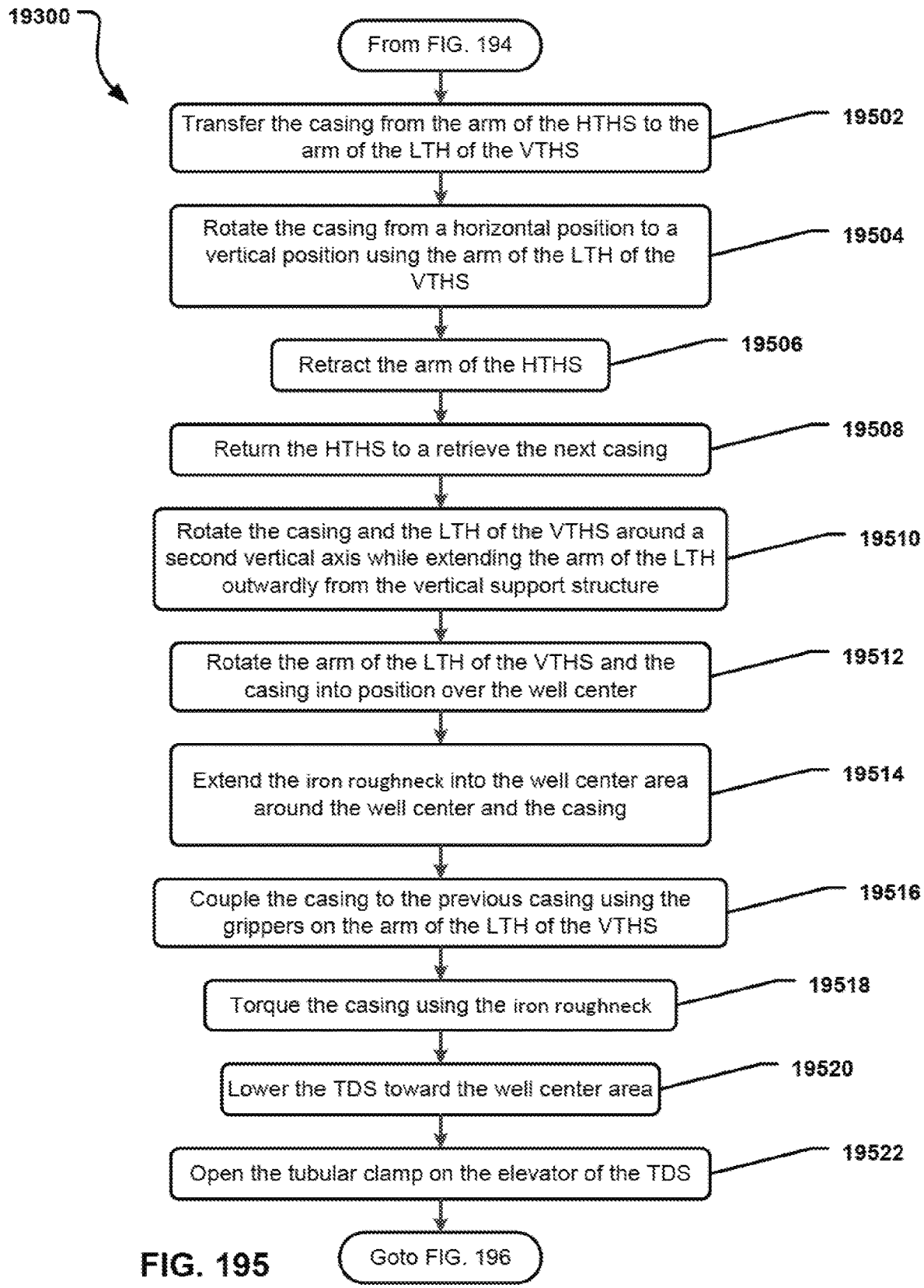

Moving to FIG. 195, at step 19502, the system 100 can transfer the casing 214 from the arm 244 of the HTHS 230 to the arm 430 of the LTH 420 of the VTHS 400 (FIG. 99). At step 19504, the system 100 can rotate the casing 214 from a horizontal position to a vertical position using the arm 430 of the LTH 420 of the VTHS 400 (FIG. 100). While rotating the casing 214 at step 19504, the system 100 can retract the arm 244 of the HTHS 230 (FIG. 100) at step 19506 and at step 19508, the system 100 can return the HTHS 230 to retrieve the next casing 214. Further, at step 19510, the system 100 can rotate the casing 214 and the LTH 420 of the VTHS 400 around a second vertical axis while extending the arm 430 of the LTH 420 outwardly from the vertical support structure 402 (FIG. 101). At step 19512, the system 100 can rotate the arm 430 of the LTH 420 of the VTHS 400 and the casing 214 into position over the well center (FIG. 102). At essentially the same time, at step 19514, the system 100 can extend the iron roughneck 600 into the well center area 508 around the well center and the casing 214. At step 19516, the system 100 can couple the casing 214 to the previous casing 214 using the grippers on the arm 430 of the LTH 420 of the VTHS 400 (FIG. 103). At step 19518, the system 100 can torque the casing 214 using the iron roughneck 600 (FIG. 105). While torqueing the casing 214, the system 100 can lower the TDS 800 toward the well center area 508 (FIG. 105) at step 19520. Further, at step 19522, the system 100 can open the tubular clamp on the elevator 850 of the TDS 800.

Figure 106:
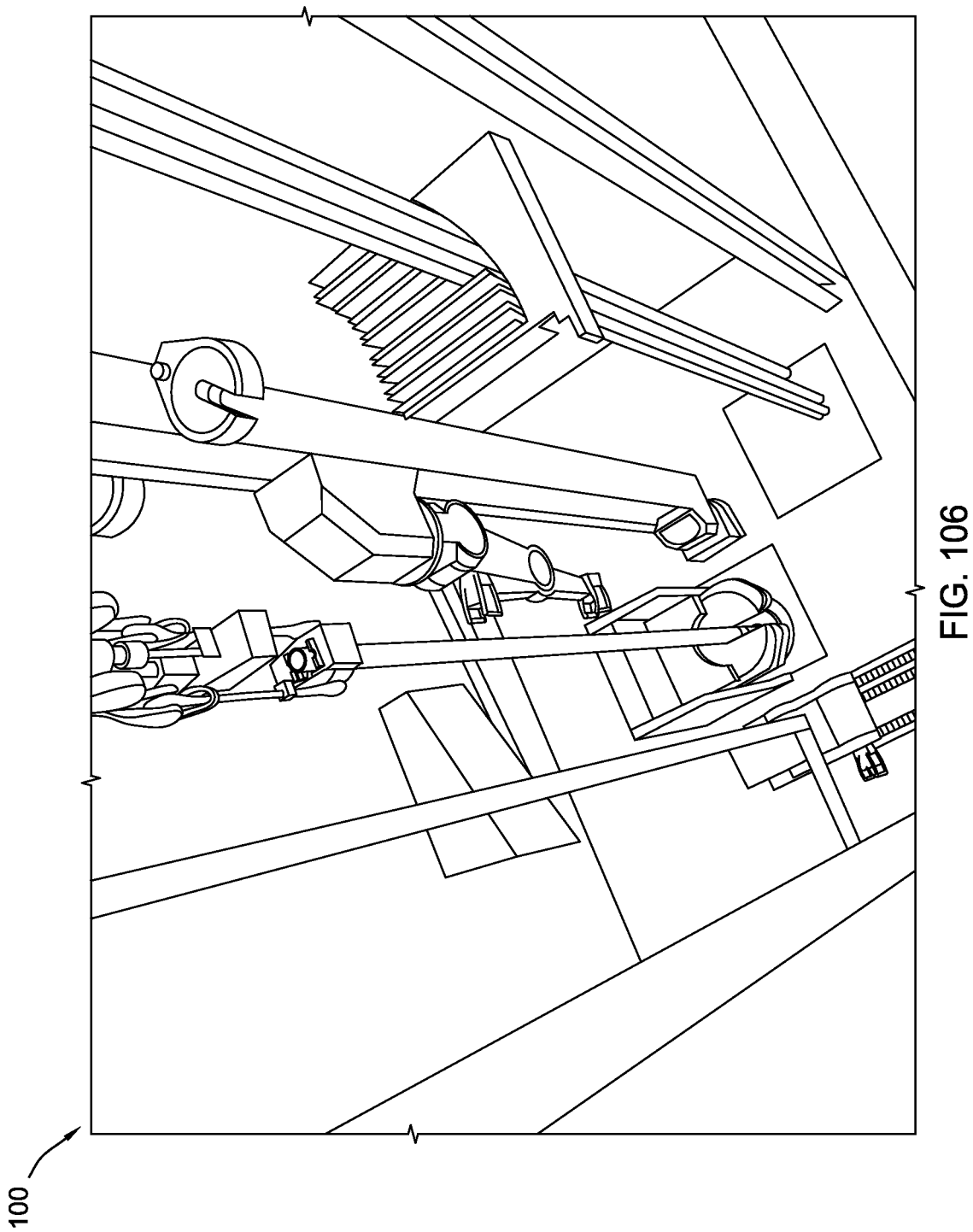
Figure 107:
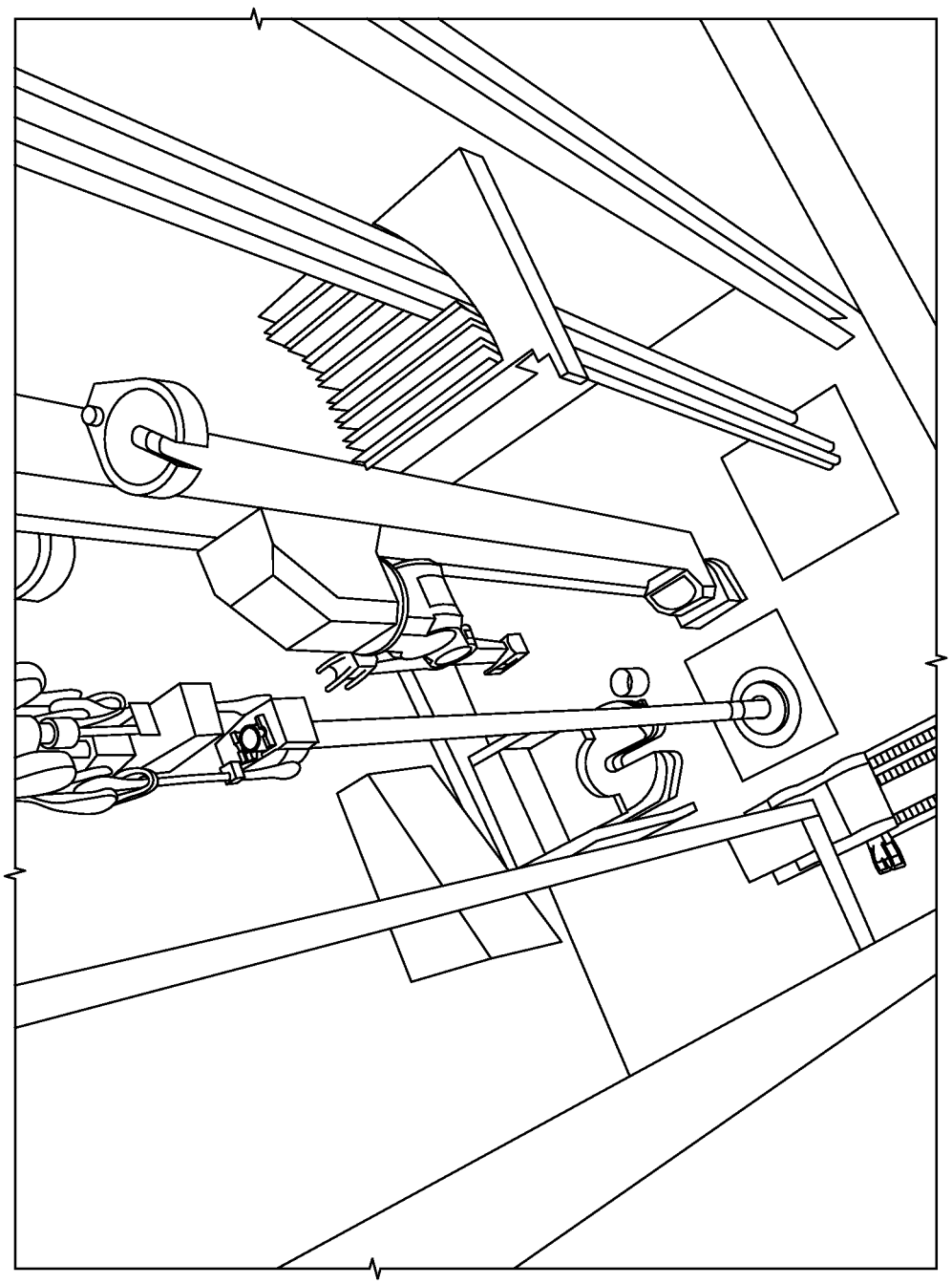
Figure 108:
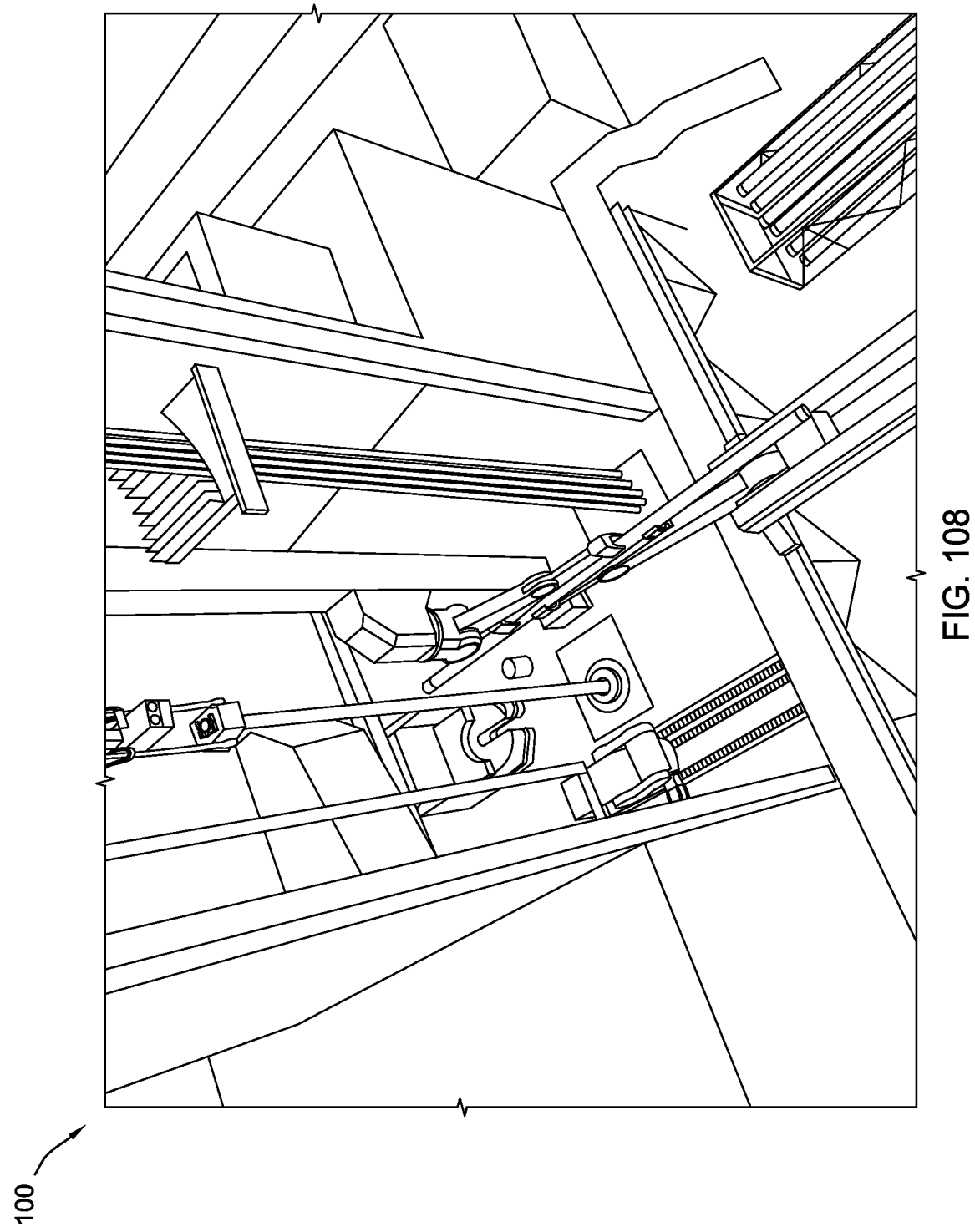
Figure 109:
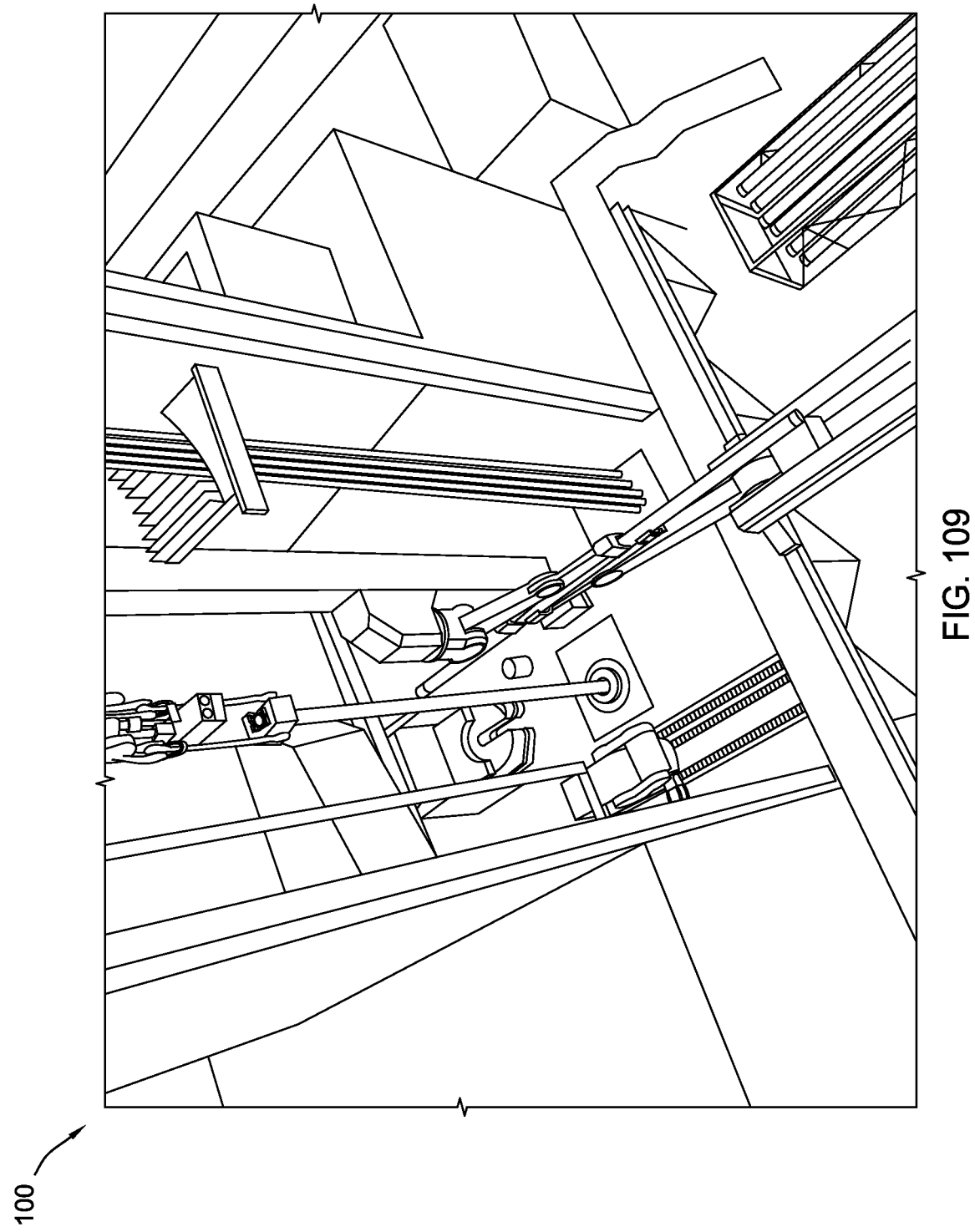
Figure 196:
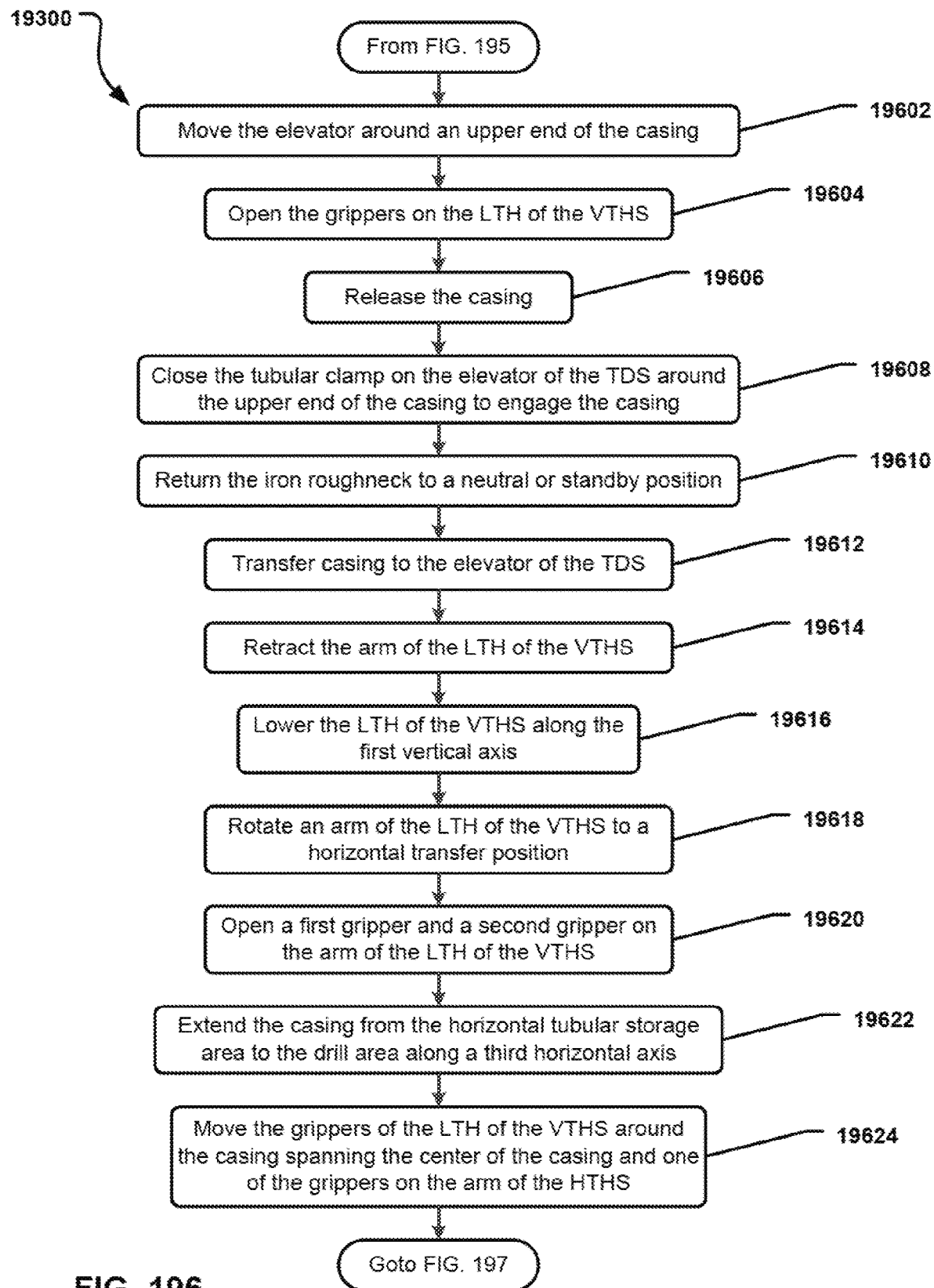
Figure 197:
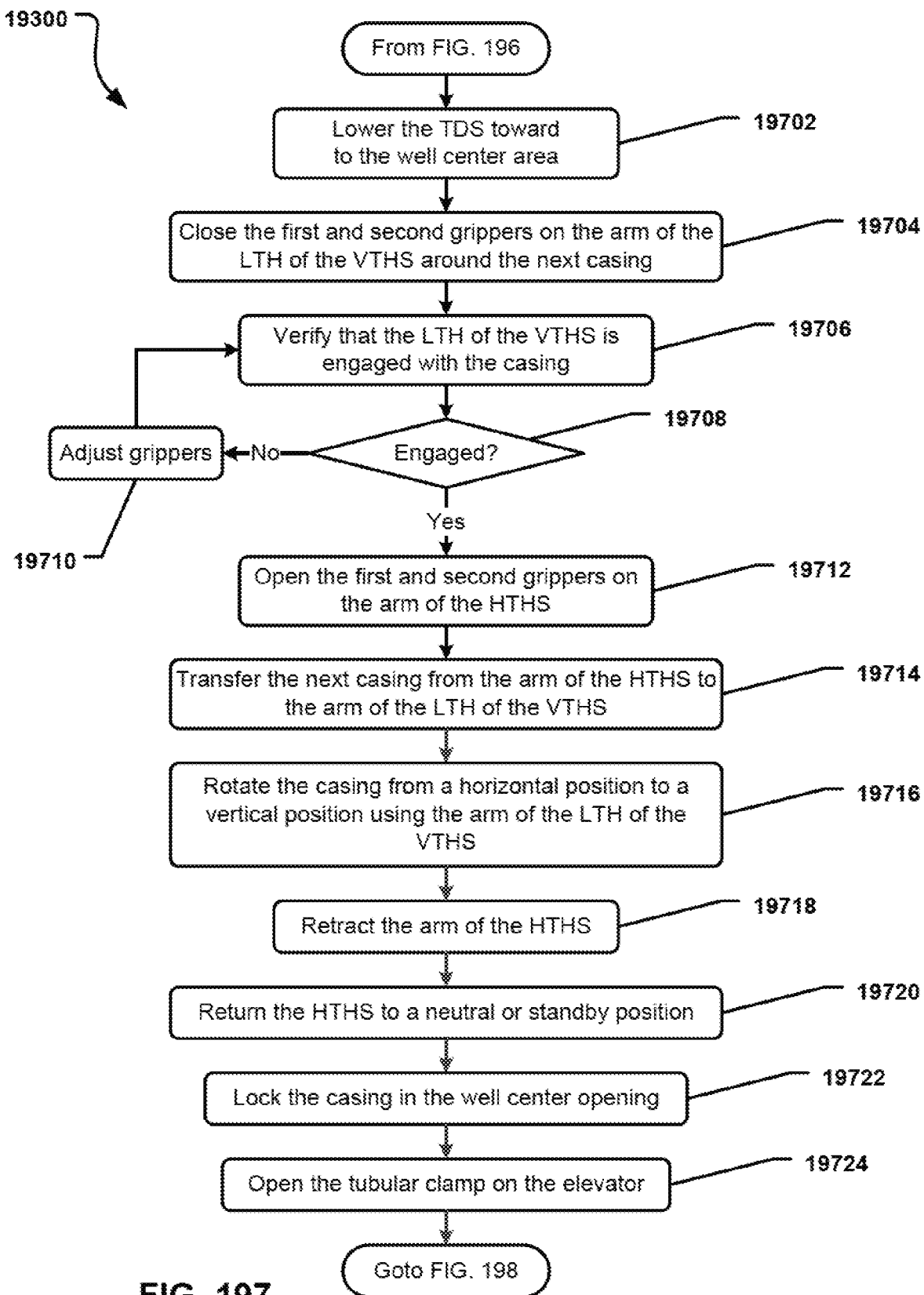

Proceeding to FIG. 196, at step 19602, the system 100 can move the elevator 850 around an upper end of the casing 214 (FIG. 105). At step 19604, the system 100 can open the grippers on the LTH 420 of the VTHS 400 (FIG. 106). At step 19606, the system 100 can release the casing 214 from the LTH 420 (FIG. 106). At step 19608, the system 100 can close the tubular clamp on the elevator 850 of the TDS 800 around the upper end of the casing 214 to engage the casing 214 (FIG. 106). At step 19610, the system 100 can return the iron roughneck 600 to a neutral or standby position (FIG. 107). Further, at step 19612, the system 100 can transfer casing 214 to the elevator 850 of the TDS 800 (FIG. 107) and at step 1614, the system 100 can retract the arm 430 of the LTH 420 of the VTHS 400 (FIG. 107). At step 19616, the system 100 can lower the LTH 420 of the VTHS 400 along the first vertical axis (FIG. 108). Further, at step 19618, the system 100 can rotate an arm 430 of the LTH 420 of the VTHS 400 to a horizontal transfer position (FIG. 108). At essentially the same time, at step 19620, the system 100 can open a first gripper 482 and a second gripper 484 on the arm 430 of the LTH 420 of the VTHS 400 and at step 19622, the system 100 can extend the casing 214 from the horizontal tubular storage area 200 to the well bore area 300 in along a third horizontal axis (FIG. 108). Moreover, at step 19624, the system 100 can move the grippers of the LTH 420 of the VTHS 400 around the casing 214 spanning the center of the casing 214 and one of the grippers on the arm 244 of the HTHS 230 (FIG. 109). Thereafter, the method 19300 can move to step 19702 of FIG. 197.

Figure 110:
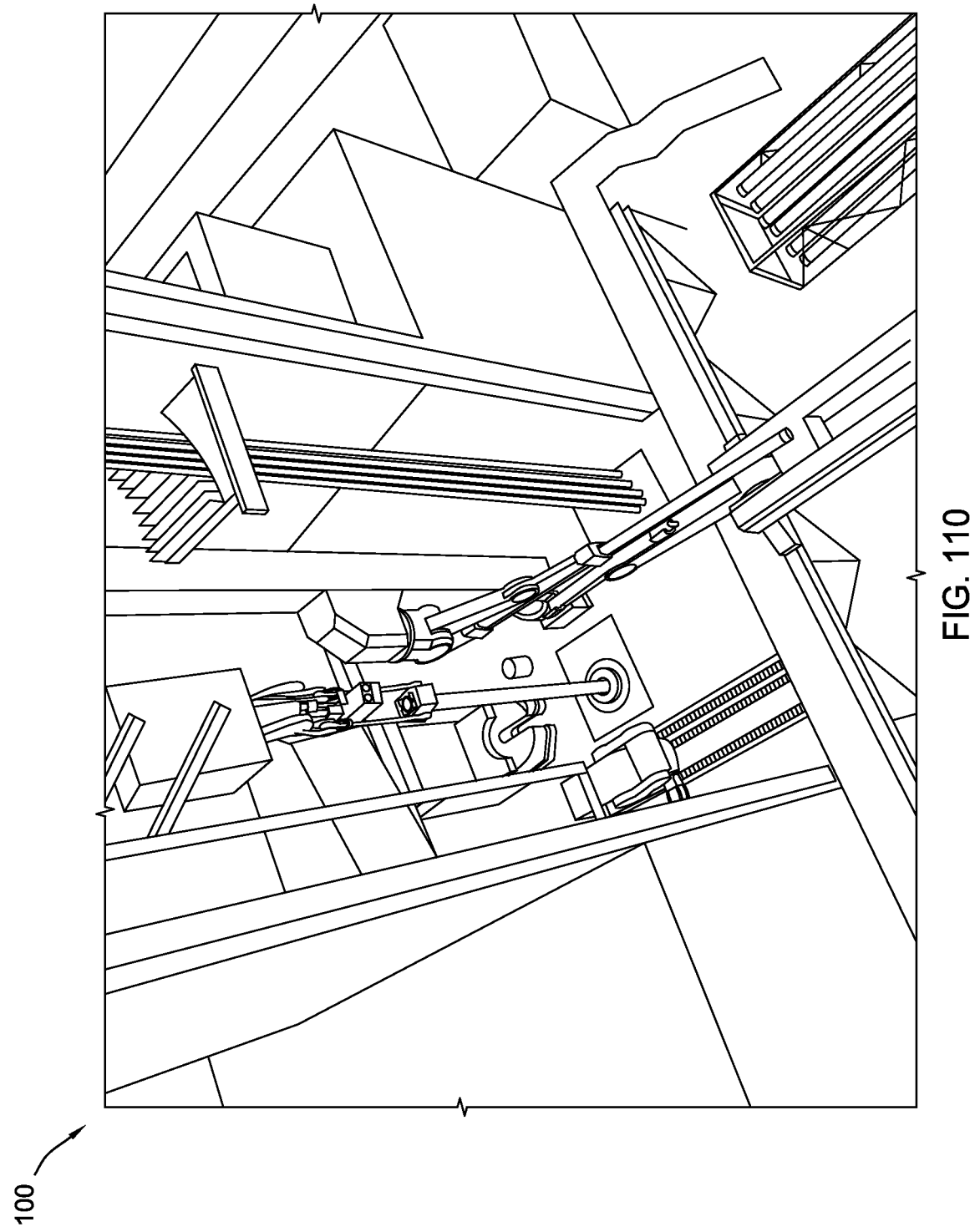
Figure 111:
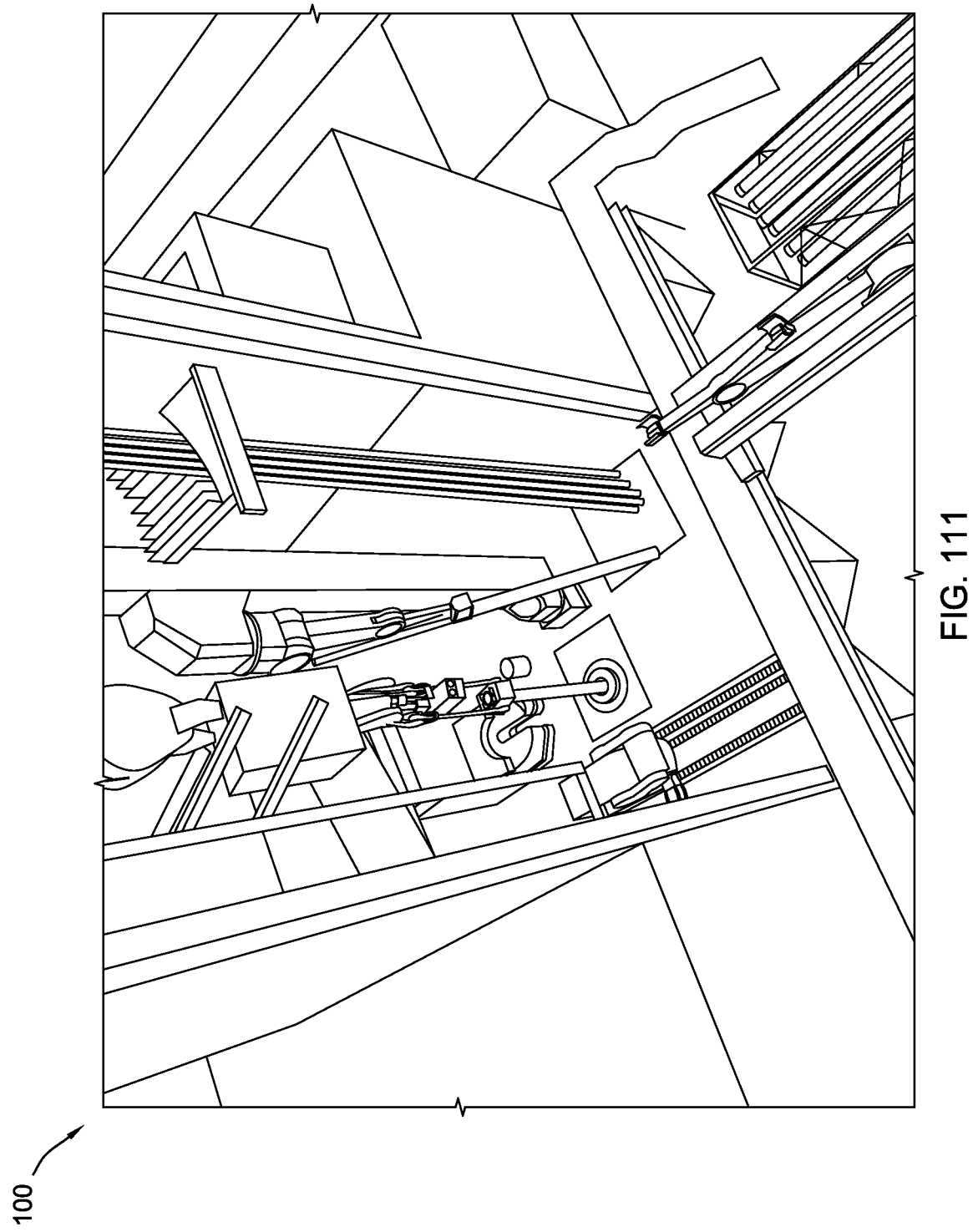

At step 19702, the system 100 can lower the TDS 800 toward to the well center area 508 (FIG. 110). While lowering the TDS 800, the system 100 can perform one or more of steps 19704 through 19710. In particular, at step 19704, the system 100 can close the first and second grippers 482, 484 on the arm 430 of the LTH 420 of the VTHS 400 around the next casing 214 (FIG. 110). At step 19706, the system 100 can verify that the LTH 420 of the VTHS 400 is engaged with the casing 214. Further, at step 19708, if the LTH 420 of the VTHS 400 is not engaged with the casing 214, the method 19300 can proceed to step 19710 and the system 100 can adjust the grippers 482, 484. Thereafter, the method 19300 can return to step 19706 and continue as described herein. On the other hand, at step 19708, if the LTH 420 of the VTHS 400 is engaged with the casing 214, the method 19300 can proceed to step 19712 where the system 100 can open the first and second grippers 482, 484 on the arm 244 of the HTHS 230 (FIG. 111).

Figure 112:
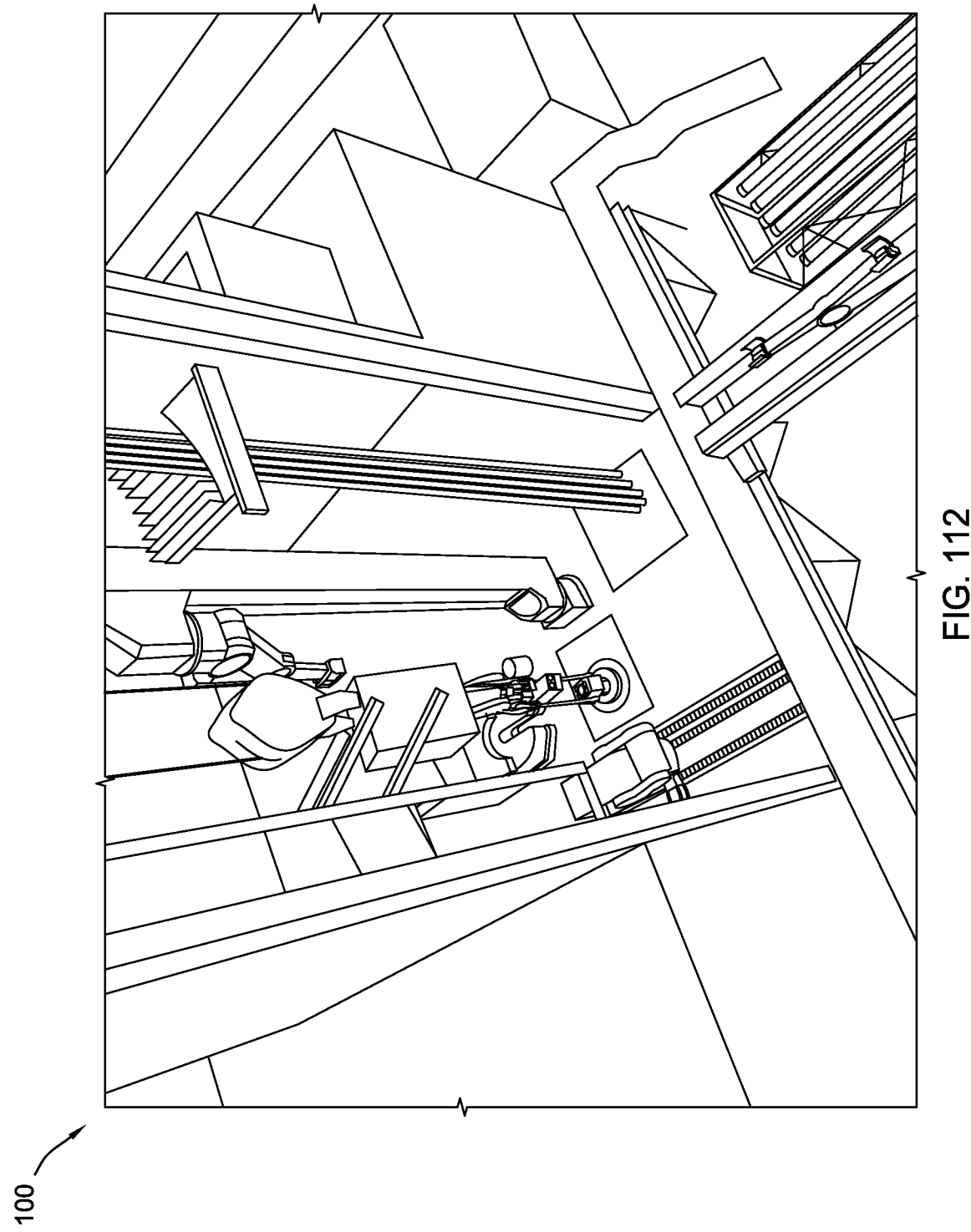

Moving to step 19714, the system 100 can transfer the next casing 214 from the arm 244 of the HTHS 230 to the arm 430 of the LTH 420 of the VTHS 400. At step 19716, the system 100 can rotate the casing 214 from a horizontal position to a vertical position using the arm 430 of the LTH 420 of the VTHS 400 (FIG. 112). Further, at step 19718, at essentially the same time, the system 100 can retract the arm 244 of the HTHS 230 (FIG. 112) and at step 19720, the system 100 can return the HTHS 230 to a neutral or standby position. At step 19722, the system 100 can lock the casing 214 in the well center opening (FIG. 112). Moreover, at step 19724, the system 100 can open the tubular clamp on the elevator 850 (FIG. 112).

Figure 113:
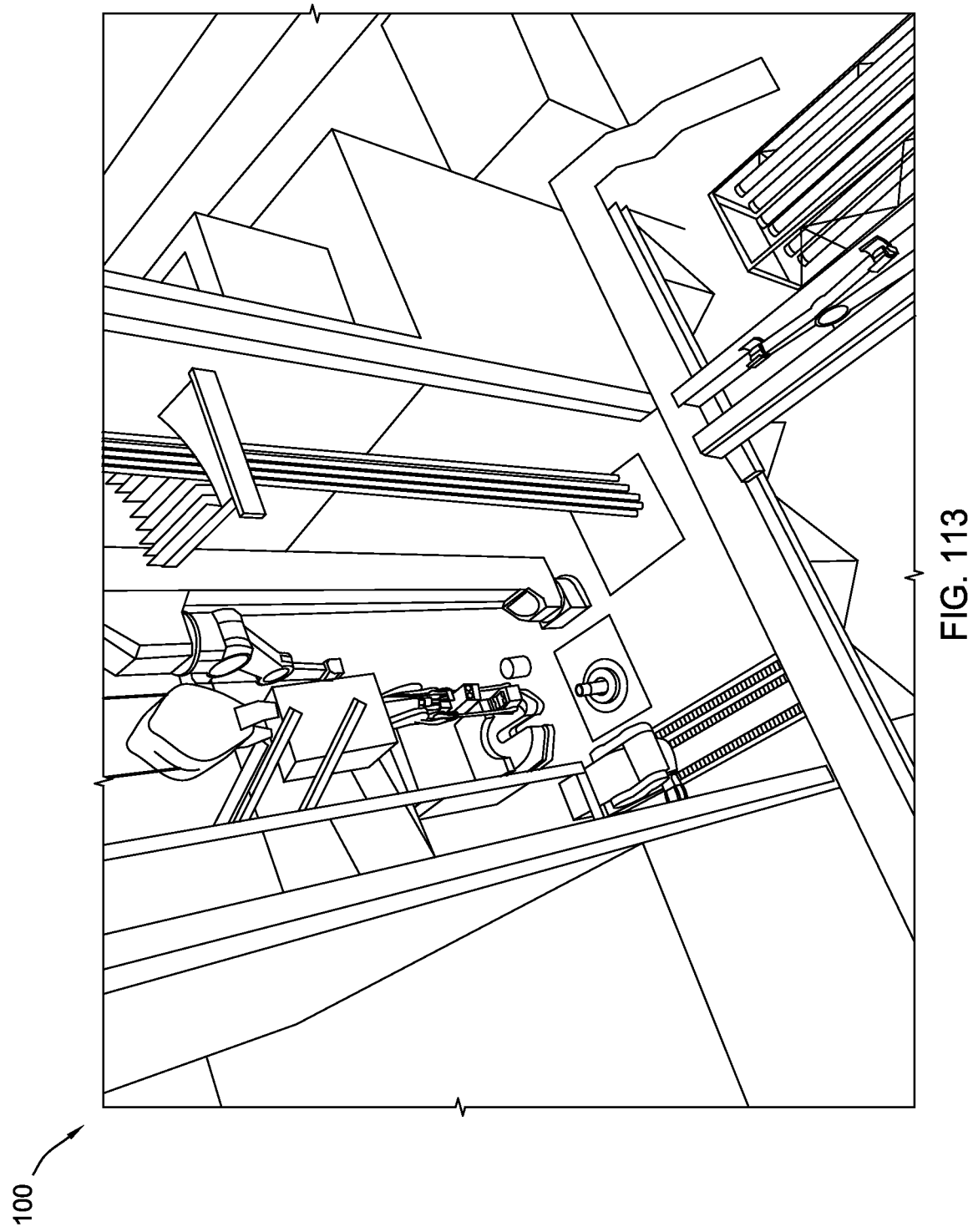
Figure 114:
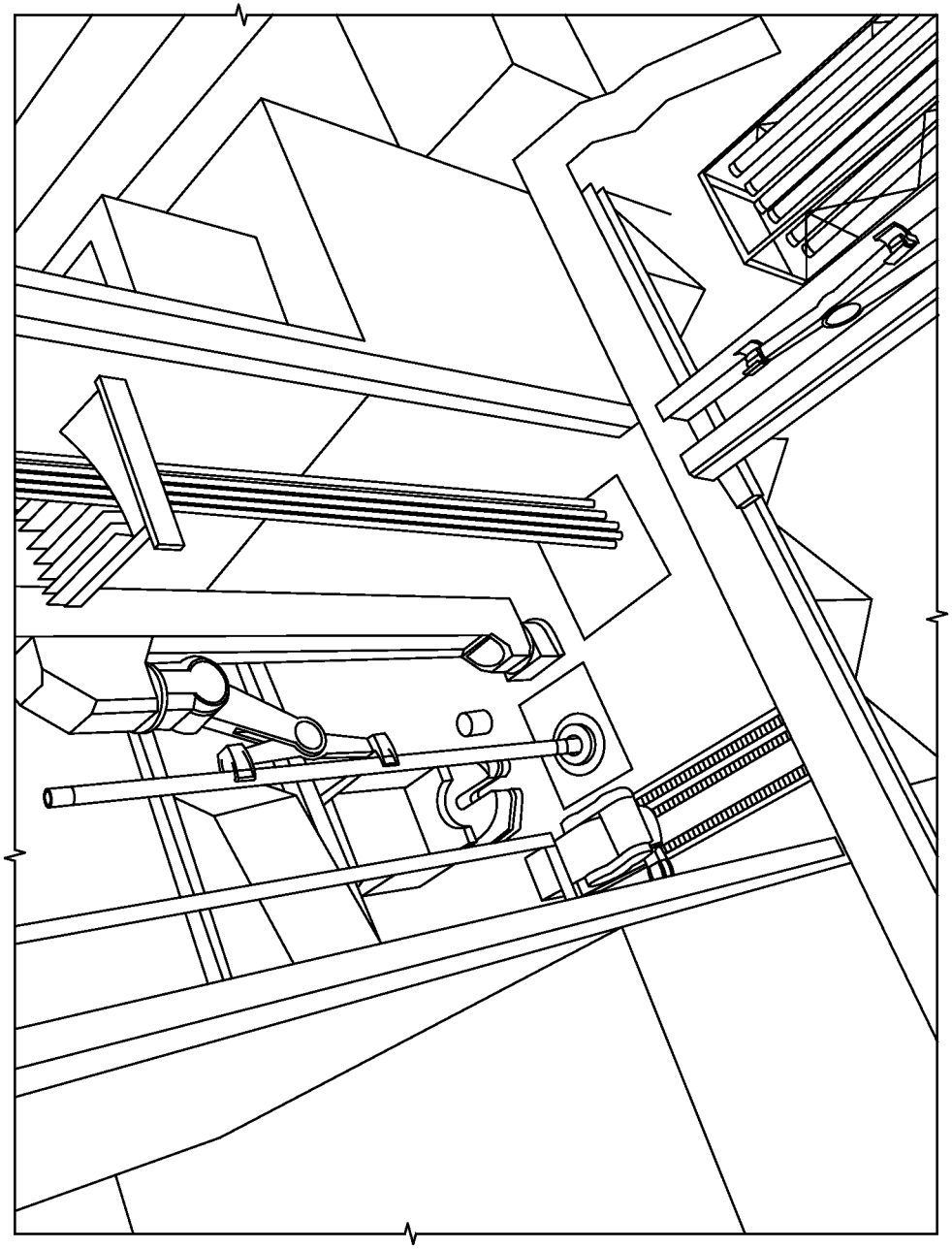
Figure 115:
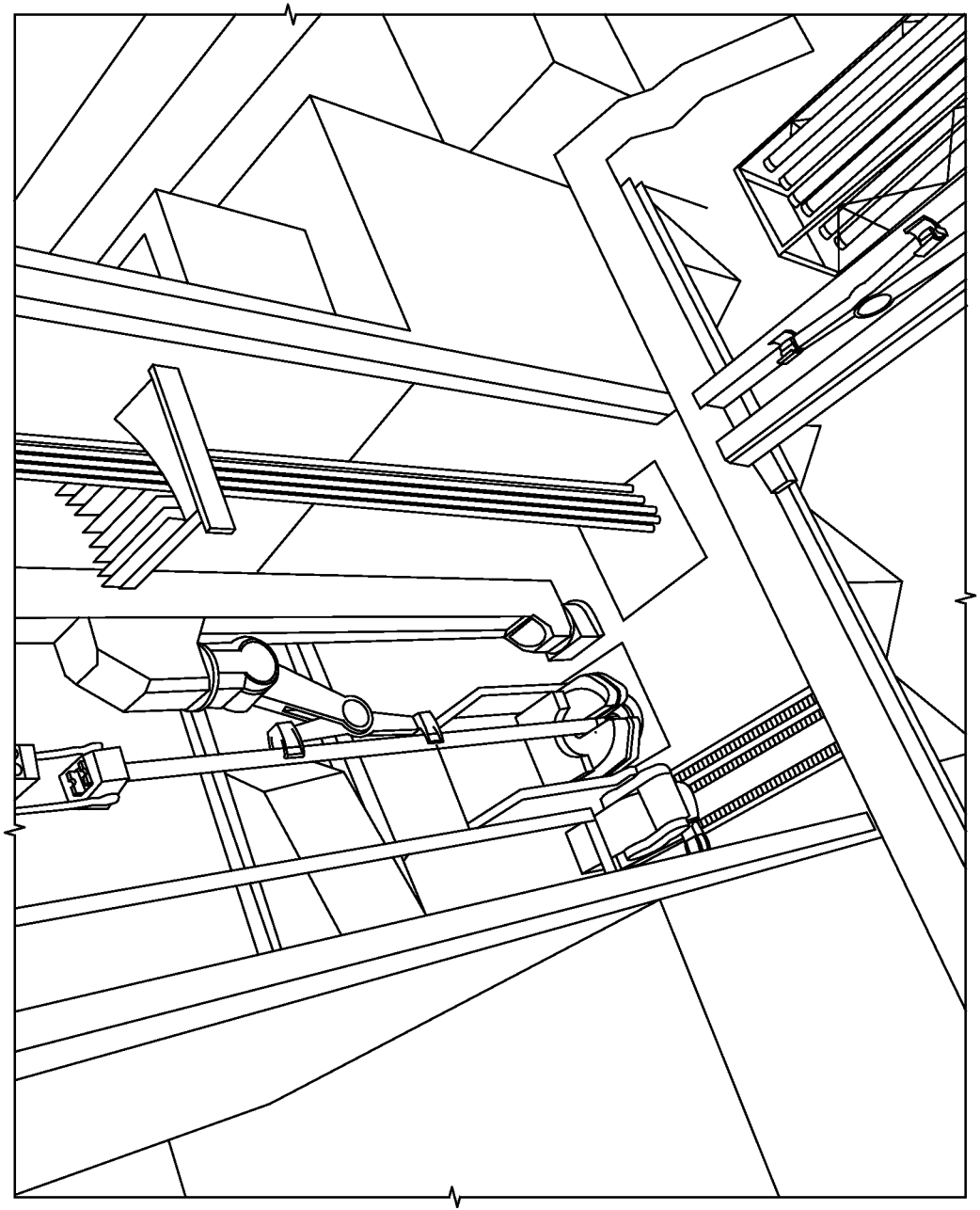
Figure 116:
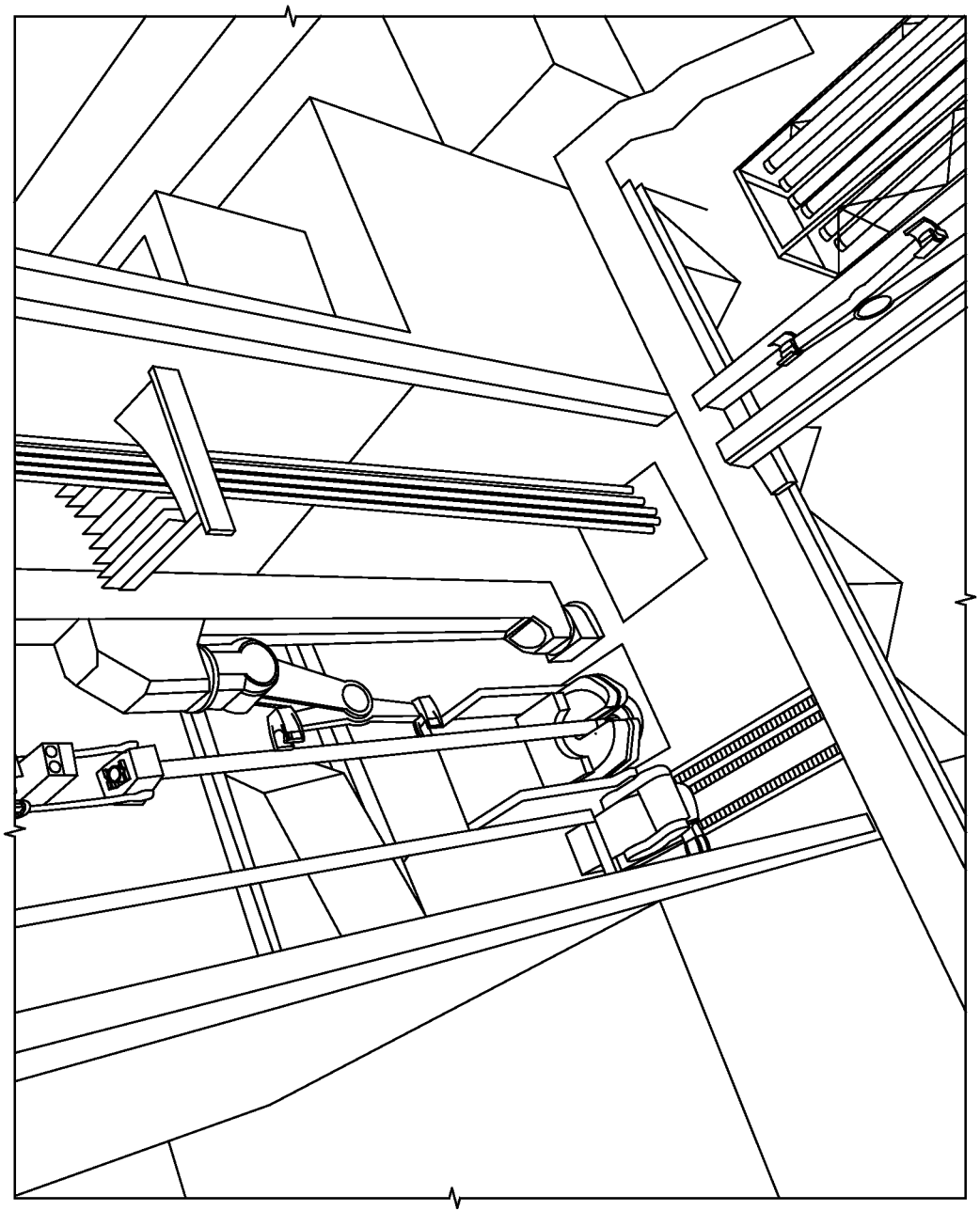
Figure 198:
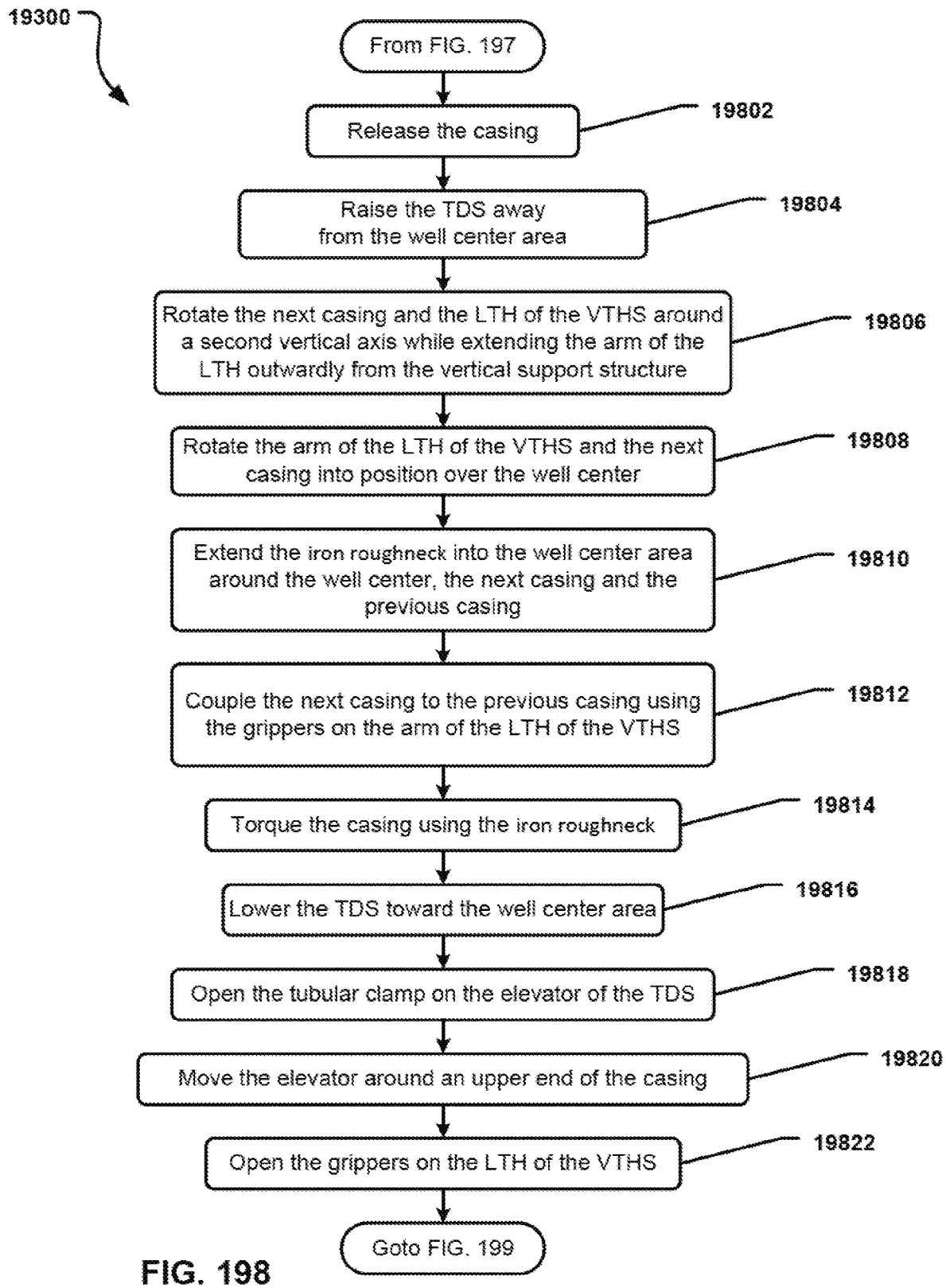
Figure 199:
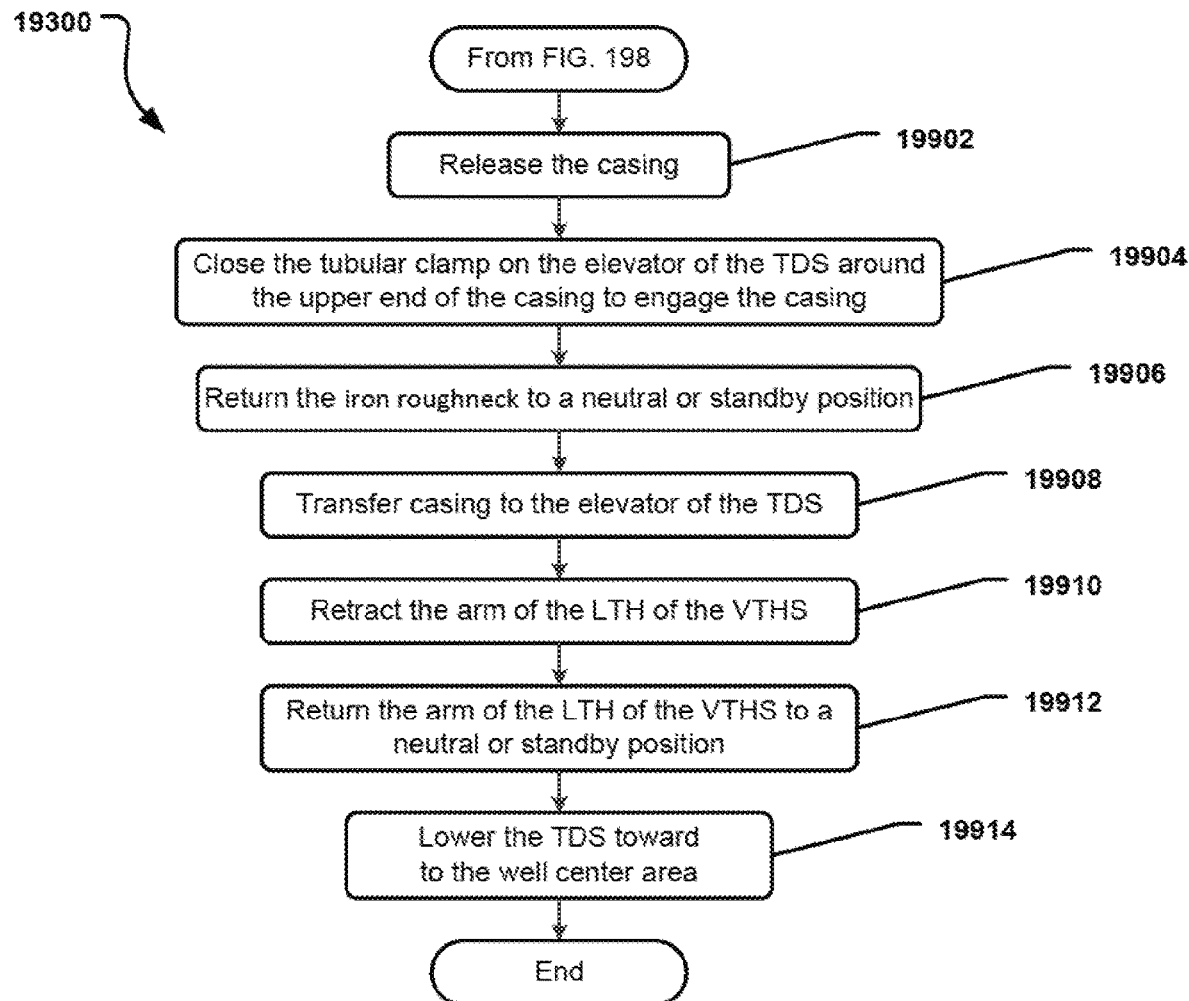
Figure 200:
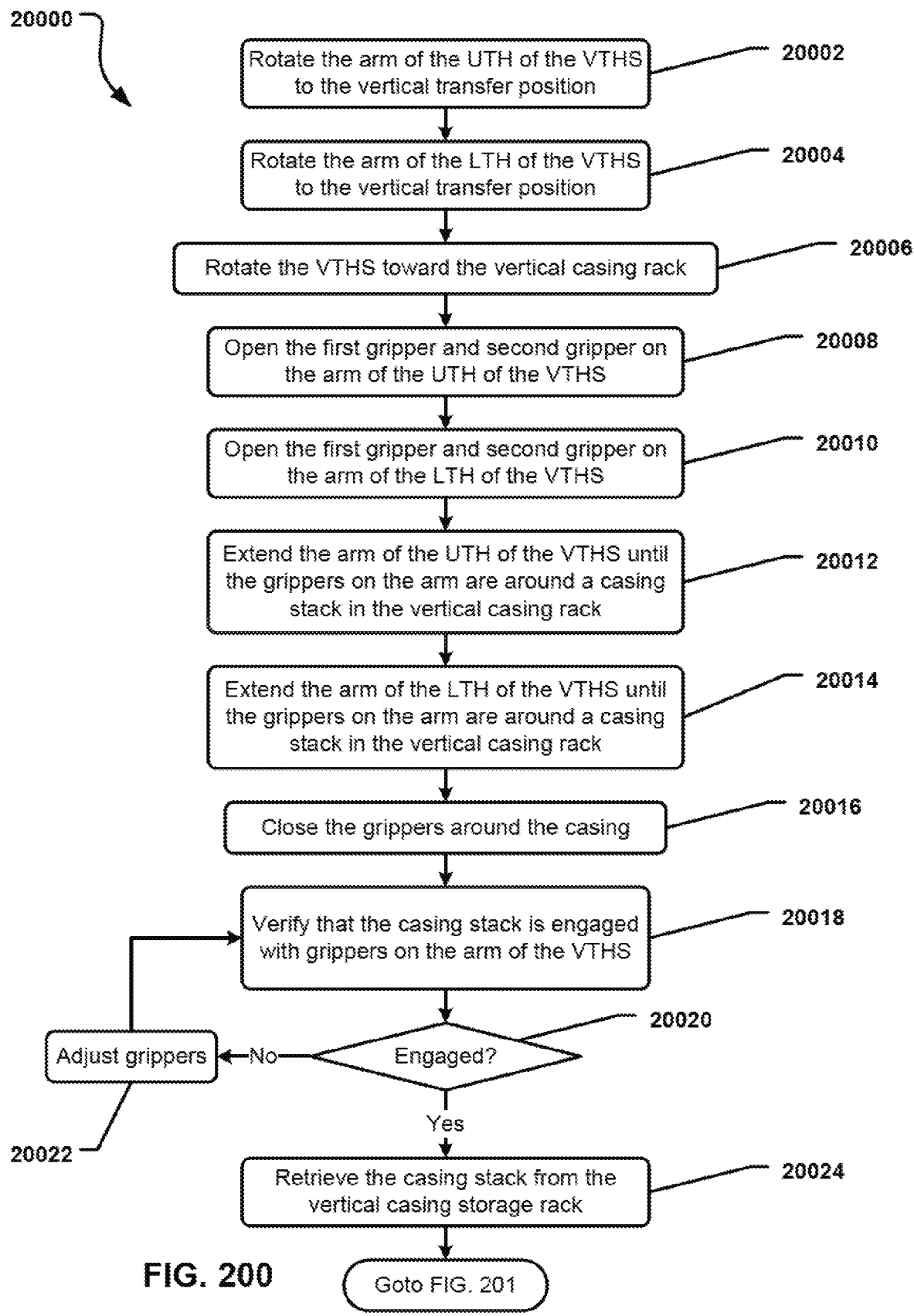
FIGS. 200-205 include illustrations of a portion of a third method for conducting subterranean operations in accordance with embodiments.

Continuing to FIG. 198, at step 19802, the system 100 can release the casing 214 (FIG. 113). At step 19804, the system 100 can raise the TDS 800 away from the well center area 508 (FIG. 113). As the system 100 raises the TDS 800, at step 19804, the system 100 can perform one or more of steps 19806 through 19810. Specifically, at step 19806, the system 100 can rotate the next casing 214 and the LTH 420 of the VTHS 400 around a second vertical axis while extending the arm 430 of the LTH 420 outwardly from the vertical support structure 402 (FIG. 114). At step 19808, the system 100 can rotate the arm 430 of the LTH 420 of the VTHS 400 and the next casing 214 into position over the well center (FIG. 114). At step 19810, the system 100 can extend the iron roughneck 600 into the well center area 508 around the well center, the next casing 214 and the previous casing 214 (FIG. 115). At step 19812, the system 100 can couple the next casing 214 to the previous casing 214 using the grippers on the arm 430 of the LTH 420 of the VTHS 400 (FIG. 115). Thereafter, at step 19814, the system 100 can torque the casing 214 using the iron roughneck 600 (FIG. 116). Further, at step 19816, at essentially the same time as step 19814, the system 100 can lower the TDS 800 toward the well center area 508 (FIG. 115). At step 19818, the system 100 can open the tubular clamp on the elevator 850 of the TDS 800 (FIG. 115). At step 19820, the system 100 can move the elevator 850 around an upper end of the casing 214 (FIG. 116). Moreover, at step 19802, the system 100 can open the grippers on the LTH 420 of the VTHS 400 (FIG. 116). Then, the method 19300 can move to step 19902 of FIG. 199.

Figure 117:
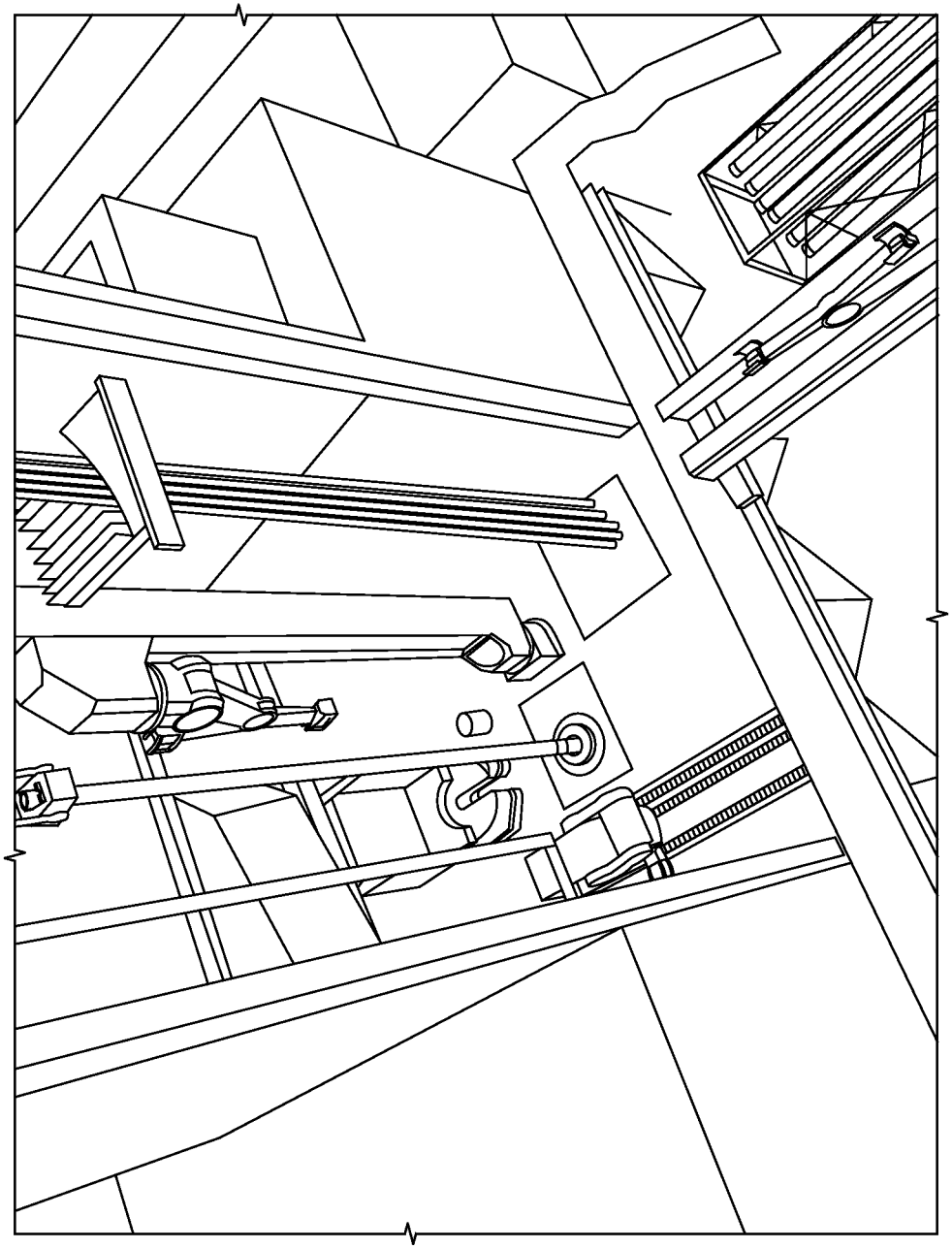
Figure 118:
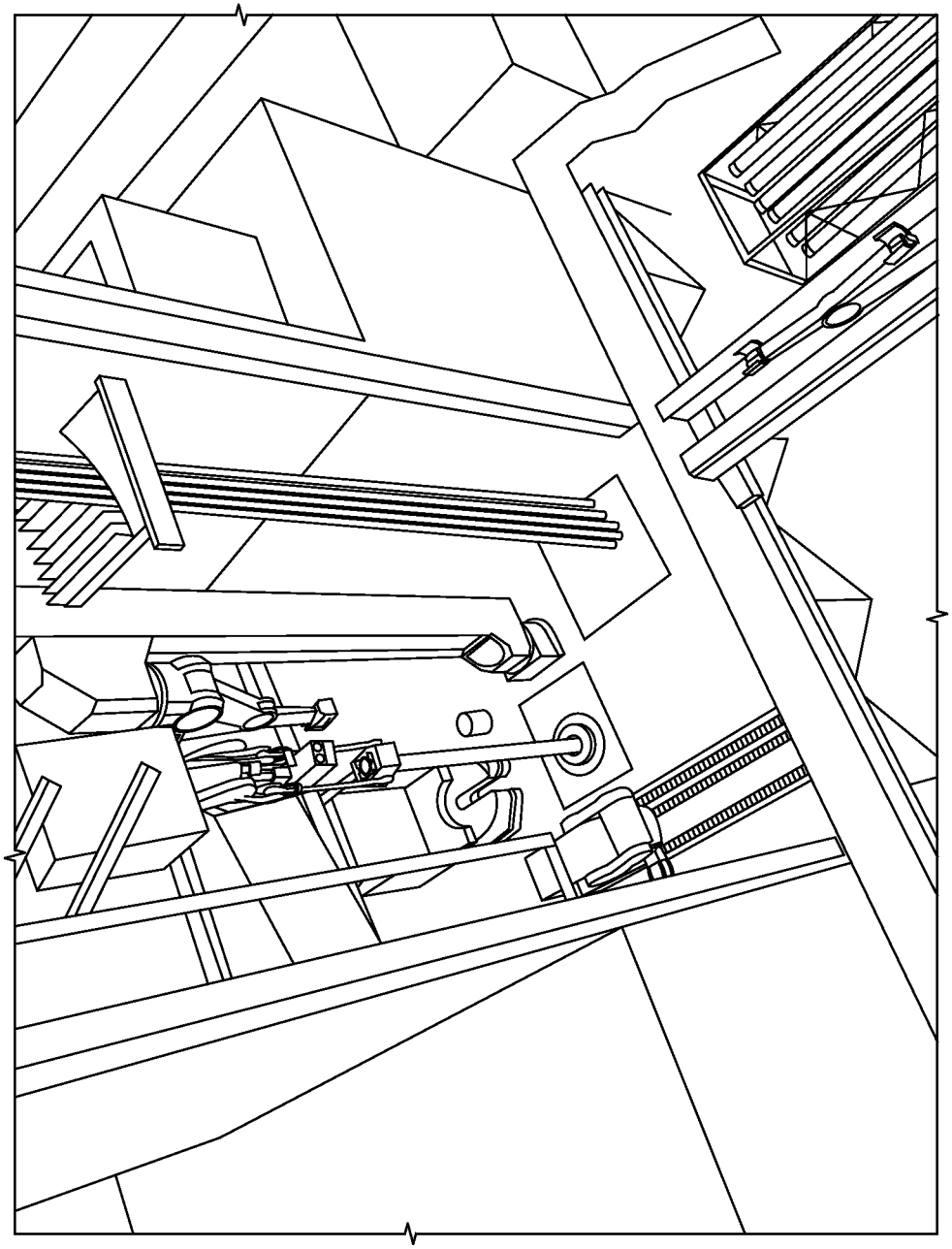
Figure 119:
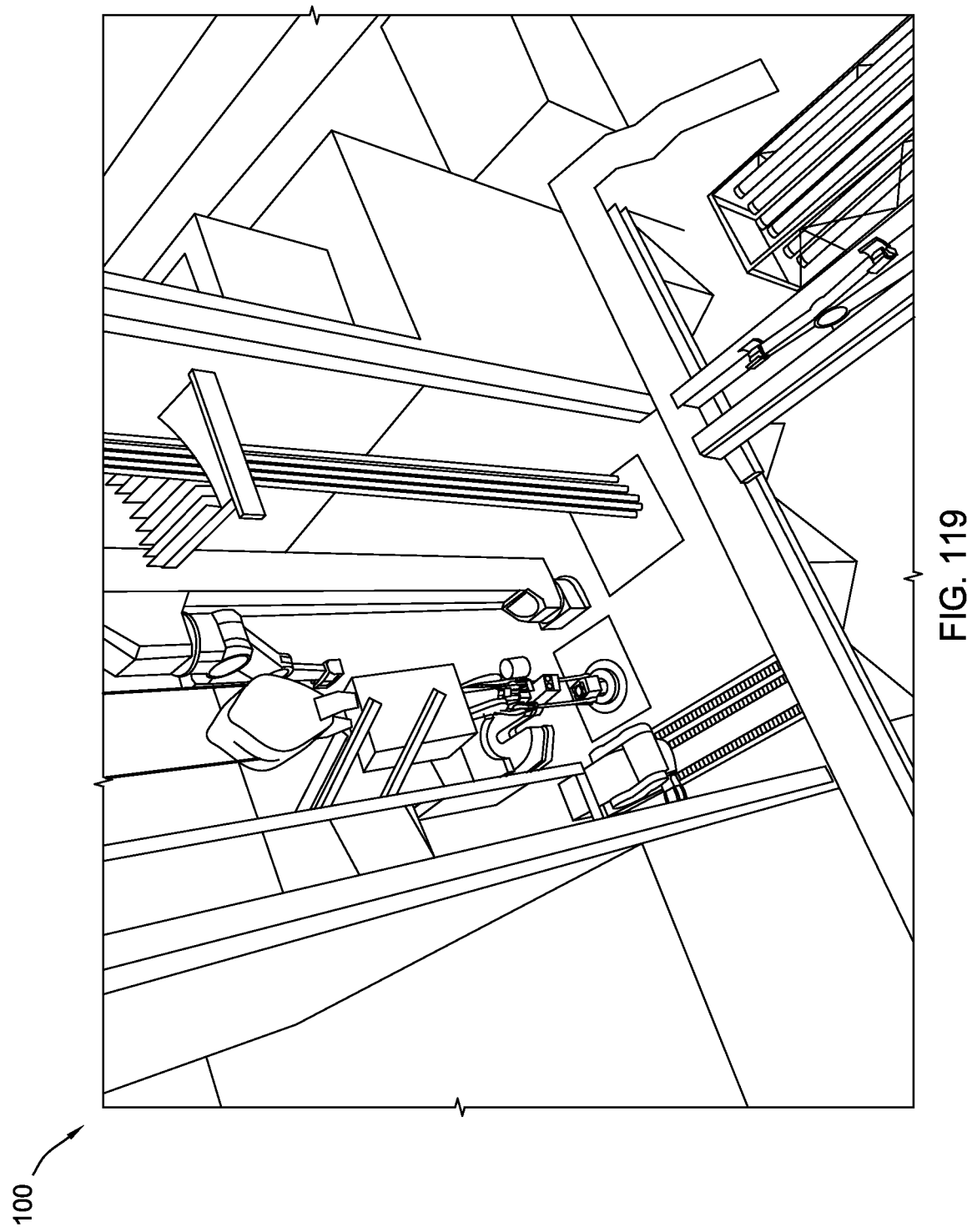

At step 19902, the system 100 can release the casing 214 from the LTH 420 of the VTHS 400 (FIG. 116). At step 19904, the system 100 can close the tubular clamp on the elevator 850 of the TDS 800 around the upper end of the casing 214 to engage the casing 214 (FIG. 116). Additionally, at step 19906, the system 100 can return the iron roughneck 600 to a neutral or standby position (FIG. 117). At step 19908, the system 100 can transfer casing 214 to the elevator 850 of the TDS 800 (FIG. 117). At step 19910, the system 100 can retract the arm 430 of the LTH 420 of the VTHS 400. It is to be understood that steps 19906 through 19910 can be performed at essentially the same time. Further, at step 19912, they system 100 can return the arm 430 of the LTH 420 of the VTHS 400 to a neutral or standby position (FIG. 117). Then, at step 19914, the system 100 can lower the TDS 800 toward to the well center area 508 (FIG. 118). Thereafter, the method 19300 can end.

Referring to FIG. 200 through FIG. 205, another series of flowcharts are illustrated that depict still another method of conducting a subterranean operation, generally designated 20000. Throughout the description of these flowcharts elements that appear in the FIG. 1 through FIG. 167 are referenced. The referenced elements are capable of performing the particular operation or function mentioned in the flowchart step. Also, there may be parenthetical notations with specific figures referenced. These parenthetical notations indicate the specific figure (in FIG. 1 through FIG. 167) in which the performance of a particular operation or function is depicted. It is to be understood that the elements and figures referenced are examples and the system 100 is not limited to only the particular element cited performing the operation or function. Moreover, any figures referenced provide examples of how the performance of a particular step may appear and are not intended to be limiting as to the only manner in which a step may be performed. Also, some steps may not appear in the figures.

Figure 120:
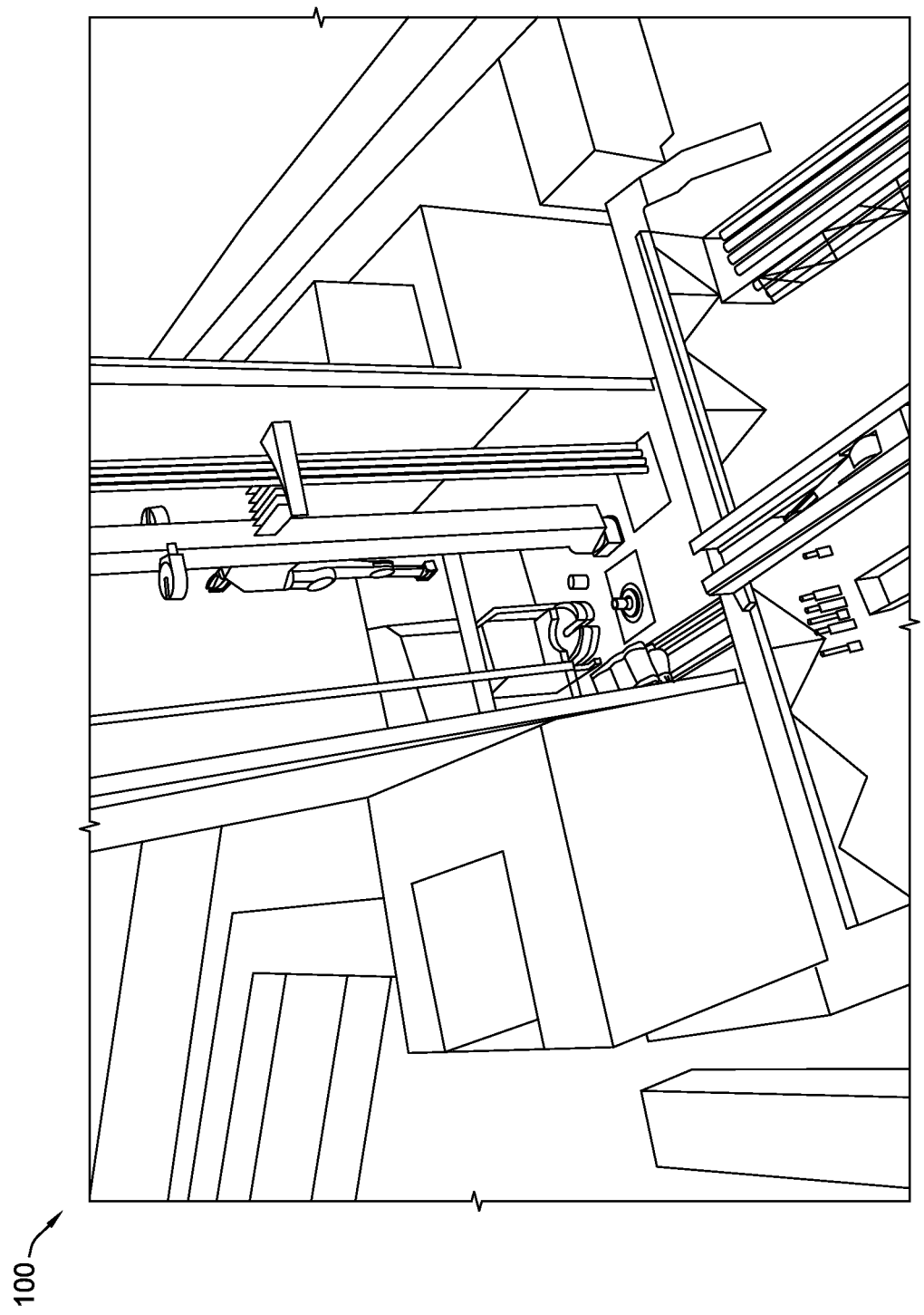

At step 20002, the system 100 can rotate the arm 430 of the UTH 422 of the VTHS 400 to the vertical transfer position. At step 20004, the system 100 can rotate the arm 430 of the LTH 420 of the VTHS 400 to the vertical transfer position. At step 20006, the system 100 can rotate the VTHS 400 toward the vertical storage rack 702. Further, at step 20008, the system 100 can open the first gripper 482 and second gripper 484 on the arm of the UTH 422 of the VTHS 400. At step 20010, the system 100 can open the first gripper and second gripper on the arm 430 of the LTH 420 of the VTHS 400. At step 20012, the system 100 can extend the arm of the UTH 422 of the VTHS 400 until the grippers 482, 484 on the arm 430 are at least partially disposed around a casing stack in the vertical storage rack 702 (FIG. 120). Further, at step 20014, the system 100 can extend the arm 430 of the LTH 420 of the VTHS 400 until the grippers 482, 484 on the arm 430 are at least partially disposed around a casing stack in the vertical storage rack 702 (FIG. 120). At step 20016, the system 100 can close the grippers 482, 484 around the casing 214. Moving to step 20018, the system 100 can verify that the casing stack is engaged with grippers 482, 484 on the arms 430 of the VTHS 400. At step 20020, if the casing 214 is not engaged with the grippers 482, 484 on the arms 430 of the VTHS 400, the method 20000 can proceed to step 20022 and the system 100 can adjust the grippers 482, 484. Then, the method 20000 may return to step 20018 and continue as described herein. Returning to step 20020, if the casing stack is engaged with the grippers 482, 484 on the arms 430 of the VTHS 400, the method 20000 can move to step 20024 and the system 100 can retrieve the casing stack from the vertical storage rack 702.

Figure 124:
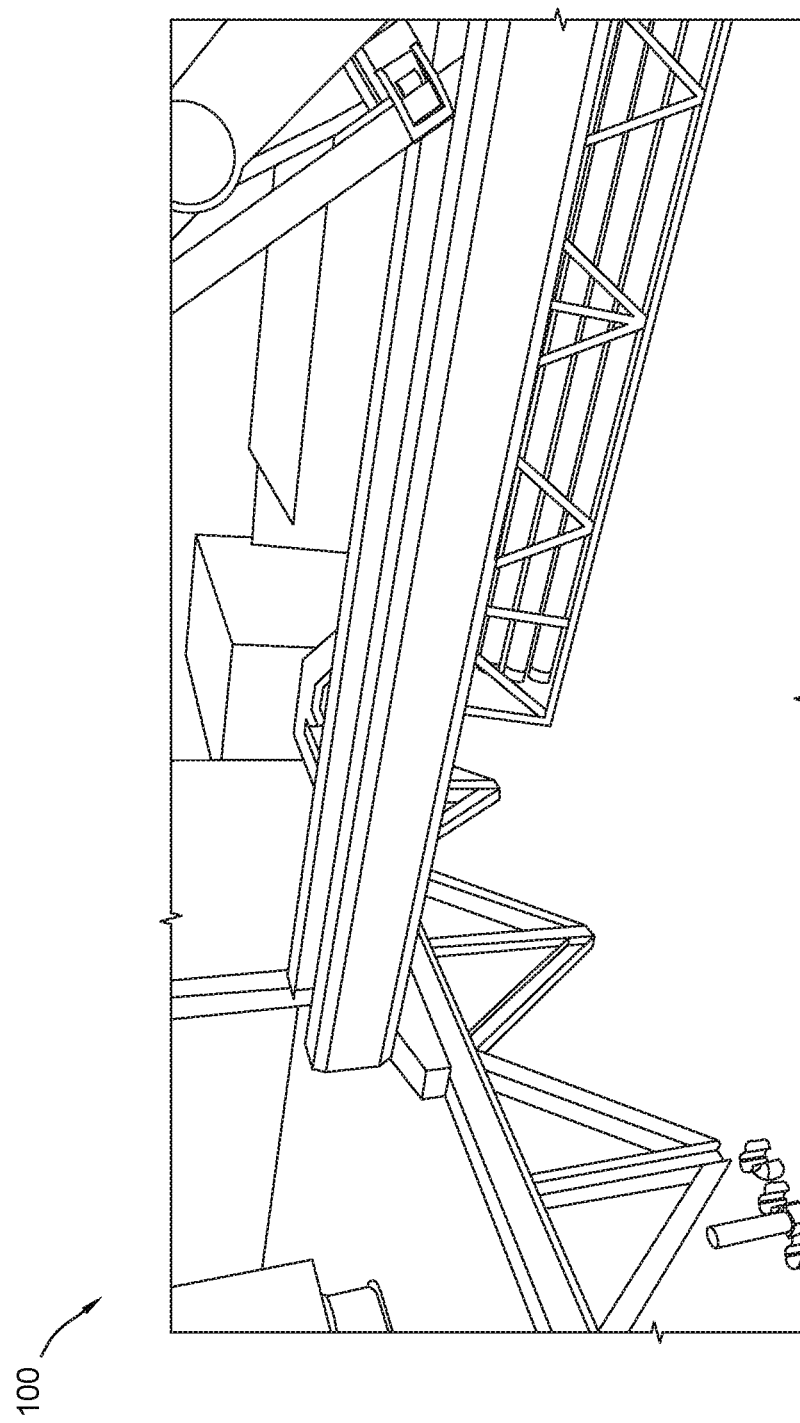
Figure 125:
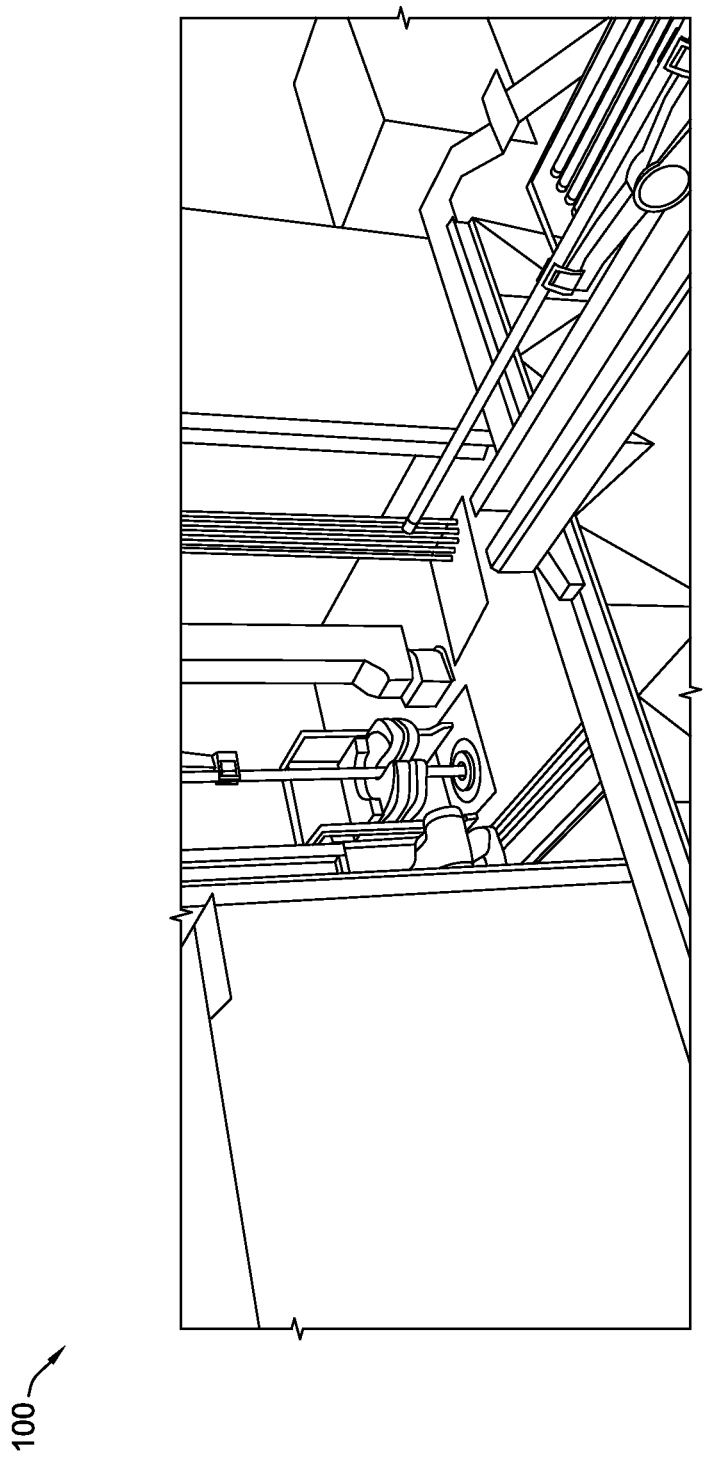
Figure 127:
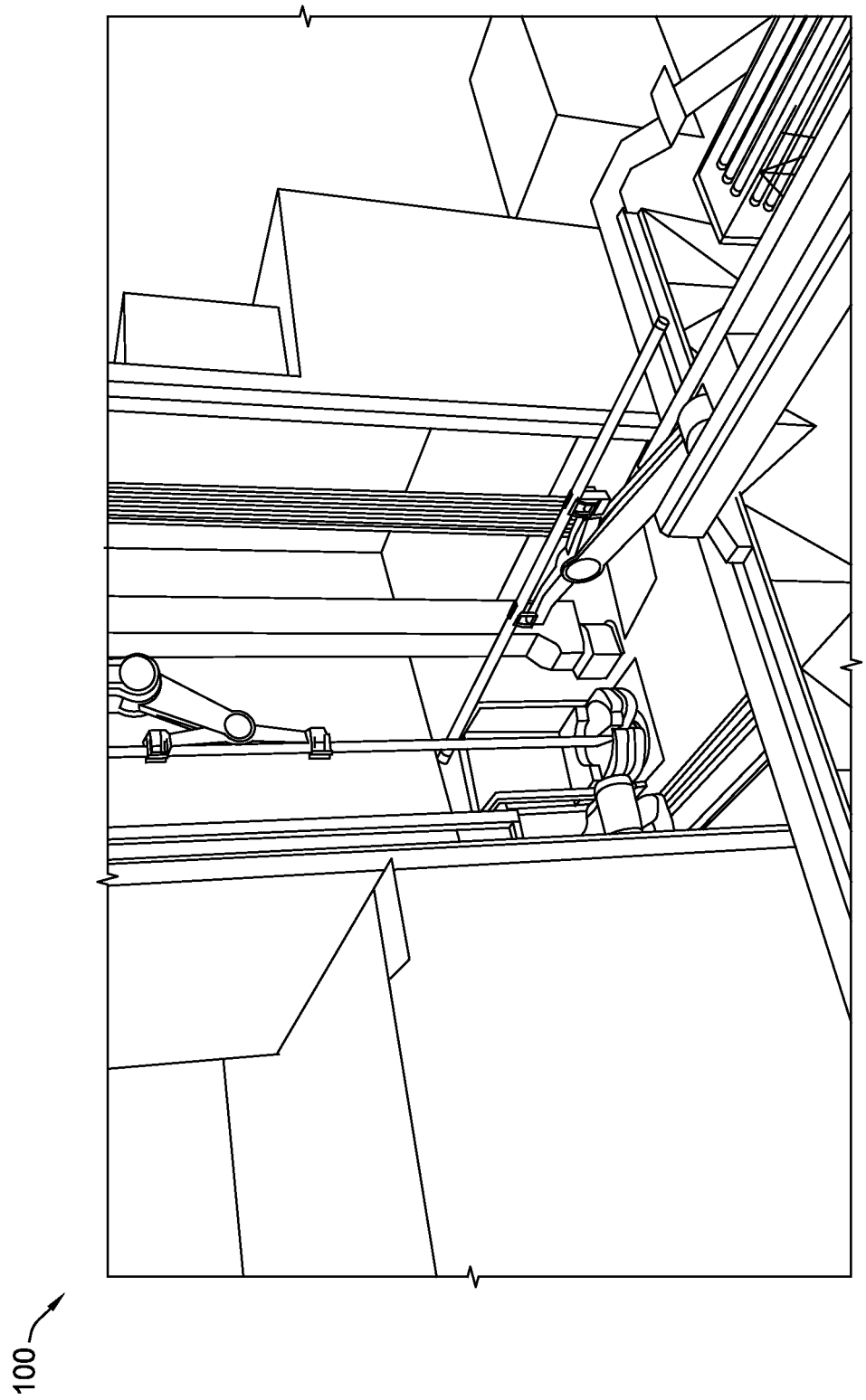
Figure 129:
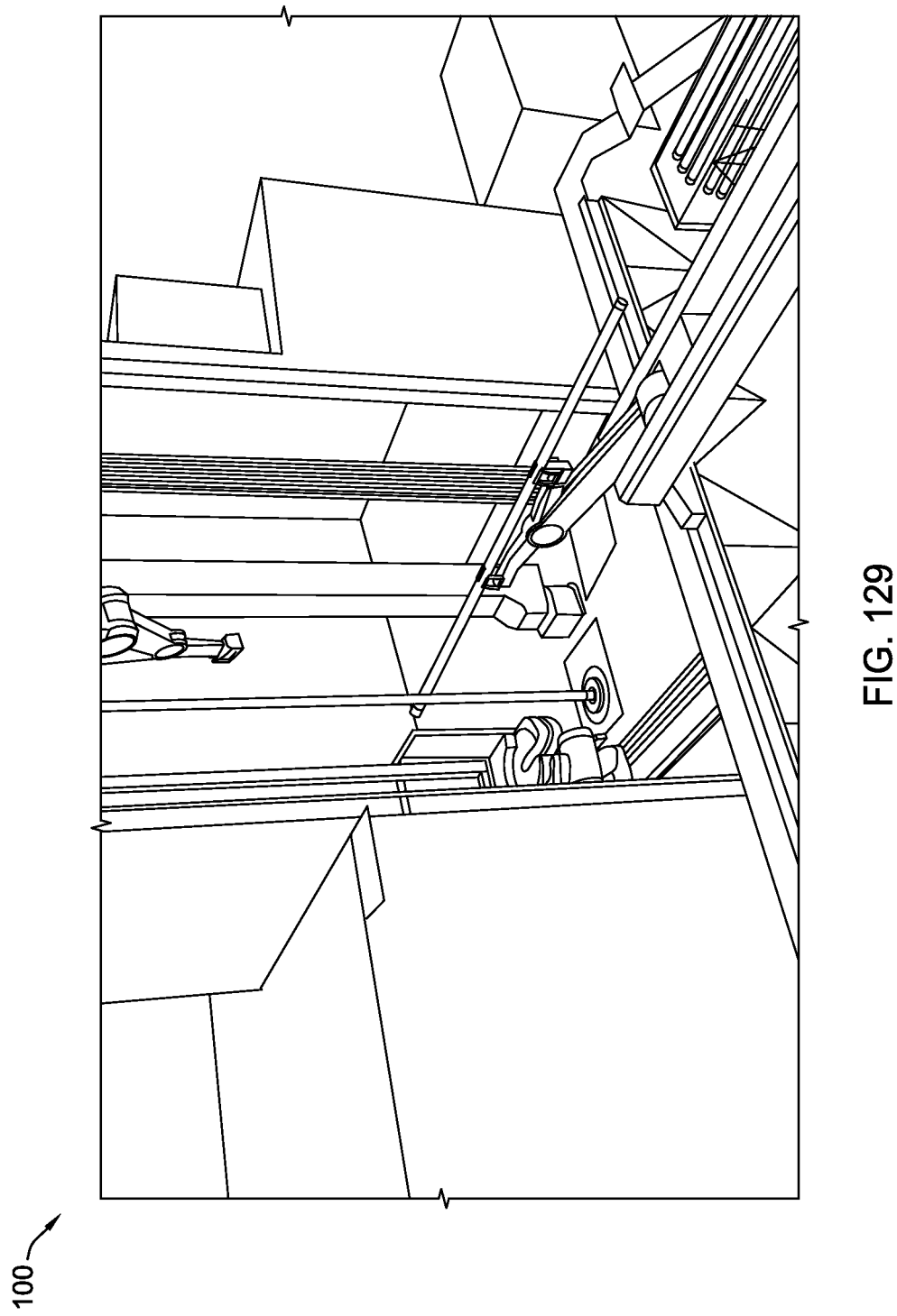
Figure 201:
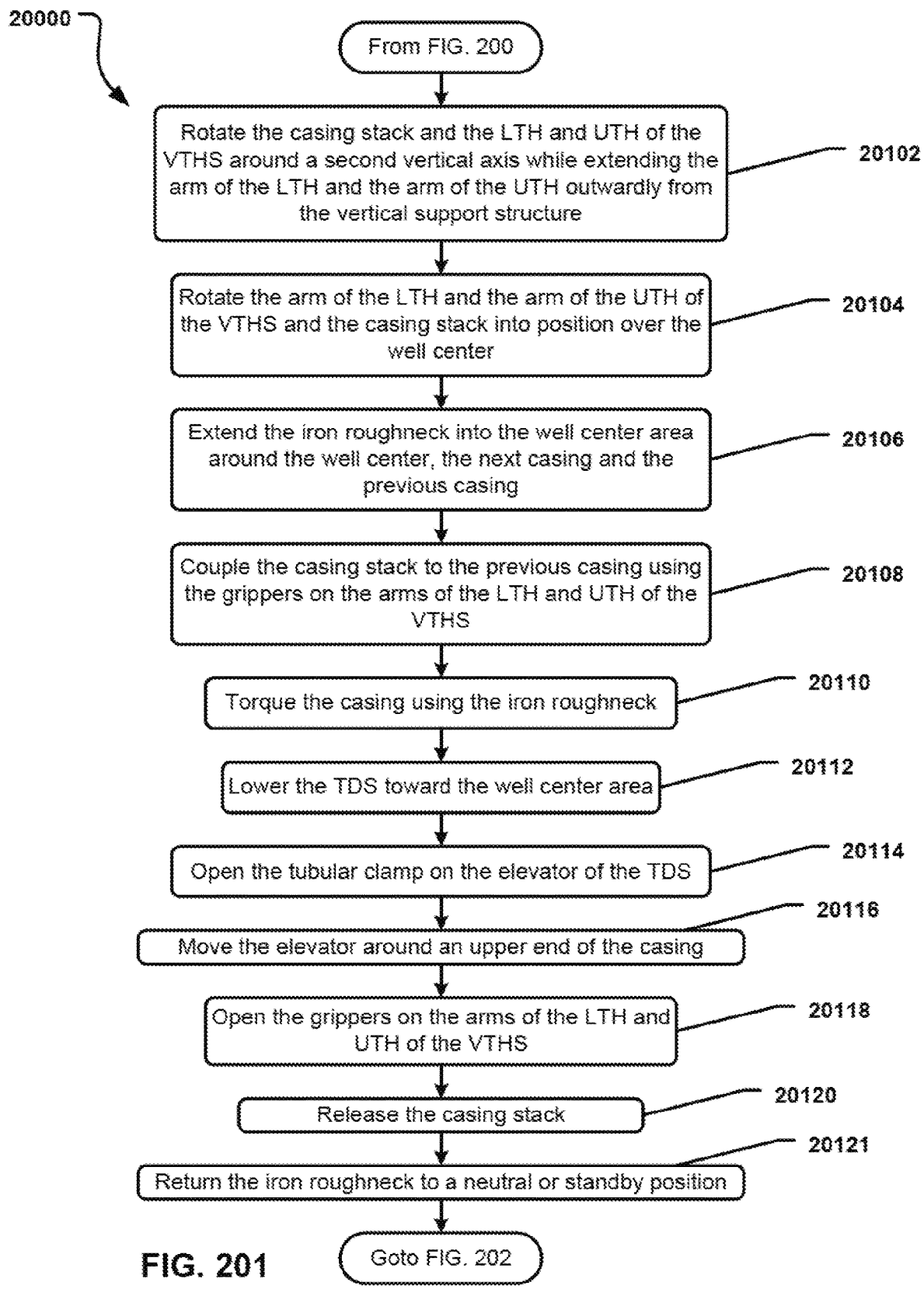

Proceeding to FIG. 201, at step 20102, the system 100 can rotate the casing stack and the LTH 420 and UTH 422 of the VTHS 400 around a second vertical axis while extending the arm 430 of the LTH 420 and the arm of the UTH 422 outwardly from the vertical support structure 402. At step 20104, the system 100 can rotate the arm 430 of the LTH 420 and the arm of the UTH 422 of the VTHS 400 and the casing stack into position over the well center (FIG. 124). At step 20106, at essentially the same time, the system 100 can extend the iron roughneck 600 into the well center area 508 around the well center, the next casing 214 and the previous casing 214 (FIG. 124). At step 20108, the system 100 can couple the casing stack to the previous casing 214 using the grippers 482, 484 on the arms of the LTH 420 and UTH 422 of the VTHS 400 (FIG. 125). Thereafter, at step 20110, the system 100 can torque the casing 214 using the iron roughneck 600 (FIG. 127). At step 20112, at essentially the same time, the system 100 can lower the TDS 800 toward the well center area 508. At step 20114, the system 100 can open the tubular clamp on the elevator 850 of the TDS 800. At step 20116, the system 100 can move the elevator 850 around an upper end of the casing 214. Further, at step 20118, the system 100 can open the grippers on the arms of the LTH 420 and UTH 422 of the VTHS 400. At step 20120, the system 100 can release the casing stack. At essentially the same time, at step 20121, the system 100 can return the iron roughneck 600 to a neutral or standby position (FIG. 129). The method 20000 may then proceed to FIG. 202.

Figure 128:
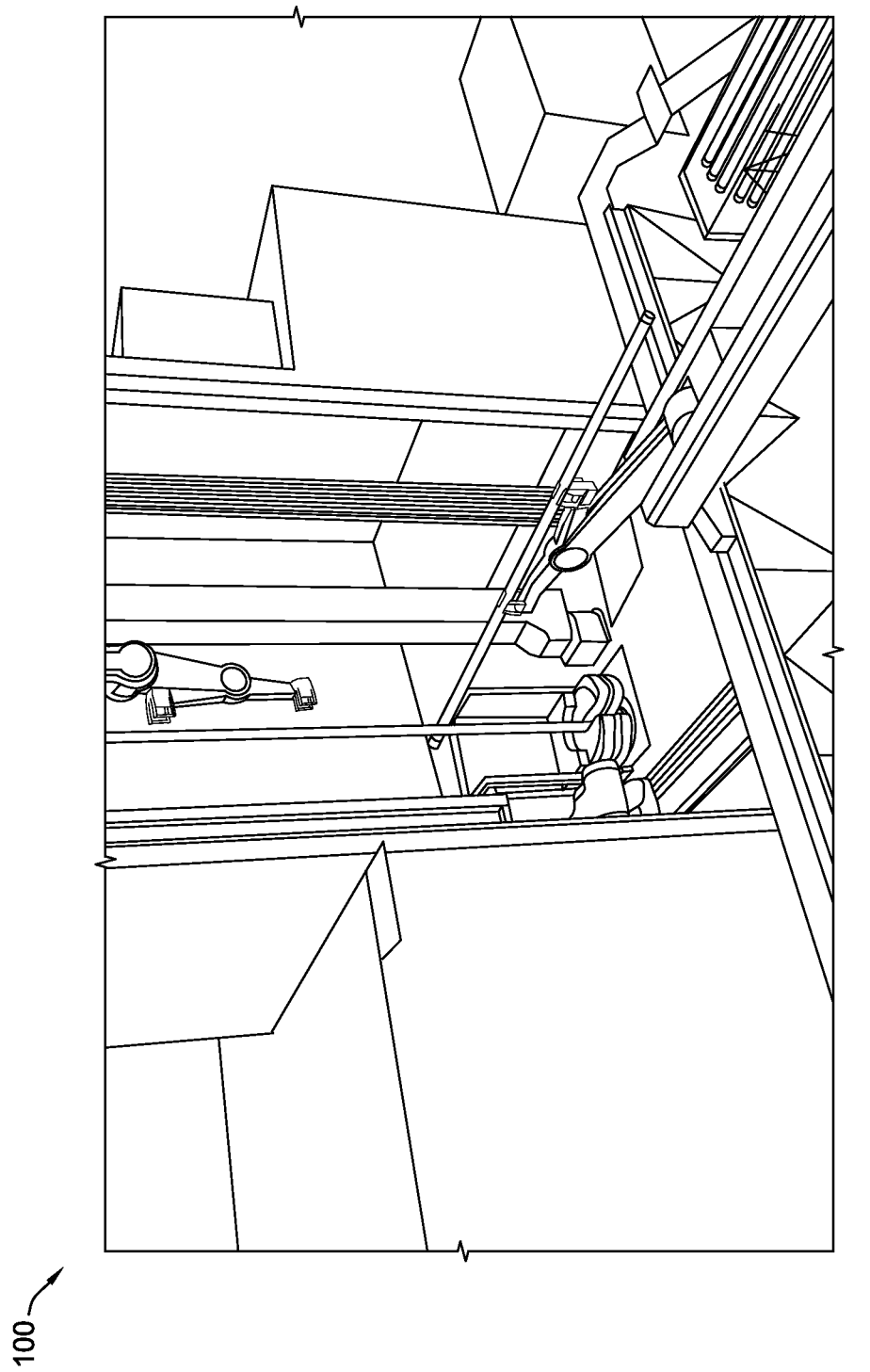
Figure 202:
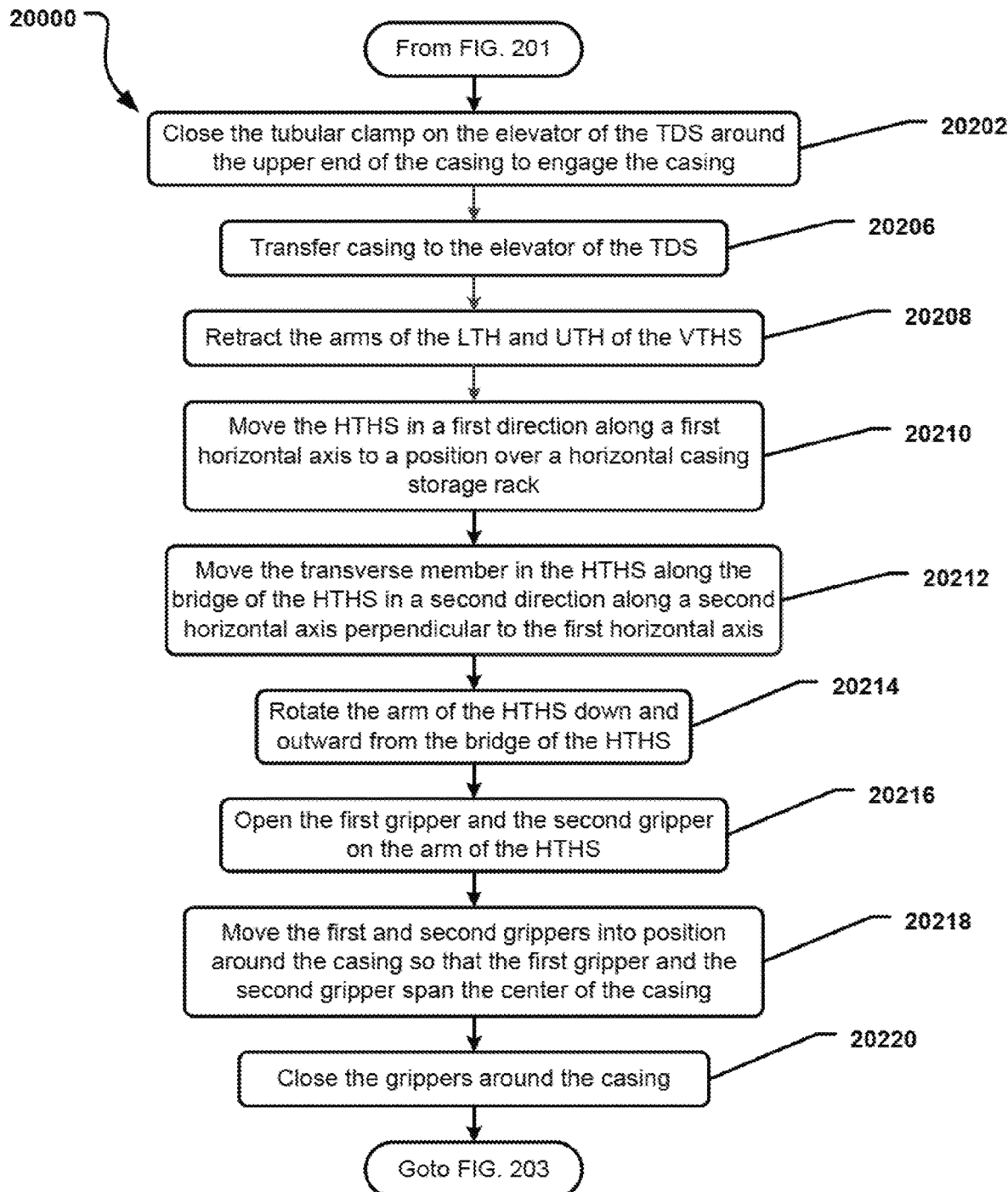

Referring now to FIG. 202, at step 20202, the system 100 can close the tubular clamp on the elevator 850 of the TDS 800 around the upper end of the casing 214 to engage the casing 214. At step 20206, the system 100 can transfer casing 214 to the elevator 850 of the TDS 800. Further, at step 20208, the system 100 can retract the arms of the LTH 420 and UTH 422 of the VTHS 400 (FIG. 128).

Figure 121:
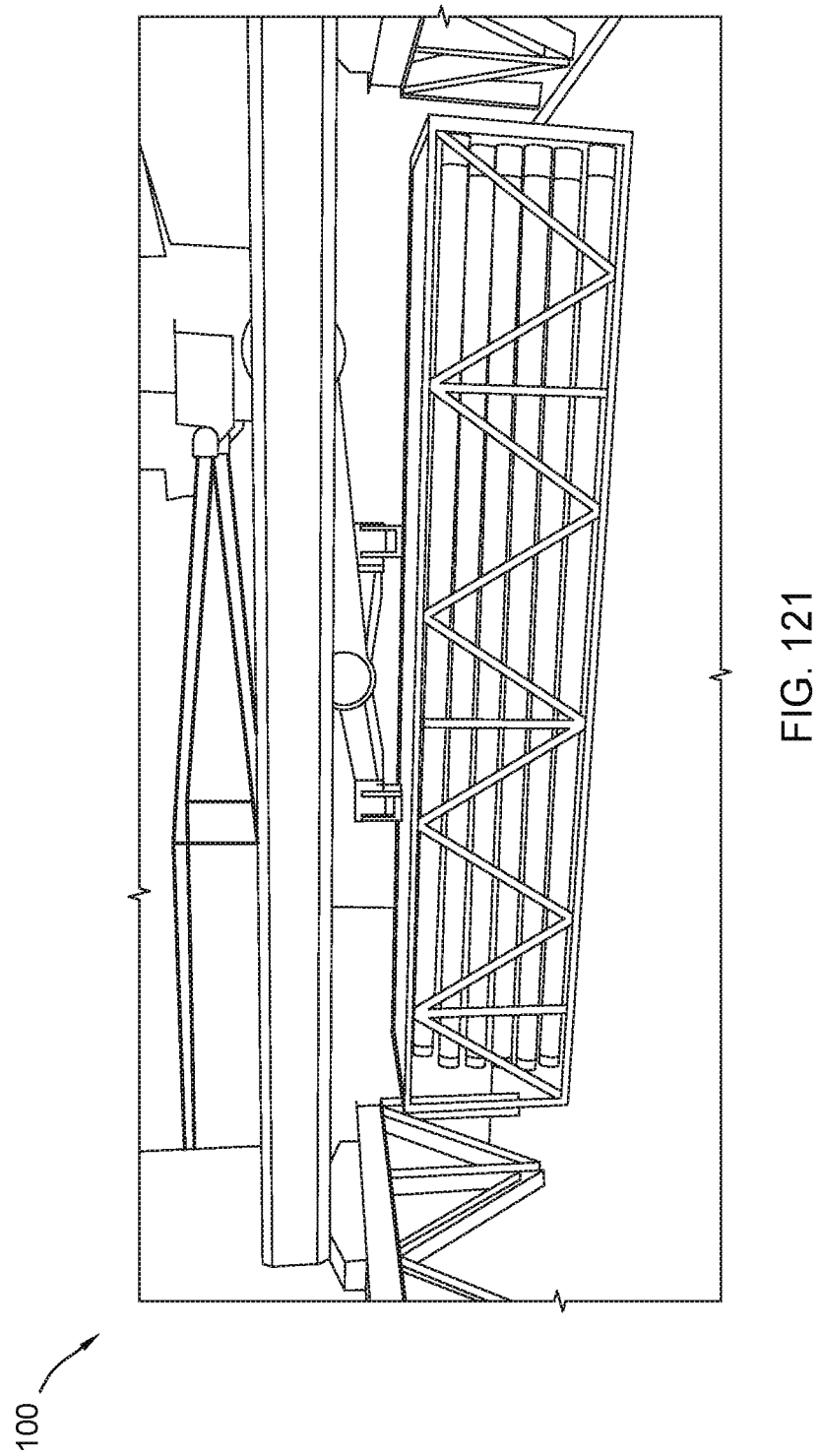
Figure 122:
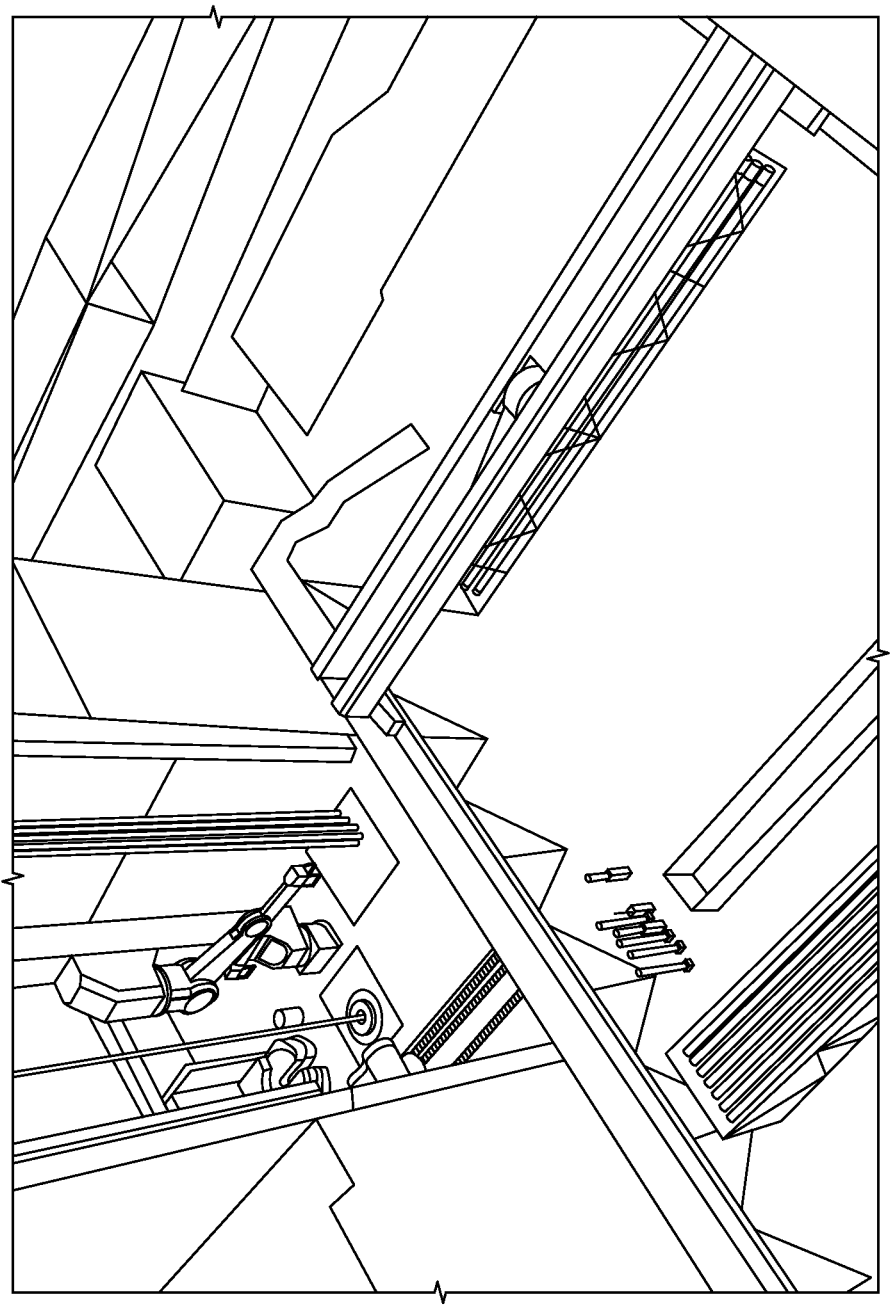

While performing one or more of steps 20002 through 20208 with the VTHS 400, the iron roughneck 600, and the TDS 800, the system 100 may perform one or more of steps 20210 through 20314, with the HTHS 230. In particular, at step 20210, the system 100 can move the HTHS 230 in a first direction along a first horizontal axis to a position over a horizontal casing 214 storage rack 212 (FIG. 121). At step 20212, the system 100 can move the transverse member 242 in the HTHS 230 along the bridge of the HTHS 230 in a second direction along a second horizontal axis perpendicular to the first horizontal axis (FIG. 121). Further, at step 20214, the system 100 can rotate the arm 244 of the HTHS 230 down and outward from the bridge of the HTHS 230 (FIG. 121). At step 20216, the system 100 can open the first gripper 280 and the second gripper 282 on the arm 244 of the HTHS 230 (FIG. 121). At step 20218, the system 100 can move the first and second grippers 280, 282 into position around the casing 214 so that the first gripper and the second gripper span the center of the casing 214 (FIG. 122). At step 20220, the system 100 can close the grippers around the casing 214.

Figure 123:
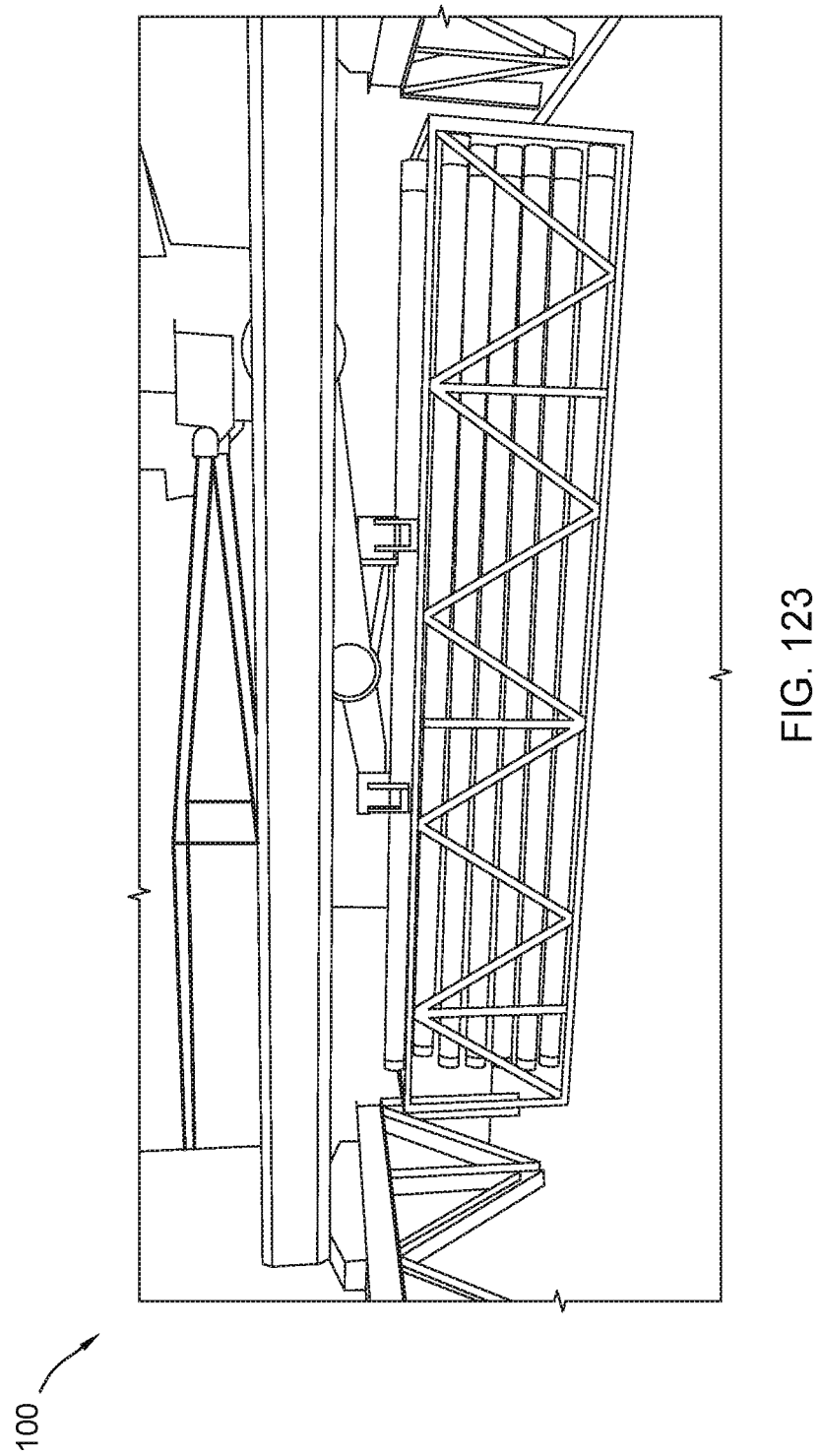
Figure 203:
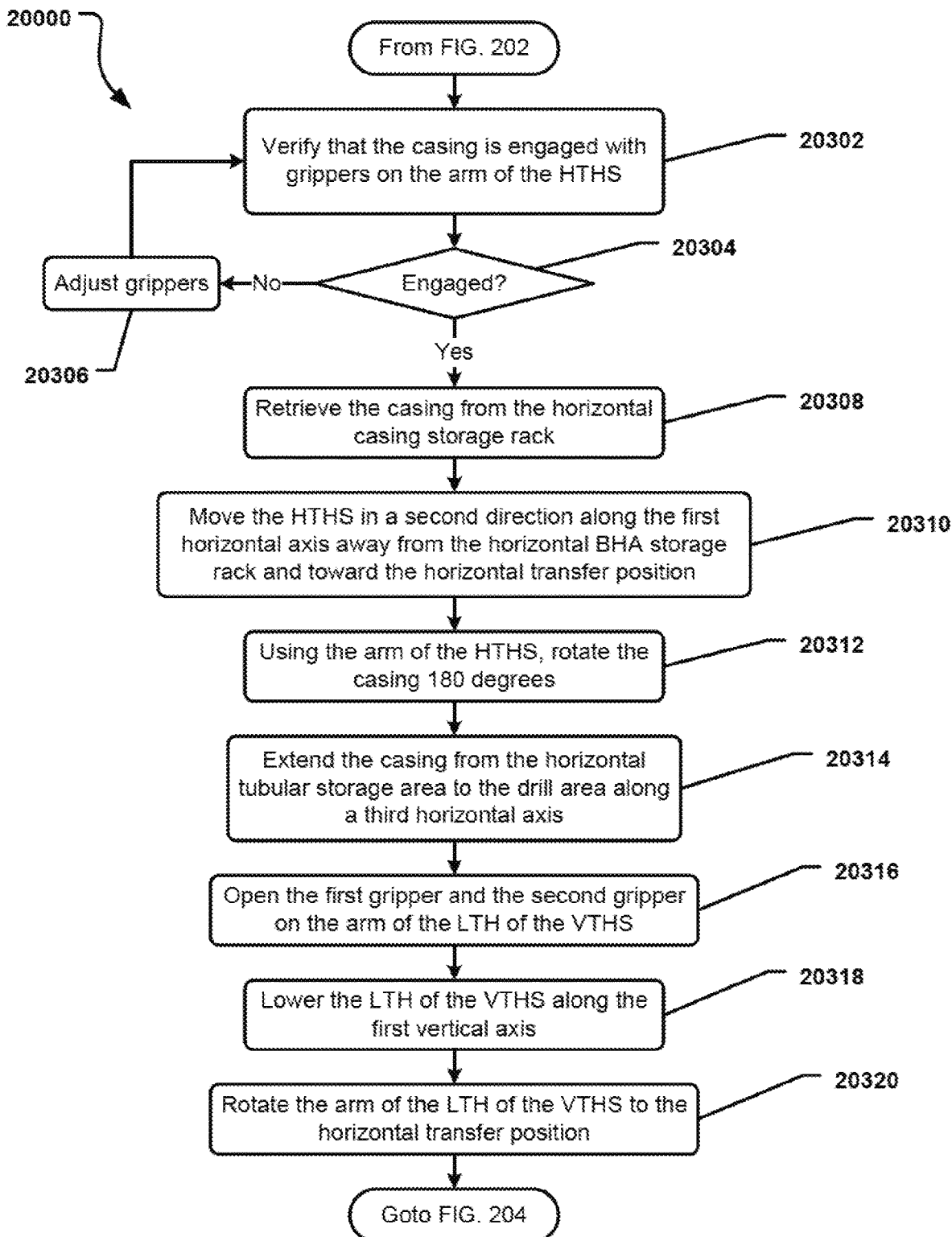

Moving to step 20302 of FIG. 203, the system 100 can verify that the casing 214 is engaged with grippers on the arm 244 of the HTHS 230. Further, at step 20304, if the system 100 determines that the casing 214 is not engaged with the grippers 280, 282 on the arm 244 of the HTHS 230, the method 20000 can proceed to step 20306 and the system 100 can adjust the grippers 280, 282. Then, the method 20000 can return to step 20302 and continue as described. Returning to step 20304, if the system 100 determines that the casing 214 is engaged with the grippers 280, 282 on the arm 244 of the HTHS 230, the method can continue to step 20308 and the system 100 can retrieve the casing 214 from the horizontal casing 214 storage rack 212 (FIG. 123). At step 20310, the system 100 can move the HTHS 230 in a second direction along the first horizontal axis away from the horizontal BHA storage rack 208 and toward the horizontal transfer position (FIG. 124).

Figure 126:
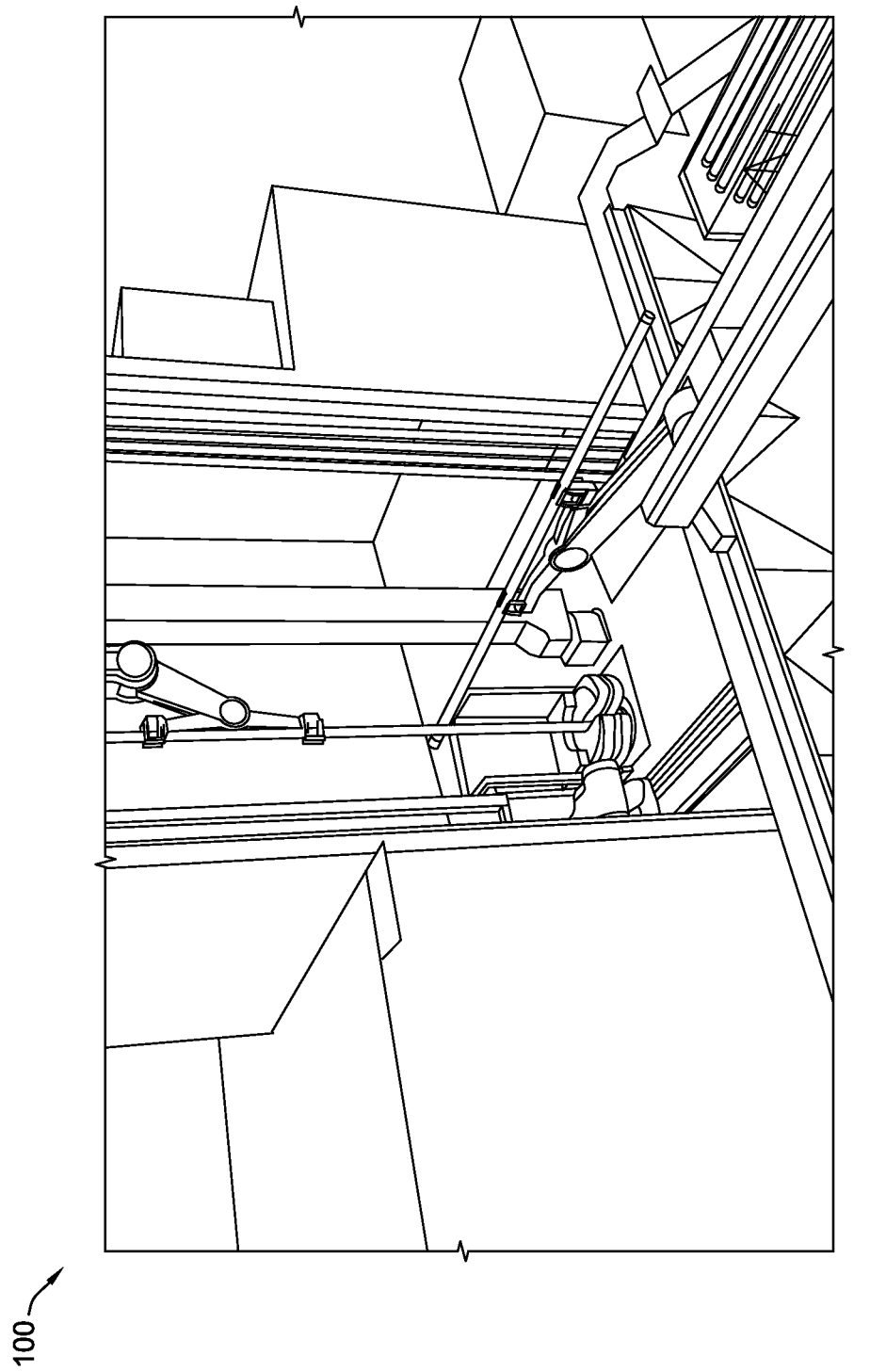

At step 20312, the system 100, using the arm 244 of the HTHS 230, can rotate the casing 214 approximately 180 degrees, i.e., end over end around a central axis (FIG. 124). At step 20314, the system 100 can extend the casing 214 from the horizontal tubular storage area 200 to the well bore area 300 along a third horizontal axis (FIG. 126). At step 20316, the system 100 can open a first gripper and a second gripper on the arm 430 of the LTH 420 of the VTHS 400 (FIG. 128). At step 20316, the system 100 can lower the LTH 420 of the VTHS 400 along the first vertical axis (FIG. 129). At step 20318, the system 100 can rotate an arm 430 of the LTH 420 of the VTHS 400 to a horizontal transfer position (FIG. 130).

Figure 130:
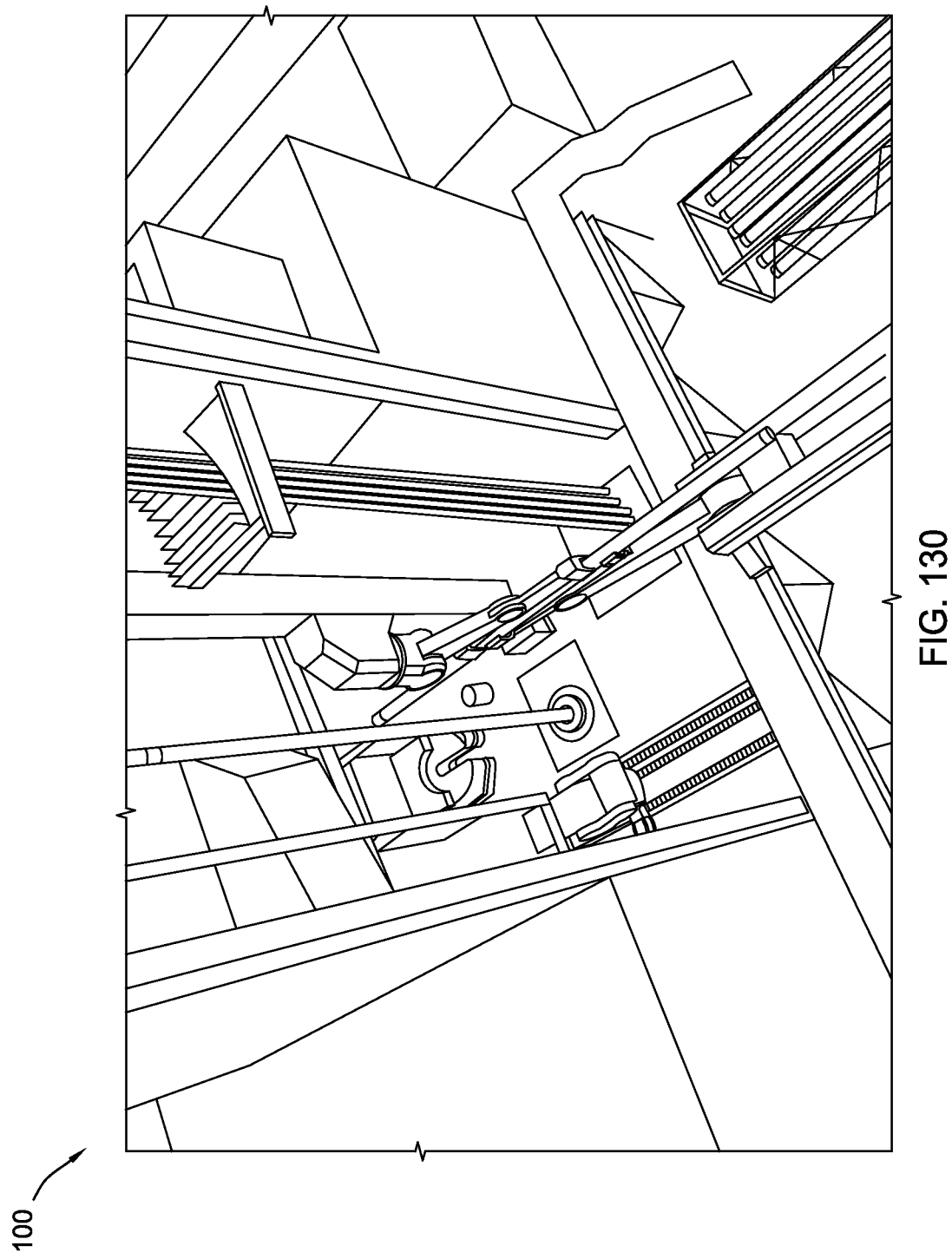
Figure 131:
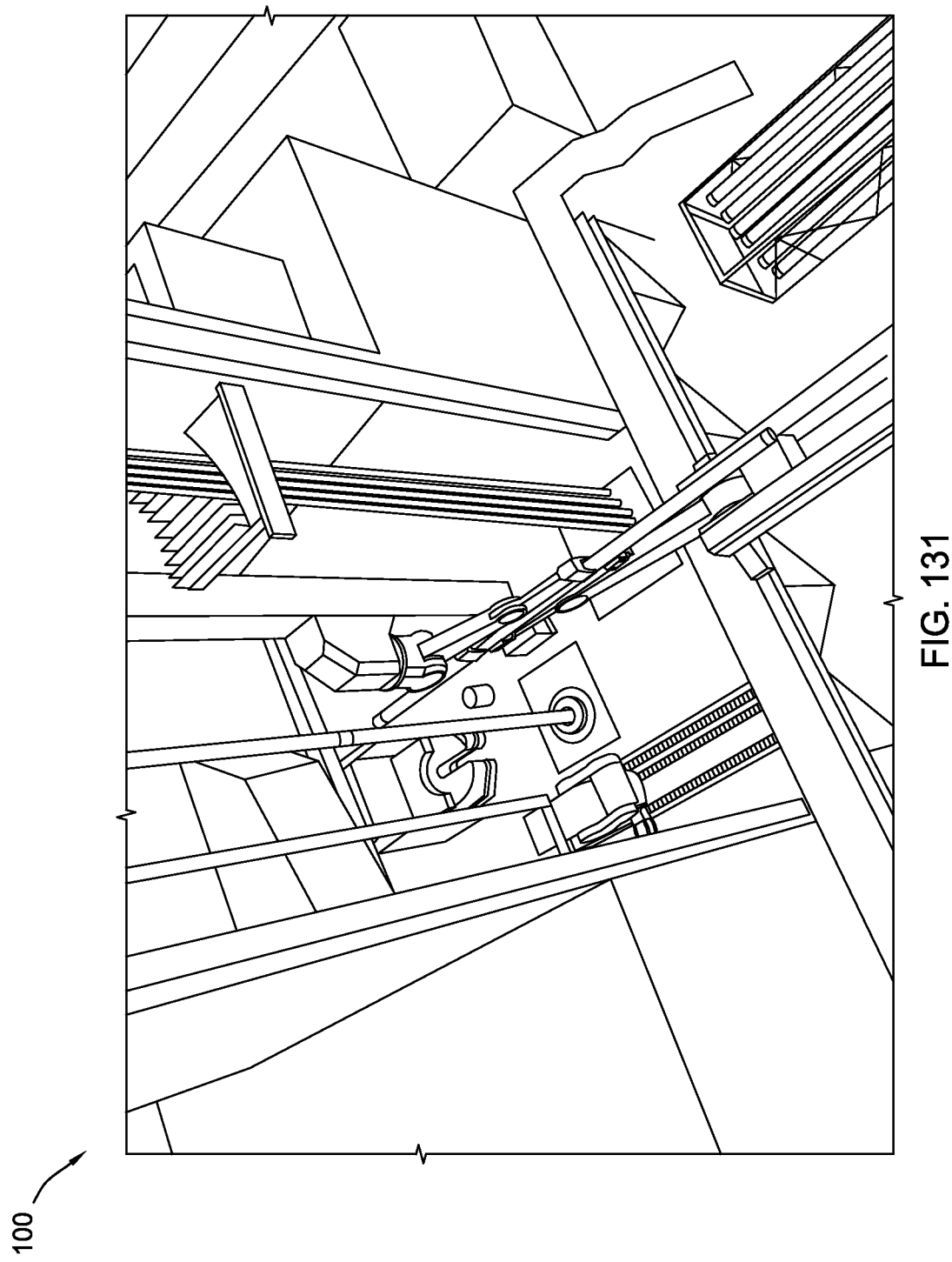
Figure 132:
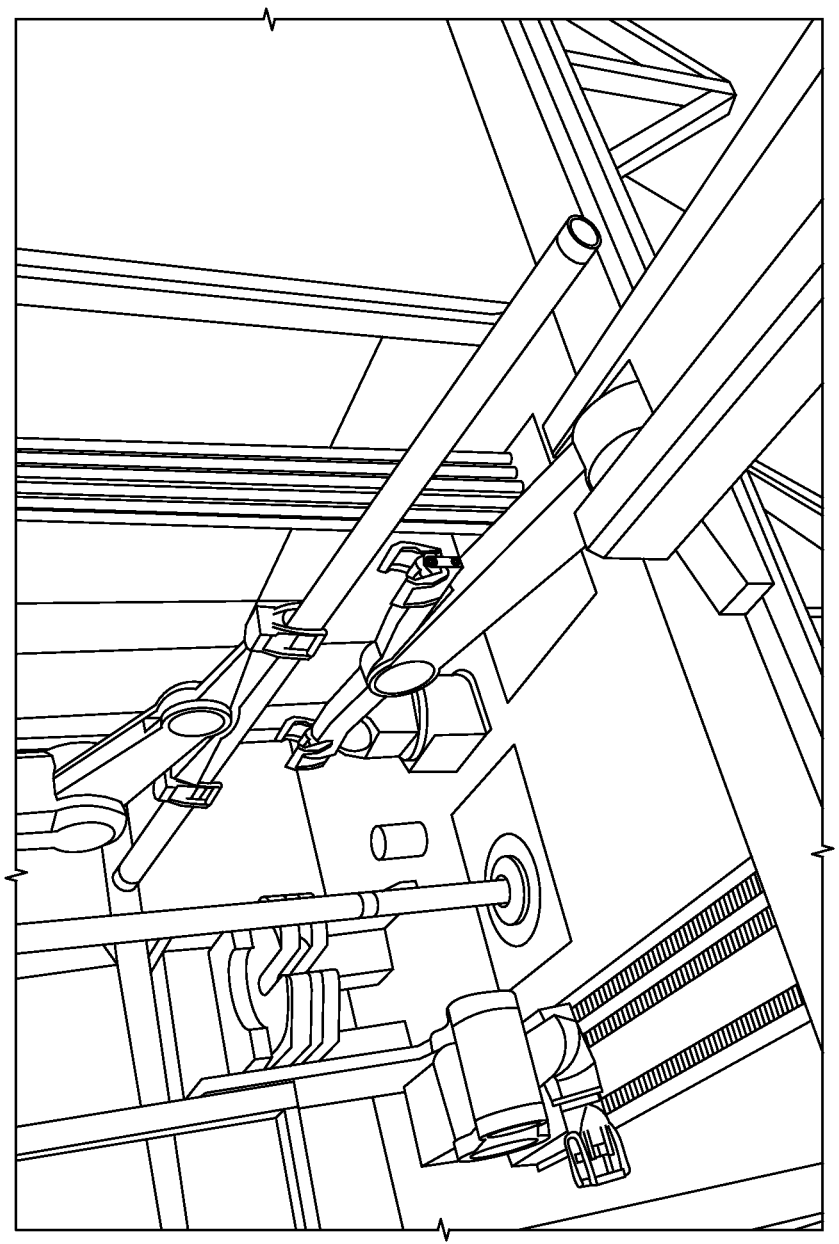
Figure 133:
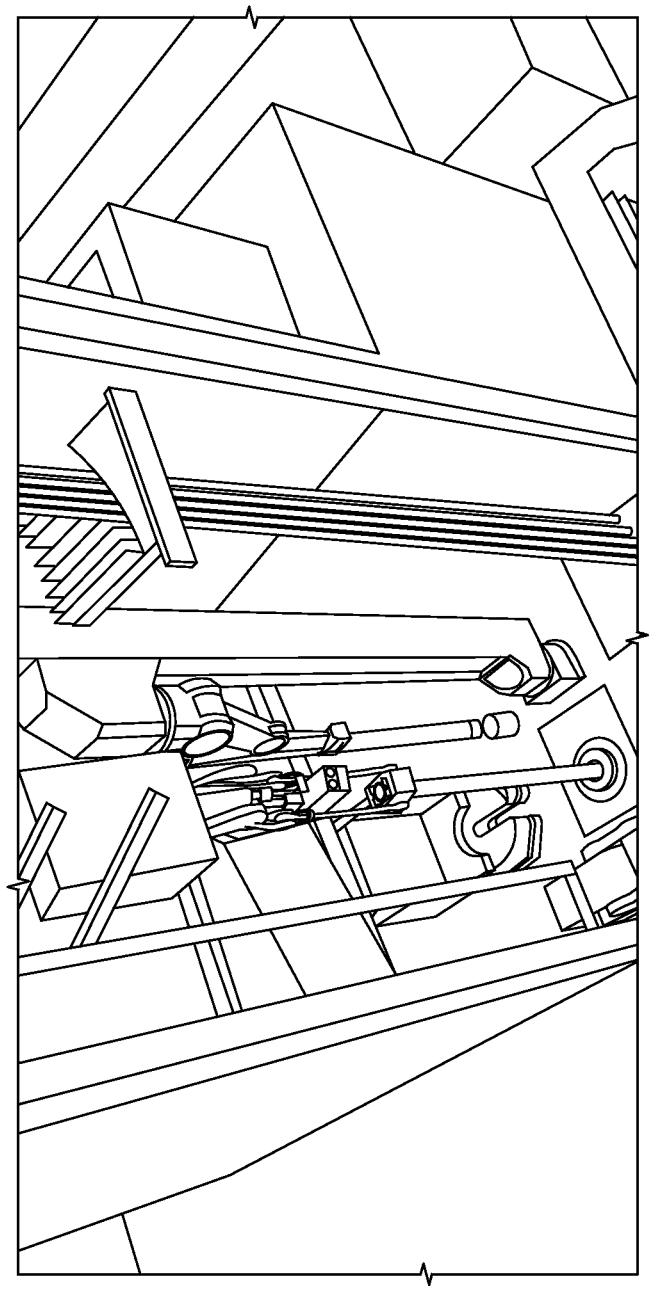
Figure 134:
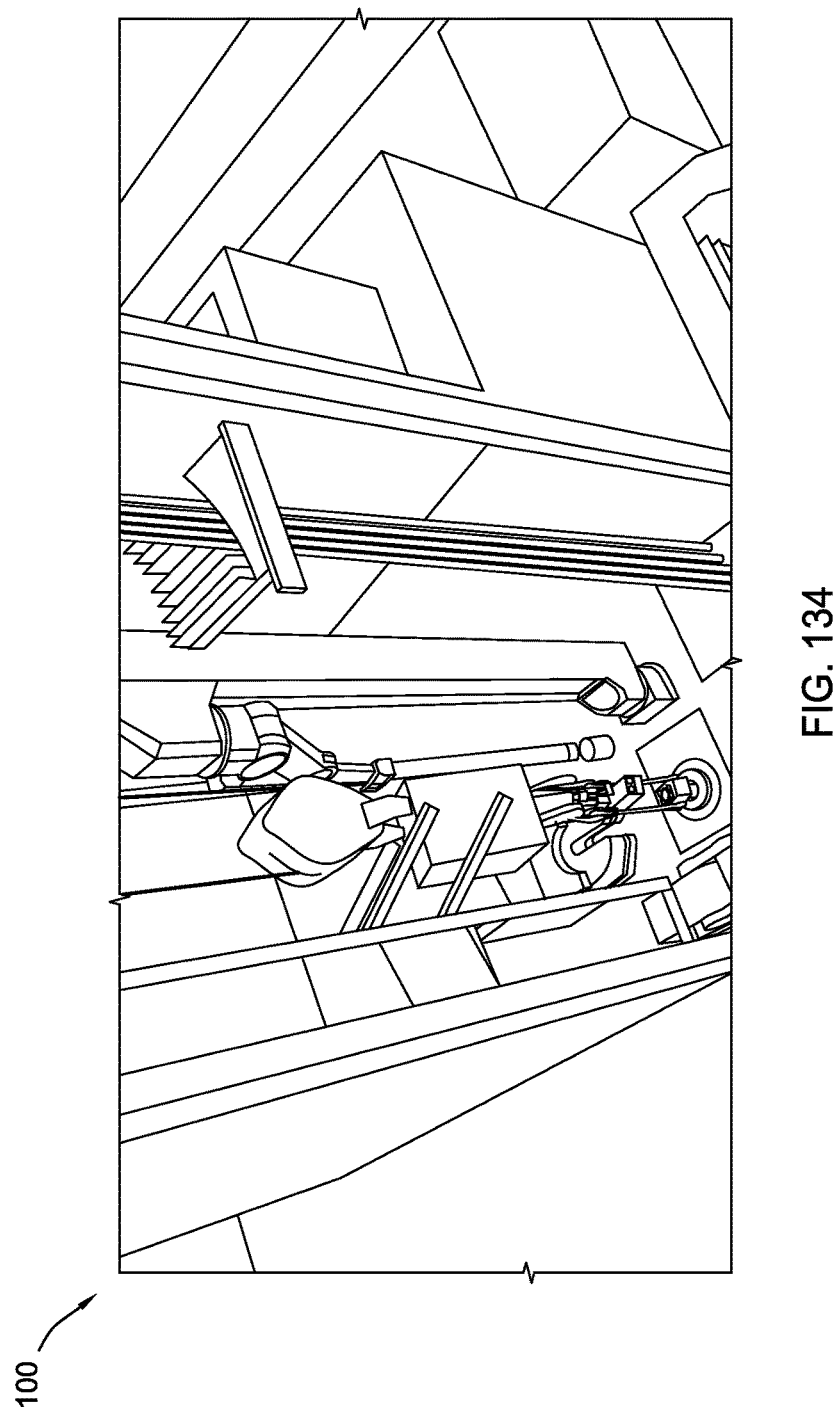
Figure 204:
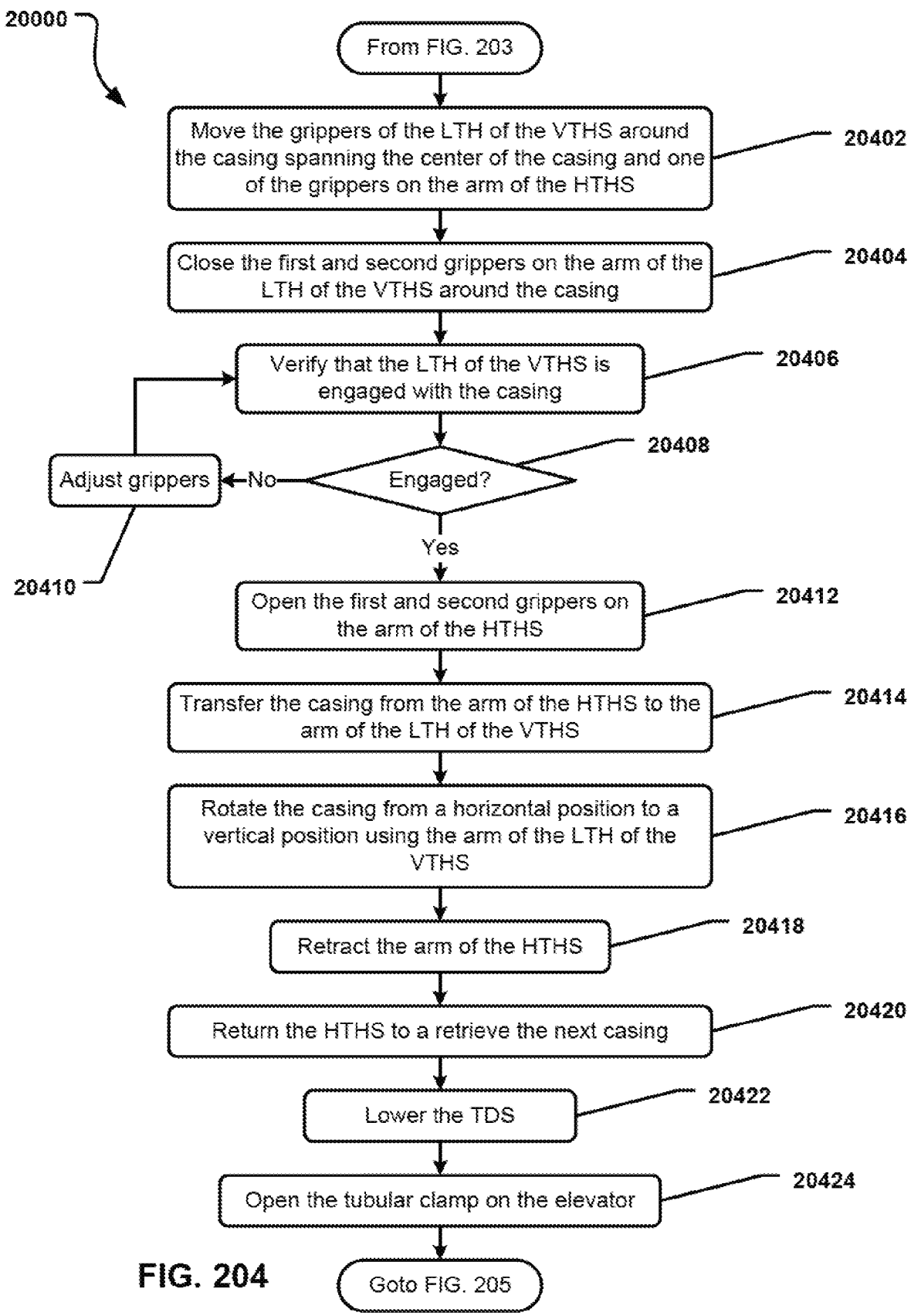
Figure 205:
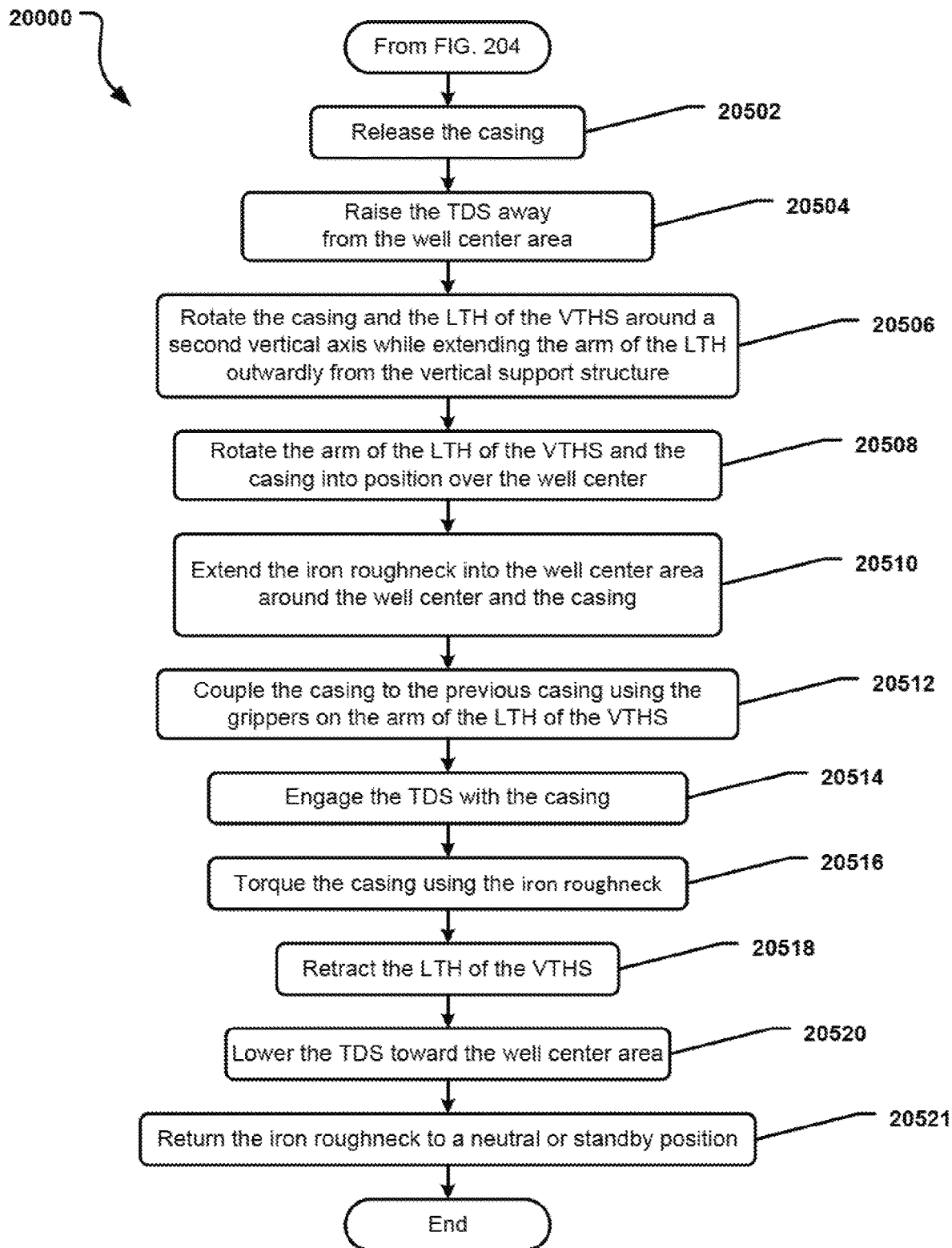

Continuing to FIG. 204, at step 20402, the system 100 can move the grippers 482, 484 of the LTH 420 of the VTHS 400 around the casing 214 spanning the center of the casing 214 and one of the grippers 280, 282 on the arm 244 of the HTHS 230 (FIG. 130). At step 20404, the system 100 can close the first and second grippers 482, 484 on the arm 430 of the LTH 420 of the VTHS 400 around the casing 214 (FIG. 130). At step 20406, the system 100 can verify that the LTH 420 of the VTHS 400 is engaged with the casing 214. At step 20408, if the LTH 420 of the VTHS 400 is not engaged with the casing 214, the method 20000 can move to step 20410 and the system 100 can adjust the grippers 482, 484. Thereafter, the method 20000 may return to step 20406 and continue as described herein. Returning to step 20408, if the LTH 420 of the VTHS 400 is engaged with the casing 214, the method 20000 can move to step 20412 and the system 100 can open the first and second grippers on the arm 244 of the HTHS 230 (FIG. 131). At step 20414, the system 100 can transfer the casing 214 from the arm 244 of the HTHS 230 to the arm 430 of the LTH 420 of the VTHS 400 (FIG. 132). At step 20416, the system 100 can rotate the casing 214 from a horizontal position to a vertical position using the arm 430 of the LTH 420 of the VTHS 400 (FIG. 133). Further, at step 20418, the system 100 can retract the arm 244 of the HTHS 230. At step 20420, the system 100 can return the HTHS 230 to a retrieve the next casing 214. At step 20422, the system 100 can lower the TDS (FIG. 133). Moreover, at step 20416, the system 100 can open the tubular clamp on the elevator 850 (FIG. 134). It is to be understood that steps 20416 through 20420 can be performed at essentially the same time. After these steps are performed, the method 20000 can proceed to FIG. 205.

Figure 135:
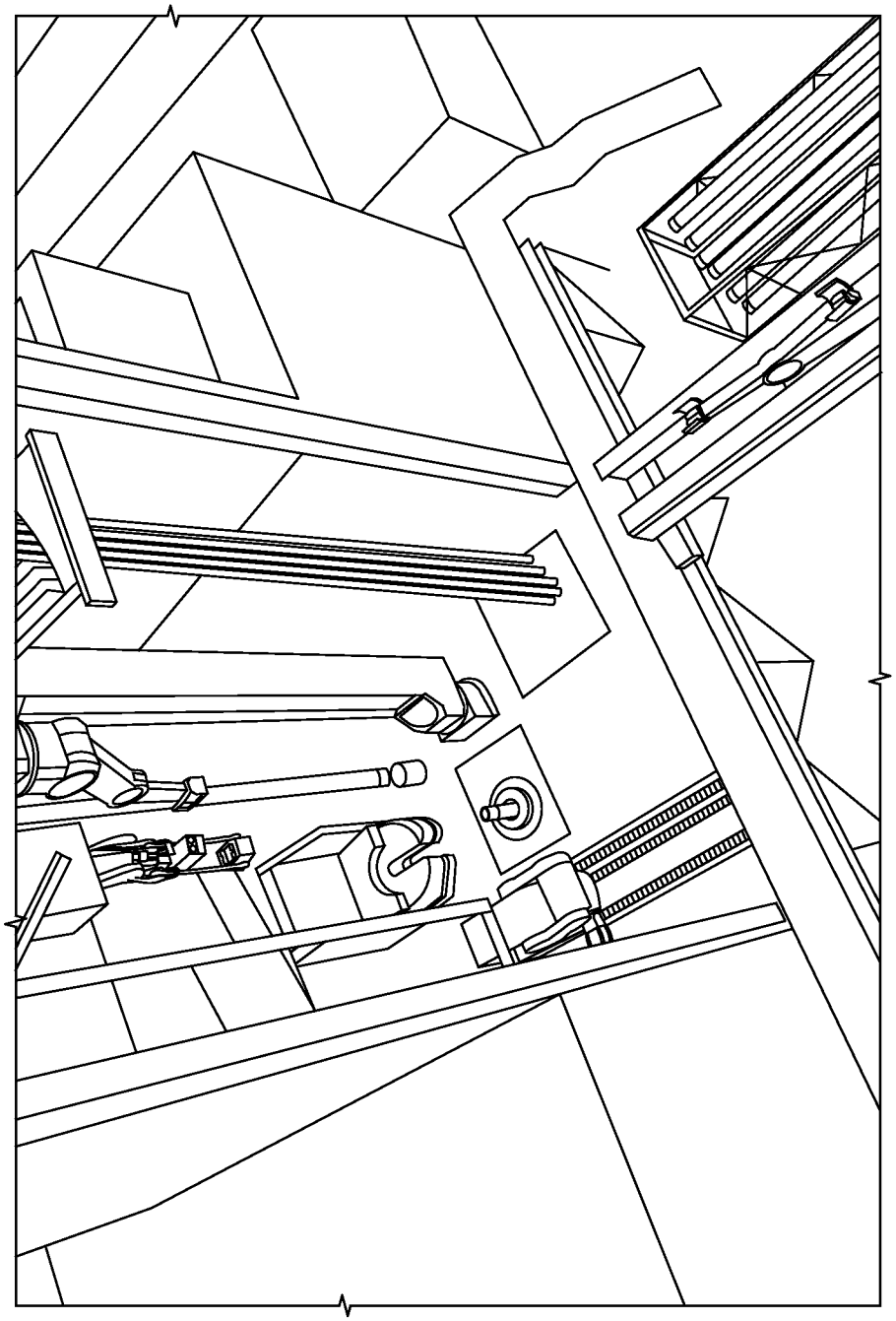
Figure 136:
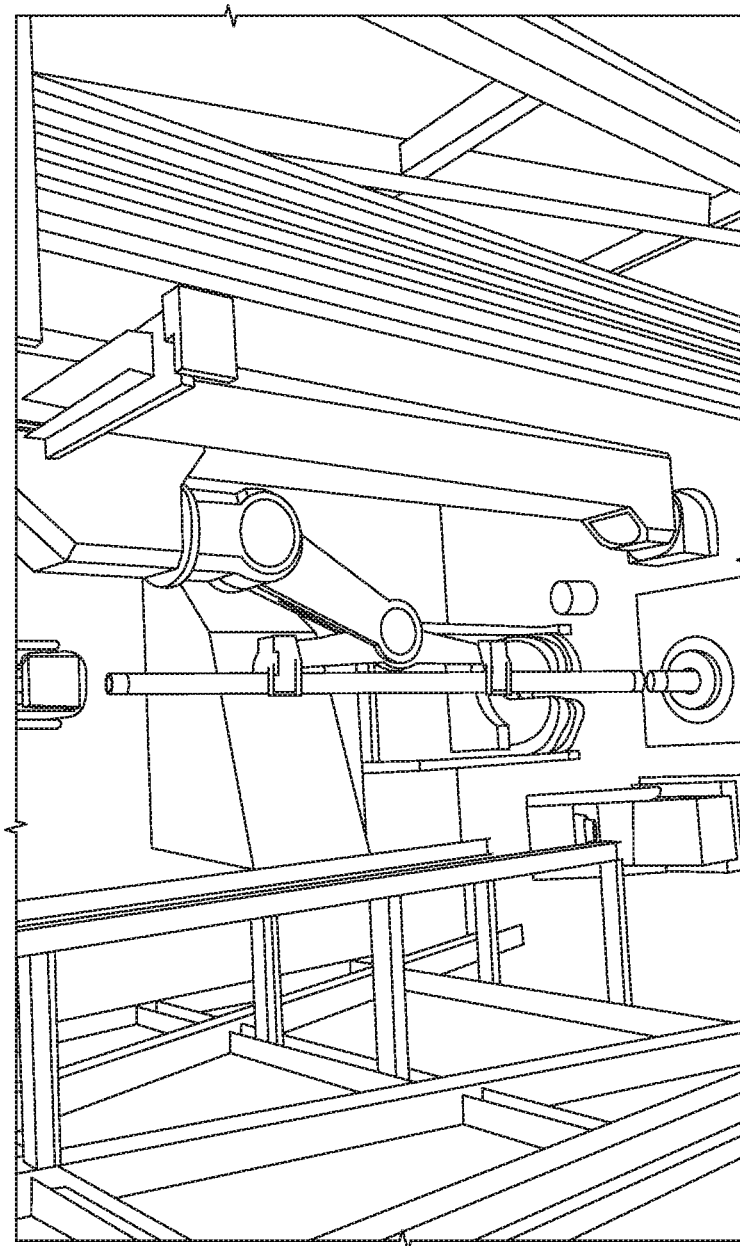
Figure 137:
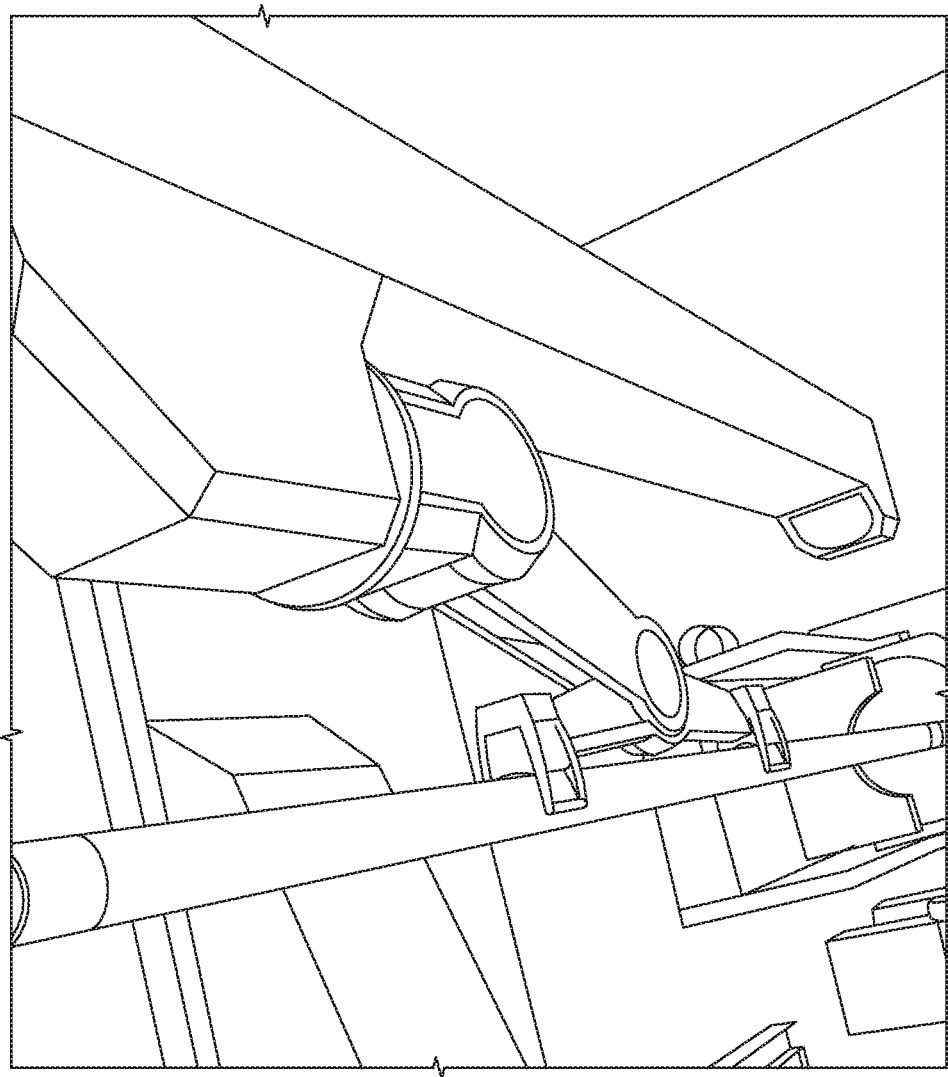
Figure 138:
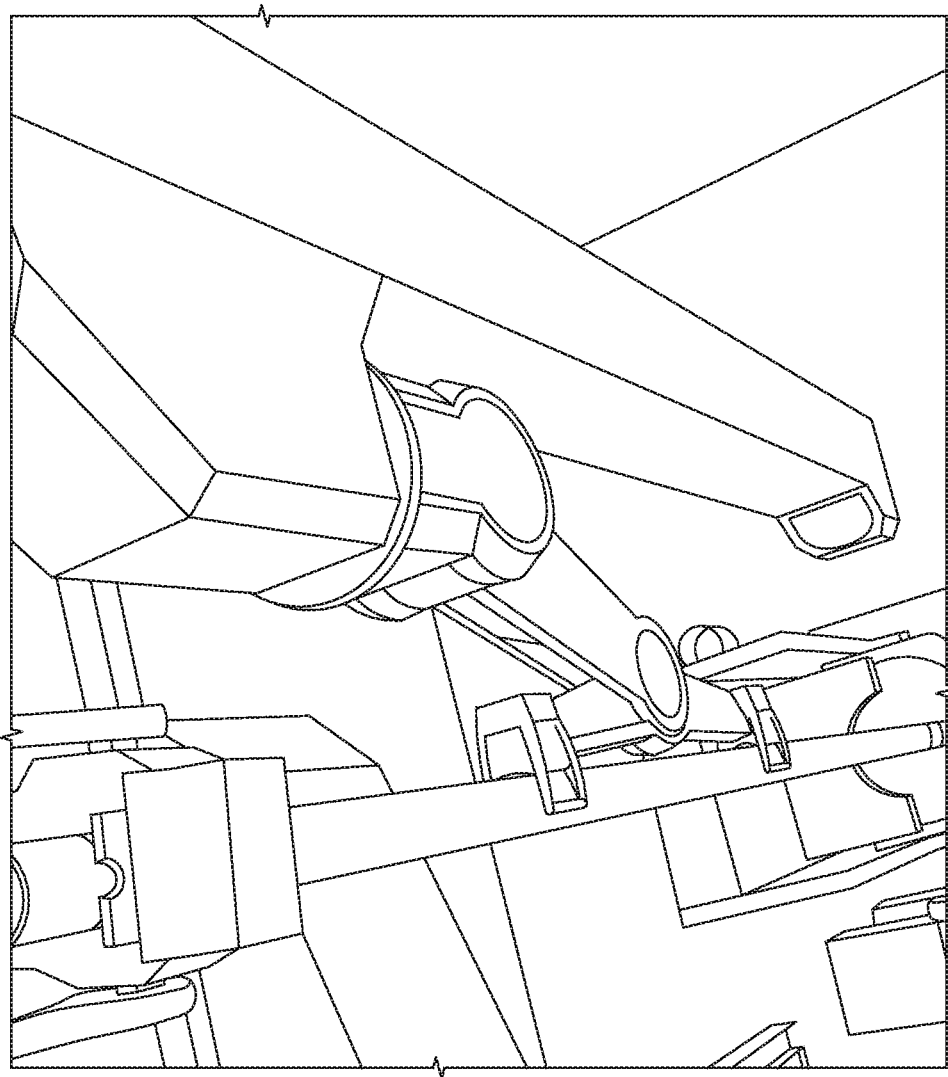
Figure 139:
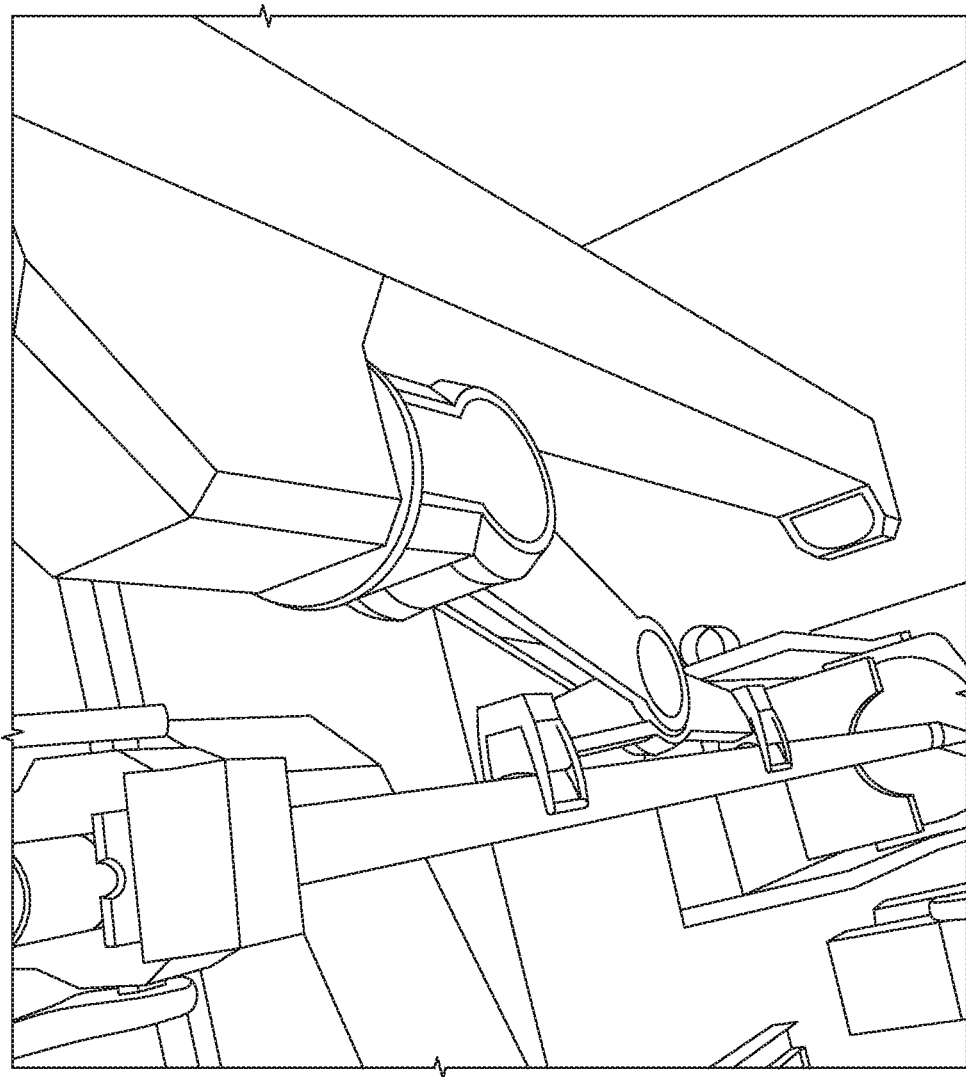
Figure 140:
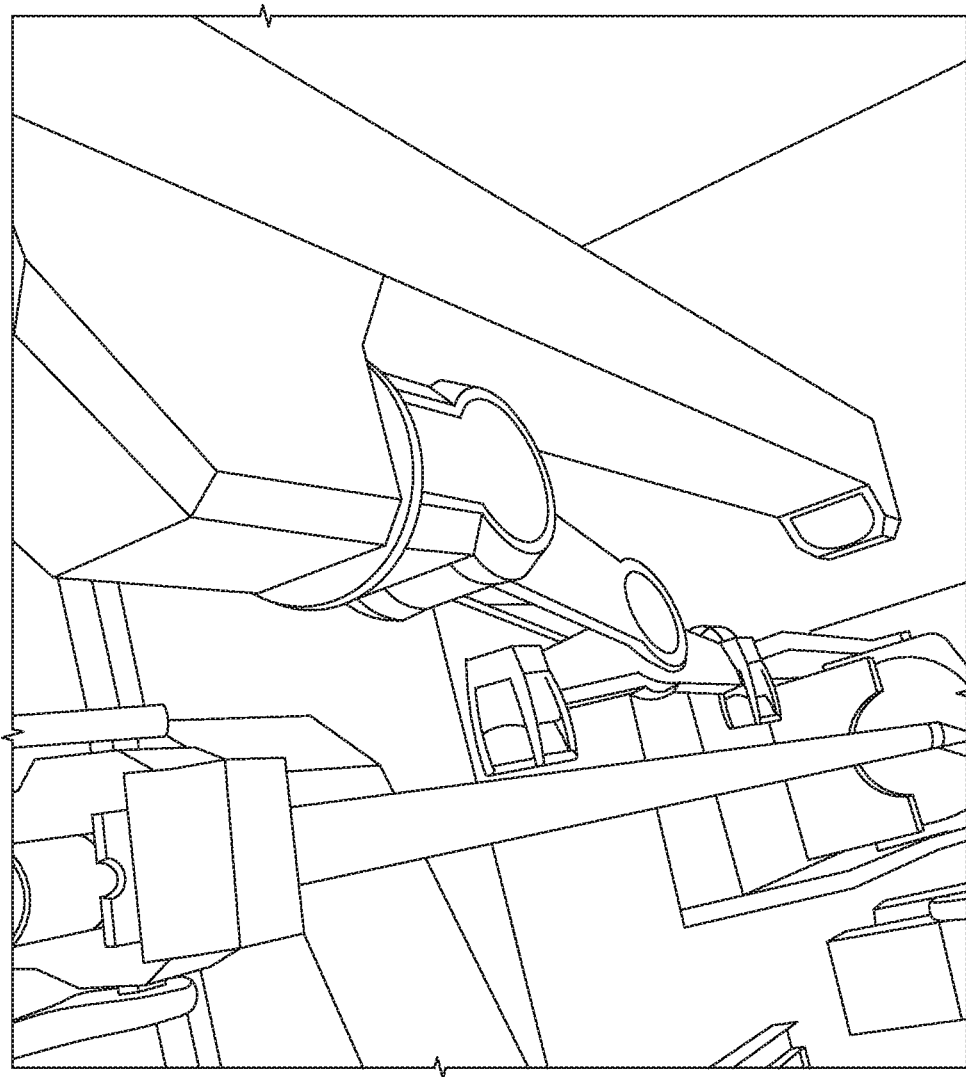
Figure 141:
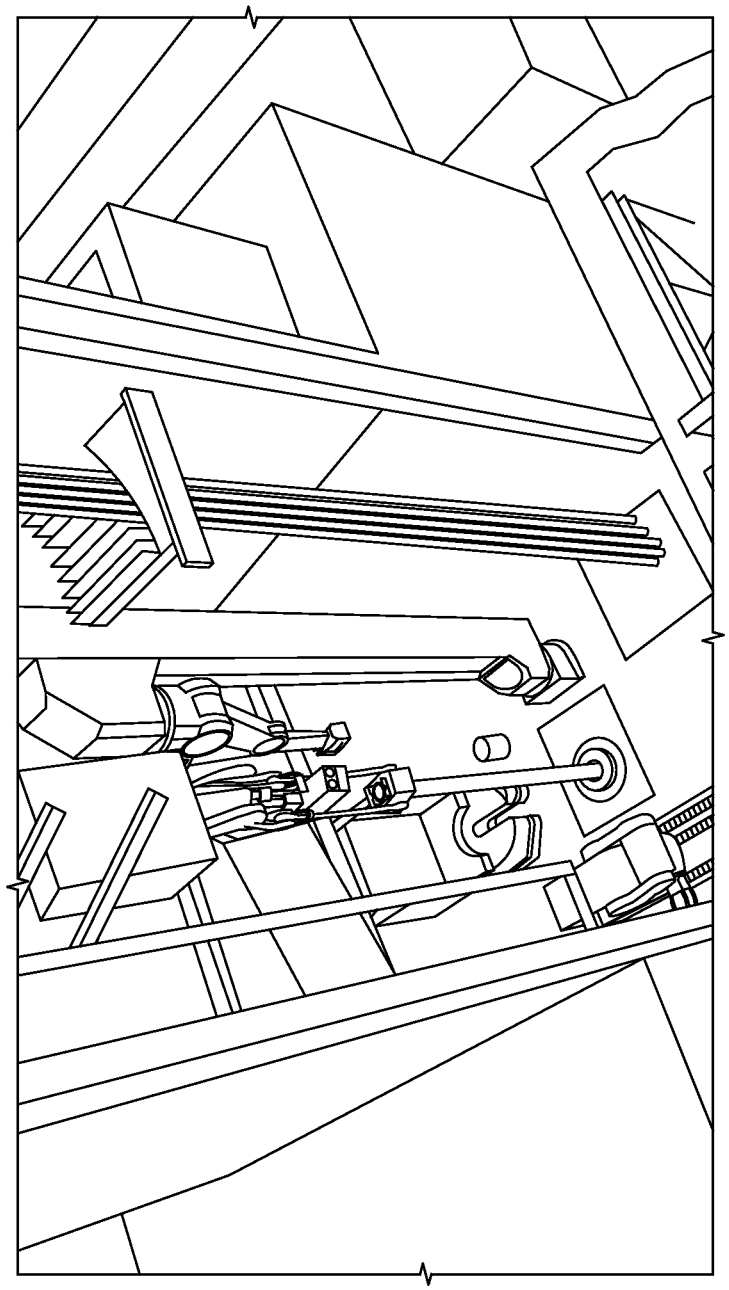

At step 20502, the system 100 can release the casing 214. At step 20504, the system 100 can raise the TDS 800 away from the well center area 508 (FIG. 135). Further, at step 20506, the system 100 can rotate the casing 214 and the LTH 420 of the VTHS 400 around a second vertical axis while extending the arm 430 of the LTH 420 outwardly from the vertical support structure 402 (FIG. 136). At step 20508, the system 100 can rotate the arm 430 of the LTH 420 of the VTHS 400 and the casing 214 into position over the well center (FIG. 136). Thereafter, at step 20510, at essentially the same time as step 20508 is performed, the system 100 can extend the iron roughneck 600 into the well center area 508 around the well center and the casing 214 (FIG. 137). At step 20512, the system 100 can couple the casing 214 to the previous casing 214 using the grippers on the arm 430 of the LTH 420 of the VTHS 400 (FIG. 138). At step 20514, the system 100 can engage the TDS 800 with the casing 214 (FIG. 138). Further, at step 20516, the system 100 can torque the casing 214 using the iron roughneck 600 (FIG. 139). Then, at step 20518, at essentially the same time, the system 100 can retract the LTH of the VTHS from the casing (FIG. 140). At step 20520, the system 100 can lower the TDS 800 toward the well center area 508 (FIG. 141). At step 20521, at essentially the same time as the system 100 lowers the TDS 800, the system 100 can return the iron roughneck 600 to a neutral or standby position. Thereafter, the method 20000 may end.

Referring now to FIG. 206 through FIG. 212, another series of flowcharts are illustrated that depict yet another method of conducting a subterranean operation, designated 20600. Throughout the description of these flowcharts elements that appear in the FIG. 1 through FIG. 167 are referenced. The elements referenced are capable of performing the particular operation or function mentioned in the flowchart step. Further, there may be parenthetical notations with specific figures referenced. These parenthetical notations indicate the specific figure (in FIG. 1 through FIG. 167) in which the performance of a particular operation or function is depicted.

Figure 142:
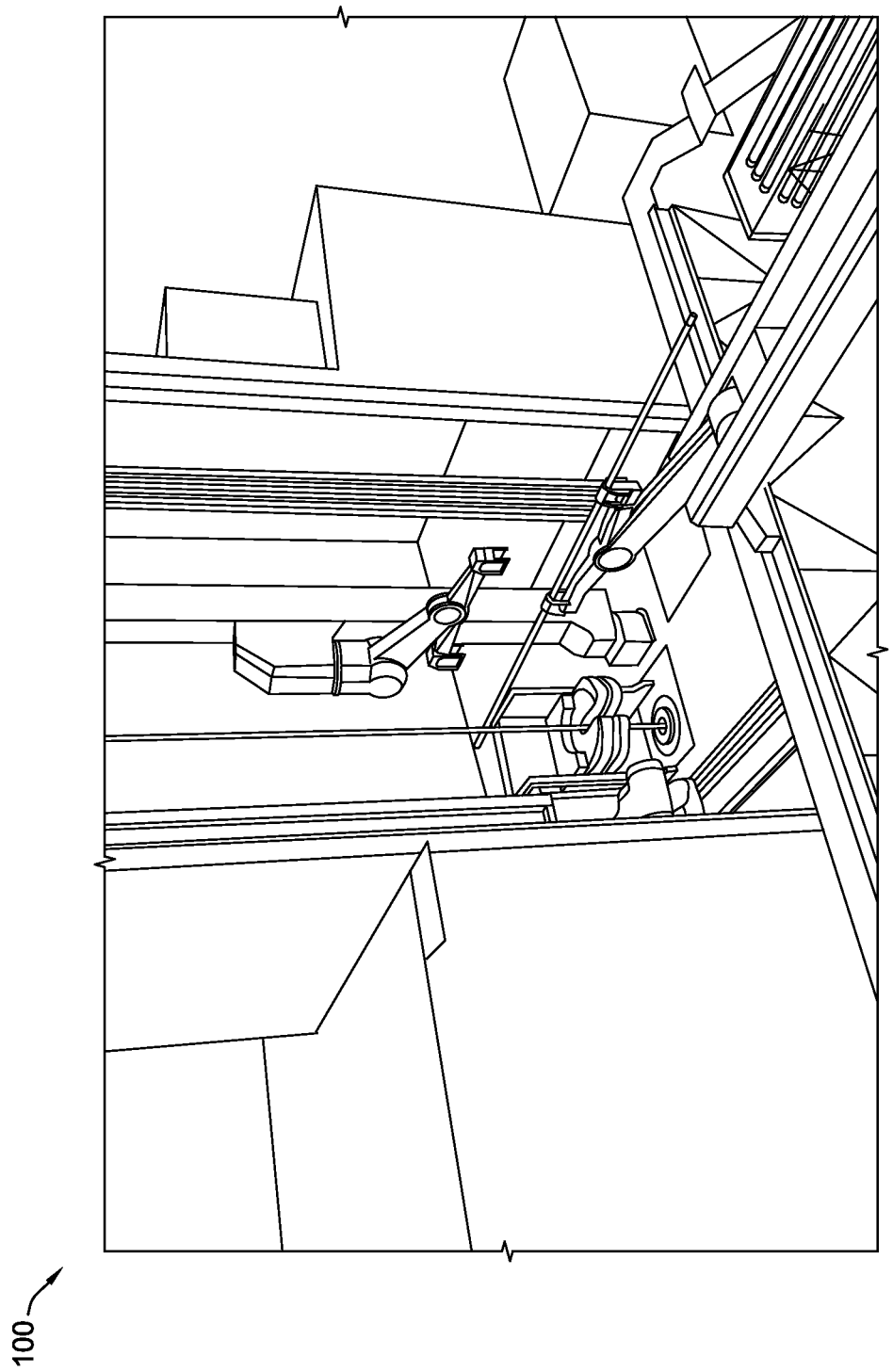
Figure 143:
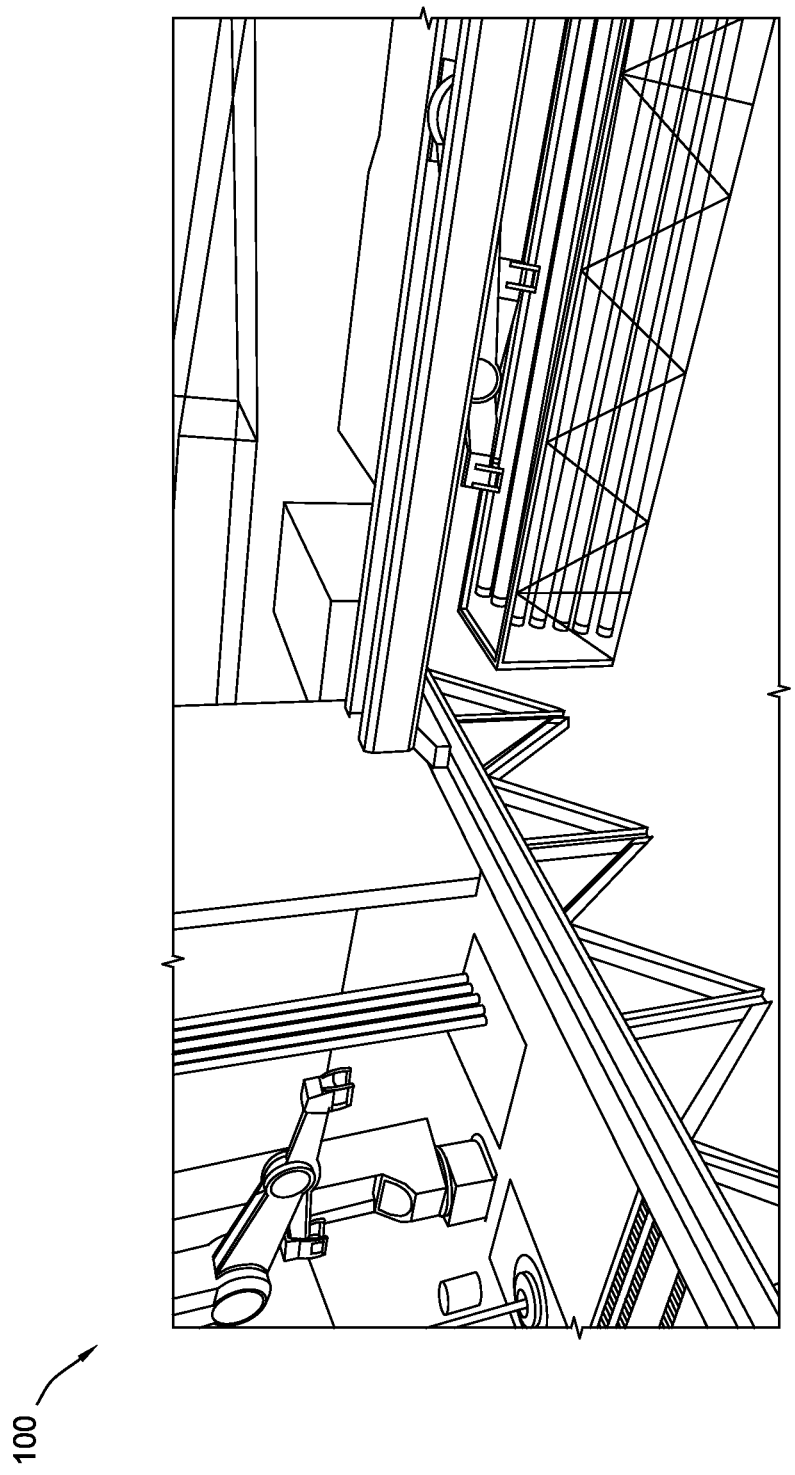
Figure 144:
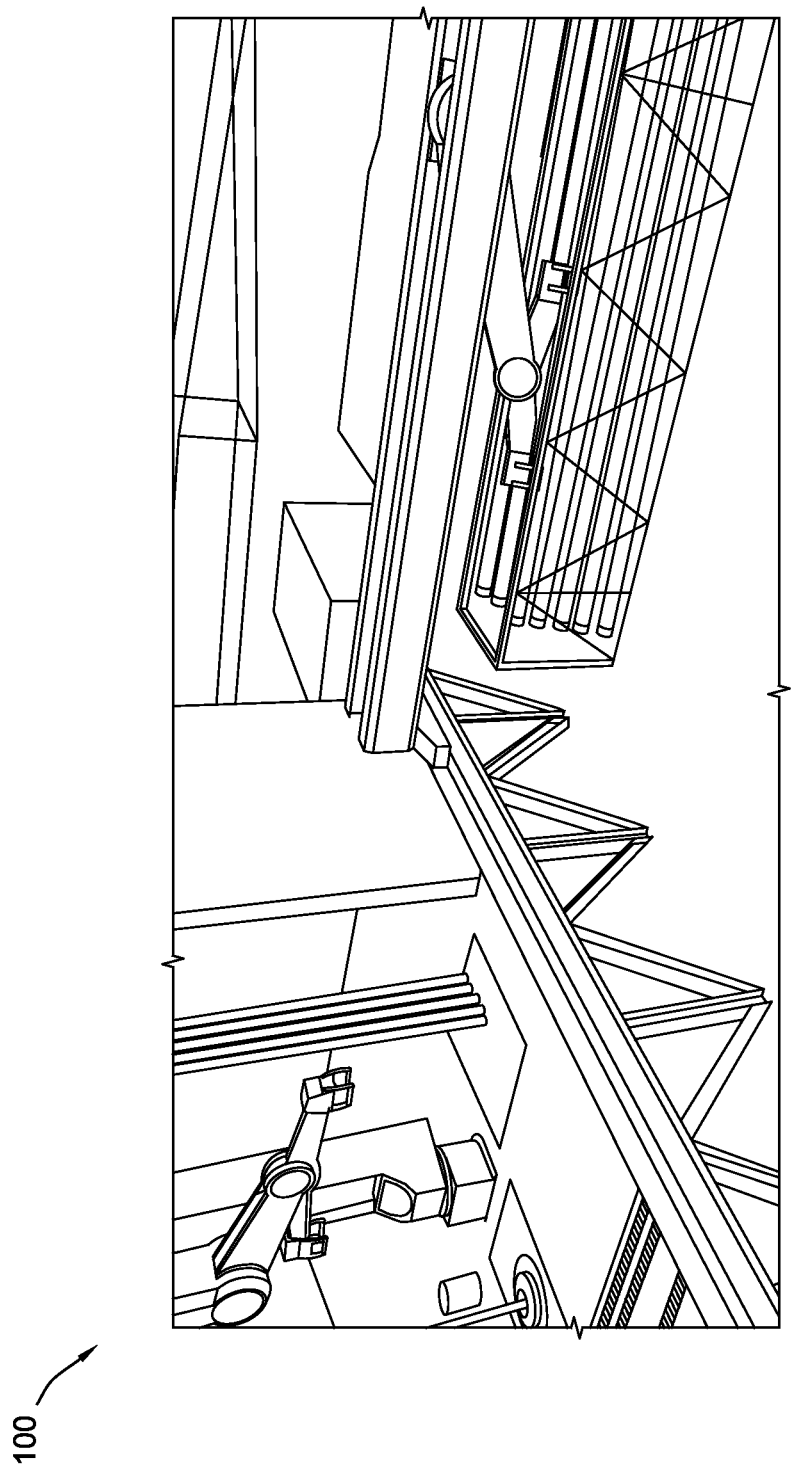
Figure 145:
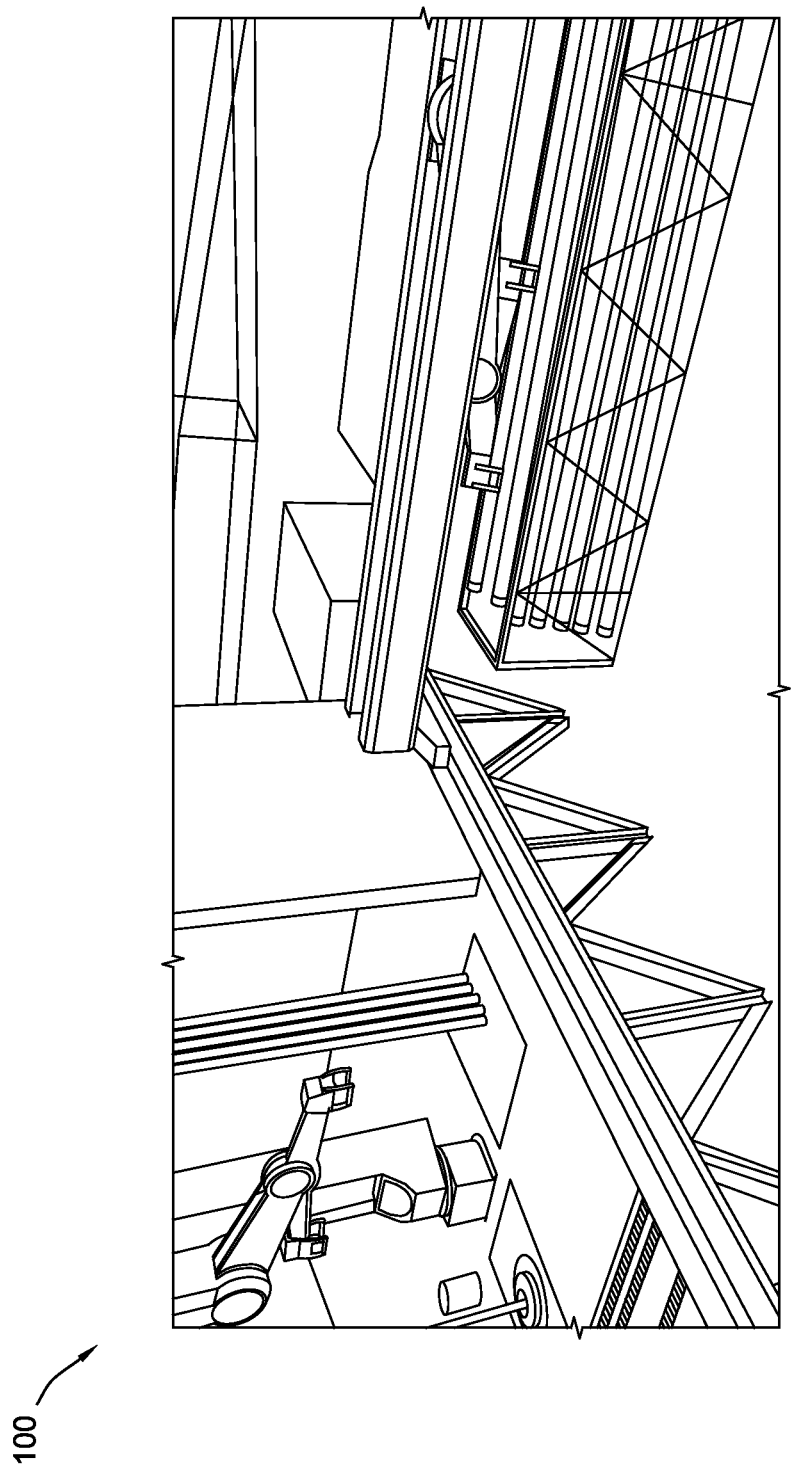
Figure 146:
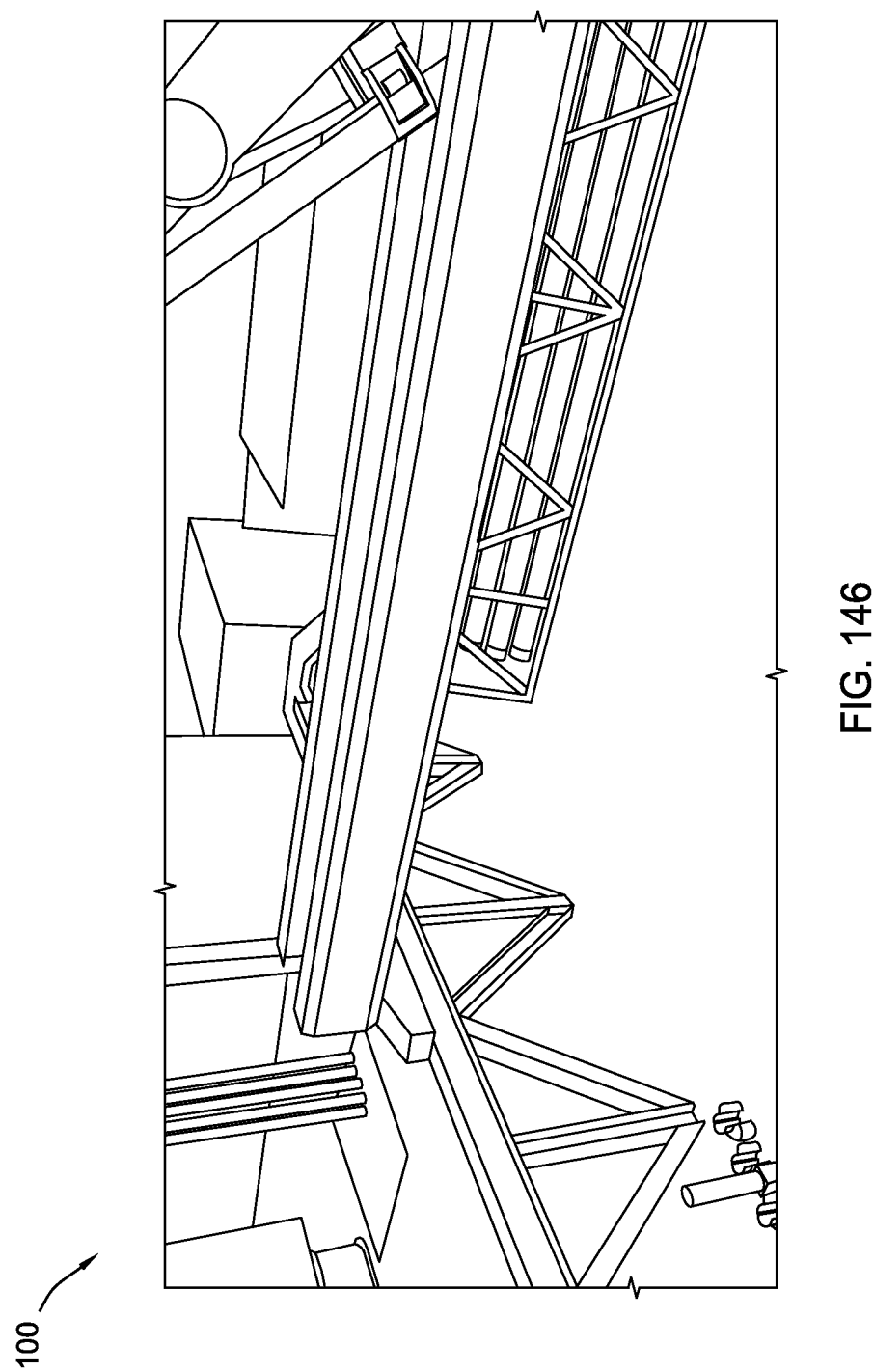
Figure 206:
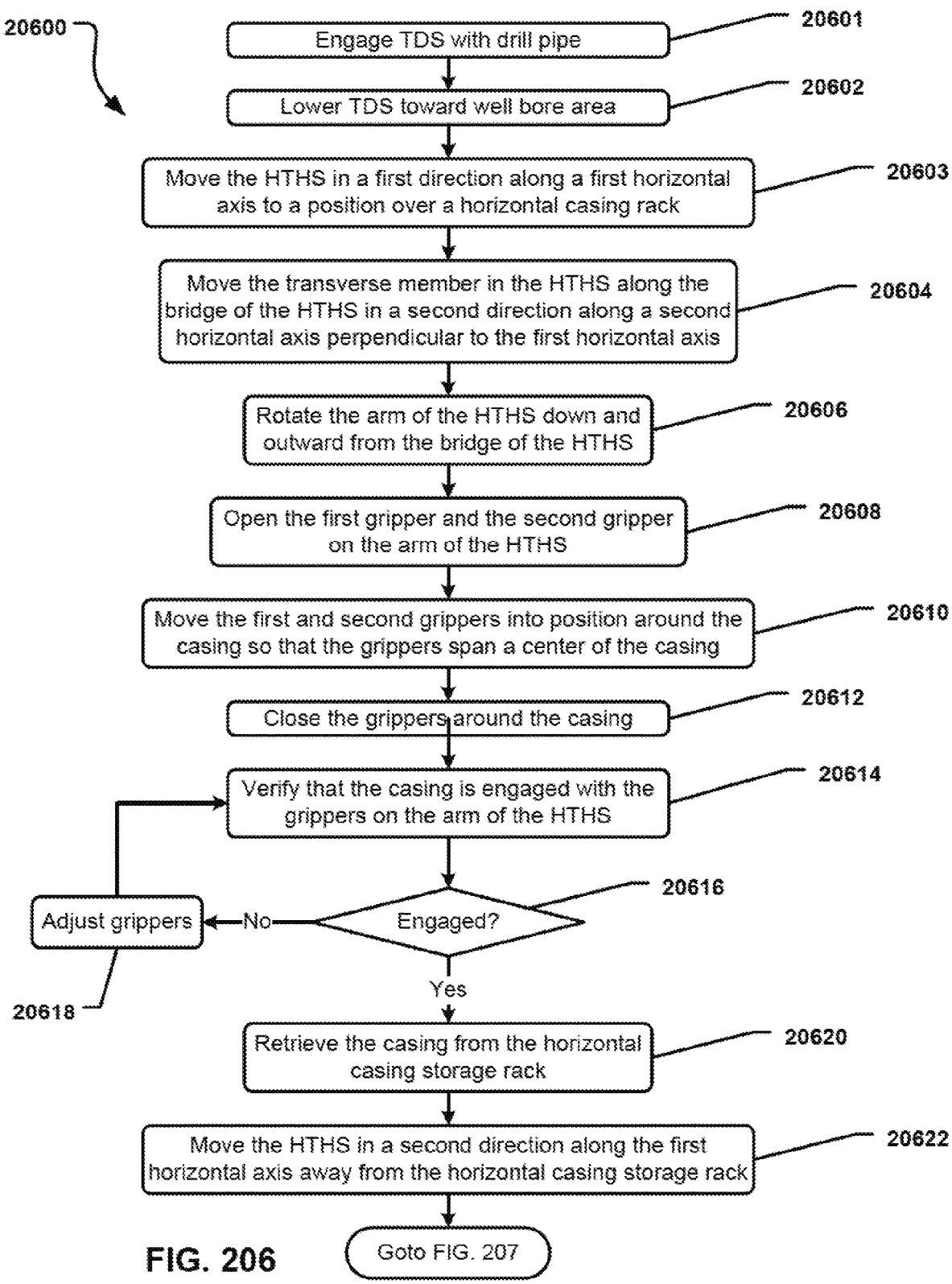
FIGS. 206-212 include illustrations of a portion of a fourth method for conducting subterranean operations in accordance with embodiments.
Figure 207:
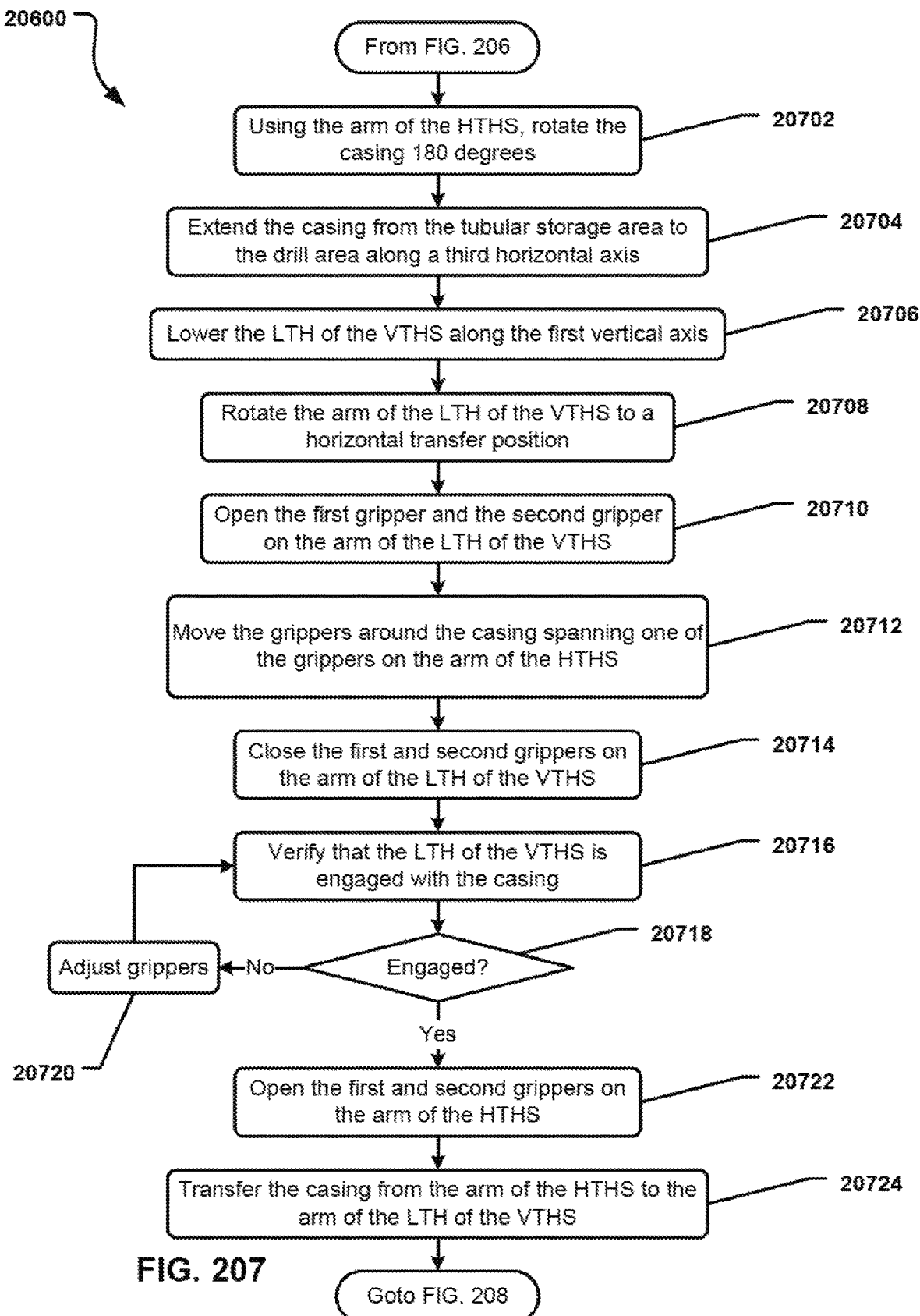

Beginning at step 20601 of FIG. 206, the system 100 can engage the TDS 800 with a drill pipe. At step 20602, the system 100 can lower the TDS toward the well bore area 506. While the system 100 lowers the TDS 800, the system 100 can perform steps 20603 through 21220 with the HTHS 230 and the VTHS 400. Specifically, at step 20603, the system 100 can move the HTHS 230 in a first direction along a first horizontal axis to a position over a horizontal casing 214 rack (FIG. 142). At step 20604, the system 100 can move the transverse member 242 in the HTHS 230 along the bridge of the HTHS 230 in a second direction along a second horizontal axis perpendicular to the first horizontal axis (FIG. 143). At step 20606, the system 100 can rotate the arm 244 of the HTHS 230 down and outward from the bridge of the HTHS 230 (FIG. 143). Further, at step 20608, the system 100 can open the first gripper and the second gripper on the arm 244 of the HTHS 230 (FIG. 143). At step 20610, the system 100 can move the first and second grippers into position around the casing 214 so that the grippers span a center of the casing 214 (FIG. 144). At step 20612, the system 100 can close the grippers around the casing 214 (FIG. 144). At step 20614, the system 100 can verify that the casing 214 is engaged with the grippers 280, 282 on the arm 244 of the HTHS 230. At step 20616, if the casing 214 is not engaged with the grippers 280, 282 on the arm 244 of the HTHS 230, the method 20600 can move to step 20618 and the system 100 can adjust the grippers 280, 282. Then, the method 20600 can return to step 20614 and continue as described. Conversely, at step 20616, if the casing 214 is engaged with the grippers 280, 282 on the arm 244 of the HTHS 230, the method 20600 can move to step 20620 and the system 100 can retrieve the casing 214 from the horizontal casing 214 storage rack (FIG. 145). Further, at step 20622, the system 100 can move the HTHS 230 in a second direction along the first horizontal axis away from the horizontal casing 214 storage rack 212 (FIG. 146). The method 20600 can then proceed to FIG. 207.

Figure 147:
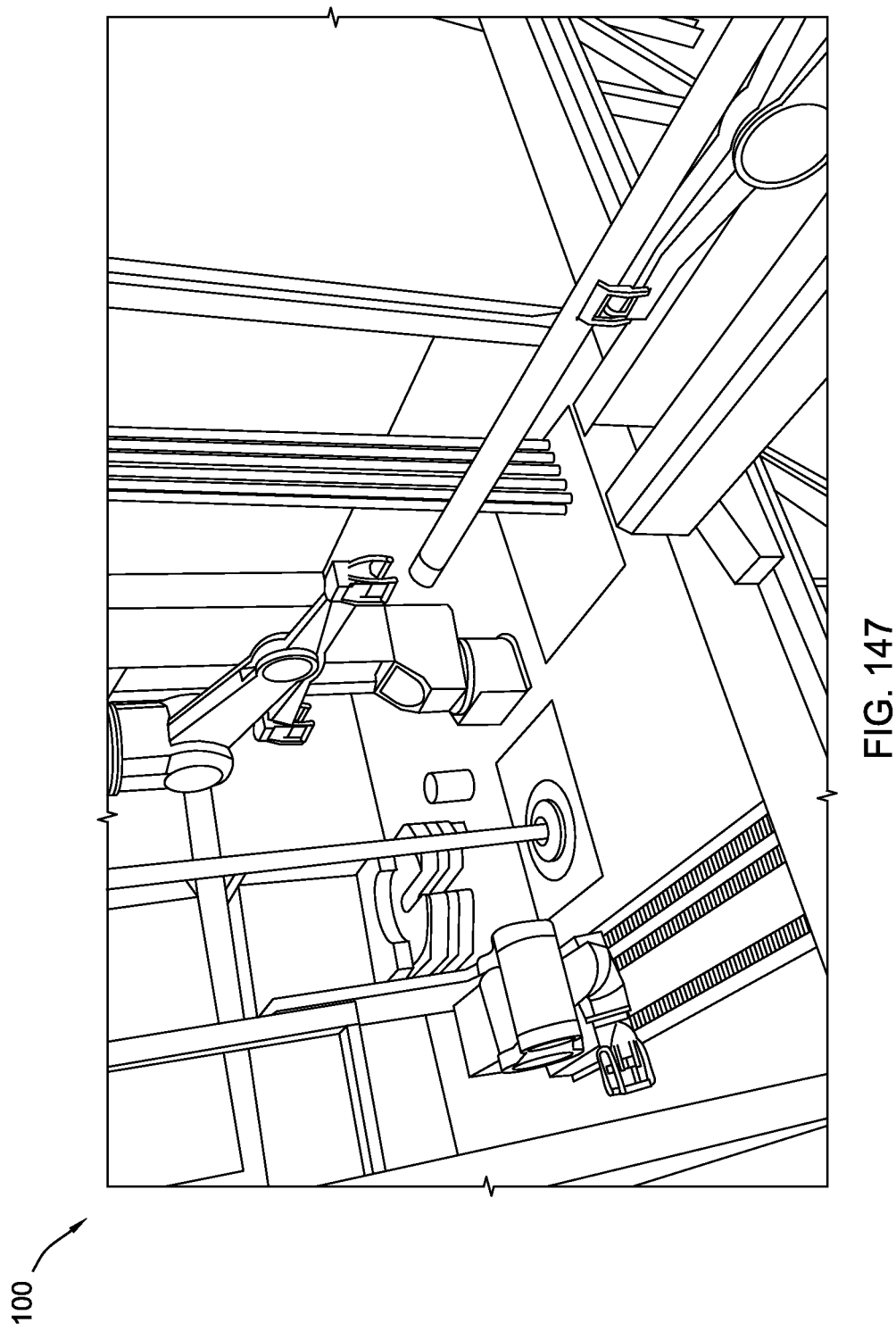
Figure 148:
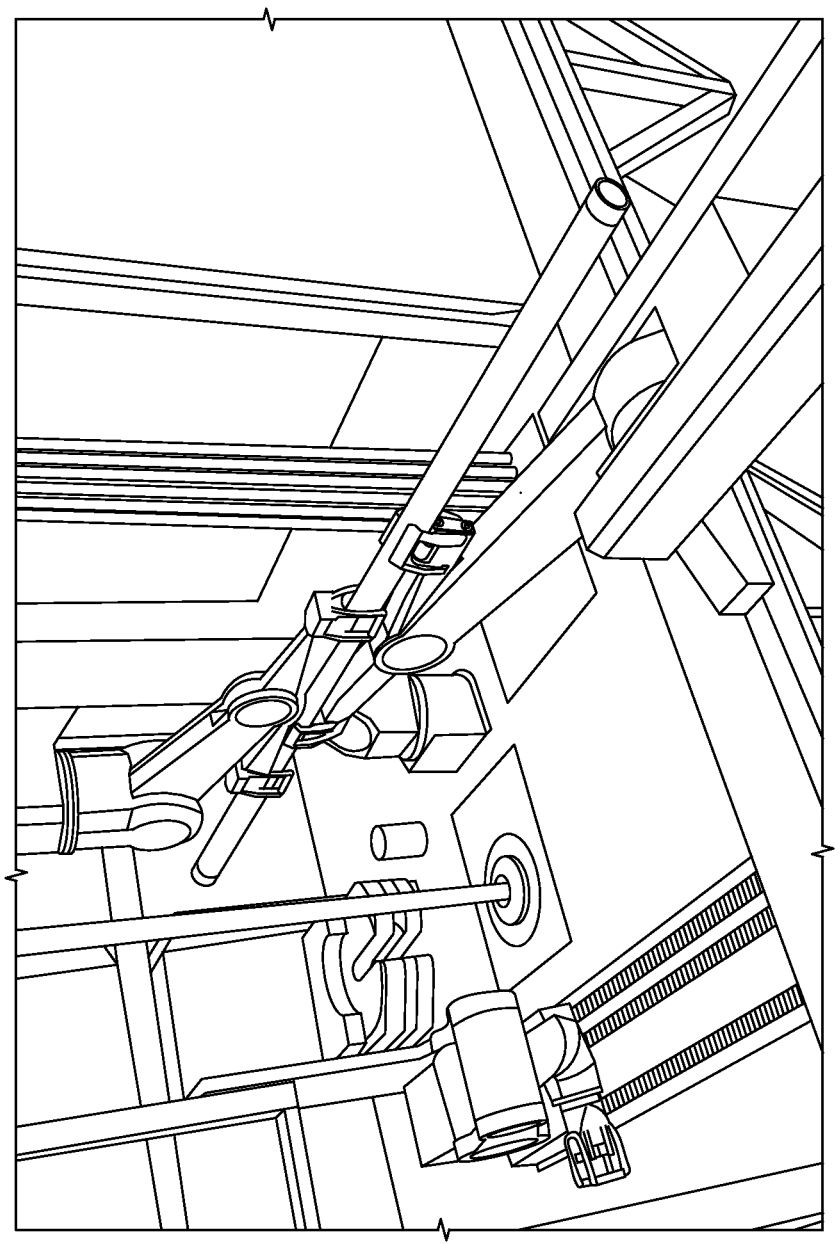

At step 20702, the system 100, using the arm 244 of the HTHS 230, can rotate the casing 214 approximately 180 degrees (FIG. 146). At step 20704, the system 100 can extend the casing 214 from the tubular storage area 200 to the well bore area 300 in along a third horizontal axis (FIG. 147). At step 20706, the system 100 can lower the LTH 420 of the VTHS 400 along the first vertical axis (FIG. 147). Further, at step 20708, the system 100 can rotate the arm 430 of the LTH 420 of the VTHS 400 to a horizontal transfer position (FIG. 147). At step 20710, the system 100 can open the first gripper 482 and the second gripper 484 on the arm 430 of the LTH 420 of the VTHS 400 (FIG. 147). Moreover, at step 20712, the system 100 can move the grippers 482, 484 around the casing 214 spanning one of the grippers 280, 282 on the arm 244 of the HTHS 230 (FIG. 148). At step 20714, the system 100 can close the first and second grippers 482, 484 on the arm 430 of the LTH 420 of the VTHS 400 (FIG. 148).

Figure 149:
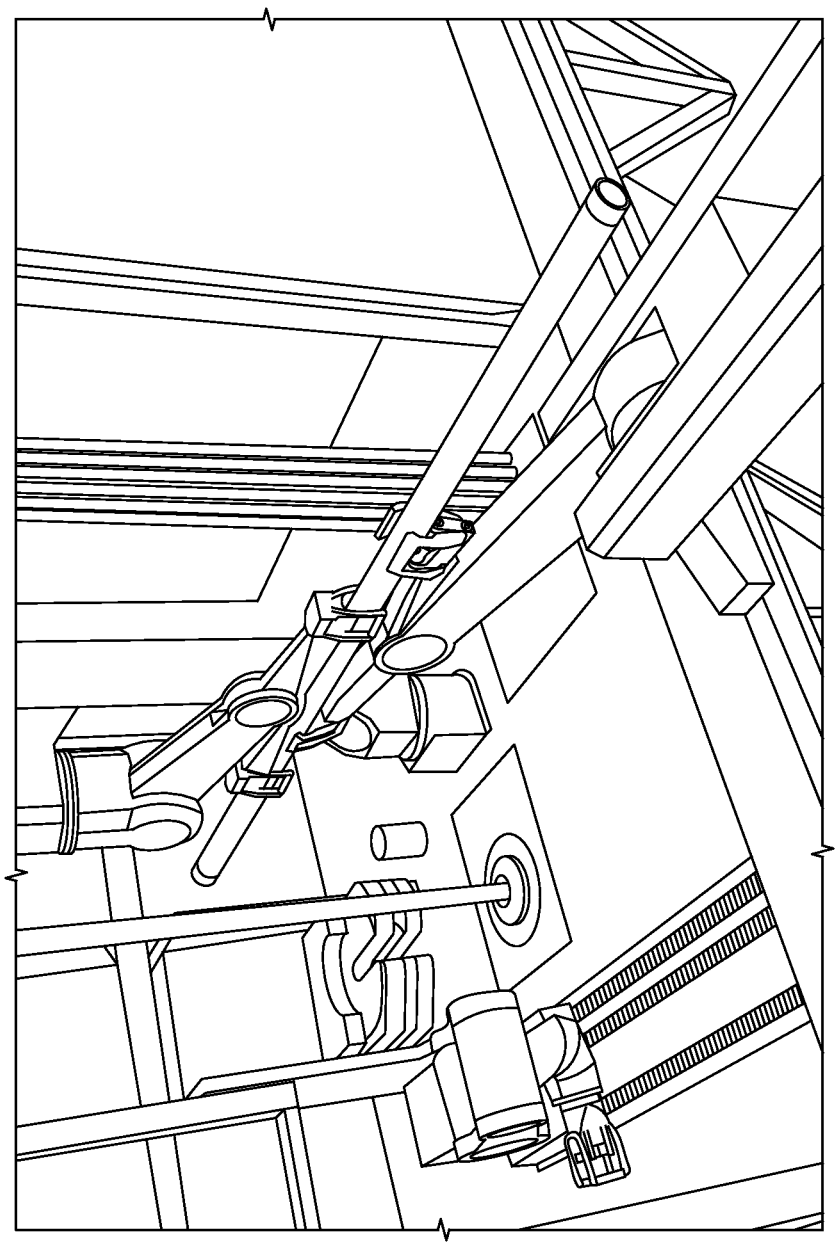
Figure 150:
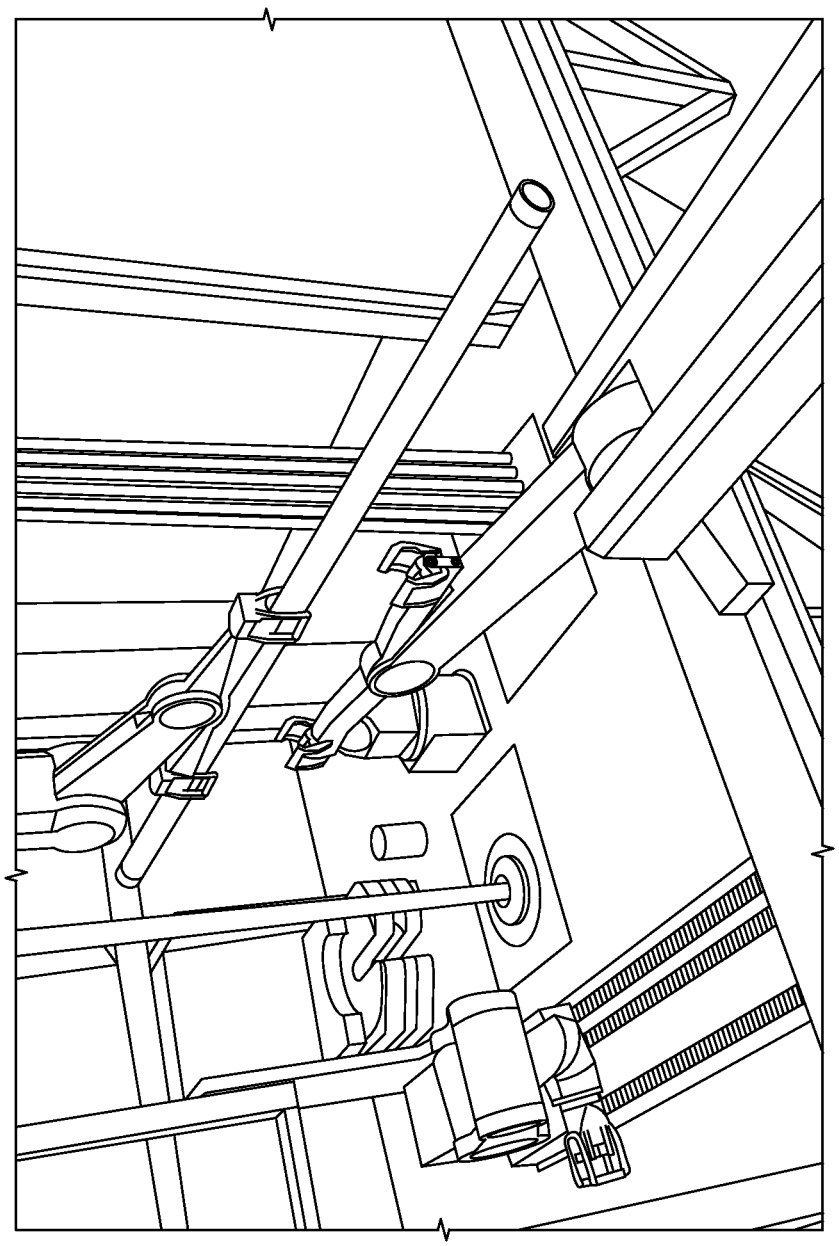

Moving to step 20716, the system 100 can verify that the LTH 420 of the VTHS 400 is engaged with the casing 214. Further, at step 20718, if the system 100 determines that the LTH 420 of the VTHS 400 is not engaged with the casing 214, the method 20600 can move to step 20720 and the system 100 can adjust the grippers 482, 480. Thereafter, the method 20600 can return to step 20716 and continue as described. Returning to step 20718, if the system 100 determines that the LTH 420 of the VTHS 400 is engaged with the casing 214, the method 20600 can move to step 20722 and the system 100 can open the first and second grippers 280, 282 on the arm 244 of the HTHS 230 (FIG. 149). Further, at step 20724, the system 100 can transfer the casing 214 from the arm 244 of the HTHS 230 to the arm 430 of the LTH 420 of the VTHS 400 (FIG. 150).

Figure 151:
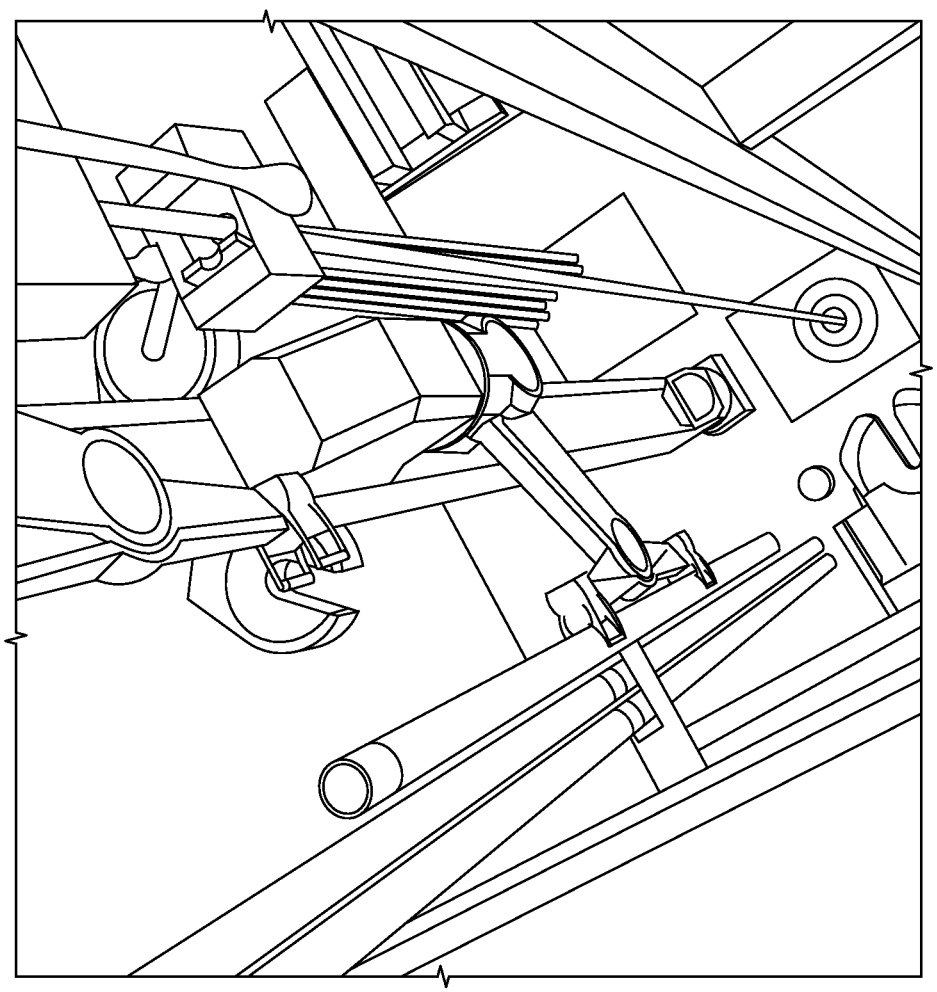
Figure 152:
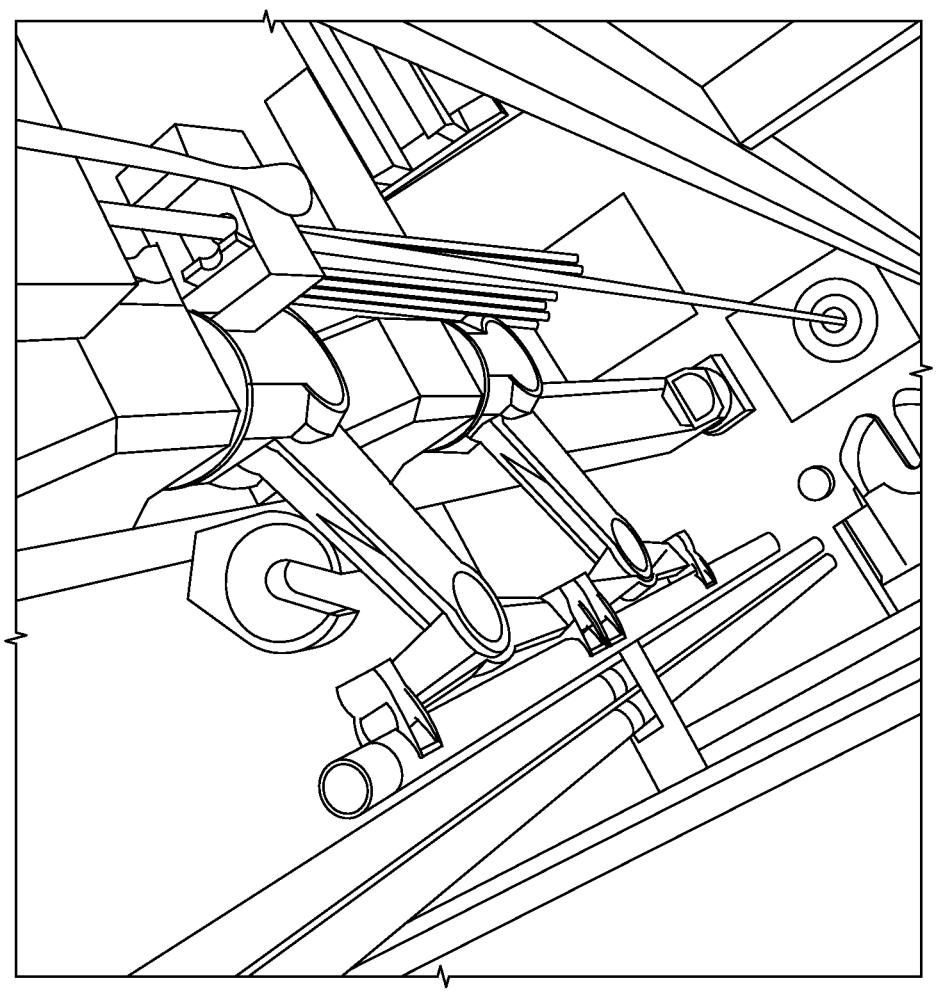
Figure 208:
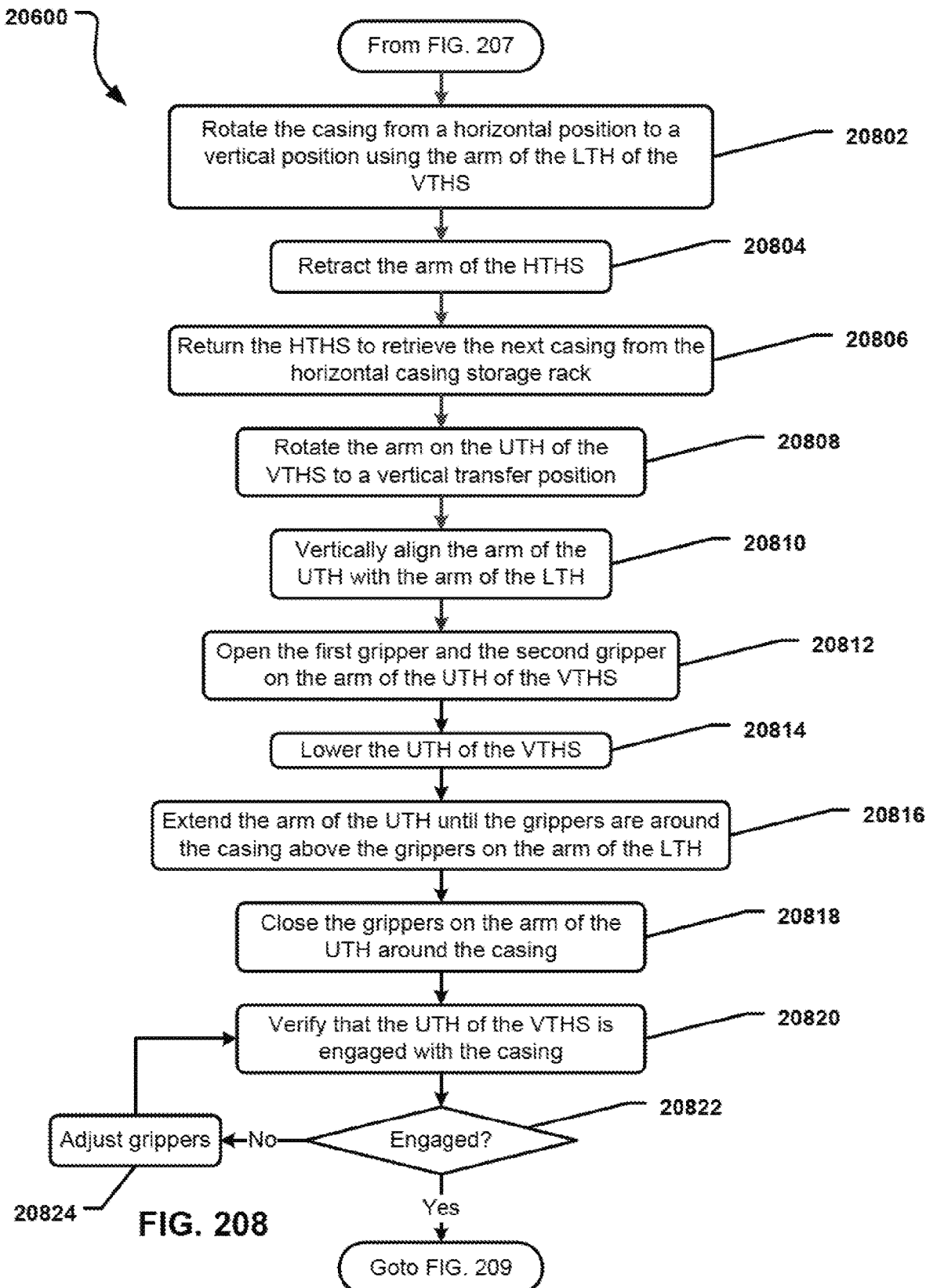
Figure 209:
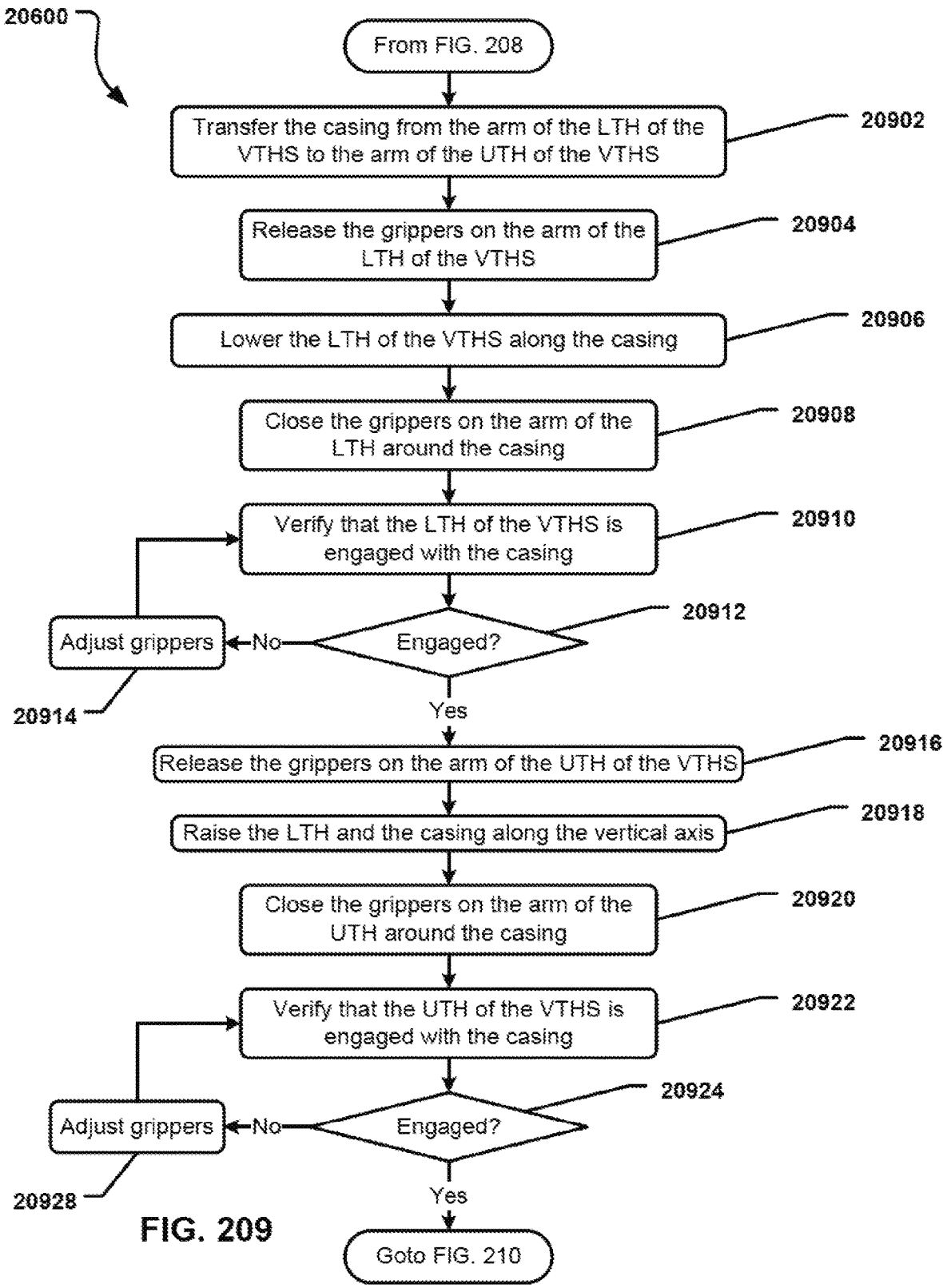
Figure 210:
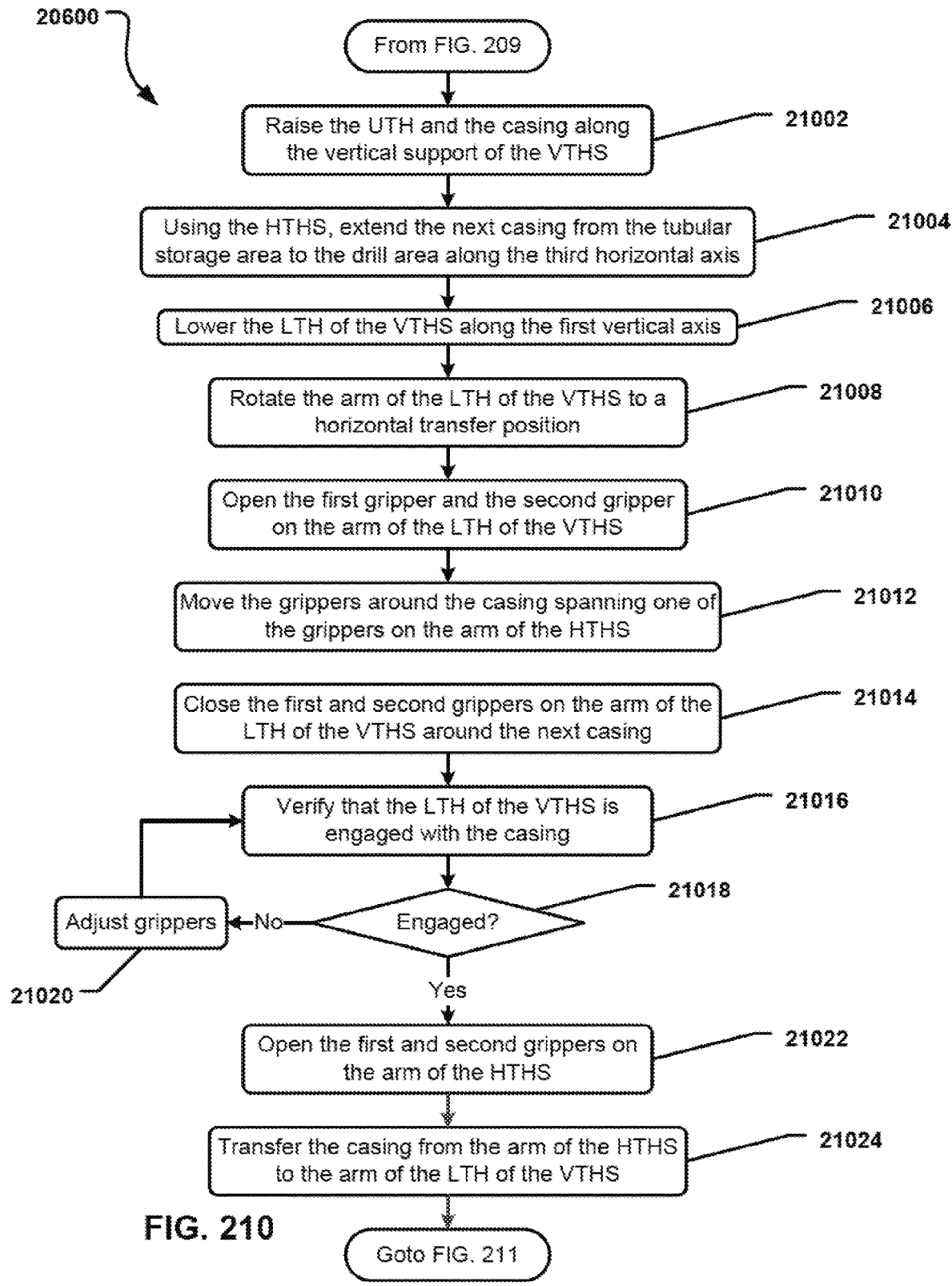

At step 20802 of FIG. 208, the system 100 can rotate the casing 214 from a horizontal position to a vertical position using the arm 430 of the LTH 420 of the VTHS 400 (FIG. 151). At step 20804, the system 100 can retract the arm 244 of the HTHS 230. At step 20806, the system 100 can return the HTHS 230 to retrieve the next casing 214 from the horizontal casing 214 storage rack. Further, at step 20808, the system 100 can rotate the arm 430 on the UTH 422 of the VTHS 400 to a vertical transfer position (FIG. 151). At step 20810, the system 100 can vertically align the arm 430 of the UTH 422 with the arm 430 of the LTH 420. At step 20812, the system 100 can open the first gripper 482 and the second gripper 484 on the arm 430 of the UTH 422 of the VTHS 400. At step 20814, the system 100 can lower the UTH 422 of the VTHS 400. Moreover, at step 20816, the system 100 can extend the arm 430 of the UTH 422 until the grippers 482, 484 are around the casing 214 above the grippers 482, 484 on the arm 430 of the LTH 420. (FIG. 152). At step 20818, the system 100 can close the grippers 482, 484 on the arm 430 of the UTH 422 around the casing 214. At step 20820, the system 100 can verify that the UTH 422 of the VTHS 400 is engaged with the casing 214. Further, at step 20822, if the system 100 determines that the UTH 422 of the VTHS 400 is not engaged with the casing 214, the method 20600 can move to step 20824 and the system 100 can adjust the grippers 482, 484 of the UTH 422. Then, the method 20600 can return to step 20820 and continue as described. On the other hand, at step 20822, if the UTH 422 of the VTHS 400 is engaged with the casing 214, the method 20600 can continue to step 20902 of FIG. 209.

Figure 153:
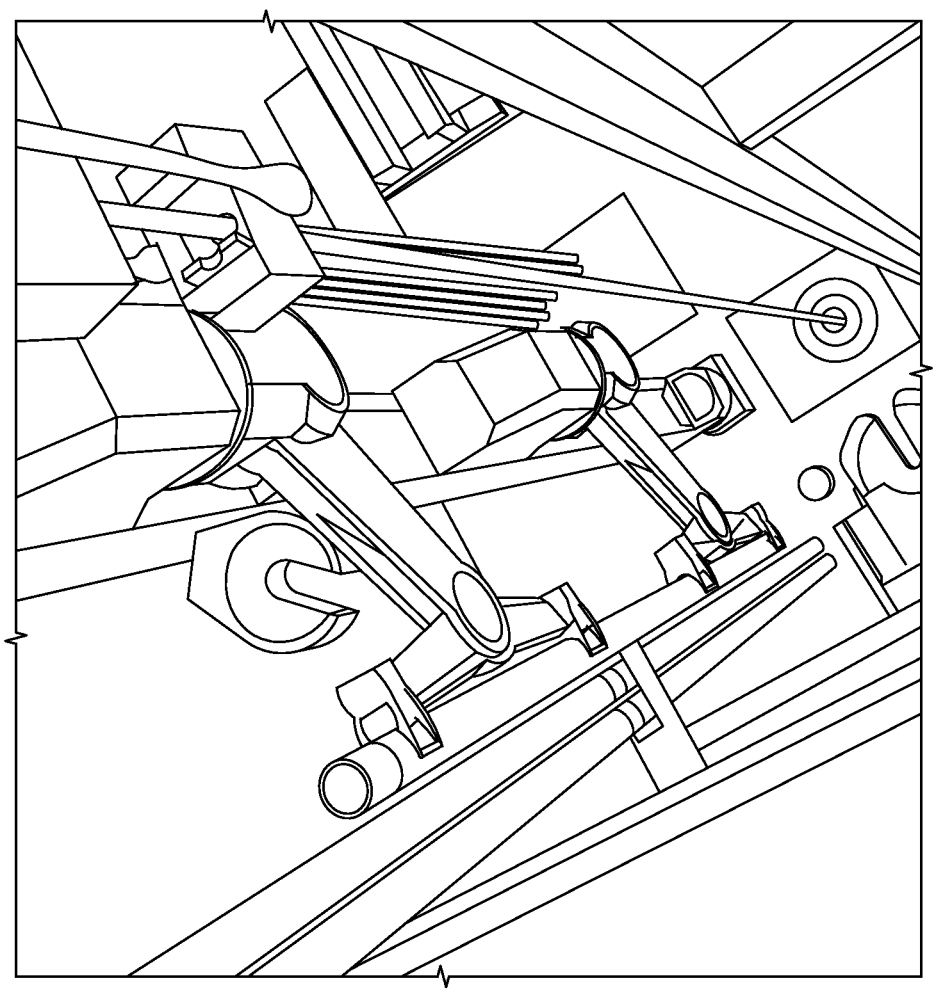
Figure 154:
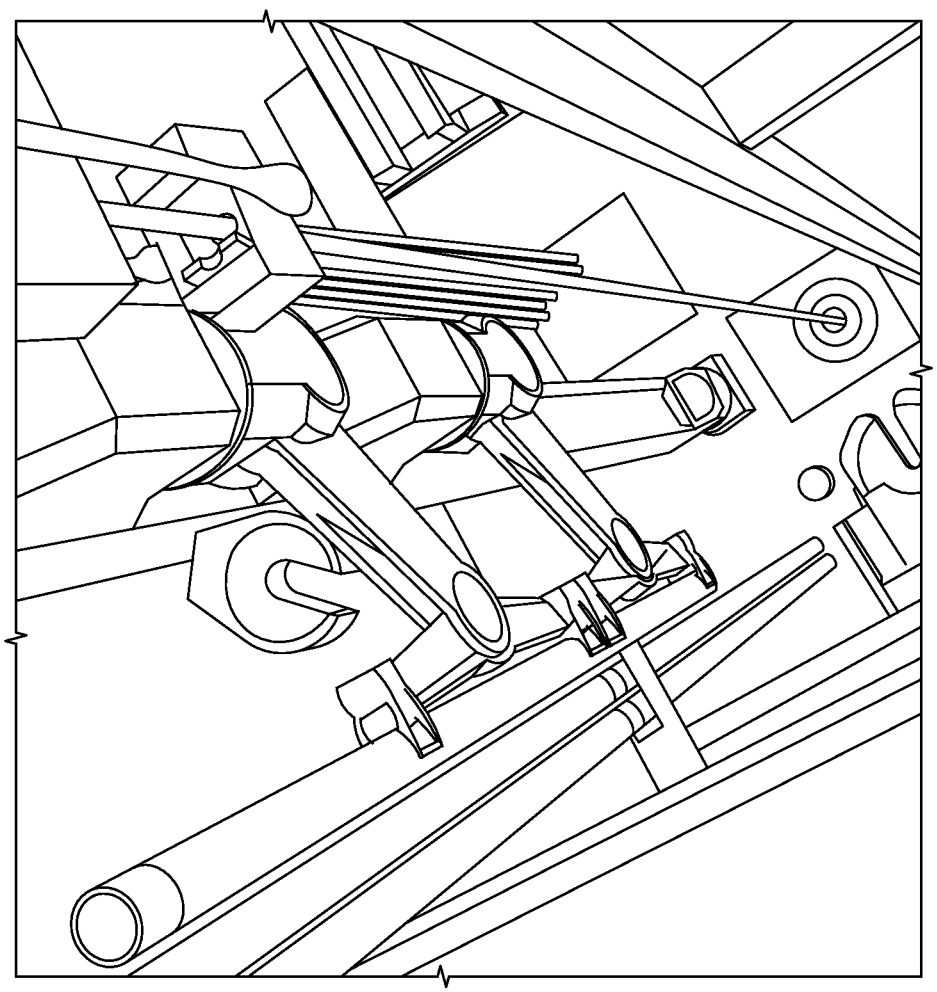

At step 20902, the system 100 can transfer the casing 214 from the arm 430 of the LTH 420 of the VTHS 400 to the arm of the UTH 422 of the VTHS 400 (FIG. 153). Further, at step 20904, the system 100 can release the grippers 482, 484 on the arm 430 of the LTH 420 of the VTHS 400 (FIG. 153) and at step 20906, the system 100 can lower the LTH 420 of the VTHS 400 along the casing 214 (FIG. 153). At step 20908, the system 100 can close the grippers on the arm 430 of the LTH 420 around the casing 214. Moreover, at step 20910, the system 100 can verify that the LTH 420 of the VTHS 400 is engaged with the casing 214. If the system 100 determines that the LTH 420 of the VTHS 400 is not engaged with the casing 214 at step 20912, the method 20600 can move to step 20914 and the system 100 can adjust the grippers 482, 484 on the LTH 420. Then, the method 20600 can return to step 20910 and continue as described herein. Returning to step 20912, if the LTH 420 of the VTHS 400 is engaged with the casing 214, the method 20600 can move to step 20916 and the system 100 can release the grippers on the arm of the UTH 422 of the VTHS 400 (FIG. 154). At step 20918, the system 100 can raise the LTH 420 and the casing 214 along the vertical axis toward the UTH 422 (FIG. 154). Further, at step 20920, the system 100 can close the grippers on the arm of the UTH 422 around the casing 214.

Moving to step 20922, the system 100 can verify that the UTH 422 of the VTHS 400 is engaged with the casing 214. If the system 100 determines that the UTH 422 of the VTHS 400 is not engaged with the casing 214 at step 20924, the method 20600 can move to step 20926 and the system 100 can adjust the grippers 482, 484 on the UTH 422. Then, the method 20600 can return to step 20924 and continue as described herein. Returning to step 20924, if the UTH 422 of the VTHS 400 is engaged with the casing 214, the method 20600 can move to step 20102 of FIG. 210.

Figure 155:
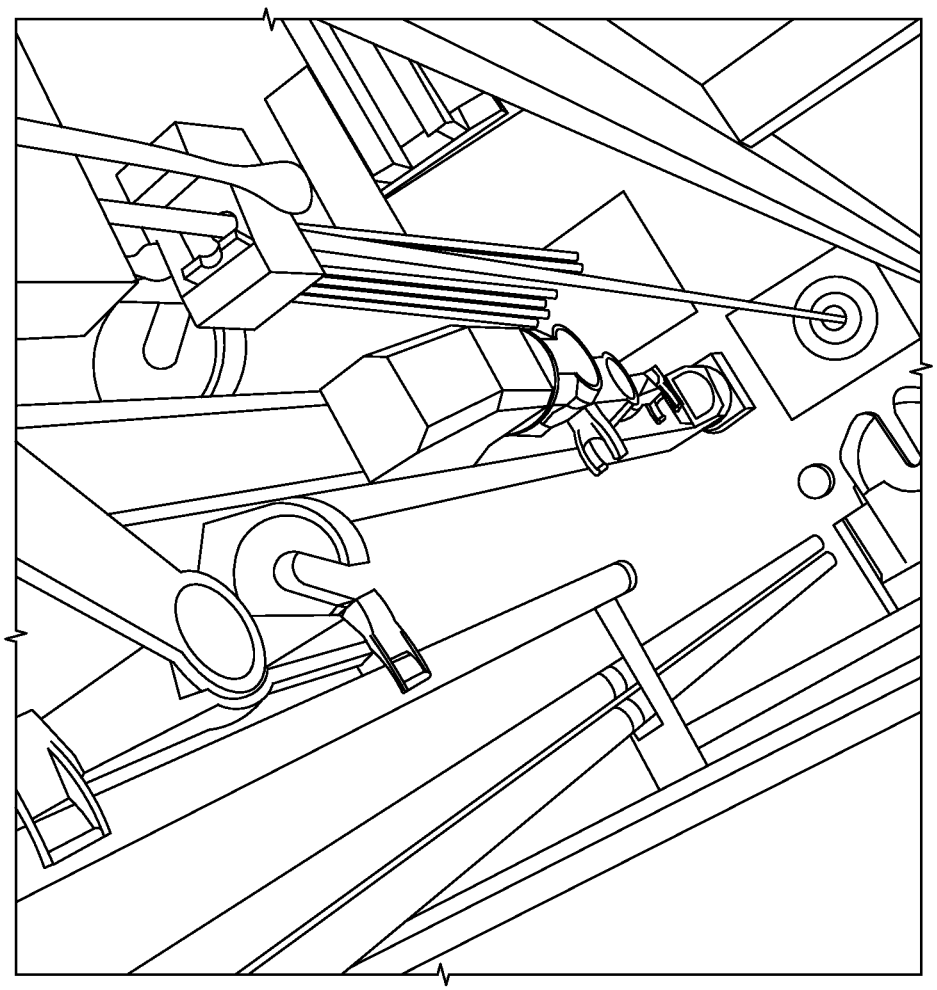
Figure 156:
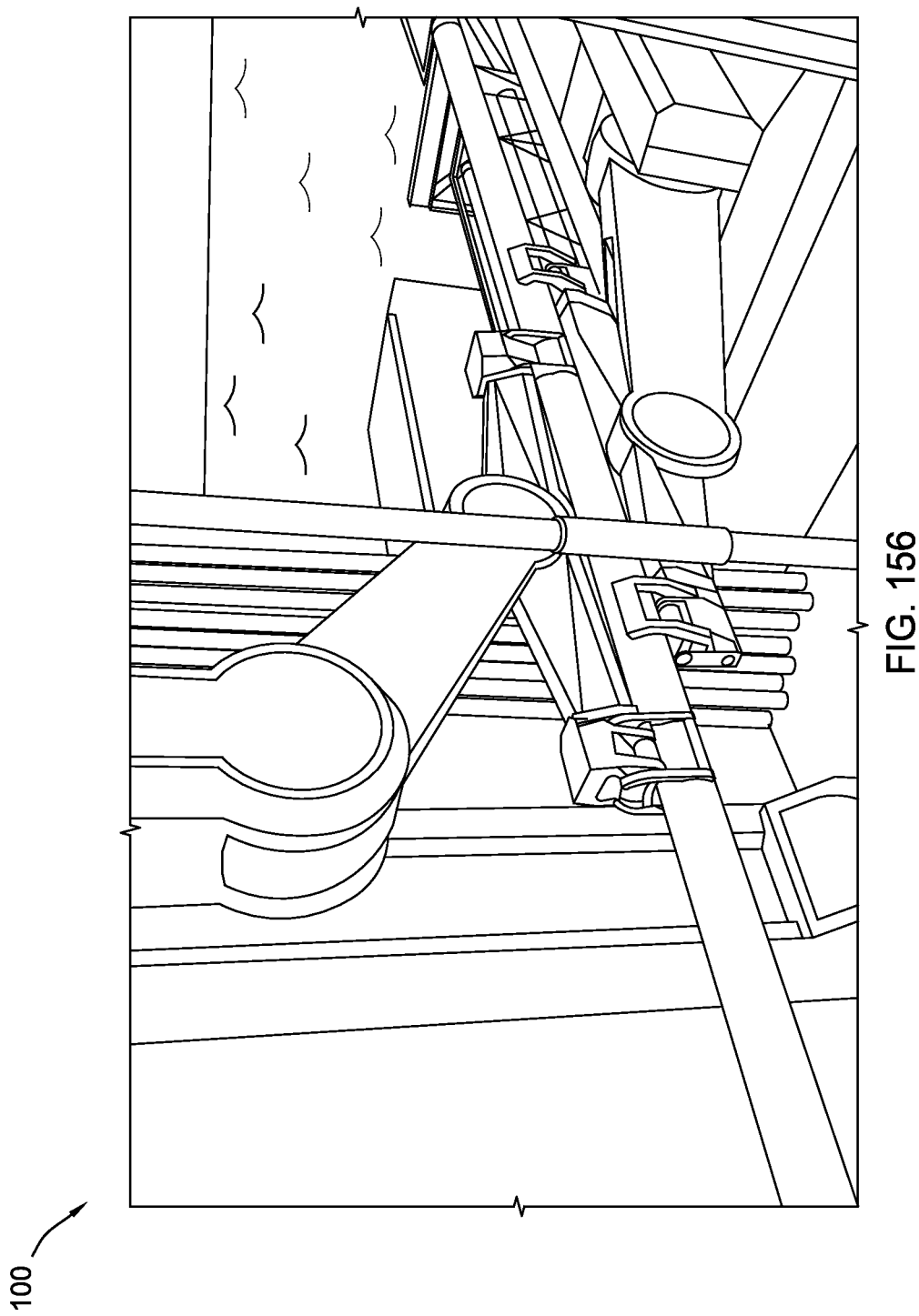

At step 20102, the system 100 can raise the UTH 422 and the casing 214 along the vertical support of the VTHS 400 (FIG. 155). At step 20104, the system 100, using the HTHS 230, can extend the next casing 214 from the tubular storage area 200 to the well bore area 300 along the third horizontal axis (FIG. 155). Further, at step 20106, the system 100 can lower the LTH 420 of the VTHS 400 along the first vertical axis (FIG. 155). At step 20108, the system 100 can rotate the arm 430 of the LTH 420 of the VTHS 400 to the horizontal transfer position. Moreover, at step 20110, the system 100 can open the first gripper and the second gripper on the arm 430 of the LTH 420 of the VTHS 400. At step 20112, the system 100 can move the grippers 482, 484 of the LTH 420 around the casing 214 spanning one of the grippers 280, 282 on the arm 244 of the HTHS 230 (FIG. 156). At step 20114, the system 100 can close the first and second grippers on the arm 430 of the LTH 420 of the VTHS 400 around the next casing 214 (FIG. 156).

Figure 157:
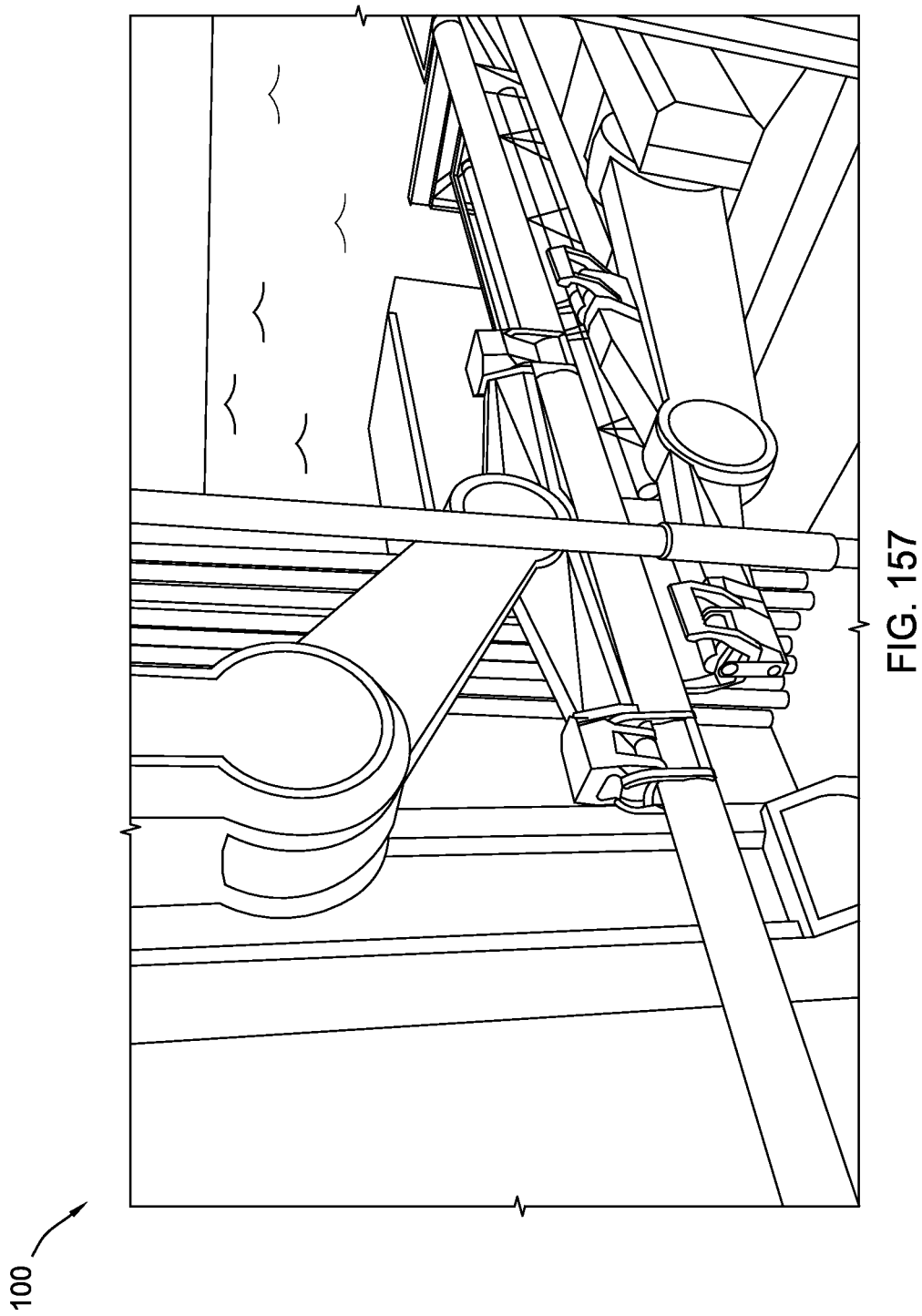
Figure 158:
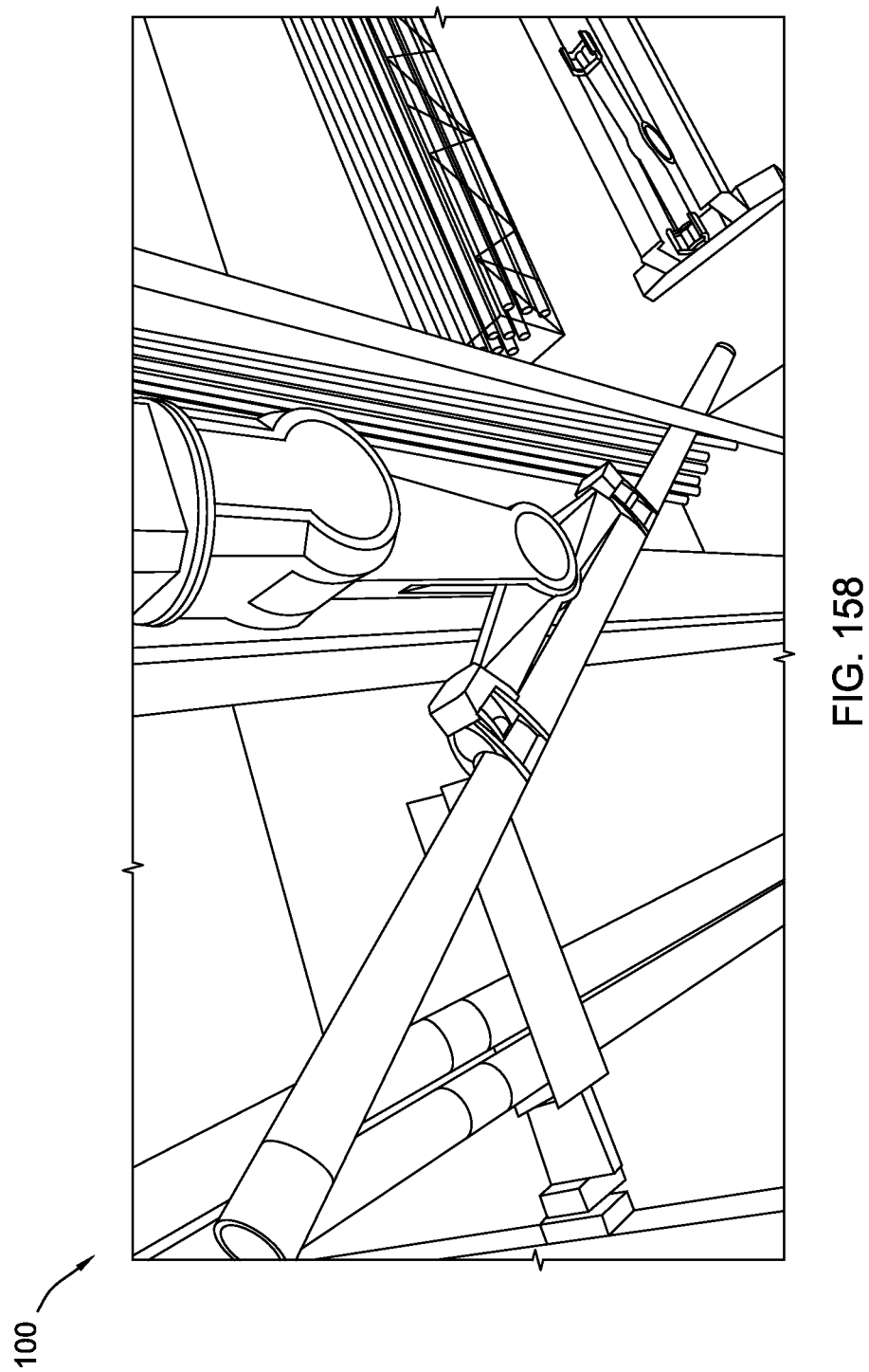

Moving to step 21016, the system 100 can verify that the LTH 420 of the VTHS 400 is engaged with the casing 214. At step 21018, if the LTH 420 is not engaged with the casing 214, the method 20600 can move to step 21020 and the system 100 can adjust the grippers 482, 284. Thereafter, the method 20600 can return to step 21016 and continue as described. On the other hand, at step 21018, if the LTH 420 is engaged with the casing 214, the method 20600 can proceed to step 21022 and the system 100 can open the first 280 and second grippers 282 on the arm 244 of the HTHS 230 (FIG. 157). Thereafter, at step 21024, the system 100 can transfer the casing 214 from the arm 244 of the HTHS 230 to the arm 430 of the LTH 420 of the VTHS 400 (FIG. 158). The method 20600 can then move to FIG. 211.

Figure 159:
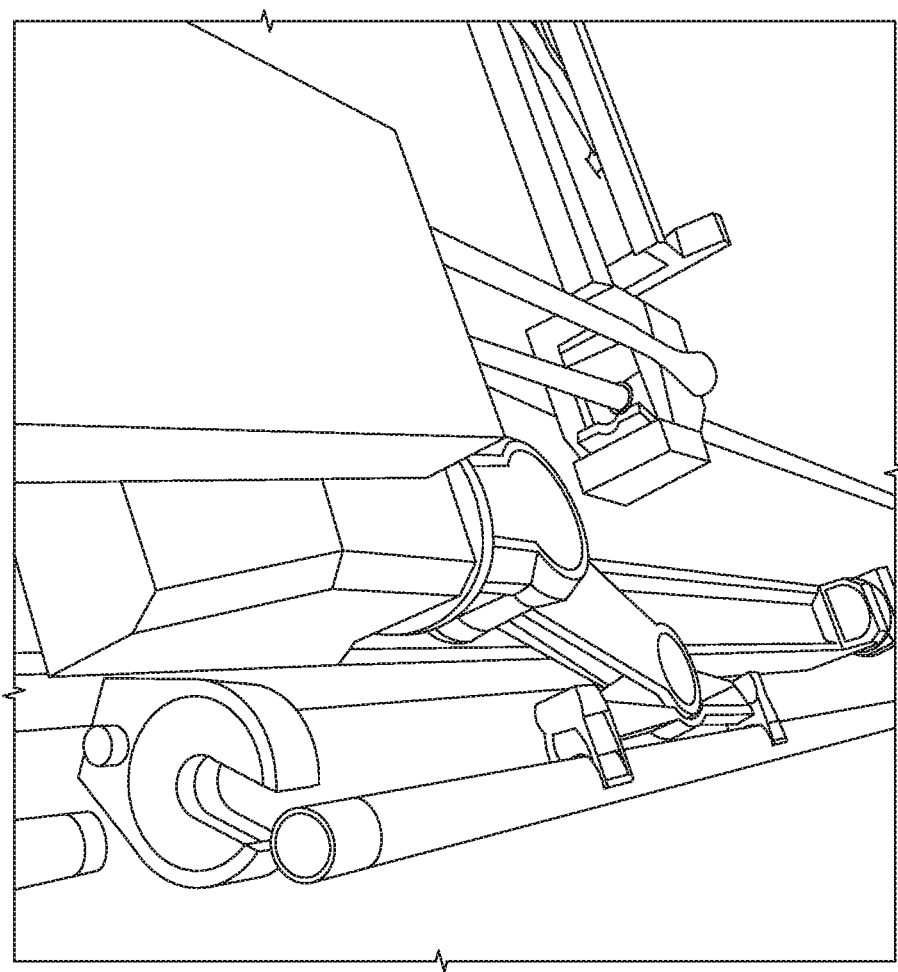
Figure 160:
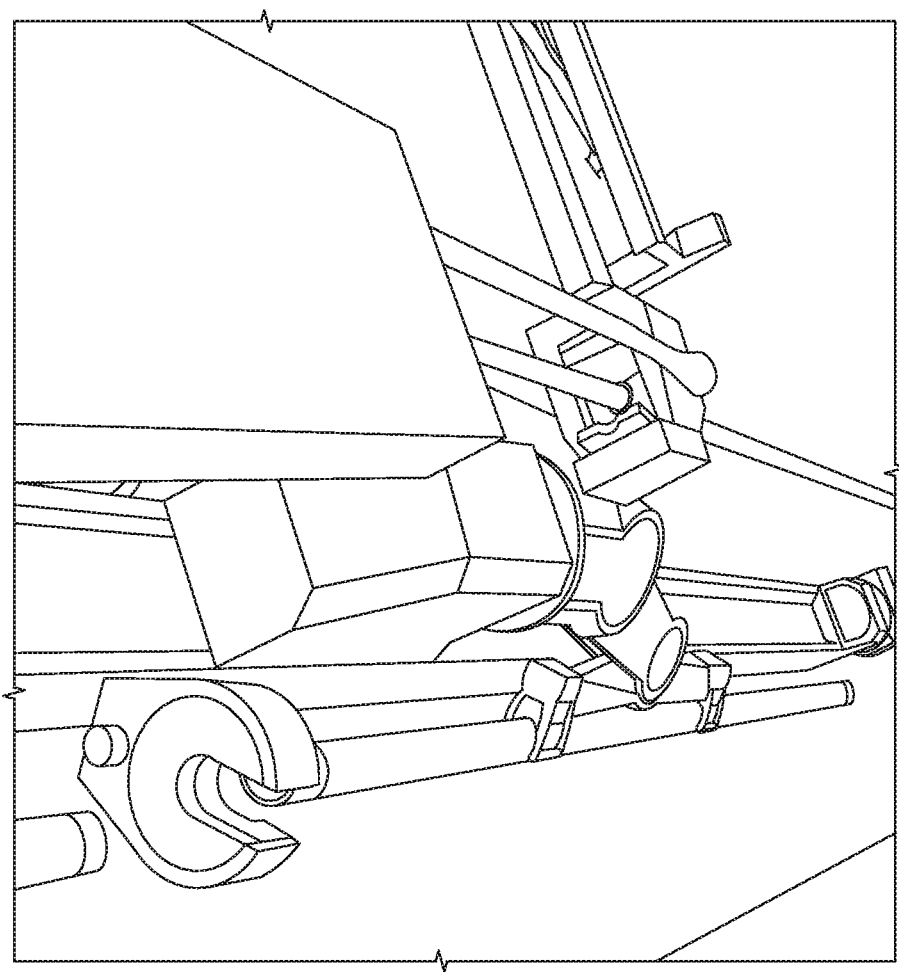
Figure 161:
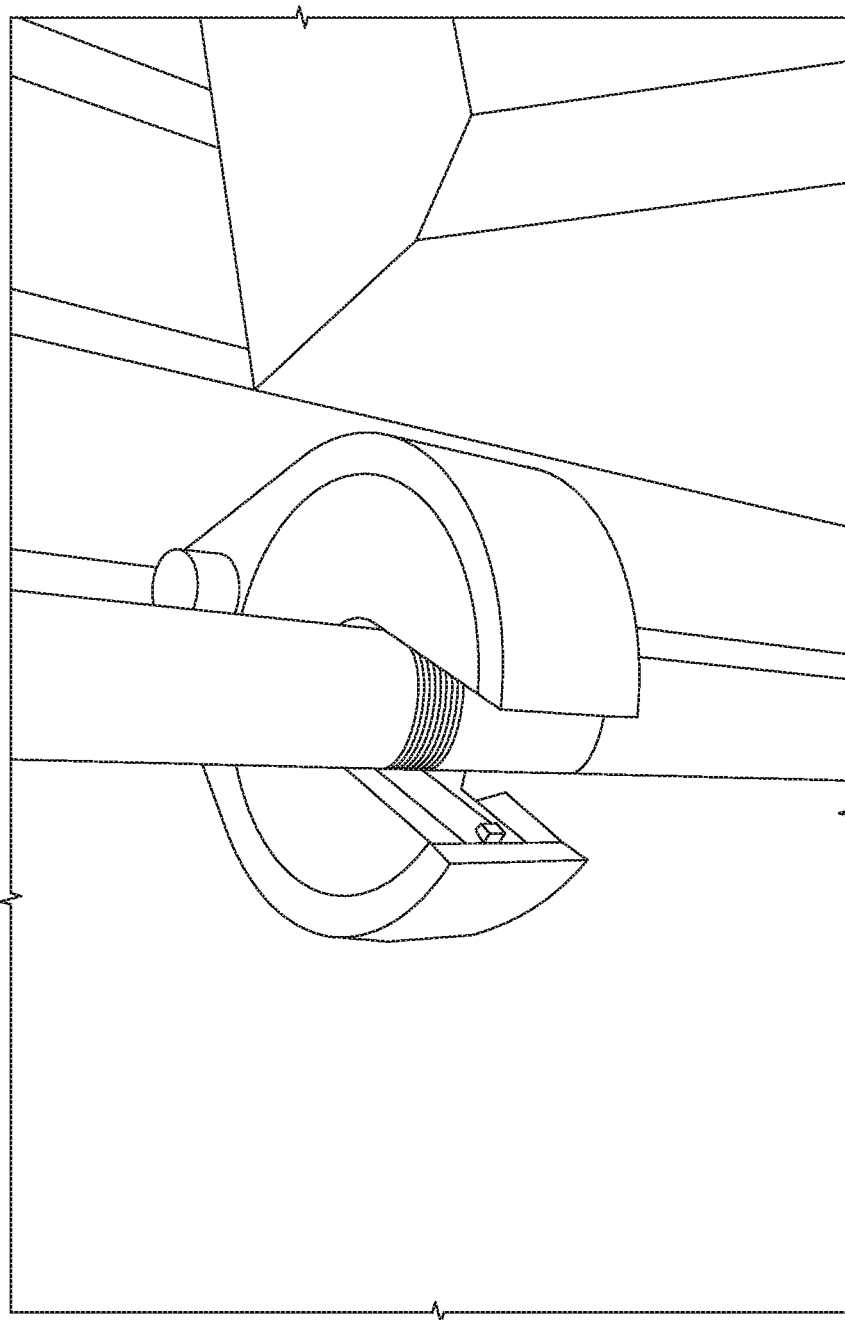
Figure 162:
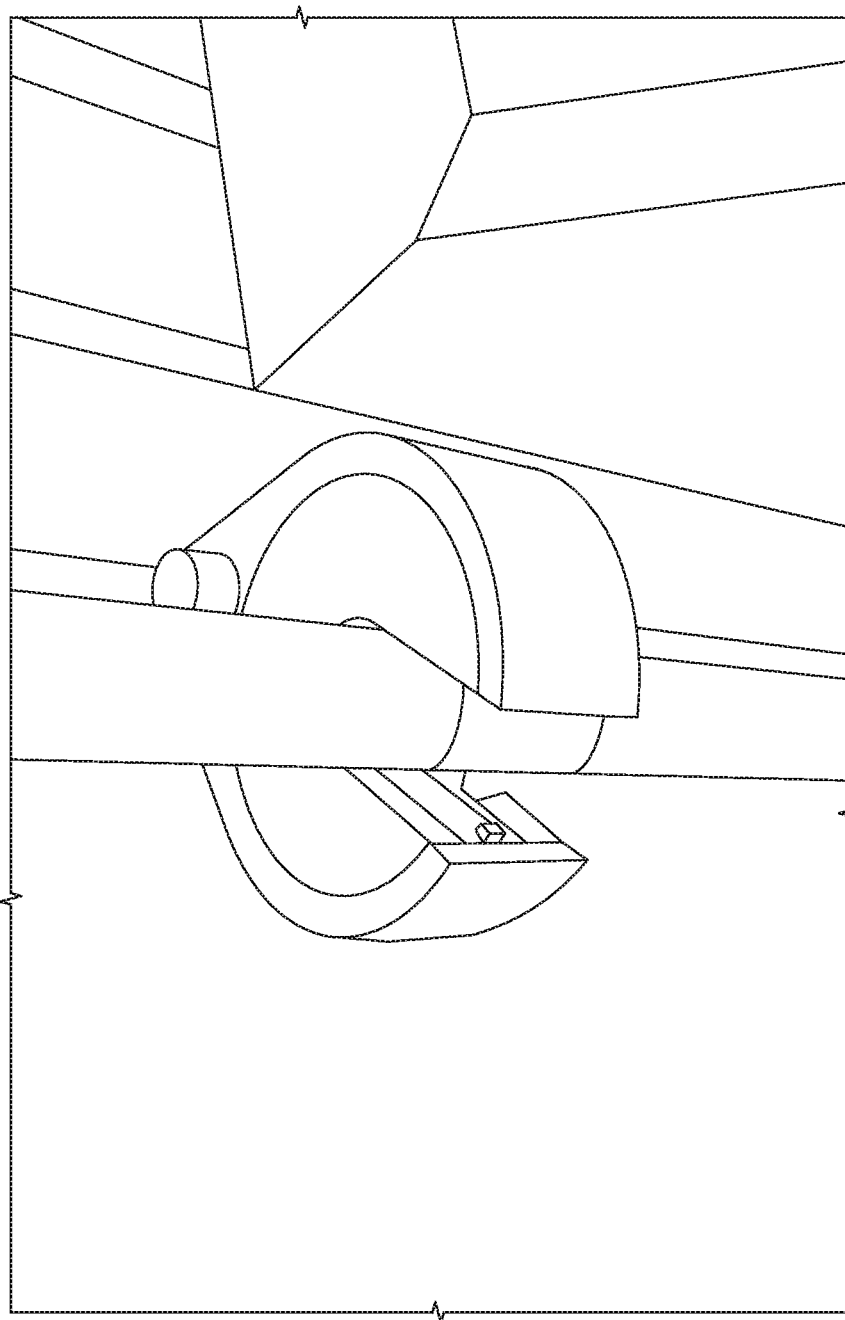
Figure 163:
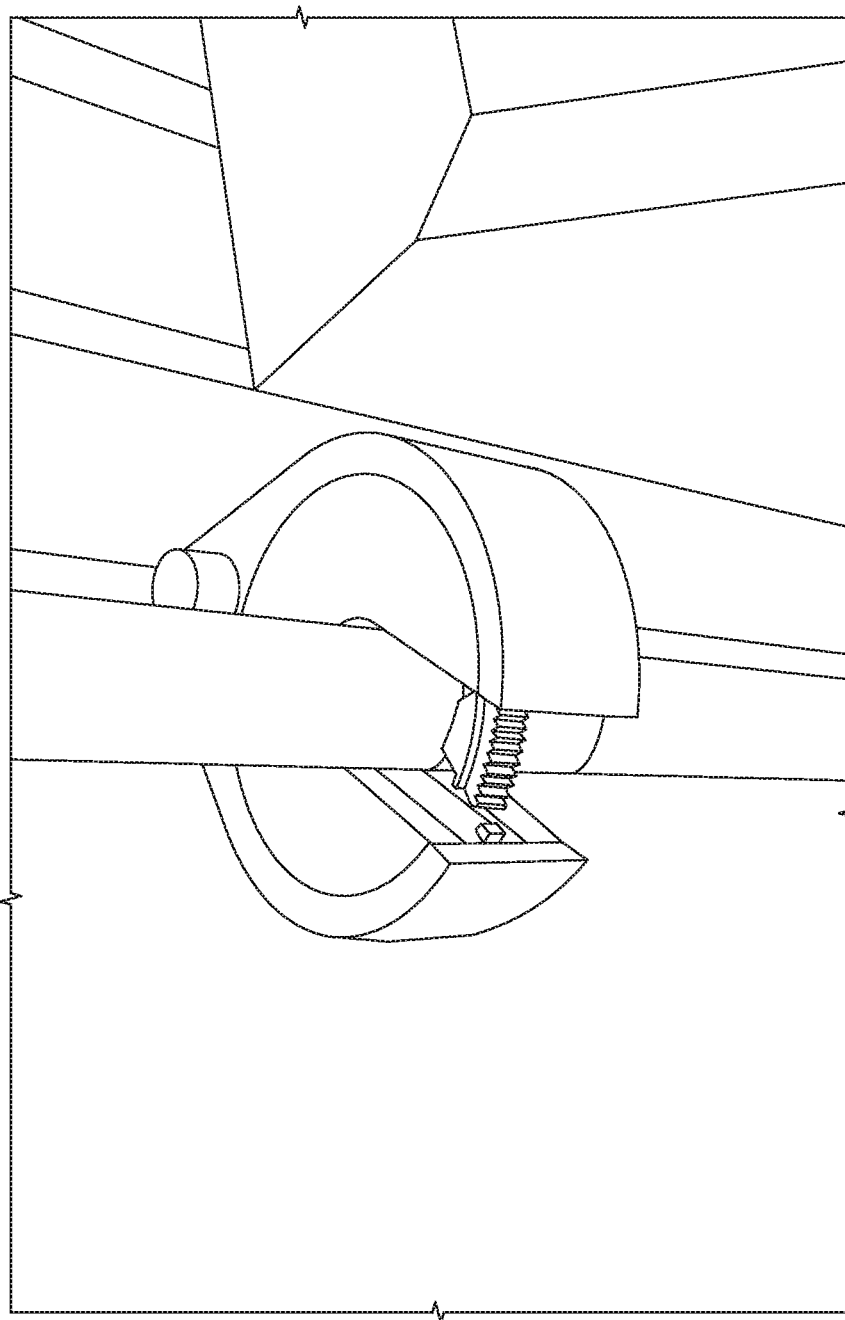
Figure 211:
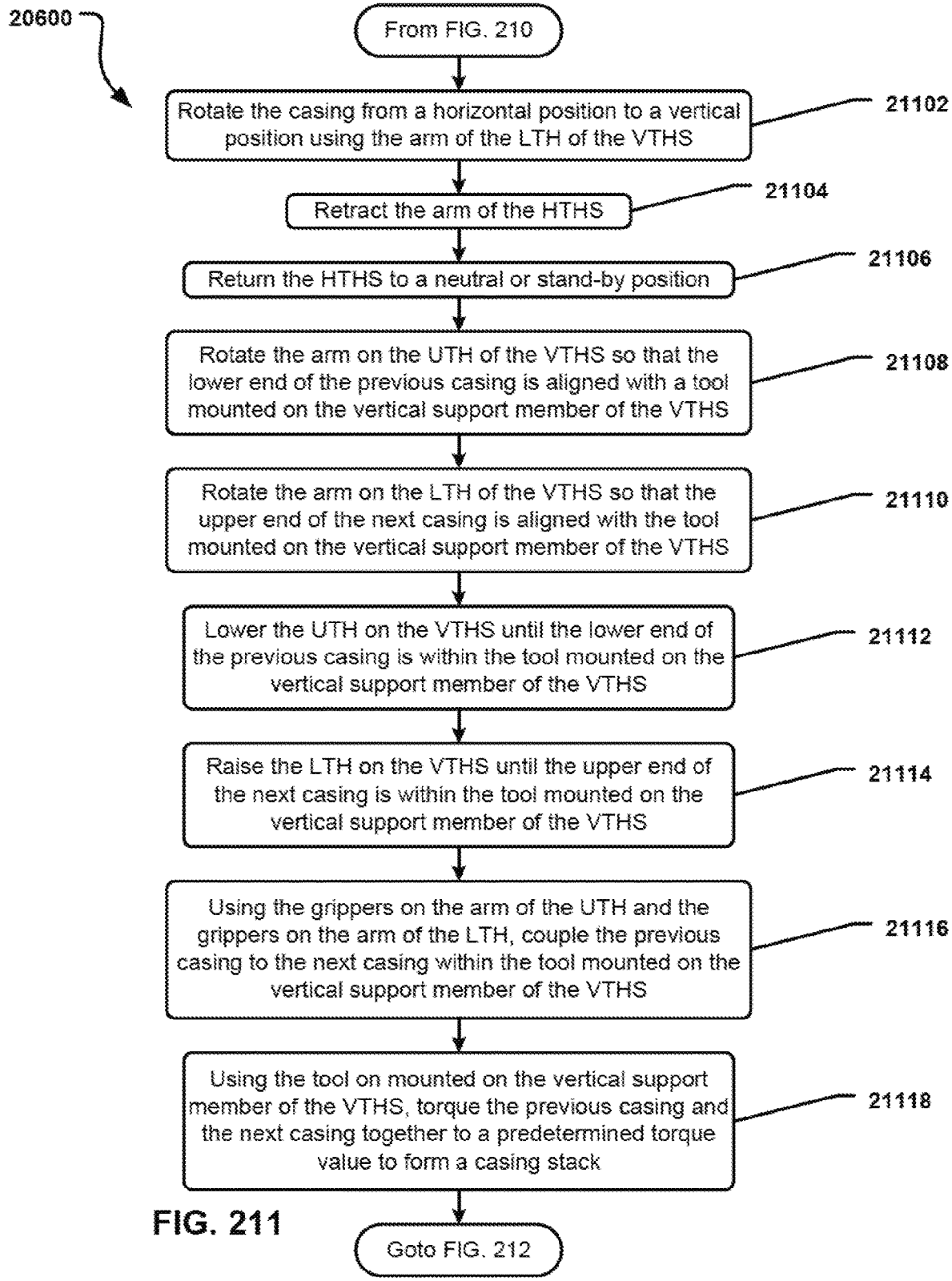

At step 21102 of FIG. 211, the system 100 can rotate the casing 214 from a horizontal position to a vertical position using the arm 430 of the LTH 420 of the VTHS 400 (FIG. 159). Moreover, at step 21104, the system 100 can retract the arm 244 of the HTHS 230 (FIG. 159). At step 21106, the system 100 can return the HTHS 230 to a neutral or stand-by position. Moving to step 21108, the system 100 can rotate the arm on the UTH 422 of the VTHS 400 so that the lower end of the previous casing 214 is aligned with a tool mounted on the vertical support member of the VTHS 400 (FIG. 159). Further, at step 21110, the system 100 can rotate the arm on the LTH 420 of the VTHS 400 so that the upper end of the next casing 214 is aligned with the tool mounted on the vertical support member of the VTHS 400 (FIG. 160). At step 21112, the system 100 can lower the UTH 422 on the VTHS 400 until the lower end of the previous casing 214 is within the tool mounted on the vertical support member of the VTHS 400 (FIG. 161). At step 21114, the system 100 can raise the LTH 420 on the VTHS 400 until the upper end of the next casing 214 is within the tool mounted on the vertical support member of the VTHS 400 (FIG. 161). Thereafter, at step 21116, the system 100, using the grippers 482, 484 on the arm 430 of the UTH 422 and the grippers 482, 484 on the arm 430 of the LTH 420, can couple the previous casing 214 to the next casing 214 within the tool mounted on the vertical support member of the VTHS 400 (FIG. 162). Further, at step 21118, the system 100, using the tool on mounted on the vertical support member of the VTHS 400, can torque the previous casing 214 and the next casing 214 together to a predetermined torque value to form a casing stack (FIG. 163).

Figure 164:
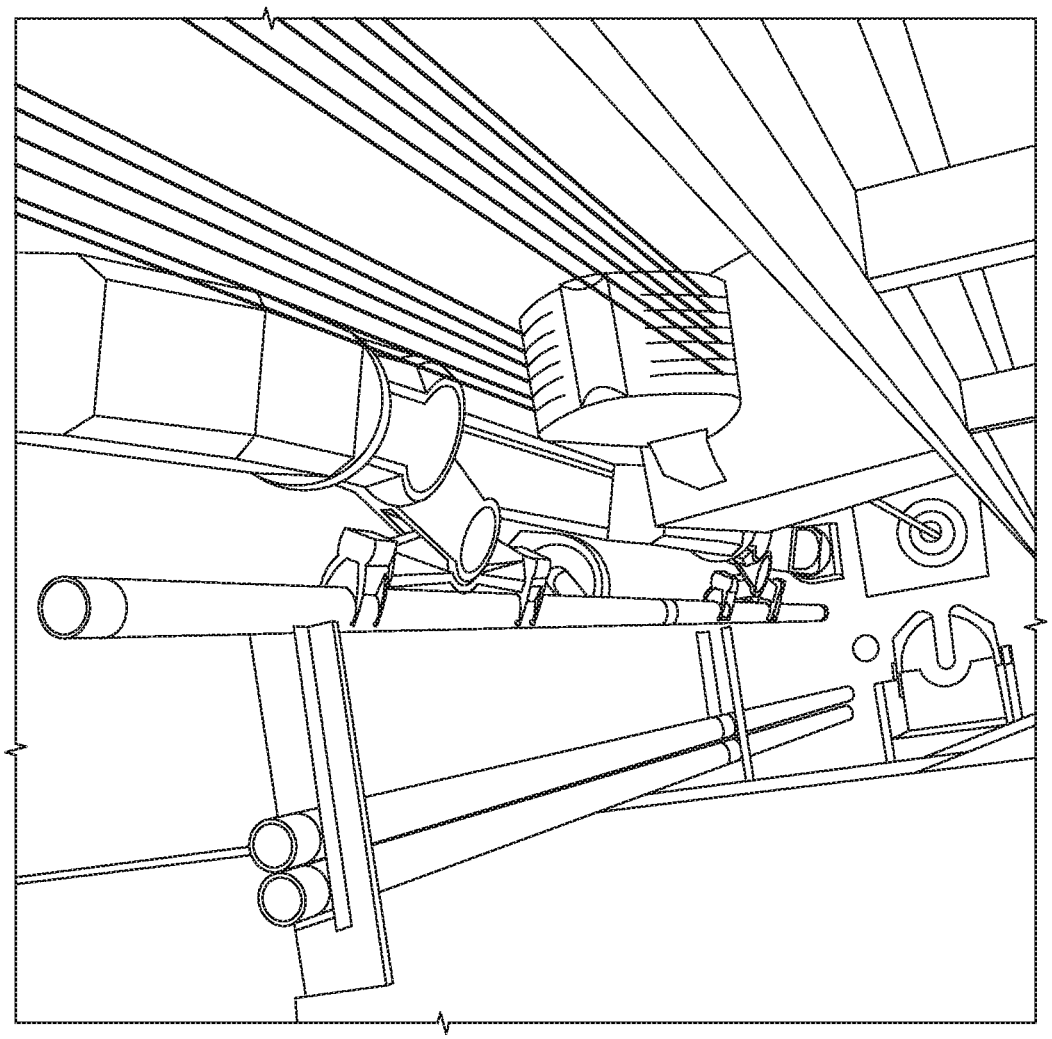
Figure 165:
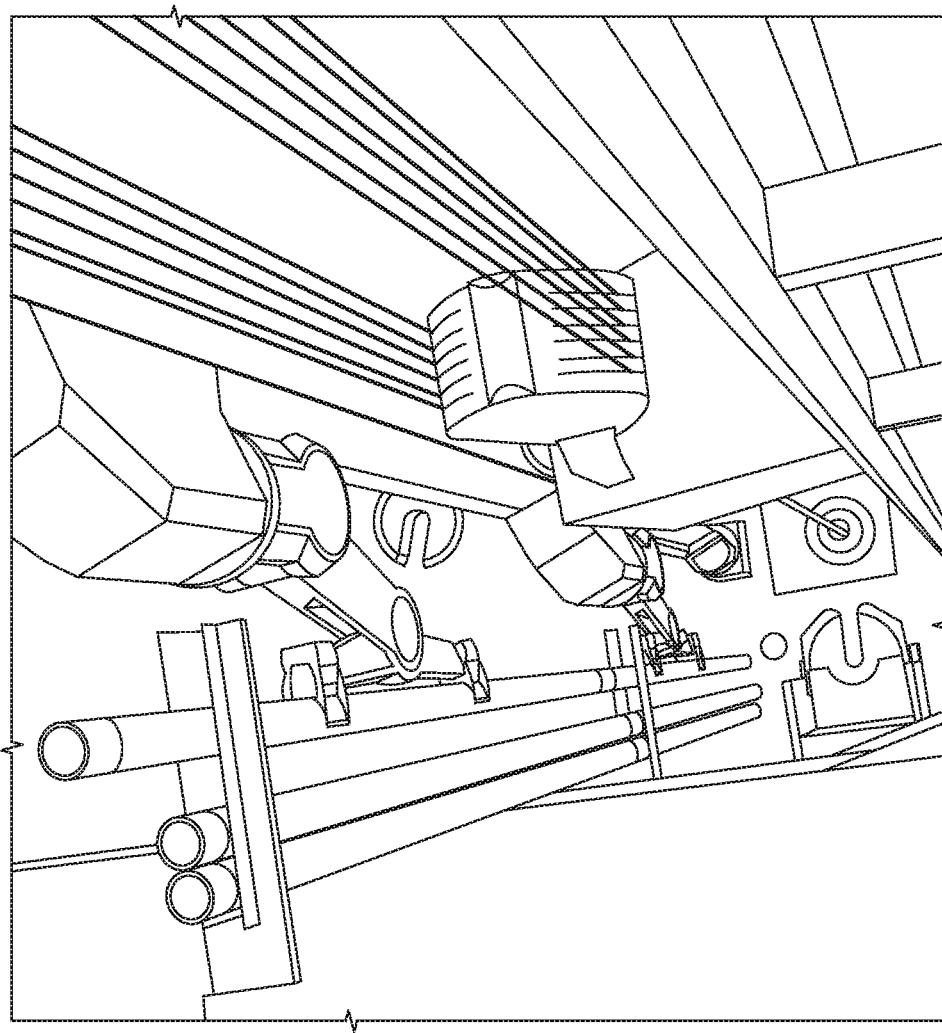
Figure 166:
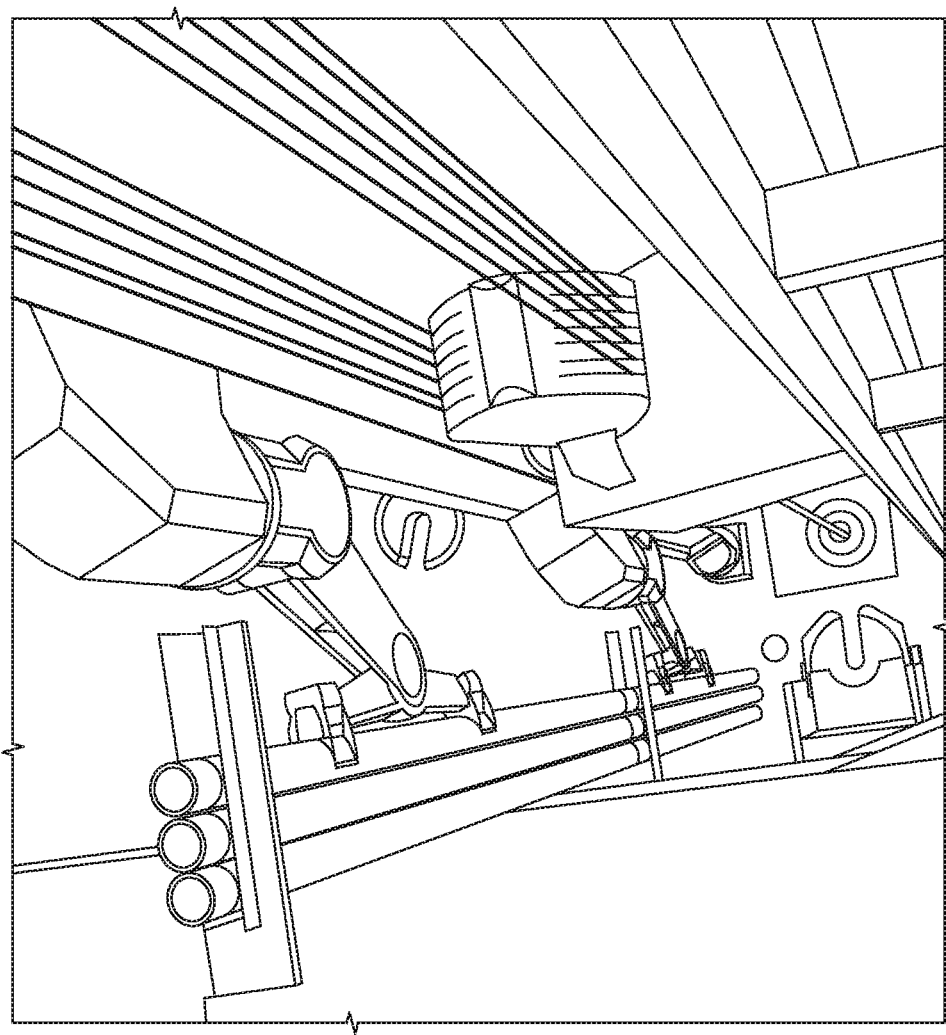
Figure 212:
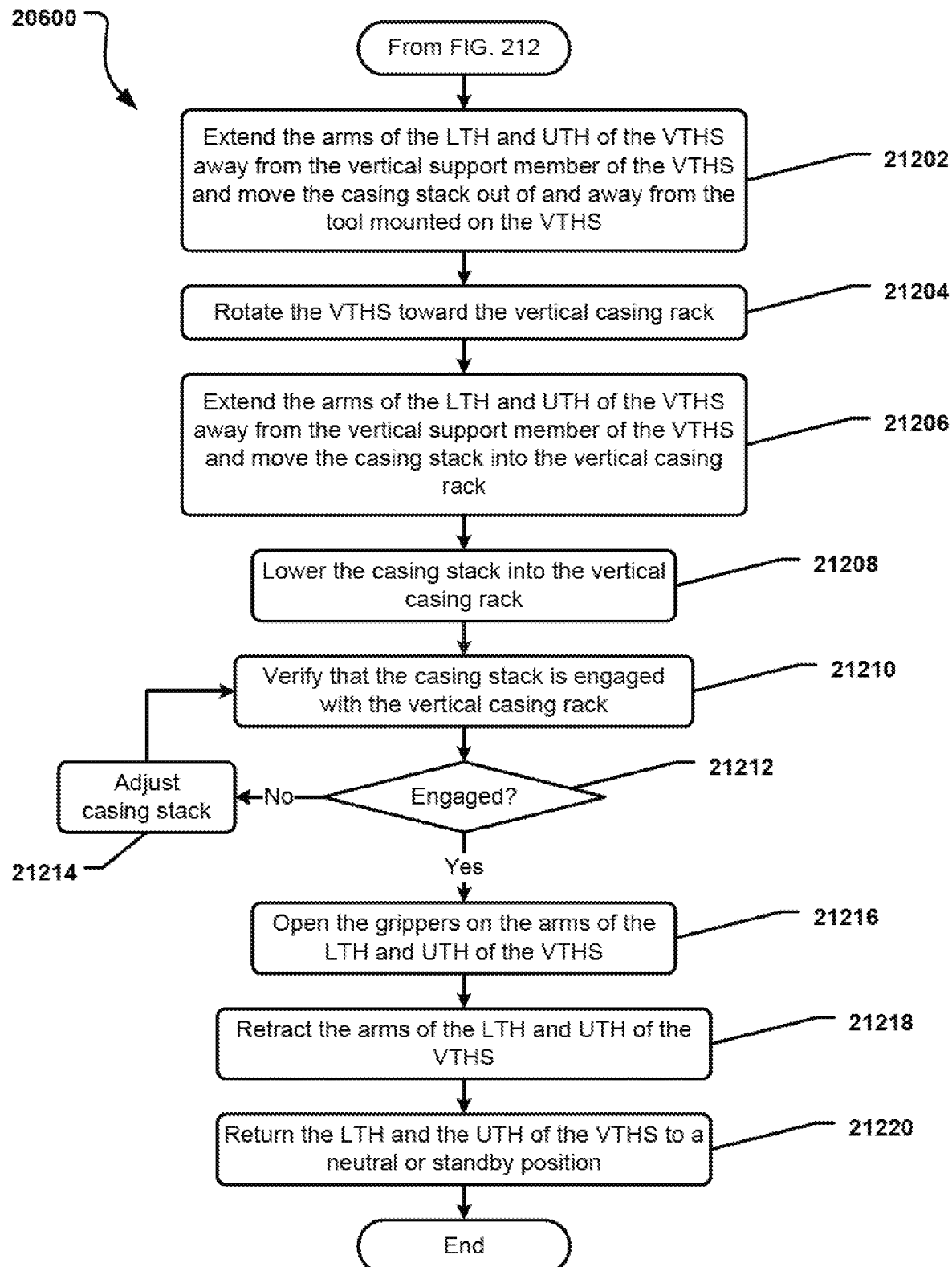

Continuing to FIG. 212, at step 21202, the system 100 can extend the arms of the LTH 420 and the UTH 422 of the VTHS 400 away from the vertical support member of the VTHS 400 and move the casing stack out of and away from the tool mounted on the VTHS 400 (FIG. 164). At step 21204, the system 100 can rotate the VTHS 400 toward the vertical storage rack (FIG. 164). Further, at step 21206, the system 100 can extend the arms of the LTH 420 and UTH 422 of the VTHS 400 away from the vertical support member of the VTHS 400 and move the casing stack into the vertical storage rack (FIG. 165). Then, at step 21208, the system 100 can lower the casing stack into the vertical storage rack 702 (FIG. 166). Moving to step 21110, the system 100 can verify that the casing stack is engaged with the vertical storage rack. Thereafter, if the system 100 determines that the casing stack is not engaged with the vertical storage rack at step 21112, the method 20600 can proceed to step 21114 and the system 100 can adjust the casing stack within the vertical storage rack. Then, the method 20600 can return to step 21110 and continue as described herein. Returning to step 21112, if the casing stack is engaged with the vertical storage rack, the method 20600 can proceed to step 21116. At step 21116, the system 100 can open the grippers on the arms of the LTH 420 and UTH 422 of the VTHS 400 (FIG. 167). Further, at step 21118, the system 100 can retract the arms of the LTH 420 and UTH 422 of the VTHS 400 (FIG. 167). Finally, at step 21120, the system 100 can return the LTH 420 and the UTH 422 of the VTHS 400 to a neutral or standby position. Then, the method 20600 may end.

While the methods above outline a prescribed series of steps for handling tubulars, it can be appreciated that the steps may be performed in reverse order (e.g., for retrieving pipes and casings from the well and transferring them to the horizontal storage areas.) Further, steps may be omitted or performed in different orders as prescribed. Moreover, in certain instances the HTHS 230 may position pipes or casings directly to the well center and spin them into the previous drill pipe or casing. In other instances, the HTHS 230 can spin tubulars (e.g., drill pipes, casings, subs, BHA components, etc.) directly out of well center and return those tubulars to the appropriate horizontal storage rack or vertical storage rack in the tubular storage area. Further, the HTHS 230 can hand tubulars directly to the UTH 422 of the VTHS 400 or receive tubulars directly from the UTH 422.

It is to be understood that the system 100 described herein can relatively quickly move drill pipes, casings, subs, BHA components, and other tubulars via the various subsystems, e.g., the HTHS 230, the VTHS 400, the track mounted robotic arm 500, the iron roughneck 600, and the TDS 800. For example, the VTHS 400 can retrieve a pipe, pipe stack, casing, or casing stack, from one of the vertical storage racks and place it over well center in an amount of time that is less than or equal to sixty (60) seconds. In another aspect, the VTHS 400 can perform this operation in an amount of time that is less than or equal to fifty-five (55) seconds, less than or equal to fifty (50) seconds, less than or equal to forty-five (45) seconds, less than or equal to forty (40) seconds, less than or equal to thirty-five (35) seconds, less than or equal to thirty (30) seconds, or less than or equal to twenty-five (25) seconds. In another aspect, the VTHS 400 can perform this task in an amount of time that is greater than or equal to ten (10) seconds, such as greater than or equal to fifteen (15) seconds, or greater than or equal to twenty (20) seconds. It is to be understood that the VTHS 400 can perform this task in an amount of time that is with a range between, and including, any of the maximum and minimum times described herein.

In another aspect, the VTHS 400 can stab and spin a tubular (e.g., a pipe, pipe stack, casing, casing stack, sub, or BHA component) to a previous tubular (stick-up) in a time that is less than or equal to forty-five (45) seconds. In another aspect, the VTHS 400 can perform this operation in an amount of time that is less than or equal to forty (40) seconds, such as less than or equal to thirty-five (35) seconds, less than or equal to thirty (30) seconds, less than or equal to twenty-five (25) seconds, less than or equal to twenty (20) seconds, or less than or equal to fifteen (15) seconds. In another aspect, the VTHS 400 can perform this task in an amount of time that is greater than or equal to five (5) seconds, such as greater than or equal to seven (7) seconds, greater than or equal to ten (10) seconds, or greater than or equal to twelve (12) seconds. It is to be understood that the VTHS 400 can perform this task in an amount of time that is with a range between, and including, any of the maximum and minimum times described herein.

In still another aspect, the VTHS 400 can retrieve a pipe, pipe stand, casing, or casing stand from the vertical storage rack and stab and spin the pipe, pipe stand, casing, or casing stand to a previous pipe, pipe stand, casing, or casing stand (stick-up) in a time that is less than or equal to ninety (90) seconds. In another aspect, the VTHS 400 can perform this operation in an amount of time that is less than or equal to eighty (80) seconds, such as less than or equal to seventy (70) seconds, less than or equal to sixty (60) seconds, less than or equal to fifty (50) seconds, or less than or equal to forty (40) seconds. In another aspect, the VTHS 400 can perform this task in an amount of time that is greater than or equal to twenty (20) seconds, such as greater than or equal to twenty-five (25) seconds, greater than or equal to thirty (30) seconds, or greater than or equal to thirty-five (35) seconds. It is to be understood that the VTHS 400 can perform this task in an amount of time that is with a range between, and including, any of the maximum and minimum times described herein.

In yet another aspect, the VTHS 400 can build a stand of drill pipes, or casings, in a time that is less than or equal to one-hundred and twenty (120) seconds. In another aspect, the VTHS 400 can perform this operation in an amount of time that is less than or equal to one-hundred and ten (110) seconds, such as less than or equal to one-hundred (100) seconds, less than or equal to ninety (90) seconds, or less than or equal to eighty (80) seconds. In another aspect, the VTHS 400 can perform this task in an amount of time that is greater than or equal to forty (40) seconds, such as greater than or equal to forty-five (45) seconds, greater than or equal to fifty (50) seconds, greater than or equal to fifty-five (55) seconds, greater than or equal to sixty (60) seconds, greater than or equal to sixty-five (65) seconds, greater than or equal to seventy (70) seconds, or greater than or equal to seventy-five (75) seconds. It is to be understood that the VTHS 400 can perform this task in an amount of time that is with a range between, and including, any of the maximum and minimum times described herein.

In another aspect, the VTHS 400 can build a stand of drill pipes, or casings, and place it in the vertical storage rack in a time that is less than or equal to one-hundred and eighty (180) seconds. In another aspect, the VTHS 400 can perform this operation in an amount of time that is less than or equal to one-hundred and seventy (170) seconds, such as less than or equal to one-hundred and sixty (160) seconds, less than or equal to one-hundred and fifty (150) seconds, less than or equal to one-hundred and forty (140) seconds, less than or equal to one-hundred and thirty (130) seconds, less than or equal to one-hundred and twenty (120) seconds, or less than or equal to one-hundred and ten (110) seconds. In another aspect, the VTHS 400 can perform this task in an amount of time that is greater than or equal to seventy-five (75) seconds, such as greater than or equal to eighty (80) seconds, greater than or equal to eighty-five (85) seconds, greater than or equal to ninety (90) seconds, greater than or equal to ninety-five (95) seconds, greater than or equal to one-hundred (100) seconds, or greater than or equal to one-hundred and five (105). It is to be understood that the VTHS 400 can perform this task in an amount of time that is with a range between, and including, any of the maximum and minimum times described herein.

In yet still another aspect, the HTHS 230 can retrieve a pipe, pipe stand, casing, or casing stand from a horizontal storage rack and transfer that pipe, pipe stand, casing, or casing stand to the VTHS 400 in a time that is less than or equal to one-hundred (100) seconds. In another aspect, the VTHS 400 can perform this operation in an amount of time that is less than or equal to ninety (90) seconds, such as less than or equal to eighty (80) seconds, as less than or equal to seventy (70) seconds, less than or equal to sixty (60) seconds. In another aspect, the VTHS 400 can perform this task in an amount of time that is greater than or equal to twenty (20) seconds, such as greater than or equal to twenty-five (25) seconds, greater than or equal to thirty (30) seconds, greater than or equal to thirty-five (35) seconds, greater than or equal to forty (40) seconds, greater than or equal to forty-five (45) seconds, greater than or equal to fifty (50) seconds, or greater than or equal to fifty-five (55)

seconds. It is to be understood that the VTHS 400 can perform this task in an amount of time that is with a range between, and including, any of the maximum and minimum times described herein.

In another aspect, the HTHS 230 can retrieve a pipe, pipe stand, casing, or casing stand from a horizontal storage rack and transfer that pipe, pipe stand, casing, or casing stand to previous pipe, pipe stand, casing, or casing stand in the well center (stick-up) and spin it into the stick-up in a time that is less than or equal to one-hundred (100) seconds. In another aspect, the VTHS 400 can perform this operation in an amount of time that is less than or equal to ninety (90) seconds, such as less than or equal to eighty (80) seconds, as less than or equal to seventy (70) seconds, less than or equal to sixty (60) seconds. In another aspect, the VTHS 400 can perform this task in an amount of time that is greater than or equal to twenty (20) seconds, such as greater than or equal to twenty-five (25) seconds, greater than or equal to thirty (30) seconds, greater than or equal to thirty-five (35) seconds, greater than or equal to forty (40) seconds, greater than or equal to forty-five (45) seconds, greater than or equal to fifty (50) seconds, or greater than or equal to fifty-five (55) seconds. It is to be understood that the VTHS 400 can perform this task in an amount of time that is with a range between, and including, any of the maximum and minimum times described herein.

Drill Pipe Storage System

Figure 213:
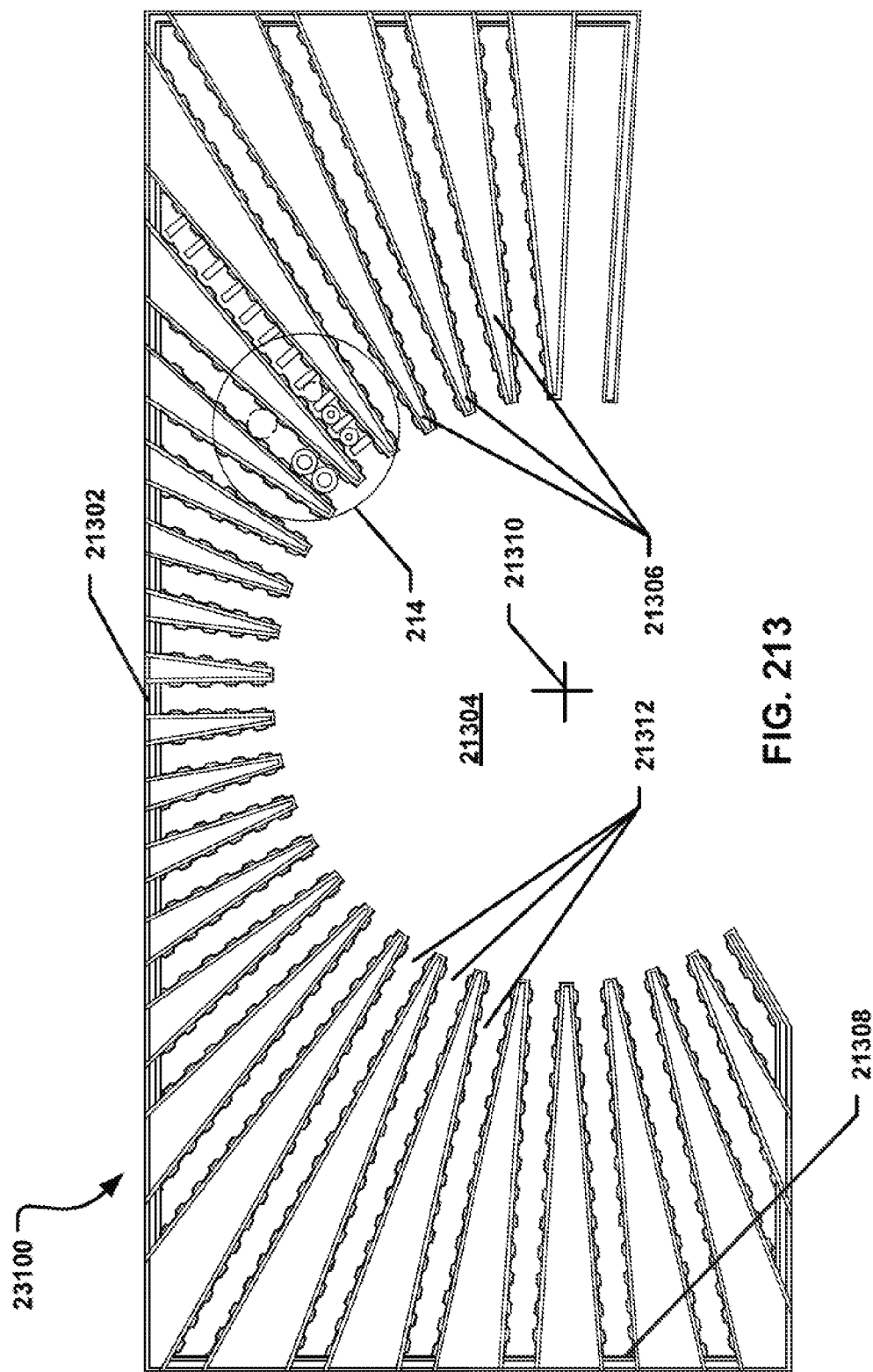
FIGS. 213-216 include illustrations of a drill pipe storage system in accordance with embodiments.

Referring now to FIG. 213 through FIG. 216, a drill pipe storage system is shown and is generally designated 21300. FIG. 213 is a top view of the drill pipe storage system 21300. As shown, the drill pipe storage system 21300 can include a generally rectangular housing 21302 having a central opening 21304. It can be appreciated that central opening 21304 can be sized and shaped to receive a tubular handling system therein, e.g., the VTHS 400 described herein.

As shown in FIG. 213, the drill pipe storage system 21300 can include a plurality of pipe support arms 21306 that can extend in a generally inward direction from an inner wall 21308 of the housing 21302 toward a center 21310 of the central opening 21304. A plurality of pipe storage bays 21312 can be established between adjacent pipe support arms 21306.

Figure 214:
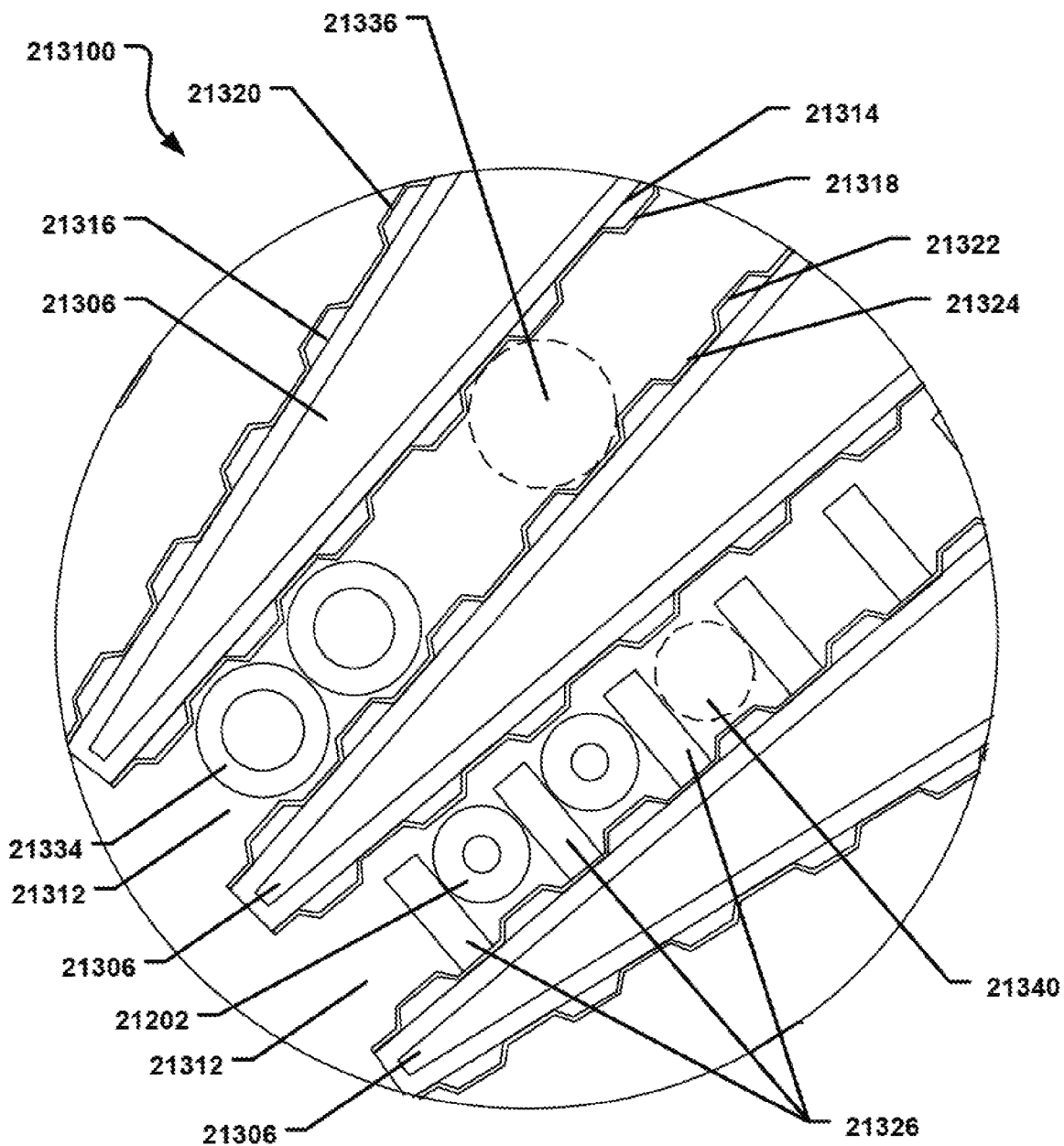

FIG. 214 is a detailed view of the drill pipe storage system 21300 taken at circle 214 in FIG. 213. As illustrated in FIG. 214, each pipe support arm 21306 can include a first surface 21314 and a second surface 21316. A first corrugated structure 21318 can be affixed to the first surface 21314 of each pipe support arm 21306. Moreover, a second corrugated structure 21320 can be affixed to the second surface 21316 of each pipe support arm 21306. Each corrugated structure 21318, 21320 can be alternatingly formed with a serious of protrusions 21322 and channels 21324. The protrusions 21322 can extend along the entire height of the drill pipe storage system 21300 (i.e., into the page) and the protrusions 21322 and the channels 21324 therebetween can be vertical and substantially parallel to each other and a longitudinal axis of the drill pipe storage system 21300. Further, the protrusions 21322 can extend away from the surfaces 21314, 21316 of each pipe support arm 21306 and into a respective pipe storage bay 21312.

Figure 215:
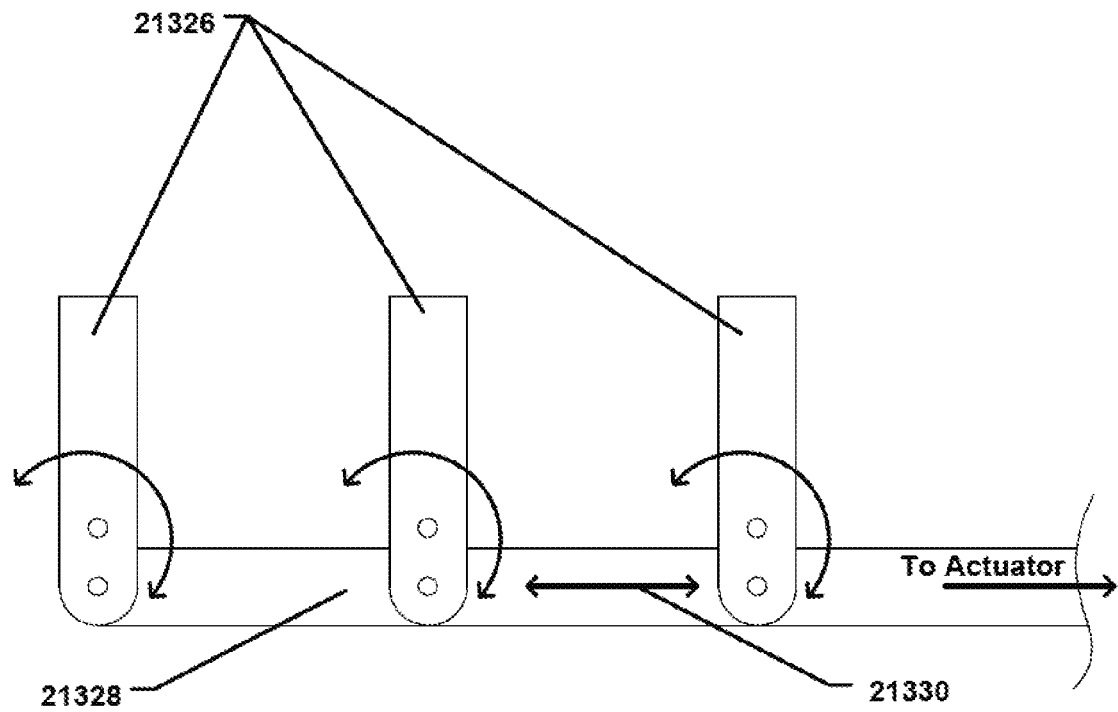
Figure 216:
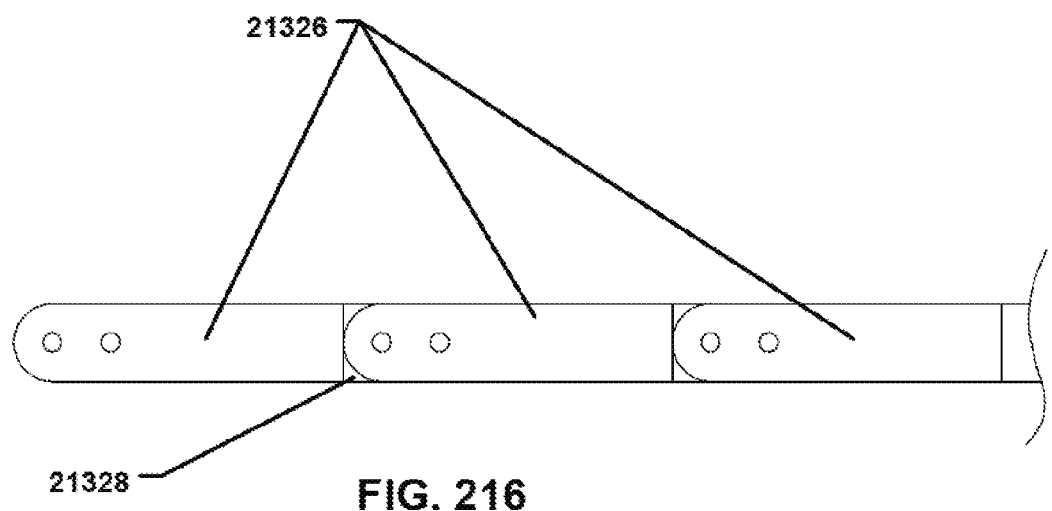

As illustrated in FIG. 213 and FIG. 214, each pipe support arm 21306 of the drill pipe storage system 2130 can include a series of latches 21326 that can extend into a respective pipe storage bay 21312 from an area overlapping with the channels 21324 formed in the corrugated structures 21318, 21320. In a particular aspect, each latch 21326 can be moved between an extended position and a retracted position. Further, each latch 21326 can move in unison between the extended position and the retraction position. Specifically, as shown in FIG. 215 and FIG. 216, the latches 21326 can be connected to, or otherwise coupled to, an actuator link 21328 and the actuator link 21328 can move linearly as indicated by arrow 21330. The actuator link 21328 can be connected to an actuator (not shown). The actuator can be a mechanical actuator, an electrical actuator, or a combination thereof. When the actuator link 21328 moves in a first direction, each latch 21326 can rotate about a pivot 21332 into the extended position, as illustrated in FIG. 215. The actuator link 21328 moves in a second direction, opposite the first, each latch 21326 can move into the retracted position, as illustrated in FIG. 216. In one aspect, the latches 21326 can move in unison. In another aspect, the latches 21326 can move independently from each other. Further, the latches 21326 can be spring actuated.

Referring back to FIG. 213 and FIG. 214, when the latches 21326 are in the retracted position, the pipe storage bay 21312 can receive a first size of drill pipes 21334 and each of the first size of drill pipes 21334 can be stored in a series of first storage openings 21336 that are established between opposite channels 21324 formed on adjacent pipe support arms 21306 flanking a particular pipe storage bay 21312. The opposing protrusions 21322 flanking each channel 21324 can be separated by a first distance, D1, that is smaller than the diameter of each of the first size of drill pipes 21334 and each of the first size of drill pipes 21334 remain in its respective first storage opening 21336.

When the latches 21326 are in the extended position, the pipe storage bay 21312 can receive a second size of drill pipes 21338 and each of the second size of drill pipes 21338 can be stored in a series of second storage openings 21340 that are established between opposite protrusions 21322 formed on adjacent pipe support arms 21306 flanking a particular pipe storage bay 21312. The first distance, D1, separating the opposing protrusions 21322 can be larger than the diameter of each of the second size of drill pipes 21338 and each of the second storage openings 21340 can be flanked by a pair of latches 21326 that maintain each of the second size of drill pipes 21338 in its respective second storage opening 21340. Accordingly, the pipe storage system 23100 can receive and storage pipes of varying sizes depending on whether the latches 212326 are extended or retracted.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the items as listed below.

EMBODIMENTS

Embodiment 1

A tubular handling system for conducting subterranean operations comprising a bridge disposed within a tubular storage area and coupled to a guide rail, wherein the bridge is configured to translate from a first bridge position to a second bridge position along the guide rail and over the tubular storage area; highlighted terms missing from spec; an arm coupled to the bridge; and a gripper coupled to the arm and adapted to engage a first tubular.

Embodiment 2

A tubular handling system for conducting subterranean operations comprising a bridge; an arm coupled to the bridge and configured to translate along a length of the bridge; and a gripper coupled to the arm and adapted to engage a first tubular in a tubular storage area.

Embodiment 3

A tubular handling system for conducting subterranean operations comprising a bridge comprising a first portion and a second portion; an arm coupled to the bridge between the first portion and the second portion; a gripper coupled to the arm and adapted to engage with a first tubular in a tubular storage area wherein the arm is adapted to move a tubular between the first portion and the second portion of the bridge upon moving the tubular from a pick-up position to a delivered position.

Embodiment 4

The tubular handling system of any one of embodiments 2 and 3, wherein the bridge is adapted to move along a guide rail between a first bridge position and a second bridge position spaced apart from the first bridge position.

Embodiment 5

The tubular handling system of any one of embodiments 1 and 2, wherein the arm is adapted to move the tubular between a first portion and a second portion of the bridge upon moving the tubular from a pick-up position to a delivered position.

Embodiment 6

The tubular handling system of any one of embodiments 1, 2, and 3, wherein the tubular handling system is adapted to move the first tubular from a first horizontal position associated with a pick-up position through a vertical position and to a second horizontal position associated with a delivered position.

Embodiment 7

The tubular handling system of any one of embodiments 1, 2, and 3, wherein the arm is adapted to translate along at least a portion of a length of the bridge while rotating the tubular from a first horizontal position, through a vertical position, to a second horizontal position.

Embodiment 8

A method of operating a tubular handling system for conducting subterranean operations comprising translating a bridge of a pipe deck handler to a first bridge position over a tubular storage area; moving an arm coupled to the bridge toward a first tubular in the tubular storage area; gripping the first tubular with a gripper coupled to the arm; and at least one of the following processes: a) translating the bridge along a guide rail to a second bridge position spaced apart from the first bridge position; b) moving the first tubular from a first position to a second position, wherein moving includes moving at least a portion of the first tubular through the bridge between a first portion and a second portion of the bridge; c) moving the first tubular from a first horizontal position associated with a pick-up position through a vertical position and to a second horizontal position associated with a delivered position; d) translating the arm along at least a portion of a length of the bridge while rotating the tubular from a first horizontal position, through a vertical position, to a second horizontal position; or e) any combination thereof.

Embodiment 9

The method of embodiment 8, wherein translating the bridge is performed in a direction generally transverse to a length of the first tubular.

Embodiment 10

The method of embodiment 8, wherein the first bridge position corresponds to a pick-up position wherein the arm is adapted to engage the first tubular in a tubular magazine and wherein the second bridge position corresponds to the delivered position.

Embodiment 11

The method of embodiment 8, wherein further comprising translating the bridge along the guide rail to a third bridge position spaced apart from the first bridge position and second bridge position, wherein the third bridge position corresponds to a second pick-up position wherein the arm is adapted to engage a second tubular in a tubular magazine.

Embodiment 12

The method of embodiment 8, wherein translating the bridge to the first bridge position further comprises sensing at least one characteristic of the tubular storage area, the at least one characteristic comprising at least one of: a) a number of tubulars in the tubular storage area; b) a position of the tubular relative to the tubular storage area; or c) any combination thereof.

Embodiment 13

The method of embodiment 8, wherein moving the first tubular between the first and second positions comprises rotating the first tubular at least 91 degrees or at least 95 degrees or at least 100 degrees or at least 120 degrees or at least 150 degrees or at least 160 degrees.

Embodiment 14

The method of embodiment 8, wherein moving the arm toward the first tubular is performed by pivoting the arm about a pivotal axis oriented generally normal to a horizontal plane.

Embodiment 15

The method of embodiment 8, wherein the arm is coupled to the bridge through a transverse member, and wherein translating the arm along the bridge is performed by moving the transverse member relative to the bridge.

Embodiment 16

The method of embodiment 8, wherein the transverse member is coupled between the first and second portions of the bridge, and wherein moving the transverse member is performed by translating the transverse member along a length of the bridge.

Embodiment 17

The method of embodiment 8, wherein the gripper is rotatably coupled to the arm about a rotational axis.

Embodiment 18

The method of embodiment 17, wherein the rotational axis is generally parallel with a horizontal plane or generally perpendicular to a length of the arm.

Embodiment 19

The method of embodiment 8, wherein moving the first tubular from the first horizontal position to the second horizontal position comprises rotating the gripper around a rotational axis.

Embodiment 20

The method of embodiment 8, wherein the first tubular is disposed at a first angular orientation, as measured with respect to a horizontal plane prior to engagement with the grip, between and including 0° and 90°.

Embodiment 21

The method of embodiment 8, further comprising moving the arm toward a second tubular in the tubular storage area; and gripping the second tubular with the gripper.

Embodiment 22

The method of embodiment 21, wherein the first and second tubulars are disposed at different angular orientations, as measured prior to engagement with the gripper.

Embodiment 23

The method of embodiment 21, wherein moving the arm toward the second tubular is performed after translating the bridge along the guide rail to a third bridge position corresponding with the second tubular.

Embodiment 24

The method of embodiment 21, wherein moving the arm toward the second tubular is performed after translating the bridge along the guide rail to the first bridge position corresponding with the second tubular.

Embodiment 25

The method of embodiment 8, the bridge is adapted to access the entire tubular storage area.

Embodiment 26

The method of embodiment 8, wherein the first horizontal position is disposed at a vertical elevation below the second horizontal position.

Embodiment 27

The method of embodiment 8, wherein the tubular handling system is disposed adjacent to a wellbore, and wherein the second horizontal position is closer to the wellbore than the first horizontal position.

Embodiment 28

The method of embodiment 8 or tubular handling system of any one of embodiments 1, 2, and 3, wherein the arm is coupled to the bridge through a transverse member adapted to translate along a length of the bridge.

Embodiment 29

The method of embodiment 8 or tubular handling system of any one of embodiments 1, 2, and 3, wherein at least one of the bridge and transverse member comprises a drive element adapted to move the transverse member along a length of the bridge.

Embodiment 30

The method of embodiment 8 or tubular handling system of any one of embodiments 1, 2, and 3, wherein the drive element comprises an electric motor.

Embodiment 31

The method of embodiment 8 or tubular handling system of any one of embodiments 1, 2, and 3, wherein the transverse member is disposed between a first portion and a second portion of the bridge.

Embodiment 32

The method of embodiment 31, wherein the transverse member is coupled to the bridge and the arm is coupled to the transverse member.

Embodiment 33

The method of embodiment 8 or tubular handling system of any one of embodiments 1, 2, and 3, wherein the arm comprises a pivot joint adapted to pivot relative to the bridge in a range between and including 1° and 270°.

Embodiment 34

The method of embodiment 33, wherein the arm is adapted to pivot around the pivot joint at an angle of at least 5° or at least 10° or at least 20° or at least 30° or at least 40° or at least 50° or at least 60° or at least 70° or at least 80° or at least 90° or at least 100° or at least 110° or at least 120° or at least 130° or at least 140° or at least 150° or at least 160° or at least 170° or at least 180° or at least 190° or at least 200° or at least 210° or at least 220° or at least 230° or at least 240° or at least 250° or at least 260°.

Embodiment 35

The method of embodiment 33, wherein the arm is adapted to pivot around the pivot joint at an angle of not greater than 260° or not greater than 250° or not greater than 240° or not greater than 230° or not greater than 220° or not greater than 210° or not greater than 200° or not greater than 190° or not greater than 180° or not greater than 170° or not greater than 160° or not greater than 150° or not greater than 140° or not greater than 130° or not greater than 120° or not greater than 110° or not greater than 100° or not greater than 90°.

Embodiment 36

The method of embodiment 8 or tubular handling system of any one of embodiments 1, 2, and 3, wherein the arm is coupled directly to a transverse element, and the transverse element is coupled directly to a first portion and second portion of the bridge.

Embodiment 37

The method of embodiment 8 or tubular handling system of any one of embodiments 1, 2, and 3, wherein the bridge is coupled to a guide rail, and wherein the bridge is configured to translate from a first bridge position to a second bridge position along the guide rail and over the tubular storage area.

Embodiment 38

The method or tubular handling system of embodiment 37, wherein the tubular handling system is configured to translate for a distance greater than a majority of a length of the tubular storage area.

Embodiment 39

The method or tubular handling system of embodiment 37, wherein the tubular handling system is configured to translate for at least 60% of a length of the tubular storage area or at least 70% or at least 80% or at least 90% or at least 95%.

Embodiment 40

The method or tubular handling system of embodiment 37, wherein the tubular handling system is configured to translate for an entire length of the tubular storage area.

Embodiment 41

The method or tubular handling system of embodiment 37, wherein the guide rail includes a first guide rail and a second guide rail, and wherein the bridge comprises a first end attached to the first guide rail and a second end attached to the second guide rail.

Embodiment 42

The method or tubular handling system of embodiment 37, wherein the guide rail extends in a direction generally perpendicular to a length of the bridge.

Embodiment 43

The method or tubular handling system of embodiment 37, further comprising at least one drive element between the bridge and the guide rail configured to translate the bridge along the guide rail.

Embodiment 44

The method or tubular handling system of embodiment 37, wherein the guide rail includes a first guide rail and a second guide rail, and wherein the bridge comprises a first end attached to the first guide rail and a second end attached to the second guide rail, and further wherein the bridge comprises at least one drive member between the first end and the first guide rail or the second end and the second guide rail, the at least one drive member configured to translate the bridge along the guide rail.

Embodiment 45

The method or tubular handling system of embodiment 44, further comprising a first drive member between the first end and the first guide rail and a second drive member between the second end and the second guide rail, wherein the first drive member and second drive member are controlled by at least one controller to synchronize their movements.

Embodiment 46

The method of embodiment 8 or tubular handling system of any one of embodiments 1, 2, and 3, wherein the arm is coupled to a transverse member, and wherein the arm comprises a first pivot point with a first pivot axis extending generally parallel to a horizontal plane, the arm further comprising a gripper coupled to the arm at a second pivot point and having a second pivot axis extending generally parallel to the horizontal plane.

Embodiment 47

The method of embodiment 8 or tubular handling system of any one of embodiments 1, 2, and 3, wherein the arm and gripper are adapted to act in concert to move the first tubular from a first horizontal position to a second horizontal position spaced apart from the first horizontal position.

Embodiment 48

The method or tubular handling system of embodiment 47, wherein during movement of the first tubular from the first horizontal position to the second horizontal positions, the gripper is adapted to rotate about a second pivot point a first angular displacement, $\alpha 1$, greater than an angular displacement, $\alpha 2$, of the arm about a first pivot axis.

Embodiment 49

The method or tubular handling system of embodiment 48, wherein $\alpha 1$ is at least 1.01 $\alpha 2$ or at least 1.02 $\alpha 2$ or at least 1.03 $\alpha 2$ or at least 1.04 $\alpha 2$ or at least 1.05 $\alpha 2$ or at least 1.1 $\alpha 2$ or at least 1.2 $\alpha 2$ or at least 1.3 $\alpha 2$ or at least 1.4 $\alpha 2$.

Embodiment 50

The method or tubular handling system of embodiment 48, wherein $\alpha 1$ is not greater than 10.0 $\alpha 2$ or not greater than 9.0 $\alpha 2$ or not greater than 8.0 $\alpha 2$ or not greater than 7.0 $\alpha 2$ or not greater than 6.0 $\alpha 2$ or not greater than 5.0 $\alpha 2$ or not greater than 4.0 $\alpha 2$ or not greater than 3.0 $\alpha 2$ or not greater than 2.0 $\alpha 2$ or not greater than 1.5 $\alpha 2$.

Embodiment 51

The method or tubular handling system of embodiment 48, wherein the gripper is rotatable about a second pivot point relative to the arm and the arm is pivotable about a first pivot axis, and wherein the second pivot axis and first pivot axis are generally parallel with respect to one another.

Embodiment 52

The method of embodiment 8 or tubular handling system of any one of embodiments 1, 2, and 3, wherein the gripper comprises at least two gripping elements each adapted to grip the first tubular.

Embodiment 53

The method or tubular handling system of embodiment 52, wherein at least one of the at least two gripping elements is adapted to grip the first tubular with a first diameter and a second tubular with a second diameter different than the first diameter.

Embodiment 54

The method of embodiment 8 or tubular handling system of any one of embodiments 1, 2, and 3, wherein the arm comprises a recessed portion, and wherein the at least a portion of the gripper is disposed in the recessed portion of the arm.

Embodiment 55

The method or tubular handling system of embodiment 54, wherein the gripper is rotatably coupled to the arm about a rotational axis extending through the recessed portion of the arm.

Embodiment 56

The method of embodiment 8 or tubular handling system of any one of embodiments 1, 2, and 3, wherein the bridge has a total length, LB, and the arm is adapted to translate a distance of not greater than LB or not greater than 0.99 LB or not greater than 0.95 LB or not greater than 0.9 LB or not greater than 0.8 LB or not greater than 0.7 LB or not greater than 0.6 LB.

Embodiment 57

The method of embodiment 8 or tubular handling system of any one of embodiments 1, 2, and 3, wherein the bridge has a length, LB, and the arm is adapted to translate a distance of at least 0.05 LB or at least 0.1 LB or at least 0.2 LB or at least 0.3 LB or at least 0.4 LB or at least 0.5 LB.

Embodiment 58

The method of embodiment 8 or tubular handling system of any one of embodiments 1, 2, and 3, wherein the bridge is disposed at a vertical elevation above the tubular storage area.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive. Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be used in this application.

As used herein, the terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in reference books and other sources within the structural arts and corresponding manufacturing arts.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A tubular handling system for conducting subterranean operations comprising:
    a bridge disposed within a tubular storage area and coupled to a guide rail, wherein the bridge is configured to translate from a first bridge position to a second bridge position along the guide rail and over the tubular storage area;
    an arm coupled to the bridge; and
    a gripper coupled to the arm and adapted to engage a tubular, wherein the arm is adapted to move the tubular between a first portion and a second portion of the bridge as the tubular is transported from a pick-up position to a delivered position.

2. The tubular handling system of claim 1, wherein the pick-up position is one of a horizontal storage location or a position above a rig floor, and the delivered position is the other one of the horizontal storage location or the position above the rig floor.

3. The tubular handling system of claim 1, wherein the tubular handling system is adapted to move the tubular from a first horizontal position associated with a pick-up position through a vertical position and to a second horizontal position associated with a delivered position.

4. The tubular handling system of claim 1, wherein the arm is adapted to translate in a first direction along at least a portion of a length of the bridge from a first position on the bridge to a second position on the bridge while rotating the tubular from a first horizontal position, through a vertical position, to a second horizontal position.

5. A tubular handling system for conducting subterranean operations comprising:
 a bridge with first and second portions that are parallel with each other and separated by a space between the first and second portions;
 an arm coupled to the bridge and configured to translate along a length of the bridge; and
 a gripper coupled to the arm and adapted to engage a tubular in a tubular storage area, wherein the arm is configured to rotate relative to the bridge and move the gripper through the space between the first and second portions.

6. The tubular handling system of claim 5, wherein the bridge is adapted to move along a guide rail between a first bridge position and a second bridge position spaced apart from the first bridge position.

7. The tubular handling system of claim 5, wherein the tubular handling system is adapted to move the tubular from a first horizontal position associated with a pick-up position through a vertical position and to a second horizontal position associated with a delivered position.

8. The tubular handling system of claim 5, wherein the arm is adapted to translate along at least a portion of a length of the bridge while rotating the tubular from a first horizontal position, through a vertical position, to a second horizontal position.

9. The tubular handling system of claim 5, wherein the arm is coupled to the bridge through a transverse member adapted to translate along a length of the bridge.

10. The tubular handling system of claim 9, wherein at least one of the bridge and transverse member comprises a drive element adapted to move the transverse member along a length of the bridge.

11. The tubular handling system of claim 10, wherein the drive element comprises an electric motor.

12. The tubular handling system of claim 10, wherein the transverse member is disposed between a first portion and a second portion of the bridge.

13. The tubular handling system of claim 12, wherein the transverse member is coupled to the bridge and the arm is coupled to the transverse member.

14. A tubular handling system for conducting subterranean operations comprising:
 a bridge comprising a first portion and a second portion;
 an arm coupled to the bridge between the first portion and the second portion;
 a gripper coupled to the arm and adapted to engage with a first tubular in a tubular storage area; and
 wherein the arm is adapted to move a tubular between the first portion and the second portion of the bridge upon moving the tubular from a pick-up position to a delivered position.

15. The tubular handling system of claim 14, wherein the arm comprises a pivot joint adapted to pivot relative to the bridge in a range between and including 1° and 270°.

16. The tubular handling system of claim 15, wherein the bridge is coupled to a guide rail, and wherein the bridge is configured to translate from a first bridge position to a second bridge position along the guide rail and over the tubular storage area.

17. The tubular handling system of claim 16, wherein the tubular handling system is configured to translate for a distance greater than a majority of a length of the tubular storage area.

18. The tubular handling system of claim 16, wherein the tubular handling system is configured to translate for at least 60% of a length of the tubular storage area.

19. The tubular handling system of claim 16, wherein the tubular handling system is configured to translate for an entire length of the tubular storage area.

20. A tubular handling system for conducting subterranean operations comprising:
 a bridge disposed within a tubular storage area, with a first guard rail coupled to one end of the bridge and a second guard rail coupled to an opposite end of the bridge, wherein the bridge is configured to translate from a first bridge position to a second bridge position along the first and second guide rails and over the tubular storage area;
 an arm coupled to the bridge;
 a gripper coupled to the arm and adapted to engage a tubular, wherein the arm is adapted to move the tubular between a first portion and a second portion of the bridge as the tubular is transported from a pick-up position to a delivered position, and
 wherein the arm is adapted to translate in a first direction or a second direction along at least a portion of a length of the bridge from a first position on the bridge to a second position on the bridge while rotating the tubular from a first horizontal position, through a vertical position, to a second horizontal position.

\* \* \* \* \*

UNITED STATES PATENT AND TRADEMARK OFFICE
CERTIFICATE OF CORRECTION

PATENT NO. : 10,808,465 B2
APPLICATION NO. : 16/396297
DATED : October 20, 2020
INVENTOR(S) : Kenneth Mikalsen et al.

It is certified that error appears in the above-identified patent and that said Letters Patent is hereby corrected as shown below:

On the Title Page

Item [71], delete "Nabors LUX 2 SARL" and insert --CANRIG ROBOTIC TECHNOLOGIES AS--

Item [56], insert:
--U.S. PATENT DOCUMENTS

| | | |
|---|---|---|
| 8845260 B2 | 2012-02-14 | Andrew GERBER |
| 8113762 B2 | 2012-02-14 | Jaroslav BELIK |
| 20190186214 A1 | 2019-06-20 | Morten ERIKSEN |
| 20200040674 A1 | 2020-02-06 | MCKENZIE et al. |
| 20190003269 A1 | 2019-01-03 | Skjærseth et al. |
| 20160208566 A1 | 2016-07-21 | BOWLEY et al. |
| 20190136669 A1 | 2019-05-09 | WIEDECKE et al. |
| 20060104747 A1 | 2006-05-18 | ZAHN et al. |
| 20190330936 A1 | 2019-10-31 | MIKALSEN et al. |
| 20190330933 A1 | 2019-10-31 | Kenneth MIKALSEN |
| 20190330937 A1 | 2019-10-31 | Kenneth MIKALSEN |

FOREIGN PATENT DOCUMENTS

| | | |
|---|---|---|
| EP | 2438263 B8 | 2016-05-25 |
| WO | 2019207161 A1 | 2019-10-31 |
| WO | 2019207163 A1 | 2019-10-31 |
| WO | 2019207158 A1 | 2019-10-31 |
| WO | 2019207162 A1 | 2019-10-31-- |

Signed and Sealed this
Fifteenth Day of November, 2022

Katherine Kelly Vidal
*Director of the United States Patent and Trademark Office*